US012516038B2

United States Patent
Barbay et al.

(10) Patent No.: US 12,516,038 B2
(45) Date of Patent: Jan. 6, 2026

(54) INHIBITORS OF ANTIGEN PRESENTATION BY HLA-DR

(71) Applicant: Janssen Pharmaceutica NV, Beerse (BE)

(72) Inventors: Joseph Kent Barbay, Flourtown, PA (US); Stephane Becart, Cardiff by the Sea, CA (US); Kelly L. Damm-Ganamet, San Diego, CA (US); Gavin C. Hirst, San Diego, CA (US); Kevin D. Kreutter, Arlington, MA (US); Alec D. Lebsack, Ladera Ranch, CA (US)

(73) Assignee: Janssen Pharmaceutica NV, Beerse (BE)

( * ) Notice: Subject to any disclaimer, the term of this patent is extended or adjusted under 35 U.S.C. 154(b) by 628 days.

(21) Appl. No.: 17/907,647

(22) PCT Filed: Mar. 30, 2021

(86) PCT No.: PCT/EP2021/058342
§ 371 (c)(1),
(2) Date: Sep. 28, 2022

(87) PCT Pub. No.: WO2021/198283
PCT Pub. Date: Oct. 7, 2021

(65) Prior Publication Data
US 2023/0150985 A1    May 18, 2023

Related U.S. Application Data

(60) Provisional application No. 63/002,984, filed on Mar. 31, 2020, provisional application No. 63/003,020, filed on Mar. 31, 2020, provisional application No. 63/003,046, filed on Mar. 31, 2020.

(51) Int. Cl.
| C07D 311/22 | (2006.01) |
| A61K 31/353 | (2006.01) |
| C07D 405/12 | (2006.01) |
| C07D 405/14 | (2006.01) |

(52) U.S. Cl.
CPC .......... *C07D 405/12* (2013.01); *C07D 311/22* (2013.01); *C07D 405/14* (2013.01); *C07B 2200/07* (2013.01)

(58) Field of Classification Search
CPC .. C07D 311/22; C07D 405/12; A61K 31/353; A61K 31/4433
USPC ................ 549/399; 546/282.1; 514/456, 336
See application file for complete search history.

(56) References Cited

U.S. PATENT DOCUMENTS 5,298,512 A * 3/1994 Eggler .................... A61P 29/00
546/281.1

FOREIGN PATENT DOCUMENTS

| GB | 1357633 A | 6/1974 |
| WO | 2011055215 A2 | 5/2011 |
| WO | 2014207648 A1 | 12/2014 |

OTHER PUBLICATIONS

Berge, et al., "Pharmaceutical Salts", Journal of Pharmaceutical Sciences, vol. 66 (1); pp. 1-19, (1977).
Fernando, M. et al., "Defining the Role of the MHC in Autoimmunity: A Review and Pooled Analysis", PLoS Genet, 2008, e1000024, 12 pages, vol. 4, No. 4.
Gebe, J.A. et al., "HLA Class II peptide-binding and autoimmunity", Tissue Antigens, 2002, p. 78-87, vol. 59.
Gough, S.C.L. and Simmonds, M.J., "The HLA Region and Autoimmune Disease: Associations and Mechanisms of Action", Curr Genomics, 2007, p. 453-465, vol. 8, No. 7.
International Search Report and Written Opinion of PCT International Application No. PCT/EP2021/058342 mailed May 11, 2021, 14 pages.
Mcdevitt, H. and Bodmer, W., "HL-A, Immune-Response Genes, and Disease", The Lancet, 1974, p. 1269-1275, vol. 1.
Shiina, T. et al., "The HLA genomic loci map: expression, interaction, diversity and disease", J Human Genetics, 2009, p. 15-39, vol. 54.
Suzuki, Akira, "Cross-Coupling Reactions Of Organoboranes: An Easy Way To Construct C—C Bonds (Nobel Lecture)", Angew. Chem. Int. Ed., 2011, p. 6723-6737, vol. 50.

* cited by examiner

*Primary Examiner* — Charanjit Aulakh

(57) ABSTRACT

Chromanone compounds, pharmaceutical compositions containing them, methods of making them, and methods of using them including methods for treating disease states, disorders, and conditions associated with the inhibition of antigen presentation by HLA-DR.

16 Claims, No Drawings

INHIBITORS OF ANTIGEN PRESENTATION BY HLA-DR

CROSS-REFERENCE TO RELATED APPLICATIONS

This application is a 371 national stage of PCT Application No. PCT/EP2021/058342, filed on Mar. 30, 2021, which claims the benefit of U.S. Application No. 63/002,984, filed Mar. 31, 2020, U.S. Application No. 63/003,020, filed Mar. 31, 2020, and U.S. Application No. 63/003,046, filed Mar. 31, 2020, the contents of each of which are incorporated herein in their entirety.

FIELD OF THE INVENTION

The present invention relates to certain chromanone compounds, pharmaceutical compositions containing them, methods of making them, and methods of using them including methods for treating disease states, disorders, and conditions associated with the inhibition of antigen presentation by HLA-DR.

BACKGROUND OF THE INVENTION

The immune system helps to protect the body against diseases caused by pathogens such as viruses, bacteria, and parasites. The immune system is made up of specialized organs, cells, and tissues that work together to destroy these pathogens. Pieces of harmful substances from pathogens, called antigens, are complexed with proteins at the surface of specialized cells from the immune system called antigen presenting cells (APCs). Once these antigens are displayed on an APC cell surface, they can be recognized by helper T cells of the immune system to trigger an immune response. Sometimes an APC erroneously presents an antigen from its own tissue (autoantigen or self-antigen) on its surface. As a result, the immune system now sees this autoantigen as a foreign pathogen and the body will begin to attack its own tissues or organs. This ultimately leads to the development of an autoimmune disease where self-tissues and organs (e.g., the joints in rheumatoid arthritis (RA) or the pancreas in Type 1 diabetes) are destroyed by the body's own immune system. One way to prevent such autoimmune diseases would be to block the presentation of these autoantigens by designing molecules that would compete with the autoantigen to bind the T cells of the immune system. These molecules would block the autoantigen from being recognized by the immune system, thus avoiding destruction of the body's own tissues.

The major histocompatibility complex of class II (MHC-II) proteins are transmembrane glycoproteins that present self and non-self-peptides to the surface of APC for recognition by T cell receptors of CD4+ T cells. Humans have three isotypes of MHC-II molecules, called human leukocyte antigen (HLA), HLA-DR, HLA-DP and HLA-DQ, each consisting of an alpha/beta ($\alpha/\beta$) chain heterodimer that binds a peptide inside the cell and carries it to the cell surface for presentation to CD4+ T cells and thus cause antigen-specific CD4+ T cell activation. Each subunit is comprised of two extracellular domains, a membrane-spanning domain and a cytoplasmic tail. When in complex with a TCR, the TCR sits directly above the peptide-binding groove and is in contact with both MHC-II and the bound peptide. The peptide-binding groove is a large, open cavity exposed to solvent and consists of sub-pockets, P1-P9. Binding specificity of the peptide comes from interactions with a series of relatively deeper hydrophobic sub-pockets (composed of allele-specific polymorphic residues), providing differing chemical environments for each given pocket of a given allele. Each MHC-II protein can bind to a diverse set of peptides and some peptides can also bind multiple MHC-II alleles. This degenerate binding controls the antigen-specific response, the most fine-tuned and specific immune response the body mounts against a wide variety of possible pathogens.

HLA-DR$\alpha$, encoded by the gene HLA DRA1, is highly conserved whereas HLA-DR$\beta$, encoded by the gene HLA DRB1 is hyperpolymorphic (>1700 alleles). Genetic associations between HLA, in particular the beta chain of HLA-DR (encoded by HLA-DRB1), and many autoimmune diseases were extensively reported since the early 1970s (Mc Devitt and Bodmer, *Lancet* 1974; 1: 1269-1275). Polymorphisms in HLA-DRB1 have been found to be associated with diseases including RA, ulcerative colitis (UC), Crohn's disease (CD), systemic juvenile idiopathic arthritis, Graves' disease, Hashimoto's thyroiditis, myasthenia gravis (MG), multiple sclerosis (MS), systemic lupus erythematosus (SLE), pemphigus vulgaris, Addison's disease and Type 1 diabetes (Gough and Simmonds, *Curr Genomics* 2007; 8(7): 453-465, Fernando et al., *PLoS Genet* 2008; 4(4): e1000024, Gebe et al., *Tissue Antigens* 2002; 59:78-87, and Shiina et al., *J Human Genetics* 2009; 54: 15-19). Also variations in the HLA DRB1 gene can affect the nature of specific peptides presented by HLA-DR (e.g., self-peptides), which in turn affects the antigen specificity of CD4+ T cells (e.g., self-reactive T cells) recognizing and responding to that HLA-DR/peptide complex. This antigen-specific T cell activation is considered as an early step in autoimmune disease initiation.

Because of the dominant MHC-II association with multiple autoimmune diseases, small molecules may selectively modulate, interfere and/or abrogate the recognition of HLA-DR/peptide complexes by T cells in treatment of these HLA-DRB1-associated autoimmune diseases including RA, UC, CD, systemic juvenile idiopathic arthritis, Graves' disease, Hashimoto's thyroiditis, MG, MS, SLE, pemphigus vulgaris, Addison's disease and Type 1 diabetes (Gough and Simmonds, *Curr Genomics* 2007; 8(7): 453-465, Fernando et al., *PLoS Genet* 2008; 4(4): e1000024, Gebe et al., *Tissue Antigens* 2002; 59:78-87, and Shiina et al., *J Human Genetics* 2009; 54: 15-19).

BRIEF SUMMARY OF THE INVENTION

Embodiments of the present invention relate to compounds, pharmaceutical compositions containing them, methods of making and purifying them, methods of using them as inhibitors of antigen presentation by HLA-DR and methods for using them for the treatment of disease states, disorders, and conditions associated with the inhibition of antigen presentation by HLA-DR.

Additional embodiments of the invention are methods of treating a subject suffering from or diagnosed with a disease, disorder, or medical condition associated with the inhibition of antigen presentation by HLA-DR complex using at least a compound or active agent of the invention.

Additional embodiments, features, and advantages of the invention will be apparent from the following detailed description and through practice of the invention.

Embodiments of this invention include compounds of Formula (I), and pharmaceutically acceptable salts thereof

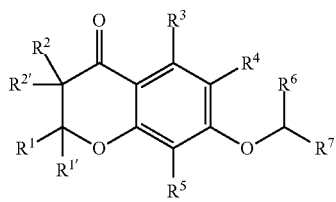
(I)

wherein
$R^1$ is selected from the group consisting of H, —$C_1$-$C_5$alkyl, and phenyl;
$R^{1'}$ is selected from the group consisting of H and —$C_1$-$C_5$alkyl;
$R^2$ is selected from the group consisting of H, —$C_1$-$C_5$alkyl, —$CH_2OH$, and phenyl;
$R^{2'}$ is selected from the group consisting of H and —$C_1$-$C_5$alkyl;
$R^3$ is selected from the group consisting of H, —$C_1$-$C_5$alkyl, halo, —$OCH_3$ and CN;
$R^4$ is selected from the group consisting of H, —$C_1$-$C_5$alkyl, halo, and phenyl;
$R^5$ is selected from the group consisting of H, —$C_1$-$C_5$alkyl, halo, CN, —$OCH_3$, phenyl, and

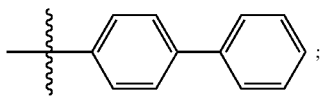
;

$R^6$ is selected from the group consisting of

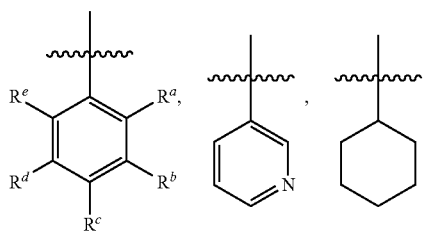
, and

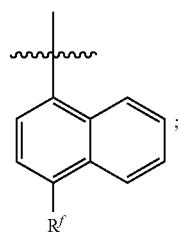
;

$R^a$ is selected from the group consisting of H, —$OCH_3$, F, CN, —$OC_1$-$C_5$alkyl, —$C(O)NH_2$, and

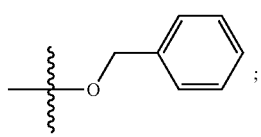
;

$R^b$ is selected from the group consisting of H, CN, —$CH_3$, —$OCH_3$, —OH, F,

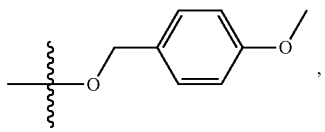
,

—$C(O)NH_2$, —$SO_2CH_3$, and —$CH_2NHC(O)NH_2$;
$R^c$ is selected from the group consisting of H, —$OCH_3$, halo, CN;

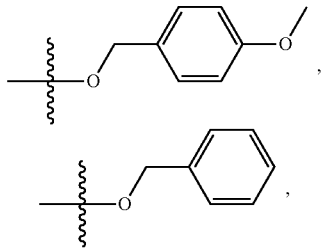

—$CO_2H$, —$CO_2CH_3$, —$C(O)NH_2$, —$C(O)NHCH_3$, —$C(O)N(CH_3)_2$, —$SO_2CH_3$, and —$CH_2NHC(O)NH_2$;
$R^d$ is H;
$R^e$ is H;
$R^f$ is selected from the group consisting of H, —$C(O)NH_2$ and CN;
$R^7$ is selected from the group consisting of

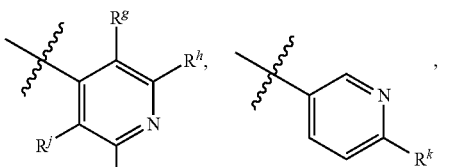

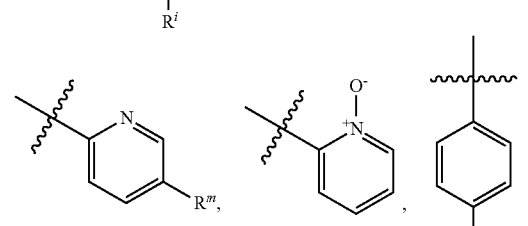

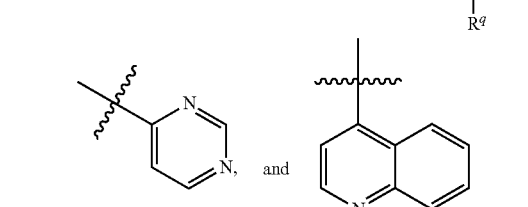

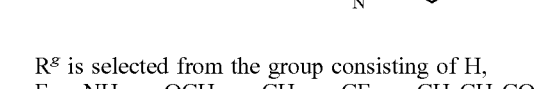

$R^g$ is selected from the group consisting of H, F, —$NH_2$, —$OCH_3$, —$CH_3$, —$CF_3$, —$CH_2CH_2CO_2H$ and phenyl;
$R^h$ is selected from the group consisting of H, —$NH_2$, —$OCH_3$, —$CH_3$, —$CF_3$, —$CH_2CH_2CO_2H$ and phenyl;
$R^i$ is selected from the group consisting of H, and —$C_1$-$C_5$alkyl;
$R^j$ is selected from the group consisting of H and —$C_1$-$C_5$alkyl;

R$^k$ is selected from the group consisting of H and —CO$_2$NH$_2$;

R$^m$ is selected from the group consisting of H, Cl, and —CO$_2$NH$_2$; and

R$^q$ is —CO$_2$H or —CO$_2$NH$_2$.

Illustrative embodiments of compounds of Formula (I) and pharmaceutically acceptable salts thereof are (*R)-7-((2-Fluorophenyl)(pyridin-4-yl)methoxy)chroman-4-one;
(*S)-7-((2-Fluorophenyl)(pyridin-4-yl)methoxy)chroman-4-one;
(R,S)-7-((3-Fluorophenyl)(pyridin-4-yl)methoxy)chroman-4-one;
(*R)-7-((3-Fluorophenyl)(pyridin-4-yl)methoxy)chroman-4-one;
(*S)-7-((3-Fluorophenyl)(pyridin-4-yl)methoxy)chroman-4-one;
(R,S)-7-((4-Fluorophenyl)(pyridin-4-yl)methoxy)chroman-4-one;
(*R)-7-((4-Fluorophenyl)(pyridin-4-yl)methoxy)chroman-4-one;
(*S)-7-((4-Fluorophenyl)(pyridin-4-yl)methoxy)chroman-4-one;
(R,S)-7-((3-((4-Methoxybenzyl)oxy)phenyl)(pyridin-4-yl)methoxy)chroman-4-one;
(*R)-7-((3-((4-Methoxybenzyl)oxy)phenyl)(pyridin-4-yl)methoxy)chroman-4-one;
(*S)-7-((3-((4-Methoxybenzyl)oxy)phenyl)(pyridin-4-yl)methoxy)chroman-4-one;
(*S)-7-((3-Hydroxyphenyl)(pyridin-4-yl)methoxy)chroman-4-one;
(R,S)-7-(Pyridin-2-yl(pyridin-4-yl)methoxy)chroman-4-one;
(*R)-2-(((4-Oxochroman-7-yl)oxy)(pyridin-4-yl)methyl)benzonitrile;
(*S)-2-(((4-Oxochroman-7-yl)oxy)(pyridin-4-yl)methyl)benzonitrile;
(*R)-2-(((4-Oxochroman-7-yl)oxy)(pyridin-4-yl)methyl)benzamide;
(*S)-2-(((4-Oxochroman-7-yl)oxy)(pyridin-4-yl)methyl)benzamide;
(*R)-3-(((4-oxochroman-7-yl)oxy)(pyridin-4-yl)methyl)benzamide;
(*S)-3-(((4-oxochroman-7-yl)oxy)(pyridin-4-yl)methyl)benzamide;
(R,S)-4-(((4-Oxochroman-7-yl)oxy)(pyridin-4-yl)methyl)benzonitrile;
(*R)-4-(((4-oxochroman-7-yl)oxy)(pyridin-4-yl)methyl)benzonitrile;
(*S)-4-(((4-oxochroman-7-yl)oxy)(pyridin-4-yl)methyl)benzonitrile;
(R,S)-4-(((4-Oxochroman-7-yl)oxy)(pyridin-4-yl)methyl)benzamide;
(*R)-4-(((4-oxochroman-7-yl)oxy)(pyridin-4-yl)methyl)benzamide;
(*S)-4-(((4-Oxochroman-7-yl)oxy)(pyridin-4-yl)methyl)benzamide;
(R,S)-7-((4-Methoxyphenyl)(pyridin-4-yl)methoxy)chroman-4-one;
(*R)-7-((4-Methoxyphenyl)(pyridin-4-yl)methoxy)chroman-4-one;
(*S)-7-((4-Methoxyphenyl)(pyridin-4-yl)methoxy)chroman-4-one;
(*R)-7-((3-methoxyphenyl)(pyridin-4-yl)methoxy)chroman-4-one;
(*S)-7-((3-methoxyphenyl)(pyridin-4-yl)methoxy)chroman-4-one;
(*R)-7-((2-Methoxyphenyl)(pyridin-4-yl)methoxy)chroman-4-one;
(*S)-7-((2-Methoxyphenyl)(pyridin-4-yl)methoxy)chroman-4-one;
(*R)-4-((2-Methylpyridin-4-yl)((4-oxochroman-7-yl)oxy)methyl)benzamide;
(*S)-4-((2-Methylpyridin-4-yl)((4-oxochroman-7-yl)oxy)methyl)benzamide;
(*R)-7-((4-(benzyloxy)phenyl)(pyridin-4-yl)methoxy)chroman-4-one;
(*R)-7-((4-((4-Methoxybenzyl)oxy)phenyl)(pyridin-4-yl)methoxy)chroman-4-one;
(*S)-7-((4-((4-Methoxybenzyl)oxy)phenyl)(pyridin-4-yl)methoxy)chroman-4-one;
(*S)-4-(((4-oxochroman-7-yl)oxy)(2-(trifluoromethyl)pyridin-4-yl)methyl)benzamide;
(*R)-4-(((4-oxochroman-7-yl)oxy)(3-(trifluoromethyl)pyridin-4-yl)methyl)benzamide;
(*S)-4-(((4-oxochroman-7-yl)oxy)(3-(trifluoromethyl)pyridin-4-yl)methyl)benzamide;
(*R)-4-((3-fluoropyridin-4-yl)((4-oxochroman-7-yl)oxy)methyl)benzamide;
(*S)-4-((3-fluoropyridin-4-yl)((4-oxochroman-7-yl)oxy)methyl)benzamide;
(*R)-4-((3-Methylpyridin-4-yl)((4-oxochroman-7-yl)oxy)methyl)benzamide;
(*S)-4-((3-Methylpyridin-4-yl)((4-oxochroman-7-yl)oxy)methyl)benzamide;
(*R)-4-(((4-oxochroman-7-yl)oxy)(quinolin-4-yl)methyl)benzamide;
(*S)-4-(((4-oxochroman-7-yl)oxy)(quinolin-4-yl)methyl)benzamide;
(*R)-4-((3-methoxypyridin-4-yl)((4-oxochroman-7-yl)oxy)methyl)benzamide;
(*S)-4-((3-methoxypyridin-4-yl)((4-oxochroman-7-yl)oxy)methyl)benzamide;
(*R)-4-((2-methoxypyridin-4-yl)((4-oxochroman-7-yl)oxy)methyl)benzamide;
(*S)-4-((2-methoxypyridin-4-yl)((4-oxochroman-7-yl)oxy)methyl)benzamide;
(*R)-4-(((4-oxochroman-7-yl)oxy)(3-phenylpyridin-4-yl)methyl)benzamide;
(*S)-4-(((4-oxochroman-7-yl)oxy)(3-phenylpyridin-4-yl)methyl)benzamide;
(*R)-4-(((4-oxochroman-7-yl)oxy)(2-phenylpyridin-4-yl)methyl)benzamide;
(*S)-4-(((4-oxochroman-7-yl)oxy)(2-phenylpyridin-4-yl)methyl)benzamide;
(*R)-4-((3-aminopyridin-4-yl)((4-oxochroman-7-yl)oxy)methyl)benzamide;
(*R)-4-((2-aminopyridin-4-yl)((4-oxochroman-7-yl)oxy)methyl)benzamide;
(*S)-4-((2-aminopyridin-4-yl)((4-oxochroman-7-yl)oxy)methyl)benzamide;
(*R)-4-(((4-oxochroman-7-yl)oxy)(phenyl)methyl)benzamide;
(*S)-4-(((4-oxochroman-7-yl)oxy)phenylmethyl)benzamide;
(*R)-4-((4-Chlorophenyl)((4-oxochroman-7-yl)oxy)methyl)benzamide;
(*S)-4-((4-Chlorophenyl)((4-oxochroman-7-yl)oxy)methyl)benzamide;
(*R)-4-(((4-oxochroman-7-yl)oxy)(pyridin-3-yl)methyl)benzamide;
(*S)-4-(((4-oxochroman-7-yl)oxy)(pyridin-3-yl)methyl)benzamide;

(*R)-4-(((4-oxochroman-7-yl)oxy)(pyridin-2-yl)methyl)
   benzamide;
(*S)-4-(((4-oxochroman-7-yl)oxy)(pyridin-2-yl)methyl)
   benzamide;
(*R)-4-(((4-Oxochroman-7-yl)oxy)(pyrimidin-4-yl)methyl)
   benzamide;
(*S)-4-(((4-Oxochroman-7-yl)oxy)(pyrimidin-4-yl)methyl)
   benzamide;
(*R)—N-methyl-4-(((4-oxochroman-7-yl)oxy)(pyridin-4-
   yl)methyl)benzamide;
(*S)—N-methyl-4-(((4-oxochroman-7-yl)oxy)(pyridin-4-
   yl)methyl)benzamide;
(*R)-2-methyl-4-(((4-oxochroman-7-yl)oxy)(pyridin-4-yl)
   methyl)benzamide;
(*S)-2-methyl-4-(((4-oxochroman-7-yl)oxy)(pyridin-4-yl)
   methyl)benzamide;
(*R)-3-methyl-4-(((4-oxochroman-7-yl)oxy)(pyridin-4-yl)
   methyl)benzamide;
(*S)-3-methyl-4-(((4-oxochroman-7-yl)oxy)(pyridin-4-yl)
   methyl)benzamide;
(*R)-4-(((4-oxochroman-7-yl)oxy)(pyridin-4-yl)methyl)-1-
   naphthonitrile;
(*S)-4-(((4-oxochroman-7-yl)oxy)(pyridin-4-yl)methyl)-1-
   naphthonitrile;
(*R)-7-(cyclohexyl(pyridin-4-yl)methoxy)chroman-4-one;
(*S)-7-(cyclohexyl(pyridin-4-yl)methoxy)chroman-4-one;
4-((*S)—(((*R)-2-Methyl-4-oxochroman-7-yl)oxy)(pyri-
   din-4-yl)methyl)benzamide;
4-((*R)—(((*R)-2-Methyl-4-oxochroman-7-yl)oxy)(pyri-
   din-4-yl)methyl)benzamide;
4-((*R)—(((*S)-2-Methyl-4-oxochroman-7-yl)oxy)(pyri-
   din-4-yl)methyl)benzamide;
4-((*S)—(((*S)-2-Methyl-4-oxochroman-7-yl)oxy)(pyri-
   din-4-yl)methyl)benzamide;
4-((*R)—(((*R)-2-ethyl-4-oxochroman-7-yl)oxy)(pyridin-
   4-yl)methyl)benzamide;
4-((*R)—(((*S)-2-ethyl-4-oxochroman-7-yl)oxy)(pyridin-
   4-yl)methyl)benzamide;
4-((*S)—(((*R)-2-ethyl-4-oxochroman-7-yl)oxy)(pyridin-
   4-yl)methyl)benzamide;
4-((*S)—(((*S)-2-ethyl-4-oxochroman-7-yl)oxy)(pyridin-
   4-yl)methyl)benzamide;
4-((*S)—(((*R)-4-oxo-2-phenylchroman-7-yl)oxy)(pyri-
   din-4-yl)methyl)benzamide;
4-((*S)—(((*S)-4-oxo-2-phenyl chroman-7-yl)oxy)(pyri-
   din-4-yl methyl)benzamide;
4-((*R)—(((*R)-4-oxo-2-phenylchroman-7-yl)oxy)(pyri-
   din-4-yl)methyl)benzamide;
4-((*R)—(((*S)-4-oxo-2-phenylchroman-7-yl)oxy)(pyri-
   din-4-yl)methyl)benzamide;
4-((*S)—(((*R)-3-Methyl-4-oxochroman-7-yl)oxy)(pyri-
   din-4-yl methyl)benzamide;
4-((*R)—(((*R)-3-Methyl-4-oxochroman-7-yl)oxy)(pyri-
   din-4-yl)methyl)benzamide;
4-((*R)—(((S)-3-Methyl-4-oxochroman-7-yl)oxy)(pyridin-
   4-ylmethyl)benzamide;
4-((*S)—(((*S)-3-Methyl-4-oxochroman-7-yl)oxy)(pyri-
   din-4-yl)methyl)benzamide;
4-((*S)—(((*R)-3-ethyl-4-oxochroman-7-yl)oxy)(pyridin-
   4-yl)methyl)benzamide;
4-((*S)—(((*S)-3-ethyl-4-oxochroman-7-yl)oxy)(pyridin-
   4-yl)methyl)benzamide;
4-((*R)—(((*R)-3-ethyl-4-oxochroman-7-yl)oxy)(pyridin-
   4-yl)methyl)benzamide;
4-((*R)—(((*S)-3-ethyl-4-oxochroman-7-yl)oxy)(pyridin-
   4-yl)methyl)benzamide;
4-((1*R)-((4-Oxo-3-phenylchroman-7-yl)oxy)(pyridin-4-
   yl)methyl)benzamide;
(*R)-4-(((8-methyl-4-oxochroman-7-yl)oxy)(pyridin-4-yl)
   methyl)benzamide;
(*S)-4-(((8-methyl-4-oxochroman-7-yl)oxy)(pyridin-4-yl)
   methyl)benzamide;
(*R)-4-(((6-Methyl-4-oxochroman-7-yl)oxy)(pyridin-4-yl)
   methyl)benzamide;
(*S)-4-(((6-Methyl-4-oxochroman-7-yl)oxy)(pyridin-4-yl)
   methyl)benzamide;
(*R)-4-(((8-Fluoro-4-oxochroman-7-yl)oxy)(pyridin-4-yl)
   methyl)benzamide;
(*S)-4-(((8-Fluoro-4-oxochroman-7-yl)oxy)(pyridin-4-yl)
   methyl)benzamide;
(*R)-4-(((5-Fluoro-4-oxochroman-7-yl)oxy)(pyridin-4-yl)
   methyl)benzamide;
(*S)-4-(((5-Fluoro-4-oxochroman-7-yl)oxy)(pyridin-4-yl)
   methyl)benzamide;
(*R)-4-(((6-Fluoro-4-oxochroman-7-yl)oxy)(pyridin-4-yl)
   methyl)benzamide;
(*S)-4-(((6-Fluoro-4-oxochroman-7-yl)oxy)(pyridin-4-yl)
   methyl)benzamide;
(*R)-4-(((4-oxo-8-phenylchroman-7-yl)oxy)(pyridin-4-yl)
   methyl)benzamide;
(*S)-4-(((4-oxo-8-phenylchroman-7-yl)oxy)(pyridin-4-ylm-
   ethyl)benzamide;
(*R)-4-(((4-oxo-6-phenylchroman-7-yl)oxy)(pyridin-4-yl)
   methyl)benzamide;
(*S)-4-(((4-oxo-6-phenylchroman-7-yl)oxy)(pyridin-4-ylm-
   ethyl)benzamide;
4-((1*R)-((3-(Hydroxymethyl)-4-oxochroman-7-yl)oxy)
   (pyridin-4-yl)methyl)benzamide;
(*R)-4-(((3,3-dimethyl-4-oxochroman-7-yl)oxy)(pyridin-4-
   yl)methyl)benzamide;
(*S)-4-(((3,3-dimethyl-4-oxochroman-7-yl)oxy)(pyridin-4-
   yl)methyl)benzamide;
(*R)-4-((4-chlorophenyl)((8-methyl-4-oxochroman-7-yl)
   oxy)methyl)benzamide;
(*S)-4-((4-chlorophenyl)((8-methyl-4-oxochroman-7-yl)
   oxy)methyl)benzamide;
(*R)-4-(((6-fluoro-8-methyl-4-oxochroman-7-yl)oxy)(pyri-
   din-4-yl)methyl)benzamide;
(*S)-4-(((6-fluoro-8-methyl-4-oxochroman-7-yl)oxy)(pyri-
   din-4-yl)methyl)benzamide;
(*R)-4-((4-cyanophenyl)((8-methyl-4-oxochroman-7-yl)
   oxy)methyl)benzamide;
(*S)-4-((4-cyanophenyl)((8-methyl-4-oxochroman-7-yl)
   oxy)methyl)benzamide;
(*R)-4-((3-cyanophenyl)((8-methyl-4-oxochroman-7-yl)
   oxy)methyl)benzamide;
(*S)-4-((3-cyanophenyl)((8-methyl-4-oxochroman-7-yl)
   oxy)methyl)benzamide;
(*R)-4-((2-cyanophenyl)((8-methyl-4-oxochroman-7-yl)
   oxy)methyl)benzamide;
(*S)-4-((2-cyanophenyl)((8-methyl-4-oxochroman-7-yl)
   oxy)methyl)benzamide;
(*R)-4-((5-chloropyridin-2-yl)((8-methyl-4-oxochroman-7-
   yl)oxy)methyl)benzamide;
(*S)-4-((5-chloropyridin-2-yl)((8-methyl-4-oxochroman-7-
   yl)oxy)methyl)benzamide;
(*R)-6-((4-chlorophenyl)((8-methyl-4-oxochroman-7-yl)
   oxy)methyl)nicotinamide;
(*S)-6-((4-chlorophenyl)((8-methyl-4-oxochroman-7-yl)
   oxy)methyl)nicotinamide;
(*R)-5-((4-chlorophenyl)((8-methyl-4-oxochroman-7-yl)
   oxy)methyl)picolinamide;

(*S)-5-((4-chlorophenyl)((8-methyl-4-oxochroman-7-yl)oxy)methyl)picolinamide;
(*R)-2-((4-carbamoylphenyl)((8-methyl-4-oxochroman-7-yl)oxy)methyl)pyridine 1-oxide;
(*S)-2-((4-carbamoylphenyl)((8-methyl-4-oxochroman-7-yl)oxy)methyl)pyridine 1-oxide;
(*R)-4-((4-Fluorophenyl)((8-methyl-4-oxochroman-7-yl)oxy)methyl)benzamide;
(*S)-4-((4-Fluorophenyl)((8-methyl-4-oxochroman-7-yl)oxy)methyl)benzamide;
(*R)-4-((3-Fluorophenyl)((8-methyl-4-oxochroman-7-yl)oxy)methyl)benzamide;
(*S)-4-((3-Fluorophenyl)((8-methyl-4-oxochroman-7-yl)oxy)methyl)benzamide;
(*R)-4-((2-Fluorophenyl)((8-methyl-4-oxochroman-7-yl)oxy)methyl)benzamide;
(*S)-4-((2-Fluorophenyl)((8-methyl-4-oxochroman-7-yl)oxy)methyl)benzamide;
(*R)-4-(((8-Methyl-4-oxochroman-7-yl)oxy)(phenyl)methyl)benzamide;
(*S)-4-(((8-Methyl-4-oxochroman-7-yl)oxy)(phenyl)methyl)benzamide;
(*R)-4-(((8-methyl-4-oxochroman-7-yl)oxy)(phenyl)methyl)benzoic acid;
(*S)-4-(((8-methyl-4-oxochroman-7-yl)oxy)(phenyl)methyl)benzoic acid;
(*R)-4-((4-carbamoylphenyl)((8-methyl-4-oxochroman-7-yl)oxy)methyl)benzoic acid;
(*S)-4-((4-carbamoylphenyl)((8-methyl-4-oxochroman-7-yl)oxy)methyl)benzoic acid;
(*R)—N,N-dimethyl-4-(((4-oxochroman-7-yl)oxy)(pyridin-4-yl)methyl)benzamide;
(*S)—N,N-dimethyl-4-(((4-oxochroman-7-yl)oxy)(pyridin-4-yl)methyl)benzamide;
(*R)-4-(((8-ethyl-4-oxochroman-7-yl)oxy)(pyridin-4-yl)methyl)benzamide;
(*S)-4-(((8-ethyl-4-oxochroman-7-yl)oxy)(pyridin-4-yl)methyl)benzamide;
(*R)-4-(((6-ethyl-4-oxochroman-7-yl)oxy)(pyridin-4-yl)methyl)benzamide;
(*S)-4-(((6-ethyl-4-oxochroman-7-yl)oxy)(pyridin-4-yl)methyl)benzamide;
(*R)-4-(((8-isopropyl-4-oxochroman-7-yl)oxy)(pyridin-4-yl)methyl)benzamide;
(*S)-4-(((8-isopropyl-4-oxochroman-7-yl)oxy)(pyridin-4-yl)methyl)benzamide;
(*R)-4-(((6-isopropyl-4-oxochroman-7-yl)oxy)(pyridin-4-yl)methyl)benzamide;
(*S)-4-(((6-isopropyl-4-oxochroman-7-yl)oxy)(pyridin-4-yl)methyl)benzamide;
(*R)-4-(((5-methoxy-4-oxochroman-7-yl)oxy)(pyridin-4-yl)methyl)benzamide;
(*S)-4-(((5-methoxy-4-oxochroman-7-yl)oxy)(pyridin-4-yl)methyl)benzamide;
(*R)-4-(((8-cyano-4-oxochroman-7-yl)oxy)(pyridin-4-yl)methyl)benzamide;
(*S)-4-(((8-cyano-4-oxochroman-7-yl)oxy)(pyridin-4-yl)methyl)benzamide;
(*R)-4-(((8-([1,1'-biphenyl]-4-yl)-4-oxochroman-7-yl)oxy)(pyridin-4-yl)methyl)benzamide;
(*S)-4-(((8-([1,1'-biphenyl]-4-yl)-4-oxochroman-7-yl)oxy)(pyridin-4-yl)methyl)benzamide;
(*R)-4-(((4-Oxo-8-propylchroman-7-yl)oxy)(pyridin-4-yl)methyl)benzamide;
(*S)-4-(((4-Oxo-8-propylchroman-7-yl)oxy)(pyridin-4-yl)methyl)benzamide;
(*R)-1-(3-(((8-methyl-4-oxochroman-7-yl)oxy)(pyridin-4-yl)methyl)benzyl)urea;
(*S)-1-(3-(((8-methyl-4-oxochroman-7-yl)oxy)(pyridin-4-yl)methyl)benzyl)urea;
(*R)-3-Methoxy-4-(((8-methyl-4-oxochroman-7-yl)oxy)(pyridin-4-yl)methyl)benzamide;
(*S)-3-Methoxy-4-(((8-methyl-4-oxochroman-7-yl)oxy)(pyridin-4-yl)methyl)benzamide;
(*R)-3-ethoxy-4-(((8-methyl-4-oxochroman-7-yl)oxy)(pyridin-4-yl)methyl)benzamide;
(*S)-3-ethoxy-4-(((8-methyl-4-oxochroman-7-yl)oxy)(pyridin-4-yl)methyl)benzamide;
(*R)-3-isopropoxy-4-(((8-methyl-4-oxochroman-7-yl)oxy)(pyridin-4-yl)methyl)benzamide;
(*S)-3-isopropoxy-4-(((8-methyl-4-oxochroman-7-yl)oxy)(pyridin-4-yl)methyl)benzamide;
(*R)-3-isobutoxy-4-(((8-methyl-4-oxochroman-7-yl)oxy)(pyridin-4-yl)methyl)benzamide;
(*S)-3-isobutoxy-4-(((8-methyl-4-oxochroman-7-yl)oxy)(pyridin-4-yl)methyl)benzamide;
(*R)-3-(benzyloxy)-4-(((8-methyl-4-oxochroman-7-yl)oxy)(pyridin-4-yl)methyl)benzamide;
(*S)-3-(benzyloxy)-4-(((8-methyl-4-oxochroman-7-yl)oxy)(pyridin-4-yl)methyl)benzamide;
(*R)-Ethyl 3-(4-((4-carbamoylphenyl)((8-methyl-4-oxochroman-7-yl)oxy)methyl)pyridin-2-yl)propanoate;
(*S)-Ethyl 3-(4-((4-carbamoylphenyl)((8-methyl-4-oxochroman-7-yl)oxy)methyl)pyridin-2-yl)propanoate;
(*R)-4-(((6,8-dimethyl-4-oxochroman-7-yl)oxy)(pyridin-4-yl)methyl)benzonitrile;
(*S)-4-(((6,8-dimethyl-4-oxochroman-7-yl)oxy)(pyridin-4-yl)methyl)benzonitrile;
(*R)-4-(((6,8-dimethyl-4-oxochroman-7-yl)oxy)(pyridin-4-yl)methyl)benzamide;
(*S)-4-(((6,8-dimethyl-4-oxochroman-7-yl)oxy)(pyridin-4-yl)methyl)benzamide;
(*R)-4-(((6,8-dimethyl-4-oxochroman-7-yl)oxy)(4-fluorophenyl)methyl)benzamide;
(*S)-4-(((6,8-dimethyl-4-oxochroman-7-yl)oxy)(4-fluorophenyl)methyl)benzamide;
(*R)-4-((3,4-difluorophenyl)((6-fluoro-8-methyl-4-oxochroman-7-yl)oxy)methyl)benzamide;
(*S)-4-((3,4-difluorophenyl)((6-fluoro-8-methyl-4-oxochroman-7-yl)oxy)methyl)benzamide;
(*R)-4-((3-cyanophenyl)((6-fluoro-8-methyl-4-oxochroman-7-yl)oxy)methyl)benzamide;
(*S)-4-((3-cyanophenyl)((6-fluoro-8-methyl-4-oxochroman-7-yl)oxy)methyl)benzamide;
(*R)-4-(((6-fluoro-8-methyl-4-oxochroman-7-yl)oxy)(4-(methylsulfonyl)phenyl)methyl)benzamide;
(*S)-4-(((6-fluoro-8-methyl-4-oxochroman-7-yl)oxy)(4-(methylsulfonyl)phenyl)methyl)benzamide;
(*R)-4-((2,6-dimethylpyridin-4-yl)((6-fluoro-8-methyl-4-oxochroman-7-yl)oxy)methyl)benzamide;
(*S)-4-((2,6-dimethylpyridin-4-yl)((6-fluoro-8-methyl-4-oxochroman-7-yl)oxy)methyl)benzamide;
(*R)-2-fluoro-4-(((6-fluoro-8-methyl-4-oxochroman-7-yl)oxy)(pyridin-4-yl)methyl)benzamide;
(*S)-2-fluoro-4-(((6-fluoro-8-methyl-4-oxochroman-7-yl)oxy)(pyridin-4-yl)methyl)benzamide;
(*R)-6-fluoro-7-((3-fluorophenyl)(pyridin-4-yl)methoxy)-8-methylchroman-4-one;
(*S)-6-fluoro-7-((3-fluorophenyl)(pyridin-4-yl)methoxy)-8-methyl chroman-4-one;
(*R)-6-fluoro-7-((3-fluoro-4-methoxyphenyl)(pyridin-4-yl)methoxy)-8-methylchroman-4-one;

(*S)-6-fluoro-7-((3-fluoro-4-methoxyphenyl)(pyridin-4-yl)methoxy)-8-methylchroman-4-one;
(*R)-4-(((4-oxochroman-7-yl)oxy)(pyridin-4-yl)methyl)-1-naphthamide;
(*S)-4-(((4-oxochroman-7-yl)oxy)(pyridin-4-yl)methyl)-1-naphthamide;
(*R)-4-(((5-ethyl-4-oxochroman-7-yl)oxy)(pyridin-4-yl)methyl)benzamide;
(*S)-4-(((5-ethyl-4-oxochroman-7-yl)oxy)(pyridin-4-yl)methyl)benzamide;
(*R)-4-(((8-methoxy-4-oxochroman-7-yl)oxy)(pyridin-4-yl)methyl)benzamide;
(*S)-4-(((8-methoxy-4-oxochroman-7-yl)oxy)(pyridin-4-yl)methyl)benzamide;
(*R)-4-(((5-cyano-4-oxochroman-7-yl)oxy)(pyridin-4-yl)methyl)benzamide;
(*S)-4-(((5-cyano-4-oxochroman-7-yl)oxy)(pyridin-4-yl)methyl)benzamide;
(*R)-4-(((8-bromo-4-oxochroman-7-yl)oxy)(pyridin-4-yl)methyl)benzamide;
(*S)-4-(((8-bromo-4-oxochroman-7-yl)oxy)(pyridin-4-yl)methyl)benzamide;
(*R)-6-fluoro-7-((4-methoxyphenyl)(pyridin-4-yl)methoxy)-8-methyl chroman-4-one;
(*S)-6-fluoro-7-((4-methoxyphenyl)(pyridin-4-yl)methoxy)-8-methyl chroman-4-one;
(*R)-6-fluoro-8-methyl-7-((4-(methylsulfonyl)phenyl)(pyridin-4-yl)methoxy)chroman-4-one;
(*S)-6-fluoro-8-methyl-7-((4-(methylsulfonyl)phenyl)(pyridin-4-yl)methoxy)chroman-4-one;
(*R)-6-fluoro-8-methyl-7-((3-(methylsulfonyl)phenyl)(pyridin-4-yl)methoxy)chroman-4-one;
(*S)-6-fluoro-8-methyl-7-((3-(methylsulfonyl)phenyl)(pyridin-4-yl)methoxy)chroman-4-one;
(*R)-4-((2,6-dimethyl pyridin-4-yl)((8-isopropyl-4-oxochroman-7-yl)oxy)methyl)benzamide;
(*S)-4-((2,6-dimethylpyridin-4-yl)((8-isopropyl-4-oxochroman-7-yl)oxy)methyl)benzamide;
(*R)-4-((3-cyanophenyl)((8-isopropyl-4-oxochroman-7-yl)oxy)methyl)benzamide;
(*S)-4-((3-cyanophenyl)((8-isopropyl-4-oxochroman-7-yl)oxy)methyl)benzamide;
(*R)-4-((4-carbamoylphenyl)((8-isopropyl-4-oxochroman-7-yl)oxy)methyl)benzoic acid;
(*S)-4-((4-carbamoylphenyl)((8-isopropyl-4-oxochroman-7-yl)oxy)methyl)benzoic acid;
(*R)-4-((2,6-dimethylpyridin-4-yl)((6-fluoro-4-oxochroman-7-yl)oxy)methyl)benzamide;
(*S)-4-((2,6-dimethylpyridin-4-yl)((6-fluoro-4-oxochroman-7-yl)oxy)methyl)benzamide;
(*R)-4-(((8-cyano-4-oxochroman-7-yl)oxy)(2,6-dimethylpyridin-4-yl)methyl)benzamide;
(*S)-4-(((8-cyano-4-oxochroman-7-yl)oxy)(2,6-dimethylpyridin-4-yl)methyl)benzamide;
(*R)-4-((2,6-dimethylpyridin-4-yl)((8-methyl-4-oxochroman-7-yl)oxy)methyl)benzamide;
(*S)-4-((2,6-dimethylpyridin-4-yl)((8-methyl-4-oxochroman-7-yl)oxy)methyl)benzamide;
(*R)-4-((2,6-dimethylpyridin-4-yl)((2,2,8-trimethyl-4-oxochroman-7-yl)oxy)methyl)benzamide;
(*S)-4-((2,6-dimethylpyridin-4-yl)((2,2,8-trimethyl-4-oxochroman-7-yl)oxy)methyl)benzamide;
(R,S)-4-(pyridin-4-yl((2,2,8-trimethyl-4-oxochroman-7-yl)oxy)methyl)benzamide;
(*R)-7-(phenyl(pyridin-4-yl)methoxy)chroman-4-one;
(*S)-7-(phenyl(pyridin-4-yl)methoxy)chroman-4-one;
(R,S)-7-(Phenyl(pyridin-3-yl)methoxy)chroman-4-one and and pharmaceutically acceptable salts thereof Additional embodiments of this invention are compounds of Formula (II), and pharmaceutically acceptable salts thereof

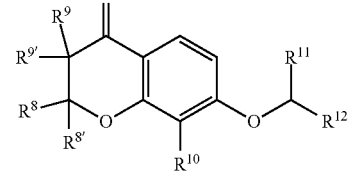

(II)

$R^8$ is H or $C_1$-$C_3$alkyl;
$R^{8'}$ is H;
$R^9$ is H or $C_1$-$C_3$alkyl;
$R^{9'}$ is H;
$R^{10}$ is H or $C_1$-$C_5$alkyl;
$R^{11}$ is H;
$R^{12}$ is

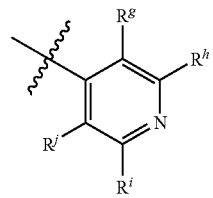

$R^g$ is H or $OCH_3$;
$R^h$ is H or $CH_3$;
$R^i$ is H or $CH_3$; and
$R^j$ is H.

Illustrative embodiments of compounds of Formula (II) and pharmaceutically acceptable salts thereof are
7-((2,6-Dimethylpyridin-4-yl)methoxy)-8-isopropylchroman-4-one;
(*R)-2-ethyl-7-((2-methylpyridin-4-yl)methoxy)chroman-4-one;
(*S)-2-ethyl-7-((2-methylpyridin-4-yl)methoxy)chroman-4-one;
(*R)-2-ethyl-7-((3-methoxypyridin-4-yl)methoxy)chroman-4-one;
(*S)-2-ethyl-7-((3-methoxypyridin-4-yl)methoxy)chroman-4-one;
(R,S)-3-ethyl-7-(pyridin-4-ylmethoxy)chroman-4-one and and pharmaceutically acceptable salts thereof.

Additional embodiment of this invention are compounds of Formula (III), and pharmaceutically acceptable salts thereof

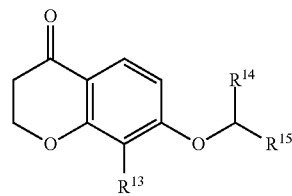

(III)

wherein

R$^{13}$ is CH$_3$;

R$^{14}$ and R$^{15}$ are taken together with the carbon to which they are attached to form

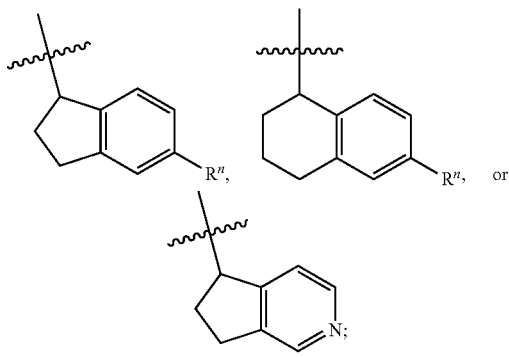

and

R" is selected from the group consisting of H or C(O)NH$_2$.

Illustrative embodiments of compounds of Formula (III) and pharmaceutically acceptable salts thereof are (*R)-1-((8-methyl-4-oxochroman-7-yl)oxy)-2,3-dihydro-1H-indene-5-carboxamide;

(*S)-1-((8-methyl-4-oxochroman-7-yl)oxy)-2,3-dihydro-1H-indene-5-carboxamide;

(R,S)-5-((8-Methyl-4-oxochroman-7-yl)oxy)-5,6,7,8-tetrahydronaphthalene-2-carbonitrile;

(*R)-5-((8-methyl-4-oxochroman-7-yl)oxy)-5,6,7,8-tetrahydronaphthalene-2-carbonitrile;

(*S)-5-((8-methyl-4-oxochroman-7-yl)oxy)-5,6,7,8-tetrahydronaphthalene-2-carbonitrile;

(R,S)-5-((8-Methyl-4-oxochroman-7-yl)oxy)-5,6,7,8-tetrahydronaphthalene-2-carboxamide;

(*R)-5-((8-methyl-4-oxochroman-7-yl)oxy)-5,6,7,8-tetrahydronaphthalene-2-carboxamide;

(*S)-5-((8-methyl-4-oxochroman-7-yl)oxy)-5,6,7,8-tetrahydronaphthalene-2-carboxamide;

(*R)-7-((6,7-dihydro-5H-cyclopenta[c]pyridin-5-yl)oxy)-8-methylchroman-4-one;

(*S)-7-((6,7-dihydro-5H-cyclopenta[c]pyridin-5-yl)oxy)-8-methylchroman-4-one and pharmaceutically acceptable salts thereof.

DETAILED DESCRIPTION OF THE INVENTION

As used herein, the terms "including", "containing" and "comprising" are used in their open, non-limiting sense.

Unless qualified specifically in particular instances of use, the term "alkyl" refers to a straight- or branched-chain alkyl group having from 1 to 8 carbon atoms in the chain. Examples of alkyl groups include methyl (Me), ethyl (Et), n-propyl, isopropyl, butyl, isobutyl, sec-butyl, tert-butyl (tBu), pentyl, isopentyl, tert-pentyl, hexyl, isohexyl, and groups that in light of the ordinary skill in the art and the teachings provided herein would be considered equivalent to any one of the foregoing examples. "C$_{1-4}$alkyl" refers to straight- or branched-chain alkyl group having from 1 to 4 carbon atoms in the chain.

The term "halogen" represents chlorine, fluorine, bromine, or iodine. The term "halo" represents chloro, fluoro, bromo, or iodo.

The term "substituted" means that the specified group or moiety bears one or more substituents. The term "unsubstituted" means that the specified group bears no substituents. The term "optionally substituted" means that the specified group is unsubstituted or substituted by one or more substituents. Where the term "substituted" is used to describe a structural system, the substitution is meant to occur at any valency-allowed position on the system.

Any formula given herein is intended to represent compounds having structures depicted by the structural formula as well as certain variations or forms. In particular, compounds of any formula given herein may have asymmetric centers and therefore exist in different enantiomeric forms. All optical isomers and stereoisomers of the compounds of the general formula, and mixtures thereof, are considered within the scope of the formula. Thus, any formula given herein is intended to represent any of a racemate, one or more enantiomeric forms, one or more diastereomeric forms, and mixtures thereof. Where a structure presents geometric isomers, it is envisaged to represent any of the cis isomers and trams isomers.

Where a structure presents tautomers, it is envisaged to represent any of the tautomeric forms. "Tautomers" refer to compounds that differ in the position of certain H member and electrons interchangeable forms of a particular compound structure, and that vary in the displacement of hydrogen atoms and electrons. For example, a compound can present itself in enol and keto tautomer forms.

Reference to a compound herein stands for a reference to any one of: (a) the actually recited form of such compound, and (b) any of the forms of such compound in the medium in which the compound is being considered when named. For example, reference herein to a compound such as R—COOH, encompasses reference to any one of, for example, R—COOH$_{(s)}$, R-COOH$_{(sol)}$, and R COO$^-$$_{(sol)}$. In this example, R—COOH$_{(s)}$ refers to the solid compound, as it could be for example in a tablet or some other solid pharmaceutical composition or preparation; R—COOH$_{(sol)}$ refers to the undissociated form of the compound in a solvent; and R—COO$^-$ (sop refers to the dissociated form of the compound in a solvent, such as the dissociated form of the compound in an aqueous environment, whether such dissociated form derives from R—COOH, from a salt thereof, or from any other entity that yields R—COO$^-$ upon dissociation in the medium being considered. In another example, an expression such as "exposing an entity to compound of formula R—COOH" refers to the exposure of such entity to the form, or forms, of the compound R—COOH that exists, or exist, in the medium in which such exposure takes place. In still another example, an expression such as "reacting an entity with a compound of formula R—COOH" refers to the reacting of (a) such entity in the chemically relevant form, or forms, of such entity that exists, or exist, in the medium in which such reacting takes place, with (b) the chemically relevant form, or forms, of the compound R—COOH that exists, or exist, in the medium in which such reacting takes place. In this regard, if such entity is for example in an aqueous environment, it is understood that the compound R—COOH is in such same medium, and therefore the entity is being exposed to species such as R—COOH$_{(aq)}$ and/or R-COO$^-$$_{(aq)}$, where the subscript "$_{(aq)}$" stands for "aqueous" according to its conventional meaning in chemistry and biochemistry. A carboxylic acid functional group has been chosen in these nomenclature examples; this choice is not intended, however, as a limitation but it is merely an illustration. It is understood that analogous examples can be provided in terms of other functional groups, including but not limited to hydroxyl, basic nitrogen members, such as those in amines, and any other group that interacts or transforms according to known manners in the medium that contains the compound. Such interactions and transformations include, but are not limited to, dissociation, association, tautomerism, solvolysis, including hydrolysis, solvation, including hydration, protonation, and deprotonation. No further examples in this regard are provided herein because these interactions and transformations in a given medium are known by any one of ordinary skill in the art.

Any formula given herein is also intended to represent unlabeled forms as well as isotopically labeled forms of the compounds. Isotopically labeled compounds have structures depicted by the formulas given herein except that one or more atoms are replaced by an atom having a selected atomic mass or mass number in an enriched form. Examples of isotopes that can be incorporated into compounds of the invention in a form that exceeds natural abundances of such isotopes include isotopes of hydrogen, carbon, nitrogen, oxygen, phosphorous, fluorine, chlorine, and iodine, such as $^{2}H$, $^{3}H$, $^{11}C$, $^{13}C$, $^{14}C$, $^{15}N$, $^{18}O$, $^{17}O$, $^{31}P$, $^{32}P$, $^{35}S$, $^{18}F$, $^{36}Cl$, and $^{125}I$, respectively. Such isotopically labelled compounds are useful in metabolic studies (preferably with $^{14}C$), reaction kinetic studies (with, for example $^{2}H$ or $^{3}H$), detection or imaging techniques (such as positron emission tomography (PET) or single-photon emission computed tomography (SPECT)) including drug or substrate tissue distribution assays, or in radioactive treatment of patients. In particular, an $^{18}F$ or $^{11}C$ labeled compound may be particularly preferred for PET or SPECT studies. Further, substitution with heavier isotopes such as deuterium (i.e., $^{2}H$) may afford certain therapeutic advantages resulting from greater metabolic stability, for example increased in vivo half-life or reduced dosage requirements. Isotopically labeled compounds of this invention can generally be prepared by carrying out the procedures disclosed in the schemes or in the examples and preparations described below by substituting a readily available isotopically labeled reagent for a non-isotopically labeled reagent.

When the same plurality of substituents is assigned to various groups, the specific individual substituent assignment to each of such groups is meant to be independently made with respect to the specific individual substituent assignments to the remaining groups. By way of illustration, but not as a limitation, if each of groups Q and R can be H or F, the choice of H or F for Q is made independently of the choice of H or F for R, so the choice of assignment for Q does not determine or condition the choice of assignment for R, or vice-versa, unless it is expressly indicated otherwise. Illustrative claim recitation in this regard would read as "each of Q and R is independently H or F", or "each of Q and R is independently selected from the group consisting of H and F".

When referring to any formula given herein, the selection of a particular moiety from a list of possible species for a specified variable is not intended to define the same choice of the species for the variable appearing elsewhere. In other words, where a variable appears more than once, the choice of the species from a specified list is independent of the choice of the species for the same variable elsewhere in the formula, unless stated otherwise.

By way of a first example on substituent terminology, if substituent $S^1_{example}$ is one of $S_1$ and $S_2$, and substituent $S^2_{example}$ is one of $S_3$ and $S_4$, then these assignments refer to embodiments of this invention given according to the choices $S^1_{example}$ is $S_1$ and $S^2_{example}$ is $S_3$; $S^1_{example}$ is $S_1$ and $S^2_{example}$ is $S_4$; $S^1_{example}$ is $S_2$ and $S^2_{example}$ is $S_3$; $S^1_{example}$ is $S_2$ and $S^2_{example}$ is $S_4$; and equivalents of each one of such choices. The shorter terminology "$S^1_{example}$ is one of $S_1$ and $S_2$, and $S^2_{example}$ is one of $S_3$ and $S_4$," is accordingly used herein for the sake of brevity, but not by way of limitation. The foregoing first example on substituent terminology, which is stated in generic terms, is meant to illustrate the various substituent assignments described herein.

Furthermore, when more than one assignment is given for any member or substituent, embodiments of this invention comprise the various groupings that can be made from the listed assignments, taken independently, and equivalents thereof. By way of a second example on substituent terminology, if it is herein described that substituent $S_{example}$ is one of $S_1$, $S_2$, and $S_3$, this listing refers to embodiments of this invention for which $S_{example}$ is $S_1$; $S_{example}$ is $S_2$; $S_{example}$ is $S_3$; $S_{example}$ is one of $S_1$ and $S_2$; $S_{example}$ is one of $S_1$ and $S_3$; $S_{example}$ is one of $S_2$ and $S_3$; $S_{example}$ is one of $S_1$, $S_2$ and $S_3$; and $S_{example}$ is any equivalent of each one of these choices. The shorter terminology "$S_{example}$ is one of $S_1$, $S_2$, and $S_3$" is accordingly used herein for the sake of brevity, but not by way of limitation. The foregoing second example on substituent terminology, which is stated in generic terms, is meant to illustrate the various substituent assignments described herein.

The nomenclature "$C_{i-j}$" with j>i, when applied herein to a class of substituents, is meant to refer to embodiments of this invention for which each and every one of the number of carbon members, from i to j including i and j, is independently realized. By way of example, the term $C_{1-3}$ refers independently to at any of the embodiments that have one carbon member ($C_1$), embodiments that have two carbon members ($C_2$), and embodiments that have three carbon members ($C_3$). As an example, the term $C_{n-m}$alkyl refers to an aliphatic chain, whether straight or branched, with a total number N of carbon members in the chain that satisfies n≤N≤m, with m>n.

Any disubstituent referred to herein is meant to encompass the various attachment possibilities when more than one of such possibilities are allowed. For example, reference to disubstituent -A-B-, where A≠B, refers herein to such disubstituent with A attached to a first substituted member and B attached to a second substituted member, and it also refers to such disubstituent with A attached to the second substituted member and B attached to the first substituted member.

The compounds of this invention may possess one or more asymmetric centers; such compounds can therefore be produced as individual (R)- or (S)-stereoisomers or as mixtures thereof.

Certain examples contain chemical structures that are depicted as an (*R) or (*S). When (*R) or (*S) is used in the name of a compound or in the chemical representation of the compound, it is intended to mean that the compound is a single isomer at that stereocenter however absolute configuration of that stereocenter has not been established. Thus, a compound designated as (*R) refers to a compound that is a single isomer at that stereocenter with an absolute configuration of either (R) or (S). A compound designated as (*S) refers to a compound that is a single isomer at that stereocenter with an absolute configuration of either (R) or (S). In cases where the absolute stereochemistry has been established, the structures are named using (R) or (S). The use of the term (R, S) in the name of the compound indicates that the compound is a racemate.

Unless indicated otherwise, the description or naming of a particular compound in the specification and claims is intended to include both individual enantiomers and mixtures, racemic or otherwise, thereof. The methods for the determination of stereochemistry and the separation of stereoisomers are well-known in the art.

A "pharmaceutically acceptable salt" is intended to mean a salt of an acid or base of a compound represented by Formula (I), Formula (II) or Formula (III) that is biologically tolerable, or otherwise biologically suitable for administration to the subject. See, generally, S. M. Berge, et al., "Pharmaceutical Salts", J. Pharm. Sci., 1977, 66:1-19, and *Handbook of Pharmaceutical Salts, Properties, Selection, and Use*, Stahl and Wermuth, Eds., Wiley-VCH and VHCA, Zurich, 2002. Preferred pharmaceutically acceptable salts are those that are pharmacologically effective and suitable for contact with the tissues of patients without undue toxicity, irritation, or allergic response.

Compounds of the invention, including their pharmaceutically acceptable salts, whether alone or in combination, (collectively, "active agents") of the present invention are useful as inhibitors of antigen presentation by HLA-DR in the methods of the invention. Such methods for inhibiting antigen presentation by HLA-DR comprise the use of an effective amount of at least one active agent of the invention.

In some embodiments, the inhibitors of antigen presentation by HLA-DR are used in a subject diagnosed with or suffering from a disease, disorder, or medical condition associated with the inhibition of antigen presentation by HLA-DR, such as those described herein. Symptoms or disease states are intended to be included within the scope of "disease, disorders or medical conditions."

Accordingly, the invention relates to methods of using the active agents described herein to treat subjects diagnosed with or suffering from a disease, disorder, or medical condition associated with inhibition of antigen presentation by HLA-DR. The term "treat" or "treating" as used herein is intended to refer to administration of an active agent or composition of the invention to a subject for the purpose of effecting a therapeutic or prophylactic benefit inhibition of antigen presentation by HLA-DR. Treating includes reversing, ameliorating, alleviating, inhibiting the progress of, lessening the severity of, or preventing a disease, disorder, or condition, or one or more symptoms of such disease, disorder or condition associated with the inhibition of antigen presentation by HLA-DR. The term "subject" refers to a mammalian patient in need of such treatment, such as a human. The term "inhibitors" or "inhibitor" refers to compounds that decrease, prevent, inactivate, desensitize or down-regulate inhibition of antigen presentation by HLA-DR.

In treatment methods according to the invention, an effective amount of at least one active agent according to the invention is administered to a subject suffering from or diagnosed as having such a disease, disorder, or medical condition. An "effective amount" means an amount or dose sufficient to generally bring about the desired therapeutic or prophylactic benefit in patients in need of such treatment for the designated disease, disorder, or condition. For a 70-kg human, an illustrative range for a suitable dosage amount is from about 1 to about 1000 mg/day in single or multiple dosage units (e.g., BID, TID, QID).

The active agents of the invention are envisaged for use, alone or in combination with one or more additional active ingredients, to formulate pharmaceutical compositions of the invention. A pharmaceutical composition of the invention comprises an effective amount of at least one active agent in accordance with the invention. In an illustrative embodiment, additional active ingredients are those that are known or discovered to be effective in the treatment of conditions, disorders, or diseases associated with inhibition of antigen presentation by HLA-DR, such as another inhibitor of antigen presentation by HLA-DR or a compound active against another target associated with the particular condition, disorder, or disease. The combination may serve to increase efficacy (e.g., by including in the combination a compound potentiating the potency or effectiveness of an agent according to the invention), decrease one or more side effects, or decrease the required dose of the active agent according to the invention.

When referring to inhibiting the target, an "effective amount" means an amount sufficient to inhibit antigen presentation by HLA-DR.

Pharmaceutically acceptable excipients commonly used in pharmaceutical compositions are substances that are biologically tolerable, and otherwise biologically suitable for administration to a subject, such as an inert substance, added to a pharmacological composition or otherwise used as a vehicle, carrier, or diluent to facilitate administration of an agent and that is compatible therewith. Examples of such excipients include calcium carbonate, calcium phosphate, various sugars and types of starch, cellulose derivatives, gelatin, vegetable oils, and polyethylene glycols.

Delivery forms of the pharmaceutical compositions containing one or more dosage units of the active agents may be prepared using pharmaceutically acceptable excipients and compounding techniques known or that become available to those of ordinary skill in the art. The compositions may be administered in the inventive methods by a suitable route of delivery, e.g., oral, parenteral, rectal, topical, or ocular routes, or by inhalation.

The preparation may be in the form of tablets, capsules, sachets, dragees, powders, granules, lozenges, powders for reconstitution, liquid preparations, or suppositories. The compositions may be formulated for any one of a plurality of administration routes, such as intravenous infusion, topical administration, or oral administration. Preferably, the compositions may be formulated for oral administration.

For oral administration, the active agents of the invention can be provided in the form of tablets or capsules, or as a solution, emulsion, or suspension. To prepare the oral compositions, the active agents may be formulated to yield a dosage of, e.g., for a 70-kg human, an illustrative range for a suitable dosage amount is from about 1 to 1000 mg/day in single or multiple dosage units.

Oral tablets may include the active ingredient(s) mixed with compatible pharmaceutically acceptable excipients such as diluents, disintegrating agents, binding agents, lubricating agents, sweetening agents, flavoring agents, coloring agents and preservative agents. Suitable inert fillers include sodium and calcium carbonate, sodium and calcium phosphate, lactose, starch, sugar, glucose, methyl cellulose, magnesium stearate, mannitol, sorbitol, and the like. Illustrative examples of liquid oral excipients include ethanol, glycerol, water, and the like. Starch, polyvinyl-pyrrolidone (PVP), sodium starch glycolate, microcrystalline cellulose, and alginic acid are examples of disintegrating agents. Binding agents may include starch and gelatin. The lubricating agent, if present, may be magnesium stearate, stearic acid or talc. If desired, the tablets may be coated with a material such as glyceryl monostearate or glyceryl distearate to delay absorption in the gastrointestinal tract, or may be coated with an enteric coating.

Capsules for oral administration include hard and soft gelatin or (hydroxypropyl)methyl cellulose capsules. To prepare hard gelatin capsules, active ingredient(s) may be mixed with a solid, semi-solid, or liquid diluent. Liquids for oral administration may be in the form of suspensions, solutions, emulsions or syrups or may be lyophilized or presented as a dry product for reconstitution with water or other suitable vehicle before use. Such liquid compositions may optionally contain: pharmaceutically-acceptable excipients such as suspending agents (for example, sorbitol, methyl cellulose, sodium alginate, gelatin, hydroxyethylcellulose, carboxymethylcellulose, aluminum stearate gel and the like); non-aqueous vehicles, e.g., oil (for example, almond oil or fractionated coconut oil), propylene glycol, ethyl alcohol, or water; preservatives (for example, methyl or propyl p-hydroxybenzoate or sorbic acid); wetting agents such as lecithin; and, if desired, flavoring or coloring agents.

Active agents of this invention may also be administered by non-oral routes. For example, compositions may be formulated for rectal administration as a suppository, enema or foam. For parenteral use, including intravenous, intramuscular, intraperitoneal, or subcutaneous routes, the agents of the invention may be provided in sterile aqueous solutions or suspensions, buffered to an appropriate pH and isotonicity or in parenterally acceptable oil. Suitable aqueous vehicles include Ringer's solution and isotonic sodium chloride. Such forms may be presented in unit-dose form such as ampules or disposable injection devices, in multi-dose forms such as vials from which the appropriate dose may be withdrawn, or in a solid form or pre-concentrate that can be used to prepare an injectable formulation. Illustrative infusion doses range from about 1 to 1000 g/kg/minute of agent admixed with a pharmaceutical carrier over a period ranging from several minutes to several days.

In a further embodiment, the invention is directed to a method of treating a subject suffering from or diagnosed with a disease, disorder, or medical condition associated with the inhibition of antigen presentation by HLA-DR, comprising administering to the subject in need of such treatment an effective amount of the active agent.

In certain embodiments of the inventive method, the disease, disorder, or medical condition is RA, UC, CD, systemic juvenile idiopathic arthritis, Graves' disease, Hashimoto's thyroiditis, MG, MS, SLE, pemphigus vulgaris, Addison's disease and Type 1 diabetes.

Other embodiments of this invention provide for a method for modulating the inhibition of antigen presentation by HLA-DR, including when the self-antigen/HLA-DR complex interaction is in a subject, comprising exposing the self-antigen/HLA-DR complex to an effective amount of at least one compound selected from compounds of the invention.

Illustrative embodiments of this invention are compounds of Formula (I), and pharmaceutically acceptable salts thereof

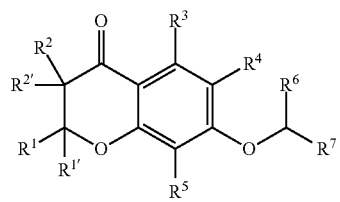
(I)

wherein
$R^1$ is selected from the group consisting of H, —$C_1$-$C_5$alkyl, and phenyl;

$R^{1'}$ is selected from the group consisting of H and —$C_1$-$C_5$alkyl;

$R^2$ is selected from the group consisting of H, —$C_1$-$C_5$alkyl, —$CH_2OH$, and phenyl;

$R^{2'}$ is selected from the group consisting of H and —$C_1$-$C_5$alkyl;

$R^3$ is selected from the group consisting of H, —$C_1$-$C_5$alkyl, halo, —$OCH_3$ and CN;

$R^4$ is selected from the group consisting of H, —$C_1$-$C_5$alkyl, halo, and phenyl;

$R^5$ is selected from the group consisting of H, —$C_1$-$C_5$alkyl, halo, CN, —$OCH_3$, phenyl, and

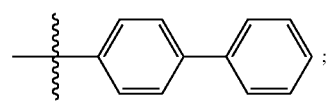 [SMILES: *c1ccc(-c2ccccc2)cc1];

$R^6$ is selected from the group consisting of

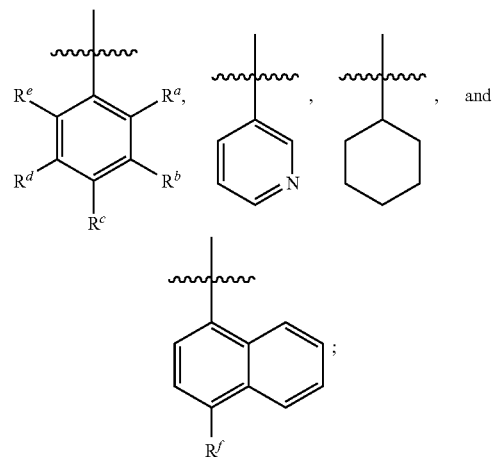

$R^a$ is selected from the group consisting of H, —$OCH_3$, F, CN, —$OC_1$-$C_5$alkyl, —$C(O)NH_2$, and;

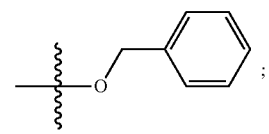 [SMILES: *OCc1ccccc1];

$R^b$ is selected from the group consisting of H, CN, —$CH_3$, —$OCH_3$, —OH, F,

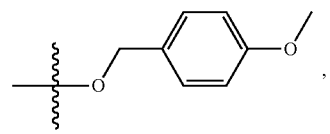 [SMILES: *OCc1ccc(OC)cc1],

—$C(O)NH_2$, —$SO_2CH_3$, and —$CH_2NHC(O)NH_2$;

$R^c$ is selected from the group consisting of H, —$OCH_3$, halo, CN;

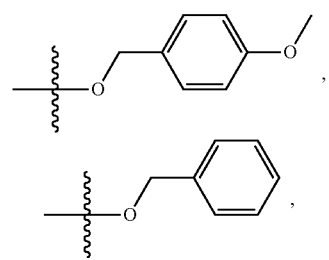

—CO$_2$H, —CO$_2$CH$_3$, —C(O)NH$_2$, —C(O)NHCH$_3$, —C(O)N(CH$_3$)$_2$, —SO$_2$CH$_3$, and —CH$_2$NHC(O)NH$_2$;

R$^d$ is H;
R$^e$ is H;
R$^f$ is selected from the group consisting of H, —C(O)NH$_2$ and CN;
R$^7$ is selected from the group consisting of

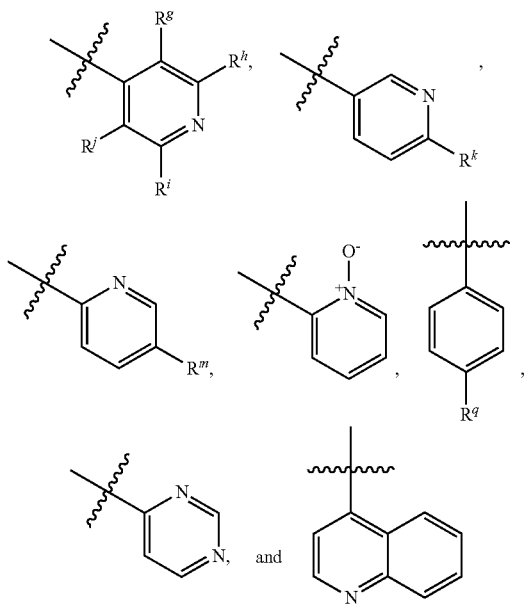

R$^g$ is selected from the group consisting of H, F, —NH$_2$, —OCH$_3$, —CH$_3$, —CF$_3$, —CH$_2$CH$_2$CO$_2$H and phenyl;
R$^h$ is selected from the group consisting of H, —NH$_2$, —OCH$_3$, —CH$_3$, —CF$_3$, —CH$_2$CH$_2$CO$_2$H and phenyl;
R$^i$ is selected from the group consisting of H, and —C$_1$-C$_5$alkyl;
R$^j$ is selected from the group consisting of H and —C$_1$-C$_5$alkyl;
R$^k$ is selected from the group consisting of H and —CO$_2$NH$_2$;
R$^m$ is selected from the group consisting of H, Cl, and —CO$_2$NH$_2$; and
R$^q$ is —CO$_2$H or —CO$_2$NH$_2$.

Additional illustrative embodiments of the invention are compounds of Formula (I), wherein each of R$^1$ and R$^{1'}$ are H.

Additional illustrative embodiments of the invention are compounds of Formula (I), wherein each of R$^2$ and R$^{2'}$ are H.

Additional illustrative embodiments of the invention are compounds of Formula (I), wherein each of R$^1$, R$^{1'}$, R$^2$, R$^{2'}$ are H.

Additional illustrative embodiments of the invention are compounds of Formula (I), wherein each of R$^2$ and R$^{2'}$ are —C$_1$-C$_5$alkyl.

Additional illustrative embodiments of the invention are compounds of Formula (I), wherein each of R$^2$ and R$^{2'}$ are —C$_1$-C$_3$alkyl.

Additional illustrative embodiments of the invention are compounds of Formula (I), wherein each of R$^2$ and R$^{2'}$ are —C$_1$-C$_2$alkyl.

Additional illustrative embodiments of the invention are compounds of Formula (I), wherein each of R$^2$ and R$^{2'}$ are —CH$_3$.

Additional illustrative embodiments of the invention are compounds of Formula (I), wherein R$^3$ is H.

An additional illustrative embodiment of the invention are compounds of Formula (I), wherein R$^4$ is F.

Additional illustrative embodiments of the invention are compounds of Formula (I), wherein R$^5$ is —CH$_3$ or CN.

Additional illustrative embodiments of the invention are compounds of Formula (I), wherein R$^5$ is —CH$_3$.

Additional illustrative embodiments of the invention are compounds of Formula (I), wherein R$^5$ is CN.

Additional illustrative embodiments of the invention are compounds of Formula (I), wherein R$^6$ is

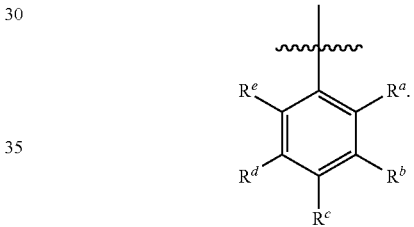

Additional illustrative embodiments of the invention are compounds of Formula (I), wherein R$^6$ is

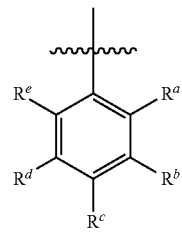

and R$^c$ is —C(O)NH$_2$.

Additional illustrative embodiments of the invention are compounds of Formula (I), wherein R$^7$ is

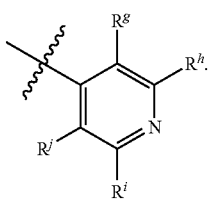

Additional illustrative embodiments of the invention are compounds of Formula (I), wherein $R^7$ is

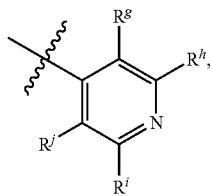

$R^g$ is H or —$CH_3$, and $R^h$ is H or —$CH_3$.

Illustrative embodiments of compounds of Formula (I) and pharmaceutically acceptable salts thereof are (*R)-7-((2-Fluorophenyl)(pyridin-4-yl)methoxy)chroman-4-one;
(*S)-7-((2-Fluorophenyl)(pyridin-4-yl)methoxy)chroman-4-one;
(R,S)-7-((3-Fluorophenyl)(pyridin-4-yl)methoxy)chroman-4-one;
(*R)-7-((3-Fluorophenyl)(pyridin-4-yl)methoxy)chroman-4-one;
(*S)-7-((3-Fluorophenyl)(pyridin-4-yl)methoxy)chroman-4-one;
(R,S)-7-((4-Fluorophenyl)(pyridin-4-yl)methoxy)chroman-4-one;
(*R)-7-((4-Fluorophenyl)(pyridin-4-yl)methoxy)chroman-4-one;
(*S)-7-((4-Fluorophenyl)(pyridin-4-yl)methoxy)chroman-4-one;
(R,S)-7-((3-((4-Methoxybenzyl)oxy)phenyl)(pyridin-4-yl)methoxy)chroman-4-one;
(*R)-7-((3-((4-Methoxybenzyl)oxy)phenyl)(pyridin-4-yl)methoxy)chroman-4-one;
(*S)-7-((3-((4-Methoxybenzyl)oxy)phenyl)(pyridin-4-yl)methoxy)chroman-4-one;
(*S)-7-((3-Hydroxyphenyl)(pyridin-4-yl)methoxy)chroman-4-one;
(R,S)-7-(Pyridin-2-yl(pyridin-4-yl)methoxy)chroman-4-one;
(*R)-2-(((4-Oxochroman-7-yl)oxy)(pyridin-4-yl)methyl)benzonitrile;
(*S)-2-(((4-Oxochroman-7-yl)oxy)(pyridin-4-yl)methyl)benzonitrile;
(*R)-2-(((4-Oxochroman-7-yl)oxy)(pyridin-4-yl)methyl)benzamide;
(*S)-2-(((4-Oxochroman-7-yl)oxy)(pyridin-4-yl)methyl)benzamide;
(*R)-3-(((4-oxochroman-7-yl)oxy)(pyridin-4-yl)methyl)benzamide;
(*S)-3-(((4-oxochroman-7-yl)oxy)(pyridin-4-yl)methyl)benzamide;
(R,S)-4-(((4-Oxochroman-7-yl)oxy)(pyridin-4-yl)methyl)benzonitrile;
(*R)-4-(((4-oxochroman-7-yl)oxy)(pyridin-4-yl)methyl)benzonitrile;
(*S)-4-(((4-oxochroman-7-yl)oxy)(pyridin-4-yl)methyl)benzonitrile;
(R,S)-4-(((4-Oxochroman-7-yl)oxy)(pyridin-4-yl)methyl)benzamide;
(*R)-4-(((4-oxochroman-7-yl)oxy)(pyridin-4-yl)methyl)benzamide;
(*S)-4-(((4-oxochroman-7-yl)oxy)(pyridin-4-yl)methyl)benzamide;
(R,S)-7-((4-Methoxyphenyl)(pyridin-4-yl)methoxy)chroman-4-one;
(*R)-7-((4-Methoxyphenyl)(pyridin-4-yl)methoxy)chroman-4-one;
(*S)-7-((4-Methoxyphenyl)(pyridin-4-yl)methoxy)chroman-4-one;
(*R)-7-((3-methoxyphenyl)(pyridin-4-yl)methoxy)chroman-4-one;
(*S)-7-((3-methoxyphenyl)(pyridin-4-yl)methoxy)chroman-4-one;
(*R)-7-((2-Methoxyphenyl)(pyridin-4-yl)methoxy)chroman-4-one;
(*S)-7-((2-Methoxyphenyl)(pyridin-4-yl)methoxy)chroman-4-one;
(*R)-4-((2-Methylpyridin-4-yl)((4-oxochroman-7-yl)oxy)methyl)benzamide;
(*S)-4-((2-Methylpyridin-4-yl)((4-oxochroman-7-yl)oxy)methyl)benzamide;
(*R)-7-((4-(benzyloxy)phenyl)(pyridin-4-yl)methoxy)chroman-4-one;
(*R)-7-((4-((4-Methoxybenzyl)oxy)phenyl)(pyridin-4-yl)methoxy)chroman-4-one;
(*S)-7-((4-((4-Methoxybenzyl)oxy)phenyl)(pyridin-4-yl)methoxy)chroman-4-one;
(*S)-4-(((4-oxochroman-7-yl)oxy)(2-(trifluoromethyl)pyridin-4-yl)methyl)benzamide;
(*R)-4-(((4-oxochroman-7-yl)oxy)(3-(trifluoromethyl)pyridin-4-yl)methyl)benzamide;
(*S)-4-(((4-oxochroman-7-yl)oxy)(3-(trifluoromethyl)pyridin-4-yl)methyl)benzamide;
(*R)-4-((3-fluoropyridin-4-yl)((4-oxochroman-7-yl)oxy)methyl)benzamide;
(*S)-4-((3-fluoropyridin-4-yl)((4-oxochroman-7-yl)oxy)methyl)benzamide;
(*R)-4-((3-Methylpyridin-4-yl)((4-oxochroman-7-yl)oxy)methyl)benzamide;
(*S)-4-((3-Methylpyridin-4-yl)((4-oxochroman-7-yl)oxy)methyl)benzamide;
(*R)-4-(((4-oxochroman-7-yl)oxy)(quinolin-4-yl)methyl)benzamide;
(*S)-4-(((4-oxochroman-7-yl)oxy)(quinolin-4-yl)methyl)benzamide;
(*R)-4-((3-methoxypyridin-4-yl)((4-oxochroman-7-yl)oxy)methyl)benzamide;
(*S)-4-((3-methoxypyridin-4-yl)((4-oxochroman-7-yl)oxy)methyl)benzamide;
(*R)-4-((2-methoxypyridin-4-yl)((4-oxochroman-7-yl)oxy)methyl)benzamide;
(*S)-4-((2-methoxypyridin-4-yl)((4-oxochroman-7-yl)oxy)methyl)benzamide;
(*R)-4-(((4-oxochroman-7-yl)oxy)(3-phenylpyridin-4-yl)methyl)benzamide;
(*S)-4-(((4-oxochroman-7-yl)oxy)(3-phenylpyridin-4-yl)methyl)benzamide;
(*R)-4-(((4-oxochroman-7-yl)oxy)(2-phenylpyridin-4-yl)methyl)benzamide;
(*S)-4-(((4-oxochroman-7-yl)oxy)(2-phenylpyridin-4-yl)methyl)benzamide;
(*R)-4-((3-aminopyridin-4-yl)((4-oxochroman-7-yl)oxy)methyl)benzamide;
(*R)-4-((2-aminopyridin-4-yl)((4-oxochroman-7-yl)oxy)methyl)benzamide;
(*S)-4-((2-aminopyridin-4-yl)((4-oxochroman-7-yl)oxy)methyl)benzamide;
(*R)-4-(((4-oxochroman-7-yl)oxy)(phenyl)methyl)benzamide;

(*S)-4-(((4-oxochroman-7-yl)oxy)(phenyl)methyl)benzamide;
(*R)-4-((4-Chlorophenyl)((4-oxochroman-7-yl)oxy)methyl)benzamide;
(*S)-4-((4-Chlorophenyl)((4-oxochroman-7-yl)oxy)methyl)benzamide;
(*R)-4-(((4-oxochroman-7-yl)oxy)(pyridin-3-yl)methyl)benzamide;
(*S)-4-(((4-oxochroman-7-yl)oxy)(pyridin-3-yl)methyl)benzamide;
(*R)-4-(((4-oxochroman-7-yl)oxy)(pyridin-2-yl)methyl)benzamide;
(*S)-4-(((4-oxochroman-7-yl)oxy)(pyridin-2-yl)methyl)benzamide;
(*R)-4-(((4-Oxochroman-7-yl)oxy)(pyrimidin-4-yl)methyl)benzamide;
(*S)-4-(((4-Oxochroman-7-yl)oxy)(pyrimidin-4-yl)methyl)benzamide;
(*R)—N-methyl-4-(((4-oxochroman-7-yl)oxy)(pyridin-4-yl)methyl)benzamide;
(*S)—N-methyl-4-(((4-oxochroman-7-yl)oxy)(pyridin-4-yl)methyl)benzamide;
(*R)-2-methyl-4-(((4-oxochroman-7-yl)oxy)(pyridin-4-yl)methyl)benzamide;
(*S)-2-methyl-4-(((4-oxochroman-7-yl)oxy)(pyridin-4-yl)methyl)benzamide;
(*R)-3-methyl-4-(((4-oxochroman-7-yl)oxy)(pyridin-4-yl)methyl)benzamide;
(*S)-3-methyl-4-(((4-oxochroman-7-yl)oxy)(pyridin-4-yl)methyl)benzamide;
(*R)-4-(((4-oxochroman-7-yl)oxy)(pyridin-4-yl)methyl)-1-naphthonitrile;
(*S)-4-(((4-oxochroman-7-yl)oxy)(pyridin-4-yl)methyl)-1-naphthonitrile;
(*R)-7-(cyclohexyl(pyridin-4-yl)methoxy)chroman-4-one;
(*S)-7-(cyclohexyl(pyridin-4-yl)methoxy)chroman-4-one;
4-((*S)—(((*R)-2-Methyl-4-oxochroman-7-yl)oxy)(pyridin-4-yl)methyl)benzamide;
4-((*R)—(((*R)-2-Methyl-4-oxochroman-7-yl)oxy)(pyridin-4-yl)methyl)benzamide;
4-((*R)—(((*S)-2-Methyl-4-oxochroman-7-yl)oxy)(pyridin-4-yl)methyl)benzamide;
4-((*S)—(((*S)-2-Methyl-4-oxochroman-7-yl)oxy)(pyridin-4-yl)methyl)benzamide;
4-((*R)—(((*R)-2-ethyl-4-oxochroman-7-yl)oxy)(pyridin-4-yl)methyl)benzamide;
4-((*R)—(((*S)-2-ethyl-4-oxochroman-7-yl)oxy)(pyridin-4-yl)methyl)benzamide;
4-((*S)—(((*R)-2-ethyl-4-oxochroman-7-yl)oxy)(pyridin-4-yl)methyl)benzamide;
4-((*S)—(((*S)-2-ethyl-4-oxochroman-7-yl)oxy)(pyridin-4-yl)methyl)benzamide;
4-((*S)—(((*R)-4-oxo-2-phenylchroman-7-yl)oxy)(pyridin-4-yl)methyl)benzamide;
4-((*S)—(((*S)-4-oxo-2-phenylchroman-7-yl)oxy)(pyridin-4-yl)methyl)benzamide;
4-((*R)—(((*R)-4-oxo-2-phenylchroman-7-yl)oxy)(pyridin-4-yl)methyl)benzamide;
4-((*R)—(((*S)-4-oxo-2-phenylchroman-7-yl)oxy)(pyridin-4-yl)methyl)benzamide;
4-((*S)—(((*R)-3-Methyl-4-oxochroman-7-yl)oxy)(pyridin-4-yl)methyl)benzamide;
4-((*R)—(((*R)-3-Methyl-4-oxochroman-7-yl)oxy)(pyridin-4-yl)methyl)benzamide;
4-((*R)—(((*S)-3-Methyl-4-oxochroman-7-yl)oxy)(pyridin-4-yl)methyl)benzamide;
4-((*S)—(((*S)-3-Methyl-4-oxochroman-7-yl)oxy)(pyridin-4-yl)methyl)benzamide;
4-((*S)—(((*R)-3-ethyl-4-oxochroman-7-yl)oxy)(pyridin-4-yl)methyl)benzamide;
4-((*S)—(((*S)-3-ethyl-4-oxochroman-7-yl)oxy)(pyridin-4-yl)methyl)benzamide;
4-((*R)—(((*R)-3-ethyl-4-oxochroman-7-yl)oxy)(pyridin-4-yl)methyl)benzamide;
4-((*R)—(((*S)-3-ethyl-4-oxochroman-7-yl)oxy)(pyridin-4-yl)methyl)benzamide;
4-((1*R)-((4-Oxo-3-phenylchroman-7-yl)oxy)(pyridin-4-yl)methyl)benzamide;
(*R)-4-(((8-methyl-4-oxochroman-7-yl)oxy)(pyridin-4-yl)methyl)benzamide;
(*S)-4-(((8-methyl-4-oxochroman-7-yl)oxy)(pyridin-4-yl)methyl)benzamide;
(*R)-4-(((6-Methyl-4-oxochroman-7-yl)oxy)(pyridin-4-yl)methyl)benzamide;
(*S)-4-(((6-Methyl-4-oxochroman-7-yl)oxy)(pyridin-4-yl)methyl)benzamide;
(*R)-4-(((8-Fluoro-4-oxochroman-7-yl)oxy)(pyridin-4-yl)methyl)benzamide;
(*S)-4-(((8-Fluoro-4-oxochroman-7-yl)oxy)(pyridin-4-yl)methyl)benzamide;
(*R)-4-(((5-Fluoro-4-oxochroman-7-yl)oxy)(pyridin-4-yl)methyl)benzamide;
(*S)-4-(((5-Fluoro-4-oxochroman-7-yl)oxy)(pyridin-4-yl)methyl)benzamide;
(*R)-4-(((6-Fluoro-4-oxochroman-7-yl)oxy)(pyridin-4-yl)methyl)benzamide;
(*S)-4-(((6-Fluoro-4-oxochroman-7-yl)oxy)(pyridin-4-yl)methyl)benzamide;
(*R)-4-(((4-oxo-8-phenylchroman-7-yl)oxy)(pyridin-4-yl)methyl)benzamide;
(*S)-4-(((4-oxo-8-phenylchroman-7-yl)oxy)(pyridin-4-yl)methyl)benzamide;
(*R)-4-(((4-oxo-6-phenylchroman-7-yl)oxy)(pyridin-4-yl)methyl)benzamide;
(*S)-4-(((4-oxo-6-phenylchroman-7-yl)oxy)(pyridin-4-yl)methyl)benzamide;
4-((1*R)-((3-(Hydroxymethyl)-4-oxochroman-7-yl)oxy)(pyridin-4-yl)methyl)benzamide;
(*R)-4-(((3,3-dimethyl-4-oxochroman-7-yl)oxy)(pyridin-4-yl)methyl)benzamide;
(*S)-4-(((3,3-dimethyl-4-oxochroman-7-yl)oxy)(pyridin-4-yl)methyl)benzamide;
(*R)-4-((4-chlorophenyl)((8-methyl-4-oxochroman-7-yl)oxy)methyl)benzamide;
(*S)-4-((4-chlorophenyl)((8-methyl-4-oxochroman-7-yl)oxy)methyl)benzamide;
(*R)-4-(((6-fluoro-8-methyl-4-oxochroman-7-yl)oxy)(pyridin-4-yl)methyl)benzamide;
(*S)-4-(((6-fluoro-8-methyl-4-oxochroman-7-yl)oxy)(pyridin-4-yl)methyl)benzamide;
(*R)-4-((4-cyanophenyl)((8-methyl-4-oxochroman-7-yl)oxy)methyl)benzamide;
(*S)-4-((4-cyanophenyl)((8-methyl-4-oxochroman-7-yl)oxy)methyl)benzamide;
(*R)-4-((3-cyanophenyl)((8-methyl-4-oxochroman-7-yl)oxy)methyl)benzamide;
(*S)-4-((3-cyanophenyl)((8-methyl-4-oxochroman-7-yl)oxy)methyl)benzamide;
(*R)-4-((2-cyanophenyl)((8-methyl-4-oxochroman-7-yl)oxy)methyl)benzamide;
(*S)-4-((2-cyanophenyl)((8-methyl-4-oxochroman-7-yl)oxy)methyl)benzamide;

(*R)-4-((5-chloropyridin-2-yl)((8-methyl-4-oxochroman-7-yl)oxy)methyl)benzamide;
(*S)-4-((5-chloropyridin-2-yl)((8-methyl-4-oxochroman-7-yl)oxy)methyl)benzamide;
(*R)-6-((4-chlorophenyl)((8-methyl-4-oxochroman-7-yl)oxy)methyl)nicotinamide;
(*S)-6-((4-chlorophenyl)((8-methyl-4-oxochroman-7-yl)oxy)methyl)nicotinamide;
(*R)-5-((4-chlorophenyl)((8-methyl-4-oxochroman-7-yl)oxy)methyl)picolinamide;
(*S)-5-((4-chlorophenyl)((8-methyl-4-oxochroman-7-yl)oxy)methyl)picolinamide;
(*R)-2-((4-carbamoylphenyl)((8-methyl-4-oxochroman-7-yl)oxy)methyl)pyridine 1-oxide;
(*S)-2-((4-carbamoylphenyl)((8-methyl-4-oxochroman-7-yl)oxy)methyl)pyridine 1-oxide;
(*R)-4-((4-Fluorophenyl)((8-methyl-4-oxochroman-7-yl)oxy)methyl)benzamide;
(*S)-4-((4-Fluorophenyl)((8-methyl-4-oxochroman-7-yl)oxy)methyl)benzamide;
(*R)-4-((3-Fluorophenyl)((8-methyl-4-oxochroman-7-yl)oxy)methyl)benzamide;
(*S)-4-((3-Fluorophenyl)((8-methyl-4-oxochroman-7-yl)oxy)methyl)benzamide;
(*R)-4-((2-Fluorophenyl)((8-methyl-4-oxochroman-7-yl)oxy)methyl)benzamide;
(*S)-4-((2-Fluorophenyl)((8-methyl-4-oxochroman-7-yl)oxy)methyl)benzamide;
(*R)-4-(((8-Methyl-4-oxochroman-7-yl)oxy)(phenyl)methyl)benzamide;
(*S)-4-(((8-Methyl-4-oxochroman-7-yl)oxy)(phenyl)methyl)benzamide;
(*R)-4-(((8-methyl-4-oxochroman-7-yl)oxy)(phenyl)methyl)benzoic acid;
(*S)-4-(((8-methyl-4-oxochroman-7-yl)oxy)(phenyl)methyl)benzoic acid;
(*R)-4-((4-carbamoylphenyl)((8-methyl-4-oxochroman-7-yl)oxy)methyl)benzoic acid;
(*S)-4-((4-carbamoylphenyl)((8-methyl-4-oxochroman-7-yl)oxy)methyl)benzoic acid;
(*R)—N,N-dimethyl-4-(((4-oxochroman-7-yl)oxy)(pyridin-4-yl)methyl)benzamide;
(*S)—N,N-dimethyl-4-(((4-oxochroman-7-yl)oxy)(pyridin-4-yl)methyl)benzamide;
(*R)-4-(((8-ethyl-4-oxochroman-7-yl)oxy)(pyridin-4-yl)methyl)benzamide;
(*S)-4-(((8-ethyl-4-oxochroman-7-yl)oxy)(pyridin-4-yl)methyl)benzamide;
(*R)-4-(((6-ethyl-4-oxochroman-7-yl)oxy)(pyridin-4-yl)methyl)benzamide;
(*S)-4-(((6-ethyl-4-oxochroman-7-yl)oxy)(pyridin-4-yl)methyl)benzamide;
(*R)-4-(((8-isopropyl-4-oxochroman-7-yl)oxy)(pyridin-4-yl)methyl)benzamide;
(*S)-4-(((8-isopropyl-4-oxochroman-7-yl)oxy)(pyridin-4-yl)methyl)benzamide;
(*R)-4-(((6-isopropyl-4-oxochroman-7-yl)oxy)(pyridin-4-yl)methyl)benzamide;
(*S)-4-(((6-isopropyl-4-oxochroman-7-yl)oxy)(pyridin-4-yl)methyl)benzamide;
(*R)-4-(((5-methoxy-4-oxochroman-7-yl)oxy)(pyridin-4-yl)methyl)benzamide;
(*S)-4-(((5-methoxy-4-oxochroman-7-yl)oxy)(pyridin-4-yl)methyl)benzamide;
(*R)-4-(((8-cyano-4-oxochroman-7-yl)oxy)(pyridin-4-yl)methyl)benzamide;
(*S)-4-(((8-cyano-4-oxochroman-7-yl)oxy)(pyridin-4-yl)methyl)benzamide;
(*R)-4-(((8-([1,1'-biphenyl]-4-yl)-4-oxochroman-7-yl)oxy)(pyridin-4-yl)methyl)benzamide;
(*S)-4-(((8-([1,1'-biphenyl]-4-yl)-4-oxochroman-7-yl)oxy)(pyridin-4-yl)methyl)benzamide;
(*R)-4-(((4-Oxo-8-propylchroman-7-yl)oxy)(pyridin-4-yl)methyl)benzamide;
(*S)-4-(((4-Oxo-8-propylchroman-7-yl)oxy)(pyridin-4-yl)methyl)benzamide;
(*R)-1-(3-(((8-methyl-4-oxochroman-7-yl)oxy)(pyridin-4-yl)methyl)benzyl)urea;
(*S)-1-(3-(((8-methyl-4-oxochroman-7-yl)oxy)(pyridin-4-yl)methyl)benzyl)urea;
(*R)-3-Methoxy-4-(((8-methyl-4-oxochroman-7-yl)oxy)(pyridin-4-yl)methyl)benzamide;
(*S)-3-Methoxy-4-(((8-methyl-4-oxochroman-7-yl)oxy)(pyridin-4-yl)methyl)benzamide;
(*R)-3-ethoxy-4-(((8-methyl-4-oxochroman-7-yl)oxy)(pyridin-4-yl)methyl)benzamide;
(*S)-3-ethoxy-4-(((8-methyl-4-oxochroman-7-yl)oxy)(pyridin-4-yl)methyl)benzamide;
(*R)-3-isopropoxy-4-(((8-methyl-4-oxochroman-7-yl)oxy)(pyridin-4-yl)methyl)benzamide;
(*S)-3-isopropoxy-4-(((8-methyl-4-oxochroman-7-yl)oxy)(pyridin-4-yl)methyl)benzamide;
(*R)-3-isobutoxy-4-(((8-methyl-4-oxochroman-7-yl)oxy)(pyridin-4-yl)methyl)benzamide;
(*S)-3-isobutoxy-4-(((8-methyl-4-oxochroman-7-yl)oxy)(pyridin-4-yl)methyl)benzamide;
(*R)-3-(benzyloxy)-4-(((8-methyl-4-oxochroman-7-yl)oxy)(pyridin-4-yl)methyl)benzamide;
(*S)-3-(benzyloxy)-4-(((8-methyl-4-oxochroman-7-yl)oxy)(pyridin-4-yl)methyl)benzamide;
(*R)-Ethyl 3-(4-((4-carbamoylphenyl)((8-methyl-4-oxochroman-7-yl)oxy)methyl)pyridin-2-yl)propanoate;
(*S)-Ethyl 3-(4-((4-carbamoylphenyl)((8-methyl-4-oxochroman-7-yl)oxy)methyl)pyridin-2-yl)propanoate;
(*R)-4-(((6,8-dimethyl-4-oxochroman-7-yl)oxy)(pyridin-4-yl)methyl)benzonitrile;
(*S)-4-(((6,8-dimethyl-4-oxochroman-7-yl)oxy)(pyridin-4-yl)methyl)benzonitrile;
(*R)-4-(((6,8-dimethyl-4-oxochroman-7-yl)oxy)(pyridin-4-yl)methyl)benzamide;
(*S)-4-(((6,8-dimethyl-4-oxochroman-7-yl)oxy)(pyridin-4-yl)methyl)benzamide;
(*R)-4-(((6,8-dimethyl-4-oxochroman-7-yl)oxy)(4-fluorophenyl)methyl)benzamide;
(*S)-4-(((6,8-dimethyl-4-oxochroman-7-yl)oxy)(4-fluorophenyl)methyl)benzamide;
(*R)-4-((3,4-difluorophenyl)((6-fluoro-8-methyl-4-oxochroman-7-yl)oxy)methyl)benzamide;
(*S)-4-((3,4-difluorophenyl)((6-fluoro-8-methyl-4-oxochroman-7-yl)oxy)methyl)benzamide;
(*R)-4-((3-cyanophenyl)((6-fluoro-8-methyl-4-oxochroman-7-yl)oxy)methyl)benzamide;
(*S)-4-((3-cyanophenyl)((6-fluoro-8-methyl-4-oxochroman-7-yl)oxy)methyl)benzamide;
(*R)-4-(((6-fluoro-8-methyl-4-oxochroman-7-yl)oxy)(4-(methylsulfonyl)phenyl)methyl)benzamide;
(*S)-4-(((6-fluoro-8-methyl-4-oxochroman-7-yl)oxy)(4-(methylsulfonyl)phenyl)methyl)benzamide;
(*R)-4-((2,6-dimethylpyridin-4-yl)((6-fluoro-8-methyl-4-oxochroman-7-yl)oxy)methyl)benzamide;
(*S)-4-((2,6-dimethylpyridin-4-yl)((6-fluoro-8-methyl-4-oxochroman-7-yl)oxy)methyl)benzamide;

(*R)-2-fluoro-4-(((6-fluoro-8-methyl-4-oxochroman-7-yl)oxy)(pyridin-4-yl)methyl)benzamide;
(*S)-2-fluoro-4-(((6-fluoro-8-methyl-4-oxochroman-7-yl)oxy)(pyridin-4-yl)methyl)benzamide;
(*R)-6-fluoro-7-((3-fluorophenyl)(pyridin-4-yl)methoxy)-8-methylchroman-4-one;
(*S)-6-fluoro-7-((3-fluorophenyl)(pyridin-4-yl)methoxy)-8-methylchroman-4-one;
(*R)-6-fluoro-7-((3-fluoro-4-methoxyphenyl)(pyridin-4-yl)methoxy)-8-methylchroman-4-one;
(*S)-6-fluoro-7-((3-fluoro-4-methoxyphenyl)(pyridin-4-yl)methoxy)-8-methylchroman-4-one;
(*R)-4-(((4-oxochroman-7-yl)oxy)(pyridin-4-yl)methyl)-1-naphthamide;
(*S)-4-(((4-oxochroman-7-yl)oxy)(pyridin-4-yl)methyl)-1-naphthamide;
(*R)-4-(((5-ethyl-4-oxochroman-7-yl)oxy)(pyridin-4-yl)methyl)benzamide;
(*S)-4-(((5-ethyl-4-oxochroman-7-yl)oxy)(pyridin-4-yl)methyl)benzamide;
(*R)-4-(((8-methoxy-4-oxochroman-7-yl)oxy)(pyridin-4-yl)methyl)benzamide;
(*S)-4-(((8-methoxy-4-oxochroman-7-yl)oxy)(pyridin-4-yl)methyl)benzamide;
(*R)-4-(((5-cyano-4-oxochroman-7-yl)oxy)(pyridin-4-yl)methyl)benzamide;
(*S)-4-(((5-cyano-4-oxochroman-7-yl)oxy)(pyridin-4-yl)methyl)benzamide;
(*R)-4-(((8-bromo-4-oxochroman-7-yl)oxy)(pyridin-4-yl)methyl)benzamide;
(*S)-4-(((8-bromo-4-oxochroman-7-yl)oxy)(pyridin-4-yl)methyl)benzamide;
(*R)-6-fluoro-7-((4-methoxyphenyl)(pyridin-4-yl)methoxy)-8-methylchroman-4-one;
(*S)-6-fluoro-7-((4-methoxyphenyl)(pyridin-4-yl)methoxy)-8-methylchroman-4-one;
(*R)-6-fluoro-8-methyl-7-((4-(methylsulfonyl)phenyl)(pyridin-4-yl)methoxy)chroman-4-one;
(*S)-6-fluoro-8-methyl-7-((4-(methylsulfonyl)phenyl)(pyridin-4-yl)methoxy)chroman-4-one;
(*R)-6-fluoro-8-methyl-7-((3-(methylsulfonyl)phenyl)(pyridin-4-yl)methoxy)chroman-4-one;
(*S)-6-fluoro-8-methyl-7-((3-(methylsulfonyl)phenyl)(pyridin-4-yl)methoxy)chroman-4-one;
(*R)-4-((2,6-dimethylpyridin-4-yl)((8-isopropyl-4-oxochroman-7-yl)oxy)methyl)benzamide;
(*S)-4-((2,6-dimethylpyridin-4-yl)((8-isopropyl-4-oxochroman-7-yl)oxy)methyl)benzamide;
(*R)-4-((3-cyanophenyl)((8-isopropyl-4-oxochroman-7-yl)oxy)methyl)benzamide;
(*S)-4-((3-cyanophenyl)((8-isopropyl-4-oxochroman-7-yl)oxy)methyl)benzamide;
(*R)-4-((4-carbamoylphenyl)((8-isopropyl-4-oxochroman-7-yl)oxy)methyl)benzoic acid;
(*S)-4-((4-carbamoylphenyl)((8-isopropyl-4-oxochroman-7-yl)oxy)methyl)benzoic acid;
(*R)-4-((2,6-dimethylpyridin-4-yl)((6-fluoro-4-oxochroman-7-yl)oxy)methyl)benzamide;
(*S)-4-((2,6-dimethylpyridin-4-yl)((6-fluoro-4-oxochroman-7-yl)oxy)methyl)benzamide;
(*R)-4-(((8-cyano-4-oxochroman-7-yl)oxy)(2,6-dimethylpyridin-4-yl)methyl)benzamide;
(*S)-4-(((8-cyano-4-oxochroman-7-yl)oxy)(2,6-dimethylpyridin-4-yl)methyl)benzamide;
(*R)-4-((2,6-dimethylpyridin-4-yl)((8-methyl-4-oxochroman-7-yl)oxy)methyl)benzamide;
(*S)-4-((2,6-dimethylpyridin-4-yl)((8-methyl-4-oxochroman-7-yl)oxy)methyl)benzamide;
(*R)-4-((2,6-dimethylpyridin-4-yl)((2,2,8-trimethyl-4-oxochroman-7-yl)oxy)methyl)benzamide;
(*S)-4-((2,6-dimethylpyridin-4-yl)((2,2,8-trimethyl-4-oxochroman-7-yl)oxy)methyl)benzamide;
(R,S)-4-(pyridin-4-yl((2,2,8-trimethyl-4-oxochroman-7-yl)oxy)methyl)benzamide;
(*R)-7-(phenyl(pyridin-4-yl)methoxy)chroman-4-one;
(*S)-7-(phenyl(pyridin-4-yl)methoxy)chroman-4-one;
(R,S)-7-(Phenyl(pyridin-3-yl)methoxy)chroman-4-one and pharmaceutically acceptable salts thereof.

Additional embodiments of this invention are compounds of Formula (II), and pharmaceutically acceptable salts thereof

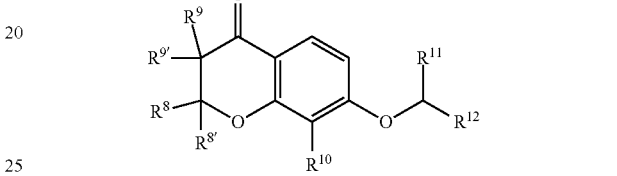

(II)

wherein
$R^8$ is H or —$C_1$-$C_3$alkyl;
$R^{8'}$ is H;
$R^9$ is H or —$C_1$-$C_3$alkyl;
$R^{9'}$ is H;
$R^{10}$ is H or —$C_1$-$C_5$alkyl;
$R^{11}$ is H;
$R^{12}$ is

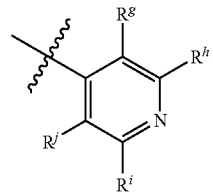

$R^g$ is H or —$OCH_3$;
$R^h$ is H or —$CH_3$;
$R^i$ is H or —$CH_3$; and
$R^j$ is H.

Additional illustrative embodiments of the invention are compounds of Formula (II), wherein $R^8$ is H.
Additional illustrative embodiments of the invention are compounds of Formula (II), wherein $R^8$ is —$C_1$-$C_3$alkyl.
Additional illustrative embodiments of the invention are compounds of Formula (II), wherein $R^8$ is —$C_1$-$C_2$alkyl.
Additional illustrative embodiments of the invention are compounds of Formula (II), wherein $R^8$ is $CH_3$.
Additional illustrative embodiments of the invention are compounds of Formula (II), wherein $R^8$ is —$CH_2CH_3$.
Additional illustrative embodiments of the invention are compounds of Formula (II), wherein $R^9$ is H.
Additional illustrative embodiments of the invention are compounds of Formula (II), wherein $R^9$ is —$C_1$-$C_3$alkyl.
Additional illustrative embodiments of the invention are compounds of Formula (II), wherein $R^9$ is —$C_1$-$C_2$alkyl.
Additional illustrative embodiments of the invention are compounds of Formula (II), wherein $R^9$ is —$CH_3$.

Additional illustrative embodiments of the invention are compounds of Formula (II), wherein $R^9$ is —CH$_2$CH$_3$.

Additional illustrative embodiments of the invention are compounds of Formula (II), wherein $R^{10}$ is H.

Additional illustrative embodiments of the invention are compounds of Formula (II), wherein $R^{10}$ is —C$_1$-C$_3$alkyl.

Additional illustrative embodiments of the invention are compounds of Formula (II), wherein $R^{10}$ is —C$_1$-C$_2$alkyl.

Additional illustrative embodiments of the invention are compounds of Formula (II), wherein $R^{10}$ is —CH$_3$.

Additional illustrative embodiments of the invention are compounds of Formula (II), wherein $R^{10}$ is —CH$_2$CH$_3$.

Additional illustrative embodiments of the invention are compounds of Formula (II), wherein $R^{10}$ is —CH(CH$_3$)$_2$.

Additional illustrative embodiments of the invention are compounds of Formula (II), wherein $R^g$ and $R^h$ are H and $R^i$ is —CH$_3$.

Additional illustrative embodiments of the invention are compounds of Formula (II), wherein $R^h$ and $R^i$ are —CH$_3$.

Additional illustrative embodiments of the invention are compounds of Formula (II), wherein $R^h$ and $R^i$ are —CH$_3$ and $R^g$ is H.

Additional illustrative embodiments of the invention are compounds of Formula (II), wherein $R^h$ and $R^i$ are H and $R^g$ is —OCH$_3$.

Additional illustrative embodiments of the invention are compounds of Formula (II), wherein $R^h$ and $R^i$ are —CH$_3$, $R^g$ is H and $R^5$ is —CH(CH$_3$)$_2$.

Additional illustrative embodiments of the invention are compounds of Formula (II), wherein $R^h$ and $R^i$ are H, $R^g$ is —OCH$_3$ and $R^2$ is —CH$_2$CH$_3$.

Additional illustrative embodiments of the invention are compounds of Formula (II), wherein $R^i$ is —CH$_3$, $R^g$ and $R^h$ are H, $R^5$ is H and $R^2$ is —CH$_2$CH$_3$.

Illustrative embodiments of compounds of Formula (II) and pharmaceutically acceptable salts thereof are
7-((2,6-Dimethylpyridin-4-yl)methoxy)-8-isopropylchroman-4-one;
(*R)-2-ethyl-7-((2-methylpyridin-4-yl)methoxy)chroman-4-one;
(*S)-2-ethyl-7-((2-methylpyridin-4-yl)methoxy)chroman-4-one;
(*R)-2-ethyl-7-((3-methoxypyridin-4-yl)methoxy)chroman-4-one;
(*S)-2-ethyl-7-((3-methoxypyridin-4-yl)methoxy)chroman-4-one;
(R,S)-3-Ethyl-7-(pyridin-4-ylmethoxy)chroman-4-one and pharmaceutically acceptable salts thereof.

Additional embodiments of this invention are compounds of Formula (III), and pharmaceutically acceptable salts thereof

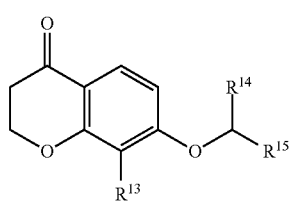
(III)

wherein
$R^{13}$ is —CH$_3$;
$R^{14}$ and $R^{15}$ are taken together with the carbon to which they are attached to form

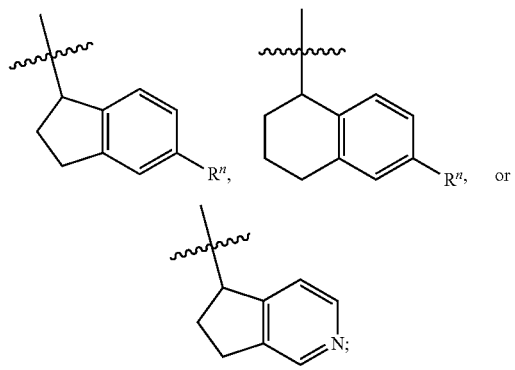

and
$R^n$ is H or —C(O)NH$_2$.

Additional illustrative embodiments of the invention are compounds of Formula (III), wherein $R^{14}$ and $R^{15}$ are taken together with the carbon to which they are attached to form

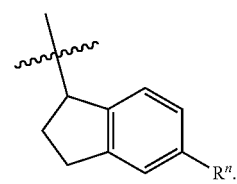

Additional illustrative embodiments of the invention are compounds of Formula (III), wherein $R^{14}$ and $R^{15}$ are taken together with the carbon to which they are attached to form

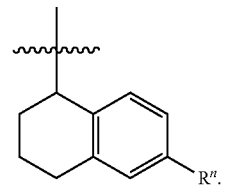

Additional illustrative embodiments of the invention are compounds of Formula (III), wherein $R^{14}$ and $R^{15}$ are taken together with the carbon to which they are attached to form

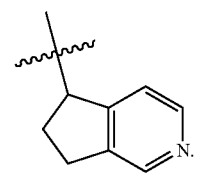 [SMILES: *C1CCc2cnccc21]

Additional illustrative embodiments of the invention are compounds of Formula (III), wherein $R^{14}$ and $R^{15}$ are taken together with the carbon to which they are attached to form
or

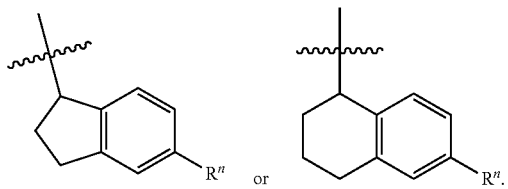

Additional illustrative embodiments of the invention are compounds of Formula (III), wherein $R^{14}$ and $R^{15}$ are taken together with the carbon to which they are attached to form

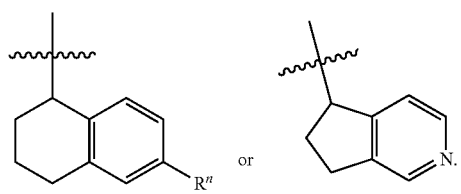

Additional illustrative embodiments of the invention are compounds of Formula (III), wherein $R^{14}$ and $R^{15}$ are taken together with the carbon to which they are attached to form

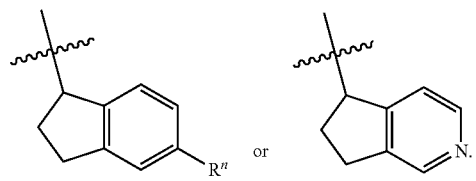

Illustrative embodiments of compounds of Formula (III) and pharmaceutically acceptable salts thereof are
(*R)-1-((8-methyl-4-oxochroman-7-yl)oxy)-2,3-dihydro-1H-indene-5-carboxamide;
(*S)-1-((8-methyl-4-oxochroman-7-yl)oxy)-2,3-dihydro-1H-indene-5-carboxamide;
(R,S)-5-((8-Methyl-4-oxochroman-7-yl)oxy)-5,6,7,8-tetrahydronaphthalene-2-carbonitrile;
(*R)-5-((8-methyl-4-oxochroman-7-yl)oxy)-5,6,7,8-tetrahydronaphthalene-2-carbonitrile;
(*S)-5-((8-methyl-4-oxochroman-7-yl)oxy)-5,6,7,8-tetrahydronaphthalene-2-carbonitrile;
(R,S)-5-((8-Methyl-4-oxochroman-7-yl)oxy)-5,6,7,8-tetrahydronaphthalene-2-carboxamide;
(*R)-5-((8-methyl-4-oxochroman-7-yl)oxy)-5,6,7,8-tetrahydronaphthalene-2-carboxamide;
(*S)-5-((8-methyl-4-oxochroman-7-yl)oxy)-5,6,7,8-tetrahydronaphthalene-2-carboxamide;
(*R)-7-((6,7-dihydro-5H-cyclopenta[c]pyridin-5-yl)oxy)-8-methylchroman-4-one;
(*S)-7-((6,7-dihydro-5H-cyclopenta[c]pyridin-5-yl)oxy)-8-methylchroman-4-one; and
pharmaceutically acceptable salts thereof.

TABLE 1

| Abbreviations and Acronyms | |
|---|---|
| Acronym | Meaning |
| Ac | acetyl |
| ADDP | 1,1'-(azodicarbonyl)dipiperidine |
| Bn | benzyl |
| br | broad |
| Bu | butyl |
| ° C. | degrees Celsius |
| calcd. | calculated |
| δ | delta |
| DCM | dichloromethane |
| DEAD | diethyl azodicarboxylate |
| DIAD | diisoproyl azodicarboxylate |
| DIPEA | diisopropylethylamine |
| DMA | dimethylacetamide |
| DMAP | 4-dimethylaminopyridine |
| DMF | N,N-dimethylformamide |
| DMSO | dimethylsulfoxide |
| dppf | 1,1'-ferrocenediyl-bis(diphenylphosphine) |
| dtbpf | 1,1'-bis(di-tert-butylphosphino)ferrocene |
| Et | ethyl |
| ESI | electrospray ionization |
| HATU | 1-[bis(dimethylamino)methylene]-1H-1,2,3-triazolo[4,5-b]pyridinium 3-oxid hexafluorophosphate |
| Hept | heptanes |
| HPLC | high performance liquid chromatography |
| FA | formic acid |
| FCC | normal-phase silica gel flash column chromatography |
| g | gram |
| Hz | Hertz |
| i- | iso- |
| IPA | isopropyl alcohol |
| M | molar |
| m/z | mass to charge ratio |
| Me | methyl |
| mg | milligram |
| MHz | megahertz |
| mL | milliliter |
| mm | millimeter |
| mmol | millimole |
| MS | mass spectrometry |
| MTBE | methyl tert-butyl ether |
| nt | not tested |
| N | normal |
| n- | normal |
| NBS | N-bromosuccinimide |
| NMR | nuclear magnetic resonance |
| $Pd_2(dba)_3$ | tris(dibenzylideneacetone)dipalladium(0) |
| Ph | phenyl |
| Pr | propyl |
| Psi | pounds per square inch |
| (R,S)- | racemic |
| SFC | supercritical fluid chromatography |
| S-Phos | (2-dicyclohexylphosphino-2',6'-dimethoxybiphenyl) |
| Pd G3 | [2-(2'-amino-1,1'-biphenyl)]palladium(II) methanesulfonate |
| t- | tertiary- |
| Tf | trifluoromethanesulfonyl |
| TFA | trifluoroacetic acid |
| TFAA | trifluoroacetic anhydride |
| THF | tetrahydrofuran |
| TLC | thin layer chromatography |
| μM | micrometer |
| v/v | volume/volume ratio |
| Xantphos | 4,5-bis(diphenylphosphino)-9,9-dimethylxanthene |

Compounds of Formula (I), (II) and (III) are synthesized in accordance with synthetic methods described herein, which are only meant to represent synthetic examples and are in no way meant to be limitations. Unless otherwise specified, the substituent groups in Schemes 1-7 are as defined above in reference to Formulas (I), (II) and (III). If no temperature or temperature range is stated, it is to be understood that the reaction is run at room temperature.

In the schemes below a Suzuki reaction or a Suzuki coupling (Suzuki, A., *Angew. Chem. Int. Ed.* 2011, 50: 6723-6737) is performed using the following conditions: One coupling reactant has a boron component that is in the form of, for example, a potassium trifluoroborate, an organoborane, a boronate or a boronic acid. The second coupling reactant is in the form of, for example, an aryl, alkyl, alkenyl or alkynyl halide. These two coupling reactants react in the presence of a palladium source, such as tetrakis-triphenylphosphine palladium, a base, such as $K_2CO_3$, in a solvent such as benzene, at a temperature range of about room temperature to about reflux temperature of the solvent. The aforementioned conditions are referred to as "Suzuki coupling conditions".

Scheme 1 describes three alternative routes for the synthesis of compound IX, which are designated as paths 1, 2 and 3.

Scheme 1, Path 1

Compounds such as compound IX are 7-hydroxychromanones. In path 1, compound IV undergoes a Friedel-Crafts acylation by treating compound IV with 3-chloropropanoic acid, and a strong acid, such as trifluoromethanesulfonic acid, at a temperature from about 50° C. to about 90° C., for about 2-16 hours. The resulting 3-chloro-1-aryl-propan-1-one, compound V, is cyclized upon treatment with a base, such as aqueous sodium hydroxide to yield compound IX.

Installation of alkyl groups $R^2$ and $R^{2'}$ at the 3-position of the chromanone is accomplished by initial protection of the 7-hydroxy group of compound IX to form compound VI, according to any of the following three illustrative hydroxyl protection schemes. These hydroxy protection schemes describe the protection of the hydroxy as a benzyl ether. In one of these protection schemes, this hydroxy group is protected as a benzyl ether using a variety of conditions such as treatment of the hydroxyl group with benzyl bromide in the presence of a base such as NaH in a solvent such as THF. In a second illustrative protection scheme, the hydroxy group is treated with benzyl bromide in the presence of silver oxide in a solvent such as DCM or toluene. In a third illustrative protection scheme, the hydroxy group is treated with 2-benzyloxy-1-methylpyridinium triflate in the presence of MgO and trifluorotoluene as a solvent. These are referred to as "benzyl protection conditions". Any of these protection schemes yield compound VI in the form of a benzyl ether.

Subsequent treatment of protected compound VI with a base, such as lithium 2,2,6,6-tetramethylpiperidide or t-BuOK, and about 1 equivalent of an alkyl halide ($R^2$—X) yields 3-alkyl chromanone, compound VII.

Dialkylated chromanone compound VIII, where $R^2=R^{2'}$, is made by treating compound VI with an excess of a base such as lithium 2,2,6,6-tetramethylpiperidide or t-BuOK and an excess of alkyl halide $R^2$—X, where X is chloro, bromo or iodo. In some embodiments this is achieved with an amount that exceeds 2 equivalents of each of such reagents.

Compound IX, where $R^2$ and $R^{2'}$ are different alkyl groups, is prepared by treating compound VII with a base such as lithium 2,2,6,6-tetramethylpiperidide or t-BuOK, and an alkyl halide, $R^{2'}$—X, where the X is chloro, bromo or iodo.

Compound IX is obtained by deprotecting compound VII or VIII. The benzyl ether in protected compound VII or VIII is removed by using any of a variety of hydrogenation conditions. For example, transfer hydrogenation conditions using Pd/C as the catalyst and cyclohexadiene in a reaction medium provided by a solvent such as ethanol at a temperature range of about room temperature to about reflux temperature of the solvent. In another example, the benzyl group is removed using 10% Pd(OH)$_2$/C or 10% Pd/C in a reaction medium such as methanol as the solvent at a temperature range of about room temperature to about 50° C. under an atmosphere of $H_2$ gas wherein the reaction is conducted in for example a conventional reaction flask or using a continuous flow hydrogenation reactor. The above conditions to remove a benzyl group are referred to as "benzyl deprotection conditions".

Scheme 1, Path 1

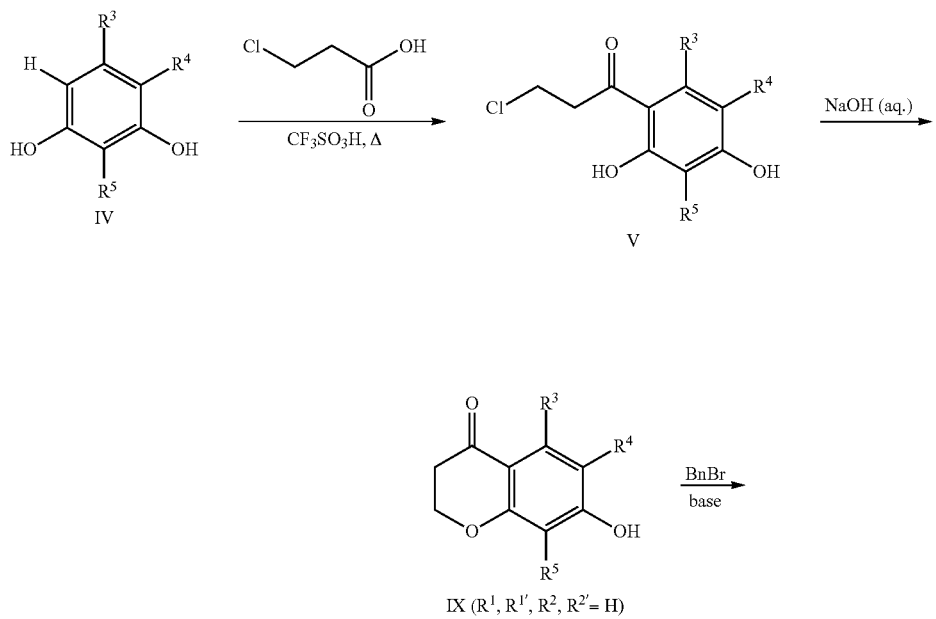

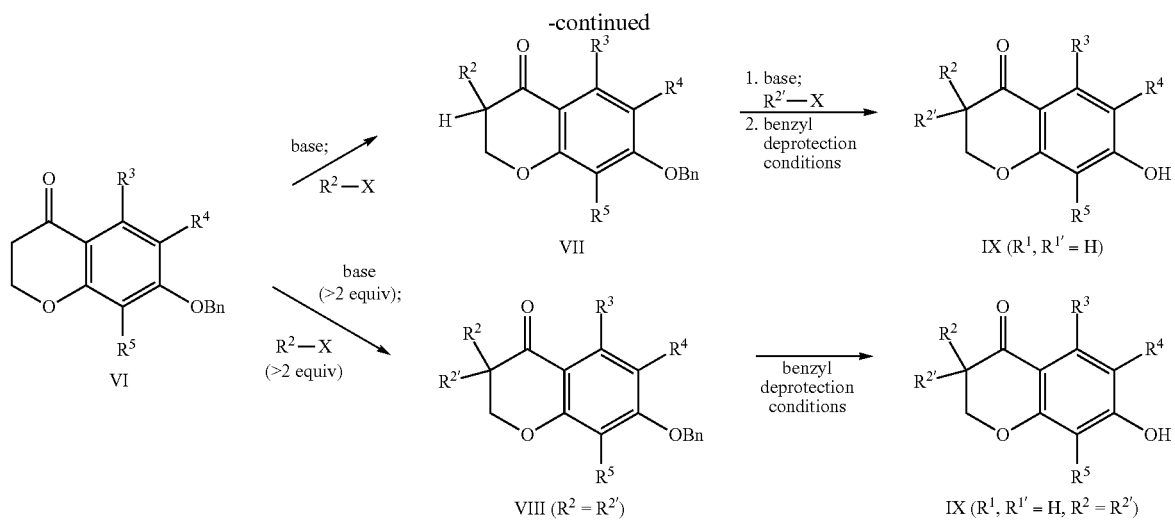

Scheme 1, Path 2

Compound IV is heated with an acrylic acid compound XXIX, in the presence of an acid, such as sulfuric acid, to yield 7-hydroxychromanone intermediate compound IX, where $R^{2'}$ is H.

pound XIII by base-catalyzed cyclization with a base such as aqueous NaOH. Finally, compound XIII is treated with pyridine hydrochloride at a temperature of about 170° C. for about 3 hours, to yield compound IX.

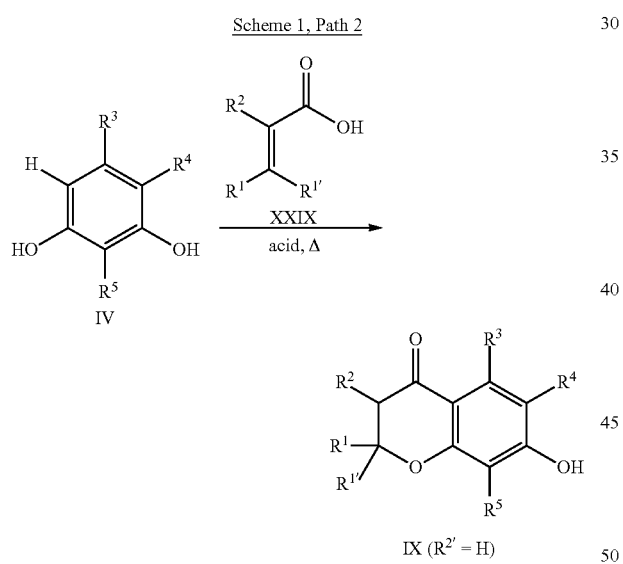

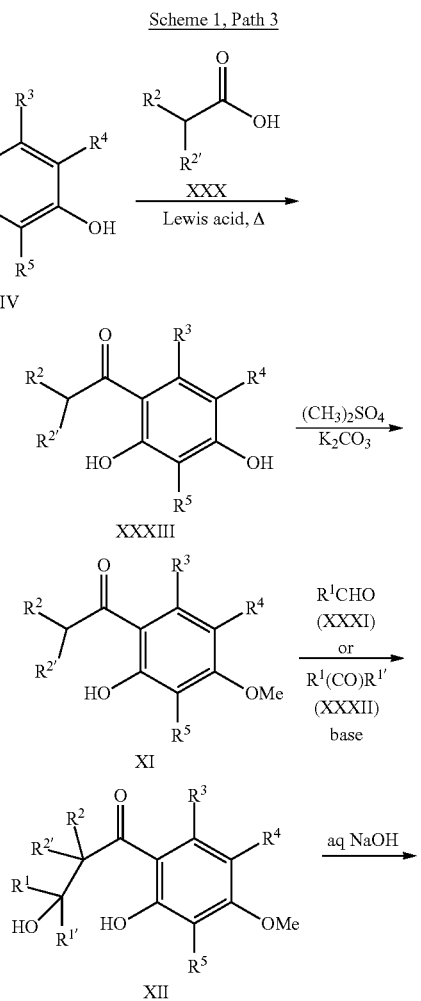

Scheme 1, Path 3

This route utilizes a Friedel Crafts acylation of 1,3-benzenediol compound IV with optionally substituted acetic acid compound XXX, at a temperature range from about room temperature to about the reflux temperature of the solvent in the presence of a Lewis acid, such as boron trifluoride diethyl etherate to form compound XXXIII. Compound XXXIII is converted to compound XI by treatment with dimethyl sulfate in the presence of a base such as $K_2CO_3$ in a solvent such as anhydrous acetone and heated to a temperature of about 65° C. for about 6-10 hours. Compound XI is treated with an aldehyde compound $R^1$—CHO XXXI or ketone $R^1(CO)R^{1'}$ compound XXXII and a base such as NaOH in water in an Aldol reaction to make compound XII. Compound XII then is converted to com-

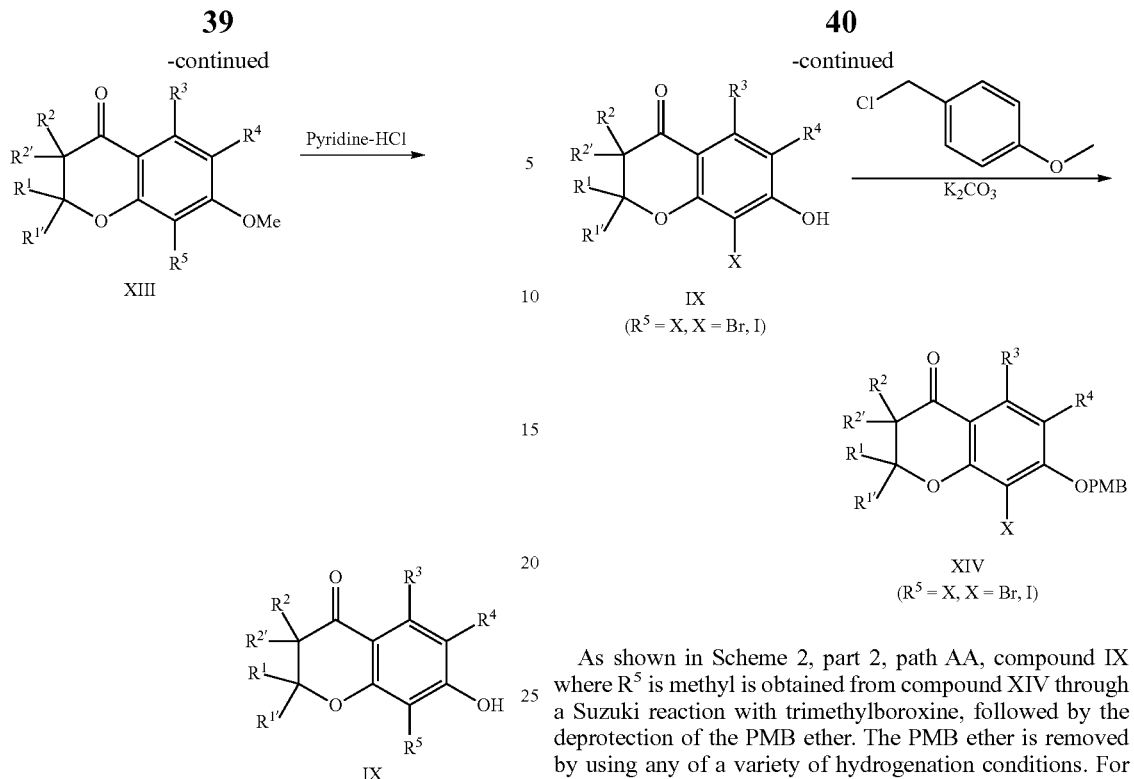

The hydroxy-protected form of compound XIV is prepared according to scheme 2, part 1 and the preparation of a plurality of embodiments of compound IX with different $R^5$ substituents is illustrated in scheme 2, part 2.

Compound IX, where $R^5$ is H, is treated with N-halo-succinimide compound XXXIV to yield compound IX, where $R^5$ is bromo or iodo. The 7-hydroxy group of embodiments of compound IX, where $R^5$ is bromo or iodo, is protected, for example as the corresponding para-methoxy benzyl (PMB) ether, to yield compound XIV by treating compound IX ($R^5$ is Br or I) with p-methoxybenzyl chloride and $K_2CO_3$ in a solvent such as DMF or THF. These conditions are referred to as "PMB protection conditions".

Scheme 2, Part 1

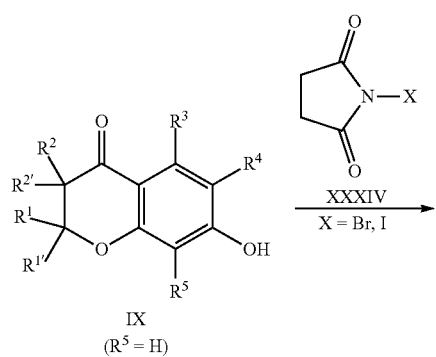

As shown in Scheme 2, part 2, path AA, compound IX where $R^5$ is methyl is obtained from compound XIV through a Suzuki reaction with trimethylboroxine, followed by the deprotection of the PMB ether. The PMB ether is removed by using any of a variety of hydrogenation conditions. For example, transfer hydrogenation conditions using Pd/C as the catalyst and cyclohexadiene in a reaction medium provided by a solvent such as ethanol at a temperature range of about room temperature to about reflux temperature of the solvent. In another example, the PMB group is removed using 10% $Pd(OH)_2$/C or 10% Pd/C in a reaction medium such as methanol as the solvent at a temperature range of about room temperature to about 50° C. under an atmosphere of $H_2$ gas wherein the reaction is conducted in for example a conventional reaction flask or using a continuous flow hydrogenation reactor. The above conditions to remove a PMB group are referred to as "p-methoxybenzyl deprotection conditions" or "PMB deprotection conditions".

Compound IX where $R^5$ is alkyl is obtained from compound XIV through Scheme 2, part 2 reaction BB, through a Suzuki reaction of compound XIV ($R^5$=X, X=Br, I) with an optionally substituted vinyl boronate ester. Simultaneous alkene reduction and PMB deprotection using PMB deprotection conditions yields compound IX where $R^5$ is alkyl.

Compound IX where $R^5$ is CN is obtained from compound XIV by reacting compound XIV with $Zn(CN)_2$ in the presence of zinc and a palladium catalyst followed by deprotection of the PMB group using PMB deprotection conditions as shown in Scheme 2, part 2, path CC.

Compound IX where $R^5$ is aryl is prepared from compound XIV by a Suzuki coupling using Suzuki coupling conditions with an aryl boronic acid and deprotection of the PMB using PMB deprotection conditions as shown in Scheme 2, part 2, path DD.

Compound IX where $R^5$ is methoxy is prepared by converting compound XIV first to the boronate ester followed by treatment with hydrogen peroxide to yield the 8-hydroxy intermediate (structure not shown). Subsequent treatment of the 8-hydroxy intermediate with methyl iodide in the presence of a base followed by PMB deprotection conditions yields compound IX, where $R^5$ is methoxy as shown in Scheme 2, part 2, path EE.

Scheme 2, Part 2

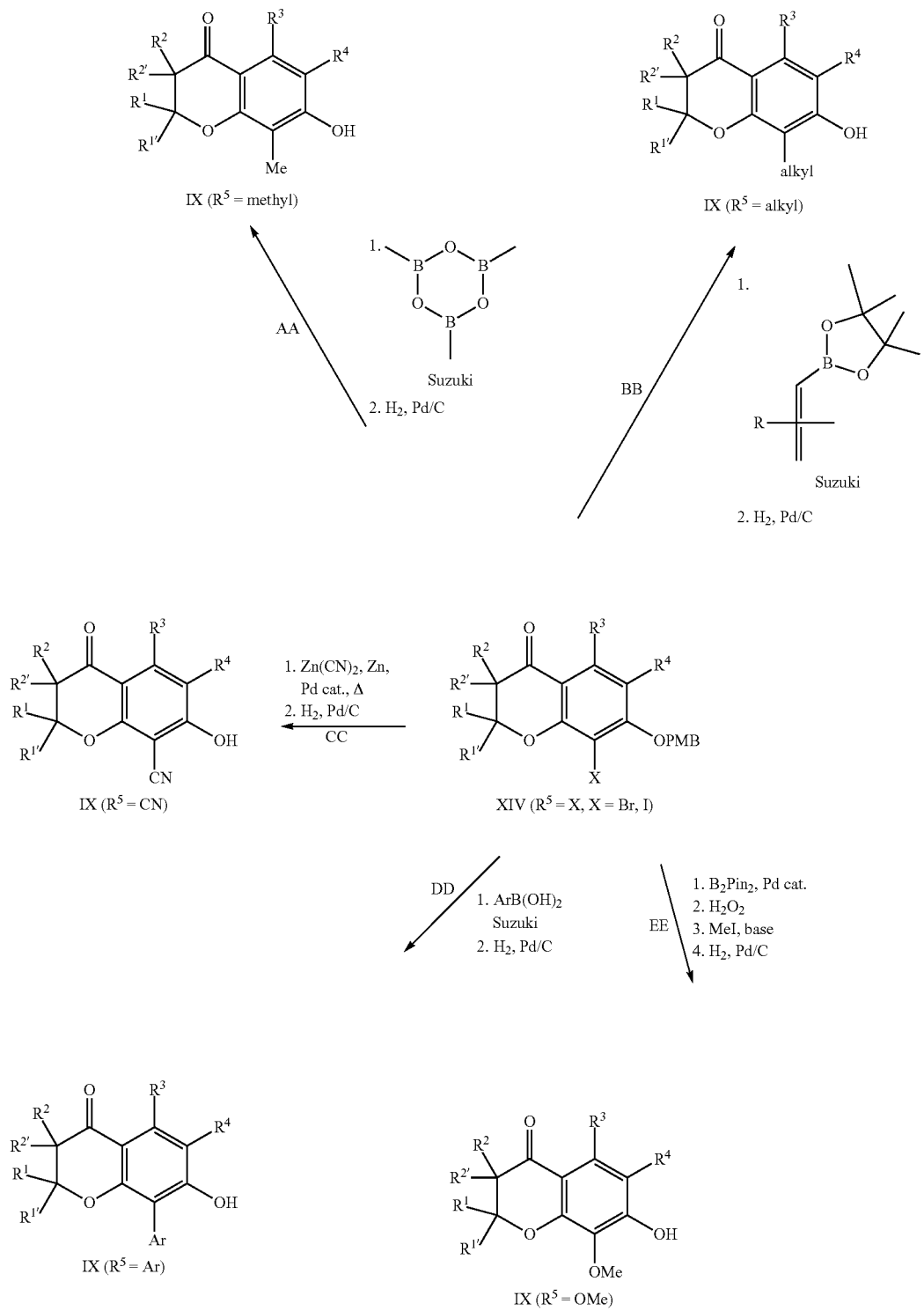

Illustrative embodiments of compound IX with different $R^4$ substituents are prepared in Scheme 3 from compound IX where $R^4$ is H. Compound IX where $R^5$ is not hydrogen, is reacted with N-halo-succinimide compound XXXIV to yield compound IX, where $R^5$ is not hydrogen and $R^4$ is bromo or iodo as shown in Scheme 2, reaction FF.

Protection of the 7-hydroxy group in compound IX, using PMB protection conditions yields compound XV. The last step shown in scheme 3 indicates that the 6-halo group of compound XV is then functionalized using the methods described in Scheme 2, path AA, BB, CC, DD, and EE for the 8-halo group in such Scheme 2.

Scheme 3

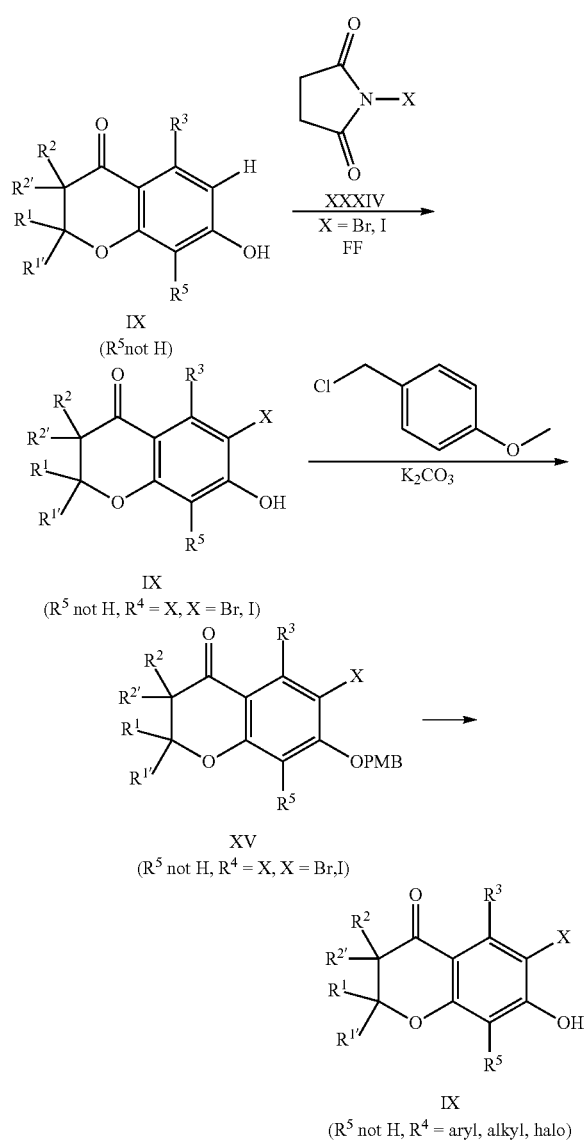

Scheme 4

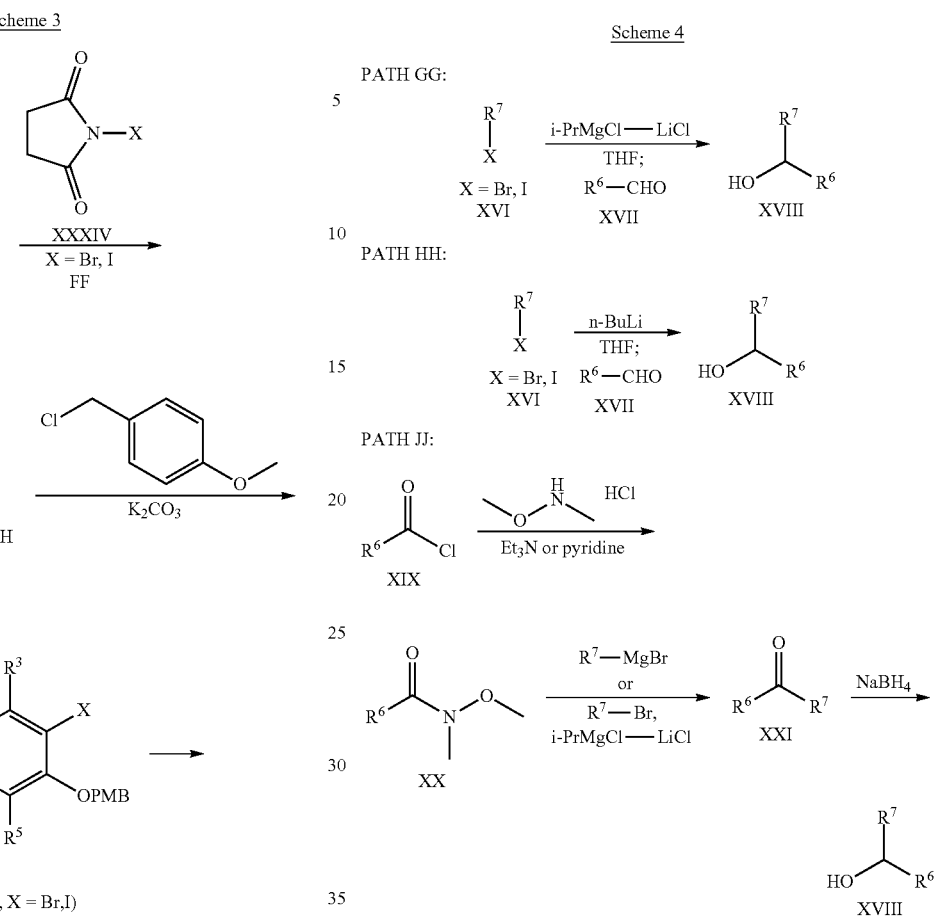

Scheme 4 illustrates the synthesis of compound XVIII. In one illustrative reaction path, as shown in scheme 4, path GG, aryl halide compound XVI is converted to the corresponding Grignard reagent (if the needed Grignard reagents are not commercially available) by reaction with isopropyl magnesium chloride-lithium chloride complex (product not shown), and then reacted with aldehyde compound XVII to yield compound XVIII. In another illustrative reaction path, as shown in scheme 4, path HH, aryl halide compound XVI is treated with n-butyllithium to yield the aryllithium intermediate (structure not shown), which reacts with aldehyde compound XVII to yield compound XVIII. In still another illustrative reaction path, as shown in scheme 4, path JJ, acid chloride compound XIX is treated with N,O-dimethylhydroxylamine hydrochloride in the presence of a base, such as triethylamine or pyridine, to yield Weinreb amide compound XX. This amide reacts with commercial or prepared Grignard reagents, $R^7$—MgX, to yield ketone compound XXI, which is then reduced with a hydride reducing reagent such as sodium borohydride to yield alcohol compound XVIII.

The synthesis of compounds of Formula (I) is illustrated in Scheme 5. In one illustrative reaction path, 7-hydroxychromanone compound IX is coupled with alcohol compound XVIII by a Mitsunobu reaction as illustrated in Scheme 5, path KK. This Mitsunobu reaction is performed by using diethyl azodicarboxylate (DEAD), diisopropyl azodicarboxylate (DIAD) or di-tert-butyl azodicarboxylate in the presence of triphenylphosphine or solid-supported triphenylphosphine in a reaction medium provided by solvents such as THF, DMF, dichloromethane, or mixtures thereof, at a temperature range from about room temperature to about the reflux temperature of the solvent. Alternatively, this Mitsunobu reaction is performed in the presence of 1,1'-(azodicarbonyl)dipiperidine (ADDP) and a phosphine such as triphenylphosphine in a solvent such as toluene or THF or mixtures thereof, at a temperature range from about room temperature to about the reflux temperature of the solvent. These conditions are referred to as "Mitsunobu reaction conditions".

In another illustrative reaction scheme 5, path LL, the conversion of alcohol compound XVIII to alkyl bromide compound XXII is accomplished using brominating reagents such as phosphorus tribromide, or with bromine ($Br_2$) in the presence of triphenylphosphine and imidazole. The reaction of 7-hydroxychromanone compound IX with alkyl bromide XXII is performed in the presence of a base, such as cesium carbonate, to yield compounds of Formula (I).

Scheme 5

PATH KK:

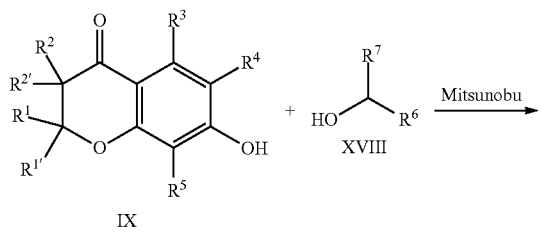

PATH LL:

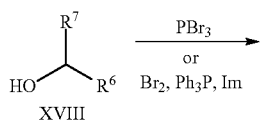

Scheme 6

PATH MM:

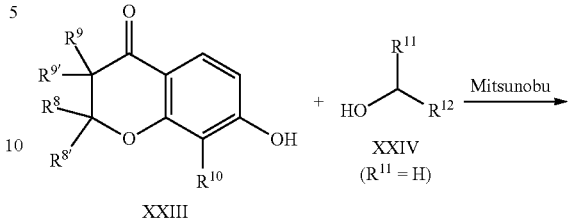

PATH NN:

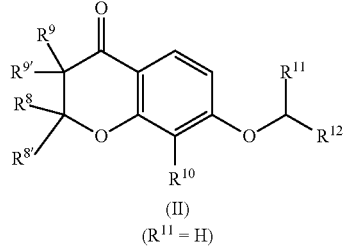

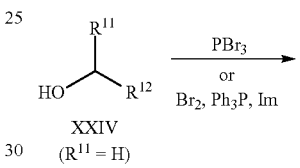

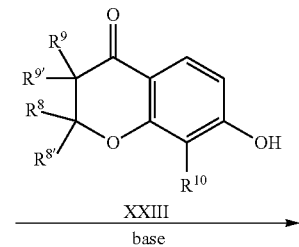

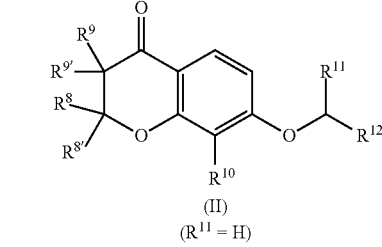

Compounds of Formula (II) are prepared as illustratively shown in Scheme 6, in a manner analogous to the synthesis routes shown above in Scheme 5, with the exception that alcohol compound XXIV is a now primary alcohol (i.e., $R^{11}$ is H). Mitsunobu coupling using Mitsunobu reaction conditions according to Scheme 6, path MM or alkylation of 7-hydroxychromanone compound XXIII according to Scheme 6, path NN yields compounds of Formula (II).

Compounds of Formula (III) are prepared by the same coupling methods in reference to those described in Schemes 5 and 6 with the exception that alcohol compound XXVII is a now secondary alcohol and wherein the substituents $R^{14}$ and $R^{15}$ are taken together with the carbon to which they are attached to form a ring (Scheme 7). Scheme 7, path OO is analogous to scheme 5, path KK and scheme 6, path MM. Scheme 7, path PP is analogous to scheme 5, path LL and scheme 6, path NN.

Scheme 7

PATH OO:

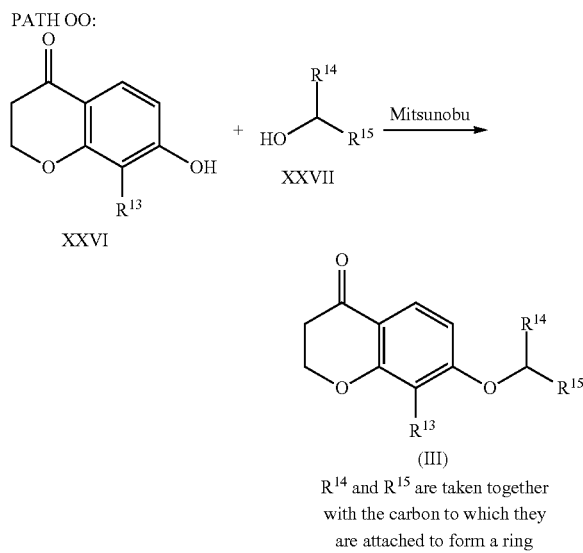

R14 and R15 are taken together with the carbon to which they are attached to form a ring

PATH PP:

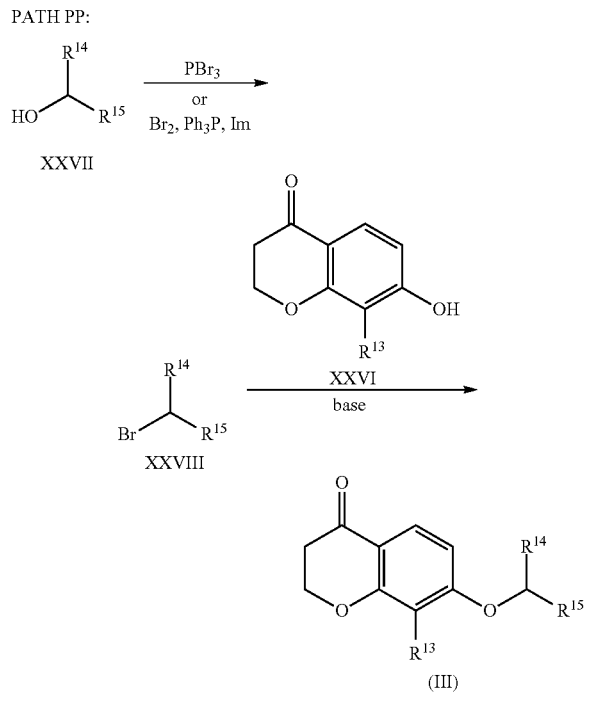

Intermediate 1:
(R,S)-(2-Fluorophenyl)(pyridin-4-yl)methanol

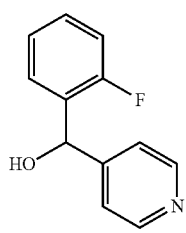 [SMILES: OC(c1ccncc1)c1ccccc1F]

i-PrMgCl·LiCl (8.0 mL, 1.3 M in THF, 10 mmol) was added dropwise to a solution of 4-iodopyridine (2.0 g, 9.8 mmol) and THF (10 mL) which had been cooled to 0° C. The mixture was stirred at 0° C. for 1 hour and then added dropwise to a solution of 2-fluorobenzaldehyde (1.3 g, 10 mmol) and THF (5 mL) which had been cooled to 0° C. This mixture was stirred at 0° C. for another 1 hour and then was stirred for 16 hours with gradual warming to room temperature before pouring it into saturated $NH_4Cl$ (50 mL) and extracting with ethyl acetate (50 mL×3). The combined organic extracts were dried over anhydrous $Na_2SO_4$, filtered, and concentrated to dryness under reduced pressure to provide the product, which was purified by FCC (eluent: petroleum ether:ethyl acetate, 1:1 to 0:1, gradient elution) to afford the title compound (500 mg, 25%) as a light yellow solid. MS (ESI): mass calcd. for $C_{12}H_{10}FNO$ 203.07 m/z found 203.9 $[M+H]^+$. $^1H$ NMR (400 MHz, DMSO-$d_6$) δ 8.53-8.46 (m, 2H), 7.54-7.47 (m, 1H), 7.36-7.29 (m, 3H), 7.25-7.11 (m, 2H), 6.27 (d, J=4.5 Hz, 1H), 5.94 (d, J=4.5 Hz, 1H).

Intermediate 2:
(R,S)-(3-Fluorophenyl)(pyridin-4-yl)methanol

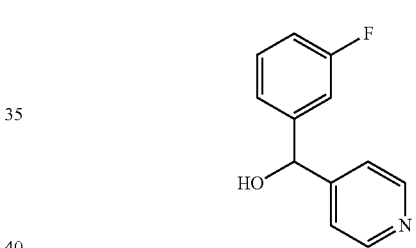

(3-Fluorophenyl)magnesium bromide (19.6 mL, 1.0 M in THF, 19.6 mmol) was added dropwise to a solution of isonicotinaldehyde (2.0 g, 18.7 mmol) and THF (11 mL) that had been cooled to −70° C. The mixture was stirred at −70° C. for 1 hour and then stirred for another 12 hours with gradual warming to room temperature before quenching with saturated $NH_4Cl$ (20 mL). The suspension was filtered and the filtrate concentrated to dryness under reduced pressure. The residue was re-dissolved in dichloromethane (30 mL) and washed with $H_2O$ (15 mL×2). The organic layer was dried over anhydrous $Na_2SO_4$, filtered, and concentrated to dryness under reduced pressure to give the product, which was purified by FCC (eluent:petroleum ether:ethyl acetate, 1:1 to 0:1, gradient elution) to afford the title compound (2.8 g, 73%) as a light yellow solid. MS (ESI): mass calcd. for $C_{12}H_{10}FNO$ 203.07 m/z, found 203.8 $[M+H]^+$. $^1H$ NMR (400 MHz, DMSO-$d_6$) δ 8.50 (d, J=6.0 Hz, 2H), 7.41 (d, J=6.0 Hz, 2H), 7.39-7.32 (m, 1H), 7.29-7.22 (m, 2H), 7.10-7.02 (m, 1H), 6.32 (d, J=4.0 Hz, 1H), 5.77 (d, J=3.0 Hz, 1H).

Intermediate 3: (R,S)-(4-Fluorophenyl)(pyridin-4-yl)methanol

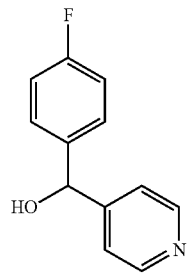 [SMILES: OC(c1ccncc1)c1ccc(F)cc1]

(4-Fluorophenyl)magnesium bromide (20 mL, 1 M in THF, 20 mmol) was added to a solution of isonicotinaldehyde (2.1 g, 20 mmol) and THF (20 mL) which had been cooled to 0° C. The mixture was stirred for 16 hours with gradual warming to room temperature before quenching with saturated $NH_4Cl$ (50 mL) and extracting with ethyl acetate (50 mL×3). The combined organic extracts were dried over anhydrous $Na_2SO_4$, filtered, and concentrated to dryness under reduced pressure to give the product, which was purified by FCC (eluent: petroleum ether:ethyl acetate, 1:0 to 1:9, gradient elution) to afford the title compound (1.83 g, 39%) as a white solid, which was used in the next step without further purification. MS (ESI): mass calcd. for $C_{12}H_{10}FNO$ 203.07 m/z found 203.9 [M+H]$^+$.

Intermediate 4: (R,S)-(3-((4-Methoxybenzyl)oxy)phenyl)(pyridin-4-yl)methanol

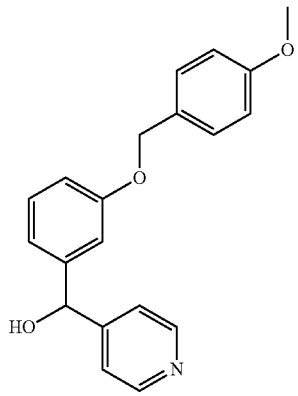 [SMILES: COc1ccc(COc2cccc(C(O)c3ccncc3)c2)cc1]

Step A: 3-Hydroxybenzaldehyde (1.0 g, 8.2 mmol), 1-(chloromethyl)-4-methoxybenzene (1.4 mL, 10 mmol), $K_2CO_3$ (2.3 g, 17 mmol), and DMF (10 mL) were stirred at 60° C. for 4 hours before pouring it into ice water (100 mL). The suspension was isolated via filtration and the filter cake washed with water (10 mL) before drying under reduced pressure to afford the title compound (2.1 g) as a white solid, which was used in the next step without further purification. $^1$H NMR (400 MHz, DMSO-$d_6$) δ 9.97 (s, 1H), 7.55-7.49 (m, 3H), 7.42-7.32 (m, 3H), 6.97-6.92 (m, 2H), 5.10 (s, 2H), 3.75 (s, 3H).

Step B: (R,S)-(3-((4-Methoxybenzyl)oxy)phenyl)(pyridin-4-yl)methanol. i-PrMgCl·LiCl (13 mL, 1.3 M in THF, 17 mmol) was added dropwise to a solution of 4-iodopyridine (1.7 g, 8.3 mmol) and THF (10 mL) which had been cooled to −15° C. The mixture was stirred at −15° C. for 1 hour before dropwise addition of a solution of 3-((4-methoxybenzyl)oxy)benzaldehyde (2.0 g, 8.3 mmol) and THF (10 mL) at −15° C. The mixture was stirred for 16 hours with gradual warming to room temperature before pouring it into saturated $NH_4Cl$ (30 mL) and extracting with ethyl acetate (30 mL×3). The combined organic extracts were dried over anhydrous $Na_2SO_4$, filtered and concentrated to dryness under reduced pressure to afford the product, which was triturated with petroleum ether:ethyl acetate (10:1, 30 mL). The suspension was isolated via filtration and the filter cake washed with petroleum ether (20 mL) before drying under reduced pressure to give the title compound (1.2 g, 39%) as a brown solid. MS (ESI): mass calcd. for $C_{20}H_{19}NO_3$ 321.14 m/z found 322.0 [M+H]$^+$. $^1$H NMR (400 MHz, DMSO-$d_6$) δ 8.47-8.42 (m, 2H), 7.37-7.30 (m, 4H), 7.22-7.17 (m, 1H), 7.02-6.99 (m, 1H), 6.94-6.88 (m, 3H), 6.85-6.81 (m, 1H), 6.10 (d, J=4.0 Hz, 1H), 5.64 (d, J=3.7 Hz, 1H), 4.96 (s, 2H), 3.73 (s, 3H).

Intermediate 5: (R,S)-Pyridin-2-yl(pyridin-4-yl)methanol

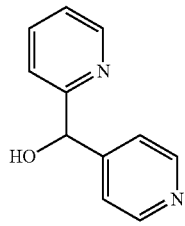 [SMILES: OC(c1ccncc1)c1ccccn1]

A solution of 2-bromopyridine (2.0 g, 12.7 mmol) and THF (10 mL) was added dropwise to a solution of n-BuLi (8.4 mL, 2.5 M in hexane, 21.0 mmol) and THF (10 mL) which had been cooled to −70° C. The mixture was stirred at −70° C. for 0.5 hours before treating with a solution of isonicotinaldehyde (1.5 g, 14.0 mmol) and THF (10 mL) dropwise. The mixture was stirred for 12 hours with gradual warming to room temperature before pouring it into saturated $NH_4Cl$ (150 mL) and extracting with ethyl acetate (150 mL×3). The combined organic extracts were dried over anhydrous $Na_2SO_4$, filtered, and concentrated to dryness under reduced pressure to give the product, which was purified by FCC (eluent:petroleum ether:ethyl acetate, 1:1 to 0:1, gradient elution) to afford the title compound (300 mg, 11%) as a yellow solid. MS (ESI): mass calcd. for $C_{11}H_{10}N_2O$ 186.08 m/z, found 187.1 [M+H]$^+$. $^1$H NMR (400 MHz, DMSO-$d_6$) δ 8.52-8.44 (m, 3H), 7.82-7.76 (m, 1H), 7.56 (d, J=7.9 Hz, 1H), 7.43-7.38 (m, 2H), 7.28-7.22 (m, 1H), 6.36 (d, J=4.6 Hz, 1H), 5.72 (d, J=4.4 Hz, 1H).

Intermediate 6: (R,S)-7-((2-Bromophenyl)(pyridin-4-yl)methoxy)chroman-4-one

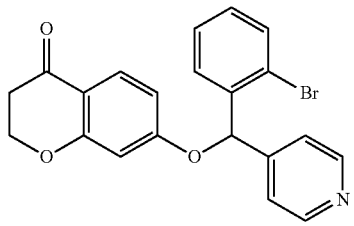 [SMILES: O=C1CCOc2cc(OC(c3ccncc3)c3ccccc3Br)ccc21]

Step A: (R,S)-(2-Bromophenyl)(pyridin-4-yl)methanol. i-PrMgCl·LiCl (25 mL, 1.3 M in THF, 33 mmol) was added dropwise to a solution of 4-iodobenzonitrile (3.3 g, 16 mmol) and anhydrous THF (30 mL) that had been cooled to −15° C. The mixture was stirred at −15° C. for 1.5 hours before treating it with a solution of 2-bromobenzaldehyde (3.0 g, 16 mmol) and anhydrous THF (10 mL) dropwise. The mixture was stirred for 16 hours with gradual warming to room temperature before quenching with saturated NH$_4$Cl (30 mL) and extracting with ethyl acetate (80 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 10:1 to 0:1, gradient elution) to afford the title compound (3.1 g, 72%) as a yellow oil. MS (ESI): mass calcd. for C$_{12}$H$_{10}$BrNO 262.99 m/z, found 266.1 [M+H]$^+$. $^1$H NMR (400 MHz, DMSO-d$_6$) δ 8.52-8.42 (m, 2H), 7.62-7.52 (m, 2H), 7.43-7.36 (m, 1H), 7.33-7.27 (m, 2H), 7.24-7.17 (m, 1H), 6.41 (d, J=4.6 Hz, 1H), 5.96 (d, J=4.4 Hz, 1H).

Step B: (R,S)-7-((2-Bromophenyl)(pyridin-4-yl)methoxy)chroman-4-one. DIAD (3.4 mL, 18 mmol) was added to a solution of 7-hydroxychroman-4-one (1.9 g, 12 mmol), (2-bromophenyl)(pyridin-4-yl)methanol (3.1 g, 12 mmol), PPh$_3$ (4.0 g, 15 mmol), and anhydrous dichloromethane (30 mL). The mixture was stirred at room temperature for 16 hours before pouring it into H$_2$O (20 mL) and extracting with dichloromethane (50 mL×3). The combined organic extracts were dried over anhydrous Na$_2$SO$_4$, filtered, and concentrated to dryness under reduced pressure to afford the product, which was purified by preparative HPLC using a Phenomenex Synergi Max-RP, 250 mm×50 mm×10 μm column (eluent: 35% to 65% (v/v) CH$_3$CN and H$_2$O with 10 mM NH$_4$HCO$_3$) to afford the title compound (2.3 g, 48%) as a white solid. MS (ESI): mass calcd. for C$_{21}$H$_{16}$BrNO$_3$ 409.03 m/z, found 411.9 [M+H]$^+$.

Intermediate 7: (R,S)-3-(((4-Oxochroman-7-yl)oxy)(pyridin-4-yl)methyl)benzonitrile

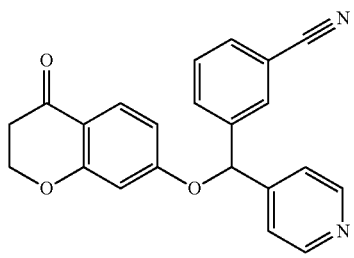 [SMILES: N#Cc1cccc(C(Oc2ccc3c(c2)OCCC3=O)c2ccncc2)c1]

Step A: (R,S)-3-(Hydroxy(pyridin-4-yl)methyl)benzonitrile. i-PrMgCl·LiCl (19 mL, 1.3 M in THF, 25 mmol) was added dropwise to a solution of 3-iodobenzonitrile (5.0 g, 22 mmol) and THF (10 mL) that had been cooled to 0° C. The mixture was stirred at 0° C. for 1 hour and then added dropwise to a 0° C. solution of isonicotinaldehyde (2.6 g, 24 mmol) and THF (10 mL). The mixture was stirred at 0° C. for 1 hour and then stirred for 16 hours with gradual warming to room temperature before pouring it into saturated NH$_4$Cl (100 mL) and extracting with ethyl acetate (100 mL×3). The combined organic extracts were dried over anhydrous Na$_2$SO$_4$, filtered, and concentrated to dryness under reduced pressure to give the product, which was triturated with petroleum ether:ethyl acetate (10:1, 30 mL). The suspension was isolated via filtration and the filter cake dried under reduced pressure to afford the title compound (1.8 g, 39%) as a white solid. $^1$H NMR (400 MHz, DMSO-d$_6$) δ 8.53-8.48 (m, 2H), 7.90-7.87 (m, 1H), 7.76-7.70 (m, 2H), 7.58-7.52 (m, 1H), 7.44-7.39 (m, 2H), 6.41-6.36 (m, 1H), 5.82 (d, J=4.0 Hz, 1H).

Step B: (R,S)-3-(((4-Oxochroman-7-yl)oxy)(pyridin-4-yl)methyl)benzonitrile. ADDP (500 mg, 1.98 mmol) was added to a solution of 7-hydroxychroman-4-one (200 mg, 1.22 mmol), 3-(hydroxy(pyridin-4-yl)methyl)benzonitrile (310 mg, 1.48 mmol), n-Bu$_3$P (324 mg, 1.60 mmol), and toluene (6 mL). The mixture was stirred at 80° C. for 3 hours, cooled to room temperature, poured into water (10 mL), and extracted with ethyl acetate (10 mL×3). The combined organic extracts were dried over anhydrous Na$_2$SO$_4$, filtered and concentrated to dryness under reduced pressure to afford the product, which was purified by preparative HPLC using a Xtimate C18 150 mm×25 mm×5 μm column (eluent: 26% to 56% (v/v) CH$_3$CN and H$_2$O with 0.225% HCOOH) to afford the title compound (150 mg, 34%) as a white solid. MS (ESI): mass calcd. for C$_{22}$H$_{16}$N$_2$O$_3$ 356.12 m/z found 357.0 [M+H]$^+$. $^1$H NMR (400 MHz, DMSO-d$_6$) δ 8.62-8.54 (m, 2H), 8.07 (s, 1H), 7.90-7.86 (m, 1H), 7.83-7.79 (m, 1H), 7.72-7.67 (m, 1H), 7.65-7.59 (m, 1H), 7.57-7.52 (m, 2H), 6.87-6.84 (m, 1H), 6.83-6.79 (m, 1H), 6.65-6.61 (m, 1H), 4.48 (t, J=6.5 Hz, 2H), 2.69 (t, J=6.3 Hz, 2H).

Intermediate 8:
(R,S)-4-(Hydroxy(pyridin-4-yl)methyl)benzonitrile

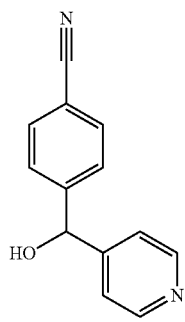

i-PrMgCl·LiCl (15.0 mL, 1.3 M in THF, 19.5 mmol) was added dropwise to a solution of 4-iodobenzonitrile (2.2 g, 9.6 mmol) and THF (5 mL) that had been cooled to −15° C. The mixture was stirred at −15° C. for 1.5 hours and then added dropwise to a −15° C. solution of isonicotinaldehyde (1.0 g, 9.3 mmol) and THF (5 mL). The mixture was stirred at −15° C. for 1 hour and then stirred for another 12 hours with gradual warming to room temperature before quenching with saturated NH₄Cl (30 mL) and extracting with ethyl acetate (100 mL×3). The combined organic extracts were dried over anhydrous Na₂SO₄, filtered, and concentrated to dryness under reduced pressure to afford the product, which was purified by FCC (eluent: petroleum ether:ethyl acetate, 1:1 to 0:1, gradient elution) to give the title compound (1.47 g, 75%) as a light yellow solid. MS (ESI): mass calcd. for C₁₃H₁₀N₂O 210.08 m/z, found 211.1 [M+H]⁺. ¹H NMR (400 MHz, DMSO-d₆) δ 8.50 (d, J=5.7 Hz, 2H), 7.80 (d, J=8.2 Hz, 2H), 7.61 (d, J=8.2 Hz, 2H), 7.40 (d, J=5.7 Hz, 2H), 6.42 (d, J=4.0 Hz, 1H), 5.83 (d, J=4.0 Hz, 1H).

A sample of (R,S)-4-(hydroxy(pyridin-4-yl)methyl)benzonitrile (2.0 g, 9.5 mmol) was separated by SFC (Chiralpak IC, 250 mm×50 mm, 10 μm, 40% (v/v) 0.1% NH₃:IPA) to yield intermediate 8a (first enantiomer to elute, labelled *R), MS (ESI): mass calcd. for C₁₃H₁₀N₂O 210.08 m/z, found 210.9 [M+H]⁺ and intermediate 8b (second enantiomer to elute, labelled *S), MS (ESI): mass calcd. for C₁₃H₁₀N₂O 210.08 m/z, found 208.9 [M–H]⁻.

Intermediate 9:
(R,S)-(4-Methoxyphenyl)(pyridin-4-yl)methanol

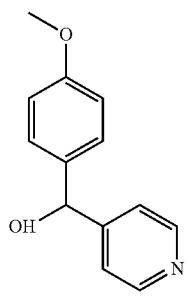 [SMILES: COc1ccc(C(O)c2ccncc2)cc1]

(4-Methoxyphenyl)magnesium bromide (20 mL, 1 M in THF, 20 mmol) was added dropwise to a 100 mL three-necked round-bottomed flask containing a solution of isonicotinaldehyde (2.1 g, 20 mmol) and THF (20 mL) that had been cooled to 0° C. The mixture was stirred for 16 hours with gradually warming to room temperature before pouring it into saturated NH₄Cl (50 mL) and extracting with ethyl acetate (50 mL×3). The combined organic extracts were washed with brine (50 mL), dried over anhydrous Na₂SO₄, filtered, and concentrated to dryness under reduced pressure to give the product, which was purified by FCC (eluent: petroleum ether:ethyl acetate, 1:0 to 1:9, gradient elution) to afford the title compound (2.6 g) as a white solid, which was used in the next step without further purification. MS (ESI): mass calcd. for C₁₃H₁₃NO₂ 215.09 m/z found 215.9 [M+H]⁺.

Intermediate 10:
(R,S)-(3-Methoxyphenyl)(pyridin-4-yl)methanol

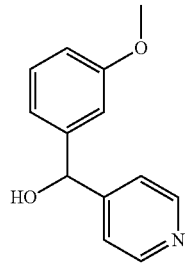 [SMILES: COc1cccc(C(O)c2ccncc2)c1]

A solution of isonicotinaldehyde (2.0 g, 19 mmol) and THF (15 mL) was added dropwise to a 100 mL three-necked round bottom flask containing a solution of (3-methoxyphenyl)magnesium bromide (20 mL, 1 M in THF, 20 mmol) that had been cooled to –78° C. The mixture was stirred at –78° C. for 1 hour and then stirred for 12 hours with gradual warming to room temperature before quenching with saturated NH₄Cl (20 mL). The suspension was filtered and the filtrate concentrated to dryness under reduced pressure. The residue was dissolved in dichloromethane (50 mL) and the mixture was washed with H₂O (25 mL×2). The organic layer was dried over anhydrous Na₂SO₄, filtered, and concentrated to dryness under reduced pressure to give the product, which was purified by FCC (eluent:petroleum ether:ethyl acetate, 1:1 to 0:1, gradient elution) to give the title compound (1.0 g) as a light yellow solid, which was used in the next step without further purification. ¹H NMR (400 MHz, CDCl₃) δ 8.53-8.48 (m, 2H), 7.31 (d, J=5.6 Hz, 2H), 7.29-7.25 (m, 1H), 6.94-6.87 (m, 2H), 6.85-6.81 (m, 1H), 5.76 (s, 1H), 3.78 (s, 3H).

Intermediate 11:
(R,S)-(2-Methoxyphenyl)(pyridin-4-yl)methanol

Isonicotinaldehyde (8.0 g, 75 mmol) was added dropwise to a solution of (2-methoxyphenyl)magnesium bromide (80 mL, 1M in THF, 80 mmol) and THF (80 mL) that had been cooled to 0° C. The mixture was stirred at room temperature for 16 hours before pouring it into saturated NH₄Cl (50 mL) and extracting with ethyl acetate (100 mL×3). The combined organic extracts were dried over anhydrous Na₂SO₄, filtered, and concentrated to dryness under reduced pressure to give the product, which was purified by FCC (eluent:petroleum ether:ethyl acetate, 10:1 to 0:1, gradient elution) to afford the title compound (2 g, 12%) as a white solid. MS (ESI): mass calcd. for $C_{13}H_{13}NO_2$ 215.09 m/z, found 215.9 $[M+H]^+$.

Intermediate 12: (R,S)-4-((2-Methylpyridin-4-yl)((4-oxochroman-7-yl)oxy)methyl)benzonitrile

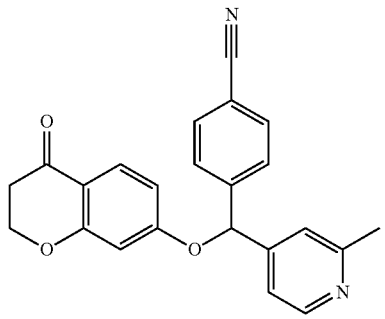 [SMILES: Cc1cc(C(Oc2ccc3c(c2)OCCC3=O)c2ccc(C#N)cc2)ccn1]

Step A. (R,S)-4-(Hydroxy(2-methylpyridin-4-yl)methyl) benzonitrile. i-PrMgCl·LiCl (13.5 mL, 1.3 M in THF, 17.6 mmol) was added dropwise to a solution of 4-iodobenzonitrile (2.0 g, 8.7 mmol) and THF (20 mL) that had been cooled to −15° C. The mixture was stirred at −15° C. for 1.5 hours and then added dropwise to a −15° C. solution of 2-methylisonicotinaldehyde (1.06 g, 8.75 mmol) and THF (10 mL). The mixture was stirred at −15° C. for another hour and then stirred for 12 hours with gradual warming to room temperature before quenching with saturated NH$_4$Cl (30 mL) and extracting with ethyl acetate (30 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 1:3, gradient elution) to afford the title compound (750 mg, 38%) as a yellow solid. MS (ESI): mass calcd. for $C_{14}H_{12}N_2O$ 224.09 m/z found 224.9 $[M+H]^+$. $^1$H NMR (400 MHz, DMSO-d$_6$) δ 8.33 (d, J=5.1 Hz, 1H), 7.80-7.74 (m, 2H), 7.57 (d, J=8.4 Hz, 2H), 7.24 (s, 1H), 7.17-7.14 (m, 1H), 6.33 (d, J=4.2 Hz, 1H), 5.75 (d, J=4.2 Hz, 1H), 2.40 (s, 3H).

Step B: (R,S)-4-((2-Methylpyridin-4-yl)((4-oxochroman-7-yl)oxy)methyl)benzonitrile. ADDP (1.07 g, 4.24 mmol) was added to a solution of 7-hydroxychroman-4-one (465 mg, 2.83 mmol), 4-(hydroxy(2-methylpyridin-4-yl)methyl) benzonitrile (700 mg, 3.12 mmol), n-Bu$_3$P (1.05 mL, 4.24 mmol), and toluene (8 mL). The mixture was stirred at 80° C. for 3 hours before pouring it into water (30 mL) and extracting with ethyl acetate (30 mL×3). The combined organic extracts were dried over anhydrous Na$_2$SO$_4$, filtered and concentrated to dryness under reduced pressure to give the product, which was purified by FCC (eluent:petroleum ether:ethyl acetate, 4:1 to 0:1, gradient elution) to afford the title compound (500 mg, 37%) as a brown solid. MS (ESI): mass calcd. for $C_{23}H_{18}N_2O_3$ 370.13 m/z found 370.9 $[M+H]^+$.

Intermediate 13: (R,S)-(4-(Benzyloxy)phenyl)(pyridin-4-yl)methanol

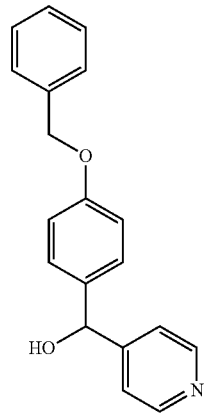 [SMILES: OC(c1ccncc1)c1ccc(OCc2ccccc2)cc1]

i-PrMgCl·LiCl (15 mL, 1.3 M in THF, 20 mmol) was added dropwise to a solution of 4-iodopyridine (2.0 g, 9.8 mmol) and THF (10 mL) that had been cooled to −15° C. The mixture was stirred at −15° C. for 1 hour before treating with a solution of 4-(benzyloxy)benzaldehyde (2.0 g, 9.4 mmol) and THF (5 mL) dropwise at −15° C. The mixture was stirred for 16 hours with gradual warming to room temperature before pouring it into saturated NH$_4$Cl (50 mL) and extracting with ethyl acetate (50 mL×3). The combined organic extracts were dried over anhydrous Na$_2$SO$_4$, filtered, and concentrated to dryness under reduced pressure to give the product, which was triturated with (petroleum ether: ethyl acetate, 10:1, 30 mL). The suspension was isolated via filtration and the filter cake washed with petroleum ether (20 mL) before drying under reduced pressure to afford the title compound (2 g, 69%) as a light yellow solid. MS (ESI): mass calcd. for $C_{19}H_{17}NO_2$ 291.13 m/z found 291.9 $[M+H]^+$.

Intermediate 14: (R,S)-(4-((4-Methoxybenzyl)oxy) phenyl)(pyridin-4-yl)methanol

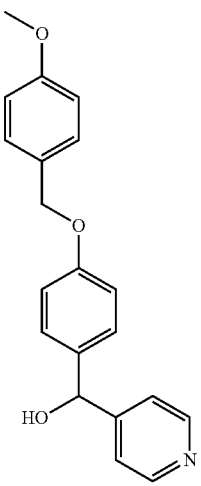 [SMILES: COc1ccc(COc2ccc(C(O)c3ccncc3)cc2)cc1]

Step A: 4-((4-Methoxybenzyl)oxy)benzaldehyde. 4-Hydroxybenzaldehyde (5.0 g, 41 mmol), 1-(chloromethyl)-4- methoxybenzene (7.2 mL, 53 mmol), $K_2CO_3$ (11.3 g, 82 mmol), and DMF (50 mL) were stirred at room temperature for 4 hours before pouring it into ice/water (500 mL). The suspension was isolated via filtration and the filter cake washed with water (50 mL) before drying under reduced pressure to afford the title compound (9 g, 91%) as a yellow solid. $^1$H NMR (400 MHz, DMSO-$d_6$) δ 9.83 (s, 1H), 7.86-7.80 (m, 2H), 7.39-7.34 (m, 2H), 7.18-7.13 (m, 2H), 6.95-6.90 (m, 2H), 5.11 (s, 2H), 3.72 (s, 3H).

Step B: (R,S)-(4-((4-Methoxybenzyl)oxy)phenyl)(pyridin-4-yl)methanol. i-PrMgCl·LiCl (15 mL, 1.3 M in THF, 20 mmol) was added dropwise to a solution of 4-iodopyridine (2.0 g, 9.8 mmol) and THF (10 mL) that had been cooled to −15° C. The mixture was stirred at −15° C. for 1 hour before treating with a solution of 4-((4-methoxybenzyl)oxy)benz-aldehyde (2.4 g, 9.9 mmol) and THF (10 mL) dropwise at −15° C. The mixture was stirred for 16 hours with gradual warming to room temperature before pouring it into saturated $NH_4Cl$ (30 mL) and extracting with ethyl acetate (30 mL×3). The combined organic extracts were dried over anhydrous $Na_2SO_4$, filtered and concentrated to dryness under reduced pressure to afford the product, which was triturated with petroleum ether:ethyl acetate (10:1, 30 mL). The suspension was isolated via filtration and the filter cake washed with petroleum ether (20 mL) before drying under reduced pressure to afford the title compound (1 g, 32%) as a yellow solid. MS (ESI): mass calcd. for $C_{20}H_{19}NO_3$ 321.14 m/z found 322.0 [M+H]$^+$. $^1$H NMR (400 MHz, DMSO-$d_6$) δ 8.46-8.43 (m, 2H), 7.36-7.21 (m, 6H), 6.93-6.86 (m, 4H), 5.99 (d, J=4.0 Hz, 1H), 5.63 (d, J=3.5 Hz, 1H), 4.95 (s, 2H), 3.72 (s, 3H).

Intermediate 15: (R,S)-4-(((4-Oxochroman-7-yl)oxy)(2-(trifluoromethyl)pyridin-4-yl)methyl)benzonitrile

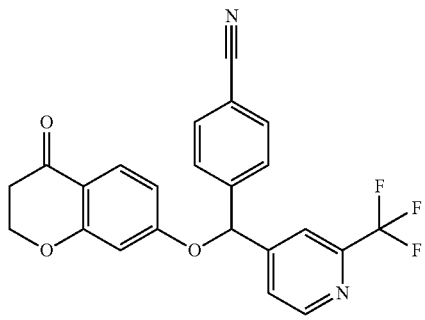 [SMILES: N#Cc1ccc(C(Oc2ccc3c(c2)OCCC3=O)c2ccnc(C(F)(F)F)c2)cc1]

Step A: (R,S)-4-(Hydroxy(2-(trifluoromethyl)pyridin-4-yl)methyl)benzonitrile. i-PrMgCl·LiCl (17.2 mL, 1.3 M in THF, 22.4 mmol) was added dropwise to a solution of 4-bromo-2-(trifluoromethyl)pyridine (4.20 g, 18.6 mmol) and THF (20 mL) that had been cooled to 0° C. The mixture was stirred at 0° C. for 1 hour before treating with a solution of 4-formylbenzonitrile (2.44 g, 18.6 mmol) and THF (20 mL) dropwise at 0° C. The mixture was stirred for 16 hours with gradual warming to room temperature before pouring it into saturated $NH_4Cl$ (100 mL) and extracting with ethyl acetate (80 mL×3). The combined organic extracts were dried over anhydrous $Na_2SO_4$, filtered, and concentrated to dryness under reduced pressure to give the product, which was purified by FCC (eluent:petroleum ether:ethyl acetate, 1:0 to 1:1, gradient elution) to afford the title compound (4 g, 77%) as a yellow solid. MS (ESI): mass calcd. for $C_{14}H_9F_3N_2O$ 278.07 m/z, found 278.9 [M+H]$^+$. $^1$H NMR (400 MHz, DMSO-$d_6$) δ 8.67 (d, J=5.1 Hz, 1H), 7.89 (s, 1H), 7.78 (d, J=8.2 Hz, 2H), 7.69 (d, J=5.1 Hz, 1H), 7.62 (d, J=8.2 Hz, 2H), 6.58 (d, J=4.2 Hz, 1H), 5.96 (d, J=4.0 Hz, 1H).

Step B: (R,S)-4-(((4-Oxochroman-7-yl)oxy)(2-(trifluoromethyl)pyridin-4-yl)methyl)benzonitrile. DEAD (1.59 g, 9.13 mmol) was added to a solution of 4-(hydroxy(2-(trifluoromethyl)pyridin-4-yl)methyl)benzonitrile (1.70 g, 6.11 mmol), 7-hydroxychroman-4-one (1.00 g, 6.09 mmol), PPh$_3$ (2.08 g, 7.93 mmol), and dichloromethane (50 mL). The mixture was stirred at room temperature under $N_2$ for 4 hours before concentrating to dryness under reduced pressure to give the product, which was purified by FCC (eluent:petroleum ether:ethyl acetate, 1:0 to 2:1, gradient elution) to afford the title compound (2.5 g, 84%) as a yellow solid. MS (ESI): mass calcd. for $C_{23}H_{15}F_3N_2O_3$ 424.10 m/z, found 425.0 [M+H]$^+$.

Intermediate 16: (R,S)-4-(((4-Oxochroman-7-yl)oxy)(3-(trifluoromethyl)pyridin-4-yl)methyl)benzonitrile

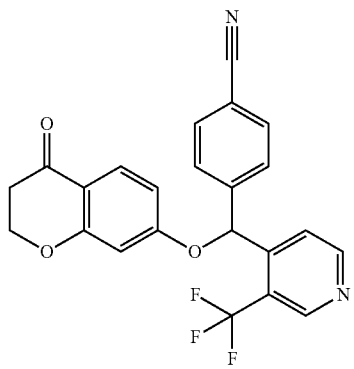 [SMILES: N#Cc1ccc(C(Oc2ccc3c(c2)OCCC3=O)c2ccncc2C(F)(F)F)cc1]

Step A: (R,S)-4-(Hydroxy(3-(trifluoromethyl)pyridin-4-yl)methyl)benzonitrile. i-PrMgCl·LiCl (5.9 mL, 1.3 M in THF, 7.7 mmol) was added dropwise to a solution of 4-iodobenzonitrile (1.77 g, 7.73 mmol) and THF (15 mL) that had been cooled to 0° C. The mixture was stirred at 0° C. for 1 hour before treating with a solution of 3-(trifluoromethyl)isonicotinaldehyde (900 mg, 5.14 mmol) and THF (5 mL) dropwise at 0° C. The mixture was stirred for 4 hours with gradual warming to room temperature before quenching with saturated $NH_4Cl$ (50 mL) and extracting with ethyl acetate (50 mL×3). The combined organic extracts were dried over anhydrous $Na_2SO_4$, filtered, and concentrated to dryness under reduced pressure to give the product, which was purified by FCC (eluent:petroleum ether:ethyl acetate, 1:0 to 2:1, gradient elution) to afford the title compound (1.1 g, 77%) as a white solid. $^1$H NMR (400 MHz, DMSO-$d_6$) δ 8.92 (s, 1H), 8.89 (d, J=5.1 Hz, 1H), 7.84-7.79 (m, 2H), 7.74 (d, J=5.3 Hz, 1H), 7.47 (d, J=8.4 Hz, 2H), 6.74 (d, J=4.6 Hz, 1H), 6.05 (d, J=4.6 Hz, 1H).

Step B: (R,S)-4-(((4-Oxochroman-7-yl)oxy)(3-(trifluoromethyl)pyridin-4-yl)methyl)benzonitrile. DEAD (939 mg, 5.39 mmol) was added to a solution of 7-hydroxychroman-4-one (590 mg, 3.59 mmol), 4-(hydroxy(3-(trifluoromethyl)pyridin-4-yl)methyl)benzonitrile (1.0 g, 3.6 mmol), PPh$_3$ (1.23 g, 4.69 mmol), and dichloromethane (15 mL). The mixture was stirred at room temperature for 14 hours. The reaction mixture was concentrated to dryness under reduced pressure to give the product, which was purified by FCC (eluent:petroleum ether:ethyl acetate, 1:0 to 2:1, gradient elution) to afford the title compound (1.1 g, 70%) as a yellow solid. MS (ESI): mass calcd. for $C_{23}H_{15}F_3N_2O_3$ 424.10 m/z found 425.0 $[M+H]^+$.

Intermediate 17: (R,S)-4-((3-Fluoropyridin-4-yl)((4-oxochroman-7-yl)oxy)methyl)benzonitrile

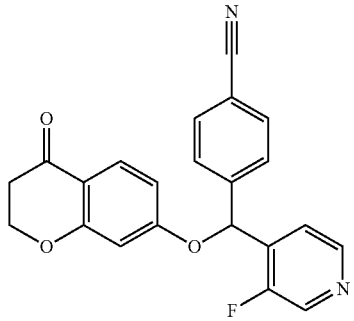 [SMILES: N#Cc1ccc(C(Oc2ccc3c(c2)OCCC3=O)c2ccncc2F)cc1]

Step A: (R,S)-4-((3-Fluoropyridin-4-yl)(hydroxy)methyl)benzonitrile. i-PrMgCl·LiCl (15 mL, 1.3 M in THF, 20 mmol) was added dropwise to a solution of 4-iodobenzonitrile (2.5 g, 11 mmol) and THF (15 mL) that had been cooled to −15° C. The mixture was stirred at −15° C. for 1.5 hours before treating with a solution of 3-fluoroisonicotinaldehyde (1.23 g, 9.83 mmol) and THF (15 mL) dropwise at −15° C. The mixture was stirred for 16 hours with gradual warming to room temperature before quenching with saturated $NH_4Cl$ (100 mL) and extracting with ethyl acetate (50 mL×3). The combined organic extracts were dried over anhydrous $Na_2SO_4$, filtered, and concentrated to dryness under reduced pressure to give the product, which was purified by FCC (eluent:petroleum ether:ethyl acetate, 1:0 to 0:1, gradient elution) to afford the title compound (900 mg, 38%) as a yellow solid. MS (ESI): mass calcd. for $C_{13}H_9FN_2O$ 228.07 m/z found 229.0 $[M+H]^+$.

Step B: (R,S)-4-((3-Fluoropyridin-4-yl)((4-oxochroman-7-yl)oxy)methyl)benzonitrile. DIAD (532 mg, 2.63 mmol) was added to a solution of 7-hydroxychroman-4-one (316 mg, 1.93 mmol), 4-((3-fluoropyridin-4-yl)(hydroxy)methyl)benzonitrile (400 mg, 1.75 mmol), $PPh_3$ (598 mg, 2.28 mmol), and dichloromethane (15 mL) that had been cooled to 0° C. The mixture was stirred for 14 hours with gradual warming to room temperature before pouring it into $H_2O$ (50 mL) and extracting with dichloromethane (30 mL×3). The combined organic extracts were dried over anhydrous $Na_2SO_4$, filtered, and concentrated to dryness under reduced pressure to afford the product, which was purified by FCC (eluent:petroleum ether:ethyl acetate, 10:1 to 1:1, gradient elution) to afford the title compound (640 mg) as a yellow oil, which was used in the next step without further purification. MS (ESI): mass calcd. for $C_{22}H_{15}FN_2O_3$ 374.11 m/z found 375.1 $[M+H]^+$.

Intermediate 18: (R,S)-4-((3-Methylpyridin-4-yl)((4-oxochroman-7-yl)oxy)methyl)benzonitrile

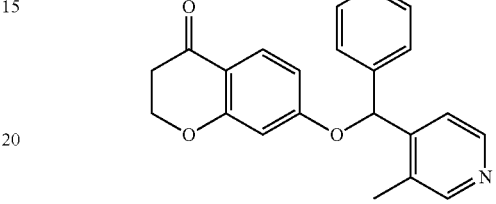

Step A: (R,S)-4-(Hydroxy(3-methylpyridin-4-yl)methyl)benzonitrile. i-PrMgCl·LiCl (11.5 mL, 1.3 M in THF, 15.0 mmol) was added dropwise to a solution of 4-iodobenzonitrile (2.0 g, 8.7 mmol) and THF (20 mL) that had been cooled to −15° C. The mixture was stirred at −15° C. for 1.5 hour before treating with a solution of 3-methylisonicotinaldehyde (900 mg, 7.43 mmol) and THF (10 mL) dropwise at −15° C. The mixture was stirred for 16 hours with gradual warming to room temperature before quenching with saturated $NH_4Cl$ (80 mL) and extracting with ethyl acetate (50 mL×3). The combined organic extracts were dried over anhydrous $Na_2SO_4$, filtered, and concentrated to dryness under reduced pressure to give the product, which was purified by FCC (eluent:petroleum ether:ethyl acetate, 1:0 to 1:2, gradient elution) to afford the title compound (850 mg, 51%) as a yellow solid. MS (ESI): mass calcd. for $C_{14}H_{12}N_2O$ 224.09 m/z found 225.1 $[M+H]^+$.

Step B: (R,S)-4-((3-Methylpyridin-4-yl)((4-oxochroman-7-yl)oxy)methyl)benzonitrile. DIAD (1.1 g, 5.4 mmol) was added to a solution of 7-hydroxychroman-4-one (622 mg, 3.79 mmol), 4-(hydroxy(3-methylpyridin-4-yl)methyl)benzonitrile (850 mg, 3.79 mmol), $PPh_3$ (1.3 g, 5.0 mmol), and dichloromethane (15 mL) that had been cooled to 0° C. The mixture was stirred for 14 hours with gradual warming to room temperature before pouring it into $H_2O$ (60 mL) and extracting with dichloromethane (30 mL×3). The combined organic extracts were dried over anhydrous $Na_2SO_4$, filtered, and concentrated to dryness under reduced pressure to give the product, which was purified by FCC (eluent:petroleum ether:ethyl acetate, 10:1 to 1:2, gradient elution) to afford the title compound (1.6 g) as a yellow oil, which was used in the next step without further purification. MS (ESI): mass calcd. for $C_{23}H_{18}N_2O_3$ 370.13 m/z found 370.9 $[M+H]^+$.

Intermediate 19: (R,S)-4-(((4-Oxochroman-7-yl)oxy)(quinolin-4-yl)methyl)benzonitrile

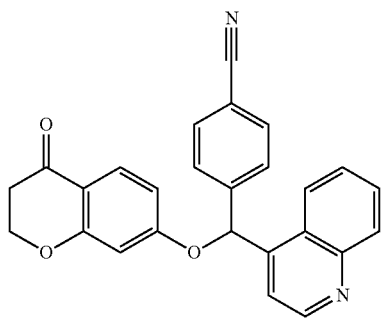 [SMILES: N#Cc1ccc(C(Oc2ccc3c(c2)OCCC3=O)c2ccnc3ccccc23)cc1]

Step A: (R,S)-4-(Hydroxy(quinolin-4-yl)methyl)benzonitrile. i-PrMgCl·LiCl (20 mL, 1.3 M in THF, 26 mmol) was added dropwise to a solution of 4-iodobenzonitrile (3.0 g, 13 mmol) and THF (20 mL) that had been cooled to −15° C. The mixture was stirred at −15° C. for 1.5 hours before treating with a solution of quinoline-4-carbaldehyde (2.27 g, 14.4 mmol) and THF (10 mL) dropwise at −15° C. The mixture was stirred for 16 hours with gradual warming to room temperature before quenching with saturated NH$_4$Cl (60 mL) and extracting with ethyl acetate (50 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 0:1, gradient elution) to afford the title compound (1.2 g, 35%) as a yellow oil. MS (ESI): mass calcd. for C$_{17}$H$_{12}$N$_2$O 260.09 m/z found 260.9 [M+H]$^+$.

Step B: (R,S)-4-(((4-Oxochroman-7-yl)oxy)(3-(trifluoromethyl)pyridin-4-yl)methyl)benzonitrile. ADDP (1.16 g, 4.60 mmol) was added to a solution of 7-hydroxychroman-4-one (605 mg, 3.69 mmol), 4-(hydroxy(quinolin-4-yl)methyl)benzonitrile (800 mg, 3.07 mmol), n-Bu$_3$P (933 mg, 4.61 mmol), and toluene (15 mL). The mixture was stirred at 80° C. for 2.5 hours before cooling to room temperature, pouring it into H$_2$O (60 mL), and extracting with ethyl acetate (50 mL×3). The combined organic layers were dried over anhydrous Na$_2$SO$_4$, filtered, and concentrated to dryness under reduced pressure to give the product, which was purified by FCC (eluent:petroleum ether:ethyl acetate, 1:0 to 1:1, gradient elution) to afford the title compound (500 mg, 40%) as a white solid. MS (ESI): mass calcd. for C$_{26}$H$_{18}$N$_2$O$_3$ 406.13 m/z found 407.0 [M+H]$^+$.

Intermediate 20: (R,S)-4-((3-Methoxypyridin-4-yl)((4-oxochroman-7-yl)oxy)methyl)benzonitrile

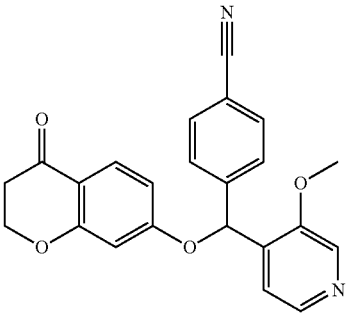 [SMILES: COc1cnccc1C(Oc1ccc2c(c1)OCCC2=O)c1ccc(C#N)cc1]

Step A: (R,S)-4-(Hydroxy(3-methoxypyridin-4-yl)methyl)benzonitrile. i-PrMgCl·LiCl (11 mL, 1.3 M in THF, 14 mmol) was added dropwise to a solution of 4-iodobenzonitrile (1.7 g, 7.4 mmol) and THF (15 mL) that had been cooled to −15° C. The mixture was stirred at −15° C. for 1.5 hours before treating with a solution of 3-methoxyisonicotinaldehyde (1.0 g, 7.3 mmol) and THF (10 mL) dropwise at −15° C. The mixture was stirred for 16 hours with gradual warming to room temperature before quenching with saturated NH$_4$Cl (60 mL) and extracting with ethyl acetate (50 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 0:1, gradient elution) to afford the title compound (850 mg, 48%) as a yellow oil. MS (ESI): mass calcd. for C$_{14}$H$_{12}$N$_2$O$_2$ 240.09 m/z found 240.9 [M+H]$^+$.

Step B: (R,S)-4-((3-Methoxypyridin-4-yl)((4-oxochroman-7-yl)oxy)methyl)benzonitrile. DIAD (757 mg, 3.74 mmol) was added to a solution of 7-hydroxychroman-4-one (410 mg, 2.50 mmol), 4-(hydroxy(3-methoxypyridin-4-yl)methyl)benzonitrile (600 mg, 2.50 mmol), PPh$_3$ (852 mg, 3.25 mmol), and dichloromethane (10 mL) that had been cooled to 0° C. The mixture was stirred at room temperature for 16 hours before pouring it into H$_2$O (30 mL) and extracting with dichloromethane (20 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 10:1 to 1:1, gradient elution) to afford the title compound (850 mg) as a yellow oil. MS (ESI): mass calcd. for C$_{23}$H$_{18}$N$_2$O$_4$ 386.13 m/z found 387.0 [M+H]$^+$.

Intermediate 21: (R,S)-4-((2-Methoxypyridin-4-yl)((4-oxochroman-7-yl)oxy)methyl)benzonitrile Intermediate 22: (R,S)-4-((3-Bromopyridin-4-yl)((4-oxochroman-7-yl)oxy)methyl)benzamide

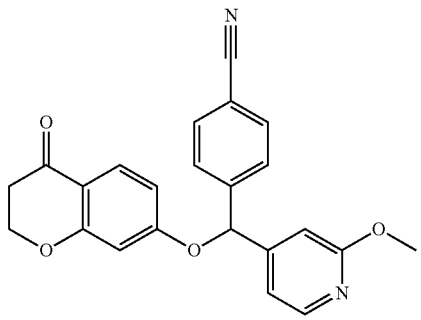 [SMILES: COc1cc(C(Oc2ccc3c(c2)OCCC3=O)c2ccc(C#N)cc2)ccn1]

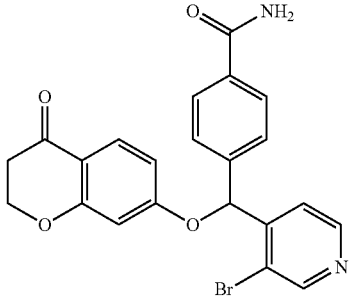 [SMILES: NC(=O)c1ccc(C(Oc2ccc3c(c2)OCCC3=O)c2ccncc2Br)cc1]

Step A: (R,S)-4-((3-Bromopyridin-4-yl)(hydroxy)methyl)benzonitrile. i-PrMgCl·LiCl (9.1 mL, 1.3 M in THF, 12 mmol) was added dropwise to a solution of 4-iodobenzonitrile (2.71 g, 11.8 mmol) and THF (25 mL) that had been cooled to −15° C. The mixture was stirred at −15° C. for 1 hour and then added dropwise to a −15° C. solution of 3-bromoisonicotinaldehyde (2.0 g, 11 mmol) and THF (5 mL). The mixture was stirred at room temperature for 16 hours before quenching with saturated $NH_4Cl$ (50 mL) and extracting with ethyl acetate (50 mL×3). The combined organic extracts were dried over anhydrous $Na_2SO_4$, filtered, and concentrated to dryness under reduced pressure to give the product, which was purified by FCC (eluent: petroleum ether:ethyl acetate, 20:1 to 2:1, gradient elution) to give the title compound (1.8 g, 58%) as a brown solid. MS (ESI): mass calcd. for $C_{13}H_9BrN_2O$ 287.99 m/z found 290.9 $[M+H]^+$.

Step B: (R,S)-4-((3-Bromopyridin-4-yl)((4-oxochroman-7-yl)oxy)methyl)benzonitrile. DIAD (2.4 g, 12 mmol) was added to a solution of 7-hydroxychroman-4-one (1.2 g, 7.3 mmol), 4-((3-bromopyridin-4-yl)(hydroxy)methyl)benzonitrile (2.1 g, 7.3 mmol), $PPh_3$ (2.7 g, 10 mmol), and dichloromethane (20 mL). The mixture was stirred at room temperature for 16 hours before pouring it into $H_2O$ (30 mL) and extracting with dichloromethane (20 mL×3). The combined organic extracts were dried over anhydrous $Na_2SO_4$, filtered, and concentrated to dryness under reduced pressure to afford the product, which was purified by FCC (eluent:petroleum ether:ethyl acetate, 10:1 to 3:1, gradient elution) to afford the title compound (3.6 g) as a yellow oil. MS (ESI): mass calcd. for $C_{22}H_{15}BrN_2O_3$ 434.03 m/z found 436.9 $[M+H]^+$.

Step A. (R,S)-4-(Hydroxy(2-methoxypyridin-4-yl)methyl)benzonitrile. i-PrMgCl·LiCl complex (23 mL, 1.3 M in THF, 30 mmol) was added dropwise to a solution of 4-iodopyridine (3.35 g, 14.6 mmol) and THF (10 mL) under $N_2$ that had been cooled to −15° C. The mixture was stirred at −15° C. for 1 hour before treating with a solution of 2-methoxyisonicotinaldehyde (2.0 g, 15 mmol) and THF (5 mL) dropwise at −15° C. The mixture was stirred at −15° C. for another 1 hour and then stirred for 2 hours with gradual warming to room temperature before pouring it into saturated $NH_4Cl$ (30 mL) and extracting with ethyl acetate (60 mL×3). The combined organic extracts were dried over anhydrous $Na_2SO_4$, filtered, and concentrated to dryness under reduced pressure to give the product, which was purified by FCC (eluent:petroleum ether:ethyl acetate, 1:1 to 0:1, gradient elution) to afford the title compound (880 mg, 24%) as a white solid. MS (ESI): mass calcd. for $C_{14}H_{12}N_2O_2$ 240.09 m/z found 241.0 $[M+H]^+$.

Step B: (R,S)-4-((2-Methoxypyridin-4-yl)((4-oxochroman-7-yl)oxy)methyl)benzonitrile. DIAD (990 mg, 4.90 mmol) was added to a solution of 7-hydroxychroman-4-one (800 mg, 4.87 mmol), 4-(hydroxy(2-methoxypyridin-4-yl)methyl)benzonitrile (780 mg, 3.25 mmol), $PPh_3$ (1.1 g, 4.2 mmol), and dichloromethane (10 mL) that had been cooled to 0° C. The mixture was stirred at room temperature for 12 hours with gradual warming to room temperature before pouring it into $H_2O$ (15 mL) and extracting with dichloromethane (25 mL×3). The combined organic layers were dried over anhydrous $Na_2SO_4$, filtered, and concentrated to dryness under reduced pressure to give the product, which was purified by preparative HPLC using a Phenomenex Gemini 150 mm×25 mm×10 μm column (eluent: 50% to 80% (v/v) $CH_3CN$ and $H_2O$ with 0.05% $NH_3$) to afford the title compound (305 mg, 23%) as a white solid. MS (ESI): mass calcd. for $C_{23}H_{18}N_2O_4$ 386.13 m/z found 387.0 $[M+H]^+$.

Step C: (R,S)-4-((3-Bromopyridin-4-yl)((4-oxochroman-7-yl)oxy)methyl)benzamide. $H_2O_2$ (2.4 mL, 30% purity, 24 mmol) was added dropwise to a solution of 4-((3-bromopyridin-4-yl)((4-oxochroman-7-yl)oxy)methyl)benzonitrile (3.5 g), $K_2CO_3$ (3.3 g, 24 mmol), and DMSO (10 mL). The mixture was stirred at room temperature for 1 hour before quenching with saturated $Na_2SO_3$ (30 mL) and extracting with ethyl acetate (30 mL×3). The combined organic extracts were dried over anhydrous $Na_2SO_4$, filtered, and concentrated to dryness under reduced pressure to afford the title product, which was purified by FCC (eluent:petroleum ether:ethyl acetate, 20:1 to 0:1, gradient elution) to give the title compound (2.0 g) as a white solid. MS (ESI): mass calcd. for $C_{22}H_{17}BrN_2O_4$ 452.04 m/z found 454.9 $[M+H]^+$.

Intermediate 23: (R,S)-4-(((4-Oxochroman-7-yl)oxy)(2-phenylpyridin-4-yl)methyl)benzonitrile

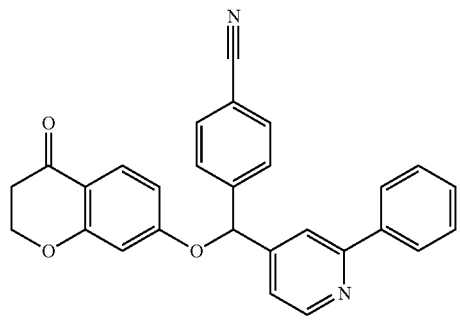 [SMILES: N#Cc1ccc(C(Oc2ccc3c(c2)OCCC3=O)c2ccnc(-c3ccccc3)c2)cc1]

Step A: (R,S)-4-((2-Chloropyridin-4-yl)(hydroxy)methyl)benzonitrile. i-PrMgCl·LiCl (5.5 mL, 1.3 M in THF, 7.2 mmol) was added dropwise to a −15° C. solution of 4-iodobenzonitrile (1.8 g, 7.9 mmol) and anhydrous THE (15 mL). The mixture was stirred at −15° C. for 1.5 hours before treating with a solution of 2-chloroisonicotinaldehyde (1 g, 7 mmol) and anhydrous THE (5 mL) dropwise. The mixture was stirred at room temperature for 16 hours before quenching with saturated $NH_4Cl$ (30 mL) and extracting with ethyl acetate (50 mL×3). The combined organic extracts were dried over anhydrous $Na_2SO_4$, filtered, and concentrated to dryness under reduced pressure to afford the product, which was purified by FCC (eluent: petroleum ether:ethyl acetate, 10:1 to 0:1, gradient elution) to give the title compound (800 mg, 46%) as a white solid. MS (ESI): mass calcd. for $C_{13}H_9ClN_2O$ 244.04 m/z, found 244.9 $[M+H]^+$.

Step B: (R,S)-4-((2-Chloropyridin-4-yl)((4-oxochroman-7-yl)oxy)methyl)benzonitrile. DIAD (868 mg, 4.29 mmol) was added to a solution of 7-hydroxychroman-4-one (470 mg, 2.86 mmol), 4-((2-chloropyridin-4-yl)(hydroxy)methyl)benzonitrile (701 mg, 2.87 mmol), $PPh_3$ (976 mg, 3.72 mmol), and anhydrous dichloromethane (10 mL). The mixture was stirred at room temperature for 16 hours before pouring it into $H_2O$ (20 mL) and extracting with dichloromethane (50 mL×3). The combined organic extracts were dried over anhydrous $Na_2SO_4$, filtered, and concentrated to dryness under reduced pressure to give the product, which was purified by FCC (eluent:petroleum ether:ethyl acetate, 10:1 to 3:1, gradient elution) to give the title compound (1.2 g, 92%) as a yellow oil. MS (ESI): mass calcd. for $C_{22}H_{15}ClN_2O_3$ 390.08 m/z, found 390.9 $[M+H]^+$.

Step C: (R,S)-4-(((4-Oxochroman-7-yl)oxy)(2-phenylpyridin-4-yl)methyl)benzonitrile. 4-((2-Chloropyridin-4-yl)((4-oxochroman-7-yl)oxy)methyl)benzonitrile (1.0 g, 2.6 mmol), phenylboronic acid (624 mg, 5.12 mmol), and $K_3PO_4$ (1.6 g, 7.5 mmol) were dissolved in 1,4-dioxane (10 mL) and $H_2O$ (2 mL). The mixture was sparged with Ar for 5 minutes and then treated with $Pd(dtbpf)Cl_2$ (167 mg, 0.256 mmol). The mixture was sparged with Ar for another 5 minutes and then stirred while heating at 100° C. via microwave irradiation for 1 hour before cooling to room temperature, quenching with water (20 mL), and extracting with ethyl acetate (50 mL×3). The combined organic extracts were dried over anhydrous $Na_2SO_4$, filtered, and concentrated to dryness under reduced pressure to give the product, which was purified by FCC (eluent:petroleum ether:ethyl acetate, 10:1 to 0:1, gradient elution) to afford the title compound (1.2 g, 87%) as a yellow oil. MS (ESI): mass calcd. for $C_{28}H_{20}N_2O_3$ 432.15 m/z, found 433.0 $[M+H]^+$.

Intermediate 24: (R,S)-4-((3-Aminopyridin-4-yl)((4-oxochroman-7-yl)oxy)methyl)benzonitrile

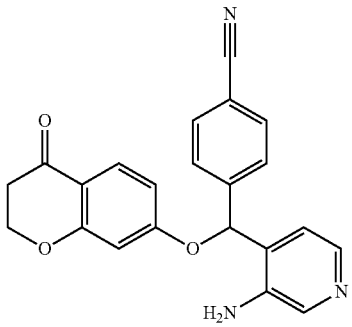 [SMILES: N#Cc1ccc(C(Oc2ccc3c(c2)OCCC3=O)c2ccncc2N)cc1]

Step A. (R,S)-4-((3-Bromopyridin-4-yl)(hydroxy)methyl)benzonitrile. i-PrMgCl·LiCl (13.6 mL, 1.3 M in THF, 17.7 mmol) was added dropwise to a solution of 4-iodobenzonitrile (4.1 g, 18 mmol) and THE (25 mL) that had been cooled to −15° C. The mixture was stirred at −15° C. for 1 hour and then added dropwise to a −15° C. solution of 3-bromoisonicotinaldehyde (3.0 g, 16 mmol) and THE (5 mL). The mixture was stirred at room temperature for 16 hours before quenching with saturated $NH_4Cl$ (80 mL) and extracting with ethyl acetate (60 mL×3). The combined organic extracts were dried over anhydrous $Na_2SO_4$, filtered, and concentrated to dryness under reduced pressure to afford the product, which was purified by FCC (eluent: petroleum ether:ethyl acetate, 20:1 to 2:1, gradient elution) to give the title compound (2.3 g, 49%) as a brown solid. MS (ESI): mass calcd. for $C_{13}H_9BrN_2O$ 287.99 m/z found 288.9 $[M+H]^+$.

Step B: (R,S)-4-((3-Bromopyridin-4-yl)((4-oxochroman-7-yl)oxy)methyl)benzonitrile. DIAD (2.56 g, 12.7 mmol) was added to a solution of 7-hydroxychroman-4-one (1.3 g, 7.9 mmol), 4-((3-bromopyridin-4-yl)(hydroxy)methyl)benzonitrile (2.29 g, 7.92 mmol), $PPh_3$ (2.91 g, 11.1 mmol), and dichloromethane (20 mL). The mixture was stirred at room temperature for 16 hours before pouring it into $H_2O$ (50 mL) and extracting with dichloromethane (30 mL×3). The combined organic extracts were dried over anhydrous $Na_2SO_4$, filtered, and concentrated to dryness under reduced pressure to afford the product, which was purified by FCC (eluent: petroleum ether:ethyl acetate, 10:1 to 3:1, gradient elution) to afford the title compound (3.2 g) as a yellow oil, which was used in the next step without further purification.

Step C: (R,S)-4-((3-((Diphenylmethylene)amino)pyridin-4-yl)((4-oxochroman-7-yl)oxy)methyl)benzonitrile. 4-((3-Bromopyridin-4-yl)((4-oxochroman-7-yl)oxy)methyl)benzonitrile (2.8 g), diphenylmethanimine (1.75 g, 9.66 mmol), $Cs_2CO_3$ (4.19 g, 12.9 mmol), XantPhos (372 mg, 0.643 mmol), and 1,4-dioxane (30 mL) were added to a 100 mL round-bottomed flask. The mixture was sparged with Ar for 5 minutes and then treated with $Pd_2(dba)_3$ (589 mg, 0.643 mmol). The mixture was stirred while heating at 110° C. for 16 hours before cooling to room temperature, quenching with $H_2O$ (60 mL), and extracting with ethyl acetate (50 mL×2). The combined organic extracts were dried over $Na_2SO_4$, filtered and concentrated to dryness under reduced pressure to afford the product (4.5 g) as a brown solid, which was used in the next step without further purification.

Step D: (R,S)-4-((3-Aminopyridin-4-yl)((4-oxochroman-7-yl)oxy)methyl)benzonitrile. 4-((3-((Diphenylmethylene)amino)pyridin-4-yl)((4-oxochroman-7-yl)oxy)methyl)benzonitrile (2.2 g), 3 N HCl (15 mL), and THF (15 mL) were added to a 50 mL round-bottomed flask. The mixture was stirred at room temperature for 2 hours before diluting with H$_2$O (30 mL) and extracting with ethyl acetate (30 mL×2). The pH of the aqueous layer was adjusted to pH 7-8 with 1 N NaOH and then extracted with ethyl acetate (30 mL×3). The combined organic extracts were dried over anhydrous Na$_2$SO$_4$, filtered, and concentrated to dryness under reduced pressure to afford the title compound (150 mg) as a brown solid, which was used in the next step without further purification.

Intermediate 25: (R,S)-4-((2-Aminopyridin-4-yl)((4-oxochroman-7-yl)oxy)methyl)benzonitrile

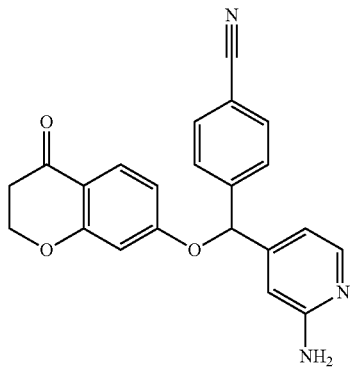 [SMILES: N#Cc1ccc(C(Oc2ccc3c(c2)OCCC3=O)c2ccnc(N)c2)cc1]

Step A. (R,S)-4-((2-Bromopyridin-4-yl)(hydroxy)methyl)benzonitrile. i-PrMgCl·LiCl (18.6 mL, 1.3 M in THF, 24.2 mmol) was added dropwise to a solution of 4-iodobenzonitrile (5.5 g, 24 mmol) and THF (50 mL) that had been cooled to −15° C. The mixture was stirred at −15° C. for 1.5 hours before treating with a solution of 2-bromoisonicotinaldehyde (3.0 g, 16 mmol) and THF (15 mL) dropwise at −15° C. The mixture was stirred for 16 hours with gradual warming to room temperature before quenching with saturated NH$_4$Cl (80 mL) and extracting with ethyl acetate (60 mL×3). The combined organic extracts were dried over anhydrous Na$_2$SO$_4$, filtered, and concentrated to dryness under reduced pressure to give the product, which was was triturated with ethyl acetate (20 mL). The filter cake was washed with ethyl acetate (5 mL×2) before drying under reduced pressure to afford the title compound (2.2 g, 45%) as a white solid. MS (ESI): mass calcd. for C$_{13}$H$_9$BrN$_2$O 287.99 m/z found 290.9 [M+H]$^+$.

Step B: (R,S)-4-((2-Bromopyridin-4-yl)((4-oxochroman-7-yl)oxy)methyl)benzonitrile. DIAD (2.31 g, 11.4 mmol) was added to a solution of 7-hydroxychroman-4-one (1.37 g, 8.35 mmol), 4-((2-bromopyridin-4-yl)(hydroxy)methyl)benzonitrile (2.2 g, 7.6 mmol), PPh$_3$ (2.59 g, 9.88 mmol), and dichloromethane (15 mL) that had been cooled to 0° C. The mixture was stirred for 14 hours with gradual warming to room temperature before pouring it into H$_2$O (50 mL) and extracting with dichloromethane (30 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 10:1 to 2:1, gradient elution) to give the title compound (1.8 g) as a yellow oil. MS (ESI): mass calcd. for C$_{22}$H$_{15}$BrN$_2$O$_3$ 434.03 m/z found 435.0 [M+H]$^+$.

Step C: (R,S)-4-((2-((Diphenylmethylene)amino)pyridin-4-yl)((4-oxochroman-7-yl)oxy)methyl)benzonitrile. 4-((2-Bromopyridin-4-yl)((4-oxochroman-7-yl)oxy)methyl)benzonitrile (500 mg), diphenylmethanimine (312 mg, 1.72 mmol), Cs$_2$CO$_3$ (749 mg, 2.30 mmol), XantPhos (100 mg, 0.173 mmol), and 1,4-dioxane (10 mL) were added to a 20 mL tube. The mixture was sparged with Ar for 5 minutes and then treated with Pd$_2$(dba)$_3$ (105 mg, 0.115 mmol). The mixture was stirred while heating at 110° C. via microwave irradiation for 1.5 hours before cooling to room temperature. The mixture was combined with another reaction carried out in the same manner, quenched with H$_2$O (60 mL), and extracted with ethyl acetate (40 mL×3). The combined organic extracts were dried over anhydrous Na$_2$SO$_4$, filtered, and concentrated to dryness under reduced pressure to give the product (3.5 g) as a brown solid, which was used in the next step without further purification. MS (ESI): mass calcd. for C$_{35}$H$_{25}$N$_3$O$_3$ 535.19 m/z found 536.1 [M+H]$^+$.

Step D: (R,S)-4-((2-Aminopyridin-4-yl)((4-oxochroman-7-yl)oxy)methyl)benzonitrile. 4-((2-((Diphenylmethylene)amino)pyridin-4-yl)((4-oxochroman-7-yl)oxy)methyl)benzonitrile (3.5 g), 3 N HCl (15 mL), and THF (20 mL) were added to a 100 mL round-bottomed flask. The mixture was stirred at room temperature for 2 hours before diluting with H$_2$O (50 mL) and extracting with ethyl acetate (40 mL×3). The pH of the aqueous layer was adjusted to pH 7-8 with 1 N NaOH and the mixture extracted with ethyl acetate (40 mL×3). The combined organic extracts were dried over anhydrous Na$_2$SO$_4$, filtered, and concentrated to dryness under reduced pressure to afford the product (310 mg) as a brown oil, which was used in the next step without further purification. MS (ESI): mass calcd. for C$_{22}$H$_{17}$N$_3$O$_3$ 371.13 m/z found 372.0 [M+H]$^+$.

Intermediate 26: (R,S)-4-(((4-Oxochroman-7-yl)oxy)(phenyl)methyl)benzonitrile

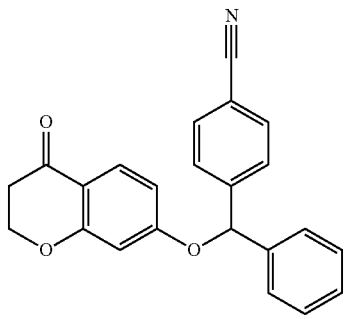 [SMILES: N#Cc1ccc(C(Oc2ccc3c(c2)OCCC3=O)c2ccccc2)cc1]

Step A: (R,S)-4-(Hydroxy(phenyl)methyl)benzonitrile. Phenylmagnesium bromide (5.6 mL, 3 M in Et$_2$O, 17 mmol) was added dropwise to a solution of 4-formylbenzonitrile (2.0 g, 15 mmol) and THF (15 mL) that had been cooled to 0° C. The mixture was stirred for 16 hours with gradual warming to room temperature before pouring it into saturated NH$_4$Cl (20 mL) and extracting with ethyl acetate (20 mL×3). The combined organic layers were dried over anhydrous Na$_2$SO$_4$, filtered, and concentrated to dryness under reduced pressure to give the product, which was purified by FCC (eluent:petroleum ether:ethyl acetate, 5:1 to 3:1, gradient elution) to afford the title compound (2.5 g, 67%) as a light yellow oil. MS (ESI): mass calcd. for $C_{14}H_{11}NO$ 209.08 m/z found 209.7 [M+H]$^+$. $^1$H NMR (400 MHz, DMSO-$d_6$) δ 7.77-7.72 (m, 2H), 7.58-7.53 (m, 2H), 7.37-7.17 (m, 5H), 6.13 (d, J=4.0 Hz, 1H), 5.77 (d, J=4.0 Hz, 1H).

Step B: (R,S)-4-(((4-Oxochroman-7-yl)oxy)(phenyl)methyl)benzonitrile. ADDP (1.6 g, 6.3 mmol) was added to a solution of 7-hydroxychroman-4-one (713 mg, 4.34 mmol), 4-(hydroxy(phenyl)methyl)benzonitrile (1.0 g, 4.8 mmol), n-Bu$_3$P (1.3 g, 6.4 mmol), and toluene (15 mL). The mixture was stirred at 80° C. for 3 hours before cooling to room temperature, pouring into water (30 mL), and extracting with ethyl acetate (30 mL×2). The combined organic extracts were dried over anhydrous Na$_2$SO$_4$, filtered, and concentrated to dryness under reduced pressure to afford the product, which was purified by preparative HPLC using a Gemini C18 150 mm×25 mm×10 μm column (eluent: 48% to 78% (v/v) CH$_3$CN and H$_2$O with 0.05% NH$_3$) to afford the title compound (800 mg, 50%) as a white solid. MS (ESI): mass calcd. for $C_{23}H_{17}NO_3$ 355.12 m/z found 356.0 [M+H]$^+$. $^1$H NMR (400 MHz, DMSO-$d_6$) δ 7.82 (d, J=8.4 Hz, 2H), 7.71-7.59 (m, 3H), 7.51-7.44 (m, 2H), 7.38-7.22 (m, 3H), 6.79 (s, 1H), 6.74 (dd, J=2.2, 8.8 Hz, 1H), 6.57 (d, J=2.2 Hz, 1H), 4.43 (t, J=6.4 Hz, 2H), 2.64 (t, J=6.4 Hz, 2H).

Intermediate 27: (R,S)-4-((4-Chlorophenyl)((4-oxochroman-7-yl)oxy)methyl)benzonitrile

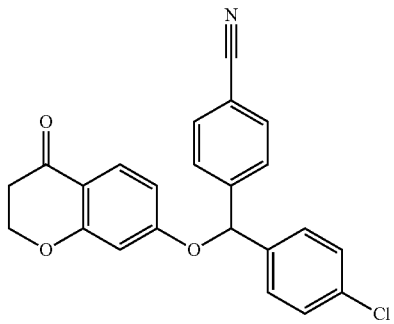 [SMILES: N#Cc1ccc(C(Oc2ccc3c(c2)OCCC3=O)c2ccc(Cl)cc2)cc1]

Step A: (R,S)-4-((4-Chlorophenyl)(hydroxy)methyl)benzonitrile. i-PrMgCl·LiCl (13 mL, 1.3 M in THF, 17 mmol) was added dropwise to a solution of 1-chloro-4-iodobenzene (2.0 g, 8.4 mmol) and THF (10 mL) that had been cooled to −15° C. The mixture was stirred at −15° C. for 1 hour before treating with a solution of 4-formylbenzonitrile (1.2 g, 9.2 mmol) and THF (5 mL) dropwise at −15° C. Then the mixture was stirred for 16 hours with gradual warming to room temperature before pouring it into saturated NH$_4$Cl (20 mL) and extracting with ethyl acetate (20 mL×3). The combined organic layers were dried over anhydrous Na$_2$SO$_4$, filtered, and concentrated to dryness under reduced pressure to give the product, which was purified by FCC (eluent:petroleum ether:ethyl acetate, 1:0 to 3:1, gradient elution) to afford the title compound (770 mg, 38%) as a light yellow oil. $^1$H NMR (400 MHz, DMSO-$d_6$) δ 7.78-7.73 (m, 2H), 7.58-7.52 (m, 2H), 7.40-7.32 (m, 4H), 6.22 (d, J=4.2 Hz, 1H), 5.79 (d, J=4.2 Hz, 1H).

Step B: (R,S)-4-((4-Chlorophenyl)((4-oxochroman-7-yl)oxy)methyl)benzonitrile. DIAD (0.8 mL, 4.1 mmol) was added to a solution of 7-hydroxychroman-4-one (404 mg, 2.46 mmol), 4-((4-chlorophenyl)(hydroxy)methyl)benzonitrile (600 mg, 2.46 mmol), PPh$_3$ (775 mg, 2.96 mmol), and dichloromethane (10 mL). The mixture was stirred at room temperature for 16 hours before concentrating under reduced pressure, pouring it into water:ethyl acetate (20 mL:20 mL), and extracting with ethyl acetate (20 mL×2). The combined organic extracts were dried over anhydrous Na$_2$SO$_4$, filtered, and concentrated to dryness under reduced pressure to afford the product, which was purified by preparative HPLC using a Gemini C18 150 mm×25 mm×10 m column (eluent: 50% to 80% (v/v) CH$_3$CN and H$_2$O with 0.05% NH$_3$) to afford the title compound (260 mg, 27%) as a white solid. MS (ESI): mass calcd. for $C_{23}H_{16}ClNO_3$ 389.08 m/z found 390.0 [M+H]$^+$.

Intermediate 28: (R,S)-4-(((4-Oxochroman-7-yl)oxy)(pyridin-3-yl)methyl)benzonitrile

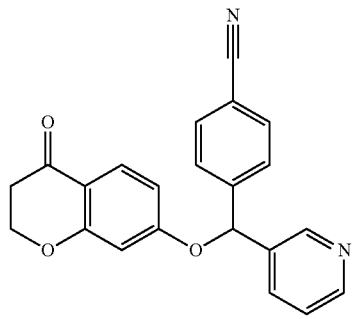 [SMILES: N#Cc1ccc(C(Oc2ccc3c(c2)OCCC3=O)c2cccnc2)cc1]

Step A: (R,S)-4-(Hydroxy(pyridin-3-yl)methyl)benzonitrile. i-PrMgCl·LiCl (13 mL, 1.3 M in THF, 17 mmol) was added dropwise to a solution of 4-iodobenzonitrile (2.0 g, 8.7 mmol) and THF (10 mL) that had been cooled to −15° C. The mixture was stirred at −15° C. for 1 hour before treating with a solution of nicotinaldehyde (1.1 g, 10 mmol) and THF (5 mL) dropwise at −15° C. The mixture was stirred for 16 hours with gradual warming to room temperature before pouring it into saturated NH$_4$Cl (20 mL) and extracting with ethyl acetate (20 mL×3). The combined organic extracts were dried over anhydrous Na$_2$SO$_4$, filtered, and concentrated to dryness under reduced pressure to give the product, which was purified by FCC (eluent: petroleum ether:ethyl acetate, 1:0 to 0:1, gradient elution) to afford the title compound (700 mg, 38%) as a yellow oil. MS (ESI): mass calcd. for $C_{13}H_{10}N_2O$ 210.08 m/z found 210.9 [M+H]$^+$. $^1$H NMR (400 MHz, DMSO-$d_6$) δ 8.63-8.61 (m, 1H), 8.47-8.43 (m, 1H), 7.83-7.78 (m, 2H), 7.76-7.71 (m, 1H), 7.62 (d, J=8.0 Hz, 2H), 7.37-7.32 (m, 1H), 6.34 (d, J=4.0 Hz, 1H), 5.89 (d, J=4.0 Hz, 1H).

Step B: (R,S)-4-(((4-Oxochroman-7-yl)oxy)(pyridin-3-yl)methyl)benzonitrile. ADDP (981 mg, 3.89 mmol) was added to a solution of 7-hydroxychroman-4-one (426 mg, 2.60 mmol), 4-(hydroxy(pyridin-3-yl)methyl)benzonitrile (600 mg, 2.85 mmol), n-Bu$_3$P (787 mg, 3.89 mmol) and toluene (10 mL). The mixture was stirred at 80° C. for 2 hours before cooling to room temperature, pouring it into water (30 mL), and extracting with ethyl acetate (30 mL×3). The combined organic extracts were dried over anhydrous Na$_2$SO$_4$, filtered and concentrated to dryness under reduced pressure to afford the product, which was purified by preparative HPLC using a Gemini C18 150 mm×25 mm×10 μm column (eluent: 35% to 65% (v/v) CH$_3$CN and H$_2$O with 0.05% NH$_3$) to afford the title compound (800 mg, 86%) as a light yellow oil. MS (ESI): mass calcd. for $C_{22}H_{16}N_2O_3$ 356.12 m/z found 357.2 [M+H]$^+$.

Intermediate 29: (R,S)-4-(((4-Oxochroman-7-yl)oxy)(pyridin-2-yl)methyl)benzonitrile

Intermediate 30: (R,S)-4-(((4-Oxochroman-7-yl)oxy)(pyrimidin-4-yl)methyl)benzonitrile

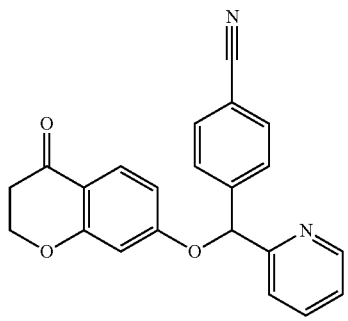 [SMILES: N#Cc1ccc(C(Oc2ccc3c(c2)OCCC3=O)c2ccccn2)cc1]

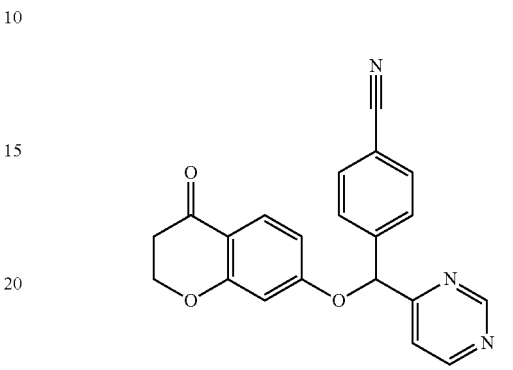

Step A: (R,S)-4-(Hydroxy(pyridin-2-yl)methyl)benzonitrile. i-PrMgCl·LiCl (13 mL, 1.3 M in THF, 17 mmol) was added dropwise to a solution of 4-iodobenzonitrile (2.0 g, 8.7 mmol) and THF (10 mL) that had been cooled to −15° C. The mixture was stirred at −15° C. for 1 hour before treating with a solution of picolinaldehyde (1.1 g, 10 mmol) and THF (10 mL) dropwise at −15° C. Then the mixture was stirred for 16 hours with gradual warming to room temperature before pouring it into saturated NH$_4$Cl (20 mL) and extracting with ethyl acetate (20 mL×3). The combined organic extracts were dried over anhydrous Na$_2$SO$_4$, filtered, and concentrated to dryness under reduced pressure to give the product, which was purified by FCC (eluent: petroleum ether:ethyl acetate, 1:0 to 3:1, gradient elution) to afford the title compound (600 mg, 33%) as a light yellow oil. MS (ESI): mass calcd. for C$_{13}$H$_{10}$N$_2$O 210.08 m/z found 193.1 [M−OH]$^+$. $^1$H NMR (400 MHz, DMSO-d$_6$) δ 8.58-8.54 (m, 1H), 7.93-7.83 (m, 3H), 7.73-7.66 (m, 3H), 7.37-7.32 (m, 1H), 6.47 (d, J=4.4 Hz, 1H), 5.90 (d, J=4.4 Hz, 1H).

Step B: (R,S)-4-(((4-Oxochroman-7-yl)oxy)(pyridin-2-yl)methyl)benzonitrile. DIAD (0.75 mL, 3.8 mmol) was added to a solution of 7-hydroxychroman-4-one (390 mg, 2.38 mmol), 4-(hydroxy(pyridin-2-yl)methyl)benzonitrile (500 mg, 2.38 mmol), PPh$_3$ (749 mg, 2.86 mmol), and dichloromethane (10 mL). The mixture was stirred at room temperature for 16 hour before concentrating to dryness under reduced pressure. The residue was diluted with water (20 mL) and ethyl acetate (20 mL). The mixture was extracted with ethyl acetate (20 mL×2). The combined organic extracts were dried over anhydrous Na$_2$SO$_4$, filtered, and concentrated to dryness under reduced pressure to give the product, which was purified by preparative HPLC using a Gemini C18 150 mm×25 mm×5 µm column (eluent: 40% to 70% (v/v) CH$_3$CN and H$_2$O with 0.05% NH$_3$) to afford the title compound (500 mg, 59%) as a light yellow solid. MS (ESI): mass calcd. for C$_{22}$H$_{16}$N$_2$O$_3$ 356.12 m/z found 357.0 [M+H]$^+$.

Step A: (R,S)-4-(Hydroxy(pyrimidin-4-yl)methyl)benzonitrile. i-PrMgCl·LiCl (7.2 mL, 1.3 M in THF, 9.4 mmol) was added dropwise to a solution of 4-iodobenzonitrile (1.06 g, 4.63 mmol) and THF (15 mL) that had been cooled to −10° C. The mixture was stirred at −10° C. for 1.5 hours and then added dropwise to a −10° C. solution of pyrimidine-4-carbaldehyde (500 mg, 4.63 mmol) and THF (5 mL). The mixture was stirred at −10° C. for another hour and then stirred for 12 hours with gradual warming to room temperature before quenching with saturated NH$_4$Cl (30 mL) and extracting with ethyl acetate (30 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:1 to 0:1, gradient elution) to afford the title compound (400 mg, 41%) as a light yellow solid. MS (ESI): mass calcd. for C$_{12}$H$_9$N$_3$O 211.07 m/z found 211.9 [M+H]$^+$. $^1$H NMR (400 MHz, MeOD) δ 9.02 (s, 1H), 8.74 (d, J=5.3 Hz, 1H), 7.76 (d, J=5.3 Hz, 1H), 7.70-7.63 (m, 5H), 5.81 (s, 1H).

Step B: (R,S)-4-(((4-Oxochroman-7-yl)oxy)(pyrimidin-4-yl)methyl)benzonitrile. ADDP (900 mg, 3.57 mmol) was added to a solution of 7-hydroxychroman-4-one (390 mg, 2.38 mmol), 4-(hydroxy(pyrimidin-4-yl)methyl)benzonitrile (550 mg, 2.60 mmol), n-Bu$_3$P (0.88 mL, 3.6 mmol), and toluene (10 mL). The mixture was stirred at 80° C. for 3 hours before cooling to room temperature, pouring it into water (30 mL), and extracting with ethyl acetate (30 mL×2). The organic extracts were dried over anhydrous Na$_2$SO$_4$, filtered, and concentrated to dryness under reduced pressure to give the product, which was purified by FCC (eluent: petroleum ether:ethyl acetate, 10:1 to 1:3, gradient elution) to afford the title compound (300 mg, 35%) as a brown oil. MS (ESI): mass calcd. for C$_{21}$H$_{15}$N$_3$O$_3$ 357.11 m/z found 358.0 [M+H]$^+$.

Intermediate 31: (R,S)-4-(Hydroxy(pyridin-4-yl)methyl)-N-methylbenzamide

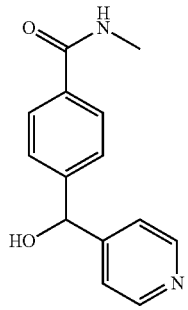 [SMILES: CNC(=O)c1ccc(C(O)c2ccncc2)cc1]

(R,S)-4-(Hydroxy(pyridin-4-yl)methyl)-N-methylbenzamide. HATU (2.5 g, 6.6 mmol) was added to a solution of 4-(hydroxy(pyridin-4-yl)methyl)benzoic acid (500 mg), methanamine (3.3 mL, 2 M in THF, 6.6 mmol), DIPEA (3.7 mL, 21 mmol), and DMF (10 mL). The mixture was stirred at room temperature for 16 hours before concentrating to dryness under reduced pressure to give the product, which was purified by preparative HPLC using a Gemini C18 150 mm×25 mm×5 μm column (eluent: 1% to 25% (v/v) $CH_3CN$ and $H_2O$ with 0.05% $NH_3$) to afford the title compound (160 mg) as a white solid. MS (ESI): mass calcd. for $C_{14}H_{14}N_2O_2$ 242.11 m/z found 243.1 $[M+H]^+$.

Intermediate 32: (R,S)-2-Methyl-4-(((4-oxochroman-7-yl)oxy)(pyridin-4-yl)methyl)benzonitrile

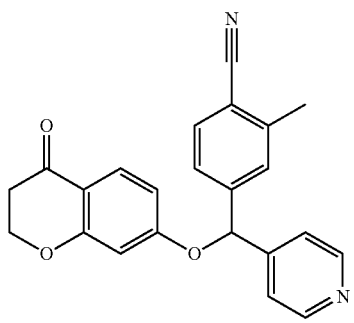 [SMILES: Cc1cc(C(Oc2ccc3c(c2)OCCC3=O)c2ccncc2)ccc1C#N]

Step A: (R,S)-(4-Bromo-3-methylphenyl)(pyridin-4-yl)methanol. i-PrMgCl·LiCl (26 mL, 1.3 M in THF, 34 mmol) was added dropwise to a solution of 4-iodopyridine (6.18 g, 30.1 mmol) and THF (80 mL) that had been cooled to −50° C. The mixture was stirred at 0° C. for 1 hour before treating with a solution of 4-bromo-3-methylbenzaldehyde (4.00 g, 20.1 mmol) and THF (20 mL) dropwise at −50° C. The mixture was stirred for 16 hours with gradual warming to room temperature before pouring it into saturated $NH_4Cl$ (200 mL, aq) and extracting with ethyl acetate (100 mL×3). The combined organic extracts were dried over anhydrous $Na_2SO_4$, filtered, and concentrated to dryness under reduced pressure to give the product, which was purified by FCC (petroleum ether:ethyl acetate, 1:0 to 0:1, gradient elution) to afford the title compound (4.4 g, 79%) as a yellow solid. MS (ESI): mass calcd. for $C_{13}H_{12}BrNO$ 277.01 m/z, found 279.7 $[M+H]^+$.

Step B: (R,S)-7-((4-Bromo-3-methylphenyl)(pyridin-4-yl)methoxy)chroman-4-one. ADDP (5.44 g, 21.6 mmol) was added to a solution of (4-bromo-3-methylphenyl)(pyridin-4-yl)methanol (4.00 g, 14.4 mmol), 7-hydroxychroman-4-one (2.83 g, 17.2 mmol), n-$Bu_3P$ (4.36 g, 21.6 mmol), and toluene (100 mL). The mixture was stirred at 80° C. for 16 hours before cooling to room temperature, pouring it into $H_2O$ (100 mL), and extracting with ethyl acetate (80 mL×3). The combined organic layers were dried over $Na_2SO_4$, concentrated to dryness under reduced pressure to give the product, which was purified by FCC (petroleum ether:ethyl acetate, 1:0 to 1:1, gradient elution) to afford the title compound (4 g, 66%) as a yellow solid. MS (ESI): mass calcd. for $C_{22}H_{18}BrNO_3$ 423.05 m/z, found 425.8 $[M+H]^+$.

Step C: (R,S)-2-Methyl-4-(((4-oxochroman-7-yl)oxy)(pyridin-4-yl)methyl)benzonitrile. $Zn(CN)_2$ (2.48 g, 21.1 mmol) was added to a 100 mL three-necked round-bottomed flask containing a mixture of 7-((4-bromo-3-methylphenyl)(pyridin-4-yl)methoxy)chroman-4-one (3.7 g, 8.7 mmol), Zn dust (171 mg, 2.61 mmol), and DMF (50 mL). The mixture was sparged with Ar for 5 minutes and then treated with $Pd(dppf)Cl_2$ (638 mg, 0.872 mmol). The mixture was sparged with Ar for another 5 minutes and then stirred while heating at 170° C. for 4 hours before cooling to room temperature. The suspension was filtered through a pad of diatomaceous earth, poured into water (100 mL), and extracted with ethyl acetate (80 mL×3). The combined organic extracts were washed with brine (50 mL), dried over anhydrous $Na_2SO_4$, filtered, and concentrated to dryness under reduced pressure to give the product, which was purified by FCC (eluent: petroleum ether:ethyl acetate, 1:0 to 1:1, gradient elution) to afford the title compound (900 mg, 28%) as a yellow oil. MS (ESI): mass calcd. for $C_{23}H_{18}N_2O_3$ 370.13 m/z, found 371.1 $[M+H]^+$.

Intermediate 33: (R,S)-3-Methyl-4-(((4-oxochroman-7-yl)oxy)(pyridin-4-yl)methyl)benzonitrile

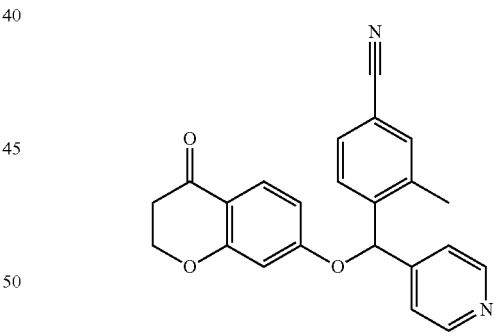

Step A: (R,S)-4-(Hydroxy(pyridin-4-yl)methyl)-3-methylbenzonitrile. i-PrMgCl·LiCl (10.6 mL, 1.3 M in THF, 13.8 mmol) was added dropwise to a solution of 4-iodopyridine (1.5 g, 7.3 mmol) and THE (15 mL) that had been cooled to −15° C. The mixture was stirred at −15° C. for 1.5 hours before treating with a solution of 4-formyl-3-methylbenzonitrile (1.0 g, 6.9 mmol) and THE (10 mL) dropwise at −15° C. The mixture was stirred for 16 hours with gradual warming to room temperature before quenching with saturated $NH_4Cl$ (60 mL) and extracting with ethyl acetate (50 mL×3). The combined organic extracts were dried over anhydrous $Na_2SO_4$, filtered, and concentrated to dryness under reduced pressure to give the product, which was purified by FCC (petroleum ether:ethyl acetate, 1:0 to 0:1, gradient elution) to afford the title compound (1 g, 65%) as a white solid. MS (ESI): mass calcd. for $C_{14}H_{12}N_2O$ 224.09 m/z found 224.9 $[M+H]^+$.

Step B: (R,S)-3-Methyl-4-(((4-oxochroman-7-yl)oxy)(pyridin-4-yl)methyl)benzonitrile. DIAD (676 mg, 3.34 mmol) was added to a solution of 7-hydroxychroman-4-one (366 mg, 2.23 mmol), 4-(hydroxy(pyridin-4-yl)methyl)-3-methylbenzonitrile (500 mg, 2.23 mmol), $PPh_3$ (760 mg, 2.90 mmol), and dichloromethane (10 mL) that had been cooled to 0° C. The mixture was stirred for 16 hours with gradual warming to room temperature before pouring it into $H_2O$ (30 mL) and extracting with dichloromethane (20 mL×3). The combined organic extracts were dried over anhydrous $Na_2SO_4$, filtered, and concentrated to dryness under reduced pressure to give the product, which was purified by FCC (eluent:petroleum ether:ethyl acetate, 10:1 to 1:1, gradient elution) to afford the title compound (900 mg) as a yellow oil. MS (ESI): mass calcd. for $C_{23}H_{18}N_2O_3$ 370.13 m/z found 371.1 $[M+H]^+$.

Intermediate 34: (R,S)-4-(Hydroxy(pyridin-4-yl)methyl)-1-naphthonitrile

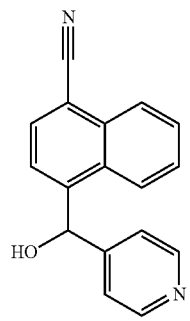 [SMILES: N#Cc1ccc(C(O)c2ccncc2)c2ccccc12]

Step A: 4-Vinyl-1-naphthonitrile. 4-Bromo-1-naphthonitrile (10 g, 43 mmol), potassium trifluoro(vinyl)borate (8.66 g, 64.7 mmol), $K_3PO_4$ (18.3 g, 86.2 mmol), 1,4-dioxane (160 mL), and $H_2O$ (40 mL) were added to a 500 mL three-necked round-bottomed flask. The mixture was sparged with Ar for 5 minutes and then treated with $Pd(dtbpf)Cl_2$ (1.40 g, 2.15 mmol). The mixture was sparged with Ar for another 5 minutes and then heated at 100° C. for 16 hours before cooling to room temperature. The suspension was filtered and the filtrate was poured into $H_2O$ (150 mL) and extracted with ethyl acetate (100 mL×3). The combined organic extracts were dried over anhydrous $Na_2SO_4$, filtered, and concentrated to dryness under reduced pressure to give the product, which was purified by FCC (petroleum ether:ethyl acetate, 1:0 to 10:1, gradient elution) to afford the title compound (4.5 g, 58%) as a brown solid. $^1H$ NMR (400 MHz, DMSO-$d_6$): 8.31 (d, J=8.4 Hz, 1H), 8.09 (d, J=7.7 Hz, 1H), 7.83-7.74 (m, 2H), 7.73-7.66 (m, 1H), 7.59 (dd, J=17.2, 11.0 Hz, 1H), 6.00 (dd, J=17.2, 1.3 Hz, 1H), 5.65 (dd, J=11.0, 1.3 Hz, 1H).

Step B: 4-Formyl-1-naphthonitrile. $K_2OsO_4 \cdot 2H_2O$ (835 mg, 2.51 mmol) was added to a solution of 4-vinyl-1-naphthonitrile (4.5 g, 25 mmol), 1,4-dioxane (100 mL), and $H_2O$ (100 mL). The mixture was treated with $NaIO_4$ (16.1 g, 75.3 mmol) in portions and then stirred at room temperature for 2 hours before quenching with $H_2O$ (120 mL) and extracting with ethyl acetate (80 mL×3). The combined organic extracts were dried over anhydrous $Na_2SO_4$, filtered, and concentrated to dryness under reduced pressure to give the product, which was purified by FCC (eluent:petroleum ether:ethyl acetate, 1:0 to 10:1, gradient elution) to afford the title compound (3.43 g, 70%) as a yellow solid. $^1H$ NMR (400 MHz, DMSO-$d_6$) δ 10.54 (s, 1H), 9.23-9.17 (m, 1H), 8.42 (d, J=7.3 Hz, 1H), 8.30 (d, J=7.5 Hz, 1H), 8.28-8.23 (m, 1H), 7.95-7.90 (m, 2H).

Step C: (R,S)-4-(Hydroxy(pyridin-4-yl)methyl)-1-naphthonitrile. i-PrMgCl·LiCl (21.8 mL, 1.3 M in THF, 28.3 mmol) was added dropwise to a solution of 4-iodopyridine (5.82 g, 28.4 mmol) and THF (50 mL) that had been cooled to 0° C. The mixture was stirred at 0° C. for 1 hour before treating with a solution of 4-formyl-1-naphthonitrile (3.43 g, 18.9 mmol) and THF (50 mL) dropwise at 0° C. The mixture was stirred for 16 hours with gradual warming to room temperature before pouring it into saturated $NH_4Cl$ (100 mL) and extracting with ethyl acetate (80 mL×3). The combined organic extracts were dried over anhydrous $Na_2SO_4$, filtered, and concentrated to dryness under reduced pressure to give the product, which was purified by FCC (eluent:petroleum ether:ethyl acetate, 1:0 to 0:1, gradient elution) to afford the title product (2 g, 37%) as a yellow solid. MS (ESI): mass calcd. for $C_{17}H_{12}N_2O$ 260.09 m/z, found 260.9 $[M+H]^+$.

Intermediate 35: (R,S)—Cyclohexyl(pyridin-4-yl)methanol

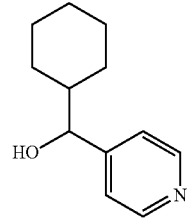 [SMILES: OC(c1ccncc1)C1CCCCC1]

i-PrMgCl·LiCl (14 mL, 1.3 M in THF, 18 mmol) was added dropwise to a solution of 4-iodopyridine (2.0 g, 9.8 mmol) and THF (20 mL) that had been cooled to −15° C. The mixture was stirred at −15° C. for 1.5 hours before treating with a solution of cyclohexanecarbaldehyde (1.0 g, 8.9 mmol) and THF (5 mL) dropwise at −15° C. The mixture was stirred for 16 hours with gradual warming to room temperature before quenching with saturated $NH_4Cl$ (100 mL) and extracting with ethyl acetate (50 mL×3). The combined organic extracts were dried over anhydrous $Na_2SO_4$, filtered, and concentrated to dryness under reduced pressure to give the product, which was purified by FCC (eluent:petroleum ether:ethyl acetate, 1:0 to 0:1, gradient elution) to afford the title compound (880 mg, 52%) as a yellow oil. MS (ESI): mass calcd. for $C_{12}H_{17}NO$ 191.13 m/z found 192.1 $[M+H]^+$. $^1H$ NMR (400 MHz, DMSO-$d_6$) δ 8.45 (d, J=5.7 Hz, 2H), 7.24 (d, J=6.0 Hz, 2H), 5.28 (d, J=4.6 Hz, 1H), 4.27 (t, J=5.1 Hz, 1H), 1.70-1.29 (m, 6H), 1.16-0.83 (m, 5H).

Intermediate 36: 4-((1*R)-((2-methyl-4-oxochroman-7-yl)oxy)(pyridin-4-yl)methyl)benzonitrile

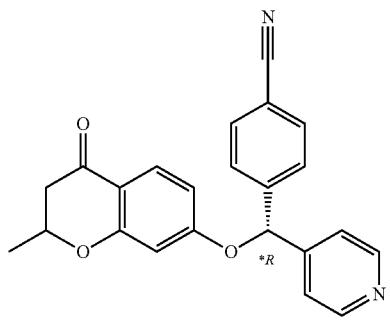 [SMILES: CC1CC(=O)c2ccc(O[C@@H](c3ccncc3)c3ccc(C#N)cc3)cc2O1]

Step A: (R,S)-7-Hydroxy-2-methylchroman-4-one. (E)-But-2-enoic acid (2.35 g, 27.3 mmol) was added to a 20 mL microwave tube containing a suspension of resorcinol (5.0 g, 45 mmol) and sulfuric acid (3.5 mL). The mixture was heated at 140° C. for 5 minutes via microwave irradiation before cooling to room temperature, pouring it into $H_2O$ (50 mL) and extracting with dichloromethane (80 mL×3). The combined organic extracts were washed with brine (50 mL), dried over anhydrous $Na_2SO_4$, filtered, and concentrated to dryness under reduced pressure to give the product, which was purified by FCC (eluent:petroleum ether:ethyl acetate, 1:0 to 0:1, gradient elution) to afford title compound (0.8 g, 7%) as a yellow solid. MS (ESI): mass calcd. for $C_{10}H_{10}O_3$ 178.06 m/z found 178.9 [M+H]$^+$.

Step B: 4-((1*R)-((2-Methyl-4-oxochroman-7-yl)oxy)(pyridin-4-yl)methyl)benzonitrile. DEAD (373 mg, 2.14 mmol) was added to a solution of 7-hydroxy-2-methylchroman-4-one (254 mg, 1.43 mmol), (*S)-4-(hydroxy(pyridin-4-yl)methyl)benzonitrile (Intermediate 8b, 300 mg, 1.43 mmol), $PPh_3$ (563 mg, 2.15 mmol), and dichloromethane (10 mL). The mixture was stirred at room temperature for 16 hours before pouring it into $H_2O$ (30 mL) and extracting with dichloromethane (30 mL×3). The combined organic extracts were dried over anhydrous $Na_2SO_4$, concentrated to dryness under reduced pressure to afford the product, which was purified by FCC (petroleum ether:ethyl acetate, 1:0 to 1:1, gradient elution) to afford the title compound (490 mg) as a yellow oil. MS (ESI): mass calcd. for $C_{23}H_{18}N_2O_3$ 370.13 m/z found 371.0 [M+H]$^+$.

Intermediate 37: (R,S)-2-Ethyl-7-hydroxychroman-4-one

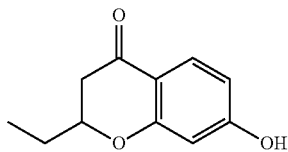

(E)-Pent-2-enoic acid (2.91 g, 29.1 mmol) was added to a 20 mL microwave tube containing a suspension of resorcinol (4.0 g, 36 mmol) and sulfuric acid (3 mL). The mixture was heated at 140° C. for 5 minutes via microwave irradiation before cooling to room temperature, pouring it into $H_2O$ (50 mL) and extracting with dichloromethane (50 mL×3). The combined organic extracts were washed with brine (40 mL), dried over anhydrous $Na_2SO_4$, filtered, and concentrated to dryness under reduced pressure to give the product, which was purified by FCC (eluent:petroleum ether:ethyl acetate, 1:0 to 1:1, gradient elution) to afford the title compound (1 g, 14%) as a brown solid. MS (ESI): mass calcd. for $C_{11}H_{12}O_3$ 192.08 m/z, found 192.9 [M+H]$^+$.

Intermediate 38: 4-((1*S)-((3-Methyl-4-oxochroman-7-yl)oxy)(pyridin-4-yl)methyl)benzonitrile

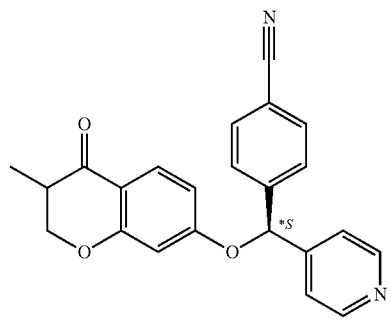 [SMILES: CC1COc2cc(O[C@H](c3ccncc3)c3ccc(C#N)cc3)ccc2C1=O]

Step A: (R,S)-3-Hydroxy-1-(2-hydroxy-4-methoxyphenyl)-2-methylpropan-1-one. 1-(2-Hydroxy-4-methoxyphenyl)propan-1-one (600 mg, 3.33 mmol) and formaldehyde (100 mg, 3.33 mmol) were added to a solution of NaOH (400 mg, 10.0 mmol) in $H_2O$ (12 mL). The mixture was heated at 50° C. for 20 min. The pH of the solution was adjusted to pH 4 with HCl (1 M), and the solution was extracted with ethyl acetate (30 mL×3). The combined organic extracts were washed with brine (20 mL), dried over anhydrous $Na_2SO_4$, filtered, and the filtrate concentrated to dryness under reduced pressure to give the product, which was purified by FCC (eluent:petroleum ether:ethyl acetate, 1:0 to 3:1, gradient elution) to afford the title compound (430 mg) as a colorless oil. MS (ESI): mass calcd. for $C_{11}H_{14}O_4$ 210.09 m/z found 211.1 [M+H]$^+$.

Step B: (R,S)-7-Methoxy-3-methylchroman-4-one. 3-Hydroxy-1-(2-hydroxy-4-methoxyphenyl)-2-methylpropan-1-one (430 mg) and 2 N aqueous NaOH (6 mL) were added to a 100 mL round-bottomed flask. The mixture was stirred at 50° C. for 3 hours before cooling to room temperature, pouring it into $H_2O$ (50 mL), and extracting with ethyl acetate (40 mL×3). The combined organic extracts were dried over anhydrous $Na_2SO_4$, concentrated to dryness under reduced pressure to give the product, which was purified by FCC (eluent:petroleum ether:ethyl acetate, 1:0 to 4:1, gradient elution) to afford the title compound (240 mg) as a colorless oil. MS (ESI): mass calcd. for $C_{11}H_{12}O_3$ 192.08 m/z found 192.9 [M+H]$^+$.

Step C: (R,S)-7-Hydroxy-3-methylchroman-4-one. Pyridine hydrochloride (4.5 g, 39 mmol) and 7-methoxy-3-methylchroman-4-one (370 mg, 1.93 mmol) were added to a 50 mL round-bottomed flask. The mixture was stirred at 170° C. for 2.5 hours under $N_2$ before cooling to room temperature, pouring it into water (40 mL), and extracting with ethyl acetate (30 mL×3). The combined organic extracts were washed with brine (20 mL), dried over anhydrous $Na_2SO_4$, filtered, and the filtrate concentrated to dryness under reduced pressure to give the product, which was purified by FCC (eluent:petroleum ether:ethyl acetate, 1:0 to 4:1, gradient elution) to afford the title compound (270 mg, 79%) as a white solid. MS (ESI): mass calcd. for $C_{10}H_{10}O_3$ 178.06 m/z found 178.9 [M+H]$^+$.

Step D: 4-((1*S)-((3-Methyl-4-oxochroman-7-yl)oxy)(pyridin-4-yl)methyl)benzonitrile. DEAD (249 mg, 1.43 mmol) was added to a solution of 7-hydroxy-3-methylchroman-4-one (167 mg, 0.937 mmol), (*R)-4-(hydroxy(pyridin-4-yl)methyl)benzonitrile (Intermediate 8a, 200 mg, 0.951 mmol), PPh$_3$ (374 mg, 1.43 mmol), and dichloromethane (5 mL). The mixture was stirred at room temperature for 16 hours before concentrating under reduced pressure to give the product, which was purified by FCC (eluent: petroleum ether:ethyl acetate, 1:0 to 1:1, gradient elution) to afford the title compound (350 mg) as a yellow oil, which was used in the next step without further purification. MS (ESI): mass calcd. for $C_{23}H_{18}N_2O_3$ 370.13 m/z found 370.9 [M+H]$^+$.

Intermediate 39:
(R,S)-3-Ethyl-7-hydroxychroman-4-one

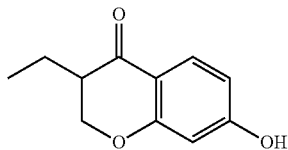

Step A: 1-(2-Hydroxy-4-methoxyphenyl)butan-1-one. Dimethyl sulfate (1.27 mL, 13.4 mol) was added to 1-(2,4-dihydroxyphenyl)butan-1-one (2.0 g, 11 mmol), K$_2$CO$_3$ (767 mg, 5.55 mmol), and anhydrous acetone (20 mL). The mixture was stirred at 65° C. for 6 hours before cooling to room temperature. The pH of the mixture was adjusted to pH 8 with 20% aqueous NH$_3$, and the resulting solution was extracted with ethyl acetate (40 mL×3). The combined organic extracts were washed with brine (30 mL), dried over anhydrous Na$_2$SO$_4$, filtered, and the filtrate concentrated to dryness under reduced pressure to give the product, which was purified by FCC (eluent:petroleum ether:ethyl acetate, 1:0 to 10:1, gradient elution) to afford the title compound (1.88 g, 86%) as colorless oil. MS (ESI): mass calcd. for $C_{11}H_{14}O_3$ 194.09 m/z found 194.9 [M+H]$^+$.

Step B: (R,S)-1-(2-Hydroxy-4-methoxyphenyl)-2-(hydroxymethyl)butan-1-one. 1-(2-Hydroxy-4-methoxyphenyl)butan-1-one (1.88 g, 9.68 mmol), and formaldehyde (290 mg, 9.66 mmol) were added to a solution of NaOH (968 mg, 24.2 mmol) in H$_2$O (10 mL). The mixture was stirred for 3 hours at 50° C. before cooling to room temperature. The pH of the solution was adjusted to pH 5 with 0.5 N HCl, and the resulting solution was extracted with ethyl acetate (20 mL×3). The combined organic extracts were washed with brine (20 mL), dried over anhydrous Na$_2$SO$_4$, filtered, and concentrated to dryness under reduced pressure to give the product, which was further purified by FCC (eluent:petroleum ether:ethyl acetate, 1:0 to 4:1, gradient elution) to afford two compounds: (R,S)-3-ethyl-7-methoxychroman-4-one (Intermediate 39, Step C, 460 mg, 20%) as a colorless oil and the title compound (970 mg, 45%) as a colorless oil. Title compound characterization: Intermediate 39, Step B: MS (ESI): mass calcd. for $C_{12}H_{16}O_4$ 224.10 m/z found 224.9 [M+H]$^+$.

Step C: (R,S)-3-Ethyl-7-methoxychroman-4-one. 1-(2-Hydroxy-4-methoxyphenyl)-2-(hydroxymethyl)butan-1-one (1.2 g, 5.4 mmol) was added to a solution of NaOH (464 mg, 11.6 mmol) in H$_2$O (10 mL). The mixture was stirred for 2.5 hours at 50° C. before cooling to room temperature, adjusting to pH 5 with 0.5 N HCl, and extracting with ethyl acetate (20 mL×3). The combined organic extracts were washed with brine (20 mL), dried over anhydrous Na$_2$SO$_4$, filtered, and concentrated to dryness under reduced pressure to give the product, which was further purified by FCC (eluent:petroleum ether:ethyl acetate, 1:0 to 4:1, gradient elution) to afford the title compound (880 mg, 77%) as a colorless oil. MS (ESI): mass calcd. for $C_{12}H_{14}O_3$ 206.09 m/z found 207.2 [M+H]$^+$.

Step D: (R,S)-3-Ethyl-7-hydroxychroman-4-one. Pyridine hydrochloride (22.4 g, 194 mmol) and 3-ethyl-7-methoxychroman-4-one (1.33 g, 6.45 mmol) were heated at 170° C. for 3 hours under Ar before cooling to the room temperature, pouring it into water (20 mL), and extracting with ethyl acetate (20 mL×3). The combined organic extracts were washed with brine (20 mL), dried over anhydrous Na$_2$SO$_4$, filtered, and concentrated to dryness under reduced pressure to give the product, which was purified by FCC (eluent:petroleum ether:ethyl acetate, 1:0 to 5:1, gradient elution) to afford the title compound (1.1 g, 87%) as a yellow solid. MS (ESI): mass calcd. for $C_{11}H_{12}O_3$ 192.08 m/z found 192.9 [M+H]$^+$.

Intermediate 40: (R,S)-4-(((8-Methyl-4-oxochroman-7-yl)oxy)(pyridin-4-yl)methyl)benzonitrile

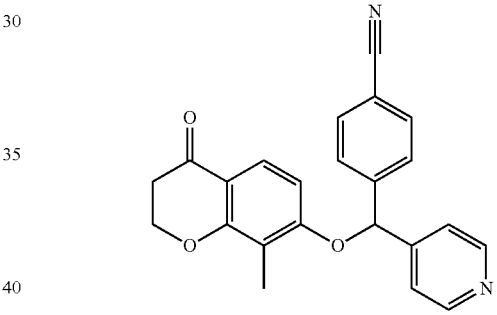

Step A: 3-Chloro-1-(2,4-dihydroxy-3-methylphenyl)propan-1-one. CF$_3$SO$_3$H (12 mL) was added to 2-methylbenzene-1,3-diol (3.0 g, 24 mmol) and 3-chloropropanoic acid (2.66 g, 24.5 mmol). The mixture was heated at 85° C. for 16 hours before cooling to room temperature, pouring it into water (30 mL), and extracting with dichloromethane (50 mL×3). The combined organic extracts were washed with brine (20 mL), dried over anhydrous Na$_2$SO$_4$, filtered, and concentrated to dryness under reduced pressure to afford the product, which was purified by FCC (eluent:petroleum ether:ethyl acetate, 10:0 to 0:1, gradient elution) to afford the title compound (700 mg, 14%) as a yellow solid. $^1$H NMR (400 MHz, DMSO-d$_6$) δ 12.82 (s, 1H), 10.62 (s, 1H), 7.64 (d, J=8.8 Hz, 1H), 6.44 (d, J=8.8 Hz, 1H), 3.89 (t, J=6.2 Hz, 2H), 3.45 (t, J=6.4 Hz, 2H), 1.94 (s, 3H).

Step B: 7-Hydroxy-8-methylchroman-4-one. 3-Chloro-1-(2,4-dihydroxy-3-methylphenyl)propan-1-one (700 mg, 3.26 mmol) was added a 100 mL round-bottomed flask containing a aqueous solution of NaOH (2 M, 20 mL, 40 mmol) that had been cooled to 0° C. The mixture was stirred at room temperature for 11 hours before adjusting the pH of the solution to pH 1-2 with 2 N HCl and extracting with ethyl acetate (10 mL×3). The combined organic extracts were washed with brine (30 mL), dried over anhydrous Na$_2$SO$_4$, filtered, and concentrated to dryness under reduced pressure to give the product, which was purified by FCC (eluent:petroleum ether:ethyl acetate, 1:0 to 0:1, gradient elution) to afford the title compound (380 mg, 65%) as a yellow solid. MS (ESI): mass calcd. for $C_{10}H_{10}O_3$ 178.06 m/z found 178.8 $[M+H]^+$. $^1H$ NMR (400 MHz, DMSO-$d_6$) δ 10.40 (s, 1H), 7.48 (d, J=8.6 Hz, 1H), 6.54 (d, J=8.6 Hz, 1H), 4.48 (t, J=12.0 Hz, 2H), 2.64 (t, J=6.4 Hz, 2H), 1.96 (s, 3H).

Step C: (R,S)-4-(((8-Methyl-4-oxochroman-7-yl)oxy)(pyridin-4-yl)methyl)benzonitrile. DIAD (511 mg, 2.53 mmol) was added to a solution of 7-hydroxy-8-methylchroman-4-one (300 mg, 1.68 mmol), 4-(hydroxy(pyridin-4-yl)methyl)benzonitrile (Intermediate 8, 425 mg, 2.02 mmol), $PPh_3$ (662 mg, 2.52 mmol) and anhydrous dichloromethane (10 mL). The mixture was stirred at room temperature for 16 hours before pouring it into water (50 mL) and extracting with dichloromethane (20 mL×3). The combined organic extracts were washed with brine (20 mL), dried over anhydrous $Na_2SO_4$, filtered, and concentrated to dryness under reduced pressure to give the product, which was purified by FCC (eluent:petroleum ether:ethyl acetate, 1:0 to 0:1, gradient elution) to afford the title compound (1.3 g) as a brown oil. MS (ESI): mass calcd. for $C_{23}H_{18}N_2O_3$ 370.13 m/z found 371.1 $[M+H]^+$.

Intermediate 41: (R,S)-4-(((6-Methyl-4-oxochroman-7-yl)oxy)(pyridin-4-yl)methyl)benzonitrile

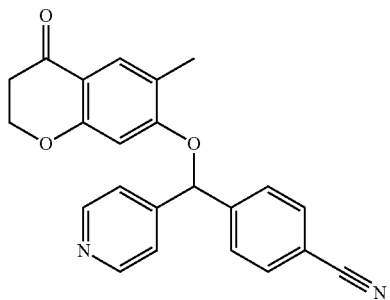 [SMILES: Cc1cc2c(cc1OC(c1ccncc1)c1ccc(C#N)cc1)OCCC2=O]

Step A: 3-Chloro-1-(2,4-dihydroxy-5-methylphenyl)propan-1-one. $CF_3SO_3H$ (10.0 mL, 113 mmol) was added to 4-methylbenzene-1,3-diol (2.0 g, 16 mmol) and 3-chloropropanoic acid (1.7 g, 16 mmol). The reaction mixture was stirred at 80° C. for 16 hours before cooling to room temperature, pouring it into water (30 mL) and extracting with ethyl acetate (50 mL×2). The combined organic extracts were washed with water (20 mL) and brine (20 mL), dried over anhydrous $Na_2SO_4$, filtered, and concentrated to dryness under reduced pressure to give the product, which was purified by FCC (eluent:petroleum ether:ethyl acetate, 10:0 to 4:1, gradient elution) to afford the title compound (1.8 g, 52%) as a yellow solid. $^1H$ NMR (400 MHz, DMSO-$d_6$) δ 12.15 (s, 1H), 10.67 (s, 1H), 7.62 (s, 1H), 6.30 (s, 1H), 3.88 (t, J=6.3 Hz, 2H), 3.45 (t, J=6.4 Hz, 2H), 2.07-2.02 (m, 3H).

Step B: 7-Hydroxy-6-methylchroman-4-one. 3-Chloro-1-(2,4-dihydroxy-5-methylphenyl)propan-1-one (1.8 g, 8.4 mmol) was added to a solution of NaOH (50.0 mL, 2 M in $H_2O$, 100 mmol) that had been cooled to 0° C. The reaction mixture was stirred at room temperature for 16 hours before adjusting the pH of the solution to pH 1-2 with 6 N HCl and extracting with ethyl acetate (100 mL×3). The combined organic extracts were washed with water (30 mL), saturated $NaHCO_3$ (30 mL×2), and brine (30 mL), dried over anhydrous $Na_2SO_4$, filtered, and concentrated to dryness under reduced pressure to give the product, which was triturated with MTBE (40 mL). The filter cake was washed with MTBE (20 mL) before drying under reduced pressure to afford the title compound (1 g, 65%) as a yellow solid. MS (ESI): mass calcd. for $C_{10}H_{10}O_3$ 178.06 m/z, found 178.8 $[M+H]^+$. $^1H$ NMR (400 MHz, DMSO-$d_6$) δ 10.52 (br s, 1H), 7.43 (s, 1H), 6.31 (s, 1H), 4.38 (t, J=6.4 Hz, 2H), 2.59 (t, J=6.4 Hz, 2H), 2.02 (s, 3H).

Step C: (R,S)-4-(((6-Methyl-4-oxochroman-7-yl)oxy)(pyridin-4-yl)methyl)benzonitrile. DEAD (1.2 g, 6.9 mmol) was added to a solution of 7-hydroxy-6-methylchroman-4-one (800 mg, 4.49 mmol), 4-(hydroxy(pyridin-4-yl)methyl)benzonitrile (Intermediate 8, 945 mg, 4.50 mmol), $PPh_3$ (1.5 g, 5.7 mmol), and anhydrous dichloromethane (10 mL). The mixture was stirred at room temperature for 16 hours before pouring it into $H_2O$ (10 mL) and extracting with dichloromethane (30 mL×3). The combined organic extracts were dried over anhydrous $Na_2SO_4$, filtered, and concentrated to dryness under reduced pressure to give the product, which was purified by FCC (eluent:petroleum ether:ethyl acetate, 10:1 to 0:1, gradient elution) to afford the title compound (2.1 g, 73%) as a yellow oil. MS (ESI): mass calcd. for $C_{23}H_{18}N_2O_3$ 370.13 m/z, found 371.4 $[M+H]^+$.

Intermediate 41: (R,S)-4-(((8-Fluoro-4-oxochroman-7-yl)oxy)(pyridin-4-yl)methyl)benzonitrile

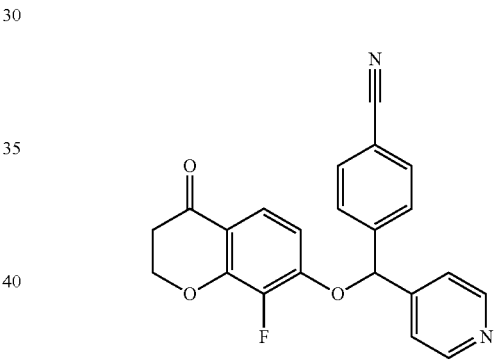

Step A: 3-Chloro-1-(3-fluoro-2,4-dihydroxyphenyl)propan-1-one. $CF_3SO_3H$ (6 mL) was added to a solution of 2-fluorobenzene-1,3-diol (800 mg, 6.25 mmol) and 3-chloropropanoic acid (813 mg, 7.49 mmol). The mixture was heated at 100° C. for 3 hours before cooling to room temperature, quenching with $H_2O$ (20 mL), and extracting with ethyl acetate (30 mL×3). The combined organic extracts were dried over anhydrous $Na_2SO_4$, filtered, and concentrated to dryness under reduced pressure to give the product, which was purified by FCC (eluent: petroleum ether:ethyl acetate, 10:1 to 3:1, gradient elution) to afford the title compound (400 mg, 29%) as a yellow solid.

Step B: 8-Fluoro-7-hydroxychroman-4-one. 3-Chloro-1-(3-fluoro-2,4-dihydroxyphenyl)propan-1-one (400 mg, 1.83 mmol) and 1 M NaOH (6 mL) were stirred at room temperature for 2 hours before adjusting the pH of the solution to pH 4.0 with 1 N HCl. The suspension was filtered and the filter cake washed with water (10 mL) before drying under reduced pressure to afford the title compound (175 mg, 53%) as a brown solid.

Step C: (R,S)-4-(((8-Fluoro-4-oxochroman-7-yl)oxy)(pyridin-4-yl)methyl)benzonitrile. DEAD (251 mg, 144 mmol) was added to a solution of 8-fluoro-7-hydroxychroman-4-one (175 mg, 0.961 mmol), 4-(hydroxy(pyridin-4-yl)methyl)benzonitrile (Intermediate 8, 202 mg, 0.961 mmol), PPh₃ (328 mg, 1.25 mmol), and dichloromethane (5 mL). The mixture was stirred at room temperature for 16 hours before pouring it into H₂O (50 mL) and extracting with dichloromethane (30 mL×3). The combined organic extracts were dried over anhydrous Na₂SO₄, filtered, and concentrated to dryness under reduced pressure to give the product, which was purified by FCC (eluent:petroleum ether:ethyl acetate, 10:1 to 2:1, gradient elution) to afford the title compound (350 mg) as a yellow oil, which was used in the next step without further purification. MS (ESI): mass calcd. for $C_{22}H_{15}FN_2O_3$ 374.11 m/z found 375.0 [M+H]⁺.

Intermediate 42: (R,S)-4-(((5-Fluoro-4-oxochroman-7-yl)oxy)(pyridin-4-yl)methyl)benzonitrile

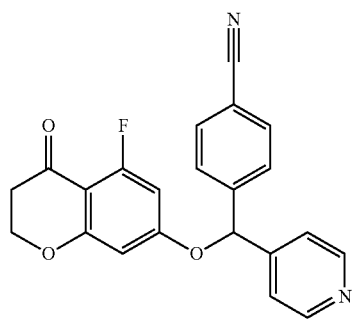 [SMILES: N#Cc1ccc(C(Oc2cc(F)c3c(c2)OCCC3=O)c2ccncc2)cc1]

Step A: 3-Chloro-1-(2-fluoro-4,6-dihydroxyphenyl)propan-1-one. CF₃SO₃H (5 mL) was added to a mixture of 5-fluorobenzene-1,3-diol (1.5 g, 12 mmol) and 3-chloropropanoic acid (1.5 g, 14 mmol). The reaction mixture was heated at 85° C. for 2 hours before pouring it into ice/water (60 mL) and extracting with ethyl acetate (30 mL×3). The combined organic extracts were dried over anhydrous Na₂SO₄, filtered, and concentrated to dryness under reduced pressure to give the product, which was purified by FCC (eluent:petroleum ether:ethyl acetate, 10:1 to 4:1, gradient elution) to afford the title compound (620 mg) as a yellow oil, which was used in the next step without further purification.

Step B: 5-Fluoro-7-hydroxychroman-4-one. 3-Chloro-1-(2-fluoro-4,6-dihydroxyphenyl)propan-1-one (620 mg, 2.84 mmol) and 1 M aqueous NaOH (3 mL) were stirred at room temperature for 2 hours before adjusting the pH of the solution to pH 4 with 1 N HCl. The solid was isolated via filtration and the filter cake washed with water (20 mL) before drying under reduced pressure to give the product, which was purified by FCC (eluent: petroleum ether:ethyl acetate, 10:1 to 3:1, gradient elution) to afford the title compound (170 mg, 33%) as a white solid. ¹H NMR (400 MHz, DMSO-d₆) δ 10.96 (br s, 1H), 6.26-6.16 (m, 2H), 4.45 (t, J=6.4 Hz, 2H), 2.65 (t, J=6.4 Hz, 2H).

Step C: (R,S)-4-(((5-Fluoro-4-oxochroman-7-yl)oxy)(pyridin-4-yl)methyl)benzonitrile. DEAD (229 mg, 1.32 mmol) was added to a solution of 5-fluoro-7-hydroxychroman-4-one (160 mg, 0.878 mmol), 4-(hydroxy(pyridin-4-yl)methyl)benzonitrile (Intermediate 8, 203 mg, 0.966 mmol), PPh₃ (347 mg, 1.32 mmol), and dichloromethane (5 mL). The mixture was stirred at room temperature for 16 hours before pouring it into H₂O (30 mL) extracting with dichloromethane (30 mL×3). The combined organic extracts were dried over anhydrous Na₂SO₄, concentrated to dryness under reduced pressure to give the product, which was purified by FCC (eluent:petroleum ether:ethyl acetate, 1:0 to 1:1, gradient elution) to give the title compound (280 mg, 80%) as a yellow oil. MS (ESI): mass calcd. for $C_{22}H_{15}FN_2O_3$ 374.11 m/z found 375.1 [M+H]⁺.

Intermediate 43: (R,S)-4-(((6-Fluoro-4-oxochroman-7-yl)oxy)(pyridin-4-yl)methyl)benzonitrile

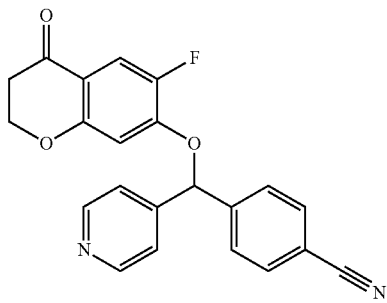 [SMILES: N#Cc1ccc(C(Oc2cc3c(cc2F)C(=O)CCO3)c2ccncc2)cc1]

Step A: 3-Chloro-1-(5-fluoro-2,4-dihydroxyphenyl)propan-1-one. CF₃SO₃H (15 mL) was added to a solution of 4-fluorobenzene-1,3-diol (2.0 g, 16 mmol) and 3-chloropropanoic acid (2.03 g, 18.7 mmol). The mixture was heated at 85° C. for 2 hours before cooling to room temperature, quenching with H₂O (20 mL), adjusting the pH of the solution to pH 6-7 with 1 N NaOH, and extracting with ethyl acetate (50 mL×3). The combined organic extracts were dried over anhydrous Na₂SO₄, filtered, and concentrated to dryness under reduced pressure to give the product, which was purified by FCC (eluent:petroleum ether:ethyl acetate, 10:1 to 5:1, gradient elution) to afford the title compound (2.2 g, 64%) as a yellow solid.

Step B: 6-Fluoro-7-hydroxychroman-4-one. 3-Chloro-1-(5-fluoro-2,4-dihydroxyphenyl)propan-1-one (2.2 g, 10 mmol) and NaOH (20 mL, 2 M in water, 40 mmol) were stirred at room temperature for 16 hours before adjusting the pH of the solution to pH 4 with 2 N HCl. The solid was isolated via filtration and the filter cake washed with water (20 mL) before drying under reduced pressure to afford the title compound (1.6 g, 87%) as a brown solid.

Step C: (R,S)-4-(((6-Fluoro-4-oxochroman-7-yl)oxy)(pyridin-4-yl)methyl)benzonitrile. DIAD (2.2 g, 11 mmol) was added to a solution of 6-fluoro-7-hydroxychroman-4-one (1.3 g, 7.1 mmol), 4-(hydroxy(pyridin-4-yl)methyl)benzonitrile (Intermediate 8, 1.5 g, 7.1 mmol), PPh₃ (2.4 g, 9.2 mmol), and dichloromethane (20 mL). The mixture was stirred at room temperature for 16 hours before pouring it into H₂O (50 mL) and extracting with dichloromethane (30 mL×3). The combined organic extracts were dried over anhydrous Na₂SO₄, filtered, and concentrated to dryness under reduced pressure to give the product, which was purified by FCC (eluent: petroleum ether:ethyl acetate, 10:1 to 2:1, gradient elution) to afford the title compound (1.7 g, 38%) as a yellow oil. MS (ESI): mass calcd. for $C_{22}H_{15}FN_2O_3$ 374.11 m/z found 375.0 [M+H]⁺.

Intermediate 44: (R,S)-4-(((4-Oxo-8-phenylchroman-7-yl)oxy)(pyridin-4-yl)methyl)benzonitrile

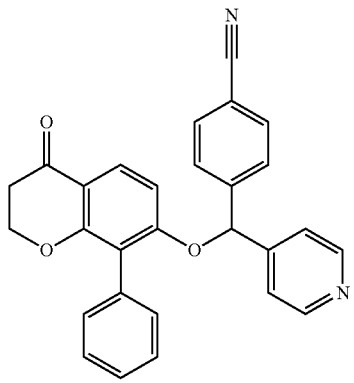 [SMILES: N#Cc1ccc(C(Oc2ccc3c(c2-c2ccccc2)OCCC3=O)c2ccncc2)cc1]

Step A: 3-Chloro-1-(2,3-dihydroxy-4-methoxyphenyl)propan-1-one. 3-Methoxybenzene-1,2-diol (1.0 g, 7.1 mmol) was added in portions to a solution of CF$_3$SO$_3$H (5 mL) that had been cooled to 5° C. After stirring for 0.5 hours at 5° C., 3-chloropropanoic acid (774 mg, 7.13 mmol) was added to the above solution. The mixture was then heated at 50° C. for 2 hours before cooling to room temperature, pouring it into ice/water (20 mL) and extracting with ethyl acetate (10 mL×3). The combined organic extracts were washed with brine (50 mL), dried over anhydrous Na$_2$SO$_4$, filtered, and concentrated to dryness under reduced pressure to give the product, which was purified by FCC (eluent: petroleum ether:ethyl acetate, 10:1 to 3:1, gradient elution) to afford the title compound (800 mg, 48%) as a white solid. $^1$H NMR (400 MHz, CDCl$_3$) δ 12.24 (s, 1H), 7.31 (d, J=9.0 Hz, 1H), 6.53 (d, J=9.0 Hz, 1H), 5.53 (s, 1H), 3.96 (s, 3H), 3.90 (t, J=6.7 Hz, 2H), 3.42 (t, J=6.7 Hz, 2H).

Step B: 8-Hydroxy-7-methoxychroman-4-one. 3-Chloro-1-(2,3-dihydroxy-4-methoxyphenyl)propan-1-one (800 mg, 3.47 mmol) was added to a solution of 2 M aqueous NaOH (10 mL, 20 mmol) that had been cooled to 5° C. The mixture was stirred at room temperature for 16 hours before pouring it into ice/water (20 mL), adjusting the pH of the solution to pH 6 with conc. HCl, and extracting with ethyl acetate (10 mL×5). The combined organic extracts were washed with brine (10 mL), dried over anhydrous Na$_2$SO$_4$, filtered, and concentrated to dryness under reduced pressure to give the product, which was purified by FCC (eluent:petroleum ether:ethyl acetate, 10:1 to 1:1, gradient elution) to afford the title compound (420 mg, 62%) as a white solid. $^1$H NMR (400 MHz, CDCl$_3$) δ 7.50 (d, J=8.8 Hz, 1H), 6.64 (d, J=8.8 Hz, 1H), 5.50 (s, 1H), 4.64-4.57 (m, 2H), 3.95 (s, 3H), 2.83-2.77 (m, 2H).

Step C: 7-Methoxy-4-oxochroman-8-yl trifluoromethanesulfonate. Tf$_2$O (1.0 mL, 5.9 mmol) was added dropwise to a solution of 8-hydroxy-7-methoxychroman-4-one (1.0 g, 5.2 mmol), pyridine (1.3 mL, 16 mmol), and dichloromethane (20 mL) that had been cooled to 0° C. The mixture was stirred for 16 hours with gradual warming to room temperature before pouring it into ice/water (30 mL) and extracting with ethyl acetate (30 mL×3). The combined organic extracts were washed with brine (20 mL), dried over anhydrous Na$_2$SO$_4$, filtered, and concentrated to dryness under reduced pressure to give the product, which was purified by FCC (eluent:petroleum ether:ethyl acetate, 10:1 to 1:1, gradient elution) to afford the title compound (1.24 g, 74%) as a white solid.

Step D: 7-Methoxy-8-phenylchroman-4-one. 7-Methoxy-4-oxochroman-8-yl trifluoromethanesulfonate (1.2 g, 3.7 mmol), phenylboronic acid (1.3 g, 11 mmol), and Na$_2$CO$_3$ (1.2 g, 11 mmol) were added to a 20 mL microwave tube and the resulting mixture was dissolved in toluene (5 mL) and ethanol (5 mL). The mixture was sparged with Ar for 5 minutes and then treated with Pd(Ph$_3$P)$_4$ (425 mg, 0.368 mmol). The mixture was sparged with Ar for another 5 minutes and then stirred while heating at 110° C. via microwave irradiation for 1 hour before cooling to room temperature, pouring it into H$_2$O (10 mL) and extracting with ethyl acetate (10 mL×3). The combined organic extracts were washed with brine (10 mL), dried over anhydrous Na$_2$SO$_4$, filtered, and concentrated to dryness under reduced pressure to afford the product, which was purified by preparative TLC (eluent:petroleum ether:ethyl acetate, 4:1) to give the title compound (450 mg, 47%) as a yellow solid. MS (ESI): mass calcd. for C$_{16}$H$_{14}$O$_3$ 254.09 m/z found 255.3 [M+H]$^+$.

Step E: 7-Hydroxy-8-phenylchroman-4-one. A mixture of 7-methoxy-8-phenylchroman-4-one (400 mg, 1.57 mmol) and pyridine hydrochloride (1.8 g, 16 mmol) was heated at 170° C. for 2 hours before cooling to room temperature and diluting with water (20 mL). The mixture was extracted with ethyl acetate (5 mL×5). The combined organic extracts were washed with brine (10 mL), dried over anhydrous Na$_2$SO$_4$, filtered, and concentrated to dryness under reduced pressure to give the product, which was purified by preparative TLC (eluent:petroleum ether:ethyl acetate, 1:1) to afford the title compound (100 mg) as a yellow solid, which was used in the next step without further purification. MS (ESI): mass calcd. for C$_{15}$H$_{12}$O$_3$ 240.08 m/z found 240.9 [M+H]$^+$.

Step F: (R,S)-4-(((4-Oxo-8-phenylchroman-7-yl)oxy)(pyridin-4-yl)methyl)benzonitrile. DIAD (135 mg, 0.668 mmol) was added to a solution of 7-hydroxy-8-phenylchroman-4-one (80 mg, 0.33 mmol), 4-(hydroxy(pyridin-4-yl)methyl)benzonitrile (Intermediate 8, 70 mg, 0.33 mmol), PPh$_3$ (178 mg, 0.679 mmol), and THF (1 mL). The mixture was heated at 70° C. for 16 hours before cooling to room temperature, pouring it into ice/water (20 mL), and extracting with ethyl acetate (10 mL×5). The combined organic extracts were washed with brine (10 mL), dried over anhydrous Na$_2$SO$_4$, filtered, and concentrated to dryness under reduced pressure to afford the product, which was purified by preparative TLC (eluent:petroleum ether:ethyl acetate, 1:1) to afford the title compound (80 mg) as a yellow solid, which was used in the next step without further purification. MS (ESI): mass calcd. for C$_{28}$H$_{20}$N$_2$O$_3$ 432.15 m/z found 433.2 [M+H]$^+$.

Intermediate 45: (R,S)-4-(((4-Oxo-6-phenylchroman-7-yl)oxy)(pyridin-4-yl)methyl)benzonitrile

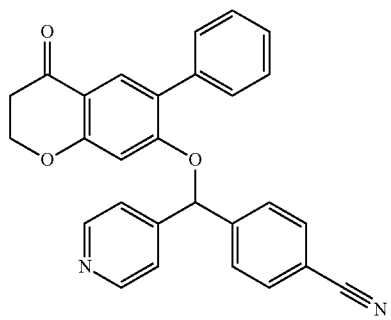 [SMILES: N#Cc1ccc(C(Oc2cc3c(cc2-c2ccccc2)C(=O)CCO3)c2ccncc2)cc1]

Step A: 3-Chloro-1-(5-chloro-2,4-dihydroxyphenyl)propan-1-one. 4-Chlorobenzene-1,3-diol (2.0 g, 14 mmol) was slowly added to trifluoromethanesulfonic acid (6.0 mL, 68 mmol). The mixture was cooled to 0° C. for 0.5 hours before treating with 3-chloropropanoic acid (1.56 g, 14.4 mmol). The mixture was then heated at 50° C. for 5 hours before cooling to room temperature, pouring it into water (60 mL) and extracting with dichloromethane (30 mL×3). The combined organic extracts were washed with brine (40 mL), dried over anhydrous $Na_2SO_4$, filtered, and concentrated to dryness under reduced pressure to afford the product (2 g) as a brown solid, which was used in the next step without further purification. $^1H$ NMR (400 MHz, DMSO-$d_6$) δ 11.94 (s, 1H), 11.44 (s, 1H), 7.88 (s, 1H), 6.51 (s, 1H), 3.89 (t, J=6.3 Hz, 2H), 3.51 (t, J=6.3 Hz, 2H), 3.53-3.49 (m, 1H).

Step B: 6-Chloro-7-hydroxychroman-4-one. 3-Chloro-1-(5-chloro-2,4-dihydroxyphenyl)propan-1-one (2 g,) was added to a solution of NaOH (20 mL, 2 M in $H_2O$, 40 mmol) that had been cooled to 0° C. The reaction mixture was allowed to gradually warm to room temperature and then stirred for 15 hours before adjusting the pH of the solution to pH 1-2 with 2 N HCl and extracting with ethyl acetate (20 mL×3). The combined organic extracts were washed with brine (20 mL), dried over anhydrous $Na_2SO_4$, filtered, and concentrated to dryness under reduced pressure to give the product, which was further purified by FCC (eluent: petroleum ether:ethyl acetate, 1:0 to 0:1, gradient elution) to afford title compound (500 mg) as a brown solid.

Step C: (R,S)-4-(((6-Chloro-4-oxochroman-7-yl)oxy)(pyridin-4-yl)methyl)benzonitrile. DEAD (700 mg, 4.02 mmol) was added to a solution of 4-(hydroxy(pyridin-4-yl)methyl)benzonitrile (Intermediate 8, 650 mg, 3.09 mmol), 6-chloro-7-hydroxychroman-4-one (500 mg, 2.52 mmol), $PPh_3$ (1.0 g, 3.8 mmol), and anhydrous dichloromethane (10 mL). The mixture was stirred at room temperature for 14 hours before pouring it into water (20 mL) and extracting with dichloromethane (20 mL×3). The combined organic extracts were washed with brine (20 mL), dried over anhydrous $Na_2SO_4$, filtered, and concentrated to dryness under reduced pressure to give the product, which was further purified by FCC (eluent:petroleum ether:ethyl acetate, 1:0 to 0:1) to afford title compound (1 g, 70%) as a brown oil. MS (ESI): mass calcd. for $C_{22}H_{15}ClN_2O_3$ 390.08 m/z found 391.0 $[M+H]^+$.

Step D: (R,S)-4-(((4-Oxo-6-phenylchroman-7-yl)oxy)(pyridin-4-yl)methyl)benzonitrile. 4-(((6-Chloro-4-oxochroman-7-yl)oxy)(pyridin-4-yl)methyl)benzonitrile (500 mg, 1.06 mmol), phenylboronic acid (250 mg, 2.05 mmol), and $Cs_2CO_3$ (1.0 g, 3.1 mmol) were added to a 20 mL microwave tube and the mixture was dissolved in 1,4-dioxane (12 mL) and $H_2O$ (1.5 mL). The mixture was sparged with $N_2$ for 5 minutes and then treated with S-Phos Pd G3 (80 mg, 0.10 mmol). The mixture was sparged with $N_2$ for another 5 minutes and then stirred while heating at 100° C. via microwave irradiation for 1 hour before cooling to room temperature, pouring it into water (20 mL) and extracting with dichloromethane (20 mL×3). The combined organic extracts were washed with brine (20 mL), dried over anhydrous $Na_2SO_4$, filtered, and concentrated to dryness under reduced pressure to give the product, which was further purified by FCC (eluent: petroleum ether:ethyl acetate, 1:0 to 0:1, gradient elution) to afford the title compound (700 mg, 68%) as a brown oil. MS (ESI): mass calcd. for $C_{28}H_{20}N_2O_3$ 432.15 m/z found 433.1 $[M+H]^+$.

Intermediate 46: 4-((1*R)-((3-(((tert-butyldimethylsilyl)oxy)methyl)-4-oxochroman-7-yl)oxy)(pyridin-4-yl)methyl)benzamide

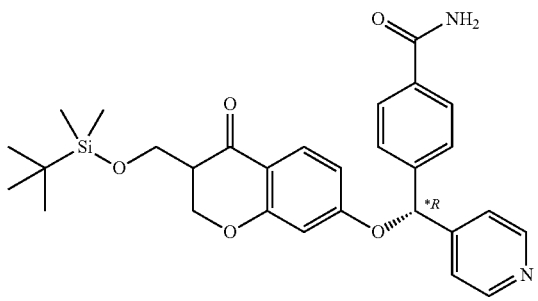 [SMILES: CC(C)(C)[Si](C)(C)OCC1COc2cc(O[C@@H](c3ccncc3)c3ccc(C(N)=O)cc3)ccc2C1=O]

Step A: 7-(Benzyloxy)chroman-4-one. Benzyl bromide (1.1 g, 6.4 mmol) was added to a mixture of 7-hydroxychroman-4-one (1.0 g, 6.1 mmol), $K_2CO_3$ (1.90 g, 13.7 mmol), and acetone (20 mL). The mixture was heated to reflux for 6 hours. The solid was filtered off through a pad of diatomaceous earth and the pad washed with ethyl acetate (20 mL). The filtrate was concentrated to dryness under reduced pressure, the residue dissolved in ethyl acetate (30 mL) and the mixture washed with 1 N aqueous NaOH (2×5 mL), water (10 mL), and brine (10 mL). The organic layer was dried over anhydrous $Na_2SO_4$, filtered, and concentrated under reduced pressure to afford the title compound (1.4 g, 90%) as a brown solid, which was used in the next step without further purification. MS (ESI): mass calcd. for $C_{16}H_{14}O_3$ 254.09 m/z found 254.9 $[M+H]^+$.

Step B: 7-(Benzyloxy)-3-(hydroxymethyl)chroman-4-one. 2,2,6,6-Tetramethylpiperidine (2.3 g, 16 mmol) was slowly added to a solution of n-BuLi (6.60 mL, 2.5 M in hexane, 16.5 mmol) and THF (20 mL) which was cooled to −10° C. The mixture was stirred at −10° C. for 0.5 hours and then cooled down to −60° C. before treating with a solution of 7-(benzyloxy)chroman-4-one (1.4 g, 5.5 mmol) and THF (5 mL). The mixture was stirred at −60° C. for 1 hour before treating with a solution of (1H-benzo[d][1,2,3]triazol-1-yl)methanol (1.15 g, 7.71 mmol) and THF (15 mL). The mixture was stirred at −60° C. for another 1 hour before quenching with saturated $NH_4Cl$ (30 mL) and extracting with ethyl acetate (30 mL×3). The combined extracts were dried over anhydrous $Na_2SO_4$, filtered, and concentrated to dryness under reduced pressure to afford the product, which was purified by preparative TLC (eluent:petroleum ether: ethyl acetate, 2:1) to give the title compound (600 mg, 38%) as a yellow solid. MS (ESI): mass calcd. for $C_{17}H_{16}O_4$ 284.10 m/z found 285.3 $[M+H]^+$.

Step C: (R,S)-7-(Benzyloxy)-3-(((tert-butyldimethylsilyl)oxy)methyl)chroman-4-one. TBSCl (466 mg, 3.09 mmol) was added dropwise to a mixture of 7-(benzyloxy)-3-(hydroxymethyl)chroman-4-one (800 mg, 2.81 mmol), imidazole (383 mg, 5.63 mmol), and dichloromethane (10 mL) that had been cooled to 0° C. The mixture was stirred for 0.5 hours with gradual warming to room temperature, and then the mixture was stirred at room temperature for 6 hours. The mixture was washed with $H_2O$ (20 mL) and extracted with ethyl acetate (20 mL×3). The combined organic extracts were dried over anhydrous $Na_2SO_4$, filtered, and concentrated to dryness under reduced pressure to give the product, which was purified by FCC (eluent:petroleum ether:ethyl acetate, 1:0 to 9:1, gradient elution) to afford title compound (880 mg, 78%) as a yellow solid. MS (ESI): mass calcd. for $C_{23}H_{30}O_4Si$ 398.19 m/z found 399.5 $[M+H]^+$.

Step D: (R,S)-3-(((tert-Butyldimethylsilyl)oxy)methyl)-7-hydroxychroman-4-one. Wet Pd/C (100 mg, 10 wt. %) was added to a solution of 7-(benzyloxy)-3-(((tert-butyldimethylsilyl)oxy)methyl)chroman-4-one (780 mg, 1.96 mmol) and ethyl acetate (10 mL) under Ar. The mixture was stirred under a $H_2$ atmosphere (15 psi) at room temperature for 0.5 hours. The suspension was filtered through a pad of diatomaceous earth and the pad washed with ethyl acetate (20 mL×2). The filtrate was concentrated to dryness under reduced pressure to give the product, which was purified by FCC (eluent:petroleum ether:ethyl acetate, 1:0 to 9:1, gradient elution) to give the title compound (600 mg, 98%) as a white solid. MS (ESI): mass calcd. for $C_{16}H_{24}O_4Si$ 308.14 m/z found 309.4 $[M+H]^+$.

Step E: 4-((1*R)-((3-(((tert-Butyldimethylsilyl)oxy)methyl)-4-oxochroman-7-yl)oxy)(pyridin-4-yl)methyl)benzamide. DIAD (226 mg, 1.12 mmol) was added to a solution of 3-(((tert-butyldimethylsilyl)oxy)methyl)-7-hydroxychroman-4-one (230 mg, 0.746 mmol), (*S)-4-(hydroxy(pyridin-4-yl)methyl)benzamide (Intermediate 107b, 170 mg, 0.745 mmol), $PPh_3$ (293 mg, 1.12 mmol), and THF (5 mL) that was cooled to 0° C. The mixture was stirred for 12 hours with gradual warming to room temperature before pouring it into water (30 mL) and extracting with ethyl acetate (30 mL×2). The organic extracts were dried over anhydrous $Na_2SO_4$, filtered, and concentrated to dryness under reduced pressure to give the product, which was purified by FCC (eluent:petroleum ether:ethyl acetate, 1:1 to 0:1, gradient elution) to afford the title compound (260 mg, 67%) as a white solid. MS (ESI): mass calcd. for $C_{29}H_{34}N_2O_5Si$ 518.22 m/z found 519.1 $[M+H]^+$.

Intermediate 47: (R,S)-4-(((3,3-Dimethyl-4-oxochroman-7-yl)oxy)(pyridin-4-yl)methyl)benzonitrile

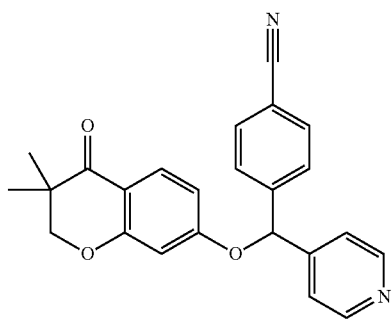 [SMILES: CC1(C)COc2cc(OC(c3ccncc3)c3ccc(C#N)cc3)ccc2C1=O]

Step A: 7-(Benzyloxy)-3,3-dimethylchroman-4-one. t-BuOK (3.5 g, 31 mmol) was added to a solution of 7-(benzyloxy)chroman-4-one (Intermediate 46, Step A, 1.6 g, 6.3 mmol), iodomethane (7.55 g, 53.2 mmol), and THF (15 mL) that had been cooled to −78° C. The mixture was stirred for 3 hours with gradual warming to room temperature before quenching with saturated $NH_4Cl$ (60 mL) and extracting with ethyl acetate (50 mL×3). The combined organic extracts were dried over anhydrous $Na_2SO_4$, filtered, and concentrated to dryness under reduced pressure to give the product, which was purified by FCC (eluent:petroleum ether:ethyl acetate, 10:1 to 1:1, gradient elution) to afford the title compound (1.25 g) as a brown solid. MS (ESI): mass calcd. for $C_{18}H_{18}O_3$ 282.13, m/z found 283.3 $[M+H]^+$. $^1H$ NMR (400 MHz, $CDCl_3$) δ 7.87-7.80 (m, 1H), 7.43-7.39 (m, 3H), 7.39-7.36 (m, 1H), 7.35-7.31 (m, 1H), 6.65 (dd, J=8.8, 2.4 Hz, 1H), 6.46 (d, J=2.2 Hz, 1H), 5.07 (s, 2H), 4.23-3.99 (m, 2H), 1.17 (s, 6H).

Step B: 7-Hydroxy-3,3-dimethylchroman-4-one. A mixture of 7-(benzyloxy)-3,3-dimethylchroman-4-one (900 mg, 3.19 mmol), ethyl acetate (15 mL), and wet Pd/C (600 mg, 10 wt. %) was degassed under vacuum and purged with $H_2$ three times. The mixture was stirred under $H_2$ (15 psi) at room temperature for 3 hours. The suspension was filtered through a pad of diatomaceous earth and the pad washed with ethyl acetate (10 mL). The filtrate was concentrated to dryness under reduced pressure to give the product, which was purified by FCC (eluent: petroleum ether:ethyl acetate, 1:0 to 3:1, gradient elution) to give the title compound (450 mg, 61%) as a yellow solid. MS (ESI): mass calcd. for $C_{11}H_{12}O_3$ 192.08, m/z found 192.9 $[M+H]^+$. $^1H$ NMR (400 MHz, DMSO-$d_6$) δ 10.58 (s, 1H), 7.67-7.61 (m, 1H), 6.57-6.49 (m, 1H), 6.37-6.31 (m, 1H), 4.17 (s, 2H), 1.09 (s, 6H).

Step C: (R,S)-4-(((3,3-Dimethyl-4-oxochroman-7-yl)oxy)(pyridin-4-yl)methyl)benzonitrile. DIAD (615 µL, 3.12 mmol) was added to a solution of 7-hydroxy-3,3-dimethylchroman-4-one (400 mg, 2.08 mmol), 4-(hydroxy(pyridin-4-yl)methyl)benzonitrile (Intermediate 8, 481 mg, 2.29 mmol), $PPh_3$ (710 mg, 2.71 mmol), and dichloromethane (10 mL) that had been cooled to 0° C. The mixture was gradually warmed to room temperature and stirred for 12 hours before concentrating to dryness under reduced pressure, pouring it into water (30 mL) and extracting with ethyl acetate (50 mL×3). The combined organic extracts were dried over anhydrous $Na_2SO_4$, filtered, and concentrated to dryness under reduced pressure to give the product, which was purified by FCC (eluent:petroleum ether:ethyl acetate, 10:1 to 1:1, gradient elution) to afford the title compound (500 mg) as a yellow oil, which was used in the next step without further purification. MS (ESI): mass calcd. for $C_{24}H_{20}N_2O_3$ 384.15, m/z found 385.0 $[M+H]^+$.

Intermediate 48: (R,S)-4-((4-Chlorophenyl)((8-methyl-4-oxochroman-7-yl)oxy)methyl)benzonitrile

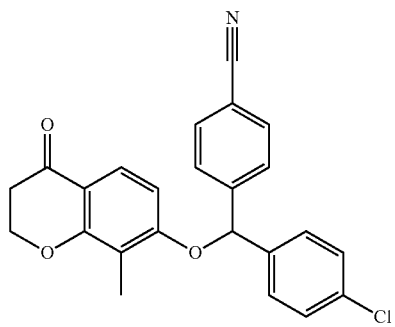 [SMILES: Cc1c(OC(c2ccc(Cl)cc2)c2ccc(C#N)cc2)ccc2c1OCCC2=O]

DEAD (624 mg, 3.58 mmol) was added to a 25 mL round-bottomed flask containing a solution of 4-((4-chlorophenyl)(hydroxy)methyl)benzonitrile (Intermediate 27, Step A, 672 mg, 2.76 mmol), 7-hydroxy-8-methylchroman-4-one (Intermediate 40, Step B, 400 mg, 2.24 mmol), $PPh_3$ (892 mg, 3.40 mmol), and anhydrous dichloromethane (5 mL). The mixture was stirred at room temperature for 14 hours before pouring it into water (20 mL) and extracting with dichloromethane (15 mL×3). The combined organic extracts were washed with brine (20 mL), dried over anhydrous Na$_2$SO$_4$, filtered, and concentrated to dryness under reduced pressure to give the product, which was purified by FCC (eluent:petroleum ether:ethyl acetate, 1:0 to 0:1, gradient elution) to afford the title compound (1 g) as a yellow oil, which was used in the next step without further purification. MS (ESI): mass calcd. for C$_{24}$H$_{18}$ClNO$_3$ 403.10 m/z found 403.8 [M+H]$^+$.

Intermediate 49: (R,S)-4-(((6-Fluoro-8-methyl-4-oxochroman-7-yl)oxy)(pyridin-4-yl)methyl)benzonitrile

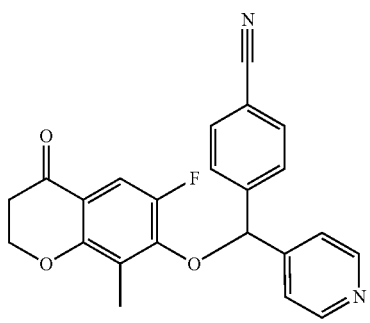 [SMILES: Cc1c(OC(c2ccncc2)c2ccc(C#N)cc2)c(F)cc2c1OCCC2=O]

Step A: 8-Bromo-6-fluoro-7-hydroxychroman-4-one. NBS (860 mg, 4.83 mmol) was added to a mixture of 6-fluoro-7-hydroxychroman-4-one (Intermediate 43, Step B, 800 mg, 4.39 mmol) and anhydrous dichloromethane (20 mL). The mixture was stirred at room temperature for 16 hours before cooling to 0° C. and quenching with saturated Na$_2$SO$_3$ (50 mL). The mixture was stirred at room temperature for another 0.5 hours before adjusting the pH of the solution to pH 5 with 1 N HCl and extracting with ethyl acetate (30 mL×5). The combined organic extracts were washed with brine (10 mL), dried over anhydrous Na$_2$SO$_4$, filtered, and concentrated to dryness under reduced pressure to give the product, which was purified by FCC (eluent: petroleum ether:ethyl acetate, 10:1 to 1:1, gradient elution) to afford the title compound (400 mg, 32%) as a pale yellow oil. MS (ESI): mass calcd. for C$_9$H$_6$BrFO$_3$ 259.95 m/z found 262.9 [M+H]$^+$.

Step B: (R,S)-4-(((8-Bromo-6-fluoro-4-oxochroman-7-yl)oxy)(pyridin-4-yl)methyl)benzonitrile. DIAD (372 mg, 1.84 mmol) was added to a solution of 6-fluoro-7-hydroxy-8-methylchroman-4-one (Intermediate 81, 240 mg, 0.919 mmol), 4-(hydroxy(pyridin-4-yl)methyl)benzonitrile (Intermediate 8, 213 mg, 1.01 mmol), n-Bu$_3$P (465 mg, 2.30 mmol), and THF (3 mL). The mixture was heated at 70° C. for 2 hours before cooling to room temperature, quenching with water (10 mL), and extracting with ethyl acetate (5 mL×4). The combined organic extracts were dried over anhydrous Na$_2$SO$_4$, filtered, and concentrated to dryness under reduced pressure to give the product, which was purified by preparative TLC (eluent:petroleum ether:ethyl acetate, 1:1) to afford the title compound (180 mg) as a pale yellow solid, which was used in the next step without further purification. MS (ESI): mass calcd. for C$_{22}$H$_{14}$BrFN$_2$O$_3$ 452.02 m/z found 452.9 [M+H]$^+$. $^1$H NMR (400 MHz, CDCl$_3$) δ 8.62 (d, J=5.7 Hz, 2H), 7.69-7.57 (m, 4H), 7.54 (d, J=11.7 Hz, 1H), 7.41 (d, J=6.0 Hz, 2H), 6.69 (s, 1H), 4.63 (t, J=6.4 Hz, 2H), 2.80 (t, J=6.4 Hz, 2H).

Step C: (R,S)-4-(((6-Fluoro-8-methyl-4-oxochroman-7-yl)oxy)(pyridin-4-yl)methyl)benzonitrile. 4-(((8-Bromo-6-fluoro-4-oxochroman-7-yl)oxy)(pyridin-4-yl)methyl)benzonitrile (160 mg), trimethylboroxine (89 mg, 0.71 mmol), and CsF (161 mg, 1.06 mmol) were added to a 10 mL microwave tube and the resulting mixture dissolved in 1,4-dioxane (4 mL) and H$_2$O (0.5 mL). The mixture was sparged with Ar for 5 minutes and then treated with Pd(dppf)Cl$_2$ (52 mg, 0.071 mmol). The mixture was sparged with Ar for another 5 minutes and then heated at 100° C. via microwave irradiation for 1 hour before cooling to room temperature, pouring it into H$_2$O (20 mL) and extracting with ethyl acetate (20 mL×4). The combined organic extracts were dried over anhydrous Na$_2$SO$_4$, filtered, and concentrated to dryness under reduced pressure to afford the product, which was purified by preparative TLC (eluent: petroleum ether:ethyl acetate, 1:1) to afford the title compound (80 mg) as a pale yellow solid. MS (ESI): mass calcd. for C$_{23}$H$_{17}$FN$_2$O$_3$ 388.12 m/z found 389.1 [M+H]$^+$. $^1$H NMR (400 MHz, CDCl$_3$) δ 8.66-8.60 (m, 2H), 7.69-7.64 (m, 2H), 7.49 (d, J=8.2 Hz, 2H), 7.44 (d, J=12.1 Hz, 1H), 7.33-7.29 (m, 2H), 6.44 (s, 1H), 4.54-4.48 (m, 2H), 2.79-2.72 (m, 2H), 2.01 (s, 3H).

Intermediate 50: (R,S)-4-((4-Bromophenyl)((8-methyl-4-oxochroman-7-yl)oxy)methyl)benzamide

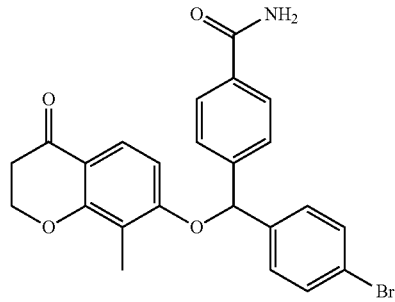 [SMILES: Cc1c(OC(c2ccc(Br)cc2)c2ccc(C(N)=O)cc2)ccc2c1OCCC2=O]

Step A: (R,S)-4-((4-Bromophenyl)(hydroxy)methyl)benzonitrile. i-PrMgCl·LiCl (8.0 mL, 1.3 M in THF, 10 mmol) was added dropwise to a solution of 4-iodobenzonitrile (2.0 g, 8.7 mmol) and THF (20 mL) that was cooled to 0° C. The mixture was stirred at 0° C. for 1 hour and then added dropwise to a 0° C. solution of 4-bromobenzaldehyde (1.6 g, 8.6 mmol) and THF (5 mL). The mixture was stirred at 0° C. for another 1 hour and then stirred for 2 hours with gradual warming to room temperature before quenching with saturated NH$_4$Cl (20 mL) and extracting with ethyl acetate (30 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 9:1 to 2:1, gradient elution) to afford the title compound (1.8 g, 57%) as a white solid. MS (ESI): mass calcd. for C$_{14}$H$_{10}$BrNO 286.99 m/z found 289.8 [M+H]$^+$. $^1$H NMR (400 MHz, DMSO-d$_6$) δ 7.79 (d, J=8.4 Hz, 2H), 7.61-7.49 (m, 4H), 7.35 (d, J=8.4 Hz, 2H), 6.27 (br s, 1H), 5.81 (s, 1H).

Step B: (R,S)-4-((4-Bromophenyl)((8-methyl-4-oxochroman-7-yl)oxy)methyl)benzonitrile. DIAD (1.2 g, 5.9 mmol) was added to a 0° C. solution of 7-hydroxy-8-methylchroman-4-one (Intermediate 40, Step B, 715 mg, 4.01 mmol), 4-((4-bromophenyl)(hydroxy)methyl)benzonitrile (1.75 g, 4.80 mmol), PPh$_3$ (1.6 g, 6.1 mmol), and THF (10 mL). The mixture was stirred for 12 hours with gradual warming to room temperature before pouring it into water (40 mL) and extracting with ethyl acetate (40 mL×2). The combined organic extracts were dried over anhydrous Na$_2$SO$_4$, filtered and concentrated to dryness under reduced pressure to give the product, which was purified by FCC (eluent: petroleum ether:ethyl acetate, 10:1 to 1:1, gradient elution) to afford the title compound (1.55 g, 68%) as a brown solid. MS (ESI): mass calcd. for C$_{24}$H$_{18}$BrNO$_3$ 447.05 m/z found 448.0 [M+H]$^+$.

Step C: (R,S)-4-((4-Bromophenyl)((8-methyl-4-oxochroman-7-yl)oxy)methyl)benzamide. H$_2$O$_2$ (2.7 mL, 30% purity, 27 mmol) was added dropwise to a solution of 4-((4-bromophenyl)((8-methyl-4-oxochroman-7-yl)oxy)methyl)benzonitrile (1.5 g, 2.6 mmol), K$_2$CO$_3$ (1.83 g, 13.2 mmol), and DMSO (8 mL) that had been cooled to 0° C. The mixture was stirred at room temperature for 1 hour before pouring it into saturated Na$_2$SO$_3$ (15 mL). The suspension was isolated via filtration and the filter cake washed with water (10 mL×2) before drying under reduced pressure to give the product, which was purified by FCC (eluent: petroleum ether:ethyl acetate, 10:1 to 9:1, gradient elution) to afford the title compound (1.0 g, 63%) as a white solid. MS (ESI): mass calcd. for C$_{24}$H$_{20}$BrNO$_4$ 465.06 m/z found 467.8 [M+H]$^+$. $^1$H NMR (400 MHz, DMSO-d$_6$) δ 7.93 (br s, 1H), 7.84 (d, J=8.4 Hz, 2H), 7.59-7.55 (m, 4H), 7.53-7.46 (m, 4H), 6.79 (s, 1H), 6.72 (d, J=9.0 Hz, 1H), 4.52 (t, J=6.3 Hz, 2H), 2.68 (t, J=6.3 Hz, 2H), 2.20 (s, 3H).

Intermediate 51: (R,S)-4-((3-Bromophenyl)((8-methyl-4-oxochroman-7-yl)oxy)methyl)benzamide

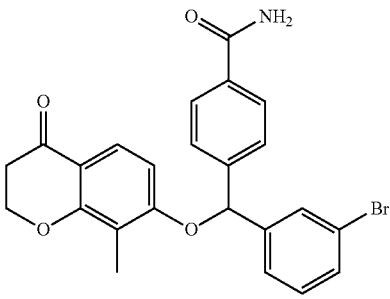 [SMILES: Cc1c(OC(c2ccc(C(N)=O)cc2)c2cccc(Br)c2)ccc2c1OCCC2=O]

Step A: (R,S)-4-((3-Bromophenyl)(hydroxy)methyl)benzonitrile. 4-Iodobenzonitrile (2.0 g, 8.7 mmol) was added to a 100 mL round-bottomed flask containing a solution of i-PrMgCl·LiCl (8.0 mL, 1.3M in THF, 10 mmol) and THF (15 mL) that was cooled to 0° C. The mixture was stirred at 0° C. for 1 hour before treating with 3-bromobenzaldehyde (1.62 g, 8.76 mmol). The mixture was stirred at 0° C. for another 2 hours before quenching with saturated NH$_4$Cl (20 mL) and extracting with ethyl acetate (30 mL×3). The combined organic extracts were washed with brine (10 mL), dried over anhydrous Na$_2$SO$_4$, filtered, and concentrated to dryness under reduced pressure to afford the product, which was further purified by FCC (eluent: petroleum ether:ethyl acetate, 1:0 to 3:1, gradient elution) to afford the product (2.2 g, 87%) as a yellow oil. $^1$H NMR (400 MHz, DMSO-d$_6$) δ 7.82-7.78 (m, 2H), 7.63-7.59 (m, 3H), 7.46-7.42 (m, 1H), 7.41-7.37 (m, 1H), 7.31 (d, J=8.0 Hz, 1H), 6.32 (d, J=4.0 Hz, 1H), 5.83 (d, J=4.0 Hz, 1H).

Step B: (R,S)-4-((3-Bromophenyl)((8-methyl-4-oxochroman-7-yl)oxy)methyl)benzonitrile. DIAD (1.07 g, 5.29 mmol) was added dropwise to a solution of 4-((3-bromophenyl)(hydroxy)methyl)benzonitrile (1.0 g, 3.5 mmol), 7-hydroxy-8-methylchroman-4-one (Intermediate 40, Step B, 0.68 g, 3.8 mmol), PPh$_3$ (1.47 g, 5.61 mmol), and THF (15 mL) under N$_2$ atmosphere. The mixture was stirred at room temperature for 16 hours before concentrating to dryness under reduced pressure to give the product, which was purified by FCC (eluent:petroleum ether:ethyl acetate, 1:0 to 3:2, gradient elution) to afford the title compound (1.8 g, 90%) as a brown solid. MS (ESI): mass calcd. for C$_{24}$H$_{18}$BrNO$_3$ 447.05 m/z found 447.9 [M+H]$^+$.

Step C: (R,S)-4-((3-Bromophenyl)((8-methyl-4-oxochroman-7-yl)oxy)methyl)benzamide. H$_2$O$_2$ (3.8 mL, 30% purity, 38 mmol) was added dropwise to a mixture of 4-((3-bromophenyl)((8-methyl-4-oxochroman-7-yl)oxy)methyl)benzonitrile (1.7 g, 3.8 mmol), K$_2$CO$_3$ (2.62 g, 19.0 mmol), and DMSO (10 mL). The mixture was stirred at room temperature for 0.5 hours before pouring it into saturated Na$_2$SO$_3$ (20 mL) and isolating via filtration. The filter cake was washed with water (10 mL×3) before drying under reduced pressure to afford the title compound (1.5 g, 59%) as a yellow solid. MS (ESI): mass calcd. for C$_{24}$H$_{20}$BrNO$_4$ 465.06 m/z found 467.9 [M+H]$^+$.

Intermediate 52: (R,S)-4-((2-Iodophenyl)((8-methyl-4-oxochroman-7-yl)oxy)methyl)benzamide

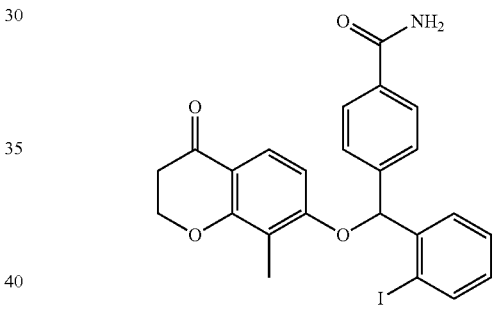

Step A: (R,S)-4-(Hydroxy(2-iodophenyl)methyl)benzonitrile. i-PrMgCl·LiCl (8.0 mL, 1.3 M in THF, 10 mmol) was added dropwise to a solution of 4-iodobenzonitrile (2.4 g, 10 mmol) and THF (20 mL) that had been cooled to 0° C. The mixture was stirred at 0° C. for 1 hour before treating with a solution of 2-iodobenzaldehyde (2.0 g, 8.6 mmol) and THF (10 mL) dropwise at 0° C. Then the mixture was stirred for 16 hours with gradual warming to room temperature before pouring it into saturated NH$_4$Cl (60 mL) and extracting with ethyl acetate (40 mL×3). The combined organic extracts were dried over anhydrous Na$_2$SO$_4$, filtered, and concentrated to dryness under reduced pressure to give the product, which was purified by FCC (eluent: petroleum ether:ethyl acetate, 1:0 to 3:1, gradient elution) to afford the title product (2.1 g), as a yellow oil. MS (ESI): mass calcd. for C$_{14}$H$_{10}$INO 334.98 m/z found 336.0 [M+H]$^+$. $^1$H NMR (400 MHz, DMSO-d6) δ 7.87-7.83 (m, 1H), 7.80 (d, J=8.3 Hz, 2H), 7.55-7.48 (m, 3H), 7.47-7.40 (m, 1H), 7.09-7.02 (m, 1H), 6.39 (s, 1H), 5.90 (s, 1H).

Step B: (R,S)-4-((2-Iodophenyl)((8-methyl-4-oxochroman-7-yl)oxy)methyl)benzonitrile. DIAD (1.9 g, 9.4 mmol) was added to 7-hydroxy-8-methylchroman-4-one (Intermediate 40, Step B, 1.3 g, 7.3 mmol), 4-(hydroxy(2-iodophenyl)methyl)benzonitrile (2.0 g, 6.0 mmol), PPh$_3$ (2.5 g, 9.5 mmol), and dichloromethane (15 mL). The mixture was stirred at room temperature for 1 hour before concentrating to dryness under reduced pressure to give the product, which was purified by FCC (eluent:petroleum ether:ethyl acetate, 10:1 to 2:1, gradient elution) to afford the title compound (3 g) as a yellow oil, which was used in the next step without further purification. MS (ESI): mass calcd. for $C_{24}H_{18}INO_3$ 495.03 m/z found 496.0 $[M+H]^+$.

Step C: (R,S)-4-((2-Iodophenyl)((8-methyl-4-oxochroman-7-yl)oxy)methyl)benzamide. $H_2O_2$ (1.8 mL, 30% purity, 18 mmol) was added dropwise to a mixture of 4-((2-iodophenyl)((8-methyl-4-oxochroman-7-yl)oxy)methyl)benzonitrile (3.0 g), $K_2CO_3$ (2.1 g, 15 mmol), and DMSO (10 mL). The mixture was stirred at room temperature for 1 hour before pouring it into saturated $Na_2SO_3$ (80 mL) and extracting with ethyl acetate (50 mL×3). The combined organic extracts were dried over anhydrous $Na_2SO_4$, filtered, and concentrated to dryness under reduced pressure to afford the product, which was purified by FCC (eluent:petroleum ether:ethyl acetate, 1:0 to 0:1, gradient elution) to afford the title product (1.0 g) as a yellow oil. MS (ESI): mass calcd. for $C_{24}H_{20}INO_4$ 513.04 m/z found 514.0 $[M+H]^+$.

Intermediate 53: (R,S)-4-((5-Chloropyridin-2-yl)((8-methyl-4-oxochroman-7-yl)oxy)methyl)benzonitrile

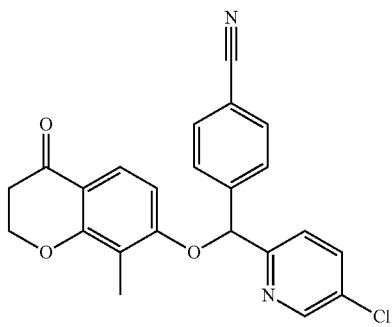 [SMILES: Cc1c(OC(c2ccc(C#N)cc2)c2ccc(Cl)cn2)ccc2c1OCCC2=O]

Step A: (R,S)-4-((5-Chloropyridin-2-yl)(hydroxy)methyl) benzonitrile. i-PrMgCl·LiCl (7.7 mL, 1.3 M in THF, 10 mmol) was added dropwise to a solution of 4-iodobenzonitrile (1.37 g, 5.98 mmol) and THF (10 mL) that had been cooled to −15° C. The mixture was stirred at −15° C. for 0.5 hours before treating a solution of 5-chloropicolinaldehyde (770 mg, 5.44 mmol) and THF (5 mL) dropwise at −15° C. Then the mixture was stirred for another 2 hours at −15° C. before quenching with saturated $NH_4Cl$ (30 mL) and extracting with ethyl acetate (20 mL×3). The combined organic extracts were dried over anhydrous $Na_2SO_4$, filtered, and concentrated to dryness under reduced pressure to give the product, which was purified by FCC (eluent: petroleum ether:ethyl acetate, 1:0 to 1:1, gradient elution) to afford the title compound (500 mg, 38%) as a brown solid. MS (ESI): mass calcd. for $C_{13}H_9ClN_2O$ 244.04 m/z found 245.0 $[M+H]^+$.

Step B: (R,S)-4-((5-Chloropyridin-2-yl)((8-methyl-4-oxochroman-7-yl)oxy)methyl)benzonitrile. DIAD (630 mg, 3.12 mmol) was added to 4-((5-chloropyridin-2-yl)(hydroxy)methyl)benzonitrile (481 mg, 1.97 mmol), 7-hydroxy-8-methylchroman-4-one (Intermediate 40, Step B, 350 mg, 1.96 mmol), $PPh_3$ (788 mg, 3.00 mmol), and anhydrous dichloromethane (10 mL). The mixture was stirred at room temperature for 5 hours before concentrating to dryness under reduced pressure to give the product, which was purified by FCC (eluent:petroleum ether:ethyl acetate, 1:0 to 1:1, gradient elution) to afford the title compound (800 mg, 78%) as a brown solid. MS (ESI): mass calcd. for $C_{23}H_{17}ClN_2O_3$ 404.09 m/z found 405.0 $[M+H]^+$.

Intermediate 54: (R,S)-6-((4-Chlorophenyl)((8-methyl-4-oxochroman-7-yl)oxy)methyl)nicotinonitrile

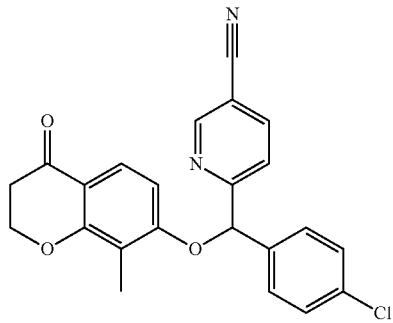 [SMILES: Cc1c(OC(c2ccc(Cl)cc2)c2ccc(C#N)cn2)ccc2c1OCCC2=O]

Step A: (R,S)-6-((4-Chlorophenyl)(hydroxy)methyl)nicotinonitrile. (4-Chlorophenyl)magnesium bromide (6.7 mL, 1 M in THF, 6.7 mmol) was added dropwise to a solution of 6-formylpicolinonitrile (800 mg, 6.06 mmol) and THF (15 mL) that had been cooled to −40° C. The mixture was stirred at −40° C. for 2 hours before pouring into saturated $NH_4Cl$ (50 mL) and extracting with ethyl acetate (50 mL×3). The combined organic extracts were dried over $Na_2SO_4$, filtered, and concentrated to dryness under reduced pressure to give the product, which was purified by FCC (eluent:petroleum ether:ethyl acetate, 1:0 to 3:1, gradient elution) to afford the title compound (900 mg, 59%) as a light yellow solid. MS (ESI): mass calcd. for $C_{13}H_9ClN_2O$ 244.04 m/z found 245.0 $[M+H]^+$.

Step B: (R,S)-6-((4-Chlorophenyl)((8-methyl-4-oxochroman-7-yl)oxy)methyl)nicotinonitrile. DEAD (0.60 mL, 3.8 mmol) was added to a solution of 7-hydroxy-8-methylchroman-4-one (Intermediate 40, Step B, 328 mg, 1.84 mmol), 6-((4-chlorophenyl)(hydroxy)methyl)nicotinonitrile (450 mg, 1.84 mmol), $PPh_3$ (965 mg, 3.68 mmol), and dichloromethane (10 mL). The mixture was stirred at room temperature for 16 hours before concentrating to dryness under reduced pressure to give the product, which was purified by FCC (eluent:petroleum ether:ethyl acetate, 20:1 to 4:1, gradient elution) to afford the title compound (1.0 g) as a yellow oil, which was used in the next step without further purification. MS (ESI): mass calcd. for $C_{23}H_{17}ClN_2O_3$ 404.09 m/z found 405.1 $[M+H]^+$.

Intermediate 55: (R,S)-5-((4-Chlorophenyl)((8-methyl-4-oxochroman-7-yl)oxy)methyl)picolinonitrile

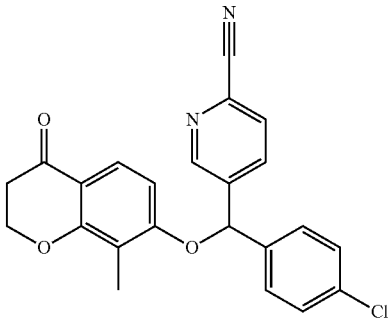 [SMILES: Cc1c(OC(c2ccc(Cl)cc2)c2ccc(C#N)nc2)ccc2c1OCCC2=O]

Step A: (R,S)-5-((4-Chlorophenyl)(hydroxy)methyl)picolinonitrile. (4-Chlorophenyl)magnesium bromide (4.2 mL, 1 M in THF, 4.2 mmol) was added dropwise to 5-formylpicolinonitrile (500 mg, 3.78 mmol) and THF (15 mL) that had been cooled to −15° C. The mixture was stirred at −15° C. for 2 hours before pouring into saturated NH$_4$Cl (20 mL) and extracting with ethyl acetate (20 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 0:1, gradient elution) to afford the title compound (810 mg, 75%) as a pale brown oil. MS (ESI): mass calcd. for C$_{13}$H$_9$ClN$_2$O 244.04 m/z found 244.9 [M+H]$^+$.

Step B: (R,S)-5-((4-Chlorophenyl)((8-methyl-4-oxochroman-7-yl)oxy)methyl)picolinonitrile. DEAD (648 mg, 3.72 mmol) was added to 5-((4-chlorophenyl)(hydroxy)methyl)picolinonitrile (700 mg, 2.86 mmol), 7-hydroxy-8-methylchroman-4-one (Intermediate 40, Step B, 415 mg, 2.33 mmol), PPh$_3$ (925 mg, 3.53 mmol), and anhydrous dichloromethane (10 mL). The mixture was stirred at room temperature for 15 hours before concentrating to dryness under reduced pressure to give the product, which was further purified by FCC (eluent:petroleum ether:ethyl acetate, 1:0 to 0:1, gradient elution) to afford the title compound (1 g, 46%) as a brown oil. MS (ESI): mass calcd. for C$_{23}$H$_{17}$ClN$_2$O$_3$ 404.09 m/z found 404.9 [M+H]$^+$.

Intermediate 56: (R,S)-2-((4-cyanophenyl)((8-methyl-4-oxochroman-7-yl)oxy)methyl)pyridine 1-oxide

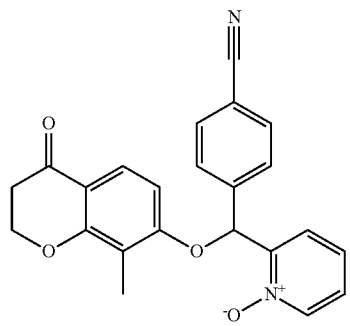

Step A: (R,S)-4-(Hydroxy(pyridin-2-yl)methyl)benzonitrile. 4-Iodobenzonitrile (2.0 g, 8.7 mmol) was added to a solution of i-PrMgCl·LiCl (8.1 mL, 1.3 M in THF, 11 mmol) and THF (15 mL) that had been cooled to 0° C. The mixture was stirred at 0° C. for 1 hour before treating with picolinaldehyde (0.94 g, 8.8 mmol). The mixture was then stirred at 0° C. for another 2 hours before quenching with saturated NH$_4$Cl (20 mL) and extracting with ethyl acetate (50 mL×3). The combined organic extracts were washed with brine (10 mL), dried over anhydrous Na$_2$SO$_4$, filtered, and concentrated to dryness under reduced pressure to give the product, which was further purified by FCC (eluent:petroleum ether:ethyl acetate, 1:0 to 2:3, gradient elution) to afford the title compound (1.25 g) as a brown oil. $^1$H NMR (400 MHz, DMSO-d$_6$) δ 8.47 (dd, J=4.7, 0.8 Hz, 1H), 7.84-7.80 (m, 1H), 7.78 (d, J=8.4 Hz, 2H), 7.62 (d, J=8.2 Hz, 2H), 7.59 (d, J=7.9 Hz, 1H), 7.29-7.24 (m, 1H), 6.39 (d, J=4.4 Hz, 1H), 5.81 (d, J=4.4 Hz, 1H).

Step B: (R,S)-4-(((8-Methyl-4-oxochroman-7-yl)oxy)(pyridin-2-yl)methyl)benzonitrile. DIAD (1.46 g, 7.22 mmol) was added dropwise to a solution of 4-(hydroxy(pyridin-2-yl)methyl)benzonitrile (1.0 g, 4.8 mmol), 7-hydroxy-8-methylchroman-4-one (Intermediate 40, Step B, 0.91 g, 5.1 mmol), PPh$_3$ (2.0 g, 7.6 mmol), and THF (15 mL) under N$_2$ atmosphere. The mixture was stirred for 16 hours at room temperature before concentrating to dryness under reduced pressure to give the product, which was purified by FCC (eluent:petroleum ether:ethyl acetate, 1:0 to 1:1, gradient elution) to afford the title compound (1.7 g, 60%, impure) as a yellow solid. MS (ESI): mass calcd. for C$_{23}$H$_{18}$N$_2$O$_3$ 370.13 m/z found 371.0 [M+H]$^+$.

Step C: (R,S)-2-((4-Cyanophenyl)((8-methyl-4-oxochroman-7-yl)oxy)methyl)pyridine 1-oxide. 3-Chlorobenzoperoxoic acid (1.87 g, 8.67 mmol) was added to a solution of 4-(((8-methyl-4-oxochroman-7-yl)oxy)(pyridin-2-yl)methyl)benzonitrile (1.6 g, 4.3 mmol), and dichloromethane (10 mL). The mixture was stirred for 16 hours at room temperature before pouring it into water (20 mL) and extracting with dichloromethane (30 mL×3). The combined organic extracts were washed with brine (20 mL), dried over anhydrous Na$_2$SO$_4$, filtered, and concentrated to dryness under reduced pressure to give the product, which was purified by FCC (eluent: ethyl acetate:methanol, 1:0 to 9:1, gradient elution) to afford the title compound (760 mg, 20%) as a yellow solid. MS (ESI): mass calcd. for C$_{23}$H$_{18}$N$_2$O$_4$ 386.13 m/z found 386.9 [M+H]$^+$.

Intermediate 57: (R,S)-4-((4-Fluorophenyl)((8-methyl-4-oxochroman-7-yl)oxy)methyl)benzonitrile

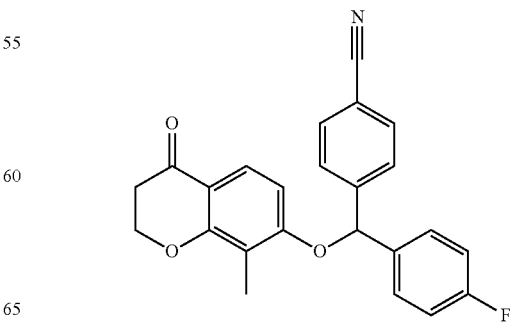

Step A: (R,S)-4-((4-Fluorophenyl)(hydroxy)methyl)benzonitrile. i-PrMgCl·LiCl (8.06 mL, 1.3 M in THF, 10.5 mmol) was added dropwise to a solution of 4-iodobenzonitrile (2.00 g, 8.73 mmol) and THF (10 mL) that had been cooled to 0° C. The mixture was stirred at 0° C. for 1 hour before treating with a solution of 4-fluorobenzaldehyde (1.30 g, 10.5 mmol) and THF (10 mL) dropwise at 0° C. The mixture was stirred for 16 hours with gradual warming to room temperature before pouring it into saturated NH$_4$Cl (80 mL) and extracting with ethyl acetate (50 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 3:1, gradient elution) to afford the title compound (1.65 g, 83%), as a yellow solid. $^1$H NMR (400 MHz, DMSO-d$_6$) δ 7.77 (d, J=8.4 Hz, 2H), 7.57 (d, J=8.2 Hz, 2H), 7.47-7.38 (m, 2H), 7.17-7.09 (m, 2H), 6.22 (br s, 1H), 5.82 (s, 1H).

Step B: (R,S)-4-((4-Fluorophenyl)((8-methyl-4-oxochroman-7-yl)oxy)methyl)benzonitrile. DIAD (1.08 g, 5.34 mmol) was added to a solution of 4-((4-fluorophenyl)(hydroxy)methyl)benzonitrile (760 mg, 3.35 mmol), 7-hydroxy-8-methylchroman-4-one (Intermediate 40, Step B, 894 mg, 5.02 mmol), PPh$_3$ (1.40 g, 5.34 mmol), and THF (30 mL). The mixture was stirred at room temperature under N$_2$ for 16 hours before concentrating to dryness under reduced pressure to give the product, which was purified by FCC (eluent: petroleum ether:ethyl acetate, 1:0 to 2:1, gradient elution) to afford the title compound (2.5 g) as a yellow solid, which was used in the next step without further purification. MS (ESI): mass calcd. for C$_{24}$H$_{18}$FNO$_3$ 387.13 m/z, found 388.0 [M+H]$^+$. $^1$H NMR (400 MHz, DMSO-d$_6$) δ 7.83 (d, J=8.4 Hz, 2H), 7.70 (d, J=8.4 Hz, 2H), 7.60-7.54 (m, 2H), 7.50 (d, J=9.0 Hz, 1H), 7.23-7.15 (m, 2H), 6.86 (s, 1H), 6.69 (d, J=9.0 Hz, 1H), 4.50 (t, J=6.3 Hz, 2H), 2.67 (t, J=6.4 Hz, 2H), 2.18 (s, 3H).

Intermediate 58: (R,S)-4-((3-Fluorophenyl)((8-methyl-4-oxochroman-7-yl)oxy)methyl)benzonitrile

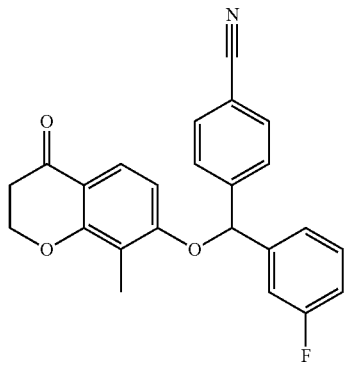 [SMILES: Cc1c(OC(c2ccc(C#N)cc2)c2cccc(F)c2)ccc2c1OCCC2=O]

Step A: (R,S)-4-((3-Fluorophenyl)(hydroxy)methyl)benzonitrile. (3-Fluorophenyl)magnesium bromide (16.8 mL, 1 M in THF, 16.8 mmol) was added dropwise to a solution of 4-formylbenzonitrile (2.0 g, 15 mmol), and THF (15 mL) under N$_2$ atmosphere that had been cooled to −78° C. The mixture was stirred for at −78° C. for 3 hours before quenching with saturated NH$_4$Cl (20 mL) and extracted with ethyl acetate (30 mL×3). The combined organic extracts were washed with brine (10 mL), dried over anhydrous Na$_2$SO$_4$, filtered, and concentrated to dryness under reduced pressure to give the product, which was purified by FCC (eluent:petroleum ether:ethyl acetate, 1:0 to 1:2, gradient elution) to afford the title compound (2.4 g, 63%) as a yellow oil. MS (ESI): mass calcd. for C$_{14}$H$_{10}$FNO 227.07 m/z, found 249.9 [M+Na]$^+$. $^1$H NMR (400 MHz, DMSO-d$_6$) δ 7.78 (d, J=8.4 Hz, 2H), 7.60 (d, J=8.4 Hz, 2H), 7.38-7.31 (m, 1H), 7.25-7.19 (m, 2H), 7.08-7.01 (m, 1H), 6.29 (d, J=4.0 Hz, 1H), 5.83 (d, J=4.0 Hz, 1H).

Step B: (R,S)-4-((3-Fluorophenyl)((8-methyl-4-oxochroman-7-yl)oxy)methyl)benzonitrile. DEAD (1.84 g, 10.6 mmol) was added to a solution of 4-((3-fluorophenyl)(hydroxy)methyl)benzonitrile (1.5 g, 6.6 mmol), 7-hydroxy-8-methylchroman-4-one (Intermediate 40, Step B, 1.18 g, 6.62 mmol), PPh$_3$ (2.77 g, 10.6 mmol), and anhydrous dichloromethane (30 mL). The mixture was stirred at room temperature under N$_2$ for 16 hours before concentrating to dryness under reduced pressure to give the product, which was purified by FCC (eluent:petroleum ether:ethyl acetate, 1:0 to 2:1, gradient elution) to afford the title compound (1.55 g) as a yellow solid, which was used in the next step without further purification. MS (ESI): mass calcd. for C$_{24}$H$_{18}$FNO$_3$ 387.13 m/z, found 388.1 [M+H]$^+$. $^1$H NMR (400 MHz, DMSO-d$_6$) δ 7.85-7.80 (m, 2H), 7.76-7.71 (m, 2H), 7.50 (d, J=8.8 Hz, 1H), 7.43-7.34 (m, 3H), 7.13-7.06 (m, 1H), 6.86 (s, 1H), 6.68 (d, J=9.0 Hz, 1H), 4.50 (t, J=6.4 Hz, 2H), 2.66 (t, J=6.4 Hz, 2H), 2.19 (s, 3H).

Intermediate 59: (R,S)-4-((2-Fluorophenyl)((8-methyl-4-oxochroman-7-yl)oxy)methyl)benzonitrile

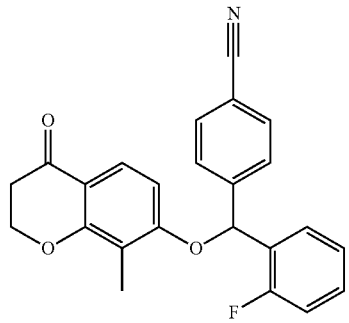 [SMILES: Cc1c(OC(c2ccc(C#N)cc2)c2ccccc2F)ccc2c1OCCC2=O]

Step A: (R,S)-4-((2-Fluorophenyl)(hydroxy)methyl)benzonitrile. i-PrMgCl·LiCl (5.1 mL, 1.3 M in THF, 6.6 mmol) was added dropwise to a solution of 4-iodobenzonitrile (1.5 g, 6.6 mmol) and THF (15 mL) that g had been cooled to 0° C. The mixture was stirred at 0° C. for 1.5 hours before treating with a solution of 2-fluorobenzaldehyde (677 mg, 5.46 mmol) and THF (5 mL) dropwise at 0° C. The mixture was stirred for 16 hours with gradual warming to room temperature before quenching with saturated NH$_4$Cl (50 mL) and extracting with ethyl acetate (40 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 3:1, gradient elution) to afford the title compound (590 mg, 47%) as a white solid. MS (ESI): mass calcd. for C$_{14}$H$_{10}$FNO 227.07 m/z found 228.1 [M+H]$^+$.

Step B: (R,S)-4-((2-Fluorophenyl)((8-methyl-4-oxochroman-7-yl)oxy)methyl)benzonitrile. DIAD (712 mg, 3.52 mmol) was added to a solution of 7-hydroxy-8-methylchroman-4-one (Intermediate 40, Step B, 392 mg, 2.20 mmol), 4-((2-fluorophenyl)(hydroxy)methyl)benzonitrile (500 mg, 2.20 mmol), PPh$_3$ (923 mg, 3.52 mmol), and THF (10 mL). The mixture was stirred at room temperature for 12 hours before pouring it into water (60 mL) and extracting with ethyl acetate (40 mL×3). The combined organic extracts were dried over anhydrous Na$_2$SO$_4$, filtered, and concentrated to dryness under reduced pressure to afford the product, which was purified under FCC (eluent:petroleum ether:ethyl acetate, 10:1 to 4:1, gradient elution) to afford the title compound (900 mg, 93%) as a yellow oil. MS (ESI): mass calcd. for C$_{24}$H$_{18}$FNO$_3$ 387.13 m/z found 388.0 [M+H]$^+$.

Intermediate 60: (R,S)-4-(((8-Methyl-4-oxochroman-7-yl)oxy)(phenyl)methyl)benzonitrile

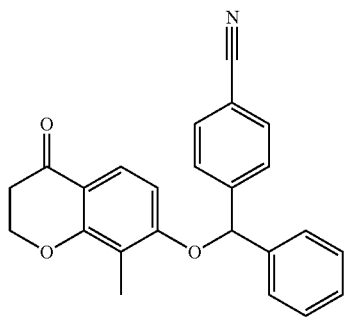 [SMILES: Cc1c(OC(c2ccccc2)c2ccc(C#N)cc2)ccc2c1OCCC2=O]

Step A: (R,S)-4-(Hydroxy(phenyl)methyl)benzonitrile. i-PrMgCl·LiCl (11 mL, 1.3 M in THF, 14 mmol) was added dropwise to a solution of 4-iodobenzonitrile (2.4 g, 10 mmol) and THF (15 mL) that had been cooled to −15° C. The mixture was stirred at −15° C. for 1 hour before treating with a solution of benzaldehyde (1.0 g, 9.4 mmol) and THF (5 mL) dropwise at −15° C. The mixture was stirred for 16 hours with gradual warming to room temperature before pouring it into saturated NH$_4$Cl (20 mL) and extracting with ethyl acetate (20 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 5:1 to 3:1, gradient elution) to give the title compound (1 g, 45%) as a light yellow solid. MS (ESI): mass calcd. for C$_{14}$H$_{11}$NO 209.08 m/z found 210.1[M+H]$^+$. $^1$H NMR (400 MHz, DMSO-d$_6$) δ 7.79-7.74 (m, 2H), 7.58 (d, J=7.9 Hz, 2H), 7.42-7.19 (m, 5H), 6.17 (br s, 1H), 5.80 (s, 1H).

Step B: (R,S)-4-(((8-Methyl-4-oxochroman-7-yl)oxy)(phenyl)methyl)benzonitrile. DIAD (0.67 mL, 3.7 mmol) was added to a solution of 4-(hydroxy(phenyl)methyl)benzonitrile (500 mg, 2.39 mmol), 7-hydroxy-8-methylchroman-4-one (Intermediate 40, Step B, 426 mg, 2.39 mmol), PPh$_3$ (815 mg, 3.11 mmol), and THF (8 mL). The mixture was stirred at room temperature for 16 hours before it was concentrated under reduced pressure and purified by FCC (eluent:petroleum ether:ethyl acetate, 1:0 to 1:1, gradient elution) to afford the title compound (800 mg) as a yellow oil, which was used in the next step without further purification. MS (ESI): mass calcd. for C$_{24}$H$_{19}$NO$_3$ 369.14 m/z found 370.1 [M+H]$^+$.

Intermediate 61: (R,S)-Methyl 4-(((8-methyl-4-oxochroman-7-yl)oxy)(phenyl)methyl)benzoate

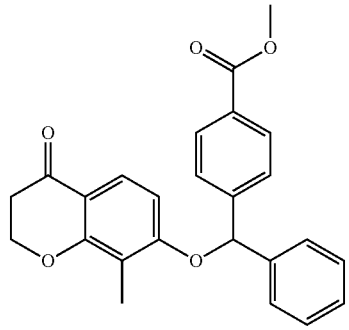 [SMILES: COC(=O)c1ccc(C(Oc2ccc3c(c2C)OCCC3=O)c2ccccc2)cc1]

Step A: (R,S)-Methyl 4-(hydroxy(phenyl)methyl)benzoate. Phenylmagnesium bromide (4.5 mL, 3 M in Et$_2$O, 13.5 mmol) was added dropwise to a solution of methyl 4-formylbenzoate (2.0 g, 12 mmol) and THF (20 mL) that had been cooled to −30° C. The mixture was stirred for 1 hour with gradual warming to room temperature before pouring it into saturated NH$_4$Cl (20 mL) and extracting with ethyl acetate (20 mL×3). The combined organic extracts were dried over anhydrous Na$_2$SO$_4$, filtered, and concentrated to dryness under reduced pressure to afford the product, which was purified by FCC (eluent:petroleum ether:ethyl acetate, 1:0 to 3:1, gradient elution) to afford the title compound (2.0 g, 56%) as a light yellow solid. MS (ESI): mass calcd. for C$_{15}$H$_{14}$O$_3$ 242.09 m/z found 242.9 [M+H]$^+$. $^1$H NMR (400 MHz, DMSO-d$_6$) δ 7.98-7.80 (m, 2H), 7.51 (d, J=8.2 Hz, 2H), 7.38-7.33 (m, 2H), 7.30-7.23 (m, 2H), 7.21-7.15 (m, 1H), 6.06 (d, J=4.0 Hz, 1H), 5.76 (d, J=4.0 Hz, 1H), 3.79 (s, 3H).

Step B: (R,S)-Methyl 4-(((8-methyl-4-oxochroman-7-yl)oxy)(phenyl)methyl)benzoate. DIAD (1.2 mL, 6.6 mmol) was added to a solution of methyl 4-(hydroxy(phenyl)methyl)benzoate (1.0 g, 4.1 mmol), 7-hydroxy-8-methylchroman-4-one (Intermediate 40, Step B, 740 mg, 4.15 mmol), PPh$_3$ (1.4 g, 5.3 mmol), and THF (15 mL). The mixture was stirred at room temperature for 16 hours before concentrating to dryness under reduced pressure to give the product, which was purified by FCC (eluent:petroleum ether:ethyl acetate, 20:1 to 4:1, gradient elution) to afford the title compound (700 mg, 33%) as a light yellow solid. MS (ESI): mass calcd. for C$_{25}$H$_{22}$O$_5$ 402.15 m/z found 403.1 [M+H]$^+$. $^1$H NMR (400 MHz, DMSO-d$_6$) δ 7.95-7.89 (m, 2H), 7.64 (d, J=7.1 Hz, 2H), 7.53-7.44 (m, 3H), 7.37-7.18 (m, 4H), 6.79 (s, 1H), 6.73-6.66 (m, 1H), 4.48 (t, J=5.6 Hz, 2H), 3.78 (d, J=1.5 Hz, 3H), 2.65 (t, J=5.5 Hz, 2H), 2.17 (s, 3H).

Intermediate 62: (R,S)-Methyl 4-((4-carbamoylphenyl)((8-methyl-4-oxochroman-7-yl)oxy)methyl)benzoate

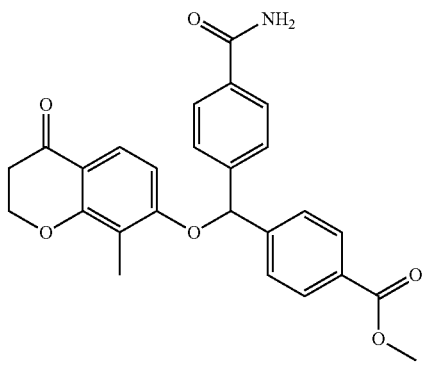 [SMILES: COC(=O)c1ccc(C(Oc2ccc3c(c2C)OCCC3=O)c2ccc(C(N)=O)cc2)cc1]

Step A. i-PrMgCl·LiCl (8.10 mL, 1.3 M in THF, 10.5 mmol) was added dropwise to a solution of 4-iodobenzonitrile (2.0 g, 8.7 mmol) and THF (20 mL) that had been cooled to 0° C. The mixture was stirred at 0° C. for 1 hour and then added dropwise to solution of methyl 4-formylbenzoate (1.45 g, 8.83 mmol) and THF (5 mL) that had been cooled to a 0° C. The mixture was stirred at 0° C. for another 1 hour and then stirred for 2 hours with gradual warming to room temperature before quenching with saturated $NH_4Cl$ (20 mL) and extracting with ethyl acetate (30 mL×3). The combined organic extracts were dried over anhydrous $Na_2SO_4$, filtered, and concentrated to dryness under reduced pressure to give the product, which was purified by FCC (eluent:petroleum ether:ethyl acetate, 9:1 to 2:1, gradient elution) to afford the title compound (1.85 g, 75%) as a brown solid. MS (ESI): mass calcd. for $C_{16}H_{13}NO_3$ 267.09 m/z found 268.0 [M+H]+. 1H NMR (400 MHz, DMSO-$d_6$) δ 7.92 (d, J=8.3 Hz, 2H), 7.79 (d, J=8.3 Hz, 2H), 7.60 (d, J=8.3 Hz, 2H), 7.55 (d, J=8.0 Hz, 2H), 6.35 (d, J=4.0 Hz, 1H), 5.90 (d, J=4.0 Hz, 1H), 3.83 (s, 3H).

Step B: (R,S)-Methyl 4-((4-cyanophenyl)((8-methyl-4-oxochroman-7-yl)oxy)methyl)benzoate. DIAD (1.7 g, 8.4 mmol) was added to a solution of 7-hydroxy-8-methylchroman-4-one (Intermediate 40, Step B, 1.0 g, 5.6 mmol), methyl 4-((4-cyanophenyl)(hydroxy)methyl)benzoate (1.8 g, 6.7 mmol), $PPh_3$ (2.2 g, 8.4 mmol), and THF (10 mL) that had been cooled to 0° C. The mixture was stirred for 12 hours with gradual warming to room temperature before pouring it into water (40 mL) and extracting with ethyl acetate (40 mL×2). The organic extracts were dried over anhydrous $Na_2SO_4$, filtered and concentrated to dryness under reduced pressure to afford the product, which was purified by FCC (petroleum ether:ethyl acetate, 10:1 to 1:1, gradient elution) to afford the title compound (2.2 g, 60%) as a brown solid. MS (ESI): mass calcd. for $C_{26}H_{21}NO_5$ 427.14 m/z found 428.0 [M+H]+. 1H NMR (400 MHz, DMSO-$d_6$) δ 7.92 (d, J=8.4 Hz, 2H), 7.84-7.80 (m, 2H), 7.72 (d, J=8.4 Hz, 2H), 7.67 (d, J=8.4 Hz, 2H), 7.49 (d, J=3.3 Hz, 1H), 6.93 (s, 1H), 6.68 (d, J=9.0 Hz, 1H), 4.49 (t, J=6.3 Hz, 2H), 3.79 (s, 3H), 2.65 (t, J=6.4 Hz, 2H), 2.19 (s, 3H).

Step C: (R,S)-Methyl 4-((4-carbamoylphenyl)((8-methyl-4-oxochroman-7-yl)oxy)methyl)benzoate. $H_2O_2$ (1.7 mL, 30% purity, 17 mmol) was added dropwise to a mixture of methyl 4-((4-cyanophenyl)((8-methyl-4-oxochroman-7-yl)oxy)methyl)benzoate (2.4 g, 3.3 mmol), $K_2CO_3$ (1.38 g, 9.99 mmol), and DMSO (6 mL) that had been cooled to 0° C. The mixture was allowed to gradually warm to room temperature and then stirred at room temperature for 1 hour before pouring it into saturated $Na_2SO_3$ (40 mL). The suspension was isolated via filtration and the filter cake washed with water (10 mL×3) to afford the title compound (1.8 g), which was used in the next step without further purification. MS (ESI): mass calcd. for $C_{26}H_{23}NO_6$ 445.15 m/z found 446.0 [M+H]+.

Intermediate 63: (R,S)-4-(Hydroxy(pyridin-4-yl)methyl)-N,N-dimethylbenzamide

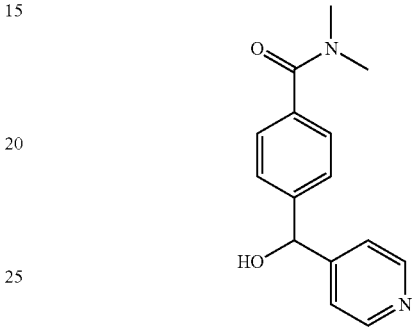

Step A. 4-(Hydroxy(pyridin-4-yl)methyl)benzoic acid. 4-(Hydroxy(pyridin-4-yl)methyl)benzonitrile (Intermediate 8, 1.0 g, 4.8 mmol) was added to 10 N HCl (10 mL). The mixture was heated at 100° C. for 16 hours before cooling to room temperature. The mixture was concentrated to dryness under reduced pressure to afford the title compound (1 g), which was used in the next step without further purification. MS (ESI): mass calcd. for $C_{13}H_{11}NO_3$ 229.07 m/z found 230.2 [M+H]+.

Step B: 4-(Hydroxy(pyridin-4-yl)methyl)-N,N-dimethylbenzamide. HATU (2.5 g, 6.6 mmol) was added to a solution of 4-(hydroxy(pyridin-4-yl)methyl)benzoic acid (500 mg), dimethylamine hydrochloride (534 mg, 6.55 mmol), $Et_3N$ (3.0 mL, 22 mmol), and DMF (10 mL). The mixture was stirred at room temperature for 16 hours before concentrating to dryness under reduced pressure to give the product, which was purified by preparative TLC (eluent: ethyl acetate:methyl alcohol, 5:1) to afford the title compound (500 mg, 89%) as a yellow oil. MS (ESI): mass calcd. for $C_{15}H_{16}N_2O_2$ 256.12 m/z found 257.1 [M+H]+.

Intermediate 64: 8-Ethyl-7-hydroxychroman-4-one

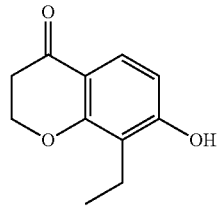

Step A: 3-Chloro-1-(2,4-dihydroxyphenyl)propan-1-one. Resorcinol (120 g, 1.09 mmol) was slowly added to trifluoromethanesulfonic acid (600 mL) that had been cooled to 0° C. The mixture was stirred at 0° C. for 0.5 hours before treating with 3-chloropropanoic acid (122.4 g, 1128 mmol)

dropwise slowly. The mixture was heated at 50° C. for 5 hours before cooling to room temperature and pouring it into water (1 L). The suspension was isolated via filtration and the filter cake washed with water (50 mL×3) before drying under reduced pressure to afford the title compound (200 g) as a brown solid, which was used in the next step without further purification. MS (ESI): mass calcd. for $C_9H_9ClO_3$ 200.02 m/z found 201.1 [M+H]$^+$.

Step B: 7-Hydroxychroman-4-one. 3-Chloro-1-(2,4-dihydroxyphenyl)propan-1-one (200 g) was added to an aqueous solution of NaOH (2 L, 2 M in $H_2O$, 4.0 mol) that had been cooled to 0° C. The mixture was allowed to gradually warm to room temperature and was then stirred at room temperature for 1 hour before adjusting the pH of the solution to pH 1-2 with 4 N HCl. The solid was isolated via filtration and the filter cake washed with water (50 mL×3) before drying under reduced pressure to afford the title compound (85 g) as a brown solid. MS (ESI): mass calcd. for $C_9H_8O_3$ 164.05 m/z found 165.1 [M+H]$^+$.

Step C: 8-Bromo-7-hydroxychroman-4-one. NBS (32.5 g, 183 mmol), 7-hydroxychroman-4-one (30.0 g, 183 mmol), and dichloromethane (150 mL) were stirred at room temperature for 0.5 hours before pouring it into aqueous $Na_2SO_3$ (25 mL). The solid was isolated via filtration and the filter cake washed with water (50 mL×3) before drying under reduced pressure to afford the title compound (25 g, 52%). $^1$H NMR (400 MHz, DMSO-$d_6$) δ 7.63 (d, J=8.8 Hz, 1H), 6.68 (d, J=8.8 Hz, 1H), 4.59 (t, J=6.4 Hz, 2H), 2.73 (t, J=6.4 Hz, 2H).

Step D: 8-Bromo-7-((4-methoxybenzyl)oxy)chroman-4-one. 1-(Chloromethyl)-4-methoxybenzene (13.5 g, 86.2 mmol) was added dropwise to a mixture of 8-bromo-7-hydroxychroman-4-one (15 g, 57 mmol), $K_2CO_3$ (16.0 g, 116 mmol), and DMF (100 mL) that had been cooled to 0° C. The mixture was stirred for 0.5 hours with gradual warming to room temperature and then stirred at room temperature for another 16 hours before pouring into ethyl acetate (15 mL). The solid was isolated via filtration and the filter cake was washed with water (50 mL×3) before drying under reduced pressure to afford the title compound (12 g, 57%) as a brown solid. MS (ESI): mass calcd. for $C_{17}H_{15}BrO_4$ 362.02 m/z found 363.0 [M+H]$^+$.

Step E: 7-((4-Methoxybenzyl)oxy)-8-vinylchroman-4-one. 8-Bromo-7-((4-methoxybenzyl)oxy)chroman-4-one (2.0 g, 5.2 mmol), 4,4,5,5-tetramethyl-2-vinyl-1,3,2-dioxaborolane (1.6 g, 10 mmol), and $Cs_2CO_3$ (5.1 g, 16 mmol) were dissolved in 1,4-dioxane (16 mL) and $H_2O$ (4 mL). The mixture was sparged with $N_2$ for 5 minutes and then treated with Pd(dppf)$Cl_2$ (0.38 g, 0.52 mmol). The mixture was sparged with $N_2$ for another 5 minutes and then heated at 110° C. under $N_2$ atmosphere for 15 hours before cooling to room temperature, pouring it into water (20 mL) and extracting with ethyl acetate (20 mL×3). The combined organic extracts were washed with brine (20 mL), dried over anhydrous $Na_2SO_4$, filtered, and concentrated to dryness under reduced pressure to give the product, which was purified by FCC (eluent:petroleum ether:ethyl acetate, 1:0 to 1:1, gradient elution) to afford the title compound (1.5 g, 85%) as a white solid. MS (ESI): mass calcd. for $C_{19}H_{18}O_4$ 310.12 m/z found 311.1 [M+H]$^+$.

Step F: 8-Ethyl-7-((4-methoxybenzyl)oxy)chroman-4-one. Wet Pd/C (500 mg, 10% w/w) was added to a solution of 7-((4-methoxybenzyl)oxy)-8-vinylchroman-4-one (1.5 g, 91% purity, 4.4 mmol) and ethyl acetate (10 mL) under $N_2$ atmosphere. The mixture was stirred under $H_2$ atmosphere (15 psi) at room temperature for 14 hours. The suspension was filtered through a pad of diatomaceous earth and the pad washed with ethyl acetate (50 mL). The filtrate was concentrated to dryness under reduced pressure to afford the title product (1.5 g), which was used in the next step without further purification. MS (ESI): mass calcd. for $C_{19}H_{20}O_4$ 312.14 m/z found 313.1 [M+H]$^+$.

Step G: 8-Ethyl-7-hydroxychroman-4-one. TFA (5 mL) was added to 8-ethyl-7-((4-methoxybenzyl)oxy)chroman-4-one (1.5 g). The mixture was stirred at room temperature for 1 hour before pouring it into water (30 mL) and extracting with ethyl acetate (30 mL×3). The combined organic extracts were washed with brine (10 mL), dried over anhydrous $Na_2SO_4$, filtered, and concentrated to dryness under reduced pressure to give the product, which was purified by FCC (eluent:petroleum ether:ethyl acetate, 1:0 to 1:1, gradient elution) and then further purified by trituration with petroleum ether:ethyl acetate (5:1, 10 mL). The solid that resulted from the trituration was isolated via filtration. The filter cake was washed with toluene (20 mL) before drying under reduced pressure to yield the title compound (200 mg) as a white solid. MS (ESI): mass calcd. for $C_{11}H_{12}O_3$ 192.08 m/z found 193.1 [M+H]$^+$.

Intermediate 65: (R,S)-4-(((6-Ethyl-4-oxochroman-7-yl)oxy)(pyridin-4-yl)methyl)benzonitrile

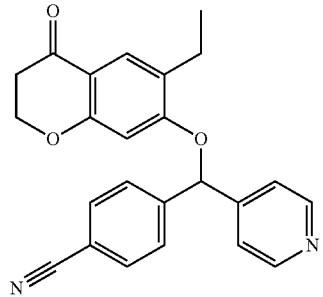

Step A: 3-Chloro-1-(5-ethyl-2,4-dihydroxyphenyl)propan-1-one. 4-Ethylbenzene-1,3-diol (1.0 g, 7.2 mmol) was slowly added to trifluoromethanesulfonic acid (10 mL) which had been cooled to 0° C. The mixture was stirred at 0° C. for 0.5 hours before treating with 3-chloropropanoic acid (785 mg, 7.23 mmol) dropwise slowly. The mixture was heated at 80° C. for 16 hours before cooling to room temperature and pouring it into ice water (200 mL). The suspension was isolated via filtration and the filter cake washed with water (50 mL) before drying under reduced pressure to afford the title compound (1.3 g, 74%) as a brown solid. MS (ESI): mass calcd. for $C_{11}H_{13}ClO_3$ 228.06 m/z found 228.9 [M+H]$^+$. $^1$H NMR (400 MHz, DMSO-$d_6$) δ 12.13 (s, 1H), 10.66 (br s, 1H), 7.57 (s, 1H), 6.29 (s, 1H), 3.87 (t, J=6.2 Hz, 2H), 3.45 (t, J=6.3 Hz, 2H), 2.49 (d, J=2.0 Hz, 2H), 1.08 (t, J=7.5 Hz, 3H).

Step B: 6-Ethyl-7-hydroxychroman-4-one. 3-Chloro-1-(5-ethyl-2,4-dihydroxyphenyl)propan-1-one (1.3 g, 5.7 mmol) was slowly added to aqueous NaOH (15 mL, 2 M in $H_2O$, 30 mmol). The mixture was stirred at room temperature for 1 hour before adjusting the pH of the solution to pH 1-2 with 4 N HCl. The solid was isolated via filtration and the filter cake washed with water (10 mL×2) before drying under reduced pressure to afford the title compound (600 mg, 55%) as a brown solid. MS (ESI): mass calcd. for $C_{11}H_{12}O_3$ 192.08 m/z found 192.9 [M+H]$^+$. $^1$H NMR (400 MHz, DMSO-$d_6$) δ 10.55 (br s, 1H), 7.47 (s, 1H), 6.35 (s, 1H), 4.43 (t, J=6.3 Hz, 2H), 2.64 (t, J=6.5 Hz, 2H), 2.49-2.44 (m, 2H), 1.10 (t, J=7.5 Hz, 3H).

Step C: (R,S)-4-(((6-Ethyl-4-oxochroman-7-yl)oxy)(pyridin-4-yl)methyl)benzonitrile. DEAD (0.76 mL, 5.2 mmol) was added to a solution of 4-(hydroxy(pyridin-4-yl)methyl) benzonitrile (Intermediate 8, 500 mg, 2.60 mmol), 6-ethyl-7-hydroxychroman-4-one (547 mg, 2.60 mmol), PPh$_3$ (1.4 g, 5.3 mmol), and CH$_2$Cl$_2$ (10 mL). The mixture was stirred at room temperature for 16 hours before concentrating to dryness under reduced pressure to give the product, which was purified by FCC (eluent:petroleum ether:ethyl acetate, 20:1 to 1:3, gradient elution) to afford the title compound (1.5 g) as a yellow oil, which was used in the next step without further purification. MS (ESI): mass calcd. for C$_{24}$H$_{20}$N$_2$O$_3$ 384.15 m/z found 385.0 [M+H]$^+$.

Intermediate 66: (R,S)-4-(((8-Isopropyl-4-oxochroman-7-yl)oxy)(pyridin-4-yl)methyl)benzonitrile

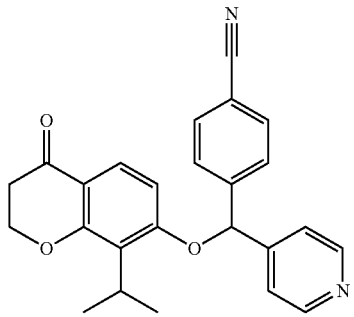 [SMILES: CC(C)c1c(OC(c2ccncc2)c2ccc(C#N)cc2)ccc2c1OCCC2=O]

Step A: 7-((4-Methoxybenzyl)oxy)-8-(prop-1-en-2-yl) chroman-4-one. 8-Bromo-7-((4-methoxybenzyl)oxy)chroman-4-one (Intermediate 64, Step D, 2.0 g, 5.2 mmol), 4,4,5,5-tetramethyl-2-(prop-1-en-2-yl)-1,3,2-dioxaborolane (1.74 g, 10.3 mmol), and Cs$_2$CO$_3$ (5.06 g, 15.5 mmol) were dissolved in 1,4-dioxane (16 mL) and H$_2$O (4 mL). The mixture was sparged with N$_2$ for 5 minutes and then treated with Pd(dppf)Cl$_2$ (379 mg, 0.518 mmol). The mixture was sparged with N$_2$ for another 5 minutes and then heated at 110° C. under N$_2$ atmosphere for 3 hours before cooling to room temperature, pouring it into water (30 mL) and extracting with ethyl acetate (20 mL×3). The combined organic extracts were washed with brine (20 mL), dried over anhydrous Na$_2$SO$_4$, filtered, and concentrated to dryness under reduced pressure to give the product, which was purified by FCC (eluent:petroleum ether:ethyl acetate, 1:0 to 1:1, gradient elution) to afford title compound (1.1 g, 65%) as yellow solid. MS (ESI): mass calcd. for C$_{20}$H$_{20}$O$_4$ 324.14 m/z found 325.1[M+H]$^+$.

Step B: 8-Isopropyl-7-((4-methoxybenzyl)oxy)chroman-4-one. RhCl(PPh$_3$)$_3$ (304 mg, 0.329 mmol) was added to a solution of 7-((4-methoxybenzyl)oxy)-8-(prop-1-en-2-yl) chroman-4-one (1.1 g, 3.3 mmol) and ethyl acetate (20 mL). The mixture was heated at 80° C. and stirred under H$_2$ atmosphere (50 psi) for 2 hours before cooling to room temperature, pouring it into water (30 mL) and extracting with ethyl acetate (30 mL×3). The combined organic extracts were washed with brine (10 mL), dried over anhydrous Na$_2$SO$_4$, filtered, and concentrated to dryness under reduced pressure to give the product, which was purified by FCC (eluent: petroleum ether:ethyl acetate, 1:0 to 1:1, gradient elution) to afford the title compound (1.0 g, 87%) as a brown solid. MS (ESI): mass calcd. for C$_{22}$H$_{20}$O$_4$ 326.15 m/z found 327.1 [M+H]$^+$.

Step C: 7-Hydroxy-8-isopropylchroman-4-one. CF$_3$SO$_3$H (0.8 mL) was added to a solution of 8-isopropyl-7-((4-methoxybenzyl)oxy)chroman-4-one (1.0 g, 2.8 mmol) and TFA (8 mL). The mixture was stirred at room temperature for 15 hours before pouring it into water (30 mL) and extracting with ethyl acetate (30 mL×3). The combined organic extracts were washed with brine (10 mL), dried over anhydrous Na$_2$SO$_4$, filtered, and concentrated to dryness under reduced pressure to give the product, which was purified by FCC (eluent:petroleum ether:ethyl acetate, 1:0 to 1:1, gradient elution) to afford title compound (240 mg, 36%) as brown solid. MS (ESI): mass calcd. for C$_{12}$H$_{14}$O$_3$ 206.09 m/z found 207.1 [M+H]$^+$. $^1$H NMR (400 MHz, DMSO-d$_6$) δ 10.33 (s, 1H), 7.48 (d, J=8.8 Hz, 1H), 6.52 (d, J=8.8 Hz, 1H), 4.46 (t, J=6.4 Hz, 2H), 3.45 (td, J=14.1, 7.0 Hz, 1H), 2.64 (t, J=6.4 Hz, 2H), 1.24 (s, 3H), 1.23 (s, 3H).

Step D: (R,S)-4-(((8-Isopropyl-4-oxochroman-7-yl)oxy) (pyridin-4-yl)methyl)benzonitrile. DIAD (318 mg, 1.57 mmol) was added to a solution of 4-(hydroxy(pyridin-4-yl) methyl)benzonitrile (Intermediate 8, 220 mg, 1.05 mmol), 7-hydroxy-8-isopropylchroman-4-one (240 mg, 1.05 mmol), PPh$_3$ (412 mg, 1.57 mmol), and anhydrous dichloromethane (4 mL). The mixture was stirred at room temperature for 1.5 hours before pouring it into water (20 mL) and extracting with ethyl acetate (20 mL×3). The combined organic extracts were washed with brine (20 mL), dried over anhydrous Na$_2$SO$_4$, filtered, and concentrated to dryness under reduced pressure to give the product, which was purified by FCC (eluent:petroleum ether:ethyl acetate, 1:0 to 0:1, gradient elution) to afford the title compound (800 mg) as a brown oil, which was used in the next step without further purification. MS (ESI): mass calcd. for C$_{25}$H$_{22}$N$_2$O$_3$ 398.16 m/z found 399.2 [M+H]$^+$.

Intermediate 67: (R,S)-4-(((6-Isopropyl-4-oxochroman-7-yl)oxy)(pyridin-4-yl)methyl)benzonitrile

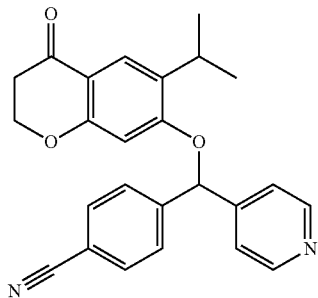 [SMILES: CC(C)c1cc2c(cc1OC(c1ccncc1)c1ccc(C#N)cc1)OCCC2=O]

Step A: 3-Chloro-1-(2,4-dihydroxy-5-isopropylphenyl) propan-1-one. 4-Isopropylbenzene-1,3-diol (1.0 g, 6.6 mmol) was slowly added to trifluoromethanesulfonic acid (5 mL) that had been cooled to 0° C. The mixture was stirred at 0° C. for 0.5 hours before treating with 3-chloropropanoic acid (738 mg, 6.8 mmol) dropwise slowly. The mixture was stirred for 22 hours at 50° C. before cooling to room temperature, and pouring it into water (50 mL). The suspension was isolated via filtration and the filter cake washed with water (50 mL×3) before drying under reduced pressure to afford the title compound (1.7 g) as a brown solid, which was used in the next step without further purification. MS (ESI): mass calcd. for C$_{12}$H$_{15}$ClO$_3$ 242.07 m/z found 243.1 [M+H]$^+$.

Step B: 7-Hydroxy-6-isopropylchroman-4-one. 3-Chloro-1-(2,4-dihydroxyphenyl)propan-1-one (1.7 g) was added to aqueous NaOH (20 mL, 2 M in water, 40 mmol) that had ben cooled to 0° C. The mixture was allowed to gradually warm to room temperature and then stirred at room temperature for 1 hour before adjusting the pH of the solution to pH to 1-2 with 2 N HCl. The solid was isolated via filtration and the filter cake washed with water (20 mL×3) before drying under reduced pressure to afford the title compound (750 mg) which was used in the next step without further purification. MS (ESI): mass calcd. for $C_{12}H_{14}O_3$ 206.09 m/z found 207.1 $[M+H]^+$. $^1H$ NMR (400 MHz, DMSO-$d_6$) δ 10.58 (s, 1H), 7.50 (s, 1H), 6.36 (s, 1H), 4.42 (t, J=6.3 Hz, 2H), 3.08 (td, J=13.8, 6.9 Hz, 1H), 2.63 (t, J=6.4 Hz, 2H), 1.13 (d, J=6.8 Hz, 6H).

Step C: (R,S)-4-(((6-Isopropyl-4-oxochroman-7-yl)oxy)(pyridin-4-yl)methyl)benzonitrile. DEAD (938 mg, 5.39 mmol) was added to a solution of 4-(hydroxy(pyridin-4-yl)methyl)benzonitrile (Intermediate 8, 714 mg, 3.40 mmol), 7-hydroxy-6-isopropylchroman-4-one (700 mg, 3.39 mmol), $PPh_3$ (1.36 g, 5.19 mmol), and anhydrous dichloromethane (10 mL). The mixture was stirred at room temperature for 3 hours before pouring it into water (20 mL) and extracting with ethyl acetate (25 mL×3). The combined organic extracts were washed with brine (10 mL), dried over anhydrous $Na_2SO_4$, filtered, and concentrated to dryness under reduced pressure to give the product, which was purified by FCC (eluent:petroleum ether:ethyl acetate, 1:0 to 0:1, gradient elution) to afford the title compound (1.6 g) as a brown oil, which was used in the next step without further purification. MS (ESI): mass calcd. for $C_{25}H_{22}N_2O_3$ 398.16 m/z found 399.1 $[M+H]^+$.

Intermediate 68:
7-Hydroxy-5-methoxychroman-4-one

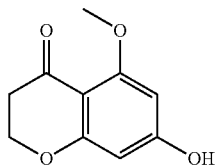

Step A: 5,7-Dihydroxy-4H-chromen-4-one. $BF_3 \cdot Et_2O$ (11.3 mL, 89.6 mmol) was added dropwise to a solution of 1-(2,4,6-trihydroxyphenyl)ethanone (5.0 g, 30 mmol) and DMF (40 mL). The mixture was treated with a solution of methanesulfonyl chloride (14.2 g, 124 mmol) in DMF (10 mL) and then heated at 90° C. for 3 hours before cooling to room temperature and pouring it into ice/water (300 mL) slowly. The solid was isolated via filtration and discarded The filtrate was extracted with ethyl acetate (200 mL×3). The combined organic extracts were dried over anhydrous $Na_2SO_4$, filtered, and concentrated to dryness under reduced pressure to give the product, which was purified by FCC (eluent:petroleum ether:ethyl acetate, 10:1 to 2:3, gradient elution) to afford the title compound (3.0 g, 57%) as a yellow solid. MS (ESI): mass calcd. for $C_9H_6O_4$ 178.03 m/z found 179.0 $[M+H]^+$. $^1H$ NMR (400 MHz, acetone-$d_6$) δ 12.77 (s, 1H), 9.72 (s, 1H), 8.06 (d, J=5.9 Hz, 1H), 6.39 (d, J=2.0 Hz, 1H), 6.26 (d, J=2.2 Hz, 1H), 6.22 (d, J=5.9 Hz, 1H).

Step B: 5,7-Dihydroxychroman-4-one. 5,7-Dihydroxy-4H-chromen-4-one (1.0 g, 5.6 mmol), EtOH (20 mL), and wet Pd/C (240 mg, 10 wt. %) were stirred under at atmosphere of $H_2$ (50 psi) at 60° C. for 2 hours before cooling to room temperature. The suspension was filtered through a pad of diatomaceous earth and the pad washed with EtOH (20 mL). The filtrate was concentrated to dryness under reduced pressure to give the product, which was purified by FCC (eluent:petroleum ether:ethyl acetate, 1:0 to 1:1, gradient elution) to afford the title compound (505 mg, 50%) as a yellow solid. MS (ESI): mass calcd. for $C_9H_8O_4$ 180.04 m/z found 180.7 $[M+H]^+$. $^1H$ NMR (400 MHz, DMSO-$d_6$) δ 12.18 (s, 1H), 10.77 (br s, 1H), 5.85 (s, 2H), 4.43 (t, J=6.4 Hz, 2H), 2.76 (t, J=6.4 Hz, 2H).

Step C: 5-Hydroxy-7-((4-methoxybenzyl)oxy)chroman-4-one. 1-(Chloromethyl)-4-methoxybenzene (1.4 g, 8.9 mmol) was added dropwise to a mixture of 5,7-dihydroxy-4H-chromen-4-one (1.2 g, 6.7 mmol), $K_2CO_3$ (3.7 g, 28 mmol), and DMF (15 mL). The mixture was stirred at room temperature for 16 hours before pouring it into water (20 mL) and extracting with ethyl acetate (20 mL×3). The combined organic extracts were dried over anhydrous $Na_2SO_4$, filtered, and concentrated to dryness under reduced pressure to give the product, which was purified by FCC (eluent:petroleum ether:ethyl acetate, 1:0 to 4:1, gradient elution) to afford the title compound (1.1 g, 55%) as a white solid. $^1H$ NMR (400 MHz, DMSO-$d_6$) δ 12.13 (s, 1H), 7.36 (d, J=8.5 Hz, 2H), 6.95 (d, J=8.5 Hz, 2H), 6.12 (s, 2H), 5.07 (s, 2H), 4.46 (t, J=6.4 Hz, 2H), 3.75 (s, 3H), 2.80 (t, J=6.5 Hz, 2H).

Step D: 5-Methoxy-7-((4-methoxybenzyl)oxy)chroman-4-one. 5-Hydroxy-7-((4-methoxybenzyl)oxy)chroman-4-one (900 mg, 3.00 mmol) was added to a mixture of $K_2CO_3$ (1.2 g, 8.7 mmol) and acetone (10 ml). The mixture was stirred at room temperature for 15 minutes during the dropwise addition of methyl iodide (1.56 g, 11.0 mmol). The mixture was heated at 50° C. for 16 hours before quenching with saturated $NH_4Cl$ (10 mL) and extracting with ethyl acetate (20 mL×3). The combined organic extracts were dried over anhydrous $Na_2SO_4$, filtered, and concentrated to dryness under reduced pressure to afford the title compound (900 mg), which was used in the next step without further purification. MS (ESI): mass calcd. for $C_{18}H_{18}O_5$ 314.12 m/z found 315.1 $[M+H]^+$.

Step E: 7-Hydroxy-5-methoxychroman-4-one. TFA (10 mL) was added to 5-methoxy-7-((4-methoxybenzyl)oxy)chroman-4-one (700 mg, 0.227 mmol). The mixture was stirred at room temperature for 1 hour before concentrating to dryness under reduced pressure to give the product, which was purified by preparative HPLC using a Xtimate C18, 150 mm×25 mm×5 m column (eluent: 6% to 36% (v/v) $CH_3CN$ and $H_2O$ with 0.225% HCOOH) to afford the title compound (200 mg, 46%) as a light yellow solid. MS (ESI): mass calcd. for $C_{10}H_{10}O_4$ 194.06 m/z found 195.1 $[M+H]^+$. $^1H$ NMR (400 MHz, DMSO-$d_6$) δ 10.51 (br s, 1H), 6.03 (d, J=2.3 Hz, 1H), 5.92 (d, J=2.0 Hz, 1H), 4.35 (t, J=6.3 Hz, 2H), 3.72 (s, 3H), 2.55 (t, J=6.4 Hz, 2H).

Intermediate 69: (R,S)-4-(((8-Iodo-4-oxochroman-7-yl)oxy)(pyridin-4-yl)methyl)benzamide

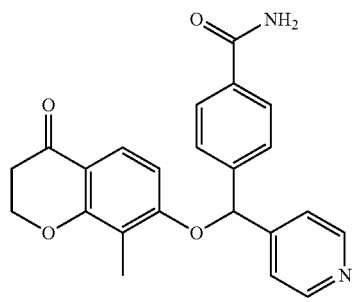

Step A: 7-Hydroxy-8-iodochroman-4-one. NIS (2.4 g, 11 mmol), 7-hydroxychroman-4-one (1.5 g, 9.1 mmol), and dichloromethane (20 mL) were stirred at room temperature for 3 hours before concentrating to dryness under reduced pressure. The residue was triturated with MTBE (30 mL) and the solid was isolated via filtration. The filter cake was washed with MTBE (20 mL) before drying under reduced pressure to afford the title compound (1.3 g) as a brown solid. MS (ESI): mass calcd. for $C_9H_7IO_3$ 289.94 m/z found 290.9 $[M+H]^+$. $^1H$ NMR (400 MHz, DMSO-$d_6$) δ 11.39 (br s, 1H), 7.59 (d, J=8.6 Hz, 1H), 6.59 (d, J=8.6 Hz, 1H), 4.54 (t, J=6.4 Hz, 2H), 2.68 (t, J=6.5 Hz, 2H).

Step B: (R,S)-4-(((8-Iodo-4-oxochroman-7-yl)oxy)(pyridin-4-yl)methyl)benzonitrile. DIAD (1.28 g, 6.33 mmol) was added to a mixture of 7-hydroxy-8-iodochroman-4-one (1.15 g, 3.97 mmol), 4-(hydroxy(pyridin-4-yl)methyl)benzonitrile (Intermediate 8, 917 mg, 4.36 mmol), $PPh_3$ (1.7 g, 6.5 mmol), and dichloromethane (15 mL). The mixture was stirred at room temperature for 12 hours before concentrating to dryness under reduced pressure to give the product, which was purified by FCC (eluent:petroleum ether:ethyl acetate, 1:0 to 2:1, gradient elution) to afford the title compound (2.0 g) as a yellow oil, which was used in the next step without further purification. MS (ESI): mass calcd. for $C_{22}H_{15}IN_2O_3$ 482.01 m/z found 482.9 $[M+H]^+$.

Step C: (R,S)-4-(((8-Iodo-4-oxochroman-7-yl)oxy)(pyridin-4-yl)methyl)benzamide. $H_2O_2$ (1.3 mL, 30% purity, 13 mmol) was added dropwise to a solution of 4-(((8-iodo-4-oxochroman-7-yl)oxy)(pyridin-4-yl)methyl)benzonitrile (2.0 g), $K_2CO_3$ (1.4 g, 10 mmol), and DMSO (8 mL). The mixture was stirred at room temperature for 3 hours before pouring it into saturated $Na_2SO_3$ (100 mL) and extracting with ethyl acetate (60 mL×3). The combined organic extracts were dried over anhydrous $Na_2SO_4$, filtered, and concentrated to dryness under reduced pressure to give the product, which was purified by FCC (eluent:petroleum ether:ethyl acetate, 1:0 to 0:1, gradient elution) to afford the title product (1.7 g) as a yellow oil, which was used in the next step without further purification. MS (ESI): mass calcd. for $C_{22}H_{17}IN_2O_4$ 500.02 m/z found 501.1 $[M+H]^+$.

Intermediate 70: (R,S)-4-(((8-([1,1'-Biphenyl]-4-yl)-4-oxochroman-7-yl)oxy)(pyridin-4-yl)methyl)benzonitrile

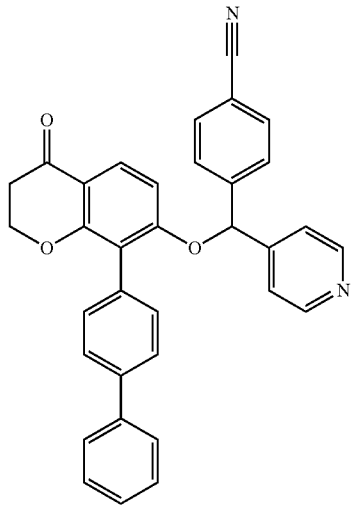 [SMILES: N#Cc1ccc(C(Oc2ccc3c(c2-c2ccc(-c4ccccc4)cc2)OCCC3=O)c2ccncc2)cc1]

Step A: (R,S)-4-(((8-([1,1'-Biphenyl]-4-yl)-4-oxochroman-7-yl)oxy)(pyridin-4-yl)methyl)benzonitrile. 8-Bromo-7-((4-methoxybenzyl)oxy)chroman-4-one (Intermediate 64, Step D, 560 mg, 1.29 mmol), [1,1'-biphenyl]-4-ylboronic acid (255 mg, 1.29 mmol), and $K_3PO_4$ (190 mg, 1.94 mmol) were dissolved in 1,4-dioxane (8 mL) and $H_2O$ (2 mL). The mixture was sparged with Ar for 5 minutes and then treated with Pd(dtbpf)Cl₂ (84 mg, 0.13 mmol). The mixture was sparged with Ar for another 5 minutes and then stirred while heating at 90° C. via microwave irradiation for 1 hour. The mixture was poured into water (15 mL), extracted with ethyl acetate (20 mL×3). The combined organic extracts were dried over anhydrous $Na_2SO_4$, filtered, and concentrated to dryness under reduced pressure give the product, which was purified by FCC (eluent:petroleum ether:ethyl acetate, 10:1 to 2:3, gradient elution) to afford the title compound (400 mg) as a yellow solid, which was used in the next step without further purification. MS (ESI): mass calcd. for $C_{34}H_{24}N_2O_3$ 508.18 m/z found 509.1 $[M+H]^+$.

Intermediate 71: (R,S)-4-(((4-Oxo-8-propylchroman-7-yl)oxy)(pyridin-4-yl)methyl)benzonitrile

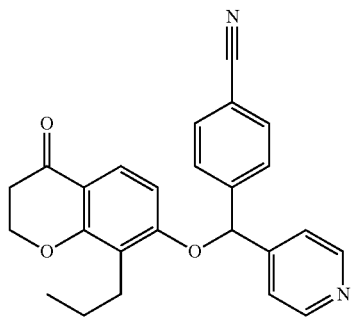 [SMILES: CCCc1c(OC(c2ccncc2)c2ccc(C#N)cc2)ccc2c1OCCC2=O]

Step A: 7-((4-Methoxybenzyl)oxy)-8-propylchroman-4-one. 8-Bromo-7-((4-methoxybenzyl)oxy)chroman-4-one (Intermediate 64, Step D, 2.0 g, 5.5 mmol), 2-propylzine bromide (0.5 M in THF, 16 mL, 8.0 mmol), and anhydrous THF (5 mL) were added to a 30 mL microwave tube. The mixture was sparged with $N_2$ for 5 minutes and then treated with $Pd[(t-Bu_3)P]_2$ (563 mg, 1.10 mmol). The mixture was sparged with $N_2$ for another 5 minutes and then heated at 80° C. via microwave irradiation for 1 hour before cooling to room temperature, pouring it into saturated $NH_4Cl$ (30 mL) and extracting with ethyl acetate (20 mL×3). The combined organic extracts were washed with brine (20 mL), dried over anhydrous $Na_2SO_4$, filtered, and concentrated to dryness under reduced pressure to give the product, which was purified by FCC (eluent:petroleum ether:ethyl acetate, 1:0 to 1:1, gradient elution) to afford the title compound (1.1 g, 55%) as a brown solid. MS (ESI): mass calcd. for $C_{20}H_{22}O_4$ 326.15 m/z found 327.1 $[M+H]^+$.

Step B: 7-Hydroxy-8-propylchroman-4-one. $CF_3SO_3H$ (0.9 mL) was slowly added to 7-((4-methoxybenzyl)oxy)-8-propylchroman-4-one (1.1 g, 3.0 mmol) and TFA (8 mL). The mixture was stirred at room temperature for 18 hours before concentrating to dryness under reduced pressure. The residue was diluted with water (20 mL) and the mixture extracted with ethyl acetate (20 mL×3). The combined organic extracts were washed with brine (10 mL), dried over anhydrous $Na_2SO_4$, filtered, and concentrated to dryness under reduced pressure to give the product, which was purified by FCC (eluent:petroleum ether:ethyl acetate, 1:0 to 1:1, gradient elution) to afford the title compound (300 mg, 37%) as a brown solid. MS (ESI): mass calcd. for $C_{12}H_{14}O_3$ 206.09 m/z found 207.1 $[M+H]^+$.

Step C: (R,S)-4-(((4-Oxo-8-propylchroman-7-yl)oxy)(pyridin-4-yl)methyl)benzonitrile. DIAD (226 mg, 1.12 mmol) was added to a solution of 4-(hydroxy(pyridin-4-yl)methyl)benzonitrile (Intermediate 8, 157 mg, 0.747 mmol), 7-hydroxy-8-propylchroman-4-one (200 mg), $PPh_3$ (294 mg, 1.12 mmol), and anhydrous dichloromethane (4 mL). The mixture was stirred at room temperature for 0.5 hours before pouring it into water (20 mL) and extracting with ethyl acetate (20 mL×3). The combined organic extracts were washed with brine (20 mL), dried over anhydrous $Na_2SO_4$, filtered, and concentrated to dryness under reduced pressure to give the product, which was purified by FCC (eluent:petroleum ether:ethyl acetate, 1:0 to 0:1, gradient elution) to afford the title compound (800 mg) as a brown oil. MS (ESI): mass calcd. for $C_{25}H_{22}N_2O_3$ 398.16 m/z found 399.1 $[M+H]^+$.

Intermediate 72:
1-(3-(Hydroxy(pyridin-4-yl)methyl)benzyl)urea

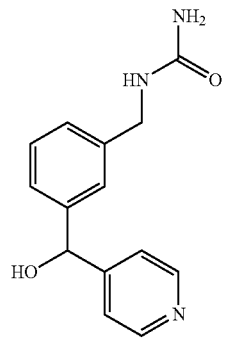

Step A: (R,S)-(3-(Aminomethyl)phenyl)(pyridin-4-yl)methanol. Raney Ni (1.5 g, wet in water) was added to a solution of 3-(hydroxy(pyridin-4-yl)methyl)benzonitrile (Intermediate 7, Step A, 1.6 g, 7.6 mmol), 25% aqueous $NH_3$ (10 mL), and MeOH (20 mL). The mixture was stirred under an atmosphere of $H_2$ (15 psi) at room temperature for 3 hours. The suspension was filtered through a pad of diatomaceous earth and the pad washed with MeOH (50 mL). The filtrate was dried over anhydrous $Na_2SO_4$, filtered, and concentrated to dryness under reduced pressure to afford the title compound (1.5 g) as a green oil, which was used in the next step without further purification.

Step B: 1-(3-(Hydroxy(pyridin-4-yl)methyl)benzyl)urea. Potassium cyanate (2.27 g, 28.0 mmol) was added to a solution of (3-(aminomethyl)phenyl)(pyridin-4-yl)methanol (1.2 g, 5.6 mmol), DMF (10 mL), and 1 N HCl (5.6 mL, 5.6 mmol). The mixture was heated at 80° C. for 1 hour before cooling to room temperature and concentrating to dryness under reduced pressure to give the product, which was purified by preparative HPLC using a Phenomenex Gemini 150 mm×25 mm×10 μm column (eluent: 5% to 35% (v/v) $CH_3CN$ and $H_2O$ with 0.05% $NH_3$) to afford the title compound (800 mg, 54%). MS (ESI): mass calcd. for $C_{14}H_{15}N_3O_2$ 257.12 m/z found 258.1 $[M+H]^+$.

Intermediate 73: (R,S)-3-Methoxy-4-(((8-methyl-4-oxochroman-7-yl)oxy)(pyridin-4-yl)methyl)benzonitrile

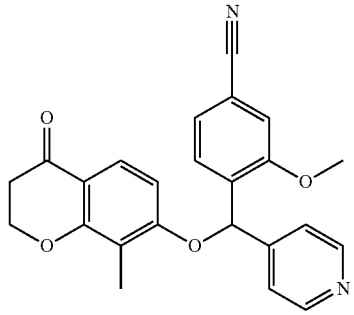 [SMILES: COc1cc(C#N)ccc1C(Oc1ccc2c(c1C)OCCC2=O)c1ccncc1]

Step A: 3-Hydroxy-4-iodobenzamide. Triethylamine (18.9 mL, 136 mol) was added to a solution of 3-hydroxy-4-iodobenzoic acid (15.0 g, 56.8 mol) and THF (100 mL) that had been cooled to 0° C. The mixture was stirred for 0.5 hours with gradual warming to 10° C. The mixture was then cooled to 0° C., before treating with iso-butyl carbonochloridate (16.5 mL, 131 mmol). The mixture was stirred for 2 hours with gradual warming to 10° C. The solid was isolated via filtration, the filter cake washed with THF (50 mL) and the filter cake was disposed of. The filtrate was poured into a solution of 25% aqueous $NH_3$ at room temperature. The mixture was concentrated to dryness under reduced pressure to give the product, which was purified by FCC (eluent: petroleum ether:ethyl acetate, 1:0 to 3:1, gradient elution) to afford the title compound (9.1 g, 57%) as a yellow solid. MS (ESI): mass calcd. for $C_7H_6INO_2$ 262.94 m/z found 263.8 $[M+H]^+$.

Step B: 3-Hydroxy-4-iodobenzonitrile. TFAA (9.8 mL, 70 mmol) was added to a solution of 3-hydroxy-4-iodobenzamide (9.1 g, 35 mmol), pyridine (8.40 mL, 104 mmol), and $CH_2Cl_2$ (120 mL) that had been cooled to 0° C. The mixture was gradually warmed to room temperature and then stirred at 25° C. for 2 hours before adjusting the pH of the solution to pH 7 with 10% aqueous NaOH and extracting with ethyl acetate (50 mL×3). The combined organic extracts were washed with brine (50 mL), dried over anhydrous $Na_2SO_4$, filtered, and concentrated to dryness under reduced pressure to give the product, which was purified by FCC (eluent: petroleum ether:ethyl acetate, 1:0 to 3:1, gradient elution) to afford the title compound (8.1 g, 96%) as a yellow solid. $^1H$ NMR (400 MHz, MeOD) δ 7.88 (d, J=8.1 Hz, 1H), 7.05 (d, J=2.0 Hz, 1H), 6.91 (dd, J=8.1, 1.7 Hz, 1H).

Step C: 4-Iodo-3-((4-methoxybenzyl)oxy)benzonitrile. 1-(Chloromethyl)-4-methoxybenzene (2.8 g, 18 mmol) was added dropwise to a mixture of 3-hydroxy-4-iodobenzonitrile (4.0 g, 16 mmol), $K_2CO_3$ (3.4 g, 25 mmol), and DMF (40 mL) that had been cooled to 0° C. The mixture was stirred for 16 hours with gradual warming to room temperature before pouring it into water (50 mL) and extracting with ethyl acetate (50 mL×3). The combined organic extracts were dried over anhydrous $Na_2SO_4$, filtered, and concentrated to dryness under reduced pressure to give the product, which was purified by FCC (eluent: petroleum ether:ethyl acetate, 1:0 to 4:1, gradient elution) to afford the title compound (5.3 g, 89%) as a yellow solid. $^1H$ NMR (400 MHz, DMSO-$d_6$) δ 8.00 (d, J=7.8 Hz, 1H), 7.56 (d, J=1.5 Hz, 1H), 7.42 (d, J=8.6 Hz, 2H), 7.21-7.17 (m, 1H), 7.00-6.95 (m, 2H), 5.18 (s, 2H), 3.76 (s, 3H).

Step D: (R,S)-4-(Hydroxy(pyridin-4-yl)methyl)-3-((4-methoxybenzyl)oxy)benzonitrile. i-PrMgCl·LiCl complex (1.3 M in THF, 13.5 mL, 17.7 mmol) was added dropwise to a solution of 4-iodo-3-((4-methoxybenzyl)oxy)benzonitrile (5.3 g, 14 mmol) and THF (30 mL) that had been cooled to 0° C. The mixture was stirred at 0° C. for 1.5 hours and then added dropwise to a solution of isonicotinaldehyde (1.56 g, 14.6 mmol) and THF (10 mL) that had been cooled to 0° C. The resulting mixture was stirred at 0° C. for 1 hour and then stirred for another 2 hours with gradual warming to room temperature before pouring it into saturated $NH_4Cl$ (30 mL) and extracting with ethyl acetate (30 mL×3). The combined organic extracts were dried over anhydrous $Na_2SO_4$, filtered, and concentrated to dryness under reduced pressure to give the product, which was purified by FCC (eluent:petroleum ether:ethyl acetate, 20:1 to 1:4, gradient elution) to afford the title compound (3 g, 50%) as a white solid. MS (ESI): mass calcd. for $C_{21}H_{18}N_2O_3$ 346.13 m/z found 346.9 [M+H]$^+$.

Step E: (R,S)-3-((4-Methoxybenzyl)oxy)-4-(((8-methyl-4-oxochroman-7-yl)oxy)(pyridin-4-yl)methyl)benzonitrile. DIAD (2.63 g, 13.0 mmol) was added to a solution of 7-hydroxy-8-methylchroman-4-one (Intermediate 40, Step B, 2.0 g, 11 mmol), 4-(hydroxy(pyridin-4-yl)methyl)-3-((4-methoxybenzyl)oxy)benzonitrile (3.0 g, 8.7 mmol), PPh$_3$ (3.4 g, 13 mmol), and THF (30 mL) that had been cooled to 0° C. The mixture was stirred for 12 hours with gradual warming to room temperature before pouring it into water (40 mL) and extracting with ethyl acetate (40 mL×2). The organic extracts were dried over anhydrous $Na_2SO_4$, filtered and concentrated to dryness under reduced pressure to give the product, which was purified by FCC (petroleum ether:ethyl acetate, 10:1 to 1:2, gradient elution) to afford the title compound (5 g) as a brown oil, which was used in the next step without further purification. MS (ESI): mass calcd. for $C_{31}H_{26}N_2O_5$ 506.18 m/z found 507.0 [M+H]$^+$.

Step F: (R,S)-3-Hydroxy-4-(((8-methyl-4-oxochroman-7-yl)oxy)(pyridin-4-yl)methyl)benzonitrile. TFA (15 mL) was added to a solution of 3-((4-methoxybenzyl)oxy)-4-(((8-methyl-4-oxochroman-7-yl)oxy)(pyridin-4-yl)methyl)benzonitrile (5.0 g, 4.5 mmol) and $CH_2Cl_2$ (60 mL). The mixture was stirred at room temperature for 4 hours before concentrating to dryness under reduced pressure. The residue was dissolved in water, the pH of the solution was adjusted to pH 7 with 1M NaOH, and then extracted with ethyl acetate (50 mL×3). The combined organic extracts were dried over anhydrous $Na_2SO_4$, filtered, and concentrated to dryness under reduced pressure to give the product, which was purified by preparative HPLC using a Phenomenex Synergi Max-RP 250×50 mm×10 µm column (eluent: 20% to 50% (v/v) $CH_3CN$ and $H_2O$ with 0.225% HCOOH) to afford the title compound (1.6 g, 84%) as a yellow solid. MS (ESI): mass calcd. for $C_{23}H_{18}N_2O_4$ 386.13 m/z found 387.0 [M+H]$^+$. $^1H$ NMR (400 MHz, DMSO-$d_6$) δ 10.99 (br s, 1H), 8.53 (d, J=5.6 Hz, 2H), 7.52-7.45 (m, 4H), 7.23 (d, J=8.1 Hz, 1H), 7.17 (s, 1H), 6.80 (s, 1H), 6.56 (d, J=8.8 Hz, 1H), 4.49 (t, J=6.4 Hz, 2H), 2.66 (t, J=6.4 Hz, 2H), 2.17 (s, 3H).

Step G: 3-Methoxy-4-(((8-methyl-4-oxochroman-7-yl)oxy)(pyridin-4-yl)methyl)benzonitrile. MeI (2.3 g, 16 mmol) was added dropwise to a mixture of 3-hydroxy-4-(((8-methyl-4-oxochroman-7-yl)oxy)(pyridin-4-yl)methyl) benzonitrile (500 mg, 1.29 mmol), $K_2CO_3$ (540 mg, 3.91 mmol), and DMF (5 mL) over a period of 15 minutes. The mixture was stirred at room temperature for 2 hours before quenching with saturated $NH_4Cl$ (20 mL) and extracting with ethyl acetate (30 mL×3). The combined organic extracts were dried over anhydrous $Na_2SO_4$, filtered, and concentrated to dryness under reduced pressure to give the product, which was purified by preparative TLC (eluent: petroleum ether:ethyl acetate, 1:2) to afford the title compound (150 mg, 29%) as a yellow oil. MS (ESI): mass calcd. for $C_{24}H_{20}N_2O_4$ 400.14 m/z found 401.0 [M+H]$^+$.

Intermediate 74: (R,S)-3-Ethoxy-4-(((8-methyl-4-oxochroman-7-yl)oxy)(pyridin-4-yl)methyl)benzonitrile

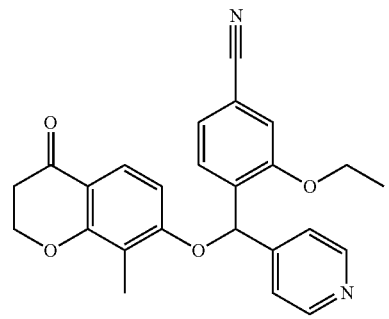 [SMILES: CCOc1cc(C#N)ccc1C(Oc1ccc2c(c1C)OCCC2=O)c1ccncc1]

Iodoethane (70 uL, 0.88 mmol), 3-hydroxy-4-(((8-methyl-4-oxochroman-7-yl)oxy)(pyridin-4-yl)methyl)benzonitrile (Intermediate 73, Step F, 800 mg), $K_2CO_3$ (242 mg, 1.75 mmol), and DMF (7 mL) were stirred for 3 hours at room temperature before pouring it into $H_2O$ (20 mL) and extracting with ethyl acetate (30 mL×3). The combined organic extracts were dried over anhydrous $Na_2SO_4$, filtered, and concentrated to dryness under reduced pressure give the product, which was purified by FCC (eluent:petroleum ether:ethyl acetate, 1:0 to 3:2, gradient elution) to afford the title compound (700 mg) as a yellow oil, which was used in the next step without further purification. MS (ESI): mass calcd. for $C_{25}H_{22}N_2O_4$ 414.16 m/z found 415.0 [M+H]$^+$.

Intermediate 75: (R,S)-3-Isopropoxy-4-(((8-methyl-4-oxochroman-7-yl)oxy)(pyridin-4-yl)methyl)benzonitrile

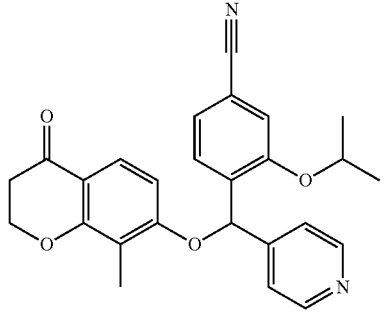 [SMILES: Cc1c(OC(c2ccncc2)c2ccc(C#N)cc2OC(C)C)ccc2c1OCCC2=O]

2-Iodopropane (78 uL, 0.78 mmol), 3-hydroxy-4-(((8-methyl-4-oxochroman-7-yl)oxy)(pyridin-4-yl)methyl)benzonitrile (Intermediate 73, Step F, 300 mg, 0.776 mmol), K$_2$CO$_3$ (225 mg, 1.63 mmol), and DMF (8 mL) were stirred at room temperature for 20 hours before pouring it into water (20 mL) and extracting with ethyl acetate (30 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 3:2, gradient elution) to afford the title compound (250 mg, 53%) as a yellow oil. MS (ESI): mass calcd. for C$_{26}$H$_{24}$N$_2$O$_4$ 428.17 m/z found 429.1 [M+H]$^+$.

Intermediate 76: (R,S)-3-Isobutoxy-4-(((8-methyl-4-oxochroman-7-yl)oxy)(pyridin-4-yl)methyl)benzonitrile

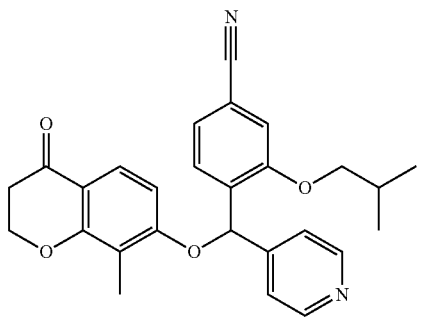 [SMILES: Cc1c(OC(c2ccncc2)c2ccc(C#N)cc2OCC(C)C)ccc2c1OCCC2=O]

DIAD (0.3 mL, 1.51 mmol) was added to a solution of 3-hydroxy-4-(((8-methyl-4-oxochroman-7-yl)oxy)(pyridin-4-yl)methyl)benzonitrile (Intermediate 73, Step F, 400 mg, 1.04 mmol), 2-methylpropan-1-ol (0.15 mL, 1.64 mmol), PPh$_3$ (410 mg, 1.56 mmol), and THF (10 mL) that had been cooled to 0° C. The mixture was stirred for 16 hours with gradual warming to room temperature before pouring it into water (30 mL) and extracting with ethyl acetate (30 mL×2). The combined organic extracts were dried over anhydrous Na$_2$SO$_4$, filtered, and concentrated to dryness under reduced pressure to give the product, which was purified by FCC (eluent: petroleum ether:ethyl acetate, 10:1 to 1:1, gradient elution) to afford the title compound (400 mg, 70%) as a brown oil. MS (ESI): mass calcd. for C$_{27}$H$_{26}$N$_2$O$_4$ 442.19 m/z found 443.1 [M+H]$^+$.

Intermediate 77: (R,S)-3-(Benzyloxy)-4-(((8-methyl-4-oxochroman-7-yl)oxy)(pyridin-4-yl)methyl)benzonitrile

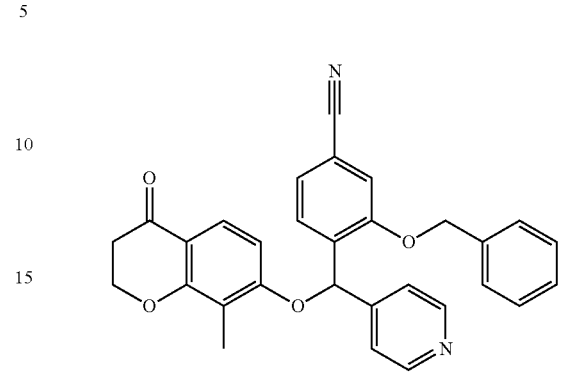

BnBr (90 mg, 0.53 mmol) was added to a mixture of 3-hydroxy-4-(((8-methyl-4-oxochroman-7-yl)oxy)(pyridin-4-yl)methyl)benzonitrile (Intermediate 73, Step F, 200 mg, 0.518 mmol), K$_2$CO$_3$ (165 mg, 1.19 mmol), and DMF (2 mL). The mixture was stirred at room temperature for 16 hours and then stirred at 50° C. for another 16 hours before quenching with H$_2$O (20 mL) and extracting with ethyl acetate (20 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 20:1 to 1:2, gradient elution) to afford the title compound (70 mg, 28%) as a yellow oil. MS (ESI): mass calcd. for C$_{30}$H$_{24}$N$_2$O$_4$ 476.17 m/z found 477.0 [M+H]$^+$.

Intermediate 78: (R,S)-Ethyl 3-(4-((4-carbamoylphenyl)((8-methyl-4-oxochroman-7-yl)oxy)methyl)pyridin-2-yl)propanoate

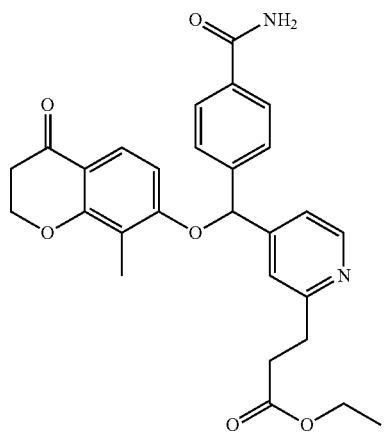 [SMILES: CCOC(=O)CCc1cc(C(Oc2ccc3c(c2C)OCCC3=O)c2ccc(C(N)=O)cc2)ccn1]

Step A: (R,S)-4-((2-Bromopyridin-4-yl)(hydroxy)methyl)benzamide. H$_2$O$_2$ (1.4 mL, 30% purity, 14 mmol) was added dropwise to a solution of 4-((2-bromopyridin-4-yl)(hydroxy)methyl)benzonitrile (Intermediate 25, Step A, 1.0 g, 3.5 mmol), K₂CO₃ (1.9 g, 14 mmol), and DMSO (10 mL). The mixture was stirred at room temperature for 1 hour before pouring it into water (50 mL) and the solid was isolated via filtration. The filter cake was washed with petroleum ether (10 mL×2) before drying under reduced pressure to afford the title compound (1 g, 94%) as a white solid. MS (ESI): mass calcd. for $C_{13}H_{11}BrN_2O_2$ 306.00 m/z found 307.0 [M+H]⁺.

Step B: (R,S)-(E)-Ethyl 3-(4-((4-carbamoylphenyl)(hydroxy)methyl)pyridin-2-yl)acrylate. 4-((2-Bromopyridin-4-yl)(hydroxy)methyl)benzamide (1.0 g, 3.3 mmol), (E)-ethyl 3-(4,4,5,5-tetramethyl-1,3,2-dioxaborolan-2-yl)acrylate (735 mg, 3.25 mmol), and K₃PO₄ (480 mg, 4.89 mmol) were dissolved in 1,4-dioxane (10 mL) and H₂O (2 mL). The mixture was sparged with Ar for 5 minutes and then treated with Pd(dtbpf)Cl₂ (213 mg, 0.327 mmol). The mixture was sparged with Ar for another 5 minutes and then stirred while heating at 80° C. via microwave irradiation for 1 hour before cooling to room temperature. The mixture was poured into water (10 mL) and extracted with ethyl acetate (10 mL×3). The combined organic extracts were dried over anhydrous Na₂SO₄, filtered, and concentrated to dryness under reduced pressure afford the product, which was purified by FCC (eluent:petroleum ether:ethyl acetate, 1:0 to 0:1, gradient elution) to afford the title compound (800 mg, 75%) as a yellow oil. MS (ESI): mass calcd. for $C_{18}H_{18}N_2O_4$ 326.13 m/z found 326.9 [M+H]⁺.

Step C: (R,S)-Ethyl 3-(4-((4-carbamoylphenyl)(hydroxy)methyl)pyridin-2-yl)propanoate. Wet Pd/C (30 mg, 10 wt. %) was added to a solution of (E)-ethyl 3-(4-((4-carbamoylphenyl)(hydroxy)methyl)pyridin-2-yl)acrylate (300 mg, 0.919 mmol) and EtOH (10 mL). The mixture was stirred under H₂ (50 psi) at room temperature for 16 hours. The suspension was filtered through a pad of diatomaceous earth and the pad washed with EtOH (10 mL). The filtrate was concentrated to dryness under reduced pressure to afford the product which was purified by FCC (eluent:petroleum ether:ethyl acetate, 1:0 to 0:1, gradient elution) to afford the title compound (250 mg, 83%) as a white solid. MS (ESI): mass calcd. for $C_{18}H_{20}N_2O_4$ 328.14 m/z found 329.1 [M+H]⁺. ¹H NMR (400 MHz, DMSO-d₆) δ 8.58 (d, J=6.1 Hz, 1H), 8.44 (d, J=5.1 Hz, 1H), 7.92 (s, 1H), 7.83-7.79 (m, 2H), 7.48-7.45 (m, 3H), 7.33 (s, 1H), 6.42-6.25 (m, 1H), 5.79 (s, 1H), 3.99 (q, J=7.2 Hz, 2H), 3.02 (t, J=7.2 Hz, 2H), 2.74 (t, J=7.2 Hz, 2H), 1.11 (t, J=7.1 Hz, 3H).

Step D: (R,S)-Ethyl 3-(4-((4-carbamoylphenyl)((8-methyl-4-oxochroman-7-yl)oxy)methyl)pyridin-2-yl)propanoate. DIAD (0.45 mL, 2.5 mmol) was added to a solution of 7-hydroxy-8-methylchroman-4-one (Intermediate 40, Step B, 239 mg, 1.34 mmol), ethyl 3-(4-((4-carbamoylphenyl)(hydroxy)methyl)pyridin-2-yl)propanoate (400 mg, 1.22 mmol), PPh₃ (639 mg, 2.44 mmol), and THF (5 mL). The mixture was stirred at room temperature for 2 hours, then stirred at 70° C. for another 16 hours before concentrating to dryness under reduced pressure to give the product, which was purified by preparative HPLC using a Xtimate C18, 150×25 mm×m column (eluent: 22% to 52% (v/v) CH₃CN and H₂O with 0.225% HCOOH) to afford the title compound (200 mg, 31%) as a light yellow solid. MS (ESI): mass calcd. for $C_{28}H_{28}N_2O_6$ 488.19 m/z found 489.0 [M+H]⁺.

Intermediate 79:
7-Hydroxy-6,8-dimethylchroman-4-one

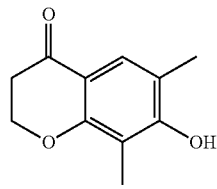

Step A: 6-Bromo-7-hydroxy-8-methylchroman-4-one. NBS (2.0 g, 11 mmol), 7-hydroxy-8-methylchroman-4-one (Intermediate 40, Step B, 2.0 g, 11 mmol), and dichloromethane (20 mL) were stirred at room temperature for 0.5 hours before pouring it into aqueous Na₂SO₃ (60 mL). The suspension was isolated via filtration. The filter cake was washed with water (10 mL×3) before drying under reduced pressure to afford the title compound (3.0 g) as a brown solid, which was used in the next step without further purification. MS (ESI): mass calcd. for $C_{10}H_9BrO_3$ 255.97 m/z found 257.0 [M+H]⁺.

Step B: 7-Hydroxy-6,8-dimethylchroman-4-one. 6-Bromo-7-hydroxy-8-methylchroman-4-one (1.6 g, 6.2 mmol), 2,4,6-trimethyl-1,3,5,2,4,6-trioxatriborinane (1.88 g, 7.49 mmol), and K₃PO₄ (2.6 g, 12 mmol) were dissolved in 1,4-dioxane (10 mL). The mixture was sparged with N₂ for 5 minutes and then treated with Pd(dtbpf)Cl₂ (406 mg, 0.623 mmol). The mixture was sparged with N₂ for another 5 minutes and then stirred while heating at 100° C. via microwave irradiation for 1 hour before cooling to room temperature. The mixture was poured into water (60 mL) and extracted with ethyl acetate (50 mL×3). The combined organic extracts were washed with brine (30 mL), dried over anhydrous Na₂SO₄, filtered, and concentrated to dryness under reduced pressure to give the product, which was purified by FCC (eluent:petroleum ether:ethyl acetate, 1:0 to 3:1, gradient elution) to afford the title compound (650 mg) as a yellow solid, which was used in the next step without further purification. MS (ESI): mass calcd. for $C_{11}H_{12}O_3$ 192.08 m/z found 193.1 [M+H]⁺.

Intermediate 80: (R,S)-4-(((6,8-Dimethyl-4-oxochroman-7-yl)oxy)(4-fluorophenyl)methyl)benzonitrile

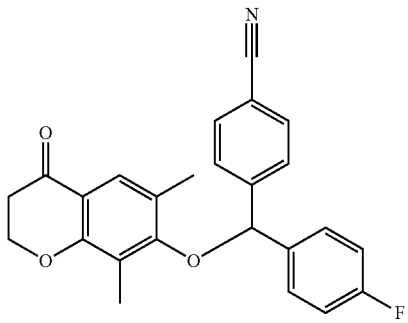 [SMILES: Cc1cc2c(c(C)c1OC(c1ccc(F)cc1)c1ccc(C#N)cc1)OCCC2=O]

DIAD (685 mg, 3.39 mmol) was added to a mixture consisting of 7-hydroxy-6,8-dimethylchroman-4-one (Intermediate 79, 550 mg, 2.12 mmol), 4-((4-fluorophenyl)(hydroxy)methyl)benzonitrile (Intermediate 57, Step A, 529 mg, 2.33 mmol), PPh$_3$ (889 mg, 3.39 mmol), and dichloromethane (5 mL). The mixture was stirred at room temperature for 45 min. For isolation, the mixture was combined with a second batch conducted in the same manner. The mixture was concentrated to dryness under reduced pressure to give the product, which was purified by FCC (eluent: petroleum ether:ethyl acetate, 1:0 to 3:1, gradient elution) to afford the title compound (800 mg) as a yellow oil, which was used in the next step without further purification. MS (ESI): mass calcd. for C$_{25}$H$_{20}$FNO$_3$ 401.14 m/z found 402.1 [M+H]$^+$.

Intermediate 81:
6-Fluoro-7-hydroxy-8-methylchroman-4-one

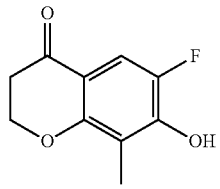

Step A: 4-Fluoro-2-methylbenzene-1,3-diol. 2-Methylbenzene-1,3-diol (50.0 g, 403 mmol), 1-(chloromethyl)-4-fluoro-1,4-diazabicyclo[2.2.2]octane-1,4-diium tetrafluoroborate (157 g, 443 mmol), and CH$_3$CN (800 mL) were added to a 2 L round-bottomed flask. The mixture was heated at 50° C. for 16 hours before cooling to room temperature. The suspension was isolated via filtration and the filter cake washed with ethyl acetate (20 mL×2). The filtrate was concentrated to dryness under reduced pressure to give the product, which was purified by FCC (eluent: petroleum ether:ethyl acetate, 1:0 to 3:2, gradient elution) to afford the title compound (56 g) as a brown solid, which was used in the next step without further purification.

Step B: 3-Chloro-1-(5-fluoro-2,4-dihydroxy-3-methylphenyl)propan-1-one. CF$_3$SO$_3$H (635 mL, 7.18 mol) was added dropwise to a mixture of 4-fluoro-2-methylbenzene-1,3-diol (35.0 g, 239 mmol) and 3-chloropropanoic acid (29.0 g, 267 mmol). The mixture was heated at 85° C. for 2 hours before cooling to room temperature and adding dropwise to ice/water (500 mL). The suspension was isolated via filtration and the filter cake washed with water (15 mL). The filtrate was extracted with dichloromethane (100 mL×3). The combined organic extracts were washed with brine (20 mL), dried over anhydrous Na$_2$SO$_4$, filtered, and concentrated to dryness under reduced pressure to afford the title compound (34 g) as a brown oil, which was used in the next step without further purification.

Step C: 6-Fluoro-7-hydroxy-8-methylchroman-4-one. 3-Chloro-1-(5-fluoro-2,4-dihydroxy-3-methylphenyl)propan-1-one (35 g) was added to aqueous NaOH (753 mL, 2 M, 1.51 mmol) which had been cooled to 0° C. The mixture was stirred at room temperature for 16 hours before adjusting the pH of the solution to pH 3-5 with 6 N HCl and extracting with ethyl acetate (100 mL×3). The combined organic extracts were washed with brine (50 mL), dried over anhydrous Na$_2$SO$_4$, filtered, and concentrated to dryness under reduced pressure to give the product, which was purified by FCC (eluent:petroleum ether:ethyl acetate, 1:0 to 1:1, gradient elution) to afford the title compound (13.4 g) as a yellow solid, which was used in the next step without further purification. MS (ESI): mass calcd. for C$_{10}$H$_9$FO$_3$ 196.05 m/z found 196.8 [M+H]$^+$.

Intermediate 82: (R,S)-4-((3,4-Difluorophenyl)((6-fluoro-8-methyl-4-oxochroman-7-yl)oxy)methyl)benzonitrile

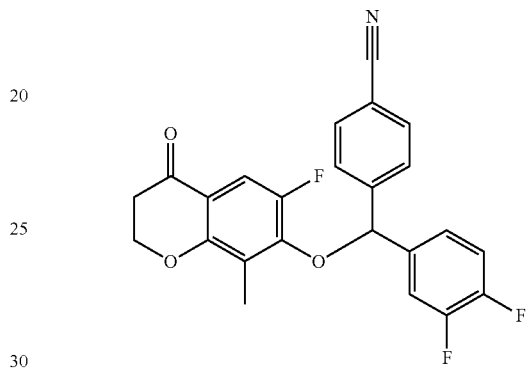

Step A: (R,S)-4-((3,4-Difluorophenyl)(hydroxy)methyl)benzonitrile. i-PrMgCl·LiCl complex (9.7 mL, 1.3 M in THF, 13 mmol) was added dropwise to a solution of 4-iodobenzonitrile (2.9 g, 13 mmol) and THF (15 mL) that had been cooled to −15° C. The mixture was stirred at −15° C. for 1 hour and then added dropwise to a −15° C. solution of 3,4-difluorobenzaldehyde (1.5 g, 11 mmol) and THF (5 mL). The mixture was stirred at room temperature for 16 hours before quenching with saturated NH$_4$Cl (50 mL) and extracting with ethyl acetate (50 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 20:1 to 2:1, gradient elution) to afford the title compound (1.5 g, 56%) as an oil. MS (ESI): mass calcd. for C$_{14}$H$_9$F$_2$NO 245.07 m/z found 246.1 [M+H]$^+$.

Step B: 4-((3,4-Difluorophenyl)((6-fluoro-8-methyl-4-oxochroman-7-yl)oxy)methyl)benzonitrile. DIAD (577 mg, 2.85 mmol) was added to a solution of 6-fluoro-7-hydroxy-8-methylchroman-4-one (Intermediate 81, 350 mg, 1.78 mmol), 4-((3,4-difluorophenyl)(hydroxy)methyl)benzonitrile (481 mg, 1.96 mmol), PPh$_3$ (655 mg, 2.50 mmol), and THF (3 mL). The mixture was stirred at room temperature for 2 hours before pouring it into H$_2$O (60 mL) and extracting with ethyl acetate (30 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 10:1 to 2:1, gradient elution) to afford the title compound (300 mg, 33%) as a clear oil. MS (ESI): mass calcd. for C$_{24}$H$_{16}$F$_3$NO$_3$ 423.11 m/z found 424.1 [M+H]$^+$.

123

Intermediate 83: (R,S)-4-((3-Bromophenyl)((6-fluoro-8-methyl-4-oxochroman-7-yl)oxy)methyl)benzamide

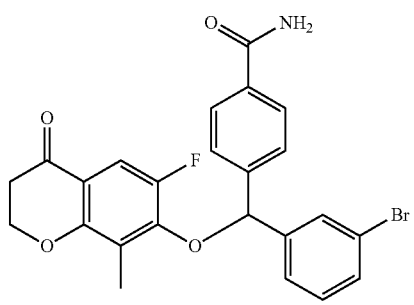 [SMILES: Cc1c(OC(c2ccc(C(N)=O)cc2)c2cccc(Br)c2)c(F)cc2c1OCCC2=O]

Step A: (R,S)-4-((3-Bromophenyl)((6-fluoro-8-methyl-4-oxochroman-7-yl)oxy)methyl)benzonitrile. DIAD (825 mg, 4.08 mmol) was added to a solution of 6-fluoro-7-hydroxy-8-methylchroman-4-one (Intermediate 81, 500 mg, 2.55 mmol), 4-((3-bromophenyl)(hydroxy)methyl)benzonitrile (Intermediate 51, Step A, 808 mg, 2.80 mmol), PPh$_3$ (936 mg, 3.57 mmol), and THF (5 mL). The mixture was stirred at room temperature for 2 hours before pouring it into H$_2$O (30 mL) and extracting with ethyl acetate (30 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 10:1 to 2:1, gradient elution) to afford the title compound (800 mg, 57%) as a clear oil. MS (ESI): mass calcd. for $C_{24}H_{17}BrFNO_3$ 465.04 m/z found 466.0 [M+H]$^+$.

Step B: (R,S)-4-((3-Bromophenyl)((6-fluoro-8-methyl-4-oxochroman-7-yl)oxy)methyl)benzamide. H$_2$O$_2$ (0.53 mL, 30% purity, 5.3 mmol) was added dropwise to a solution of 4-((3-bromophenyl)((6-fluoro-8-methyl-4-oxochroman-7-yl)oxy)methyl)benzonitrile (700 mg, 1.50 mmol), K$_2$CO$_3$ (622 mg, 4.50 mmol), and DMSO (5 mL). The mixture was stirred at room temperature for 2 hours before quenching with saturated Na$_2$SO$_3$ (30 mL) and extracting with ethyl acetate (30 mL×3). The combined organic extracts were dried over anhydrous Na$_2$SO$_4$, filtered, and concentrated to dryness under reduced pressure to afford the product, which was purified by FCC (eluent:petroleum ether:ethyl acetate, 20:1 to 0:1, gradient elution) to afford the title compound (650 mg, 80%) as a clear oil. MS (ESI): mass calcd. for $C_{24}H_{19}BrFNO_4$ 483.05 m/z found 486.1 [M+H]$^+$.

124

Intermediate 84: (R,S)-4-(((6-Fluoro-8-methyl-4-oxochroman-7-yl)oxy)(4-(methylsulfonyl)phenyl)methyl)benzonitrile

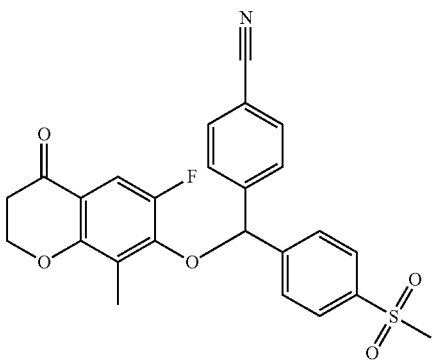 [SMILES: Cc1c(OC(c2ccc(C#N)cc2)c2ccc(S(C)(=O)=O)cc2)c(F)cc2c1OCCC2=O]

Step A: (R,S)-4-(Hydroxy(4-(methylsulfonyl)phenyl)methyl)benzonitrile. i-PrMgCl·LiCl (4.6 mL, 1.3 M in THF, 6.0 mmol) was added dropwise to a solution of 4-iodobenzonitrile (1.4 g, 6.1 mmol) and THF (10 mL) that had been cooled to 0° C. The mixture was stirred at 0° C. for 1 hour before treating with a solution of 4-(methylsulfonyl)benzaldehyde (1.0 g, 5.4 mmol) and THF (5 mL) dropwise at 0° C. The mixture was stirred for 1.5 hours with gradual warming to room temperature before pouring it into saturated NH$_4$Cl (50 mL, aq) and extracting with ethyl acetate (40 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 1:1, gradient elution) to afford the title compound (1.0 g, 64%) as a white solid. $^1$H NMR (400 MHz, DMSO-d$_6$) δ 7.85 (d, J=8.6 Hz, 2H), 7.77 (d, J=8.3 Hz, 2H), 7.64 (d, J=8.3 Hz, 2H), 7.59 (d, J=8.3 Hz, 2H), 6.40 (d, J=4.2 Hz, 1H), 5.91 (d, J=3.9 Hz, 1H), 3.14 (s, 3H).

Step B: (R,S)-4-(((6-Fluoro-8-methyl-4-oxochroman-7-yl)oxy)(4-(methylsulfonyl)phenyl)methyl)benzonitrile. DIAD (405 mg, 2.00 mmol) was added to a mixture consisting of 6-fluoro-7-hydroxy-8-methylchroman-4-one (Intermediate 81, 250 mg, 1.27 mmol), 4-(hydroxy(4-(methylsulfonyl)phenyl)methyl)benzonitrile (360 mg, 1.25 mmol), PPh$_3$ (526 mg, 2.01 mmol), and dichloromethane (3 mL). The mixture was stirred at room temperature for 16 hours before concentrating to dryness under reduced pressure to give the product, which was purified by FCC (eluent: petroleum ether:ethyl acetate, 1:0 to 1:1, gradient elution) to afford the title compound (500 mg) as a yellow oil, which was used in the next step without further purification. MS (ESI): mass calcd. for $C_{25}H_{20}FNO_5S$ 465.10 m/z found 488.1 [M+Na]$^+$.

Intermediate 85: (R,S)-4-((2,6-Dimethylpyridin-4-yl)((6-fluoro-8-methyl-4-oxochroman-7-yl)oxy)methyl)benzonitrile

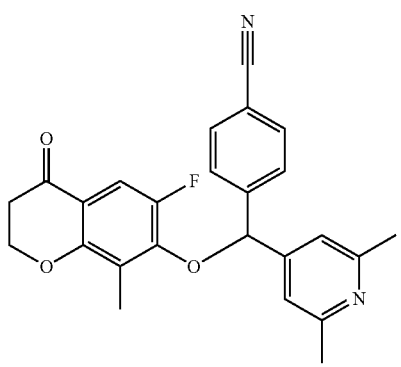 [SMILES: Cc1cc(C(Oc2c(F)cc3c(c2C)OCCC3=O)c2ccc(C#N)cc2)cc(C)n1]

Step A: (R,S)-4-((2,6-Dimethylpyridin-4-yl)(hydroxy)methyl)benzonitrile. i-PrMgCl·LiCl (5.6 mL, 1.3 M in THF, 7.3 mmol) was added dropwise to a solution of 4-iodobenzonitrile (1.7 g, 7.4 mmol) and THF (15 mL) that had been cooled to 0° C. The mixture was stirred at 0° C. for 1 hour before treating with a solution of 2,6-dimethylisonicotinaldehyde (900 mg, 6.66 mmol) and THF (5 mL) dropwise at 0° C. The mixture was stirred for 1.5 hours with gradual warming to room temperature before pouring it into saturated NH$_4$Cl (80 mL) and extracting with ethyl acetate (50 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 1:2, gradient elution) to afford the title product (900 mg, 57%) as a yellow solid. MS (ESI): mass calcd. for C$_{15}$H$_{14}$N$_2$O 238.11 m/z found 238.9 [M+H]$^+$. $^1$H NMR (400 MHz, DMSO-d$_6$) δ 7.78 (d, J=8.1 Hz, 2H), 7.58 (d, J=8.3 Hz, 2H), 7.04 (s, 2H), 6.29 (d, J=4.2 Hz, 1H), 5.71 (d, J=3.9 Hz, 1H), 2.36 (s, 6H).

Step B: (R,S)-4-((2,6-Dimethylpyridin-4-yl)((6-fluoro-8-methyl-4-oxochroman-7-yl)oxy)methyl)benzonitrile. DIAD (407 mg, 2.01 mmol) was added to a mixture of 6-fluoro-7-hydroxy-8-methylchroman-4-one (Intermediate 81, 247 mg, 1.26 mmol), 4-((2,6-dimethylpyridin-4-yl)(hydroxy)methyl)benzonitrile (300 mg, 1.26 mmol), PPh$_3$ (528 mg, 2.01 mmol), and dichloromethane (4 mL). The mixture was stirred at room temperature for 16 hours before concentrating to dryness under reduced pressure to give the product, which was purified by FCC (eluent:petroleum ether:ethyl acetate, 1:0 to 1:1, gradient elution) to afford the title compound (600 mg) as a yellow oil, which was used in the next step without further purification. MS (ESI): mass calcd. for C$_{25}$H$_{21}$FN$_2$O$_3$ 416.15 m/z found 417.1 [M+H]$^+$.

Intermediate 86: (R,S)-2-Fluoro-4-(((6-fluoro-8-methyl-4-oxochroman-7-yl)oxy)(pyridin-4-yl)methyl)benzonitrile

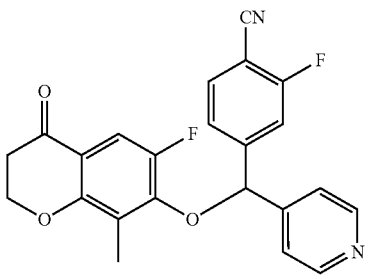 [SMILES: Cc1c(OC(c2ccncc2)c2ccc(C#N)c(F)c2)c(F)cc2c1OCCC2=O]

Step A: (R,S)-2-Fluoro-4-(hydroxy(pyridin-4-yl)methyl)benzonitrile. i-PrMgCl·LiCl (9.0 mL, 1.3 M in THF, 12 mmol) was added dropwise to a solution of 4-iodopyridine (2.0 g, 10 mmol) and THF (20 mL) that had been cooled to 0° C. The mixture was stirred at 0° C. for 1 hour before treating with a solution of 2-fluoro-4-formylbenzonitrile (1.5 g, 10 mmol) and THF (10 mL) at 0° C. The mixture was stirred at 0° C. for another 1 hour and then stirred for 2 hours with gradual warming to room temperature. The mixture was poured into saturated NH$_4$Cl (20 mL) and the mixture extracted with ethyl acetate (30 mL×3). The combined organic extracts were dried over anhydrous Na$_2$SO$_4$, filtered, and concentrated to dryness under reduced pressure. The residue was triturated with ethyl acetate (20 mL) and the solid was isolated via filtration. The filter cake was washed with ethyl acetate (5 mL×2) before drying under reduced pressure to afford the title compound (1.2 g, 54%) as a white solid. MS (ESI): mass calcd. for C$_{13}$H$_9$FN$_2$O 228.07 m/z found 228.9 [M+H]$^+$. $^1$H NMR (400 MHz, DMSO-d$_6$) δ 8.51-8.43 (m, 2H), 7.90-7.81 (m, 1H), 7.55 (d, J=10.5 Hz, 1H), 7.45-7.34 (m, 3H), 6.50 (d, J=4.2 Hz, 1H), 5.82 (d, J=3.7 Hz, 1H).

Step B: (R,S)-2-Fluoro-4-(((6-fluoro-8-methyl-4-oxochroman-7-yl)oxy)(pyridin-4-yl)methyl)benzonitrile. DIAD (335 mg, 1.66 mmol) was added to a solution of 2-fluoro-4-(hydroxy(pyridin-4-yl)methyl)benzonitrile (250 mg, 1.10 mmol), 6-fluoro-7-hydroxy-8-methylchroman-4-one (Intermediate 81, 280 mg, 1.43 mmol), PPh$_3$ (430 mg, 1.64 mmol), and THF (5 mL) that had been cooled to 0° C. The mixture was stirred for 12 hours with gradual warming to room temperature before pouring into water (20 mL) and extracting with ethyl acetate (20 mL×2). The combined organic extracts were dried over anhydrous Na$_2$SO$_4$, filtered, and concentrated to dryness under reduced pressure to give the product, which was purified by FCC (eluent:petroleum ether:ethyl acetate, 10:1 to 1:3, gradient elution) to afford the title compound (900 mg) as a brown oil, which was used in the next step without further purification. MS (ESI): mass calcd. for C$_{23}$H$_{16}$F$_2$N$_2$O$_3$ 406.11 m/z found 406.9 [M+H]$^+$.

Intermediate 87: (R,S)-(3-Fluoro-4-methoxyphenyl)(pyridin-4-yl)methanol

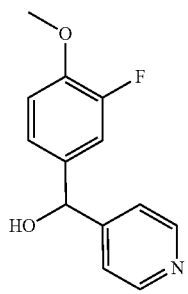

4-Iodopyridine (2.0 g, 9.8 mmol) was added to a 100 mL three-necked round-bottomed flask containing a solution of i-PrMgCl·LiCl (11.3 mL, 1.3 M in THF, 14.7 mmol) and THF (20 mL) that had been cooled to 0° C. The mixture was stirred at 0° C. for 1 hour before treating with 3-fluoro-4-methoxybenzaldehyde (1.67 g, 10.8 mmol). The mixture was stirred at 0° C. for another 2 hours before quenching with saturated $NH_4Cl$ (20 mL) and extracting with ethyl acetate (50 mL×3). The combined organic extracts were washed with brine (10 mL), dried over anhydrous $Na_2SO_4$, filtered, and concentrated to dryness under reduced pressure. The residue was triturated with petroleum ether:ethyl acetate (1:1, 10 mL) and the solid was isolated via filtration. The filter cake was washed with petroleum ether:ethyl acetate (1:1, 5 mL) before drying under reduced pressure to afford the title compound (960 mg, 41%) as a yellow solid. MS (ESI): mass calcd. for $C_{13}H_{12}FNO_2$ 233.09 m/z found 233.8 [M+H]$^+$.

Intermediate 88: (R,S)-4-(((5-Ethyl-4-oxochroman-7-yl)oxy)(pyridin-4-yl)methyl)benzonitrile

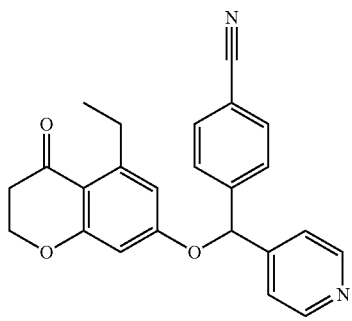 [SMILES: CCc1cc(OC(c2ccncc2)c2ccc(C#N)cc2)cc2c1C(=O)CCO2]

Step A: 7-((4-Methoxybenzyl)oxy)-4-oxochroman-5-yl trifluoromethanesulfonate. DMAP (651 mg, 5.33 mmol) was added to a solution of 5-hydroxy-7-((4-methoxybenzyl)oxy)chroman-4-one (Intermediate 68, Step C, 1.6 g, 5.3 mmol), 1,1,1-trifluoro-N-phenyl-N-((trifluoromethyl)sulfonyl)methanesulfonamide (2.3 g, 6.4 mmol), $Et_3N$ (2.2 mL, 16 mmol), and dichloromethane (20 mL). The mixture was stirred at room temperature for 16 hours before pouring it into water (20 mL) and extracting with dichloromethane (20 mL×2). The combined organic extracts were dried over anhydrous $Na_2SO_4$, filtered, and concentrated to dryness under reduced pressure to give the product, which was purified by FCC (eluent: petroleum ether:ethyl acetate, 1:0 to 3:1, gradient elution) to afford the title compound (1.7 g, 74%) as a colorless oil. MS (ESI): mass calcd. for $C_{18}H_{15}F_3O_7S$ 432.05 m/z found 432.9 [M+H]$^+$. $^1$H NMR (400 MHz, DMSO-$d_6$) δ 7.39 (d, J=8.5 Hz, 2H), 6.96 (d, J=8.5 Hz, 2H), 6.84 (d, J=2.3 Hz, 1H), 6.65 (d, J=2.0 Hz, 1H), 5.15 (s, 2H), 4.55 (t, J=6.4 Hz, 2H), 3.76 (s, 3H), 2.78 (t, J=6.4 Hz, 2H).

Step B: 7-((4-Methoxybenzyl)oxy)-5-vinylchroman-4-one. 7-((4-Methoxybenzyl)oxy)-4-oxochroman-5-yl trifluoromethanesulfonate (2.0 g, 4.6 mmol), 4,4,5,5-tetramethyl-2-vinyl-1,3,2-dioxaborolane (784 mg, 5.09 mmol), and $Cs_2CO_3$ (4.5 g, 14 mmol) were added to 1,4-dioxane (16 mL) and $H_2O$ (4 mL). The mixture was sparged with Ar for 5 minutes and then treated with Pd(dppf)Cl$_2$ (340 mg, 0.465 mmol). The mixture was sparged with Ar for another 5 minutes and then stirred while heating at 110° C. for 3 hours before cooling to room temperature, pouring it into water (20 mL), and extracting with ethyl acetate (20 mL×3). The combined organic extracts were dried over anhydrous $Na_2SO_4$, filtered, and concentrated to dryness under reduced pressure to give the product, which was purified by FCC (eluent:petroleum ether:ethyl acetate, 1:0 to 2:1, gradient elution) to afford the title compound (1.2 g, 79%) as a light yellow solid. MS (ESI): mass calcd. for $C_{19}H_{18}O_4$ 310.12 m/z found 310.9 [M+H]$^+$. $^1$H NMR (400 MHz, DMSO-$d_6$) δ 7.66-7.57 (m, 1H), 7.38 (d, J=8.6 Hz, 2H), 6.95 (d, J=8.6 Hz, 2H), 6.73 (s, 1H), 6.59 (d, J=2.0 Hz, 1H), 5.63 (d, J=17.6 Hz, 1H), 5.29 (d, J=11.2 Hz, 1H), 5.11 (s, 2H), 4.45 (t, J=6.2 Hz, 2H), 3.76 (s, 3H), 2.69 (t, J=6.2 Hz, 2H).

Step C: 5-Ethyl-7-((4-methoxybenzyl)oxy)chroman-4-one. (PPh$_3$)$_3$RhCl (328 mg, 0.355 mmol) was added to a solution of 7-((4-methoxybenzyl)oxy)-5-vinylchroman-4-one (1.1 g, 3.5 mmol) and ethyl acetate (15 mL) heated at 60° C. for 2 hours under an atmosphere of H$_2$ (50 psi). The suspension was filtered through a pad of diatomaceous earth and the pad washed with ethyl acetate (20 mL). The filtrate was concentrated to dryness under reduced pressure to afford the product, which was purified by FCC (eluent:petroleum ether:ethyl acetate, 1:0 to 3:1, gradient elution) to afford title compound (1 g, 90%) as a light yellow solid. MS (ESI): mass calcd. for $C_{19}H_{20}O_4$ 312.14 m/z found 312.9 [M+H]$^+$. $^1$H NMR (400 MHz, DMSO-$d_6$) δ 7.37 (d, J=8.6 Hz, 2H), 6.95 (d, J=8.6 Hz, 2H), 6.48 (s, 2H), 5.06 (s, 2H), 4.42 (t, J=6.4 Hz, 2H), 3.75 (s, 3H), 2.96 (q, J=7.3 Hz, 2H), 2.67 (t, J=6.4 Hz, 2H), 1.09 (t, J=7.3 Hz, 3H).

Step D: 5-Ethyl-7-hydroxychroman-4-one. CF$_3$SO$_3$H (0.72 mL) was added to a solution of 5-ethyl-7-((4-methoxybenzyl)oxy)chroman-4-one (850 mg, 2.72 mmol) and TFA (8 mL). The mixture was heated at 50° C. for 1 hour before cooling to room temperature, concentrating under reduced pressure, pouring it to water (10 mL), and extracting with dichloromethane (10 mL×3). The combined organic extracts were dried over anhydrous $Na_2SO_4$, filtered, and concentrated to dryness under reduced pressure to give the product, which was purified by FCC (eluent: petroleum ether:ethyl acetate, 1:0 to 2:1, gradient elution) to afford the title compound (560 mg, 85%) as a light yellow solid. MS (ESI): mass calcd. for $C_{11}H_{12}O_3$ 192.08 m/z found 193.1 [M+H]$^+$. $^1$H NMR (400 MHz, DMSO-$d_6$) δ 10.37 (s, 1H), 6.25 (s, 1H), 6.14 (s, 1H), 4.34 (t, J=6.2 Hz, 2H), 2.89 (q, J=7.2 Hz, 2H), 2.60 (t, J=6.5 Hz, 2H), 1.05 (t, J=7.2 Hz, 3H).

Step E: (R,S)-4-(((5-Ethyl-4-oxochroman-7-yl)oxy)(pyridin-4-yl)methyl)benzonitrile. DEAD (0.62 mL, 0.31 mmol) was added to a solution of 4-(hydroxy(pyridin-4-yl)methyl)benzonitrile (Intermediate 8, 394 mg, 1.87 mmol), 5-ethyl-7-hydroxychroman-4-one (300 mg, 1.56 mmol), PPh$_3$ (819 mg, 3.12 mmol), and THF (3 mL). The mixture was stirred at room temperature for 2 hours. The solvent was removed under reduced pressure to afford the product, which was purified by FCC (eluent:petroleum ether:ethyl acetate, 1:0 to 1:2, gradient elution) to afford the title compound (700 mg) as a yellow solid. MS (ESI): mass calcd. for $C_{24}H_{20}N_2O_3$ 384.15 m/z found 384.9 [M+H]$^+$.

Intermediate 89: (R,S)-4-(((8-Methoxy-4-oxochroman-7-yl)oxy)(pyridin-4-yl)methyl)benzonitrile

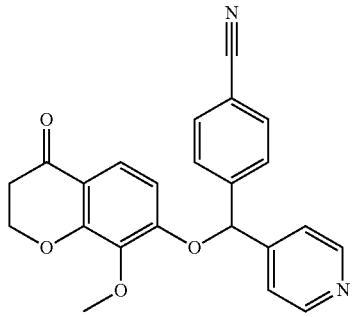 [SMILES: COc1c(OC(c2ccncc2)c2ccc(C#N)cc2)ccc2c1OCCC2=O]

Step A: 7-((4-Methoxybenzyl)oxy)-8-(4,4,5,5-tetramethyl-1,3,2-dioxaborolan-2-yl)chroman-4-one. 8-Bromo-7-((4-methoxybenzyl)oxy)chroman-4-one (Intermediate 64, Step D, 2.0 g, 5.3 mmol), 4,4,4',4',5,5,5',5'-octamethyl-2,2'-bi(1,3,2-dioxaborolane) (2.7 g, 11 mmol), KOAc (1.6 g, 16 mmol), and 1,4-dioxane (15 mL) were added to a flask. The mixture was sparged with N$_2$ for 5 minutes and then treated with Pd(dppf)Cl$_2$ (391 mg, 0.534 mmol). The mixture was sparged with N$_2$ for another 5 minutes and then stirred while heating at 80° C. for 20 hours before cooling to room temperature and concentrating to dryness under reduced pressure. The residue was triturated with toluene (50 mL), the solid was filtered off and discarded, and the filtrate concentrated to dryness under reduced pressure to afford the title compound (2 g), which was used in the next step without further purification. MS (ESI): mass calcd. for $C_{23}H_{27}BO_6$ 410.19 m/z found 411.2 [M+H]$^+$.

Step B: 8-Hydroxy-7-((4-methoxybenzyl)oxy)chroman-4-one. 7-((4-Methoxybenzyl)oxy)-8-(4,4,5,5-tetramethyl-1,3,2-dioxaborolan-2-yl)chroman-4-one (2 g) was dissolved in THF (10 mL). The resulting solution was slowly added to a solution of H$_2$O$_2$ (0.74 mL, 30% purity, 7.4 mmol) and aqueous NaOH (1.95 mL, 2.5 M, 4.88 mmol) that had been cooled to 0° C. Then, the mixture was stirred at room temperature for 6 hours before pouring it into saturated Na$_2$SO$_3$ (10 mL) and extracting with ethyl acetate (20 mL×3). The combined organic extracts were washed with brine (20 mL), dried over anhydrous Na$_2$SO$_4$, filtered, and concentrated to dryness under reduced pressure to give the product, which was purified by FCC (eluent:petroleum ether:ethyl acetate, 1:0 to 0:1) to afford the title compound (100 mg) as brown solid. MS (ESI): mass calcd. for $C_{17}H_{16}O_5$ 300.10 m/z found 301.1 [M+H]$^+$.

Step C: 8-Methoxy-7-((4-methoxybenzyl)oxy)chroman-4-one. 8-Hydroxy-7-((4-methoxybenzyl)oxy)chroman-4-one (250 mg, 0.824 mmol) was added to a suspension of K$_2$CO$_3$ (342 mg, 2.48 mmol) and DMF (3 ml). Then MeI (820 mg, 5.78 mmol) was carefully added dropwise during 15 minutes. The reaction mixture was stirred at 25° C. for 4 hours before pouring it into water (20 mL), and extracting with ethyl acetate (20 mL×3). The organic extracts were dried over anhydrous Na$_2$SO$_4$, filtered, and concentrated to dryness under reduced pressure to afford the title product (200 mg, 74%). MS (ESI): mass calcd. for $C_{18}H_{18}O_5$ 314.12 m/z found 315.1 [M+H]$^+$.

Step D: 7-Hydroxy-8-methoxychroman-4-one. TFA (2 mL) was added to 8-methoxy-7-((4-methoxybenzyl)oxy)chroman-4-one (200 mg, 0.611 mmol). The reaction mixture was stirred at room temperature for 1.5 hours before pouring it into water (20 mL) and extracting with dichloromethane (20 mL×3). The organic extracts were dried over anhydrous Na$_2$SO$_4$, filtered and concentrated to dryness under reduced pressure to afford the title product (230 mg) as a brown oil. MS (ESI): mass calcd. for $C_{10}H_{10}O_4$ 194.06 m/z found 195.1 [M+H]$^+$.

Step E: (R,S)-4-(((8-Methoxy-4-oxochroman-7-yl)oxy)(pyridin-4-yl)methyl)benzonitrile. DIAD (220 mg, 1.09 mmol) was added to a solution of 4-(hydroxy(pyridin-4-yl)methyl)benzonitrile (Intermediate 8, 153 mg, 0.728 mmol), 7-hydroxy-8-methoxychroman-4-one (200 mg, 0.721 mmol), PPh$_3$ (280 mg, 1.07 mmol), and anhydrous dichloromethane (2 mL). The mixture was stirred at room temperature for 1.5 hours before pouring it into water (20 mL) and extracting with ethyl acetate (20 mL×3). The combined organic extracts were washed with brine (20 mL), dried over anhydrous Na$_2$SO$_4$, filtered, and concentrated to dryness under reduced pressure to give the product, which was further purified by FCC (eluent:petroleum ether:ethyl acetate, 1:0 to 0:1) to afford the title compound (280 mg) as a brown oil. MS (ESI): mass calcd. for $C_{23}H_{18}N_2O_4$ 386.13 m/z found 387.1 [M+H]$^+$.

Intermediate 90: 7-Hydroxy-4-oxochromane-5-carbonitrile

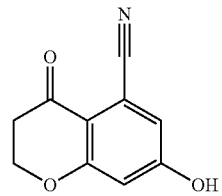 [SMILES: N#Cc1cc(O)cc2c1C(=O)CCO2]

Step A: 7-((4-Methoxybenzyl)oxy)-4-oxochroman-5-carbonitrile. Zn(CN)$_2$ (0.54 g, 4.6 mmol) was added to 7-((4-methoxybenzyl)oxy)-4-oxochroman-5-yl trifluoromethanesulfonate (Intermediate 88, Step A, 900 mg, 2.08), Zn dust (41 mg, 0.63 mmol), and DMF (10 mL). The mixture was sparged with Ar for 5 minutes and then treated with Pd(dppf)Cl$_2$ (3.1 g, 4.2 mmol). The mixture was sparged with Ar for another 5 minutes and then heated at 100° C. for 1 hour before cooling to room temperature, pouring it into water (20 mL), and extracting with dichloromethane (20 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 1:1) to afford the title compound (500 mg, 63%) as a white solid. MS (ESI): mass calcd. for $C_{18}H_{15}NO_4$ 309.10 m/z found 332.1 [M+Na]$^+$. $^1$H NMR (400 MHz, DMSO-d$_6$) δ 7.39 (d, J=8.3 Hz, 2H), 7.23 (d, J=2.0 Hz, 1H), 7.01-6.92 (m, 3H), 5.15 (s, 2H), 4.57 (t, J=6.4 Hz, 2H), 3.76 (s, 3H), 2.79 (t, J=6.4 Hz, 2H).

Step B: 7-Hydroxy-4-oxochroman-5-carbonitrile. 7-((4-Methoxybenzyl)oxy)-4-oxochroman-5-carbonitrile (450 mg, 1.46 mmol) was added to a solution of TFA (5 mL). The mixture was stirred at room temperature for 1 hour before pouring it into CH$_3$CN (10 mL). The resulting white solid was separated out and the solid was isolated via filtration. The filter cake was washed with water (10 mL×2) before drying under reduced pressure to afford the title compound (280 mg, 92%) as a white solid. MS (ESI): mass calcd. for C$_{10}$H$_7$NO$_3$ 189.04 m/z found 211.8 [M+Na]$^+$. $^1$H NMR (400 MHz, DMSO-d$_6$) δ 11.28 (br s, 1H), 6.92 (d, J=2.3 Hz, 1H), 6.62 (d, J=2.3 Hz, 1H), 4.52 (t, J=6.4 Hz, 2H), 2.76 (t, J=6.4 Hz, 2H).

Intermediate 91: (R,S)-4-(((8-Bromo-4-oxochroman-7-yl)oxy)(pyridin-4-yl)methyl)benzonitrile

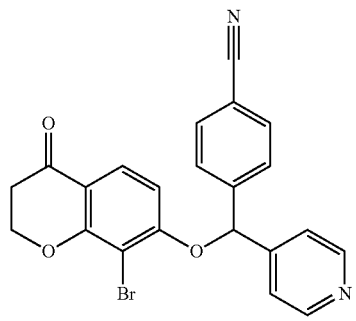 [SMILES: N#Cc1ccc(C(Oc2ccc3c(c2Br)OCCC3=O)c2ccncc2)cc1]

DIAD (1441 mg, 7.126 mmol) was added to a solution of 4-(hydroxy(pyridin-4-yl)methyl)benzonitrile (Intermediate 8, 999 mg, 4.75 mmol), 8-bromo-7-hydroxychroman-4-one (Intermediate 64, Step C, 1250 mg, 4.783 mmol), PPh$_3$ (1.87 g, 7.13 mmol), and anhydrous dichloromethane (10 mL). The mixture was stirred at room temperature for 1.5 hours before pouring it into water (20 mL) and extracting with ethyl acetate (20 mL×3). The combined organic extracts were washed with brine (20 mL), dried over anhydrous Na$_2$SO$_4$, filtered, and concentrated to dryness under reduced pressure to give the product, which was purified by FCC (eluent:petroleum ether:ethyl acetate, 1:0 to 0:1) to afford the title compound (2.4 g) as brown oil. MS (ESI): mass calcd. for C$_{22}$H$_{15}$BrN$_2$O$_3$ 434.03 m/z found 435.0 [M+H]$^+$.

Intermediate 92: (R,S)-(4-(Methylsulfonyl)phenyl)(pyridin-4-yl)methanol

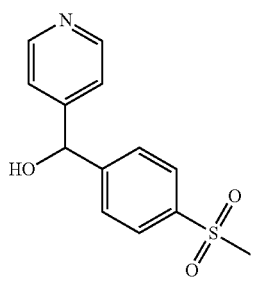 [SMILES: CS(=O)(=O)c1ccc(C(O)c2ccncc2)cc1]

i-PrMgCl·LiCl complex (4.6 mL, 1.3 M in THF, 6.0 mmol) was added dropwise to a solution of 4-iodopyridine (1.2 g, 5.9 mmol) and THF (15 mL) that had been cooled to 0° C. The mixture was stirred at 0° C. for 1 hour before treating with 4-(methylsulfonyl)benzaldehyde (1.0 g, 5.4 mmol). Then the mixture was stirred for another 3 hours with gradual warming to room temperature before pouring it into saturated aqueous NH$_4$Cl (50 mL) and extracting with ethyl acetate (40 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 0:1) to afford the title compound (750 mg, 52%) as a white solid. MS (ESI): mass calcd. for C$_{13}$H$_{13}$NO$_3$S 263.06 m/z found 264.1 [M+H]$^+$.

Intermediate 93: (R,S)-3-(Methylsulfonyl)phenyl)(pyridin-4-yl)methanol

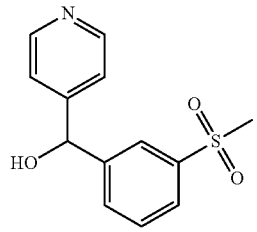 [SMILES: CS(=O)(=O)c1cccc(C(O)c2ccncc2)c1]

i-PrMgCl·LiCl complex (2.8 mL, 1.3 M in THF, 3.6 mmol) was added dropwise to a solution of 4-iodopyridine (557 mg, 2.72 mmol) and THF (10 mL) that had been cooled to 0° C. The mixture was stirred at 0° C. for 1 hour. The solution was added dropwise to a 0° C. solution of 3-(methylsulfonyl)benzaldehyde (500 mg, 2.72 mmol) and THF (5 mL). The mixture was stirred at 0° C. for 2 hours before quenching with saturated NH$_4$Cl (20 mL) and extracting with ethyl acetate (30 mL×3). The combined organic extracts were washed with brine (10 mL), dried over anhydrous Na$_2$SO$_4$, filtered, and concentrated to dryness under reduced pressure to give the product, which was purified by FCC (eluent: dichloromethane:methanol, 1:0 to 10:1, gradient elution) to afford the title compound (270 mg) as a yellow solid. MS (ESI): mass calcd. for C$_{13}$H$_{13}$NO$_3$S 263.06 m/z found 264.0 [M+H]$^+$.

Intermediate 94: (R,S)-4-((2,6-Dimethylpyridin-4-yl)((8-isopropyl-4-oxochroman-7-yl)oxy)methyl)benzonitrile

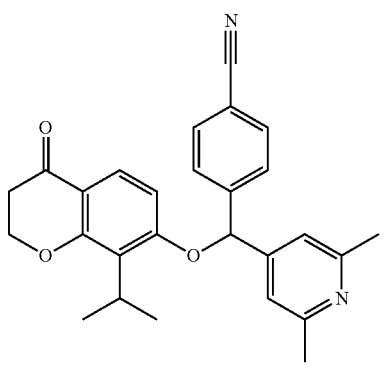 [SMILES: Cc1cc(C(Oc2ccc3c(c2C(C)C)OCCC3=O)c2ccc(C#N)cc2)cc(C)n1]

DIAD (592 mg, 2.93 mmol) was added to a solution of 4-((2,6-dimethylpyridin-4-yl)(hydroxy)methyl)benzonitrile (Intermediate 85, Step A, 480 mg, 2.01 mmol), 7-hydroxy- 8-isopropylchroman-4-one (Intermediate 66, Step C, 400 mg, 1.94 mmol), PPh₃ (753 mg, 2.87 mmol), and anhydrous dichloromethane (10 mL). The mixture was stirred at room temperature for 1.5 hours before pouring it into water (30 mL) and extracting with ethyl acetate (20 mL×3). The combined organic extracts were dried over anhydrous Na₂SO₄, filtered, and concentrated to dryness under reduced pressure to give the product, which was purified by FCC (eluent: petroleum ether:ethyl acetate, 1:0 to 0:1, gradient elution) to afford the title compound (1.4 g) as a brown oil. MS (ESI): mass calcd. for $C_{27}H_{26}N_2O_3$ 426.19 m/z found 427.2 [M+H]⁺.

Intermediate 95: (R,S)-4-((3-bromophenyl)((8-isopropyl-4-oxochroman-7-yl)oxy)methyl)benzamide

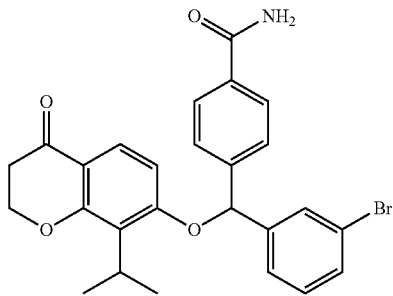 [SMILES: CC(C)c1c(OC(c2ccc(C(N)=O)cc2)c2cccc(Br)c2)ccc2c1OCCC2=O]

Step A: (R,S)-4-((3-Bromophenyl)((8-isopropyl-4-oxochroman-7-yl)oxy)methyl)benzonitrile. DIAD (1.10 g, 5.44 mmol) was added to a solution of 7-hydroxy-8-isopropylchroman-4-one (Intermediate 66, Step C, 700 mg, 3.39 mmol), 4-((3-bromophenyl)(hydroxy)methyl)benzonitrile (Intermediate 51, Step A, 978 mg, 3.39 mmol), PPh₃ (1.25 g, 4.77 mmol), and THF (5 mL). The mixture was stirred at room temperature for 2 hours before pouring it into H₂O (60 mL) and extracting with ethyl acetate (30 mL×3). The combined organic extracts were dried over anhydrous Na₂SO₄, filtered, and concentrated to dryness under reduced pressure to give the product, which was purified by FCC (eluent:petroleum ether:ethyl acetate, 10:1 to 2:1, gradient elution) to afford the title compound (800 mg) as a clear oil. MS (ESI): mass calcd. for $C_{26}H_{22}BrNO_3$ 475.08 m/z found 476.1 [M+H]⁺.

Step B: (R,S)-4-((3-Bromophenyl)((8-isopropyl-4-oxochroman-7-yl)oxy)methyl)benzamide. H₂O₂ (0.65 mL, 30% purity, 6.5 mmol) was added dropwise to a solution of 4-((3-bromophenyl)((8-isopropyl-4-oxochroman-7-yl)oxy)methyl)benzonitrile (770 mg), K₂CO₃ (670 mg, 4.85 mmol), and DMSO (3 mL). The mixture was stirred at room temperature for 2 hours before quenching with saturated Na₂SO₃ (30 mL) and extracting with ethyl acetate (30 mL×3). The combined organic extracts were dried over anhydrous Na₂SO₄, filtered, and concentrated to dryness under reduced pressure to give the product, which was purified by FCC (eluent:petroleum ether:ethyl acetate, 10:1 to 1:2, gradient elution) to afford the title compound (600 mg) as a yellow oil, which was used in the next step without further purification. MS (ESI): mass calcd. for $C_{26}H_{24}BrNO_4$ 493.09 m/z found 494.0 [M+H]⁺.

Intermediate 96: (R,S)-4-((4-cyanophenyl)((8-isopropyl-4-oxochroman-7-yl)oxy)methyl)benzoic acid

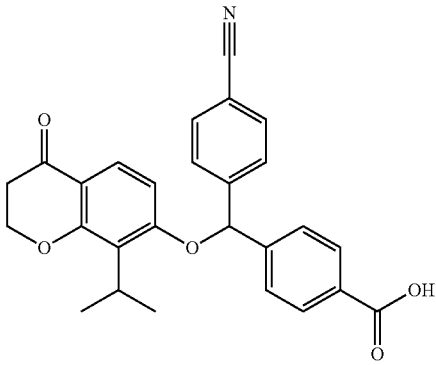 [SMILES: CC(C)c1c(OC(c2ccc(C#N)cc2)c2ccc(C(=O)O)cc2)ccc2c1OCCC2=O]

Step A: (R,S)-Methyl 4-((4-cyanophenyl)(hydroxy)methyl)benzoate. i-PrMgCl·LiCl complex (20 mL, 1.3 M in THF, 26 mmol) was added dropwise to a solution of 4-iodobenzonitrile (5.0 g, 22 mmol) and THF (40 mL) that had been cooled to −15° C. The mixture was stirred at −15° C. for 1 hour before treating with a solution of methyl 4-formylbenzoate (3.6 g, 22 mmol) and THF (20 mL). The mixture was stirred for 1.5 hours with gradual warming to room temperature before pouring it into saturated NH₄Cl (200 mL) and extracting with ethyl acetate (100 mL×3). The combined organic extracts were dried over anhydrous Na₂SO₄, filtered and concentrated to dryness under reduced pressure to give the product, which was triturated with ethyl acetate (20 mL) and the solid was isolated via filtration. The filter cake was washed with ethyl acetate (5 mL×2) before drying under reduced pressure to afford the title compound (3.2 g, 54% yield) as a white solid. MS (ESI): mass calcd. for $C_{16}H_{13}NO_3$ 267.09 m/z found 268.0 [M+H]⁺.

Step B: (R,S)-Methyl 4-((4-cyanophenyl)((8-isopropyl-4-oxochroman-7-yl)oxy)methyl)benzoate. DIAD (471 mg, 2.33 mmol) was added to a solution of 7-hydroxy-8-isopropylchroman-4-one (Intermediate 66, Step C, 300 mg, 1.46 mmol), methyl 4-((4-cyanophenyl)(hydroxy)methyl)benzoate (466 mg, 1.74 mmol), PPh₃ (610 mg, 2.33 mmol), and THF (5 mL). The mixture was stirred at room temperature for 2 hours before diluting with H₂O (30 mL) and extracting with ethyl acetate (10 mL×3). The combined organic extracts were washed with brine (100 mL), dried over anhydrous Na₂SO₄, filtered, and concentrated to dryness under reduced pressure to give the product, which was purified by FCC (eluent:petroleum ether:ethyl acetate, 1:0 to 1:1, gradient elution) to afford the title compound (900 mg) as a pale yellow oil. MS (ESI): mass calcd. for $C_{28}H_{25}NO_5$ 455.17 m/z found 456.2 [M+H]⁺.

Step C: (R,S)-4-((4-Cyanophenyl)((8-isopropyl-4-oxochroman-7-yl)oxy)methyl)benzoic acid. Methyl 4-((4-cyanophenyl)((8-isopropyl-4-oxochroman-7-yl)oxy)methyl)benzoate (900 mg) was added to a solution of NaOH (316 mg, 7.90 mmol), THF (10 mL), and H₂O (2 mL). The mixture was heated at 40° C. for 16 hours before cooling to room temperature, adjusting the pH of the solution to pH 6 with 1 N HCl, and diluting with ethyl acetate (20 mL). The organic layer was separated and dried over anhydrous Na₂SO₄, filtered and concentrated to dryness to afford the title compound (600 mg) as a yellow solid. MS (ESI): mass calcd. for $C_{27}H_{23}NO_5$ 441.16 m/z found 442.2 [M+H]⁺.

Intermediate 97: (R,S)-4-((2,6-Dimethylpyridin-4-yl)((6-fluoro-4-oxochroman-7-yl)oxy)methyl)benzonitrile

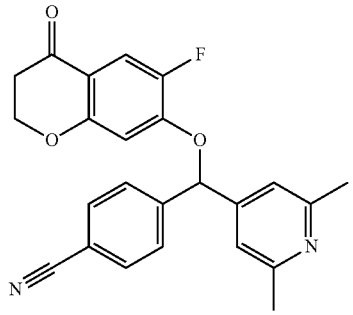 [SMILES: Cc1cc(C(Oc2cc3c(cc2F)C(=O)CCO3)c2ccc(C#N)cc2)cc(C)n1]

DIAD (272 mg, 1.35 mmol) was added to a mixture of 6-fluoro-7-hydroxychroman-4-one (Intermediate 43, Step B, 153 mg, 0.840 mmol), 4-((2,6-dimethylpyridin-4-yl)(hydroxy)methyl)benzonitrile (Intermediate 85, Step A, 200 mg, 0.839 mmol), PPh$_3$ (352 mg, 1.34 mmol), and dichloromethane (4 mL). The mixture was stirred at room temperature for 1 hour before concentrating to dryness under reduced pressure to give the product, which was purified by FCC (eluent:petroleum ether:ethyl acetate, 1:0 to 1:1, gradient elution) to afford the title compound (600 mg) as a yellow oil. MS (ESI): mass calcd. for $C_{24}H_{19}FN_2O_3$ 402.14 m/z found 403.2 [M+H]$^+$.

Intermediate 98: (R,S)-4-((2,6-Dimethylpyridin-4-yl)((8-iodo-4-oxochroman-7-yl)oxy)methyl)benzamide

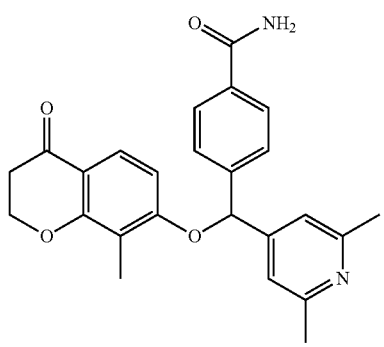 [SMILES: Cc1cc(C(Oc2ccc3c(c2C)OCCC3=O)c2ccc(C(N)=O)cc2)cc(C)n1]

Step A: (R,S)-4-((2,6-Dimethylpyridin-4-yl)((8-iodo-4-oxochroman-7-yl)oxy)methyl)benzonitrile. DIAD (2.72 g, 13.5 mmol) was added to a mixture of 7-hydroxy-8-iodochroman-4-one (Intermediate 69, Step A, 2.68 g, 9.24 mmol), 4-((2,6-dimethylpyridin-4-yl)(hydroxy)methyl)benzonitrile (Intermediate 85, Step A, 2.0 g, 8.4 mmol), PPh$_3$ (3.5 g, 13 mmol), and dichloromethane (20 mL). Then the mixture was stirred at room temperature for 1 hour before concentrating to dryness under reduced pressure to give the product, which was purified by FCC (eluent:petroleum ether:ethyl acetate, 1:0 to 1:1, gradient elution) to afford the title compound (8.5 g) as a yellow oil. MS (ESI): mass calcd. for $C_{24}H_{19}IN_2O_3$ 510.04 m/z found 511.0 [M+H]$^+$.

Step B: (R,S)-4-((2,6-Dimethylpyridin-4-yl)((8-iodo-4-oxochroman-7-yl)oxy)methyl)benzamide. H$_2$O$_2$ (6.7 mL, 30% purity, 67 mmol) was added dropwise to a mixture of 4-((2,6-dimethylpyridin-4-yl)((8-iodo-4-oxochroman-7-yl)oxy)methyl)benzonitrile (8.5 g), K$_2$CO$_3$ (6.9 g, 50 mmol), and DMSO (20 mL). The mixture was stirred at room temperature for 3 hours before pouring it into saturated Na$_2$SO$_3$ (200 mL) and extracting with ethyl acetate (80 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 0:1, gradient elution) to afford the title compound (4.3 g) as a yellow oil. MS (ESI): mass calcd. for $C_{24}H_{21}IN_2O_4$ 528.05 m/z found 529.0 [M+H]$^+$.

Intermediate 99: (R,S)-4-((2,6-Dimethylpyridin-4-yl)((8-methyl-4-oxochroman-7-yl)oxy)methyl)benzonitrile

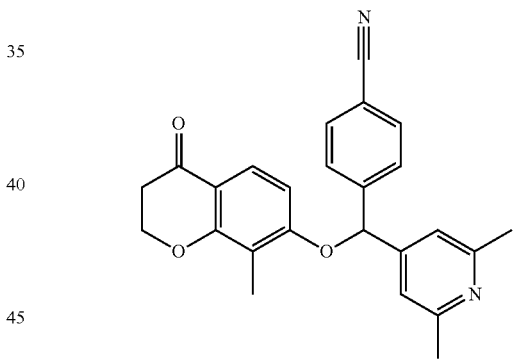

DIAD (339 mg, 1.68 mmol) was added to a mixture of 7-hydroxy-8-methylchroman-4-one (Intermediate 40, Step B, 187 mg, 1.05 mmol), 4-((2,6-dimethylpyridin-4-yl)(hydroxy)methyl)benzonitrile (Intermediate 85, Step A, 250 mg, 1.05 mmol), PPh$_3$ (440 mg, 1.68 mmol), and dichloromethane (4 mL). The mixture was stirred at room temperature for 16 hours before concentrating to dryness under reduced pressure to give the product, which was purified by FCC (eluent:petroleum ether:ethyl acetate, 1:0 to 0:1, gradient elution) to afford the title compound (550 mg) as a yellow oil, which was used in the next step without further purification. MS (ESI): mass calcd. for $C_{25}H_{22}N_2O_3$ 398.16 m/z found 399.1 [M+H]$^+$.

Intermediate 100: (R,S)-4-((2,6-Dimethylpyridin-4-yl)((2,2,8-trimethyl-4-oxochroman-7-yl)oxy)methyl)benzonitrile

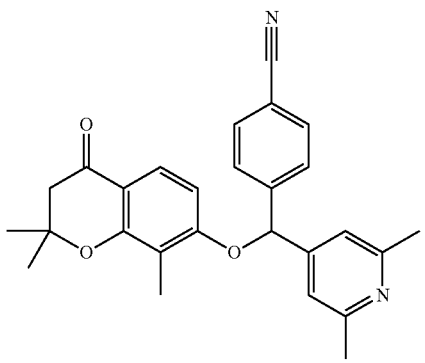

DIAD (0.6 mL, 3.0 mmol) was added to a solution of 7-hydroxy-2,2,8-trimethylchroman-4-one (300 mg, 1.46 mmol), 4-((2,6-dimethylpyridin-4-yl)(hydroxy)methyl)benzonitrile (Intermediate 85, Step A, 347 mg, 1.46 mmol), PPh$_3$ (763 mg, 2.91 mmol), and THF (5 mL). The mixture was stirred at room temperature for 1 hour. The solvent was removed under reduced pressure to afford the product, which was purified by FCC (eluent:petroleum ether:ethyl acetate, 1:0 to 1:2, gradient elution) to afford the title compound (1 g) as a yellow oil. MS (ESI): mass calcd. for $C_{27}H_{26}N_2O_3$ 426.19 m/z found 427.1 [M+H]$^+$.

Intermediate 101: (R,S)-4-(Pyridin-4-yl((2,2,8-trimethyl-4-oxochroman-7-yl)oxy)methyl)benzonitrile

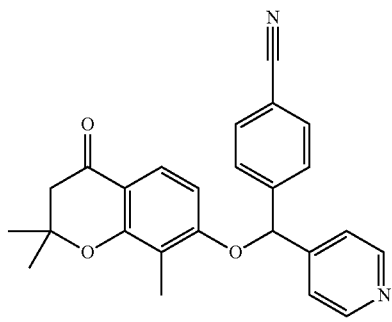 [SMILES: Cc1c(OC(c2ccncc2)c2ccc(C#N)cc2)ccc2c1OC(C)(C)CC2=O]

Step A: (R,S)-4-(Bromo(pyridin-4-yl)methyl)benzonitrile. To a mixture of 4-(hydroxy(pyridin-4-yl)methyl)benzonitrile (Intermediate 8, 10.0 g, 47.6 mmol) in DCM (200 mL) which had been cooled to 0° C., was added Et$_3$N (13.24 mL, 95.13 mmol) followed by dropwise addition of methanesulfonyl chloride (4.42 mL, 57.08 mmol) at 0° C. The reaction mixture was stirred at 0° C. for 0.5 hr. The reaction mixture was diluted with DCM and washed with water and saturated aqueous NaBr, dried over anhydrous Na$_2$SO$_4$, filtered and concentrated under reduced pressure to give a residue. To a mixture of the residue in THF (80 mL) was added LiBr (24.8 g, 285.40 mmol) and then the reaction mixture was heated at 30° C. under N$_2$ for 16 hrs. The reaction mixture was concentrated under reduced pressure to remove THF, diluted with EtOAc (150 mL), washed with water (100 mL×2) and brine (150 mL), dried over anhydrous Na$_2$SO$_4$, filtered and concentrated under reduced pressure to give a residue that was used directly in the next step without further purification. MS (ESI): mass calcd. for $C_{13}H_9BrN_2$ 271.99 m/z found 273.0 [M+H]$^+$. $^1$H NMR (400 MHz, CDCl$_3$) δ 8.63 (d, J=4.2 Hz, 2H), 7.67 (d, J=6.3 Hz, 2H), 7.53 (d, J=6.3 Hz, 2H), 7.34 (d, J=4.8 Hz, 2H), 6.14 (s, 1H).

Step B: (R,S)-4-(Pyridin-4-yl((2,2,8-trimethyl-4-oxochroman-7-yl)oxy)methyl)benzonitrile. To a mixture of 4-(bromo(pyridin-4-yl)methyl)benzonitrile (100 mg, 0.366 mmol) in MeCN (2 mL) was added 7-hydroxy-2,2,8-trimethylchroman-4-one (79.3 mg, 0.384 mmol) and Cs$_2$CO$_3$ (143 mg, 0.439 mmol). The reaction mixture was heated at 30° C. under N$_2$ for 16 hrs. The reaction mixture was diluted with ethyl acetate (15 mL), was filtered, and the filtrate was concentrated under reduced pressure to give the title compound (180 mg), which was used in the next step without purification. MS (ESI): mass calcd. for $C_{25}H_{22}N_2O_3$ 398.16 m/z found 379.0.

Intermediate 102: (3-Methoxypyridin-4-yl)methanol

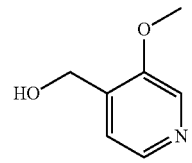

BH$_3$·THF (7.9 mL, 1 M in THF, 7.9 mmol) was added dropwise under N$_2$ atmosphere to a suspension of 3-methoxyisonicotinic acid (600 mg, 3.92 mmol) and THF (10 mL) that had been cooled to 0° C. The mixture was stirred for 16 hours with gradual warming to room temperature and then heated at 85° C. for another 16 hours before cooling to room temperature, quenching with MeOH (10 mL), and concentrating to dryness under reduced pressure to afford the product, which was purified by FCC (eluent: petroleum ether:ethyl acetate, 1:0 to 0:1, gradient elution) to give the title compound (180 mg, 31%) as a white solid. MS (ESI): mass calcd. for $C_7H_9NO_2$ 139.06 m/z found 139.8 [M+H]$^+$.

Intermediate 103: (R,S)-3-Ethyl-7-hydroxychroman-4-one

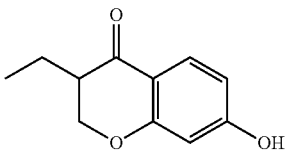

Step A: 1-(2-Hydroxy-4-methoxyphenyl)butan-1-one. Dimethyl sulfate (1.27 mL, 13.4 mmol) was added to a mixture of 1-(2,4-dihydroxyphenyl)butan-1-one (2.0 g, 11 mmol), K$_2$CO$_3$ (767 mg, 5.55 mmol), and anhydrous acetone (20 mL). The mixture was heated at 65° C. for 6 hours before cooling to room temperature, adjusting the pH of the solution to pH 8 with 20% aqueous NH$_3$, and extracting with ethyl acetate (40 mL×3). The combined organic extracts were washed with brine (30 mL), dried over anhydrous Na$_2$SO$_4$, filtered, and concentrated to dryness under reduced pressure to give the product, which was purified by FCC (eluent:petroleum ether:ethyl acetate, 1:0 to 10:1, gradient elution) to afford the title compound (1.88 g, 86%) as a colorless oil. MS (ESI): mass calcd. for $C_{11}H_{14}O_3$ 194.09 m/z found 194.9 [M+H]+.

Step B: (R,S)-1-(2-Hydroxy-4-methoxyphenyl)-2-(hydroxymethyl)butan-1-one. 1-(2-Hydroxy-4-methoxyphenyl)butan-1-one (1.88 g, 9.68 mmol) and formaldehyde (290 mg, 9.66 mmol) were added to a solution of NaOH (968 mg, 24.2 mmol) and $H_2O$ (10 mL). The mixture was stirred for 3 hours at 50° C. before cooling to room temperature, adjusting the pH of the solution to pH 5 with 0.5 N HCl, and extracting with ethyl acetate (20 mL×3). The combined organic extracts were washed with brine (20 mL), dried over anhydrous $Na_2SO_4$, filtered, and concentrated to dryness under reduced pressure to give the product, which was purified by FCC (eluent:petroleum ether:ethyl acetate, 1:0 to 4:1, gradient elution) to afford the title compound (970 mg, 45%) as a colorless oil and a side product which was identified as (R,S)-3-ethyl-7-methoxychroman-4-one (Intermediate 103, step C, 460 mg, 20%) as a colorless oil. MS (ESI): mass calcd. for $C_{12}H_{16}O_4$ 224.10 m/z found 224.9 [M+H]+.

Step C: (R,S)-3-Ethyl-7-methoxychroman-4-one. (R,S)-1-(2-Hydroxy-4-methoxyphenyl)-2-(hydroxymethyl)butan-1-one (1.2 g, 5.4 mmol) was added to a solution of NaOH (464 mg, 11.6 mmol) and $H_2O$ (10 mL). The mixture was heated at 50° C. for 2.5 hours before cooling to room temperature, adjusting the pH of the solution to pH 5 with 0.5 N HCl, and extracting with ethyl acetate (20 mL×3). The combined organic extracts were washed with brine (20 mL), dried over anhydrous $Na_2SO_4$, filtered, and concentrated to dryness under reduced pressure to give the product, which was purified by FCC (eluent:petroleum ether:ethyl acetate, 1:0 to 4:1, gradient elution) to afford the title compound (880 mg, 77%) as a colorless oil. MS (ESI): mass calcd. for $C_{12}H_{14}O_3$ 206.09 m/z found 207.2 [M+H]+.

Step D: (R,S)-3-Ethyl-7-hydroxychroman-4-one. Pyridine hydrochloride (22.4 g, 194 mmol), and (R,S)-3-ethyl-7-methoxychroman-4-one (1.33 g, 6.45 mmol) were added to a 50 mL round-bottomed flask. The mixture was heated at 170° C. for 3 hours under Ar before cooling to room temperature, diluting with water (20 mL), and extracting with ethyl acetate (20 mL×3).

The combined organic extracts were washed with brine (20 mL), dried over anhydrous $Na_2SO_4$, filtered, and concentrated to dryness under reduced pressure to give the product, which was purified by FCC (eluent:petroleum ether:ethyl acetate, 1:0 to 5:1, gradient elution) to afford the title compound (1.1 g, 87%) as a yellow solid. MS (ESI): mass calcd. for $C_{11}H_{12}O_3$ 192.08 m/z found 192.9 [M+H]+.

Intermediate 104: (R,S)-1-((8-Methyl-4-oxochroman-7-yl)oxy)-2,3-dihydro-1H-indene-5-carbonitrile

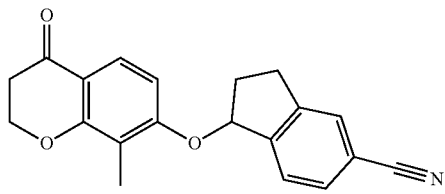 [SMILES: Cc1c(OC2CCc3cc(C#N)ccc32)ccc2c1OCCC2=O]

Step A: 1-Hydroxy-2,3-dihydro-1H-indene-5-carbonitrile. To a solution of 1-oxo-2,3-dihydro-1H-indene-5-carbonitrile (948.5 mg, 6.035 mmol) in 1,2-dichloroethane (15 mL) and MeOH (15 mL) was added sodium borohydride (471 mg, 12.45 mmol). The reaction mixture was stirred at room temperature open to the air for 30 min. The reaction mixture was partitioned between water (25 mL) and dichloromethane (25 mL). The aqueous phase was extracted twice with DCM (25 mL each). The organic phase was dried ($Na_2SO_4$), filtered, and concentrated to afford the title compound (922 mg, 96%), which was used in the next step without further purification. MS (ESI): mass calcd. for $C_{10}H_9NO$ 159.07 m/z found 160.1 [M+H]+.

Step B: (R,S)-1-((8-Methyl-4-oxochroman-7-yl)oxy)-2,3-dihydro-1H-indene-5-carbonitrile. 7-Hydroxy-8-methylchroman-4-one (Intermediate 40, Step B, 268 mg, 1.51 mmol), 1-hydroxy-2,3-dihydro-1H-indene-5-carbonitrile (264 mg, 1.66 mmol) and triphenylphosphine (592 mg, 2.26 mmol) were combined. THF (7.5 mL) was added and a brown solution resulted. The reaction vessel was sealed and evacuated and back-filled with argon twice. The mixture was cooled in an ice water bath. DIAD (0.44 mL, 2.26 mmol) was added dropwise. The resulting brown solution was stirred at room temperature under argon for 20 hr. Additional portions of triphenylphospine (394 mg, 1.51 mmol) and DIAD (293 µL, 1.51 mmol) were added and the mixture was stirred at room temperature for 6 hr. The reaction mixture was partitioned between water (20 mL) and EtOAc (20 mL). The separated aqueous phase was extracted twice with EtOAc (20 mL each). The organic phase was dried ($Na_2SO_4$), filtered, and concentrated. The residue was purified by FCC ($SiO_2$, gradient 0-30% EtOAc-Heptane) to afford the title compound (597 mg) which was used as is without further purification. MS (ESI): mass calcd. for $C_{20}H_{17}NO_3$ 319.12 m/z found 320.1 [M+H]+.

Intermediate 105: (R,S)-5-Hydroxy-5,6,7,8-tetrahydronaphthalene-2-carbonitrile

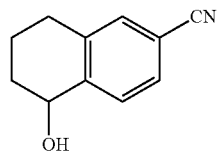 [SMILES: N#Cc1ccc2c(c1)CCCC2O]

To a solution of 5-oxo-5,6,7,8-tetrahydronaphthalene-2-carbonitrile (972 mg, 5.68 mmol) in 1,2-dichloroethane (14 mL) and MeOH (14 mL) was added sodium borohydride (430 mg, 11.4 mmol). The reaction mixture was stirred at room temperature open to the air for 90 minutes. The reaction mixture was partitioned between water (25 mL) and DCM (25 mL). The aqueous phase was extracted twice with DCM (25 mL each). The combined organic extracts were washed with water (25 mL). The organic phase was dried ($Na_2SO_4$), filtered, and concentrated. The residue was purified by flash column chromatography ($SiO_2$, 0-50% EtOAc-heptanes, gradient elution) to yield the title compound (568 mg, 58%). MS (ESI): mass calcd. for $C_{11}H_{11}NO$ 173.08 m/z found 174.1 [M+H]+.

Intermediate 106: (R,S)-6,7-Dihydro-5H-cyclopenta[c]pyridin-5-ol

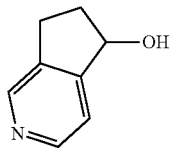

To a solution of 6,7-dihydro-5H-cyclopenta[c]pyridin-5-one (1.0 g, 7.5 mmol) in 1,2-dichloroethane (18 mL) and MeOH (18 mL) was added sodium borohydride (568 mg, 15.0 mmol). The resulting solution was stirred at room temperature open to the air for 3 days. The reaction mixture was partitioned between water (50 mL) and dichloromethane (50 mL). The mixture was filtered through diatomaceous earth and the organic and aqueous phases were separated. The organic phase was washed with water. The organic phase was dried ($Na_2SO_4$), filtered, and concentrated onto $SiO_2$. The residue was purified by flash column chromatography ($SiO_2$, 0-100% EtOAc-Hept) to yield the title compound (127 mg, 13%). MS (ESI): mass calcd. for $C_8H_9NO$ 135.07 m/z found 136.2 [M+H]$^+$.

Intermediate 107: (R,S)-4-(Hydroxy(pyridin-4-yl)methyl)benzamide

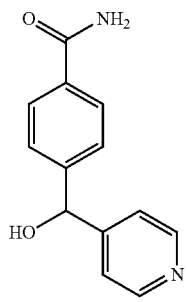 [SMILES: NC(=O)c1ccc(C(O)c2ccncc2)cc1]

$H_2O_2$ (4.3 mL, 43 mmol, 30%) was added dropwise to a solution of 4-(hydroxy(pyridin-4-yl)methyl)benzonitrile (Intermediate 8, 3.0 g, 14 mmol), $K_2CO_3$ (4.9 g, 35 mmol) and DMSO (20 mL). The mixture was stirred at room temperature for 1 hour and was then poured into saturated aqueous $Na_2SO_3$ (20 mL) which had been cooled to 0° C. resulting in the formation of a white precipitate. The solid was collected by filtration and washed with water (20 mL×3) to afford the solid product. This solid product was suspended in water (20 mL), the mixture frozen using dry ice/acetone, and then lyophilized to dryness to afford the title product (3.0 g, 92%). MS (ESI): mass calcd. for $C_{13}H_{12}N_2O_2$ 228.25 m/z found 229.1 [M+H]$^+$. $^1$H NMR (400 MHz, DMSO-d$_6$): 8.48 (d, J=5.6 Hz, 2H), 7.93 (s, 1H), 7.81 (d, J=8.1 Hz, 2H), 7.49-7.37 (m, 4H), 7.33 (s, 1H), 6.26 (d, J=4.2 Hz, 1H), 5.77 (d, J=3.9 Hz, 1H).

A sample of (R,S)-4-(hydroxy(pyridin-4-yl)methyl)benzamide (1.3 g, 5.70 mmol) was separated by chiral SFC (Chiralpak AD, 250 mm×30 mm, 10 μm, 35% (v/v) supercritical $CO_2$ in IPA and $H_2O$ with 0.1% $NH_3$) to yield Intermediate 107a (first enantiomer to elute, labelled *R) and Intermediate 107b (second enantiomer to elute, labelled *S).

Intermediate 107a: $^1$H NMR (400 MHz, DMSO-d$_6$): 8.51-8.46 (m, 2H), 7.94 (br s, 1H), 7.87-7.80 (m, 2H), 7.47 (d, J=8.2 Hz, 2H), 7.41-7.37 (m, J=6.0 Hz, 2H), 7.35 (br s, 1H), 6.26 (d, J=4.2 Hz, 1H), 5.78 (d, J=4.0 Hz, 1H).

Intermediate 107b: $^1$H NMR (400 MHz, DMSO-d$_6$): 8.54-8.45 (m, 2H), 7.93 (br s, 1H), 7.86-7.78 (m, 2H), 7.47 (d, J=8.2 Hz, 2H), 7.42-7.37 (m, J=6.0 Hz, 2H), 7.34 (br s, 1H), 6.26 (d, J=4.0 Hz, 1H), 5.78 (d, J=4.0 Hz, 1H).

Intermediate 108: (R,S)-7-Hydroxy-3-phenylchroman-4-one

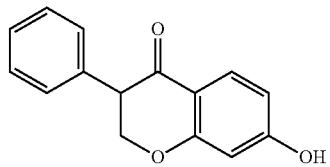 [SMILES: O=C1c2ccc(O)cc2OCC1c1ccccc1]

7-hydroxy-3-phenyl-4H-chromen-4-one (1.5 g, 6.30 mmol), ammonium formate (7.94 g, 126 mmol), methanol (20 mL) and wet Pd/C (2 g, 10 wt. %) were heated at 100° C. for 16 hours under $N_2$. The mixture was cooled to room temperature and filtered through a pad of diatomaceous earth and the pad was washed with methanol (20 mL). The filtrate was poured into ice/water (20 mL) and extracted with ethyl acetate (20 mL×3). The combined organic layers were dried over $Na_2SO_4$, filtered and concentrated to dryness under reduced pressure to afford the product, which was purified by FCC (eluent:petroleum ether:ethyl acetate, 10:1 to 5:1, gradient elution) to afford the title compound (330 mg, 22%) as a white solid. MS (ESI): mass calcd. for $C_{15}H_{12}O_3$ 240.08 m/z found 240.8 [M+H]$^+$. $^1$H NMR (400 MHz, CDCl$_3$): 7.88 (d, J=8.8 Hz, 1H), 7.41-7.27 (m, 5H), 6.52 (dd, J=8.7, 2.3 Hz, 1H), 6.42 (d, J=2.4 Hz, 1H), 6.25-6.12 (m, 1H), 4.69-4.63 (m, 2H), 3.95 (dd, J=7.8, 6.1 Hz, 1H).

Example 1: (R,S)-7-((2-Fluorophenyl)(pyridin-4-yl)methoxy)chroman-4-one

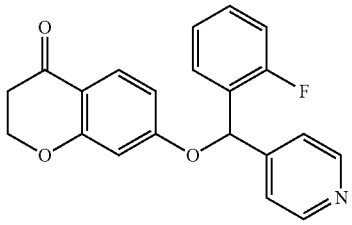 [SMILES: O=C1CCOc2cc(OC(c3ccncc3)c3ccccc3F)ccc21]

ADDP (500 mg, 1.98 mmol) was added to a solution of 7-hydroxychroman-4-one (200 mg, 1.22 mmol), (2-fluorophenyl)(pyridin-4-yl)methanol (Intermediate 1, 300 mg, 1.48 mmol), n-Bu$_3$P (324 mg, 1.60 mmol), and toluene (6 mL). The mixture was heated at 75° C. for 2 hours before pouring it into water (20 mL) and extracting with ethyl acetate (20 mL×2). The combined organic extracts were dried over anhydrous $Na_2SO_4$, filtered and concentrated to dryness under reduced pressure to give the product, which was purified by preparative HPLC (eluent: 32% to 62% (v/v) CH$_3$CN and H$_2$O with 0.225% FA) to afford the title compound (210 mg, 48%) as a white solid. MS (ESI): mass calcd. for $C_{21}H_{16}FNO_3$ 349.11 m/z found 350.0 [M+H]$^+$. $^1$H NMR (400 MHz, DMSO-d$_6$) δ 8.57-8.54 (m, 2H), 7.64 (d, J=8.8 Hz, 1H), 7.49-7.34 (m, 4H), 7.26-7.18 (m, 2H), 6.88 (s, 1H), 6.77-6.72 (m, 1H), 6.59 (d, J=2.4 Hz, 1H), 4.44 (t, J=6.5 Hz, 2H), 2.65 (t, J=6.4 Hz, 2H).

A sample of (R,S)-7-((2-fluorophenyl)(pyridin-4-yl)methoxy)chroman-4-one (210 mg, 0.601 mmol) was separated by chiral SFC (Chiralcel OJ, 40% (v/v) supercritical CO$_2$ in i-PrOH and H$_2$O with 0.1% NH$_3$) to yield example 1a (first enantiomer to elute, labelled *R) and example 1b (second enantiomer to elute, labelled *S).

Example 1a (*R)-7-((2-Fluorophenyl)(pyridin-4-yl)methoxy)chroman-4-one

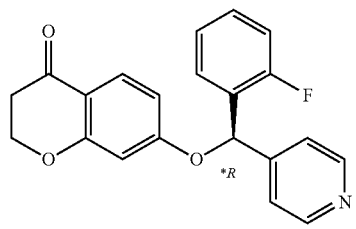 [SMILES: O=C1CCOc2cc(O[C@H](c3ccncc3)c3ccccc3F)ccc21]

MS (ESI): mass calcd. for $C_{21}H_{16}FNO_3$ 349.11 m/z found 350.0 [M+H]$^+$. $^1$H NMR (400 MHz, DMSO-d$_6$) δ 8.57-8.53 (m, 2H), 7.64 (d, J=8.8 Hz, 1H), 7.49-7.34 (m, 4H), 7.25-7.17 (m, 2H), 6.87 (s, 1H), 6.76-6.72 (m, 1H), 6.58 (d, J=2.2 Hz, 1H), 4.44 (t, J=6.4 Hz, 2H), 2.67-2.62 (m, 2H).

Example 1b (*S)-7-((2-Fluorophenyl)(pyridin-4-yl)methoxy)chroman-4-one

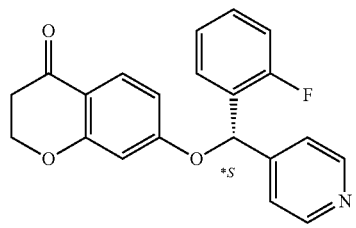 [SMILES: O=C1CCOc2cc(O[C@@H](c3ccncc3)c3ccccc3F)ccc21]

MS (ESI): mass calcd. for $C_{21}H_{16}FNO_3$ 349.11 m/z found 350.0 [M+H]$^+$. $^1$H NMR (400 MHz, DMSO-d$_6$) δ 8.57-8.53 (m, 2H), 7.64 (d, J=8.8 Hz, 1H), 7.49-7.34 (m, 4H), 7.25-7.18 (m, 2H), 6.87 (s, 1H), 6.76-6.72 (m, 1H), 6.58 (d, J=2.4 Hz, 1H), 4.44 (t, J=6.4 Hz, 2H), 2.67-2.62 (m, 2H).

Example 2: (R,S)-7-((3-Fluorophenyl)(pyridin-4-yl)methoxy)chroman-4-one

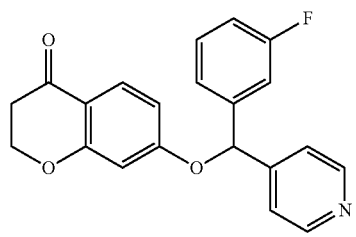 [SMILES: O=C1CCOc2cc(OC(c3ccncc3)c3cccc(F)c3)ccc21]

DIAD (369 mg, 1.83 mmol) was added to a solution of 7-hydroxychroman-4-one (200 mg, 1.22 mmol), (3-fluorophenyl)(pyridin-4-yl)methanol (Intermediate 2, 297 mg, 1.462 mmol), PPh$_3$ (415 mg, 1.58 mmol), and dichloromethane (5 mL) that had been cooled to 0° C. The mixture was stirred at room temperature for 12 hours before pouring it into H$_2$O (20 mL) and extracting with dichloromethane (50 mL×3). The combined organic extracts were dried over anhydrous Na$_2$SO$_4$, filtered, and concentrated to dryness under reduced pressure to give the product, which was purified by preparative HPLC using a Phenomenex Gemini 150 mm×25 mm×10 μm column (eluent: 38% to 68% (v/v) CH$_3$CN and H$_2$O with 0.05% NH$_3$). The product was further purified by preparative HPLC using a Phenomenex Gemini C18 250 mm×50 mm×m column (eluent: 28% to 58% (v/v) CH$_3$CN and H$_2$O with 0.225% HCOOH) to provide the title compound (100.3 mg, 23%) as a white solid. MS (ESI): mass calcd. for $C_{21}H_{16}FNO_3$ 349.11 m/z, found 350.0 [M+H]$^+$. $^1$H NMR (400 MHz, DMSO-d$_6$) δ 8.65-8.50 (m, 2H), 7.68 (d, J=8.8 Hz, 1H), 7.59-7.48 (m, 2H), 7.47-7.36 (m, 3H), 7.23-7.11 (m, 1H), 6.83-6.74 (m, 2H), 6.62 (s, 1H), 4.47 (t, J=6.0 Hz, 2H), 2.68 (t, J=6.0 Hz, 2H).

A sample of (R,S)-7-((3-fluorophenyl)(pyridin-4-yl)methoxy)chroman-4-one (75 mg, 0.214 mmol) was separated by chiral SFC (Chiralpak AD-H, 70% CO$_2$-30% iPrOH) to yield example 2a (first enantiomer to elute, labelled *R) and example 2b (second enantiomer to elute, labelled *S).

Example 2a (*R)-7-((3-Fluorophenyl)(pyridin-4-yl)methoxy)chroman-4-one

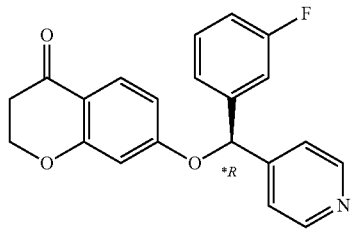 [SMILES: O=C1CCOc2cc(O[C@H](c3ccncc3)c3cccc(F)c3)ccc21]

MS (ESI): mass calcd. for $C_{21}H_{16}FNO_3$ 349.11 m/z, found 350.1 [M+H]$^+$. $^1$H NMR (400 MHz, CHLOROFORM-d) δ 8.62 (d, J=5.1 Hz, 2H), 7.83 (d, J=9.1 Hz, 1H), 7.29-7.42 (m, 3H), 7.19 (d, J=7.6 Hz, 1H), 7.11 (d, J=9.6 Hz, 1H), 6.99-7.07 (m, 1H), 6.66 (dd, J=2.3, 8.8 Hz, 1H), 6.40 (d, J=2.0 Hz, 1H), 6.18 (s, 1H), 4.48 (t, J=6.3 Hz, 2H), 2.74 (t, J=6.3 Hz, 2H).

Example 2b (*S)-7-((3-Fluorophenyl)(pyridin-4-yl)methoxy)chroman-4-one

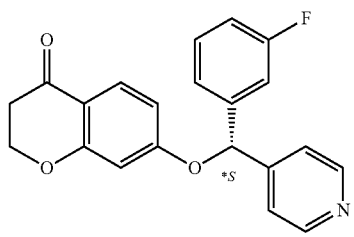 [SMILES: O=C1CCOc2cc(O[C@@H](c3ccncc3)c3cccc(F)c3)ccc21]

MS (ESI): mass calcd. for $C_{21}H_{16}FNO_3$ 349.11 m/z, found 350.1 [M+H]+. 1H NMR (400 MHz, CHLOROFORM-d) δ 8.62 (d, J=5.1 Hz, 2H), 7.83 (d, J=9.1 Hz, 1H), 7.29-7.42 (m, 3H), 7.19 (d, J=7.6 Hz, 1H), 7.11 (d, J=9.6 Hz, 1H), 6.99-7.07 (m, 1H), 6.66 (dd, J=2.3, 8.8 Hz, 1H), 6.40 (d, J=2.0 Hz, 1H), 6.18 (s, 1H), 4.48 (t, J=6.3 Hz, 2H), 2.74 (t, J=6.3 Hz, 2H).

Example 3: (R,S)-7-((4-Fluorophenyl)(pyridin-4-yl)methoxy)chroman-4-one

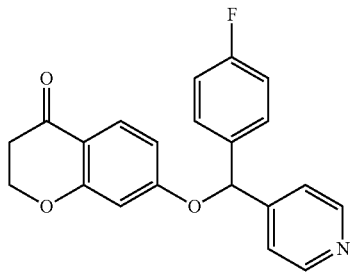 [SMILES: O=C1CCOc2cc(OC(c3ccncc3)c3ccc(F)cc3)ccc21]

DIAD (370 mg, 1.83 mmol) was added to a solution of 7-hydroxychroman-4-one (200 mg, 1.22 mmol), (4-fluorophenyl)(pyridin-4-yl)methanol (Intermediate 3, 297 mg, 1.46 mmol), PPh3 (416 mg, 1.59 mmol), and THF (15 mL) that had been cooled to 0° C. The mixture was stirred at room temperature for 16 hours. The mixture was concentrated to dryness under reduced pressure to give the product, which was purified by preparative HPLC using a Phenomenex Gemini C18 250 mm×50×10 μm column (eluent: 25% to 55% (v/v) CH3CN and H2O with 0.225% HCOOH) to afford the title compound as a white solid. MS (ESI): mass calcd. for $C_{21}H_{16}FNO_3$ 349.11 m/z found 350.0 [M+H]+. 1H NMR (400 MHz, DMSO-d6) δ 8.55-8.51 (m, 2H), 7.64 (d, J=8.8 Hz, 1H), 7.56-7.51 (m, 2H), 7.46-7.43 (m, 2H), 7.23-7.16 (m, 2H), 6.76-6.72 (m, 2H), 6.58 (d, J=2.0 Hz, 1H), 4.43 (t, J=6.4 Hz, 2H), 2.64 (t, J=6.4 Hz, 2H).

A sample of 7-((4-fluorophenyl)(pyridin-4-yl)methoxy)chroman-4-one (75 mg, 0.202 mmol) was separated by chiral SFC (Chiralpak AD-H, 70% CO2-30% EtOH) to yield example 3a (first enantiomer to elute, labelled *R) and example 3b (second enantiomer to elute, labelled *S).

Example 3a (*R)-7-((4-Fluorophenyl)(pyridin-4-yl)methoxy)chroman-4-one

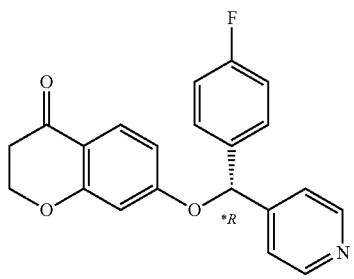 [SMILES: O=C1CCOc2cc(O[C@@H](c3ccncc3)c3ccc(F)cc3)ccc21]

MS (ESI): mass calcd. for $C_{21}H_{16}FNO_3$ 349.11 m/z, found 350.1 [M+H]+. 1H NMR (400 MHz, CHLOROFORM-d) δ 8.61 (br s, 2H), 7.82 (d, J=8.6 Hz, 1H), 7.29-7.41 (m, 4H), 7.04-7.11 (m, 2H), 6.65 (dd, J=2.3, 8.8 Hz, 1H), 6.39 (d, J=2.5 Hz, 1H), 6.19 (s, 1H), 4.48 (t, J=6.3 Hz, 2H), 2.73 (t, J=6.6 Hz, 2H).

Example 3b (*S)-7-((4-Fluorophenyl)(pyridin-4-yl)methoxy)chroman-4-one

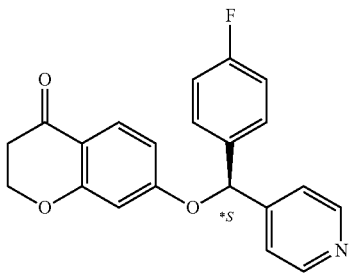 [SMILES: O=C1CCOc2cc(O[C@H](c3ccncc3)c3ccc(F)cc3)ccc21]

MS (ESI): mass calcd. for $C_{21}H_{16}FNO_3$ 349.11 m/z, found 350.1 [M+H]+. 1H NMR (400 MHz, CHLOROFORM-d) δ 8.61 (br s, 2H), 7.82 (d, J=8.6 Hz, 1H), 7.29-7.41 (m, 4H), 7.04-7.11 (m, 2H), 6.65 (dd, J=2.3, 8.8 Hz, 1H), 6.39 (d, J=2.5 Hz, 1H), 6.19 (s, 1H), 4.48 (t, J=6.3 Hz, 2H), 2.73 (t, J=6.6 Hz, 2H).

Example 4: (R,S)-7-((3-((4-Methoxybenzyl)oxy)phenyl)(pyridin-4-yl)methoxy)chroman-4-one

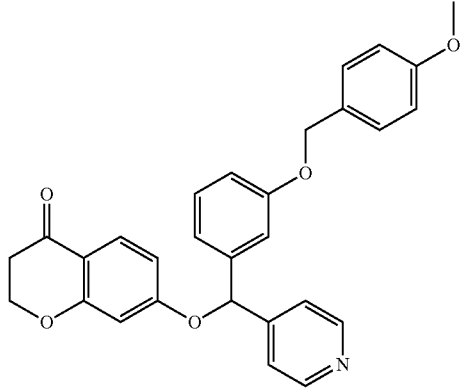 [SMILES: COc1ccc(COc2cccc(C(Oc3ccc4c(c3)OCCC4=O)c3ccncc3)c2)cc1]

ADDP (942 mg, 3.73 mmol) was added to a solution of 7-hydroxychroman-4-one (407 mg, 2.48 mmol), (3-((4-methoxybenzyl)oxy)phenyl)(pyridin-4-yl)methanol (Intermediate 4, 800 mg, 2.49 mmol), n-Bu3P (0.93 mL, 3.72 mmol), and toluene (10 mL). The mixture was heated at 80° C. for 2 hours before cooling to room temperature, pouring it into water (30 mL) and extracting with ethyl acetate (30 mL×3). The combined organic extracts were dried over anhydrous Na2SO4, filtered and concentrated to dryness under reduced pressure to afford the product, which was purified by FCC (eluent:petroleum ether:ethyl acetate, 1:1 to 1:2, gradient elution) to give the title compound (820 mg, 70%) as a brown oil. MS (ESI): mass calcd. for $C_{29}H_{25}NO_5$ 467.17 m/z found 468.0 [M+H]+. 1H NMR (400 MHz, DMSO-d6) δ 8.51 (d, J=6.0 Hz, 2H), 7.63 (d, J=8.8 Hz, 1H), 7.47-7.43 (m, 2H), 7.34-7.29 (m, 2H), 7.28-7.22 (m, 1H), 7.14-7.11 (m, 1H), 7.04 (d, J=7.7 Hz, 1H), 6.91-6.86 (m, 3H), 6.76-6.71 (m, 1H), 6.64 (s, 1H), 6.57 (d, J=2.4 Hz, 1H), 4.95 (s, 2H), 4.43 (t, J=6.4 Hz, 2H), 3.71 (s, 3H), 2.64 (t, J=6.4 Hz, 2H).

A sample of (R,S)-7-((3-((4-methoxybenzyl)oxy)phenyl)(pyridin-4-yl)methoxy)chroman-4-one (100 mg, 0.214 mmol) was separated by chiral SFC (ChiralpakAD, 45% (v/v) supercritical $CO_2$ in i-PrOH and $H_2O$ with 0.1% $NH_3$) to yield example 4a (first enantiomer to elute, labelled *R) and example 4b (second enantiomer to elute, labelled *S).

Example 4a (*R)-7-((3-((4-Methoxybenzyl)oxy)phenyl)(pyridin-4-yl)methoxy)chroman-4-one

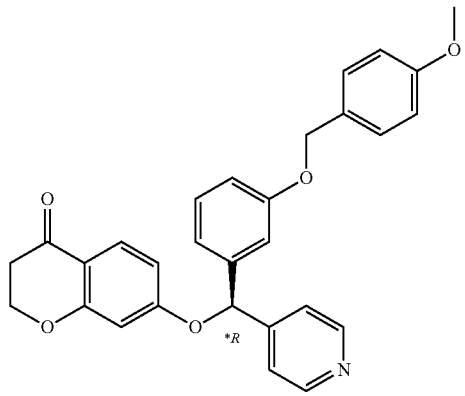 [SMILES: COc1ccc(COc2cccc([C@H](Oc3ccc4c(c3)OCCC4=O)c3ccncc3)c2)cc1]

MS (ESI): mass calcd. for $C_{29}H_{25}NO_5$ 467.17 m/z found 468.0 [M+H]+. $^1$H NMR (400 MHz, DMSO-$d_6$) δ 8.53-8.49 (m, 2H), 7.63 (d, J=8.8 Hz, 1H), 7.47-7.43 (m, 2H), 7.32 (d, J=8.6 Hz, 2H), 7.28-7.22 (m, 1H), 7.14-7.11 (m, 1H), 7.04 (d, J=7.7 Hz, 1H), 6.92-6.86 (m, 3H), 6.74 (dd, J=8.8, 2.4 Hz, 1H), 6.64 (s, 1H), 6.57 (d, J=2.4 Hz, 1H), 4.96 (s, 2H), 4.43 (t, J=6.4 Hz, 2H), 3.71 (s, 3H), 2.64 (t, J=6.4 Hz, 2H).

Example 4b (*S)-7-((3-((4-Methoxybenzyl)oxy)phenyl)(pyridin-4-yl)methoxy)chroman-4-one

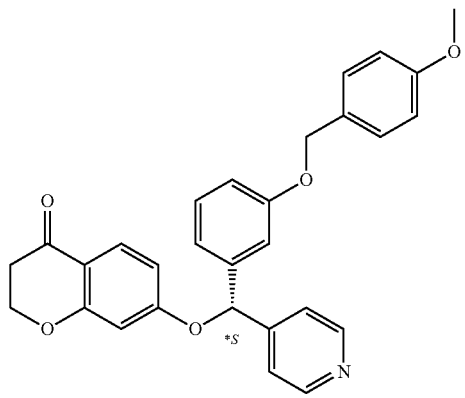 [SMILES: COc1ccc(COc2cccc([C@@H](Oc3ccc4c(c3)OCCC4=O)c3ccncc3)c2)cc1]

MS (ESI): mass calcd. for $C_{29}H_{25}NO_5$ 467.17 m/z found 468.0 [M+H]. $^1$H NMR (400 MHz, DMSO-$d_6$) δ 8.53-8.49 (m, 2H), 7.64 (d, J=8.8 Hz, 1H), 7.47-7.43 (m, 2H), 7.32 (d, J=8.6 Hz, 2H), 7.28-7.22 (m, 1H), 7.14-7.11 (m, 1H), 7.04 (d, J=7.5 Hz, 1H), 6.92-6.86 (m, 3H), 6.74 (dd, J=8.8, 2.4 Hz, 1H), 6.64 (s, 1H), 6.57 (d, J=2.4 Hz, 1H), 4.96 (s, 2H), 4.43 (t, J=6.4 Hz, 2H), 3.71 (s, 3H), 2.64 (t, J=6.4 Hz, 2H).

Example 5a: (*R)-7-((3-Hydroxyphenyl)(pyridin-4-yl)methoxy)chroman-4-one

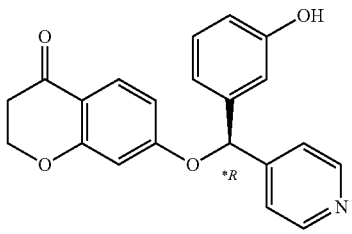 [SMILES: O=C1CCOc2cc(O[C@H](c3ccncc3)c3cccc(O)c3)ccc21]

TFA (1 mL) was added to (*R)-7-((3-((4-methoxybenzyl)oxy)phenyl)(pyridin-4-yl)methoxy)chroman-4-one (Example 4a, 100 mg, 0.214 mmol) and dichloromethane (2 mL). The mixture was stirred at room temperature for 1 hour before concentrating to dryness under reduced pressure to give the product, which was purified by preparative HPLC using a Gemini C18 150 mm×25 mm×10 μm column (eluent: 12% to 42% (v/v) $CH_3CN$ and $H_2O$ with 0.225% HCOOH) to afford the title compound (23.7 mg, 24%) as a white solid. MS (ESI): mass calcd. for $C_{21}H_{17}NO_4$ 347.12 m/z found 348.0 [M+H]+. $^1$H NMR (400 MHz, DMSO-$d_6$) δ 9.57 (br s, 1H), 8.58 (d, J=3.5 Hz, 2H), 7.67 (d, J=9.0 Hz, 1H), 7.50 (d, J=5.5 Hz, 2H), 7.20-7.13 (m, 1H), 6.95 (d, J=7.5 Hz, 1H), 6.88 (s, 1H), 6.80-6.74 (m, 1H), 6.72-6.67 (m, 1H), 6.65 (s, 1H), 6.62-6.59 (m, 1H), 4.46 (t, J=6.3 Hz, 2H), 2.68 (t, J=6.3 Hz, 2H).

Example 5b: (*S)-7-((3-Hydroxyphenyl)(pyridin-4-yl)methoxy)chroman-4-one

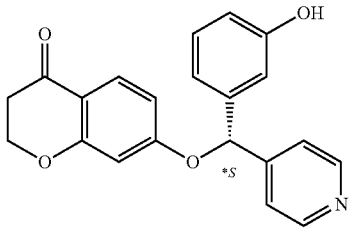 [SMILES: O=C1CCOc2cc(O[C@@H](c3ccncc3)c3cccc(O)c3)ccc21]

TFA (1 mL) was added to (*S)-7-((3-((4-methoxybenzyl)oxy)phenyl)(pyridin-4-yl)methoxy)chroman-4-one (Example 4b, 100 mg, 0.214 mmol) and dichloromethane (2 mL). The mixture was stirred at room temperature for 1 hour before concentrating to dryness under reduced pressure to give the product, which was purified by preparative HPLC using a Gemini C18 150 mm×25 mm×10 um column (eluent: 12% to 42% (v/v) $CH_3CN$ and $H_2O$ with 0.225% HCOOH) to afford the title compound (40.5 mg, 41%) as a white solid. MS (ESI): mass calcd. for $C_{21}H_{17}NO_4$ 347.12 m/z found 348.0 [M+H]+. $^1$H NMR (400 MHz, DMSO-$d_6$) δ 9.55 (br s, 1H), 8.59 (s, 2H), 7.67 (d, J=8.5 Hz, 1H), 7.51 (d, J=5.5 Hz, 2H), 7.20-7.14 (m, 1H), 6.94 (d, J=7.5 Hz, 1H), 6.88 (s, 1H), 6.79-6.75 (m, 1H), 6.71-6.67 (m, 1H), 6.66 (s, 1H), 6.60 (d, J=2.0 Hz, 1H), 4.47 (t, J=6.3 Hz, 2H), 2.68 (t, J=6.3 Hz, 2H).

Example 6: (R,S)-7-(Pyridin-2-yl(pyridin-4-yl)methoxy)chroman-4-one

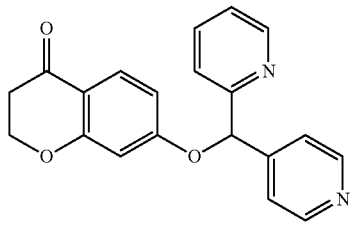 [SMILES: O=C1CCOc2cc(OC(c3ccncc3)c3ccccn3)ccc21]

DIAD (277 mg, 1.37 mmol) was added to a 0° C. solution of 7-hydroxychroman-4-one (150 mg, 0.914 mmol), pyridin-2-yl(pyridin-4-yl)methanol (Intermediate 5, 204 mg, 1.10 mmol), PPh$_3$ (311 mg, 1.19 mmol), and dichloromethane (10 mL). The mixture was stirred for 12 hours with gradual warming to room temperature before pouring into H$_2$O (15 mL) and extracting with dichloromethane (25 mL×3). The combined organic extracts were dried over anhydrous Na$_2$SO$_4$, filtered, and concentrated to dryness under reduced pressure to give the product, which was purified by preparative HPLC using a Phenomenex Gemini 150×25 mm×10 μm column (eluent: 25% to 55% (v/v) CH$_3$CN and H$_2$O with 0.05% NH$_3$) to afford the title compound (60.0 mg, 20%) as a white solid. MS (ESI): mass calcd. for C$_{20}$H$_{16}$N$_2$O$_3$ 332.12 m/z, found 333.0 [M+H]$^+$. $^1$H NMR (400 MHz, DMSO-d$_6$) δ 8.57-8.48 (m, 3H), 7.85-7.77 (m, 1H), 7.64 (d, J=8.8 Hz, 1H), 7.60 (d, J=7.9 Hz, 1H), 7.50 (d, J=5.3 Hz, 2H), 7.34-7.27 (m, 1H), 6.76 (dd, J=1.8, 8.8 Hz, 1H), 6.67 (s, 1H), 6.58 (d, J=1.8 Hz, 1H), 4.43 (t, J=6.4 Hz, 2H), 2.64 (t, J=6.3 Hz, 2H).

Example 7: (R,S)-2-(((4-Oxochroman-7-yl)oxy)(pyridin-4-yl)methyl)benzonitrile

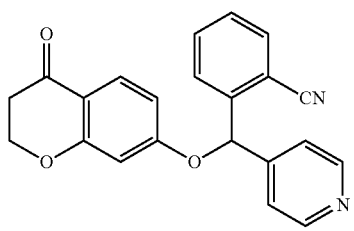

(R,S)-7-((2-Bromophenyl)(pyridin-4-yl)methoxy)chroman-4-one (Intermediate 6, 1.7 g, 4.1 mmol), Zn(CN)$_2$ (3.72 g, 31.7 mmol), and Zn dust (58 mg, 0.89 mmol) were dissolved in DMF (20 mL). The mixture was sparged with Ar for 5 minutes and then treated with Pd(dppf)Cl$_2$ (321 mg, 0.439 mmol). The mixture was sparged with Ar for another 5 minutes and then heated at 170° C. for 3 hours before cooling to room temperature. The suspension was filtered and the solids were discarded. The filtrate was poured into H$_2$O (20 mL) and the mixture extracted with ethyl acetate (50 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 1:1, gradient elution) to afford the title compound (1.6 g), which was further purified by preparative HPLC using a Phenomenex Gemini C18 250 mm×50 mm×10 μm column (eluent: 45% to 55% (v/v) CH$_3$CN and H$_2$O with 0.05% NH$_3$) to afford the title compound (200 mg) as a white solid. MS (ESI): mass calcd. for C$_{22}$H$_{16}$N$_2$O$_3$ 356.12 m/z, found 357.0 [M+H]$^+$.

A sample of (R,S)-2-(((4-oxochroman-7-yl)oxy)(pyridin-4-yl)methyl)benzonitrile (200 mg, 0.561 mmol) was separated by chiral SFC (C2, 45% (v/v) supercritical CO$_2$ in i-PrOH and H$_2$O with 0.1% NH$_3$) to yield example 7a (first enantiomer to elute, labelled *R) and example 7b (second enantiomer to elute, labelled *S).

Example 7a (*R)-2-(((4-Oxochroman-7-yl)oxy)(pyridin-4-yl)methyl)benzonitrile

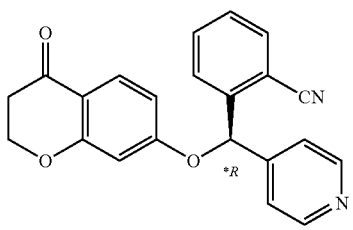

MS (ESI): mass calcd. for C$_{22}$H$_{16}$N$_2$O$_3$ 356.12 m/z, found 357.1 [M+H]$^+$. $^1$H NMR (400 MHz, DMSO-d$_6$) δ 8.63-8.55 (m, 2H), 7.89 (dd, J=0.9, 7.7 Hz, 1H), 7.76-7.69 (m, 1H), 7.66 (d, J=8.8 Hz, 1H), 7.61 (d, J=7.7 Hz, 1H), 7.56-7.50 (m, 1H), 7.47 (d, J=6.0 Hz, 2H), 6.92 (s, 1H), 6.75 (dd, J=2.4, 8.8 Hz, 1H), 6.59 (d, J=2.4 Hz, 1H), 4.45 (t, J=6.4 Hz, 2H), 2.66 (t, J=6.4 Hz, 2H).

Example 7b (*S)-2-(((4-Oxochroman-7-yl)oxy)(pyridin-4-yl)methyl)benzonitrile

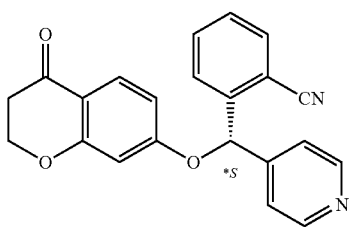 [SMILES: N#Cc1ccccc1C(Oc1ccc2c(c1)OCCC2=O)c1ccncc1]

MS (ESI): mass calcd. for C$_{22}$H$_{16}$N$_2$O$_3$ 356.12 m/z, found 357.1 [M+H]$^+$. $^1$H NMR (400 MHz, DMSO-d$_6$) δ 8.62-8.57 (m, 2H), 7.90 (dd, J=0.9, 7.7 Hz, 1H), 7.76-7.71 (m, 1H), 7.67 (d, J=8.8 Hz, 1H), 7.62 (d, J=7.5 Hz, 1H), 7.57-7.51 (m, 1H), 7.50-7.46 (m, 2H), 6.93 (s, 1H), 6.76 (dd, J=2.4, 8.8 Hz, 1H), 6.60 (d, J=2.4 Hz, 1H), 4.46 (t, J=6.4 Hz, 2H), 2.67 (t, J=6.4 Hz, 2H).

Example 8: (R,S)-2-(((4-Oxochroman-7-yl)oxy)(pyridin-4-yl)methyl)benzamide

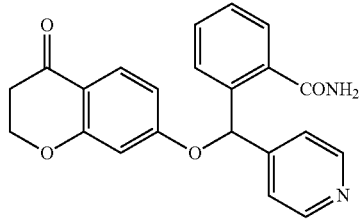 [SMILES: NC(=O)c1ccccc1C(Oc1ccc2c(c1)OCCC2=O)c1ccncc1]

H$_2$O$_2$ (0.65 mL, 30% purity, 6.5 mmol) was added dropwise to a solution of 2-(((4-oxochroman-7-yl)oxy)(pyridin-4-yl)methyl)benzonitrile (Example 7, 900 mg, 2.53 mmol), K$_2$CO$_3$ (1.1 g, 8.0 mmol), and DMSO (5 mL). The mixture was stirred at room temperature for 1 hour before pouring it into saturated Na$_2$SO$_3$ (30 mL) and extracting with ethyl acetate (30 mL×2). The combined organic extracts were dried over anhydrous Na$_2$SO$_4$, filtered, and concentrated to dryness under reduced pressure to afford the product, which was purified by preparative HPLC using a Phenomenex Gemini 150 mm×25 mm, 10 μm column (eluent: 22% to 52% (v/v) CH$_3$CN and H$_2$O with 0.05% NH$_3$) to afford the title compound (300 mg, 32%) as a white solid. MS (ESI): mass calcd. for C$_{22}$H$_{18}$N$_2$O$_4$ 374.13 m/z, found 375.0 [M+H]$^+$.

A sample of (R,S)-2-(((4-oxochroman-7-yl)oxy)(pyridin-4-yl)methyl)benzamide (300 mg, 0.801 mmol) was separated by chiral SFC (Chiralpak IC, 45% (v/v) supercritical CO$_2$ in MeOH and H$_2$O with 0.1% NH$_3$) to yield example 8a (first enantiomer to elute, labelled *R) and example 8b (second enantiomer to elute, labelled *S).

Example 8a (*R)-2-(((4-Oxochroman-7-yl)oxy)(pyridin-4-yl)methyl)benzamide

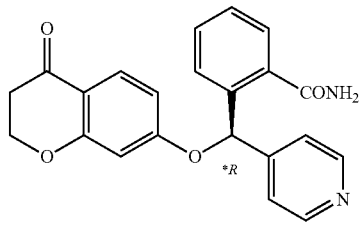 [SMILES: NC(=O)c1ccccc1[C@H](Oc1ccc2c(c1)OCCC2=O)c1ccncc1]

MS (ESI): mass calcd. for C$_{22}$H$_{18}$N$_2$O$_4$ 374.13 m/z, found 375.1 [M+H]$^+$. $^1$H NMR (400 MHz, DMSO-d$_6$) δ 8.57-8.45 (m, 2H), 8.10 (s, 1H), 7.67 (s, 1H), 7.63 (d, J=8.8 Hz, 1H), 7.53 (d, J=7.2 Hz, 1H), 7.47-7.38 (m, 4H), 7.38-7.31 (m, 1H), 7.24 (s, 1H), 6.74 (dd, J=2.4, 8.8 Hz, 1H), 6.62 (d, J=2.4 Hz, 1H), 4.42 (t, J=6.4 Hz, 2H), 2.64 (t, J=6.4 Hz, 2H).

Example 8b (*S)-2-(((4-Oxochroman-7-yl)oxy)(pyridin-4-yl)methyl)benzamide

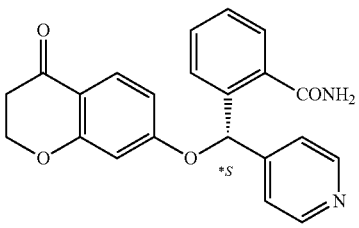 [SMILES: NC(=O)c1ccccc1[C@@H](Oc1ccc2c(c1)OCCC2=O)c1ccncc1]

MS (ESI): mass calcd. for C$_{22}$H$_{18}$N$_2$O$_4$ 374.13 m/z, found 375.1 [M+H]$^+$. $^1$H NMR (400 MHz, DMSO-d$_6$) δ 8.57-8.49 (m, 2H), 8.10 (s, 1H), 7.67 (s, 1H), 7.63 (d, J=8.8 Hz, 1H), 7.53 (d, J=7.2 Hz, 1H), 7.47-7.40 (m, 4H), 7.40-7.32 (m, 1H), 7.24 (s, 1H), 6.74 (dd, J=2.4, 8.8 Hz, 1H), 6.62 (d, J=2.4 Hz, 1H), 4.42 (t, J=6.4 Hz, 2H), 2.64 (t, J=6.4 Hz, 2H).

Example 9: (R,S)-3-(((4-Oxochroman-7-yl)oxy)(pyridin-4-yl)methyl)benzamide

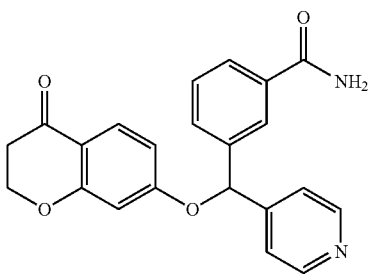 [SMILES: NC(=O)c1cccc(C(Oc2ccc3c(c2)OCCC3=O)c2ccncc2)c1]

H$_2$O$_2$ (0.25 mL, 30% purity, 2.5 mmol) was added dropwise to a solution of 3-(((4-oxochroman-7-yl)oxy)(pyridin-4-yl)methyl)benzonitrile (Intermediate 7, 300 mg, 0.842 mmol), K$_2$CO$_3$ (291 mg, 2.11 mmol), and DMSO (2 mL). The mixture was stirred at 40° C. for 2 hours before cooling to room temperature, pouring it into H$_2$O (10 mL), and extracting with ethyl acetate (10 mL×3). The combined organic extracts were dried over anhydrous Na$_2$SO$_4$, filtered, and concentrated to dryness under reduced pressure to afford the product, which was purified by preparative HPLC using a Gemini C18, 150 mm×25 mm×5 μm column (eluent: 20% to 50% (v/v) CH$_3$CN and H$_2$O with 0.05% NH$_3$) to afford the title compound (100 mg, 32%) as a white solid. MS (ESI): mass calcd. for C$_{22}$H$_{18}$N$_2$O$_4$ 374.13 m/z found 375.0 [M+H]$^+$.

A sample of (R,S)-3-(((4-oxochroman-7-yl)oxy)(pyridin-4-yl)methyl)benzamide (100 mg, 0.267 mmol) was separated by chiral SFC over (Chiralpak AS, 40% (v/v) supercritical CO$_2$ in EtOH and H$_2$O with 0.1% NH$_3$) to yield example 9a (first enantiomer to elute, labelled *R) and example 9b (second enantiomer to elute, labelled *S).

Example 9a (*R)-3-(((4-oxochroman-7-yl)oxy)(pyridin-4-yl)methyl)benzamide

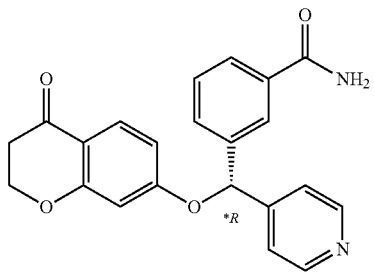 [SMILES: NC(=O)c1cccc([C@@H](Oc2ccc3c(c2)OCCC3=O)c2ccncc2)c1]

MS (ESI): mass calcd. for C₂₂H₁₈N₂O₄ 374.13 m/z found 375.0 [M+H]⁺. ¹H NMR (400 MHz, DMSO-d₆) δ 8.61-8.55 (m, 2H), 8.07-8.01 (m, 2H), 7.81 (d, J=7.0 Hz, 1H), 7.68 (d, J=9.0 Hz, 2H), 7.54 (d, J=6.0 Hz, 2H), 7.51-7.42 (m, 2H), 6.84-6.78 (m, 2H), 6.64-6.61 (m, 1H), 4.50-4.43 (m, 2H), 2.71-2.64 (m, 2H).

Example 9b (*S)-3-(((4-oxochroman-7-yl)oxy)(pyridin-4-yl)methyl)benzamide

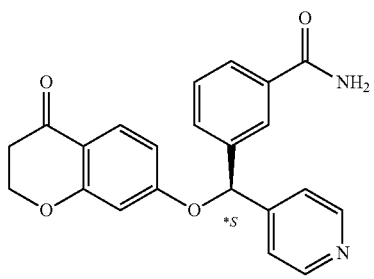 [SMILES: NC(=O)c1cccc([C@H](Oc2ccc3c(c2)OCCC3=O)c2ccncc2)c1]

MS (ESI): mass calcd. for C₂₂H₁₈N₂O₄ 374.13 m/z found 375.0 [M+H]⁺. ¹H NMR (400 MHz, DMSO-d₆) δ 8.54 (d, J=5.3 Hz, 2H), 8.01 (s, 2H), 7.78 (d, J=7.5 Hz, 1H), 7.65 (d, J=8.4 Hz, 2H), 7.53-7.38 (m, 4H), 6.82-6.74 (m, 2H), 6.60 (s, 1H), 4.44 (t, J=6.2 Hz, 2H), 2.65 (t, J=6.1 Hz, 2H).

Example 10: (R,S)-4-(((4-Oxochroman-7-yl)oxy)(pyridin-4-yl)methyl)benzonitrile

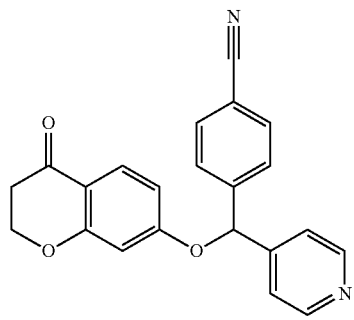

DIAD (369 mg, 1.82 mmol) was added to a solution of 7-hydroxychroman-4-one (200 mg, 1.22 mmol), 4-(hydroxy(pyridin-4-yl)methyl)benzonitrile (Intermediate 8, 307 mg, 1.46 mmol), PPh₃ (415 mg, 1.58 mmol) and dichloromethane (10 mL) that had been cooled to 0° C. The mixture was stirred for 12 hours with gradual warming to room temperature before pouring into H₂O (15 mL) and extracting with dichloromethane (25 mL×3). The combined organic extracts were dried over anhydrous Na₂SO₄, filtered, and concentrated to dryness under reduced pressure to give the product, which was purified by preparative HPLC with a Phenomenex Gemini C18 250 mm×50 mm×10 μm column (eluent: 26% to 56% (v/v) CH₃CN and H₂O with 0.225% HCOOH) to provide the title compound (295.9 mg, 59%) as a light yellow solid. MS (ESI): mass calcd. for C₂₂H₁₆N₂O₃ 356.12 m/z, found 357.0 [M+H]⁺. ¹H NMR (400 MHz, DMSO-d₆) δ 8.64-8.51 (m, 2H), 7.88 (d, J=7.5 Hz, 2H), 7.75 (d, J=7.7 Hz, 2H), 7.68 (d, J=7.9 Hz, 1H), 7.55-7.44 (m, 2H), 6.89 (s, 1H), 6.79 (s, 1H), 6.62 (s, 1H), 4.47 (t, J=6.1 Hz, 2H), 2.68 (t, J=6.0 Hz, 2H).

A sample of (R,S)-4-(((4-oxochroman-7-yl)oxy)(pyridin-4-yl)methyl)benzonitrile (40 mg, 0.106 mmol) was separated by chiral SFC (Chiralpak AD-H, 55% CO₂-45% EtOH) to yield example 10a (first enantiomer to elute, labelled *R) and example 10b (second enantiomer to elute, labelled *S).

Example 10a (*R)-4-(((4-oxochroman-7-yl)oxy)(pyridin-4-yl)methyl)benzonitrile

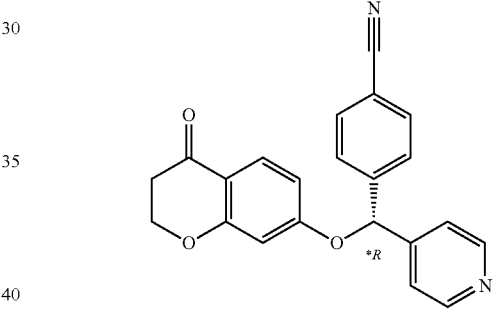

MS (ESI): mass calcd. for C₂₂H₁₆N₂O₃ 356.12 m/z found 357.1 [M+H]⁺. ¹H NMR (400 MHz, CHLOROFORM-d) δ 8.64 (br s, 2H), 7.83 (d, J=9.1 Hz, 1H), 7.66-7.74 (m, 2H), 7.54 (d, J=8.6 Hz, 2H), 7.32 (br d, J=5.6 Hz, 2H), 6.65 (dd, J=2.5, 9.1 Hz, 1H), 6.38 (d, J=2.5 Hz, 1H), 6.23 (s, 1H), 4.49 (t, J=6.3 Hz, 2H), 2.74 (t, J=6.6 Hz, 2H).

Example 10b (*S)-4-(((4-oxochroman-7-yl)oxy)(pyridin-4-yl)methyl)benzonitrile

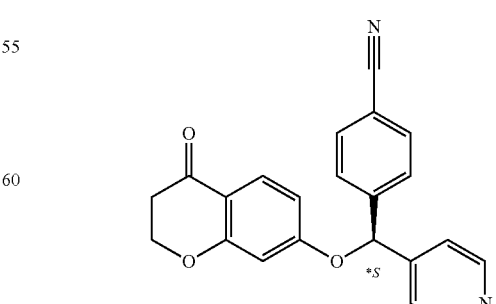

MS (ESI): mass calcd. for $C_{22}H_{16}N_2O_3$ 356.12 m/z found 357.1 [M+H]$^+$. 1H NMR (400 MHz, CHLOROFORM-d) δ 8.63 (d, J=6.1 Hz, 2H), 7.83 (d, J=9.1 Hz, 1H), 7.64-7.72 (m, 2H), 7.54 (d, J=8.6 Hz, 2H), 7.32 (d, J=6.1 Hz, 2H), 6.65 (dd, J=2.5, 9.1 Hz, 1H), 6.38 (d, J=2.5 Hz, 1H), 6.24 (s, 1H), 4.48 (t, J=6.3 Hz, 2H), 2.74 (t, J=6.6 Hz, 2H).

Example 11: (R,S)-4-(((4-Oxochroman-7-yl)oxy)(pyridin-4-yl)methyl)benzamide

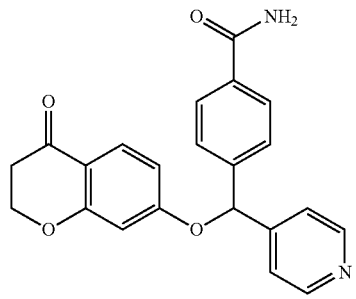

H$_2$O$_2$ (0.17 mL, 30% purity, 1.7 mmol) was added dropwise to a mixture of (R,S)-4-(((4-oxochroman-7-yl)oxy)(pyridin-4-yl)methyl)benzonitrile (Example 10, 200 mg, 0.561 mmol), K$_2$CO$_3$ (194 mg, 1.40 mmol), and DMSO (5 mL). The mixture was stirred at 40° C. for 11 hours before quenching with saturated Na$_2$SO$_3$ (2 mL). The suspension was filtered and the filtrate was purified by preparative HPLC using a Phenomenex Gemini 150 mm×25 mm×10 μm column (eluent: 25% to 55% (v/v) CH$_3$CN and H$_2$O with 0.05% NH$_3$) to afford the title compound (160 mg, 76%) as a yellow solid. MS (ESI): mass calcd. for $C_{22}H_{18}N_2O_4$ 374.13 m/z, found 375.0 [M+H]$^+$. $^1$H NMR (400 MHz, DMSO-d$_6$) δ 8.60-8.53 (m, 2H), 7.96 (s, 1H), 7.85 (d, J=8.2 Hz, 2H), 7.67 (d, J=8.8 Hz, 1H), 7.60 (d, J=8.4 Hz, 2H), 7.51 (d, J=6.2 Hz, 2H), 7.39 (s, 1H), 6.84-6.76 (m, 2H), 6.62 (d, J=2.2 Hz, 1H), 4.46 (t, J=6.4 Hz, 2H), 2.67 (t, J=6.4 Hz, 2H).

A sample of (R,S)-4-(((4-oxochroman-7-yl)oxy)(pyridin-4-yl)methyl)benzamide (300 mg, 0.801 mmol) was purified by chiral SFC (Chiralpak AD 50% (v/v) supercritical CO$_2$ in EtOH and H$_2$O with 0.1% NH$_3$) to yield example 11a (first enantiomer to elute, labelled *R) and example 11b (second enantiomer to elute, labelled *S).

Example 11a (*R)-4-(((4-oxochroman-7-yl)oxy)(pyridin-4-yl)methyl)benzamide

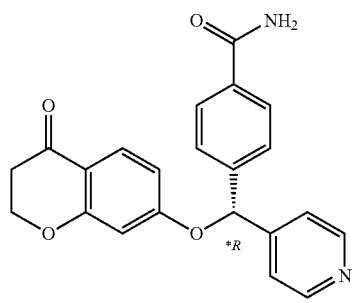

MS (ESI): mass calcd. for $C_{22}H_{18}N_2O_4$ 374.13 m/z, found 375.0 [M+H]$^+$. $^1$H NMR (400 MHz, DMSO-d$_6$) δ 8.60-8.53 (m, 2H), 7.95 (s, 1H), 7.86 (d, J=8.4 Hz, 2H), 7.67 (d, J=8.8 Hz, 1H), 7.60 (d, J=8.4 Hz, 2H), 7.54-7.48 (m, 2H), 7.38 (s, 1H), 6.83-6.77 (m, 2H), 6.62 (d, J=2.4 Hz, 1H), 4.46 (t, J=6.4 Hz, 2H), 2.68 (t, J=6.4 Hz, 2H).

Example 11b (*S)-4-(((4-oxochroman-7-yl)oxy)(pyridin-4-yl)methyl)benzamide

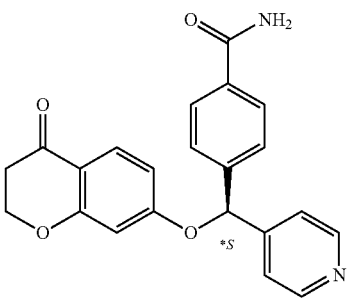 [SMILES: NC(=O)c1ccc([C@H](Oc2ccc3c(c2)OCCC3=O)c2ccncc2)cc1]

MS (ESI): mass calcd. for $C_{22}H_{18}N_2O_4$ 374.13 m/z, found 375.0 [M+H]$^+$. $^1$H NMR (400 MHz, DMSO-d$_6$) δ 8.63-8.50 (m, 2H), 7.95 (s, 1H), 7.86 (d, J=8.4 Hz, 2H), 7.67 (d, J=8.8 Hz, 1H), 7.60 (d, J=8.4 Hz, 2H), 7.55-7.50 (m, 2H), 7.39 (s, 1H), 6.86-6.75 (m, 2H), 6.62 (d, J=2.4 Hz, 1H), 4.46 (t, J=6.4 Hz, 2H), 2.67 (t, J=6.4 Hz, 2H).

Example 12: (R,S)-7-((4-Methoxyphenyl)(pyridin-4-yl)methoxy)chroman-4-one

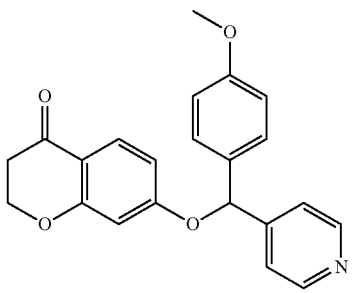 [SMILES: COc1ccc(C(Oc2ccc3c(c2)OCCC3=O)c2ccncc2)cc1]

Under a N$_2$ atmosphere, DIAD (1.42 g, 7.02 mmol) was added to a solution of 7-hydroxychroman-4-one (0.92 g, 5.6 mmol), (4-methoxyphenyl)(pyridin-4-yl)methanol (Intermediate 9, 1.0 g, 4.6 mmol), PPh$_3$ (1.6 g, 6.1 mmol), and tetrahydrofuran (15 mL) that had been cooled to 0° C. The mixture was stirred at 0° C. for 16 hours with gradual warming to room temperature before concentrating to dryness under reduced pressure to give the product, which was purified by preparative HPLC using a Phenomenex Gemini 150 mm×25 mm×10 m column (eluent: 13% to 43% (v/v) CH$_3$CN and H$_2$O with 0.225% HCOOH) to afford the product (470 mg) as a white solid. The product (400 mg, 84% purity) was further purified by preparative HPLC using a Phenomenex Gemini C18 250 mm×50 mm×10 μm column (eluent: 45% to 75% (v/v) CH$_3$CN and H$_2$O with 0.225% HCOOH) to afford the title compound (195 mg) as a yellow solid. MS (ESI): mass calcd. for $C_{22}H_{19}NO_4$ 361.13 m/z found 362.0 [M+H]$^+$. $^1$H NMR (400 MHz, DMSO-d$_6$): 8.54-8.49 (m, 2H), 7.63 (d, J=8.8 Hz, 1H), 7.43-7.40 (m, 2H), 7.40-7.36 (m, 2H), 6.92-6.88 (m, 2H), 6.74-6.71 (m, 1H), 6.65 (s, 1H), 6.56 (d, J=2.4 Hz, 1H), 4.43 (t, J=6.4 Hz, 2H), 3.68 (s, 3H), 2.64 (t, J=6.4 Hz, 2H).

A sample of (R,S)-7-((4-methoxyphenyl)(pyridin-4-yl)methoxy)chroman-4-one (210 mg, 0.562 mmol) was further purified by chiral SFC (Chiralpak AS, 40% (v/v) supercritical $CO_2$ in EtOH and $H_2O$ with 0.1% $NH_3$) to yield example 12a (first enantiomer to elute, labelled *R) and example 12b (second enantiomer to elute, labelled *S).

Example 12a (*R)-7-((4-Methoxyphenyl)(pyridin-4-yl)methoxy)chroman-4-one

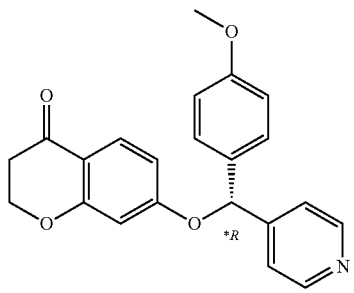 [SMILES: COc1ccc([C@@H](Oc2ccc3c(c2)OCCC3=O)c2ccncc2)cc1]

MS (ESI): mass calcd. for $C_{22}H_{19}NO_4$ 361.13 m/z found 362.0 [M+H]$^+$. $^1$H NMR (400 MHz, DMSO-$d_6$) δ 8.53-8.50 (m, 2H), 7.62 (d, J=8.8 Hz, 1H), 7.43-7.40 (m, 2H), 7.40-7.37 (m, 2H), 6.91-6.88 (m, 2H), 6.72 (dd, J=2.0, 2.4 Hz, 1H), 6.65 (s, 1H), 6.56 (d, J=2.0 Hz, 1H), 4.43 (t, J=6.4 Hz, 2H), 3.68 (s, 3H), 2.64 (t, J=6.4 Hz, 2H).

Example 12b (*S)-7-((4-Methoxyphenyl)(pyridin-4-yl)methoxy)chroman-4-one

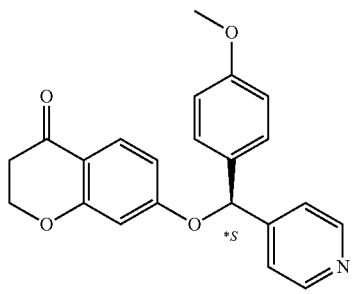 [SMILES: COc1ccc([C@H](Oc2ccc3c(c2)OCCC3=O)c2ccncc2)cc1]

MS (ESI): mass calcd. for $C_{22}H_{19}NO_4$ 361.13 m/z found 362.0 [M+H]$^+$. $^1$H NMR (400 MHz, DMSO-$d_6$) δ 8.53-8.49 (m, 2H), 7.63 (d, J=9.2 Hz, 1H), 7.43-7.37 (m, 4H), 6.92-6.88 (m, 2H), 6.75-6.71 (m, 1H), 6.65 (s, 1H), 6.56 (d, J=2.4 Hz, 1H), 4.43 (t, J=6.4 Hz, 2H), 3.68 (s, 3H), 2.64 (t, J=6.4 Hz, 2H).

Example 13: (R,S)-7-((3-Methoxyphenyl)(pyridin-4-yl)methoxy)chroman-4-one

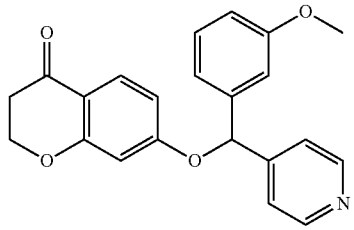 [SMILES: COc1cccc(C(Oc2ccc3c(c2)OCCC3=O)c2ccncc2)c1]

ADDP (480 mg, 1.90 mmol) was added to a solution of 7-hydroxychroman-4-one (200 mg, 1.22 mmol), (3-methoxyphenyl)(pyridin-4-yl)methanol (Intermediate 10, 310 mg), n-Bu$_3$P (350 mg, 1.73 mmol), and toluene (8 mL). The mixture was stirred at 65° C. for 2 hours before pouring it into $H_2O$ (20 mL) and extracting with dichloromethane (50 mL×3). The combined organic extracts were dried over anhydrous $Na_2SO_4$, filtered, and concentrated to dryness under reduced pressure to give the product, which was purified by FCC (eluent:petroleum ether:ethyl acetate, 20:1 to 0:1, gradient elution) to afford the title compound (300 mg) as a yellow oil, which was used in the next step without further purification. MS (ESI): mass calcd. for $C_{22}H_{19}NO_4$ 361.13, m/z found 362.0 [M+H]$^+$. $^1$H NMR (400 MHz, DMSO-$d_6$) δ 8.56-8.49 (m, 2H), 7.65 (d, J=8.8 Hz, 1H), 7.50-7.45 (m, 2H), 7.31-7.24 (m, 1H), 7.09-7.03 (m, 2H), 6.88-6.82 (m, 1H), 6.78-6.73 (m, 1H), 6.67 (s, 1H), 6.61-6.56 (m, 1H), 4.44 (t, J=6.4 Hz, 2H), 3.71 (s, 3H), 2.65 (t, J=6.4 Hz, 2H).

A sample of (R,S)-7-((3-methoxyphenyl)(pyridin-4-yl)methoxy)chroman-4-one (200 mg, 0.517 mmol) was separated by chiral SFC (Chiralpak AS, 40% (v/v) supercritical $CO_2$ in MeOH and $H_2O$ with 0.1% $NH_3$) to yield example 13a (first enantiomer to elute, labelled *R) and example 13b (second enantiomer to elute, labelled *S).

Example 13a (*R)-7-((3-methoxyphenyl)(pyridin-4-yl)methoxy)chroman-4-one

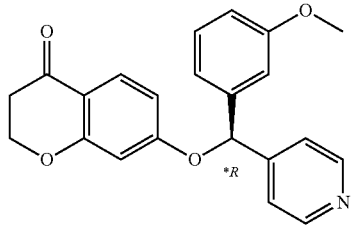 [SMILES: COc1cccc([C@H](Oc2ccc3c(c2)OCCC3=O)c2ccncc2)c1]

MS (ESI): mass calcd. for $C_{22}H_{19}NO_4$ 361.13, m/z found 362.0 [M+H]$^+$. $^1$H NMR (400 MHz, DMSO-$d_6$) δ 8.56-8.48 (m, 2H), 7.65 (d, J=8.8 Hz, 1H), 7.49-7.45 (m, 2H), 7.30-7.24 (m, 1H), 7.09-7.03 (m, 2H), 6.87-6.82 (m, 1H), 6.78-6.73 (m, 1H), 6.67 (s, 1H), 6.60-6.56 (m, 1H), 4.44 (t, J=6.4 Hz, 2H), 3.71 (s, 3H), 2.65 (t, J=6.4 Hz, 2H).

Example 13b (*S)-7-((3-methoxyphenyl)(pyridin-4-yl)methoxy)chroman-4-one

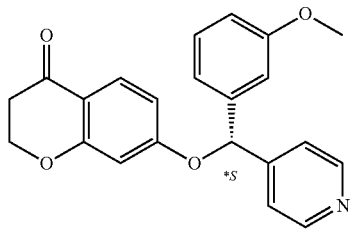 [SMILES: COc1cccc([C@@H](Oc2ccc3c(c2)OCCC3=O)c2ccncc2)c1]

MS (ESI): mass calcd. for $C_{22}H_{19}NO_4$ 361.13, m/z found 362.0 [M+H]⁺. ¹H NMR (400 MHz, DMSO-$d_6$) δ 8.62-8.51 (m, 2H), 7.68 (d, J=8.8 Hz, 1H), 7.54-7.47 (m, 2H), 7.34-7.26 (m, 1H), 7.14-7.06 (m, 2H), 6.92-6.84 (m, 1H), 6.82-6.75 (m, 1H), 6.70 (s, 1H), 6.65-6.58 (m, 1H), 4.47 (t, J=6.4 Hz, 2H), 3.74 (s, 3H), 2.68 (t, J=6.4 Hz, 2H).

Example 14: 7-((2-Methoxyphenyl)(pyridin-4-yl)methoxy)chroman-4-one

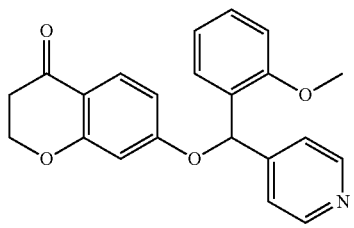 [SMILES: COc1ccccc1C(Oc1ccc2c(c1)OCCC2=O)c1ccncc1]

DIAD (1.0 g, 4.9 mmol) was added to a solution of 7-hydroxychroman-4-one (640 mg, 3.90 mmol), (2-methoxyphenyl)(pyridin-4-yl)methanol (Intermediate 11, 1.0 g, 4.6 mmol), PPh₃ (1.5 g, 5.7 mmol), and dichloromethane (10 mL). The mixture was stirred at room temperature for 16 hours before pouring it into H₂O (20 mL) and extracting with ethyl acetate (50 mL×3). The combined organic extracts were dried over anhydrous Na₂SO₄, filtered, and concentrated to dryness under reduced pressure to give the product, which was purified by preparative HPLC using Phenomenex Synergi Max-RP 250 mm×50 mm×10 μm column (eluent: 5% to 45% (v/v) CH₃CN and H₂O with 0.225% HCOOH) to afford the product (400 mg, 90% purity) as a white solid. The product (400 mg) was further purified by preparative HPLC using a Phenomenex Gemini C18 250 mm×50 mm×10 μm column (eluent: 10% to 40%, (v/v) CH₃CN and H₂O with 0.225% HCOOH) to afford the title compound (250 mg) as a white solid. MS (ESI): mass calcd. for $C_{22}H_{19}NO_4$ 361.13 m/z, found 362.0 [M+H]⁺. ¹H NMR (400 MHz, DMSO-$d_6$) δ 8.59-8.44 (m, 2H), 7.64 (d, J=8.6 Hz, 1H), 7.45-7.38 (m, 2H), 7.34-7.24 (m, 2H), 7.07 (d, J=8.2 Hz, 1H), 6.92 (t, J=7.5 Hz, 1H), 6.75 (s, 1H), 6.69 (dd, J=2.4, 8.8 Hz, 1H), 6.53-6.36 (m, 1H), 4.43 (t, J=6.4 Hz, 2H), 3.86 (s, 3H), 2.65 (t, J=6.4 Hz, 2H).

A sample of (R,S)-7-((2-methoxyphenyl)(pyridin-4-yl)methoxy)chroman-4-one (200 mg, 0.553 mmol) was separated by SFC (Chiralpak OJ, 30% (v/v) supercritical CO₂ in EtOH and H₂O with 0.1% NH₃) to yield example 14a (first enantiomer to elute, labelled *R) and example 14b (second enantiomer to elute, labelled *S).

Example 14a (*R)-7-((2-Methoxyphenyl)(pyridin-4-yl)methoxy)chroman-4-one

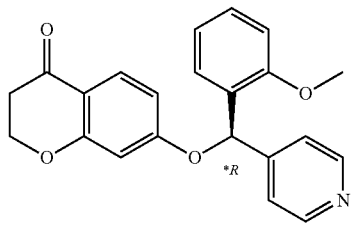 [SMILES: COc1ccccc1[C@H](Oc1ccc2c(c1)OCCC2=O)c1ccncc1]

MS (ESI): mass calcd. for $C_{22}H_{19}NO_4$ 361.13 m/z, found 362.0 [M+H]⁺. ¹H NMR (400 MHz, DMSO-$d_6$) δ 8.58-8.42 (m, 2H), 7.63 (d, J=8.8 Hz, 1H), 7.45-7.37 (m, 2H), 7.33-7.23 (m, 2H), 7.06 (d, J=8.0 Hz, 1H), 6.95-6.87 (m, 1H), 6.74 (s, 1H), 6.68 (dd, J=2.4, 8.8 Hz, 1H), 6.45 (d, J=2.4 Hz, 1H), 4.43 (t, J=6.4 Hz, 2H), 3.85 (s, 3H), 2.64 (t, J=6.4 Hz, 2H).

Example 14b (*S)-7-((2-Methoxyphenyl)(pyridin-4-yl)methoxy)chroman-4-one

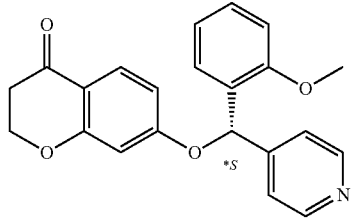 [SMILES: COc1ccccc1[C@@H](Oc1ccc2c(c1)OCCC2=O)c1ccncc1]

MS (ESI): mass calcd. for $C_{22}H_{19}NO_4$ 361.13 m/z, found 362.0 [M+H]⁺. ¹H NMR (400 MHz, DMSO-$d_6$) δ 8.63-8.38 (m, 2H), 7.63 (d, J=8.8 Hz, 1H), 7.47-7.37 (m, 2H), 7.32-7.23 (m, 2H), 7.06 (d, J=7.8 Hz, 1H), 6.96-6.87 (m, 1H), 6.75 (s, 1H), 6.69 (dd, J=2.4, 8.8 Hz, 1H), 6.45 (d, J=2.4 Hz, 1H), 4.43 (t, J=6.5 Hz, 2H), 3.85 (s, 3H), 2.64 (t, J=6.4 Hz, 2H).

Example 15: (R,S)-4-((2-Methylpyridin-4-yl)((4-oxochroman-7-yl)oxy)methyl)benzamide

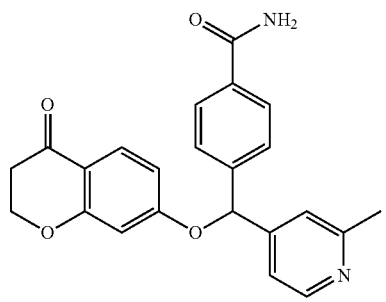 [SMILES: Cc1cc(C(Oc2ccc3c(c2)OCCC3=O)c2ccc(C(N)=O)cc2)ccn1]

H₂O₂ (1.04 mL, 30% purity, 10.4 mmol) was added dropwise to a mixture of 4-((2-methylpyridin-4-yl)((4-oxochroman-7-yl)oxy)methyl)benzonitrile (Intermediate 12, 500 mg, 1.04 mmol), K₂CO₃ (720 mg, 5.21 mmol), and DMSO (5 mL). The mixture was stirred at room temperature for 1 hour before pouring it into saturated Na₂SO₃ (20 mL). The suspension was isolated via filtration and the filter cake washed with water (10 mL×2) to give the product, which was purified by preparative HPLC using a Phenomenex Gemini 150 mm×25 mm×10 m column (eluent: 20% to 50% (v/v) CH₃CN and H₂O with 0.05% NH₃) to afford the title compound (150 mg, 37%) as a white solid. MS (ESI): mass calcd. for $C_{23}H_{20}N_2O_4$ 388.14 m/z found 389.0 $[M+H]^+$.

A sample of (R,S)-4-((2-methylpyridin-4-yl)((4-oxochroman-7-yl)oxy)methyl)benzamide (150 mg, 0.386 mmol) was separated by chiral SFC (ChiralpakAD, 55% (v/v) supercritical CO₂ in i-PrOH and H₂O with 0.1% NH₃) to yield example 15a (first enantiomer to elute, labelled *R) and example 15b (second enantiomer to elute, labelled *S).

Example 15a (*R)-4-((2-Methylpyridin-4-yl)((4-oxochroman-7-yl)oxy)methyl)benzamide

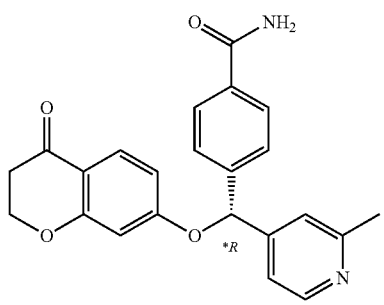 [SMILES: Cc1cc([C@H](Oc2ccc3c(c2)OCCC3=O)c2ccc(C(N)=O)cc2)ccn1]

MS (ESI): mass calcd. for $C_{23}H_{20}N_2O_4$ 388.14 m/z found 389.0 $[M+H]^+$. ¹H NMR (400 MHz, DMSO-d₆) δ 8.40 (d, J=4.8 Hz, 1H), 7.92 (s, 1H), 7.84-7.81 (m, 2H), 7.65 (d, J=8.8 Hz, 1H), 7.59-7.55 (m, 2H), 7.36-7.33 (m, 2H), 7.29-7.27 (m, 1H), 6.76 (dd, J=2.4, 8.8 Hz, 1H), 6.72 (s, 1H), 6.58 (d, J=2.4 Hz, 1H), 4.44 (t, J=6.4 Hz, 2H), 2.65 (t, J=6.4 Hz, 2H), 2.42 (s, 3H).

Example 15b (*S)-4-((2-Methylpyridin-4-yl)((4-oxochroman-7-yl)oxy)methyl)benzamide

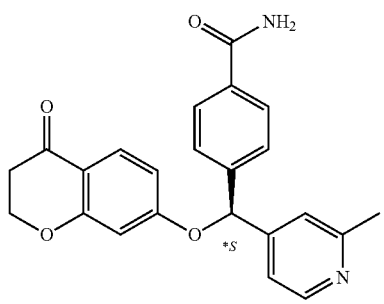 [SMILES: Cc1cc([C@@H](Oc2ccc3c(c2)OCCC3=O)c2ccc(C(N)=O)cc2)ccn1]

MS (ESI): mass calcd. for $C_{23}H_{20}N_2O_4$ 388.14 m/z found 389.0 $[M+H]^+$. ¹H NMR (400 MHz, DMSO-d₆) δ 8.40 (d, J=4.2 Hz, 1H), 7.92 (br s, 1H), 7.82 (d, J=8.4 Hz, 2H), 7.65 (d, J=8.8 Hz, 1H), 7.57 (d, J=8.4 Hz, 2H), 7.38-7.32 (m, 2H), 7.30-7.26 (m, 1H), 6.76 (dd, J=2.4, 8.8 Hz, 1H), 6.72 (s, 1H), 6.58 (d, J=2.4 Hz, 1H), 4.44 (t, J=6.4 Hz, 2H), 2.65 (t, J=6.3 Hz, 2H), 2.42 (s, 3H).

Example 16: (R,S)-7-((4-(Benzyloxy)phenyl)(pyridin-4-yl)methoxy)chroman-4-one

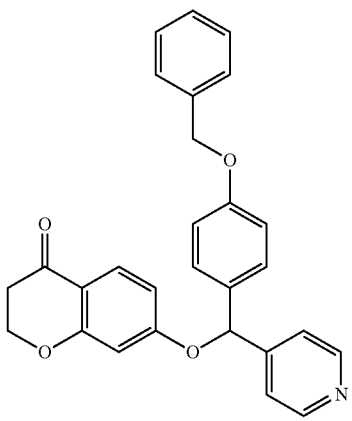 [SMILES: O=C1CCOc2cc(OC(c3ccncc3)c3ccc(OCc4ccccc4)cc3)ccc21]

ADDP (945 mg, 3.75 mmol) was added to a solution of 7-hydroxychroman-4-one (410 mg, 2.50 mmol), (4-(benzyloxy)phenyl)(pyridin-4-yl)methanol (Intermediate 13, 800 mg, 2.75 mmol), n-Bu₃P (758 mg, 3.75 mmol), and toluene (10 mL). The mixture was stirred at 80° C. for 3 hours before cooling to room temperature, pouring it into water (30 mL), and extracting with ethyl acetate (30 mL×2). The combined organic extracts were dried over anhydrous Na₂SO₄, filtered, and concentrated to dryness under reduced pressure to afford the product, which was purified by preparative HPLC using a Gemini C18 150 mm×25 mm×10 μm column (eluent: 48% to 78% (v/v) CH₃CN and H₂O with 0.05% NH₃) to afford the title compound (380 mg, 34%) as a white solid. MS (ESI): mass calcd. for $C_{28}H_{23}NO_4$ 437.16 m/z found 438.1 $[M+H]^+$. ¹H NMR (400 MHz, DMSO-d₆) δ 8.53-8.49 (m, 2H), 7.62 (d, J=8.8 Hz, 1H), 7.43-7.27 (m, 9H), 7.00-6.95 (m, 2H), 6.74-6.70 (m, 1H), 6.64 (s, 1H), 6.56 (d, J=2.2 Hz, 1H), 5.03 (s, 2H), 4.43 (t, J=6.4 Hz, 2H), 2.66-2.62 (m, 2H).

A sample of 7-((4-(benzyloxy)phenyl)(pyridin-4-yl)methoxy)chroman-4-one (180 mg, 0.411 mmol) was separated by chiral SFC (Chiralpak OJ, 45% (v/v) supercritical CO₂ in EtOH and H₂O with 0.1% NH₃) to yield example 16a (first enantiomer to elute, labelled *R) and example 16b (second enantiomer to elute, labelled *S).

Example 16a (*R)-7-((4-(benzyloxy)phenyl)(pyridin-4-yl)methoxy)chroman-4-one

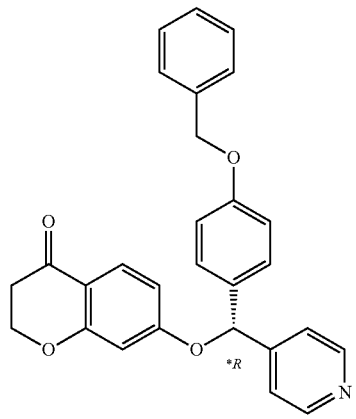 [SMILES: O=C1CCOc2cc(O[C@@H](c3ccncc3)c3ccc(OCc4ccccc4)cc3)ccc21]

MS (ESI): mass calcd. for $C_{28}H_{23}NO_4$ 437.16 m/z found 438.0 [M+H]$^+$. $^1$H NMR (400 MHz, DMSO-d$_6$) δ 8.55 (d, J=5.0 Hz, 2H), 7.67 (d, J=9.0 Hz, 1H), 7.47-7.30 (m, 9H), 7.04-7.00 (m, 2H), 6.79-6.75 (m, 1H), 6.69 (s, 1H), 6.60 (d, J=2.5 Hz, 1H), 5.07 (s, 2H), 4.47 (t, J=6.5 Hz, 2H), 2.68 (t, J=6.5 Hz, 2H).

Example 16b (*S)-7-((4-(benzyloxy)phenyl)(pyridin-4-yl)methoxy)chroman-4-one

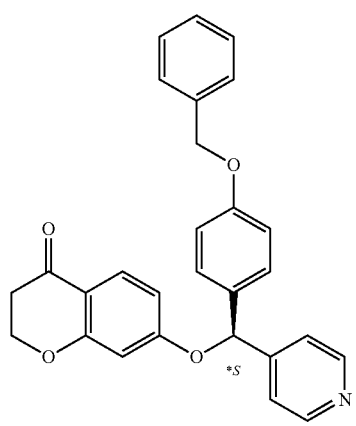 [SMILES: O=C1CCOc2cc(O[C@H](c3ccncc3)c3ccc(OCc4ccccc4)cc3)ccc21]

MS (ESI): mass calcd. for $C_{28}H_{23}NO_4$ 437.16 m/z found 438.0 [M+H]$^+$. $^1$H NMR (400 MHz, DMSO-d$_6$) δ 8.55-8.47 (m, 2H), 7.63 (d, J=8.8 Hz, 1H), 7.43-7.26 (m, 9H), 7.00-6.95 (m, 2H), 6.74-6.70 (m, 1H), 6.64 (s, 1H), 6.56 (d, J=2.2 Hz, 1H), 5.03 (s, 2H), 4.43 (t, J=6.4 Hz, 2H), 2.64 (t, J=6.4 Hz, 2H).

Example 17: (R,S)-7-((4-((4-Methoxybenzyl)oxy)phenyl)(pyridin-4-yl)methoxy)chroman-4-one ADDP (1.2 g, 4.8 mmol) was added to a solution of 7-hydroxychroman-4-one (510 mg, 3.12 mmol), (4-((4-methoxybenzyl)oxy)phenyl)(pyridin-4-yl)methanol (Intermediate 14, 1.0 g, 3.1 mmol), n-Bu$_3$P (1.2 mL, 4.8 mmol), and toluene (15 mL). The mixture was stirred at 80° C. for 2 hours before cooling to room temperature, pouring it into water (20 mL), and extracting with ethyl acetate (20 mL×3). The combined organic layers were dried over anhydrous Na$_2$SO$_4$, filtered, and concentrated to dryness under reduced pressure to afford the product, which was purified by FCC (eluent:petroleum ether:ethyl acetate, 1:1 to 1:3, gradient elution) to give the title compound (520 mg, 32%) as a light yellow oil. MS (ESI): mass calcd. for $C_{29}H_{25}NO_5$ 467.17 m/z found 468.0 [M+H]$^+$. $^1$H NMR (400 MHz, DMSO-d$_6$) δ 8.54-8.50 (m, 2H), 7.64 (d, J=8.8 Hz, 1H), 7.44-7.29 (m, 6H), 6.99-6.88 (m, 4H), 6.73 (dd, J=2.4, 8.8 Hz, 1H), 6.65 (s, 1H), 6.57 (d, J=2.2 Hz, 1H), 4.95 (s, 2H), 4.44 (t, J=6.4 Hz, 2H), 3.72 (s, 3H), 2.68-2.62 (m, 2H).

A sample of (R,S)-7-((4-((4-methoxybenzyl)oxy)phenyl)(pyridin-4-yl)methoxy)chroman-4-one (50 mg, 0.107 mmol) was separated by chiral SFC (Chiralpak AD, 50% (v/v) supercritical CO$_2$ in EtOH and H$_2$O with 0.1% NH$_3$) to yield example 17a (first enantiomer to elute, labelled *R) and example 17b (second enantiomer to elute, labelled *S).

Example 17a (*R)-7-((4-((4-Methoxybenzyl)oxy)phenyl)(pyridin-4-yl)methoxy)chroman-4-one

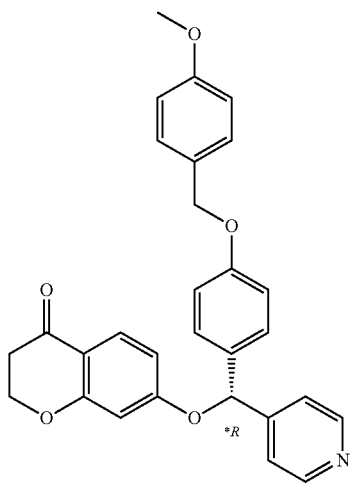 [SMILES: COc1ccc(COc2ccc([C@@H](Oc3ccc4c(c3)OCCC4=O)c3ccncc3)cc2)cc1]

MS (ESI): mass calcd. for $C_{29}H_{25}NO_5$ 467.17 m/z found 468.0 [M+H]$^+$. $^1$H NMR (400 MHz, DMSO-d$_6$) δ 8.51 (d, J=4.9 Hz, 2H), 7.62 (d, J=8.8 Hz, 1H), 7.44-7.34 (m, 4H), 7.31 (d, J=8.4 Hz, 2H), 6.99-6.86 (m, 4H), 6.72 (d, J=7.5 Hz, 1H), 6.64 (s, 1H), 6.56 (s, 1H), 4.94 (s, 2H), 4.43 (t, J=6.3 Hz, 2H), 3.70 (s, 3H), 2.64 (t, J=6.0 Hz, 2H).

Example 17b (*S)-7-((4-((4-Methoxybenzyl)oxy)phenyl)(pyridin-4-yl)methoxy)chroman-4-one

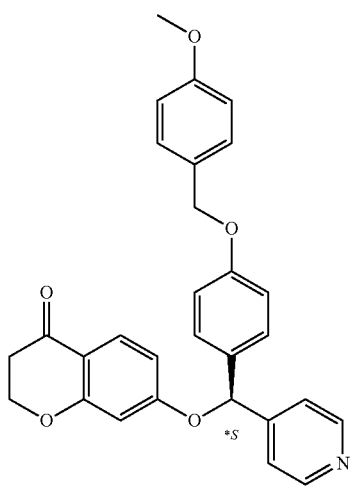 [SMILES: COc1ccc(COc2ccc([C@H](Oc3ccc4c(c3)OCCC4=O)c3ccncc3)cc2)cc1]

MS (ESI): mass calcd. for $C_{29}H_{25}NO_5$ 467.17 m/z found 468.0 [M+H]$^+$. $^1$H NMR (400 MHz, DMSO-d$_6$) δ 8.53-8.49 (m, 2H), 7.63 (d, J=8.8 Hz, 1H), 7.43-7.35 (m, 4H), 7.33-7.28 (m, 2H), 6.99-6.93 (m, 2H), 6.91-6.86 (m, 2H), 6.72 (dd, J=2.4, 8.8 Hz, 1H), 6.64 (s, 1H), 6.56 (d, J=2.4 Hz, 1H), 4.94 (s, 2H), 4.43 (t, J=6.4 Hz, 2H), 3.71 (s, 3H), 2.64 (t, J=6.3 Hz, 2H).

Example 18: (R,S)-4-(((4-Oxochroman-7-yl)oxy)(2-(trifluoromethyl)pyridin-4-yl)methyl)benzamide

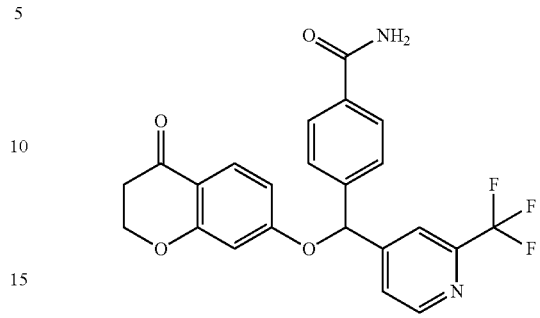

H$_2$O$_2$ (1.77 mL, 30% purity, 17.6 mmol) was added dropwise to a solution of 4-(((4-oxochroman-7-yl)oxy)(2-(trifluoromethyl)pyridin-4-yl)methyl)benzonitrile (Intermediate 15, 2.5 g, 5.9 mmol), K$_2$CO$_3$ (2.04 g, 14.8 mmol), and DMSO (3 mL). The mixture was stirred at room temperature for 1 hour before pouring it into water (80 mL) and extracting with ethyl acetate (50 mL×3). The combined organic layers were dried over anhydrous Na$_2$SO$_4$, filtered, and concentrated to dryness under reduced pressure to afford the product, which was purified by FCC (eluent:petroleum ether:ethyl acetate, 1:0 to 1:3, gradient elution) to afford the product. The product was further purified by preparative HPLC over Phenomenex Gemini 150 mm×5 mm×10 μm column (eluent: 30% to 60% (v/v) CH$_3$CN and H$_2$O with 0.05% NH$_3$) to yield the title compound (1 g, 38%) as a white solid. MS (ESI): mass calcd. for $C_{23}H_{17}F_3N_2O_4$ 442.11 m/z, found 443.0 [M+H]$^+$. $^1$H NMR (400 MHz, DMSO-d$_6$) δ 8.75 (d, J=5.1 Hz, 1H), 8.01 (s, 1H), 7.93 (br s, 1H), 7.86-7.80 (m, 3H), 7.68-7.60 (m, 3H), 7.37 (br s, 1H), 6.94 (s, 1H), 6.79 (dd, J=2.3, 8.7 Hz, 1H), 6.61 (d, J=2.4 Hz, 1H), 4.44 (t, J=6.4 Hz, 2H), 2.65 (t, J=6.4 Hz, 2H).

A sample of (R,S)-4-(((4-oxochroman-7-yl)oxy)(2-(trifluoromethyl)pyridin-4-yl)methyl)benzamide (1.00 g, 2.26 mmol) was separated by chiral SFC (Chiralpak OD, 45% (v/v) supercritical CO$_2$ in EtOH and H$_2$O with 0.1% NH$_3$) to yield example 18a (first enantiomer to elute, labelled *R) and example 18b (second enantiomer to elute, labelled *S) Example 18a (*R)-4-(((4-oxochroman-7-yl)oxy)(2-(trifluoromethyl)pyridin-4-yl)methyl)benzamide.

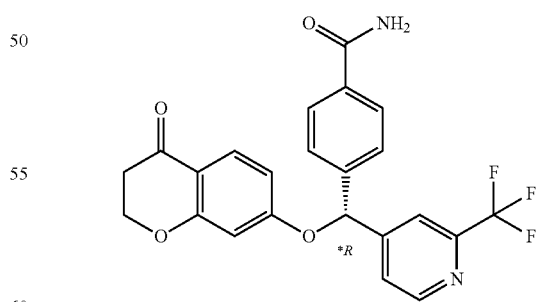

MS (ESI): mass calcd. for $C_{23}H_{17}F_3N_2O_4$ 442.11 m/z, found 442.9 [M+H]$^+$. $^1$H NMR (400 MHz, DMSO-d$_6$) δ 8.79 (d, J=5.0 Hz, 1H), 8.05 (s, 1H), 7.98 (s, 1H), 7.91-7.84 (m, 3H), 7.70 (d, J=8.8 Hz, 1H), 7.67 (d, J=8.3 Hz, 2H), 7.41 (s, 1H), 6.98 (s, 1H), 6.83 (dd, J=2.4, 8.9 Hz, 1H), 6.65 (d, J=2.3 Hz, 1H), 4.48 (t, J=6.4 Hz, 2H), 2.69 (t, J=6.3 Hz, 2H).

Example 18b (*S)-4-(((4-oxochroman-7-yl)oxy)(2-(trifluoromethyl)pyridin-4-yl)methyl)benzamide

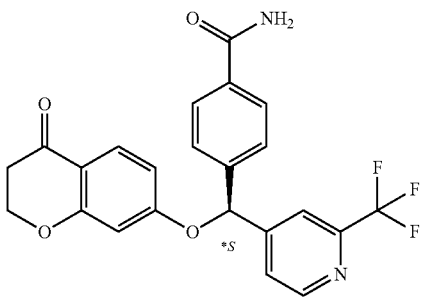 [SMILES: NC(=O)c1ccc([C@H](Oc2ccc3c(c2)OCCC3=O)c2ccnc(C(F)(F)F)c2)cc1]

MS (ESI): mass calcd. for C₂₃H₁₇F₃N₂O₄ 442.11 m/z, found 443.0 [M+H]⁺. ¹H NMR (400 MHz, DMSO-d₆) δ 8.79 (d, J=5.0 Hz, 1H), 8.05 (s, 1H), 7.97 (s, 1H), 7.90-7.84 (m, 3H), 7.69 (d, J=8.8 Hz, 1H), 7.66 (d, J=8.3 Hz, 2H), 7.40 (s, 1H), 6.97 (s, 1H), 6.83 (dd, J=2.3, 8.8 Hz, 1H), 6.65 (d, J=2.3 Hz, 1H), 4.48 (t, J=6.4 Hz, 2H), 2.69 (t, J=6.3 Hz, 2H).

Example 19: (R,S)-4-(((4-Oxochroman-7-yl)oxy)(3-(trifluoromethyl)pyridin-4-yl)methyl)benzamide

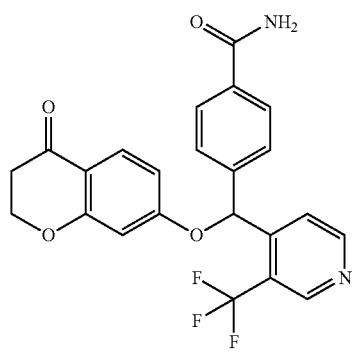 [SMILES: NC(=O)c1ccc(C(Oc2ccc3c(c2)OCCC3=O)c2ccncc2C(F)(F)F)cc1]

H₂O₂ (0.43 mL, 30% purity, 4.3 mmol) was added dropwise to a solution of 4-(((4-oxochroman-7-yl)oxy)(3-(trifluoromethyl)pyridin-4-yl)methyl)benzonitrile (Intermediate 16, 600 mg, 1.41 mmol), K₂CO₃ (489 mg, 3.54 mmol), and DMSO (5 mL). The mixture was stirred at room temperature for 1 hour before pouring it into saturated Na₂SO₃ (50 mL) and extracting with ethyl acetate (30 mL×3). The combined organic extracts were dried over anhydrous Na₂SO₄, filtered, and concentrated to dryness under reduced pressure to afford the product, which was purified by preparative HPLC using a Phenomenex Gemini 150 mm×25 mm, 10 μm column (eluent: 36% to 66% (v/v) CH₃CN and H₂O with 0.05% NH₃) to afford the title compound (380 mg, 61%) as a white solid. MS (ESI): mass calcd. for C₂₃H₁₇F₃N₂O₄ 442.11 m/z found 443.0 [M+H]⁺.

A sample of (R,S)-4-(((4-oxochroman-7-yl)oxy)(3-(trifluoromethyl)pyridin-4-yl)methyl)benzamide (380 mg, 0.859 mmol) was separated by chiral SFC (Chiralcel OD, 45% (v/v) supercritical CO₂ in EtOH and H₂O with 0.1% NH₃) to yield example 19a (first enantiomer to elute, labelled *R) and example 19b (second enantiomer to elute, labelled *S).

Example 19a (*R)-4-(((4-oxochroman-7-yl)oxy)(3-(trifluoromethyl)pyridin-4-yl)methyl)benzamide

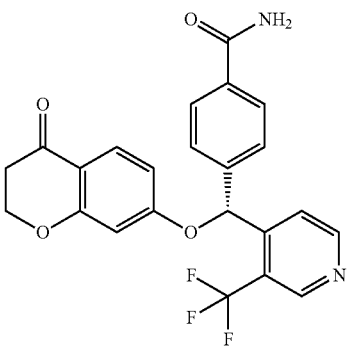 [SMILES: NC(=O)c1ccc([C@@H](Oc2ccc3c(c2)OCCC3=O)c2ccncc2C(F)(F)F)cc1]

MS (ESI): mass calcd. for C₂₃H₁₇F₃N₂O₄ 442.11 m/z found 442.9 [M+H]⁺. ¹H NMR (400 MHz, DMSO-d₆) δ 9.02 (s, 1H), 8.92 (d, J=5.3 Hz, 1H), 7.99 (s, 1H), 7.88 (d, J=8.2 Hz, 2H), 7.71 (d, J=5.1 Hz, 1H), 7.67 (d, J=8.8 Hz, 1H), 7.52 (d, J=8.4 Hz, 2H), 7.42 (s, 1H), 6.89 (s, 1H), 6.72 (dd, J=2.4, 8.8 Hz, 1H), 6.53 (d, J=2.4 Hz, 1H), 4.47 (t, J=6.5 Hz, 2H), 2.68 (t, J=6.4 Hz, 2H).

Example 19b (*S)-4-(((4-oxochroman-7-yl)oxy)(3-(trifluoromethyl)pyridin-4-yl)methyl)benzamide

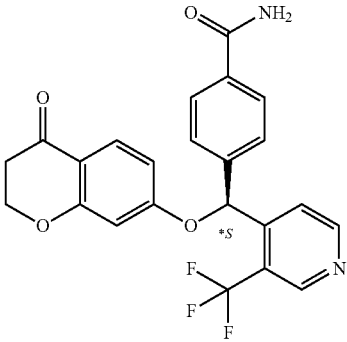 [SMILES: NC(=O)c1ccc([C@H](Oc2ccc3c(c2)OCCC3=O)c2ccncc2C(F)(F)F)cc1]

MS (ESI): mass calcd. for C₂₃H₁₇F₃N₂O₄ 442.11 m/z found 442.9 [M+H]⁺. ¹H NMR (400 MHz, DMSO-d₆) δ 9.02 (s, 1H), 8.92 (d, J=5.3 Hz, 1H), 8.00 (s, 1H), 7.88 (d, J=8.6 Hz, 2H), 7.71 (d, J=5.3 Hz, 1H), 7.68 (d, J=8.8 Hz, 1H), 7.52 (d, J=8.4 Hz, 2H), 7.43 (s, 1H), 6.89 (s, 1H), 6.72 (dd, J=2.4, 8.8 Hz, 1H), 6.53 (d, J=2.2 Hz, 1H), 4.47 (t, J=6.4 Hz, 2H), 2.72-2.64 (m, 2H).

Example 20: (R,S)-4-((3-Fluoropyridin-4-yl)((4-oxochroman-7-yl)oxy)methyl)benzamide

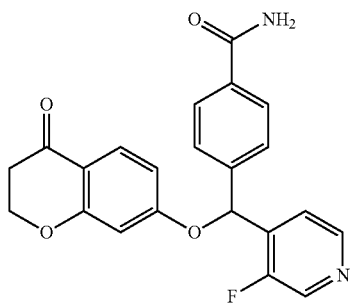 [SMILES: NC(=O)c1ccc(C(Oc2ccc3c(c2)OCCC3=O)c2ccncc2F)cc1]

H₂O₂ (0.25 mL, 30% purity, 2.5 mmol) was added dropwise to a solution of 4-((3-fluoropyridin-4-yl)((4-oxochroman-7-yl)oxy)methyl)benzonitrile (Intermediate 17, 640 mg), K₂CO₃ (280 mg, 2.03 mmol), and DMSO (4 mL). The mixture was stirred at room temperature for 1 hour before pouring it into saturated Na₂SO₃ (40 mL) and extracting with ethyl acetate (30 mL×3). The combined organic extracts were dried over anhydrous Na₂SO₄, filtered, and concentrated to dryness under reduced pressure to give the product, which was purified by FCC (eluent:petroleum ether:ethyl acetate, 1:0 to 0:1, gradient elution) to afford the title compound (260 mg) as a colorless oil. MS (ESI): mass calcd. for C₂₂H₁₇FN₂O₄ 392.12 m/z found 392.9 [M+H]⁺.

A sample of (R,S)-4-((3-fluoropyridin-4-yl)((4-oxochroman-7-yl)oxy)methyl)benzamide (240 mg, 0.612 mmol) was separated by SFC (Chiralpak AD, 45% (v/v) supercritical CO₂ in EtOH and H₂O with 0.1% NH₃) to yield example 20a (first enantiomer to elute, labelled *R) and example 20b (second enantiomer to elute, labelled *S).

Example 20a (*R)-4-((3-fluoropyridin-4-yl)((4-oxochroman-7-yl)oxy)methyl)benzamide

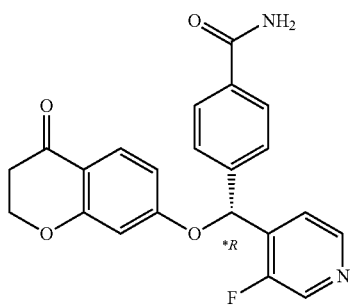 [SMILES: NC(=O)c1ccc([C@@H](Oc2ccc3c(c2)OCCC3=O)c2ccncc2F)cc1]

MS (ESI): mass calcd. for C₂₂H₁₇FN₂O₄ 392.12 m/z found 393.0 [M+H]⁺. ¹H NMR (400 MHz, DMSO-d₆) δ 8.56 (d, J=2.0 Hz, 1H), 8.46 (d, J=4.9 Hz, 1H), 7.94 (s, 1H), 7.84 (d, J=8.4 Hz, 2H), 7.65 (d, J=8.8 Hz, 1H), 7.64-7.61 (m, 1H), 7.57 (d, J=8.4 Hz, 2H), 7.37 (s, 1H), 6.97 (s, 1H), 6.78 (dd, J=2.4, 8.8 Hz, 1H), 6.63 (d, J=2.2 Hz, 1H), 4.45 (t, J=6.5 Hz, 2H), 2.66 (t, J=6.4 Hz, 2H).

Example 20b (*S)-4-((3-fluoropyridin-4-yl)((4-oxochroman-7-yl)oxy)methyl)benzamide

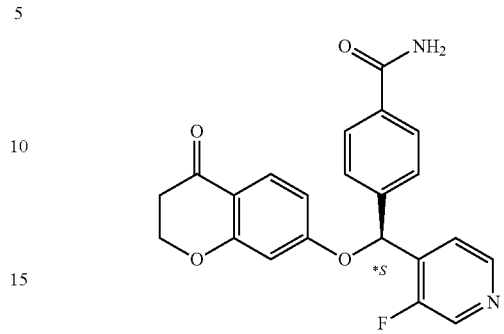

MS (ESI): mass calcd. for C₂₂H₁₇FN₂O₄ 392.12 m/z found 393.0 [M+H]⁺. ¹H NMR (400 MHz, DMSO-d₆) δ 8.56 (d, J=1.8 Hz, 1H), 8.46 (d, J=5.1 Hz, 1H), 7.94 (s, 1H), 7.84 (d, J=8.4 Hz, 2H), 7.65 (d, J=8.8 Hz, 1H), 7.64-7.61 (m, 1H), 7.57 (d, J=8.4 Hz, 2H), 7.37 (s, 1H), 6.97 (s, 1H), 6.78 (dd, J=2.5, 8.9 Hz, 1H), 6.63 (d, J=2.4 Hz, 1H), 4.45 (t, J=6.4 Hz, 2H), 2.66 (t, J=6.4 Hz, 2H).

Example 21: (R,S)-4-((3-Methylpyridin-4-yl)((4-oxochroman-7-yl)oxy)methyl)benzamide

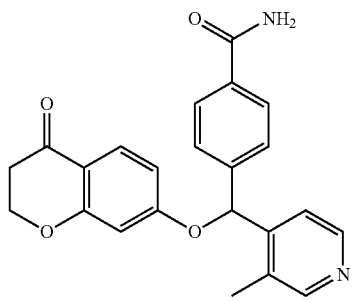 [SMILES: Cc1cnccc1C(Oc1ccc2c(c1)OCCC2=O)c1ccc(C(N)=O)cc1]

H₂O₂ (1.0 mL, 30% purity, 10 mmol) was added dropwise to a solution of 4-((3-methylpyridin-4-yl)((4-oxochroman-7-yl)oxy)methyl)benzonitrile (Intermediate 18, 1.6 g), K₂CO₃ (1.1 g, 8.0 mmol), and DMSO (6 mL). The mixture was stirred at room temperature for 0.5 hours before pouring it into saturated Na₂SO₃ (30 mL) and extracting with ethyl acetate (30 mL×3). The combined organic extracts were dried over anhydrous Na₂SO₄, filtered, and concentrated to dryness under reduced pressure to give the product, which was purified by FCC (eluent:petroleum ether:ethyl acetate, 1:0 to 0:1, gradient elution) to afford the title compound (750 mg) as a colorless oil. MS (ESI): mass calcd. for C₂₃H₂₀N₂O₄ 388.14 m/z found 389.1 [M+H]⁺.

A sample of (R,S)-4-((3-methylpyridin-4-yl)((4-oxochroman-7-yl)oxy)methyl)benzamide (300 mg, 0.772 mmol) was separated by SFC over Chiralpak AD (40% (v/v) supercritical CO₂ in EtOH and H₂O with 0.1% NH₃) to yield example 21a (first enantiomer to elute, labelled *R) and example 21b (second enantiomer to elute, labelled *S).

Example 21a (*R)-4-((3-Methylpyridin-4-yl)((4-oxochroman-7-yl)oxy)methyl)benzamide

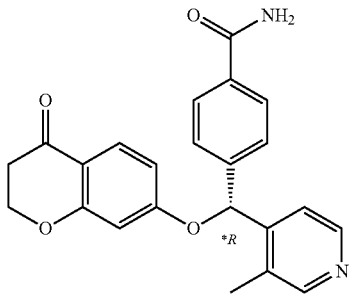 [SMILES: Cc1cnccc1[C@H](Oc1ccc2c(c1)OCCC2=O)c1ccc(C(N)=O)cc1]

MS (ESI): mass calcd. for $C_{23}H_{20}N_2O_4$ 388.14 m/z found 389.0 $[M+H]^+$. $^1$H NMR (400 MHz, DMSO-$d_6$) δ 8.43 (d, J=5.1 Hz, 1H), 8.40 (s, 1H), 7.96 (s, 1H), 7.87 (d, J=8.6 Hz, 2H), 7.67 (d, J=8.8 Hz, 1H), 7.54 (d, J=8.4 Hz, 2H), 7.39 (d, J=4.9 Hz, 2H), 6.84 (s, 1H), 6.76 (dd, J=2.4, 8.8 Hz, 1H), 6.60 (d, J=2.4 Hz, 1H), 4.47 (t, J=6.4 Hz, 2H), 2.68 (t, J=6.4 Hz, 2H), 2.30 (s, 3H).

Example 21b (*S)-4-((3-Methylpyridin-4-yl)((4-oxochroman-7-yl)oxy)methyl)benzamide

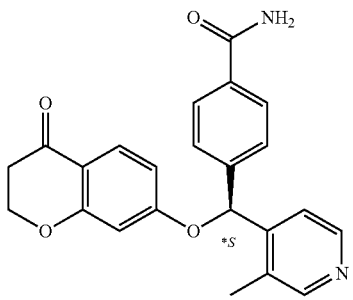 [SMILES: Cc1cnccc1[C@@H](Oc1ccc2c(c1)OCCC2=O)c1ccc(C(N)=O)cc1]

MS (ESI): mass calcd. for $C_{23}H_{20}N_2O_4$ 388.14 m/z found 389.0 $[M+H]^+$. $^1$H NMR (400 MHz, DMSO-$d_6$) δ 8.43 (d, J=5.1 Hz, 1H), 8.40 (s, 1H), 7.96 (s, 1H), 7.87 (d, J=8.4 Hz, 2H), 7.67 (d, J=8.8 Hz, 1H), 7.54 (d, J=8.4 Hz, 2H), 7.39 (d, J=5.1 Hz, 2H), 6.83 (s, 1H), 6.76 (dd, J=2.4, 8.8 Hz, 1H), 6.60 (d, J=2.2 Hz, 1H), 4.47 (t, J=6.4 Hz, 2H), 2.68 (t, J=6.4 Hz, 2H), 2.30 (s, 3H).

Example 22: (R,S)-4-(((4-Oxochroman-7-yl)oxy)(quinolin-4-yl)methyl)benzamide

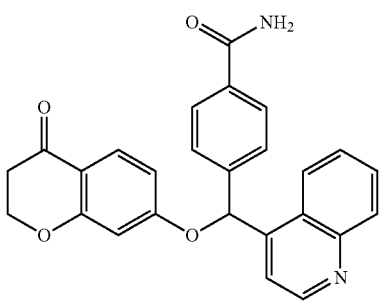 [SMILES: NC(=O)c1ccc(C(Oc2ccc3c(c2)OCCC3=O)c2ccnc3ccccc23)cc1]

$H_2O_2$ (0.26 mL, 30% purity, 2.6 mmol) was added dropwise to a solution of 4-(((4-oxochroman-7-yl)oxy)(quinolin-4-yl)methyl)benzonitrile (Intermediate 19, 500 mg, 0.861 mmol), $K_2CO_3$ (298 mg, 2.16 mmol), and DMSO (2 mL). The mixture was heated at 40° C. for 1 hour before cooling to room temperature, pouring it into saturated $Na_2SO_3$ (30 mL), and extracting with ethyl acetate (30 mL×3). The combined organic extracts were dried over anhydrous $Na_2SO_4$, filtered, and concentrated to dryness under reduced pressure to afford the product, which was purified by FCC (eluent:petroleum ether:ethyl acetate, 1:0 to 0:1, gradient elution) to afford the title compound.

A sample of (R,S)-4-(((4-oxochroman-7-yl)oxy)(quinolin-4-yl)methyl)benzamide was separated by SFC (Chiralpak AD, 45% (v/v) supercritical $CO_2$ in EtOH and $H_2O$ with 0.1% $NH_3$) to yield example 22a (first enantiomer to elute, labelled *R) and example 22b (second enantiomer to elute, labelled *S).

Example 22a (*R)-4-(((4-oxochroman-7-yl)oxy)(quinolin-4-yl)methyl)benzamide

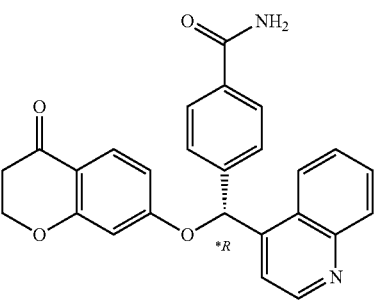 [SMILES: NC(=O)c1ccc([C@@H](Oc2ccc3c(c2)OCCC3=O)c2ccnc3ccccc23)cc1]

MS (ESI): mass calcd. for $C_{26}H_{20}N_2O_4$ 424.14 m/z found 425.0 $[M+H]^+$. $^1$H NMR (400 MHz, DMSO-$d_6$) δ 8.92 (d, J=4.4 Hz, 1H), 8.37 (d, J=8.6 Hz, 1H), 8.07-8.02 (m, 1H), 7.91 (s, 1H), 7.82 (d, J=8.4 Hz, 2H), 7.78-7.73 (m, 1H), 7.69-7.60 (m, 5H), 7.52 (s, 1H), 7.35 (s, 1H), 6.80 (dd, J=2.4, 8.8 Hz, 1H), 6.67 (d, J=2.2 Hz, 1H), 4.43 (t, J=6.4 Hz, 2H), 2.64 (t, J=6.3 Hz, 2H).

Example 22b (*S)-4-(((4-oxochroman-7-yl)oxy)(quinolin-4-yl)methyl)benzamide

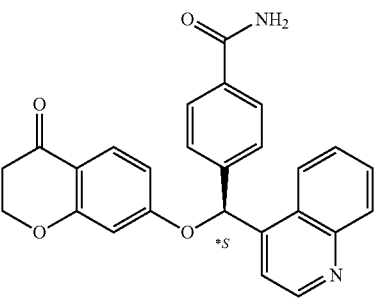 [SMILES: NC(=O)c1ccc([C@H](Oc2ccc3c(c2)OCCC3=O)c2ccnc3ccccc23)cc1]

MS (ESI): mass calcd. for $C_{26}H_{20}N_2O_4$ 424.14 m/z found 425.0 $[M+H]^+$. $^1$H NMR (400 MHz, DMSO-$d_6$) δ 8.92 (d, J=4.6 Hz, 1H), 8.37 (d, J=7.9 Hz, 1H), 8.07-8.02 (m, 1H), 7.91 (s, 1H), 7.82 (d, J=8.6 Hz, 2H), 7.78-7.73 (m, 1H), 7.70-7.61 (m, 5H), 7.51 (s, 1H), 7.35 (s, 1H), 6.80 (dd, J=2.4, 8.8 Hz, 1H), 6.67 (d, J=2.2 Hz, 1H), 4.43 (t, J=6.3 Hz, 2H), 2.64 (t, J=6.4 Hz, 2H).

Example 23: (R,S)-4-((3-Methoxypyridin-4-yl)((4-oxochroman-7-yl)oxy)methyl)benzamide

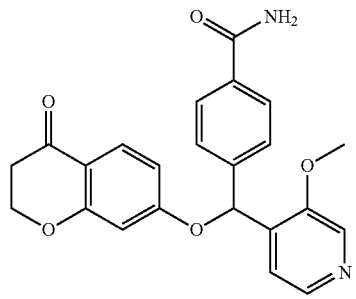 [SMILES: COc1cnccc1C(Oc1ccc2c(c1)OCCC2=O)c1ccc(C(N)=O)cc1]

H$_2$O$_2$ (0.2 mL, 30% purity, 2.0 mmol) was added dropwise to a solution of 4-((3-methoxypyridin-4-yl)((4-oxochroman-7-yl)oxy)methyl)benzonitrile (Intermediate 20, 300 mg, 89% purity, 0.691 mmol), K$_2$CO$_3$ (239 mg, 1.73 mmol), and DMSO (3 mL). The mixture was stirred at room temperature for 1 hour before pouring it into saturated Na$_2$SO$_3$ (30 mL) and extracting with ethyl acetate (30 mL×3). The combined organic extracts were dried over anhydrous Na$_2$SO$_4$, filtered, and concentrated to dryness under reduced pressure to afford the product, which was purified by FCC (eluent:petroleum ether:ethyl acetate, 1:0 to 0:1, gradient elution) to afford the title compound (180 mg, 64%) as a colorless oil. MS (ESI): mass calcd. for C$_{23}$H$_{20}$N$_2$O$_5$ 404.14 m/z found 405.1 [M+H]$^+$.

A sample of (R,S)-4-((3-methoxypyridin-4-yl)((4-oxochroman-7-yl)oxy)methyl)benzamide (180 mg, 0.445 mmol) was separated by SFC (Chiralpak OJ, 40% (v/v) supercritical CO$_2$ in MeOH and H$_2$O with 0.1% NH$_3$) to yield example 23a (first enantiomer to elute, labelled *R) and example 23b (second enantiomer to elute, labelled *S).

Example 23a (*R)-4-((3-methoxypyridin-4-yl)((4-oxochroman-7-yl)oxy)methyl)benzamide

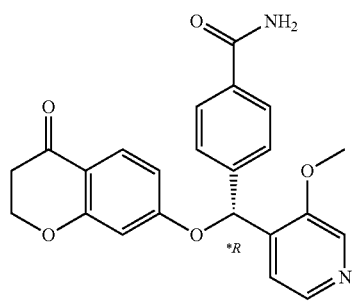 [SMILES: COc1cnccc1[C@H](Oc1ccc2c(c1)OCCC2=O)c1ccc(C(N)=O)cc1]

MS (ESI): mass calcd. for C$_{23}$H$_{20}$N$_2$O$_5$ 404.14 m/z found 405.0 [M+H]$^+$. $^1$H NMR (400 MHz, DMSO-d$_6$) δ 8.39 (s, 1H), 8.21 (d, J=4.9 Hz, 1H), 7.92 (s, 1H), 7.81 (d, J=8.6 Hz, 2H), 7.64 (d, J=8.8 Hz, 1H), 7.53 (d, J=8.2 Hz, 2H), 7.41 (d, J=4.9 Hz, 1H), 7.35 (s, 1H), 6.75 (s, 1H), 6.71 (dd, J=2.3, 8.9 Hz, 1H), 6.48 (d, J=2.2 Hz, 1H), 4.44 (t, J=6.4 Hz, 2H), 3.94 (s, 3H), 2.65 (t, J=6.4 Hz, 2H).

Example 23b (*S)-4-((3-methoxypyridin-4-yl)((4-oxochroman-7-yl)oxy)methyl)benzamide

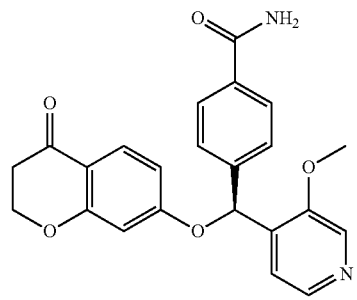 [SMILES: COc1cnccc1[C@@H](Oc1ccc2c(c1)OCCC2=O)c1ccc(C(N)=O)cc1]

MS (ESI): mass calcd. for C$_{23}$H$_{20}$N$_2$O$_5$ 404.14 m/z found 405.0 [M+H]$^+$. $^1$H NMR (400 MHz, DMSO-d$_6$) δ 8.38 (s, 1H), 8.21 (d, J=4.9 Hz, 1H), 7.93 (s, 1H), 7.81 (d, J=8.4 Hz, 2H), 7.64 (d, J=8.8 Hz, 1H), 7.53 (d, J=8.4 Hz, 2H), 7.41 (d, J=4.9 Hz, 1H), 7.35 (s, 1H), 6.75 (s, 1H), 6.71 (dd, J=2.4, 8.8 Hz, 1H), 6.47 (d, J=2.2 Hz, 1H), 4.43 (t, J=6.4 Hz, 2H), 3.94 (s, 3H), 2.65 (t, J=6.4 Hz, 2H).

Example 24: (R,S)-4-((2-Methoxypyridin-4-yl)((4-oxochroman-7-yl)oxy)methyl)benzamide

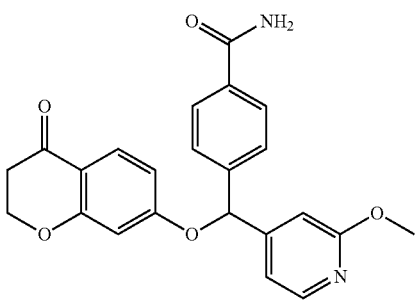 [SMILES: COc1cc(C(Oc2ccc3c(c2)OCCC3=O)c2ccc(C(N)=O)cc2)ccn1]

H$_2$O$_2$ (180 μL, 30% purity, 1.79 mmol) was added dropwise to a solution of 4-((2-methoxypyridin-4-yl)((4-oxochroman-7-yl)oxy)methyl)benzonitrile (295 mg, 0.763 mmol), K$_2$CO$_3$ (200 mg, 1.45 mmol), and DMSO (2 mL). The mixture was stirred at room temperature for 1 hour. The mixture was directly purified by preparative HPLC using a Phenomenex Gemini 150 mm×25 mm×10 μm column (eluent: 50% to 80% (v/v) CH$_3$CN and H$_2$O with 0.05% NH$_3$) to afford the title compound (190 mg, 61%) as a white solid. MS (ESI): mass calcd. for C$_{23}$H$_{20}$N$_2$O$_5$ 404.14 m/z found 405.0 [M+H]$^+$.

A sample of (R,S)-4-((2-methoxypyridin-4-yl)((4-oxochroman-7-yl)oxy)methyl)benzamide (190 mg, 0.470 mmol) was separated by SFC (Chiralcel OD, 40% (v/v) supercritical CO$_2$ in EtOH and H$_2$O with 0.1% NH$_3$) to yield example 24a (first enantiomer to elute, labelled *R) and example 24b (second enantiomer to elute, labelled *S).

Example 24a (*R)-4-((2-methoxypyridin-4-yl)((4-oxochroman-7-yl)oxy)methyl)benzamide

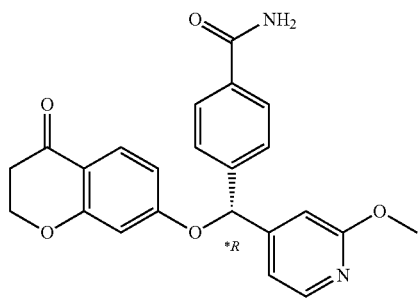 [SMILES: COc1cc([C@H](Oc2ccc3c(c2)OCCC3=O)c2ccc(C(N)=O)cc2)ccn1]

MS (ESI): mass calcd. for $C_{23}H_{20}N_2O_5$ 404.14 m/z found 405.0 [M+H]$^+$. $^1$H NMR (400 MHz, DMSO-d$_6$) δ 8.10 (d, J=5.2 Hz, 1H), 7.91 (br s, 1H), 7.81 (d, J=8.4 Hz, 2H), 7.64 (d, J=8.8 Hz, 1H), 7.56 (d, J=8.0 Hz, 2H), 7.34 (br s, 1H), 7.05 (d, J=5.2 Hz, 1H), 6.92 (s, 1H), 6.79-6.70 (m, 2H), 6.61-6.53 (m, 1H), 4.43 (t, J=6.4 Hz, 2H), 3.78 (s, 3H), 2.64 (t, J=6.4 Hz, 2H).

Example 24b (*S)-4-((2-methoxypyridin-4-yl)((4-oxochroman-7-yl)oxy)methyl)benzamide

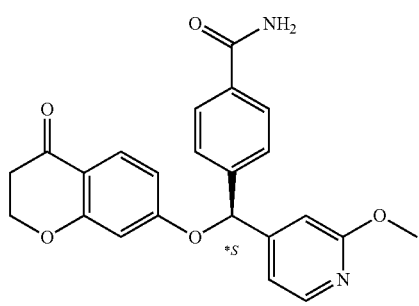 [SMILES: COc1cc([C@@H](Oc2ccc3c(c2)OCCC3=O)c2ccc(C(N)=O)cc2)ccn1]

MS (ESI): mass calcd. for $C_{23}H_{20}N_2O_5$ 404.42 m/z found 405.0 [M+H]$^+$. $^1$H NMR (400 MHz, DMSO-d$_6$) δ 8.10 (d, J=5.2 Hz, 1H), 7.91 (br s, 1H), 7.81 (d, J=8.2 Hz, 2H), 7.64 (d, J=8.8 Hz, 1H), 7.56 (d, J=8.2 Hz, 2H), 7.34 (br s, 1H), 7.05 (d, J=5.2 Hz, 1H), 6.92 (s, 1H), 6.77-6.70 (m, 2H), 6.57 (s, 1H), 4.43 (t, J=6.0 Hz, 2H), 3.78 (s, 3H), 2.64 (t, J=6.4 Hz, 2H).

Example 25: (R,S)-4-(((4-Oxochroman-7-yl)oxy)(3-phenylpyridin-4-yl)methyl)benzamide

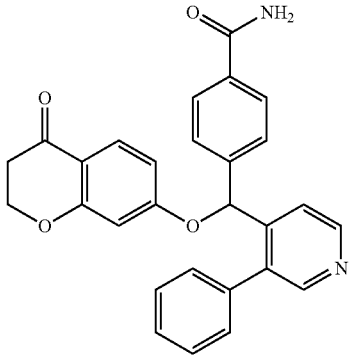 [SMILES: NC(=O)c1ccc(C(Oc2ccc3c(c2)OCCC3=O)c2ccncc2-c2ccccc2)cc1]

4-((3-Bromopyridin-4-yl)((4-oxochroman-7-yl)oxy)methyl)benzamide (Intermediate 22, 500 mg, 1.10 mmol), phenylboronic acid (269 mg, 2.21 mmol), and K$_3$PO$_4$ (702 mg, 3.31 mmol) were dissolved in 1,4-dioxane (10 mL) and H$_2$O (2 mL). The mixture was sparged with Ar for 5 minutes and then treated with Pd(dtbpf)Cl$_2$ (72 mg, 0.11 mmol). The mixture was sparged with Ar for another 5 minutes and then stirred while heating at 100° C. via microwave irradiation for 1 hour before cooling to room temperature, pouring it into H$_2$O (30 mL), and extracting with ethyl acetate (30 mL×3). The combined organic extracts were concentrated to dryness under reduced pressure to afford the product, which was purified by preparative HPLC using a Gemini 150 mm×25 mm, 5 μm column (eluent: 30% to 60% (v/v) CH$_3$CN and H$_2$O with 0.05% NH$_3$) to afford the title compound (380 mg, 76%) as a white solid. MS (ESI): mass calcd. for $C_{28}H_{22}N_2O_4$ 450.16 m/z found 451.1 [M+H]$^+$.

A sample of (R,S)-4-(((4-oxochroman-7-yl)oxy)(3-phenylpyridin-4-yl)methyl)benzamide (360 mg, 0.799 mmol) was separated by SFC (Chiralpak AS, 50% (v/v) supercritical CO$_2$ in EtOH and H$_2$O with 0.1% NH$_3$) to yield example 25a (first enantiomer to elute, labelled *R) and example 25b (second enantiomer to elute, labelled *S).

Example 25a (*R)-4-(((4-oxochroman-7-yl)oxy)(3-phenylpyridin-4-yl)methyl)benzamide

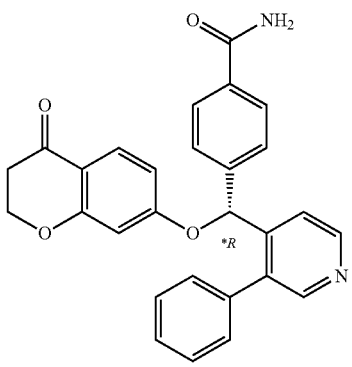 [SMILES: NC(=O)c1ccc([C@@H](Oc2ccc3c(c2)OCCC3=O)c2ccncc2-c2ccccc2)cc1]

MS (ESI): mass calcd. for $C_{28}H_{22}N_2O_4$ 450.16 m/z found 451.0 [M+H]$^+$. $^1$H NMR (400 MHz, DMSO-d$_6$) δ 8.69 (d, J=5.3 Hz, 1H), 8.53 (s, 1H), 8.02 (s, 1H), 7.84 (d, J=8.4 Hz, 2H), 7.68 (d, J=8.8 Hz, 1H), 7.58 (d, J=5.1 Hz, 1H), 7.54-7.49 (m, 3H), 7.45 (s, 1H), 7.37-7.31 (m, 2H), 7.25 (d, J=8.4 Hz, 2H), 6.62 (dd, J=2.4, 8.8 Hz, 1H), 6.58 (s, 1H), 6.36 (d, J=2.4 Hz, 1H), 4.50 (t, J=6.4 Hz, 2H), 2.76-2.69 (m, 2H).

Example 25b (*S)-4-(((4-oxochroman-7-yl)oxy)(3-phenylpyridin-4-yl)methyl)benzamide

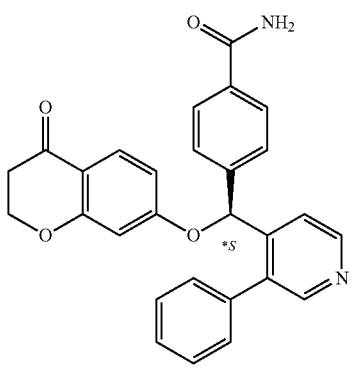 [SMILES: NC(=O)c1ccc([C@H](Oc2ccc3c(c2)OCCC3=O)c2ccncc2-c2ccccc2)cc1]

MS (ESI): mass calcd. for C$_{28}$H$_{22}$N$_2$O$_4$ 450.16 m/z found 451.0 [M+H]$^+$. $^1$H NMR (400 MHz, DMSO-d$_6$) δ 8.69 (d, J=5.1 Hz, 1H), 8.55-8.50 (m, 1H), 8.02 (s, 1H), 7.84 (d, J=8.4 Hz, 2H), 7.68 (d, J=8.8 Hz, 1H), 7.58 (d, J=5.3 Hz, 1H), 7.54-7.49 (m, 3H), 7.46 (s, 1H), 7.37-7.32 (m, 2H), 7.25 (d, J=8.4 Hz, 2H), 6.62 (dd, J=2.4, 8.8 Hz, 1H), 6.58 (s, 1H), 6.36 (d, J=2.4 Hz, 1H), 4.50 (t, J=6.5 Hz, 2H), 2.75-2.69 (m, 2H).

Example 26: (R,S)-4-(((4-Oxochroman-7-yl)oxy)(2-phenylpyridin-4-yl)methyl)benzamide

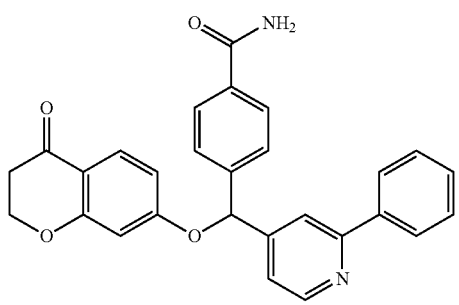 [SMILES: NC(=O)c1ccc(C(Oc2ccc3c(c2)OCCC3=O)c2ccnc(-c3ccccc3)c2)cc1]

H$_2$O$_2$ (0.70 mL, 30% purity, 7.0 mmol) was added dropwise to a solution of 4-(((4-oxochroman-7-yl)oxy)(2-phenylpyridin-4-yl)methyl)benzonitrile (Intermediate 23, 1.1 g, 2.5 mmol), K$_2$CO$_3$ (1.1 g, 8.0 mmol), and DMSO (5 mL). The mixture was stirred at room temperature for 1 hour before pouring it into H$_2$O (20 mL) and extracting with ethyl acetate (20 mL×3). The combined organic extracts were dried over anhydrous Na$_2$SO$_4$, filtered, and concentrated to dryness under reduced pressure to afford the product, which was purified by preparative HPLC using a Phenomenex Gemini C18 250 mm×50 mm×10 μm column (eluent: 25% to 55% (v/v) CH$_3$CN and H$_2$O with 0.225% HCOOH) to afford the title compound (400 mg, 35%) as a white solid. MS (ESI): mass calcd. for C$_{28}$H$_{22}$N$_2$O$_4$ 450.16 m/z, found 451.1 [M+H]$^+$.

A sample of (R,S)-4-(((4-oxochroman-7-yl)oxy)(2-phenylpyridin-4-yl)methyl)benzamide (400 mg, 0.888 mmol) was separated by SFC (Chiralcel OD, 55% (v/v) supercritical CO$_2$ in EtOH and H$_2$O with 0.1% NH$_3$) to yield example 26a (first enantiomer to elute, labelled *R) and example 26b (second enantiomer to elute, labelled *S).

Example 26a (*R)-4-(((4-oxochroman-7-yl)oxy)(2-phenylpyridin-4-yl)methyl)benzamide

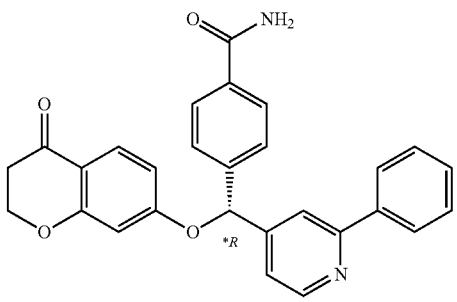 [SMILES: NC(=O)c1ccc([C@@H](Oc2ccc3c(c2)OCCC3=O)c2ccnc(-c3ccccc3)c2)cc1]

MS (ESI): mass calcd. for C$_{28}$H$_{22}$N$_2$O$_4$ 450.16 m/z, found 451.0 [M+H]$^+$. $^1$H NMR (400 MHz, DMSO-d$_6$) δ 8.62 (d, J=4.8 Hz, 1H), 8.09 (s, 1H), 8.05-7.99 (m, 2H), 7.92 (br s, 1H), 7.84 (d, J=8.4 Hz, 2H), 7.66 (d, J=8.8 Hz, 3H), 7.51-7.39 (m, 4H), 7.35 (br s, 1H), 6.84-6.78 (m, 2H), 6.65-6.60 (m, 1H), 4.43 (t, J=6.3 Hz, 2H), 2.64 (t, J=6.3 Hz, 2H).

Example 26b (*S)-4-(((4-oxochroman-7-yl)oxy)(2-phenylpyridin-4-yl)methyl)benzamide

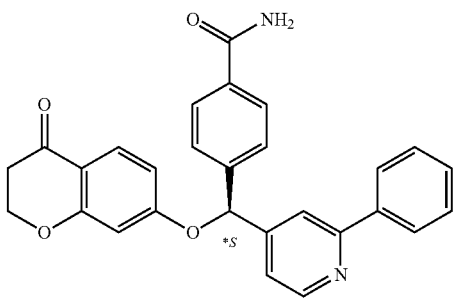 [SMILES: NC(=O)c1ccc([C@H](Oc2ccc3c(c2)OCCC3=O)c2ccnc(-c3ccccc3)c2)cc1]

MS (ESI): mass calcd. for C$_{28}$H$_{22}$N$_2$O$_4$ 450.16 m/z, found 451.0 [M+H]$^+$. $^1$H NMR (400 MHz, DMSO-d$_6$) δ 8.61 (d, J=5.2 Hz, 1H), 8.09 (s, 1H), 8.04-8.00 (m, 2H), 7.92 (s, 1H), 7.83 (d, J=8.0 Hz, 2H), 7.65 (d, J=8.8 Hz, 3H), 7.51-7.39 (m, 4H), 7.34 (br s, 1H), 6.85-6.78 (m, 2H), 6.65-6.60 (m, 1H), 4.43 (t, J=6.3 Hz, 2H), 2.64 (t, J=6.3 Hz, 2H).

Example 27: (R,S)-4-((3-Aminopyridin-4-yl)((4-oxochroman-7-yl)oxy)methyl)benzamide

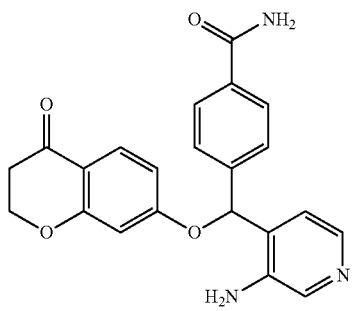 [SMILES: NC(=O)c1ccc(C(Oc2ccc3c(c2)OCCC3=O)c2ccncc2N)cc1]

H$_2$O$_2$ (0.12 mL, 30% purity, 1.2 mmol) was added dropwise to a solution of 4-((3-aminopyridin-4-yl)((4-oxochroman-7-yl)oxy)methyl)benzonitrile (Intermediate 24, 150 mg), K$_2$CO$_3$ (167 mg, 1.21 mmol), and DMSO (3 mL). The mixture was stirred at room temperature for 2 hours before quenching with saturated Na$_2$SO$_3$ (20 mL) and extracting with ethyl acetate (30 mL×3). The combined organic extracts were dried over anhydrous Na$_2$SO$_4$, filtered, and concentrated to dryness under reduced pressure to afford the compound. The product was purified by preparative HPLC using a Gemini 150 mm×25 mm×5 µm column (eluent: 15% to 45% (v/v) CH$_3$CN and H$_2$O with 0.05% NH$_3$) to afford the title compound (60 mg) as a white solid. MS (ESI): mass calcd. for C$_{22}$H$_{19}$N$_3$O$_4$ 389.14 m/z found 390.0 [M+H]$^+$.

A sample of (R,S)-4-((3-aminopyridin-4-yl)((4-oxochroman-7-yl)oxy)methyl)benzamide was separated by SFC (Chiralpak AD, 55% (v/v) supercritical CO$_2$ in EtOH and H$_2$O with 0.1% NH$_3$) to yield example 27a (first enantiomer to elute, labelled *R) and example 27b (second enantiomer to elute, labelled *S).

Example 27a (*R)-4-((3-aminopyridin-4-yl)((4-oxochroman-7-yl)oxy)methyl)benzamide

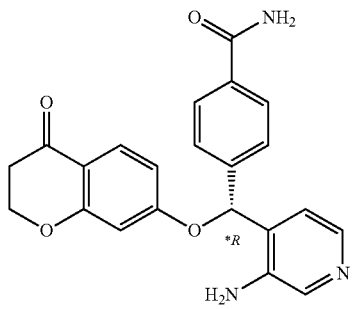 [SMILES: NC(=O)c1ccc([C@@H](Oc2ccc3c(c2)OCCC3=O)c2ccncc2N)cc1]

MS (ESI): mass calcd. for C$_{22}$H$_{19}$N$_3$O$_4$ 389.14 m/z found 390.0 [M+H]$^+$. $^1$H NMR (400 MHz, DMSO-d$_6$) δ 7.97 (d, J=18.0 Hz, 2H), 7.84 (d, J=8.4 Hz, 2H), 7.75 (d, J=4.9 Hz, 1H), 7.67 (d, J=8.8 Hz, 1H), 7.57 (d, J=8.4 Hz, 2H), 7.37 (s, 1H), 7.19 (d, J=5.1 Hz, 1H), 6.79-6.75 (m, 1H), 6.75 (s, 1H), 6.58 (d, J=2.4 Hz, 1H), 5.60 (s, 2H), 4.47 (t, J=6.4 Hz, 2H), 2.67 (t, J=6.4 Hz, 2H).

Example 27b (*S)-4-((3-aminopyridin-4-yl)((4-oxochroman-7-yl)oxy)methyl)benzamide

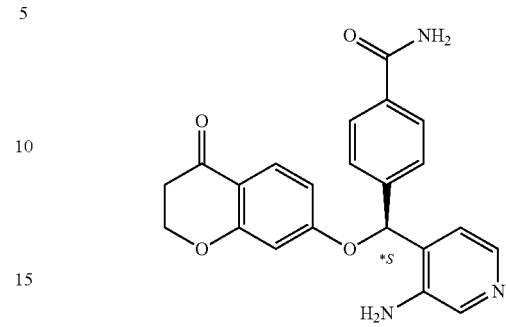

MS (ESI): mass calcd. for C$_{22}$H$_{19}$N$_3$O$_4$ 389.14 m/z found 390.0 [M+H]$^+$. $^1$H NMR (400 MHz, DMSO-d$_6$) δ 7.97 (d, J=19.2 Hz, 2H), 7.84 (d, J=8.4 Hz, 2H), 7.75 (d, J=4.0 Hz, 1H), 7.67 (d, J=8.8 Hz, 1H), 7.57 (d, J=8.2 Hz, 2H), 7.37 (s, 1H), 7.19 (d, J=5.1 Hz, 1H), 6.79-6.75 (m, 1H), 6.75 (s, 1H), 6.58 (d, J=2.2 Hz, 1H), 5.60 (s, 2H), 4.47 (t, J=6.4 Hz, 2H), 2.67 (t, J=6.3 Hz, 2H).

Example 28: (R,S)-4-((2-Aminopyridin-4-yl)((4-oxochroman-7-yl)oxy)methyl)benzamide

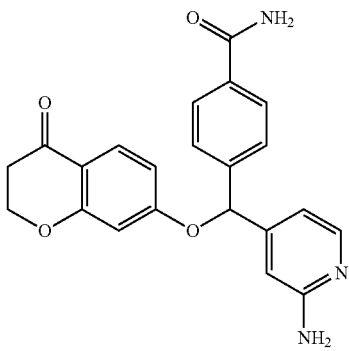 [SMILES: NC(=O)c1ccc(C(Oc2ccc3c(c2)OCCC3=O)c2ccnc(N)c2)cc1]

H$_2$O$_2$ (0.1 mL, 30% purity, 1 mmol) was added dropwise to a solution of 4-((2-aminopyridin-4-yl)((4-oxochroman-7-yl)oxy)methyl)benzonitrile (Intermediate 25, 310 mg), K$_2$CO$_3$ (115 mg, 0.832 mmol), and DMSO (3 mL). The mixture was stirred at room temperature for 2 hours before pouring it into saturated Na$_2$SO$_3$ (30 mL) and extracting with ethyl acetate (30 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 0:1, gradient elution) to afford the title compound (47 mg) as a colorless oil. MS (ESI): mass calcd. for C$_{22}$H$_{19}$N$_3$O$_4$ 389.14 m/z found 390.2 [M+H]$^+$.

A sample of (R,S)-4-((2-aminopyridin-4-yl)((4-oxochroman-7-yl)oxy)methyl)benzamide was separated by SFC (Chiralpak OJ, 40% (v/v) supercritical CO$_2$ in MeOH and H$_2$O with 0.1% NH$_3$) to yield example 28a (first enantiomer to elute, labelled *R) and example 28b (second enantiomer to elute, labelled *S).

Example 28a (*R)-4-((2-aminopyridin-4-yl)((4-oxochroman-7-yl)oxy)methyl)benzamide

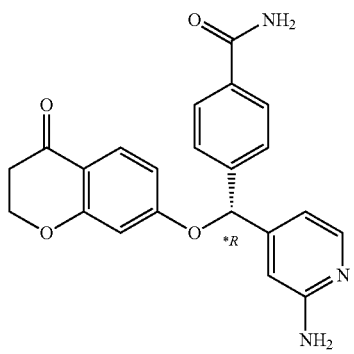 [SMILES: NC(=O)c1ccc([C@@H](Oc2ccc3c(c2)OCCC3=O)c2ccnc(N)c2)cc1]

MS (ESI): mass calcd. for $C_{22}H_{19}N_3O_4$ 389.14 m/z found 390.0 [M+H]$^+$. $^1$H NMR (400 MHz, DMSO-$d_6$) δ 7.95 (s, 1H), 7.87-7.82 (m, 3H), 7.67 (d, J=8.8 Hz, 1H), 7.54 (d, J=8.0 Hz, 2H), 7.37 (s, 1H), 6.75 (dd, J=2.3, 8.8 Hz, 1H), 6.59-6.54 (m, 3H), 6.50 (s, 1H), 5.99 (s, 2H), 4.46 (t, J=6.1 Hz, 2H), 2.70-2.66 (m, 2H).

Example 28b (*S)-4-((2-aminopyridin-4-yl)((4-oxochroman-7-yl)oxy)methyl)benzamide

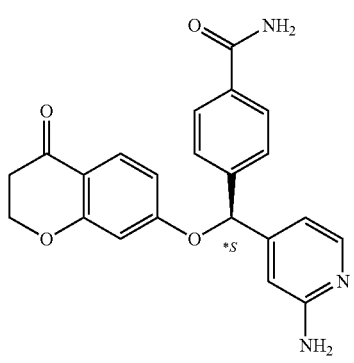 [SMILES: NC(=O)c1ccc([C@H](Oc2ccc3c(c2)OCCC3=O)c2ccnc(N)c2)cc1]

MS (ESI): mass calcd. for $C_{22}H_{19}N_3O_4$ 389.14 m/z found 390.0 [M+H]$^+$. $^1$H NMR (400 MHz, DMSO-$d_6$) δ 7.95 (s, 1H), 7.88-7.81 (m, 3H), 7.67 (d, J=8.8 Hz, 1H), 7.54 (d, J=8.0 Hz, 2H), 7.37 (s, 1H), 6.75 (dd, J=2.3, 8.8 Hz, 1H), 6.60-6.54 (m, 3H), 6.51 (s, 1H), 5.99 (s, 2H), 4.46 (t, J=6.3 Hz, 2H), 2.70-2.66 (m, 2H).

Example 29: (R,S)-4-(((4-Oxochroman-7-yl)oxy)(phenyl)methyl)benzamide

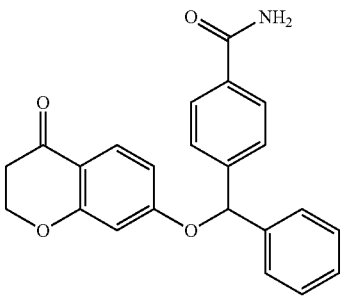 [SMILES: NC(=O)c1ccc(C(Oc2ccc3c(c2)OCCC3=O)c2ccccc2)cc1]

H$_2$O$_2$ (0.36 mL, 30% purity, 3.6 mmol) was added dropwise to a solution of 4-(((4-oxochroman-7-yl)oxy)(phenyl)methyl)benzonitrile (400 mg, 1.13 mmol), K$_2$CO$_3$ (389 mg, 2.82 mmol), and DMSO (6 mL). The mixture was stirred at room temperature for 1 hour before pouring into H$_2$O (20 mL) and extracting with ethyl acetate (20 mL×3). The combined organic extracts were dried over anhydrous Na$_2$SO$_4$, filtered, and concentrated to dryness under reduced pressure to afford the product, which was purified by preparative HPLC using a Gemini C18, 150 mm×25 mm×10 µm column (eluent: 35% to 65% (v/v) CH$_3$CN and H$_2$O with 0.05% NH$_3$) to afford the title compound (250 mg, 59%) as a white solid. MS (ESI): mass calcd. for $C_{23}H_{19}NO_4$ 373.13 m/z found 396.1 [M+Na]$^+$. $^1$H NMR (400 MHz, DMSO-$d_6$) δ 7.90 (s, 1H), 7.81 (d, J=8.2 Hz, 2H), 7.62 (d, J=8.8 Hz, 1H), 7.53 (d, J=8.4 Hz, 2H), 7.49-7.44 (m, 2H), 7.37-7.30 (m, 3H), 7.28-7.22 (m, 1H), 6.76-6.69 (m, 2H), 6.56 (d, J=2.4 Hz, 1H), 4.42 (t, J=6.4 Hz, 2H), 2.63 (t, J=6.4 Hz, 2H).

A sample of (R,S)-4-(((4-oxochroman-7-yl)oxy)(phenyl)methyl)benzamide was separated by SFC (ChiralpakAS, 35% (v/v) supercritical CO$_2$ in i-PrOH and H$_2$O with 0.1% NH$_3$) to yield example 29a (first enantiomer to elute, labelled *R) and example 29b (second enantiomer to elute, labelled *S).

Example 29a (*R)-4-(((4-oxochroman-7-yl)oxy)(phenyl)methyl)benzamide

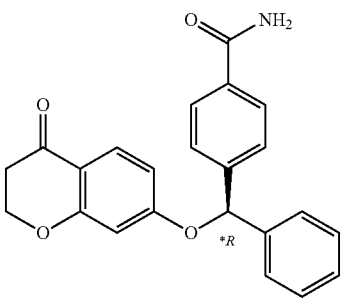 [SMILES: NC(=O)c1ccc([C@H](Oc2ccc3c(c2)OCCC3=O)c2ccccc2)cc1]

MS (ESI): mass calcd. for $C_{23}H_{19}NO_4$ 373.13 m/z found 374.0 [M+H]$^+$. $^1$H NMR (400 MHz, DMSO-$d_6$) δ 7.90 (s, 1H), 7.81 (d, J=8.4 Hz, 2H), 7.62 (d, J=8.8 Hz, 1H), 7.53 (d, J=8.4 Hz, 2H), 7.49-7.44 (m, 2H), 7.37-7.30 (m, 3H), 7.28-7.22 (m, 1H), 6.76-6.72 (m, 1H), 6.71 (s, 1H), 6.56 (d, J=2.4 Hz, 1H), 4.42 (t, J=6.4 Hz, 2H), 2.63 (t, J=6.4 Hz, 2H).

Example 29b (*S)-4-(((4-oxochroman-7-yl)oxy)(phenyl)methyl)benzamide

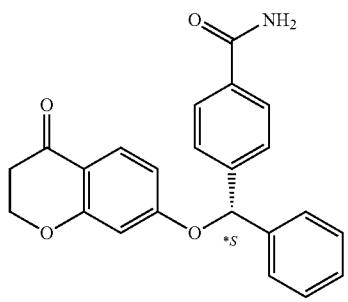 [SMILES: NC(=O)c1ccc([C@@H](Oc2ccc3c(c2)OCCC3=O)c2ccccc2)cc1]

MS (ESI): mass calcd. for $C_{23}H_{19}NO_4$ 373.13 m/z found 374.0 [M+H]$^+$. $^1$H NMR (400 MHz, DMSO-$d_6$) δ 7.90 (s, 1H), 7.81 (d, J=8.2 Hz, 2H), 7.62 (d, J=8.8 Hz, 1H), 7.53 (d, J=8.2 Hz, 2H), 7.49-7.44 (m, 2H), 7.36-7.31 (m, 3H), 7.27-7.22 (m, 1H), 6.76-6.72 (m, 1H), 6.71 (s, 1H), 6.56 (d, J=2.2 Hz, 1H), 4.42 (t, J=6.4 Hz, 2H), 2.63 (t, J=6.4 Hz, 2H).

Example 30: (R,S)-4-((4-Chlorophenyl)((4-oxochroman-7-yl)oxy)methyl)benzamide

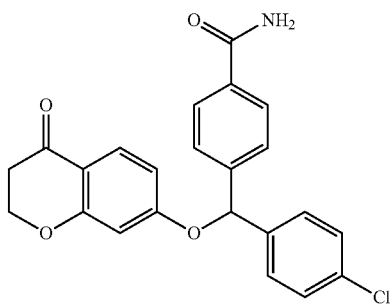 [SMILES: NC(=O)c1ccc(C(Oc2ccc3c(c2)OCCC3=O)c2ccc(Cl)cc2)cc1]

H$_2$O$_2$ (0.15 mL, 30% purity, 1.5 mmol) was added dropwise to a solution of 4-((4-chlorophenyl)((4-oxochroman-7-yl)oxy)methyl)benzonitrile (Intermediate 27, 200 mg, 0.513 mmol), K$_2$CO$_3$ (178 mg, 1.29 mmol), and DMSO (5 mL). The mixture was stirred at room temperature for 1 hour before pouring it into H$_2$O (20 mL) and extracting with ethyl acetate (20 mL×3). The combined organic extracts were dried over anhydrous Na$_2$SO$_4$, filtered, and concentrated to dryness under reduced pressure to afford the product, which was purified by preparative HPLC using a Gemini C18, 150 mm×25 mm×5 μm column (eluent: 40% to 70% (v/v) CH$_3$CN and H$_2$O with 0.05% NH$_3$) to afford the title compound (150 mg, 72%) as a white solid. MS (ESI): mass calcd. for $C_{23}H_{18}ClNO_4$ 407.9 m/z found 407.9 [M+H]$^+$.

A sample of (R,S)-4-((4-chlorophenyl)((4-oxochroman-7-yl)oxy)methyl)benzamide (150 mg, 0.368 mmol) was separated by SFC (Chiralpak OJ, 45% (v/v) supercritical CO$_2$ in MeOH and H$_2$O with 0.1% NH$_3$) to yield example 30a (first enantiomer to elute, labelled *R) and example 30b (second enantiomer to elute, labelled *S).

Example 30a (*R)-4-((4-Chlorophenyl)((4-oxochroman-7-yl)oxy)methyl)benzamide

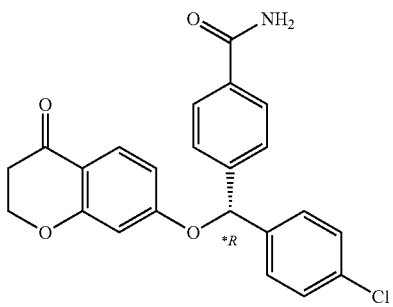 [SMILES: NC(=O)c1ccc([C@@H](Oc2ccc3c(c2)OCCC3=O)c2ccc(Cl)cc2)cc1]

MS (ESI): mass calcd. for $C_{23}H_{18}ClNO_4$ 407.9 m/z found 408.0 [M+H]$^+$. $^1$H NMR (400 MHz, DMSO-$d_6$) δ 7.94 (s, 1H), 7.84 (d, J=8.4 Hz, 2H), 7.66 (d, J=8.8 Hz, 1H), 7.58-7.50 (m, 4H), 7.47-7.42 (m, 2H), 7.37 (s, 1H), 6.80-6.75 (m, 2H), 6.60 (d, J=2.4 Hz, 1H), 4.46 (t, J=6.4 Hz, 2H), 2.67 (t, J=6.4 Hz, 2H).

Example 30b (*S)-4-((4-Chlorophenyl)((4-oxochroman-7-yl)oxy)methyl)benzamide

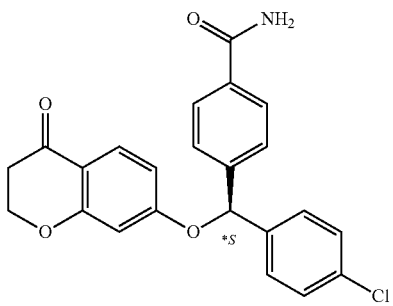 [SMILES: NC(=O)c1ccc([C@H](Oc2ccc3c(c2)OCCC3=O)c2ccc(Cl)cc2)cc1]

MS (ESI): mass calcd. for $C_{23}H_{18}ClNO_4$ 407.9 m/z found 408.0 [M+H]$^+$. $^1$H NMR (400 MHz, DMSO-$d_6$) δ 7.94 (s, 1H), 7.84 (d, J=8.4 Hz, 2H), 7.66 (d, J=8.8 Hz, 1H), 7.58-7.49 (m, 4H), 7.47-7.42 (m, 2H), 7.37 (s, 1H), 6.79-6.74 (m, 2H), 6.60 (d, J=2.2 Hz, 1H), 4.46 (t, J=6.3 Hz, 2H), 2.67 (t, J=6.4 Hz, 2H).

Example 31: (R,S)-4-(((4-Oxochroman-7-yl)oxy)(pyridin-3-yl)methyl)benzamide

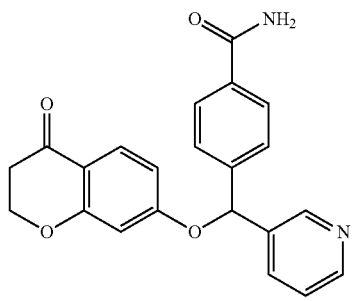 [SMILES: NC(=O)c1ccc(C(Oc2ccc3c(c2)OCCC3=O)c2cccnc2)cc1]

H$_2$O$_2$ (0.51 mL, 30% purity, 5.1 mmol) was added dropwise to a solution of 4-(((4-oxochroman-7-yl)oxy)(pyridin-3-yl)methyl)benzonitrile (Intermediate 28, 600 mg, 1.68 mmol), K$_2$CO$_3$ (582 mg, 4.21 mmol), and DMSO (10 mL). The mixture was stirred at room temperature for 1.5 hours before pouring it into H$_2$O (20 mL) and extracting with ethyl acetate (20 mL×3). The combined organic extracts were dried over anhydrous Na$_2$SO$_4$, filtered, and concentrated to dryness under reduced pressure to afford the product, which was purified by preparative HPLC using a Gemini C18, 150 mm×25 mm×5 µm column (eluent: 20% to 50% (v/v) CH$_3$CN and H$_2$O with 0.05% NH$_3$) to afford the title compound (300 mg, 47%) as a white solid MS (ESI): mass calcd. for C$_{22}$H$_{18}$N$_2$O$_4$ 374.13 m/z found 375.0 [M+H]$^+$.

A sample of (R,S)-4-(((4-oxochroman-7-yl)oxy)(pyridin-3-yl)methyl)benzamide (250 mg, 0.668 mmol) was separated by SFC (Chiralpak AS, 40% (v/v) supercritical CO$_2$ in i-PrOH and H$_2$O with 0.1% NH$_3$) to yield example 31a (first enantiomer to elute, labelled *R) and example 31b (second enantiomer to elute, labelled *S).

Example 31a (*R)-4-(((4-oxochroman-7-yl)oxy)(pyridin-3-yl)methyl)benzamide

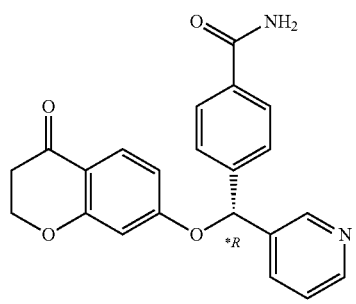 [SMILES: NC(=O)c1ccc([C@@H](Oc2ccc3c(c2)OCCC3=O)c2cccnc2)cc1]

MS (ESI): mass calcd. for C$_{22}$H$_{18}$N$_2$O$_4$ 374.13 m/z found 375.0 [M+H]$^+$. $^1$H NMR (400 MHz, DMSO-d$_6$) δ 8.75 (d, J=1.8 Hz, 1H), 8.53-8.49 (m, 1H), 7.94 (br s, 1H), 7.90-7.84 (m, 3H), 7.67 (d, J=8.8 Hz, 1H), 7.60 (d, J=8.4 Hz, 2H), 7.43-7.35 (m, 2H), 6.87 (s, 1H), 6.82-6.77 (m, 1H), 6.63 (d, J=2.2 Hz, 1H), 4.46 (t, J=6.4 Hz, 2H), 2.67 (t, J=6.3 Hz, 2H).

Example 31b (*S)-4-(((4-oxochroman-7-yl)oxy)(pyridin-3-yl)methyl)benzamide

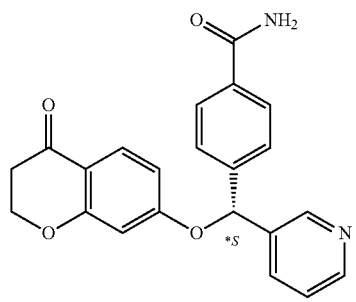 [SMILES: NC(=O)c1ccc([C@@H](Oc2ccc3c(c2)OCCC3=O)c2cccnc2)cc1]

MS (ESI): mass calcd. for C$_{22}$H$_{18}$N$_2$O$_4$ 374.13 m/z found 375.0 [M+H]$^+$. $^1$H NMR (400 MHz, DMSO-d$_6$) δ 8.76 (d, J=1.8 Hz, 1H), 8.52-8.49 (m, 1H), 7.95 (br s, 1H), 7.90-7.84 (m, 3H), 7.67 (d, J=8.8 Hz, 1H), 7.60 (d, J=8.4 Hz, 2H), 7.43-7.36 (m, 2H), 6.87 (s, 1H), 6.81-6.77 (m, 1H), 6.63 (d, J=2.2 Hz, 1H), 4.46 (t, J=6.4 Hz, 2H), 2.67 (t, J=6.4 Hz, 2H).

Example 32: (R,S)-4-(((4-Oxochroman-7-yl)oxy)(pyridin-2-yl)methyl)benzamide

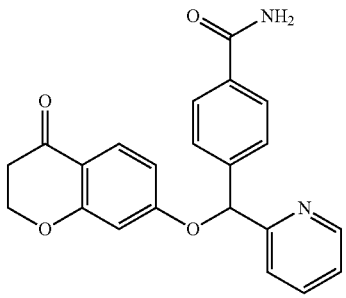 [SMILES: NC(=O)c1ccc(C(Oc2ccc3c(c2)OCCC3=O)c2ccccn2)cc1]

H$_2$O$_2$ (0.35 mL, 30% purity, 3.5 mmol) was added dropwise to a solution of 4-(((4-oxochroman-7-yl)oxy)(pyridin-2-yl)methyl)benzonitrile (Intermediate 29, 400 mg, 1.12 mmol), K$_2$CO$_3$ (389 mg, 2.82 mmol), and DMSO (5 mL). The mixture was stirred at room temperature for 1 hour before pouring it into H$_2$O (20 mL) and extracting with ethyl acetate (20 mL×3). The combined organic extracts were dried over anhydrous Na$_2$SO$_4$, filtered, and concentrated to dryness under reduced pressure to afford the product, which was purified by preparative HPLC using a Gemini C18, 150 mm×25 mm×10 µm column (eluent: 20% to 50% (v/v) CH$_3$CN and H$_2$O with 0.05% NH$_3$) to afford the title compound (300 mg, 71%) as a white solid. MS (ESI): mass calcd. for C$_{22}$H$_{18}$N$_2$O$_4$ 374.13 m/z found 375.0 [M+H]$^+$.

A sample of (R,S)-4-(((4-oxochroman-7-yl)oxy)(pyridin-2-yl)methyl)benzamide (250 mg, 0.668 mmol) was separated by SFC (Chiralpak IC, 45% (v/v) supercritical CO$_2$ in MeOH and H$_2$O with 0.1% NH$_3$) to yield example 32a (first enantiomer to elute, labelled *R) and example 32b (second enantiomer to elute, labelled *S).

Example 32a (*R)-4-(((4-oxochroman-7-yl)oxy)(pyridin-2-yl)methyl)benzamide

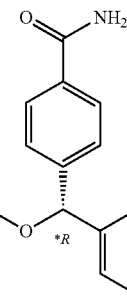

MS (ESI): mass calcd. for C$_{22}$H$_{18}$N$_2$O$_4$ 374.13 m/z found 375.0 [M+H]$^+$. $^1$H NMR (400 MHz, DMSO-d$_6$) δ 8.56-8.53 (m, 1H), 7.93 (s, 1H), 7.86-7.80 (m, 3H), 7.68-7.58 (m, 4H), 7.35 (s, 1H), 7.33-7.29 (m, 1H), 6.78 (dd, J=2.2, 8.8 Hz, 1H), 6.68 (s, 1H), 6.59 (d, J=2.4 Hz, 1H), 4.46 (t, J=6.4 Hz, 2H), 2.67 (t, J=6.3 Hz, 2H).

Example 32b (*S)-4-(((4-oxochroman-7-yl)oxy)(pyridin-2-yl)methyl)benzamide

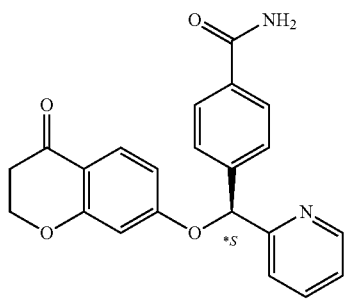 [SMILES: NC(=O)c1ccc([C@H](Oc2ccc3c(c2)OCCC3=O)c2ccccn2)cc1]

MS (ESI): mass calcd. for $C_{22}H_{18}N_2O_4$ 374.13 m/z found 375.0 [M+H]$^+$. $^1$H NMR (400 MHz, DMSO-d$_6$) δ 8.53-8.49 (m, 1H), 7.90 (s, 1H), 7.82-7.77 (m, 3H), 7.65-7.55 (m, 4H), 7.32 (s, 1H), 7.30-7.25 (m, 1H), 6.75 (dd, J=2.4, 8.8 Hz, 1H), 6.65 (s, 1H), 6.55 (d, J=2.4 Hz, 1H), 4.42 (t, J=6.4 Hz, 2H), 2.64 (t, J=6.4 Hz, 2H).

Example 33: (R,S)-4-(((4-Oxochroman-7-yl)oxy)(pyrimidin-4-yl)methyl)benzamide

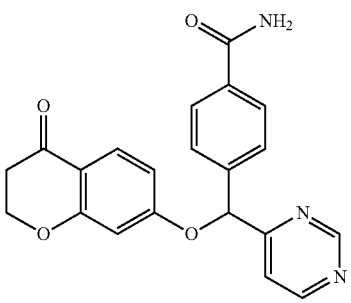 [SMILES: NC(=O)c1ccc(C(Oc2ccc3c(c2)OCCC3=O)c2ccncn2)cc1]

H$_2$O$_2$ (0.73 mL, 30% purity, 7.3 mmol) was added dropwise to a solution of 4-(((4-oxochroman-7-yl)oxy)(pyrimidin-4-yl)methyl)benzonitrile (Intermediate 30, 260 mg, 0.728 mmol), K$_2$CO$_3$ (510 mg, 3.69 mmol), and DMSO (5 mL). The mixture was stirred at room temperature for 1 hour before pouring it into saturated Na$_2$SO$_3$ (20 mL). The suspension was isolated via filtration and the filter cake washed with water (10 mL×2) to give the product, which was purified by preparative HPLC using a Phenomenex Gemini C18 150 mm×25 mm×10 μm column (eluent: 20% to 50% (v/v) CH$_3$CN and H$_2$O with 0.05% NH$_3$) to afford the title compound (120 mg, 44%) as a white solid. MS (ESI): mass calcd. for $C_{21}H_{17}N_3O_4$ 375.12 m/z found 376.0 [M+H]$^+$.

A sample of (R,S)-4-(((4-oxochroman-7-yl)oxy)(pyrimidin-4-yl)methyl)benzamide (120 mg, 0.320 mmol) was separated by SFC (Chiralcel OD, 40% (v/v) supercritical CO$_2$ in EtOH and H$_2$O with 0.1% NH$_3$) to yield example 33a (first enantiomer to elute, labelled *R) and example 33b (second enantiomer to elute, labelled *S).

Example 33a (*R)-4-(((4-Oxochroman-7-yl)oxy)(pyrimidin-4-yl)methyl)benzamide

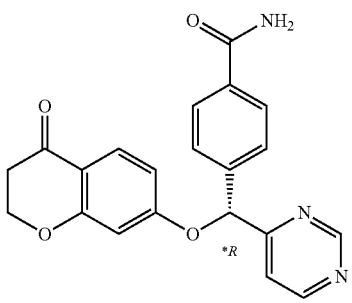 [SMILES: NC(=O)c1ccc([C@@H](Oc2ccc3c(c2)OCCC3=O)c2ccncn2)cc1]

MS (ESI): mass calcd. for $C_{21}H_{17}N_3O_4$ 375.12 m/z found 376.0 [M+H]$^+$. $^1$H NMR (400 MHz, DMSO-d$_6$) δ 9.22 (d, J=1.2 Hz, 1H), 8.92 (d, J=5.2 Hz, 1H), 8.02 (s, 1H), 7.93-7.87 (m, 3H), 7.74 (d, J=8.8 Hz, 1H), 7.70 (d, J=8.4 Hz, 2H), 7.45 (s, 1H), 6.87 (dd, J=2.4, 8.8 Hz, 1H), 6.80 (s, 1H), 6.70 (d, J=2.4 Hz, 1H), 4.53 (t, J=6.4 Hz, 2H), 2.74 (t, J=6.4 Hz, 2H).

Example 33b (*S)-4-(((4-Oxochroman-7-yl)oxy)(pyrimidin-4-yl)methyl)benzamide

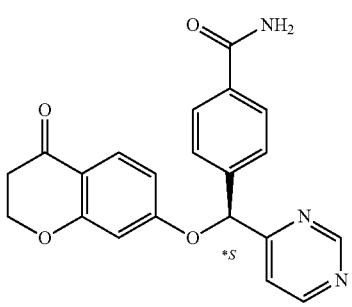 [SMILES: NC(=O)c1ccc([C@H](Oc2ccc3c(c2)OCCC3=O)c2ccncn2)cc1]

MS (ESI): mass calcd. for $C_{21}H_{17}N_3O_4$ 375.12 m/z found 376.0 [M+H]$^+$. $^1$H NMR (400 MHz, DMSO-d$_6$) δ 9.22 (d, J=1.2 Hz, 1H), 8.92 (d, J=5.2 Hz, 1H), 8.02 (s, 1H), 7.92-7.87 (m, 3H), 7.74 (d, J=8.8 Hz, 1H), 7.70 (d, J=8.4 Hz, 2H), 7.45 (s, 1H), 6.87 (dd, J=2.4, 8.4 Hz, 1H), 6.80 (s, 1H), 6.70 (d, J=2.4 Hz, 1H), 4.53 (t, J=6.4 Hz, 2H), 2.74 (t, J=6.4 Hz, 2H).

Example 34: (R,S)—N-Methyl-4-(((4-oxochroman-7-yl)oxy)(pyridin-4-yl)methyl)benzamide

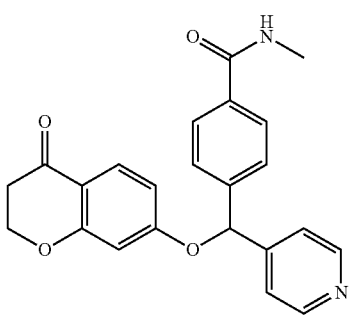 [SMILES: CNC(=O)c1ccc(C(Oc2ccc3c(c2)OCCC3=O)c2ccncc2)cc1]

DIAD (0.21 mL, 1.15 mmol) was added to a solution of 7-hydroxychroman-4-one (114 mg, 0.694 mmol), 4-(hydroxy(pyridin-4-yl)methyl)-N-methylbenzamide (Intermediate 31, 140 mg, 0.578 mmol), PPh$_3$ (303 mg, 1.16 mmol), and THF (2 mL). The mixture was stirred at room temperature for 16 hours before concentrating to dryness under reduced pressure to provide the product, which was purified by preparative HPLC using a Gemini C18 150 mm×25 mm×5 m column (eluent: 25% to 55% (v/v) CH$_3$CN and H$_2$O with 0.05% NH$_3$) to afford the title compound (50 mg, 22%) as a light yellow solid. MS (ESI): mass calcd. for C$_{23}$H$_{20}$N$_2$O$_4$ 388.14 m/z found 389.2 [M+H]$^+$.

A sample of (R,S)—N-methyl-4-(((4-oxochroman-7-yl)oxy)(pyridin-4-yl)methyl)benzamide (50 mg, 0.13 mmol) was separated by SFC (Chiralpak AS, 40% (v/v) supercritical CO$_2$ in EtOH and H$_2$O with 0.1% NH$_3$) to yield example 34a (first enantiomer to elute, labelled *R) and example 34b (second enantiomer to elute, labelled *S).

Example 34a (*R)—N-methyl-4-(((4-oxochroman-7-yl)oxy)(pyridin-4-yl)methyl)benzamide

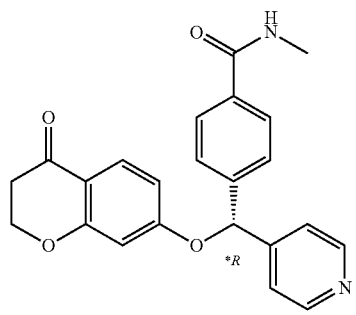 [SMILES: CNC(=O)c1ccc([C@@H](Oc2ccc3c(c2)OCCC3=O)c2ccncc2)cc1]

MS (ESI): mass calcd. for C$_{23}$H$_{20}$N$_2$O$_4$ 388.14 m/z found 389.0 [M+H]$^+$. $^1$H NMR (400 MHz, DMSO-d$_6$) δ 8.58-8.55 (m, 2H), 8.44-8.38 (m, 1H), 7.81 (d, J=8.4 Hz, 2H), 7.67 (d, J=8.8 Hz, 1H), 7.61 (d, J=8.4 Hz, 2H), 7.53-7.48 (m, 2H), 6.82-6.77 (m, 2H), 6.61 (d, J=2.4 Hz, 1H), 4.46 (t, J=6.4 Hz, 2H), 2.75 (d, J=4.6 Hz, 3H), 2.67 (t, J=6.4 Hz, 2H).

Example 34b (*S)—N-methyl-4-(((4-oxochroman-7-yl)oxy)(pyridin-4-yl)methyl)benzamide

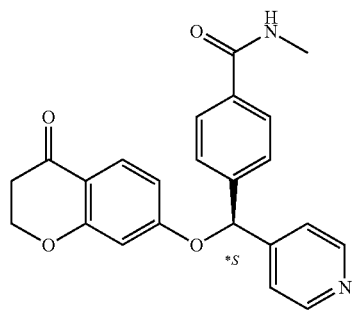 [SMILES: CNC(=O)c1ccc([C@H](Oc2ccc3c(c2)OCCC3=O)c2ccncc2)cc1]

MS (ESI): mass calcd. for C$_{23}$H$_{20}$N$_2$O$_4$ 388.14 m/z found 389.0 [M+H]$^+$. $^1$H NMR (400 MHz, DMSO-d$_6$) δ 8.58-8.55 (m, 2H), 8.44-8.39 (m, 1H), 7.81 (d, J=8.0 Hz, 2H), 7.67 (d, J=8.5 Hz, 1H), 7.61 (d, J=8.5 Hz, 2H), 7.53-7.50 (m, 2H), 6.82-6.77 (m, 2H), 6.61 (d, J=2.0 Hz, 1H), 4.46 (t, J=6.3 Hz, 2H), 2.75 (d, J=4.5 Hz, 3H), 2.67 (t, J=6.3 Hz, 2H).

Example 35: (R,S)-2-Methyl-4-(((4-oxochroman-7-yl)oxy)(pyridin-4-yl)methyl)benzamide

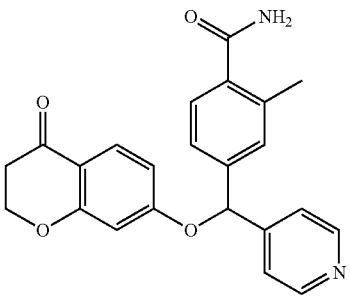 [SMILES: Cc1cc(C(Oc2ccc3c(c2)OCCC3=O)c2ccncc2)ccc1C(N)=O]

H$_2$O$_2$ (0.731 mL, 30% purity, 7.29 mmol) was added dropwise to a solution of 2-methyl-4-(((4-oxochroman-7-yl)oxy)(pyridin-4-yl)methyl)benzonitrile (Intermediate 32, 900 mg, 2.43 mmol), K$_2$CO$_3$ (840 mg, 6.08 mmol), and DMSO (4 mL). The mixture was stirred at room temperature for 17 hours before pouring it into water (20 mL) and extracting with ethyl acetate (10 mL×3). The combined organic layers were dried over Na$_2$SO$_4$, and concentrated to dryness under reduced pressure to give the product, which was purified by FCC (eluent:petroleum ether:ethyl acetate, 1:0 to 0:1, gradient elution) to afford the title compound (550 mg, 57%) as a yellow solid. MS (ESI): mass calcd. for C$_{23}$H$_{20}$N$_2$O$_4$ 388.14 m/z, found 389.1 [M+H]$^+$.

A sample of (R,S)-2-methyl-4-(((4-oxochroman-7-yl)oxy)(pyridin-4-yl)methyl)benzamide (550 mg, 1.42 mmol) was separated by SFC (Chiralpak AD, 45% (v/v) supercritical CO$_2$ in i-PrOH and H$_2$O with 0.1% NH$_3$) to yield example 35a (first enantiomer to elute, labelled *R) and example 35b (second enantiomer to elute, labelled *S).

Example 35a (*R)-2-methyl-4-(((4-oxochroman-7-yl)oxy)(pyridin-4-yl)methyl)benzamide

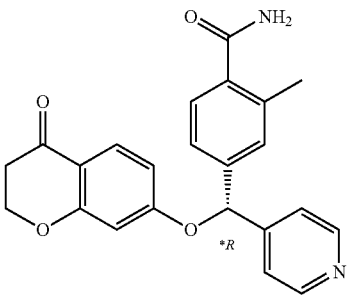 [SMILES: Cc1cc([C@@H](Oc2ccc3c(c2)OCCC3=O)c2ccncc2)ccc1C(N)=O]

MS (ESI): mass calcd. for C$_{23}$H$_{20}$N$_2$O$_4$ 388.14 m/z, found 389.1 [M+H]$^+$. $^1$H NMR (400 MHz, DMSO-d$_6$) δ 8.53 (d, J=6.0 Hz, 2H), 7.68-7.61 (m, 2H), 7.47 (d, J=6.0 Hz, 2H), 7.38-7.29 (m, 4H), 6.76 (dd, J=2.4, 8.8 Hz, 1H), 6.69 (s, 1H), 6.58 (d, J=2.4 Hz, 1H), 4.43 (t, J=6.4 Hz, 2H), 2.64 (t, J=6.3 Hz, 2H), 2.30 (s, 3H).

Example 35b (*S)-2-methyl-4-(((4-oxochroman-7-yl)oxy)(pyridin-4-yl)methyl)benzamide

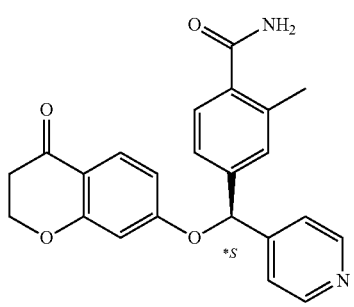 [SMILES: Cc1cc([C@H](Oc2ccc3c(c2)OCCC3=O)c2ccncc2)ccc1C(N)=O]

MS (ESI): mass calcd. for C$_{23}$H$_{20}$N$_2$O$_4$ 388.14 m/z, found 389.1 [M+H]$^+$. $^1$H NMR (400 MHz, DMSO-d$_6$) δ 8.53 (d, J=6.0 Hz, 2H), 7.69-7.62 (m, 2H), 7.47 (d, J=6.0 Hz, 2H), 7.38-7.28 (m, 4H), 6.76 (dd, J=2.2, 8.8 Hz, 1H), 6.69 (s, 1H), 6.58 (d, J=2.4 Hz, 1H), 4.44 (t, J=6.4 Hz, 2H), 2.64 (t, J=6.4 Hz, 2H), 2.30 (s, 3H).

Example 36: (R,S)-3-Methyl-4-(((4-oxochroman-7-yl)oxy)(pyridin-4-yl)methyl)benzamide

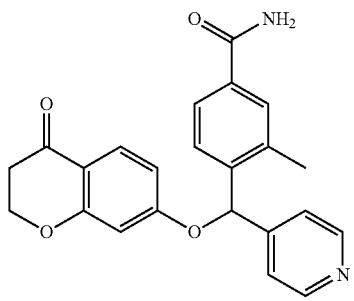 [SMILES: Cc1cc(C(N)=O)ccc1C(Oc1ccc2c(c1)OCCC2=O)c1ccncc1]

H$_2$O$_2$ (0.20 mL, 30% purity, 2.0 mmol) was added dropwise to a solution of 3-methyl-4-(((4-oxochroman-7-yl)oxy)(pyridin-4-yl)methyl)benzonitrile (Intermediate 33, 400 mg), K$_2$CO$_3$ (231 mg, 1.67 mmol), and DMSO (3 mL). The mixture was stirred at room temperature for 1 hour before pouring it into saturated Na$_2$SO$_3$ (30 mL) and extracting with ethyl acetate (30 mL×3). The combined organic extracts were dried over anhydrous Na$_2$SO$_4$, filtered, and concentrated to dryness under reduced pressure to give the product, which was purified by FCC (eluent: petroleum ether:ethyl acetate, 1:0 to 0:1, gradient elution) to afford the title compound (170 mg, 65%) as a colorless oil. MS (ESI): mass calcd. for C$_{23}$H$_{20}$N$_2$O$_4$ 388.14 m/z found 389.0 [M+H]$^+$.

A sample of (R,S)-3-methyl-4-(((4-oxochroman-7-yl)oxy)(pyridin-4-yl)methyl)benzamide (170 mg, 0.438 mmol) was separated by SFC (Chiralpak AS, 45% (v/v) supercritical CO$_2$ in i-PrOH and H$_2$O with 0.1% NH$_3$) to yield example 36a (first enantiomer to elute, labelled *R) and example 36b (second enantiomer to elute, labelled *S).

Example 36a (*R)-3-methyl-4-(((4-oxochroman-7-yl)oxy)(pyridin-4-yl)methyl)benzamide

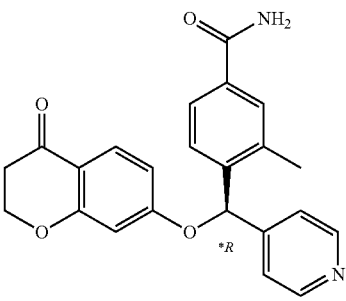 [SMILES: Cc1cc(C(N)=O)ccc1[C@H](Oc1ccc2c(c1)OCCC2=O)c1ccncc1]

MS (ESI): mass calcd. for C$_{23}$H$_{20}$N$_2$O$_4$ 388.14 m/z found 389.0 [M+H]$^+$. $^1$H NMR (400 MHz, DMSO-d$_6$) δ 8.59-8.55 (m, 2H), 7.90 (s, 1H), 7.71-7.63 (m, 3H), 7.42-7.35 (m, 3H), 7.33 (s, 1H), 6.84 (s, 1H), 6.74 (dd, J=2.3, 8.9 Hz, 1H), 6.56 (d, J=2.2 Hz, 1H), 4.44 (t, J=6.4 Hz, 2H), 2.65 (t, J=6.4 Hz, 2H), 2.36 (s, 3H).

Example 36b (*S)-3-methyl-4-(((4-oxochroman-7-yl)oxy)(pyridin-4-yl)methyl)benzamide

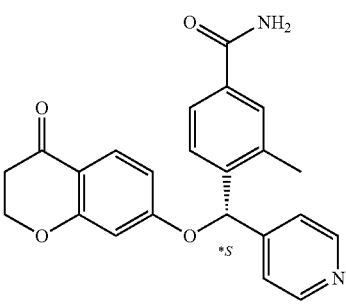 [SMILES: Cc1cc(C(N)=O)ccc1[C@@H](Oc1ccc2c(c1)OCCC2=O)c1ccncc1]

MS (ESI): mass calcd. for C$_{23}$H$_{20}$N$_2$O$_4$ 388.14 m/z found 389.0 [M+H]$^+$. $^1$H NMR (400 MHz, DMSO-d$_6$) δ 8.59-8.55 (m, 2H), 7.90 (s, 1H), 7.71-7.63 (m, 3H), 7.41-7.35 (m, 3H), 7.33 (s, 1H), 6.84 (s, 1H), 6.74 (dd, J=2.2, 8.8 Hz, 1H), 6.56 (d, J=2.4 Hz, 1H), 4.44 (t, J=6.4 Hz, 2H), 2.65 (t, J=6.4 Hz, 2H), 2.36 (s, 3H).

Example 37: (R,S)-4-(((4-Oxochroman-7-yl)oxy)(pyridin-4-yl)methyl)-1-naphthonitrile

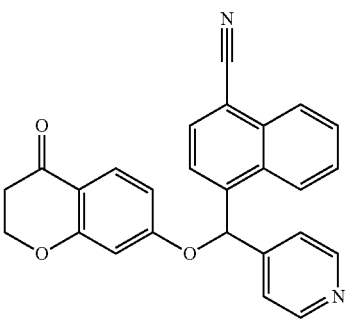 [SMILES: N#Cc1ccc(C(Oc2ccc3c(c2)OCCC3=O)c2ccncc2)c2ccccc12]

DEAD (1.51 g, 8.67 mmol) was added to a solution of 4-(hydroxy(pyridin-4-yl)methyl)-1-naphthonitrile (Intermediate 34, 1.50 g, 5.76 mmol), 7-hydroxychroman-4-one (946 mg, 5.76 mmol), PPh$_3$ (2.27 g, 8.66 mmol), and dichloromethane (50 mL). The mixture was stirred at room temperature under N$_2$ for 12 hours before concentrating to dryness under reduced pressure to give the product, which was purified by FCC (eluent:petroleum ether:ethyl acetate, 1:0 to 1:1, gradient elution) to afford the title compound (2.6 g) as a yellow solid, which was used in the next step without further purification. MS (ESI): mass calcd. for C$_{26}$H$_{18}$N$_2$O$_3$ 406.13 m/z, found 407.1 [M+H]$^+$.

A sample of (R,S)-4-(((4-oxochroman-7-yl)oxy)(pyridin-4-yl)methyl)-1-naphthonitrile (500 mg, 1.23 mmol) was separated by SFC (Chiralpak OJ, 30% (v/v) supercritical CO$_2$ in EtOH and H$_2$O with 0.1% NH$_3$) to yield example 37a (first enantiomer to elute, labelled *R) and example 37b (second enantiomer to elute, labelled *S).

Example 37a (*R)-4-(((4-oxochroman-7-yl)oxy)(pyridin-4-yl)methyl)-1-naphthonitrile

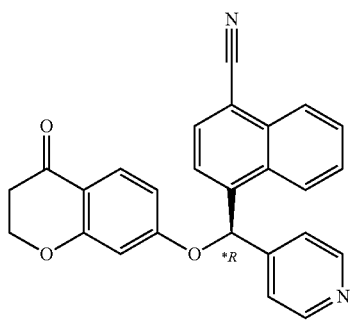 [SMILES: N#Cc1ccc([C@H](Oc2ccc3c(c2)OCCC3=O)c2ccncc2)c2ccccc12]

MS (ESI): mass calcd. for C$_{26}$H$_{18}$N$_2$O$_3$ 406.13 m/z, found 407.1 [M+H]$^+$. $^1$H NMR (400 MHz, DMSO-d$_6$) δ 8.60-8.57 (m, 2H), 8.55 (d, J=8.3 Hz, 1H), 8.23 (d, J=7.8 Hz, 1H), 8.19 (d, J=7.8 Hz, 1H), 7.88-7.78 (m, 3H), 7.68 (d, J=8.8 Hz, 1H), 7.59 (s, 1H), 7.54 (d, J=6.0 Hz, 2H), 6.83 (dd, J=2.5, 8.8 Hz, 1H), 6.71 (d, J=2.3 Hz, 1H), 4.46 (t, J=6.4 Hz, 2H), 2.67 (t, J=6.4 Hz, 2H).

Example 37b (*S)-4-(((4-oxochroman-7-yl)oxy)(pyridin-4-yl)methyl)-1-naphthonitrile

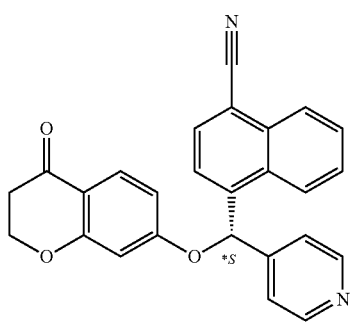 [SMILES: N#Cc1ccc([C@@H](Oc2ccc3c(c2)OCCC3=O)c2ccncc2)c2ccccc12]

MS (ESI): mass calcd. for C$_{26}$H$_{18}$N$_2$O$_3$ 406.13 m/z, found 407.0 [M+H]$^+$. $^1$H NMR (400 MHz, DMSO-d$_6$) δ 8.60-8.56 (m, 2H), 8.55 (d, J=8.3 Hz, 1H), 8.22 (d, J=7.5 Hz, 1H), 8.18 (d, J=7.8 Hz, 1H), 7.89-7.76 (m, 3H), 7.67 (d, J=8.8 Hz, 1H), 7.58 (s, 1H), 7.54 (d, J=5.8 Hz, 2H), 6.83 (dd, J=2.3, 8.8 Hz, 1H), 6.71 (d, J=2.3 Hz, 1H), 4.44 (t, J=6.3 Hz, 2H), 2.66 (t, J=6.4 Hz, 2H).

Example 38: (R,S)-7-(Cyclohexyl(pyridin-4-yl)methoxy)chroman-4-one

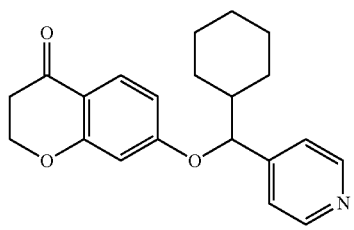 [SMILES: O=C1CCOc2cc(OC(c3ccncc3)C3CCCCC3)ccc21]

ADDP (1.25 g, 4.95 mmol) was added to a solution of 7-hydroxychroman-4-one (542 mg, 3.30 mmol), cyclohexyl(pyridin-4-yl)methanol (Intermediate 35, 630 mg, 3.29 mmol), PBu$_3$ (995 mg, 4.92 mmol), and toluene (15 mL). The mixture was stirred at 80° C. for 3 hours before cooling to room temperature, pouring it into H$_2$O (60 mL) and extracting with ethyl acetate (50 mL×3).

The combined organic layers were dried over anhydrous Na$_2$SO$_4$, and concentrated to dryness under reduced pressure to afford the product, which was purified by preparative HPLC using a Gemini 150 mm×25 mm×5 μm column (eluent: 50% to 80% (v/v) CH$_3$CN and H$_2$O with 0.05% NH$_3$) to afford the title compound.

A sample of (R,S)-7-(cyclohexyl(pyridin-4-yl)methoxy)chroman-4-one was separated by SFC (Chiralpak AD, 35% (v/v) supercritical CO$_2$ in IPA and H$_2$O with 0.1% NH$_3$) to yield example 38a (first enantiomer to elute, labelled *R) and example 38b (second enantiomer to elute, labelled *S).

Example 38a (*R)-7-(cyclohexyl(pyridin-4-yl)methoxy)chroman-4-one

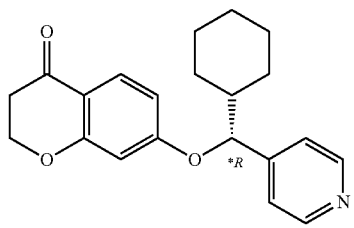 [SMILES: O=C1CCOc2cc(O[C@@H](c3ccncc3)C3CCCCC3)ccc21]

MS (ESI): mass calcd. for C$_{21}$H$_{23}$NO$_3$ 337.17 m/z found 338.0 [M+H]$^+$. $^1$H NMR (400 MHz, DMSO-d$_6$) δ 8.54-8.48 (m, 2H), 7.59 (d, J=8.8 Hz, 1H), 7.35-7.29 (m, 2H), 6.61 (dd, J=2.4, 8.8 Hz, 1H), 6.40 (d, J=2.4 Hz, 1H), 5.25 (d, J=6.2 Hz, 1H), 4.41 (t, J=6.4 Hz, 2H), 2.65-2.59 (m, 2H), 1.83-1.54 (m, 5H), 1.43-1.35 (m, 1H), 1.22-0.98 (m, 5H).

Example 38b (*S)-7-(cyclohexyl(pyridin-4-yl)methoxy)chroman-4-one

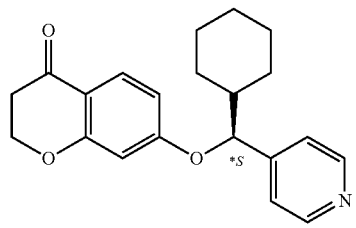 [SMILES: O=C1CCOc2cc(O[C@H](c3ccncc3)C3CCCCC3)ccc21]

MS (ESI): mass calcd. for C$_{21}$H$_{23}$NO$_3$ 337.17 m/z found 338.1 [M+H]$^+$. $^1$H NMR (400 MHz, DMSO-d$_6$) δ 8.56-8.46 (m, 2H), 7.59 (d, J=8.8 Hz, 1H), 7.35-7.29 (m, 2H), 6.61 (dd, J=2.4, 8.8 Hz, 1H), 6.40 (d, J=2.4 Hz, 1H), 5.25 (d, J=6.2 Hz, 1H), 4.41 (t, J=6.4 Hz, 2H), 2.66-2.59 (m, 2H), 1.83-1.54 (m, 5H), 1.42-1.35 (m, 1H), 1.22-0.98 (m, 5H).

Example 39: 4-(((2-Methyl-4-oxochroman-7-yl)oxy)(pyridin-4-yl)methyl)benzamide

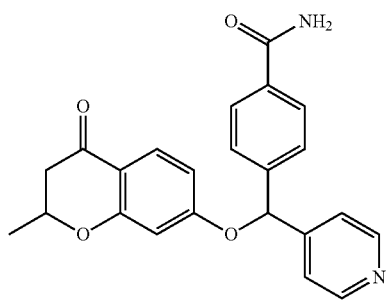 [SMILES: CC1CC(=O)c2ccc(OC(c3ccncc3)c3ccc(C(N)=O)cc3)cc2O1]

H$_2$O$_2$ (0.4 mL, 30% purity, 4 mmol) was added dropwise to a solution of 4-((1*R)-((2-methyl-4-oxochroman-7-yl)oxy)(pyridin-4-yl)methyl)benzonitrile (Intermediate 36, 450 mg), K$_2$CO$_3$ (420 mg, 3.04 mmol), and DMSO (6 mL). The mixture was stirred at room temperature for 1 hour before pouring it into saturated Na$_2$SO$_3$ (30 mL) and extracting with ethyl acetate (30 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 0:1, gradient elution) to afford the title compound (380 mg) as a yellow oil. The title compound was found to be a mixture of four diastereomers due to epimerization at the benzylic stereocenter that occurred during nitrile hydrolysis.

A sample of 4-(((2-methyl-4-oxochroman-7-yl)oxy)(pyridin-4-yl)methyl)benzamide was separated into three fractions using Method 1 (as shown in Table 2): SFC (Chiralpak AD, 55% (v/v) supercritical CO$_2$ in EtOH and H$_2$O with 0.1% NH$_3$) to yield a mixed sample of the first two eluting diastereomers, example 39c (third diastereomer to elute) and example 39d (fourth diastereomer to elute). The mixed sample fraction 1 which contained example 39a and example 39b was separated using Method 2 (as shown in Table 3): SFC (Chiralpak AD, 55% (v/v) supercritical CO$_2$ in MeOH and H$_2$O with 0.1% NH$_3$) to afford example 39a (first diastereomer to elute) and example 39b (second diastereomer to elute).

TABLE 2

Method 1 Separation Results

| Fraction | Order of elution | Example # |
|---|---|---|
| 1 | first and second diastereomers to elute | Mixed sample of example 39a and example 39b |
| 2 | third diastereomer to elute | Example 39c |
| 3 | fourth diastereomer to elute | Example 39d |

TABLE 3

Method 2 Separation Results

| Fraction | Order of elution | Example # |
|---|---|---|
| 1 | first diastereomer to elute | Example 39a |
| 2 | second diastereomer to elute | Example 39b |

Example 39a 4-((*S)—(((*R)-2-Methyl-4-oxochroman-7-yl)oxy)(pyridin-4-yl)methyl)benzamide

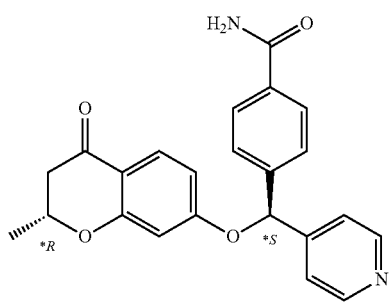 [SMILES: C[C@@H]1CC(=O)c2ccc(O[C@H](c3ccncc3)c3ccc(C(N)=O)cc3)cc2O1]

MS (ESI): mass calcd. for C$_{23}$H$_{20}$N$_2$O$_4$ 388.14 m/z found 389.0 [M+H]$^+$. $^1$H NMR (400 MHz, DMSO-d$_6$) δ 8.59-8.55 (m, 2H), 7.94 (s, 1H), 7.85 (d, J=8.4 Hz, 2H), 7.66 (d, J=8.6 Hz, 1H), 7.59 (d, J=8.4 Hz, 2H), 7.53-7.49 (m, 2H), 7.37 (s, 1H), 6.82 (s, 1H), 6.79 (dd, J=2.4, 8.8 Hz, 1H), 6.61 (d, J=2.4 Hz, 1H), 4.63-4.53 (m, 1H), 2.68-2.52 (m, 2H), 1.38 (d, J=6.2 Hz, 3H).

Example 39b 4-((*R)—(((*R)-2-Methyl-4-oxochroman-7-yl)oxy)(pyridin-4-yl)methyl)benzamide

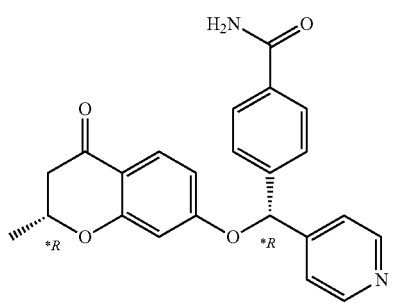 [SMILES: C[C@@H]1CC(=O)c2ccc(O[C@@H](c3ccncc3)c3ccc(C(N)=O)cc3)cc2O1]

MS (ESI): mass calcd. for C$_{23}$H$_{20}$N$_2$O$_4$ 388.14 m/z found 389.0 [M+H]$^+$. $^1$H NMR (400 MHz, DMSO-d$_6$) δ 8.58-8.54 (m, 2H), 7.95 (s, 1H), 7.85 (d, J=8.4 Hz, 2H), 7.66 (d, J=8.8 Hz, 1H), 7.60 (d, J=8.4 Hz, 2H), 7.52-7.48 (m, 2H), 7.37 (s, 1H), 6.81 (s, 1H), 6.79 (dd, J=2.4, 8.8 Hz, 1H), 6.60 (d, J=2.2 Hz, 1H), 4.63-4.54 (m, 1H), 2.68-2.52 (m, 2H), 1.37 (d, J=6.2 Hz, 3H).

Example 39c 4-((*R)—(((*S)-2-Methyl-4-oxochroman-7-yl)oxy)(pyridin-4-yl)methyl)benzamide

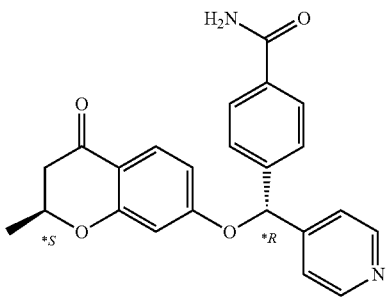 [SMILES: C[C@H]1CC(=O)c2ccc(O[C@@H](c3ccncc3)c3ccc(C(N)=O)cc3)cc2O1]

MS (ESI): mass calcd. for $C_{23}H_{20}N_2O_4$ 388.14 m/z found 389.0 [M+H]$^+$. $^1$H NMR (400 MHz, DMSO-d$_6$) δ 8.59-8.55 (m, 2H), 7.94 (s, 1H), 7.85 (d, J=8.4 Hz, 2H), 7.66 (d, J=8.6 Hz, 1H), 7.60 (d, J=8.4 Hz, 2H), 7.53-7.49 (m, 2H), 7.37 (s, 1H), 6.81 (s, 1H), 6.79 (dd, J=2.4, 8.8 Hz, 1H), 6.61 (d, J=2.4 Hz, 1H), 4.63-4.54 (m, 1H), 2.68-2.52 (m, 2H), 1.38 (d, J=6.2 Hz, 3H).

Example 39d 4-((*S)—(((*S)-2-Methyl-4-oxochroman-7-yl)oxy)(pyridin-4-yl)methyl)benzamide

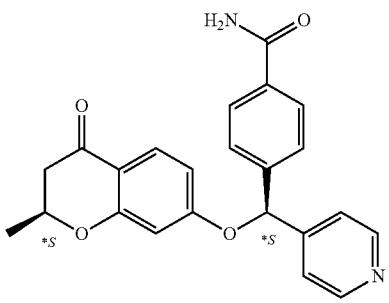 [SMILES: C[C@H]1CC(=O)c2ccc(O[C@H](c3ccncc3)c3ccc(C(N)=O)cc3)cc2O1]

MS (ESI): mass calcd. for $C_{23}H_{20}N_2O_4$ 388.14 m/z found 389.0 [M+H]$^+$. $^1$H NMR (400 MHz, DMSO-d$_6$) δ 8.57-8.54 (m, 2H), 7.95 (s, 1H), 7.86 (d, J=8.6 Hz, 2H), 7.66 (d, J=8.6 Hz, 1H), 7.60 (d, J=8.4 Hz, 2H), 7.52-7.48 (m, 2H), 7.37 (s, 1H), 6.81 (s, 1H), 6.79 (dd, J=2.4, 8.8 Hz, 1H), 6.60 (d, J=2.4 Hz, 1H), 4.64-4.54 (m, 1H), 2.69-2.52 (m, 2H), 1.37 (d, J=6.2 Hz, 3H).

Example 40: 4-((1*R)-((2-Ethyl-4-oxochroman-7-yl)oxy)(pyridin-4-yl)methyl)benzamide

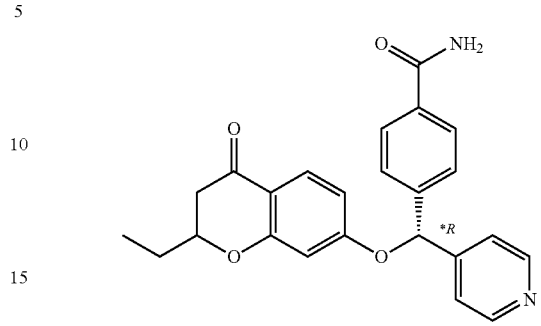

DEAD (305 mg, 1.75 mmol) was added to a solution of (*S)-4-(hydroxy(pyridin-4-yl)methyl)benzamide (Intermediate 107b, 200 mg, 0.876 mmol), 2-ethyl-7-hydroxychroman-4-one (Intermediate 37, 168 mg, 0.874 mmol), PPh$_3$ (460 mg, 1.75 mmol), and dichloromethane (5 mL). The mixture was stirred at room temperature under N$_2$ for 16 hours before concentrating to dryness under reduced pressure to give the product, which was purified by FCC (eluent: petroleum ether:ethyl acetate, 1:0 to 0:1, gradient elution) to afford the title product (90 mg, 24%) as a yellow oil. MS (ESI): mass calcd. For $C_{24}H_{22}N_2O_4$ 402.16 m/z, found 403.2 [M+H]$^+$.

A sample of 4-((1*R)-((2-ethyl-4-oxochroman-7-yl)oxy)(pyridin-4-yl)methyl)benzamide was separated by SFC (Chiralpak AD, 55% (v/v) supercritical CO$_2$ in EtOH and H$_2$O with 0.1% NH$_3$) to yield example 40a (first enantiomer to elute, labelled *R at chiral center on chromanone) and example 40b (second enantiomer to elute, labelled *S at chiral center on chromanone).

Example 40a 4-((*R)—(((*R)-2-ethyl-4-oxochroman-7-yl)oxy)(pyridin-4-yl)methyl)benzamide

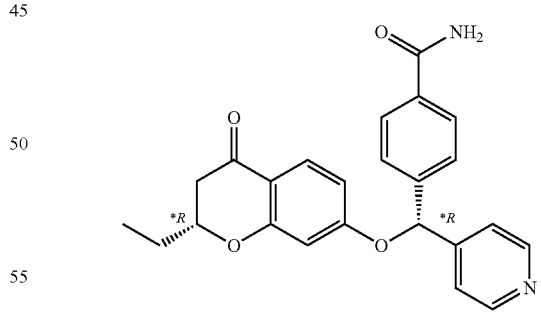

MS (ESI): mass calcd. for $C_{24}H_{22}N_2O_4$ 402.16 m/z, found 403.0 [M+H]$^+$. $^1$H NMR (400 MHz, DMSO-d$_6$) δ 8.59-8.52 (m, 2H), 7.94 (s, 1H), 7.85 (d, J=8.4 Hz, 2H), 7.66 (d, J=8.8 Hz, 1H), 7.60 (d, J=8.4 Hz, 2H), 7.52-7.47 (m, 2H), 7.37 (s, 1H), 6.83 (s, 1H), 6.78 (dd, J=2.2, 8.8 Hz, 1H), 6.62 (d, J=2.2 Hz, 1H), 4.44-4.35 (m, 1H), 2.65-2.55 (m, 2H), 1.78-1.65 (m, 2H), 0.95 (t, J=7.4 Hz, 3H).

Example 40b 4-((*R)—(((*S)-2-ethyl-4-oxochroman-7-yl)oxy)(pyridin-4-yl)methyl)benzamide

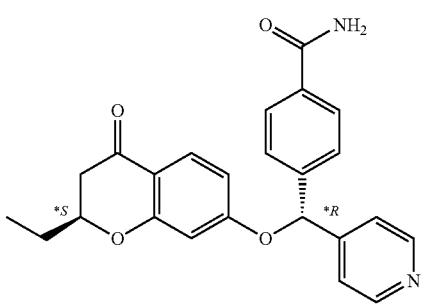

MS (ESI): mass calcd. for C$_{24}$H$_{22}$N$_2$O$_4$ 402.16 m/z, found 403.0 [M+H]$^+$. $^1$H NMR (400 MHz, DMSO-d$_6$) δ 8.58-8.50 (m, 2H), 7.93 (s, 1H), 7.84 (d, J=8.4 Hz, 2H), 7.65 (d, J=8.8 Hz, 1H), 7.59 (d, J=8.2 Hz, 2H), 7.53-7.47 (m, 2H), 7.36 (s, 1H), 6.83 (s, 1H), 6.78 (dd, J=2.4, 8.8 Hz, 1H), 6.62 (d, J=2.4 Hz, 1H), 4.44-4.35 (m, 1H), 2.64-2.55 (m, 2H), 1.77-1.66 (m, 2H), 0.95 (t, J=7.4 Hz, 3H).

Example 41: 4-((1*S)-((2-Ethyl-4-oxochroman-7-yl)oxy)(pyridin-4-yl)methyl)benzamide

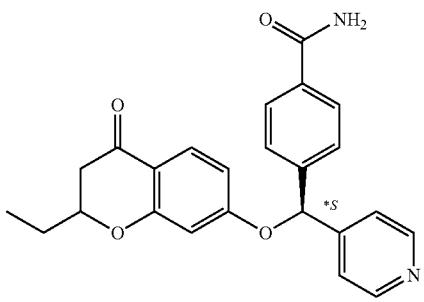 [SMILES: CCC1CC(=O)c2ccc(O[C@@H](c3ccncc3)c3ccc(C(N)=O)cc3)cc2O1]

DEAD (152 mg, 0.873 mmol) was added to a 10 mL round-bottomed flask containing a solution of (*R)-4-(hydroxy(pyridin-4-yl)methyl)benzamide (Intermediate 107a, 100 mg, 0.438) mmol), 2-ethyl-7-hydroxychroman-4-one (Intermediate 37, 168 mg, 0.874 mmol), PPh$_3$ (229 mg, 0.873 mmol), and anhydrous THF (4 mL). The mixture was sparged with N$_2$ for 5 minutes and then stirred at room temperature for 14 hours. The mixture was purified by preparative TLC (petroleum ether:ethyl acetate, 0:1), then was further purified by preparative HPLC using a Phenomenex Gemini 150 mm×25 mm×10 µm column (eluent: 30% to 60% (v/v) CH$_3$CN and H$_2$O with 0.05% NH$_3$) to afford the title compound (100 mg, 48%) as white solid. MS (ESI): mass calcd. for C$_{24}$H$_{22}$N$_2$O$_4$ 402.44 m/z found 403.0 [M+H]$^+$.

A sample of 4-((1*S)-((2-ethyl-4-oxochroman-7-yl)oxy)(pyridin-4-yl)methyl)benzamide was separated by SFC (Chiralpak AD, 55% (v/v) supercritical CO$_2$ in EtOH and H$_2$O with 0.1% NH$_3$) to yield example 41a (first enantiomer to elute, labelled *R at chiral center on chromanone) and example 41b (second enantiomer to elute, labelled *S at chiral center on chromanone).

Example 41a 4-((*S)—(((*R)-2-ethyl-4-oxochroman-7-yl)oxy)(pyridin-4-yl)methyl)benzamide

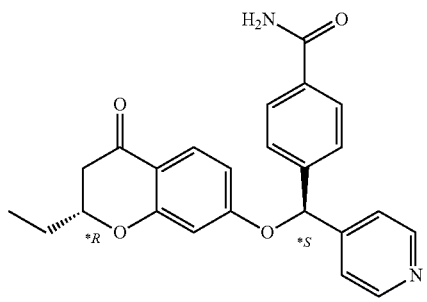 [SMILES: CC[C@@H]1CC(=O)c2ccc(O[C@H](c3ccncc3)c3ccc(C(N)=O)cc3)cc2O1]

MS (ESI): mass calcd. for C$_{24}$H$_{22}$N$_2$O$_4$ 402.44 m/z found 403.0 [M+H]$^+$. $^1$H NMR (400 MHz, DMSO-d$_6$) δ 8.61-8.53 (m, 2H), 7.94 (s, 1H), 7.85 (d, J=8.4 Hz, 2H), 7.66 (d, J=8.8 Hz, 1H), 7.60 (d, J=8.4 Hz, 2H), 7.54-7.49 (m, 2H), 7.38 (s, 1H), 6.84 (s, 1H), 6.79 (dd, J=2.4, 8.8 Hz, 1H), 6.62 (d, J=2.4 Hz, 1H), 4.44-4.35 (m, 1H), 2.66-2.55 (m, 2H), 1.77-1.66 (m, 2H), 0.96 (t, J=7.5 Hz, 3H).

Example 41b 4-((*S)—(((*S)-2-ethyl-4-oxochroman-7-yl)oxy)(pyridin-4-yl)methyl)benzamide

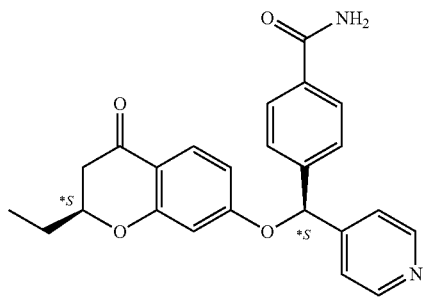 [SMILES: CC[C@H]1CC(=O)c2ccc(O[C@H](c3ccncc3)c3ccc(C(N)=O)cc3)cc2O1]

MS (ESI): mass calcd. for C$_{24}$H$_{22}$N$_2$O$_4$ 402.44 m/z found 403.0 [M+H]$^+$. $^1$H NMR (400 MHz, DMSO-d$_6$) δ 8.61-8.52 (m, 2H), 7.95 (s, 1H), 7.86 (d, J=8.4 Hz, 2H), 7.66 (d, J=8.8 Hz, 1H), 7.61 (d, J=8.2 Hz, 2H), 7.53-7.48 (m, 2H), 7.39 (s, 1H), 6.84 (s, 1H), 6.79 (dd, J=2.4, 8.8 Hz, 1H), 6.62 (d, J=2.4 Hz, 1H), 4.44-4.36 (m, 1H), 2.69-2.55 (m, 2H), 1.78-1.66 (m, 2H), 0.95 (t, J=7.5 Hz, 3H).

Example 42: 4-((1*S)-((4-Oxo-2-phenylchroman-7-yl)oxy)(pyridin-4-yl)methyl)benzamide

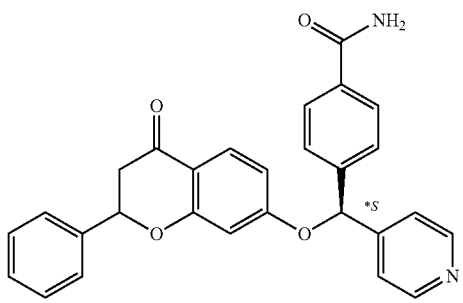 [SMILES: NC(=O)c1ccc([C@H](Oc2ccc3c(c2)OC(c2ccccc2)CC3=O)c2ccncc2)cc1]

ADDP (442 mg, 1.75 mmol) was added to a solution of 7-hydroxy-2-phenylchroman-4-one (421 mg, 1.75 mmol), (*R)-4-(hydroxy(pyridin-4-yl)methyl)benzamide (Intermediate 107a, 200 mg, 0.876 mmol), n-Bu$_3$P (0.44 mL, 1.8 mmol), and THF (3 mL). The mixture was stirred at 70° C. for 16 hours before cooling to room temperature, pouring it into water (10 mL), and extracting with ethyl acetate (10 mL×3). The combined organic extracts were dried over anhydrous Na$_2$SO$_4$, filtered and concentrated to dryness under reduced pressure to afford the product which was purified by preparative HPLC using a Gemini C18 150 mm×25 mm×5 µm column (eluent: 35% to 65% (v/v) CH$_3$CN and H$_2$O with 0.05% NH$_3$) to afford the title compound (200 mg, 49%) as a light yellow oil. MS (ESI): mass calcd. for C$_{28}$H$_{22}$N$_2$O$_4$ 450.16 m/z found 451.2 [M+H]$^+$.

A sample of 4-((1*S)-((4-oxo-2-phenylchroman-7-yl)oxy)(pyridin-4-yl)methyl)benzamide (200 mg, 0.444 mmol) was separated by SFC (Chiralpak OJ, 40% (v/v) supercritical CO$_2$ in MeOH and H$_2$O with 0.1% NH$_3$) to yield example 42a (first enantiomer to elute, labelled *R at chiral center on chromanone) and example 42b (second enantiomer to elute, labelled *S at chiral center on chromanone).

Example 42a 4-((*S)—(((*R)-4-oxo-2-phenylchroman-7-yl)oxy)(pyridin-4-yl)methyl)benzamide

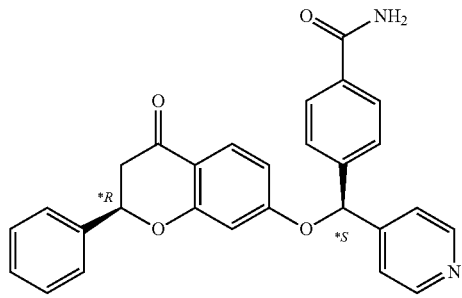 [SMILES: NC(=O)c1ccc([C@H](Oc2ccc3c(c2)O[C@@H](c2ccccc2)CC3=O)c2ccncc2)cc1]

MS (ESI): mass calcd. for C$_{28}$H$_{22}$N$_2$O$_4$ 450.16 m/z found 451.0 [M+H]$^+$. $^1$H NMR (400 MHz, DMSO-d$_6$) δ 8.58-8.54 (m, 2H), 7.95 (s, 1H), 7.85 (d, J=8.4 Hz, 2H), 7.72 (d, J=8.8 Hz, 1H), 7.60 (d, J=8.4 Hz, 2H), 7.52-7.48 (m, 4H), 7.44-7.35 (m, 4H), 6.86-6.83 (m, 2H), 6.70 (d, J=2.2 Hz, 1H), 5.61 (dd, J=2.6, 13.0 Hz, 1H), 3.22-3.13 (m, 1H), 2.75-2.68 (m, 1H).

Example 42b 4-((*S)—(((*S)-4-oxo-2-phenylchroman-7-yl)oxy)(pyridin-4-yl)methyl)benzamide

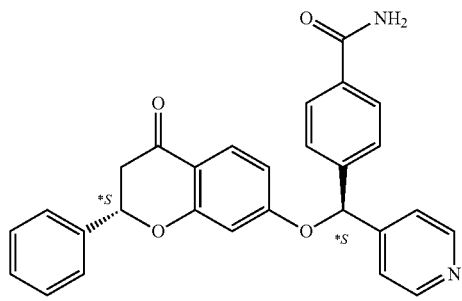 [SMILES: NC(=O)c1ccc([C@H](Oc2ccc3c(c2)O[C@H](c2ccccc2)CC3=O)c2ccncc2)cc1]

MS (ESI): mass calcd. for C$_{28}$H$_{22}$N$_2$O$_4$ 450.16 m/z found 451.0 [M+H]$^+$. $^1$H NMR (400 MHz, DMSO-d$_6$) δ 8.56 (d, J=6.0 Hz, 2H), 7.94 (s, 1H), 7.85 (d, J=8.0 Hz, 2H), 7.72 (d, J=8.0 Hz, 1H), 7.60 (d, J=8.0 Hz, 2H), 7.52-7.48 (m, 4H), 7.44-7.35 (m, 4H), 6.87-6.82 (m, 2H), 6.71 (d, J=3.0 Hz, 1H), 5.62 (dd, J=3.0, 13.1 Hz, 1H), 3.23-3.13 (m, 1H), 2.75-2.68 (m, 1H).

Example 43: 4-((1*R)-((4-Oxo-2-phenylchroman-7-yl)oxy)(pyridin-4-yl)methyl)benzamide

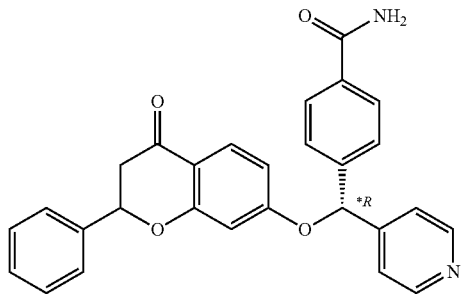 [SMILES: NC(=O)c1ccc([C@@H](Oc2ccc3c(c2)OC(c2ccccc2)CC3=O)c2ccncc2)cc1]

ADDP (553 mg, 2.19 mmol) was added to a solution of 7-hydroxy-2-phenylchroman-4-one (526 mg, 2.19 mmol), (*S)-4-(hydroxy(pyridin-4-yl)methyl)benzamide (Intermediate 107b, 250 mg, 1.10 mmol), n-Bu$_3$P (0.55 mL, 2.2 mmol), and THF (5 mL). The mixture was heated at 70° C. for 16 hours before pouring it into water (10 mL) and extracting with ethyl acetate (10 mL×3). The combined organic extracts were dried over anhydrous Na$_2$SO$_4$, filtered and concentrated to dryness under reduced pressure to afford the product, which was purified by preparative HPLC using a Gemini C18 150×25 mm×5 um column (eluent: 35% to 65% (v/v) CH$_3$CN and H$_2$O with 0.05% NH$_3$) to afford the title compound (210 mg, 42%) as a light yellow oil. MS (ESI): mass calcd. for C$_{28}$H$_{22}$N$_2$O$_4$ 450.16 m/z found 451.2 [M+H]$^+$.

A sample of 4-((1*R)-((4-oxo-2-phenylchroman-7-yl)oxy)(pyridin-4-yl)methyl)benzamide (200 mg, 0.444 mmol) was separated by SFC (Chiralcel OD, 45% (v/v) supercritical CO$_2$ in MeOH and H$_2$O with 0.1% NH$_3$) to yield example 43a (first enantiomer to elute, labelled *R at chiral center on chromanone, impure) and example 43b (second enantiomer to elute, labelled *S at chiral center on chromanone, impure). Example 43a was further purified by preparative HPLC using a Gemini C18 250 mm×50 mm×10 µm column (eluent: 26% to 56% (v/v) CH$_3$CN and H$_2$O with 0.225% HCOOH) to afford example 43a (ee<90%). This material was separated by SFC (Chiralcel OD, eluent: 45% to 45% (v/v) supercritical CO$_2$ in MeOH and H$_2$O with 0.1% NH$_3$) to afford example 43a. Example 43b (impure) was further purified under preparative HPLC using a Gemini C18 250×50 mm×10 µm column (eluent: 26% to 56% (v/v) CH$_3$CN and H$_2$O with 0.225% HCOOH) to afford pure product.

Example 43a: 4-((*R)—(((*R)-4-oxo-2-phenylchroman-7-yl)oxy)(pyridin-4-yl)methyl)benzamide

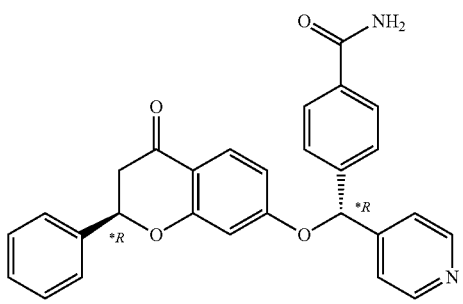 [SMILES: NC(=O)c1ccc([C@@H](Oc2ccc3c(c2)O[C@@H](c2ccccc2)CC3=O)c2ccncc2)cc1]

MS (ESI): mass calcd. for $C_{28}H_{22}N_2O_4$ 450.16 m/z found 451.0 [M+H]$^+$. $^1$H NMR (400 MHz, DMSO-d$_6$) δ 8.57-8.54 (m, 2H), 7.96 (s, 1H), 7.85 (d, J=8.4 Hz, 2H), 7.72 (d, J=8.8 Hz, 1H), 7.60 (d, J=8.4 Hz, 2H), 7.53-7.48 (m, 4H), 7.44-7.35 (m, 4H), 6.86-6.82 (m, 2H), 6.70 (d, J=2.2 Hz, 1H), 5.61 (dd, J=2.9, 13.0 Hz, 1H), 3.22-3.13 (m, 1H), 2.74-2.68 (m, 1H).

Example 43b 4-((*R)—(((*S)-4-oxo-2-phenylchroman-7-yl)oxy)(pyridin-4-yl)methyl)benzamide

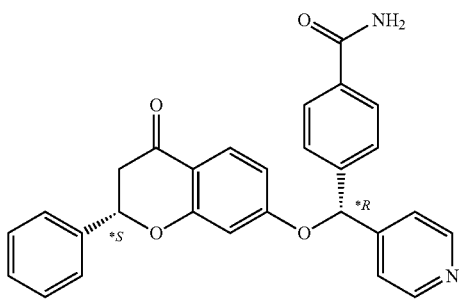 [SMILES: NC(=O)c1ccc([C@@H](Oc2ccc3c(c2)O[C@H](c2ccccc2)CC3=O)c2ccncc2)cc1]

MS (ESI): mass calcd. for $C_{28}H_{22}N_2O_4$ 450.16 m/z found 451.0 [M+H]$^+$. $^1$H NMR (400 MHz, DMSO-d$_6$) δ 8.58-8.55 (m, 2H), 7.94 (s, 1H), 7.85 (d, J=8.4 Hz, 2H), 7.72 (d, J=8.8 Hz, 1H), 7.60 (d, J=8.4 Hz, 2H), 7.52-7.48 (m, 4H), 7.44-7.35 (m, 4H), 6.87-6.82 (m, 2H), 6.71 (d, J=2.4 Hz, 1H), 5.62 (dd, J=2.9, 12.8 Hz, 1H), 3.22-3.13 (m, 1H), 2.75-2.69 (m, 1H).

Example 44: 4-(((3-Methyl-4-oxochroman-7-yl)oxy)(pyridin-4-yl)methyl)benzamide

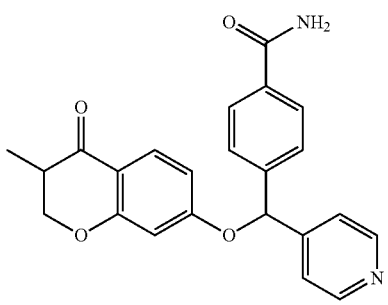 [SMILES: CC1COc2cc(OC(c3ccncc3)c3ccc(C(N)=O)cc3)ccc2C1=O]

H$_2$O$_2$ (0.28 mL, 30% purity, 2.8 mmol) was added dropwise to a solution of 4-((1*S)-((3-methyl-4-oxochroman-7-yl)oxy)(pyridin-4-yl)methyl)benzonitrile (Intermediate 38, 350 mg), K$_2$CO$_3$ (326 mg, 2.36 mmol), and DMSO (4 mL). The mixture was stirred at room temperature for 1 hour before pouring it into saturated Na$_2$SO$_3$ (30 mL), and extracting with ethyl acetate (30 mL×3). The combined organic extracts were dried over anhydrous Na$_2$SO$_4$, filtered, and the filtrate concentrated to dryness under reduced pressure to give the product, which was purified by FCC (eluent:petroleum ether:ethyl acetate, 1:0 to 0:1, gradient elution) to afford the title compound (160 mg) as a colorless oil. The title compound was found to be a mixture of four diastereomers due to epimerization at the benzylic stereocenter that occurred during nitrile hydrolysis. MS (ESI): mass calcd. for $C_{23}H_{20}N_2O_4$ 388.14 m/z found 389.2 [M+H]$^+$.

A sample of 4-(((3-methyl-4-oxochroman-7-yl)oxy)(pyridin-4-yl)methyl)benzamide (160 mg, 0.412 mmol) was separated into two fractions using Method 1 (as shown in Table 4): SFC (ChiralpakAD, 250 mm×30 mm, 45% (v/v) supercritical CO$_2$ in EtOH and H$_2$O with 0.1% NH$_3$) to afford fraction 1, a mixed sample of the first two eluting diastereomers (examples 44a and 44b), and fraction 2, a mixed sample of the third and fourth eluting diastereomers (examples 44c and 44d). Fraction 1 was separated by Method 2 (as shown in Table 5): SFC (Chiralpak AD, 50% (v/v) supercritical CO$_2$ in MeOH and H$_2$O with 0.1% NH$_3$) to afford example 44a (first diastereomer to elute, impure) and example 44b (second diastereomer to elute). Example 44a (impure) was separated by Method 3: SFC (Chiralpak AD, 50% (v/v) supercritical CO$_2$ in MeOH and H$_2$O with 0.1% NH$_3$) to afford example 44a. Fraction 2 was separated by Method 4 (as shown in Table 6): SFC (Chiralpak AD, 40% (v/v) supercritical CO$_2$ in IPA and H$_2$O with 0.1% NH$_3$) to afford example 44c (first diastereomer to elute, impure) and example 44d (second diastereomer to elute). Example 44c was separated by Method 5: SFC (ChiralpakAD, 40% (v/v) supercritical CO$_2$ in EtOH and H$_2$O with 0.1% NH$_3$) to afford example 44c.

TABLE 4

Method 1 Separation Results

| Fraction | Order of elution | Example # |
| --- | --- | --- |
| 1 | first and second diastereomers to elute | Mixed sample of example 44a and example 44b |
| 2 | third and fourth diastereomer to elute | Mixed sample of example 44c and example 44d |

TABLE 5

Method 2 Separation Results

| Fraction | Order of elution | Example # |
| --- | --- | --- |
| 1 | first diastereomer to elute | Example 44a (impure) |
| 2 | second diastereomer to elute | Example 44b |

TABLE 6

Method 4 Separation Results

| Fraction | Order of elution | Example # |
|---|---|---|
| 1 | first diastereomer to elute | Example 44c (impure) |
| 2 | second diastereomer to elute | Example 44d |

Example 44a 4-((*S)—(((*R)-3-Methyl-4-oxochroman-7-yl)oxy)(pyridin-4-yl)methyl)benzamide

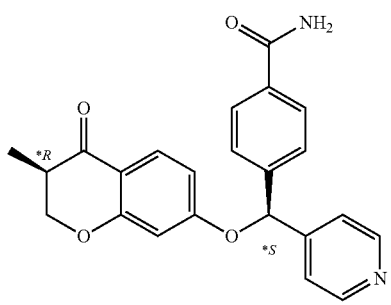 [SMILES: C[C@@H]1COc2cc(O[C@H](c3ccncc3)c3ccc(C(N)=O)cc3)ccc2C1=O]

MS (ESI): mass calcd. for $C_{23}H_{20}N_2O_4$ 388.14 m/z found 389.0 [M+H]$^+$. $^1$H NMR (400 MHz, DMSO-d$_6$) δ 8.59-8.54 (m, 2H), 7.95 (s, 1H), 7.86 (d, J=8.4 Hz, 2H), 7.67 (d, J=8.8 Hz, 1H), 7.60 (d, J=8.2 Hz, 2H), 7.54-7.48 (m, 2H), 7.37 (s, 1H), 6.83-6.77 (m, 2H), 6.61 (d, J=2.2 Hz, 1H), 4.47 (dd, J=5.2, 11.1 Hz, 1H), 4.12 (t, J=11.2 Hz, 1H), 2.85-2.77 (m, 1H), 1.02 (d, J=7.1 Hz, 3H).

Example 44b 4-((*R)—(((*R)-3-Methyl-4-oxochroman-7-yl)oxy)(pyridin-4-yl)methyl)benzamide

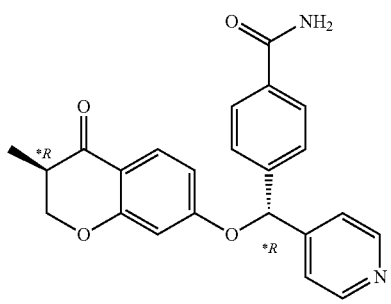 [SMILES: C[C@@H]1COc2cc(O[C@@H](c3ccncc3)c3ccc(C(N)=O)cc3)ccc2C1=O]

MS (ESI): mass calcd. for $C_{23}H_{20}N_2O_4$ 388.14 m/z found 389.0 [M+H]$^+$. $^1$H NMR (400 MHz, DMSO-d$_6$) δ 8.60-8.53 (m, 2H), 7.95 (s, 1H), 7.85 (d, J=8.2 Hz, 2H), 7.67 (d, J=8.8 Hz, 1H), 7.60 (d, J=8.4 Hz, 2H), 7.54-7.48 (m, 2H), 7.37 (s, 1H), 6.83-6.77 (m, 2H), 6.61 (d, J=2.2 Hz, 1H), 4.47 (dd, J=5.1, 11.2 Hz, 1H), 4.12 (t, J=11.2 Hz, 1H), 2.87-2.76 (m, 1H), 1.02 (d, J=7.1 Hz, 3H).

Example 44c 4-((*R)—(((*S)-3-Methyl-4-oxochroman-7-yl)oxy)(pyridin-4-yl)methyl)benzamide

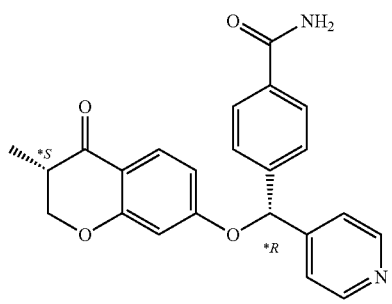 [SMILES: C[C@H]1COc2cc(O[C@@H](c3ccncc3)c3ccc(C(N)=O)cc3)ccc2C1=O]

MS (ESI): mass calcd. for $C_{23}H_{20}N_2O_4$ 388.14 m/z found 389.0 [M+H]$^+$. $^1$H NMR (400 MHz, DMSO-d$_6$) δ 8.59-8.53 (m, 2H), 7.95 (s, 1H), 7.85 (d, J=8.2 Hz, 2H), 7.67 (d, J=8.8 Hz, 1H), 7.60 (d, J=8.2 Hz, 2H), 7.54-7.48 (m, 2H), 7.37 (s, 1H), 6.83-6.76 (m, 2H), 6.61 (d, J=2.4 Hz, 1H), 4.47 (dd, J=5.3, 11.2 Hz, 1H), 4.12 (t, J=11.2 Hz, 1H), 2.86-2.75 (m, 1H), 1.02 (d, J=7.1 Hz, 3H).

Example 46d 4-((*S)—(((*S)-3-Methyl-4-oxochroman-7-yl)oxy)(pyridin-4-yl)methyl)benzamide

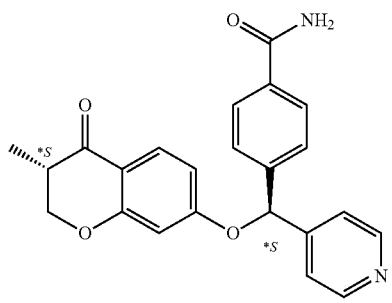 [SMILES: C[C@H]1COc2cc(O[C@H](c3ccncc3)c3ccc(C(N)=O)cc3)ccc2C1=O]

MS (ESI): mass calcd. for $C_{23}H_{20}N_2O_4$ 388.14 m/z found 389.0 [M+H]$^+$. $^1$H NMR (400 MHz, DMSO-d$_6$) δ 8.59-8.54 (m, 2H), 7.94 (s, 1H), 7.86 (d, J=8.4 Hz, 2H), 7.67 (d, J=8.6 Hz, 1H), 7.60 (d, J=8.4 Hz, 2H), 7.53-7.49 (m, 2H), 7.37 (s, 1H), 6.82-6.77 (m, 2H), 6.61 (d, J=2.4 Hz, 1H), 4.47 (dd, J=5.3, 11.2 Hz, 1H), 4.12 (t, J=11.2 Hz, 1H), 2.86-2.76 (m, 1H), 1.02 (d, J=6.8 Hz, 3H).

Example 45: 4-((1*S)-((3-Ethyl-4-oxochroman-7-yl)oxy)(pyridin-4-yl)methyl)benzamide

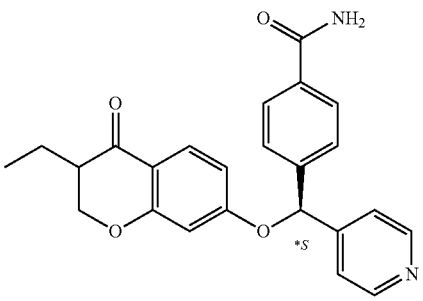 [SMILES: CCC1COc2cc(O[C@H](c3ccncc3)c3ccc(C(N)=O)cc3)ccc2C1=O]

DIAD (266 mg, 1.32 mmol) was added to a 100 mL three-necked round-bottomed flask containing a solution of 3-ethyl-7-hydroxychroman-4-one (Intermediate 39, 186 mg, 0.968 mmol), (*R)-4-(hydroxy(pyridin-4-yl)methyl)benzamide (Intermediate 107a, 200 mg, 0.876 mmol), PPh₃ (368 mg, 1.40 mmol), and THF (8 mL) under N₂ atmosphere. The mixture was stirred for 16 hours at room temperature before concentrating to dryness under reduced pressure to give the product, which was purified by FCC (eluent:methanol:ethyl acetate, 0:1 to 1:9, gradient elution) to afford impure product (350 mg, 88%). The post chromatographic product (350 mg) was further purified by preparative HPLC using a Gemini 150 mm×25 mm×5 m column (eluent: 30% to 60% (v/v) CH₃CN and H₂O with 0.05% NH₃) to afford the title compound (250 mg, 71%) as a white solid. MS (ESI): mass calcd. For $C_{24}H_{22}N_2O_4$ 402.16 m/z found 403.2 [M+H]⁺.

A sample of 4-((1*S)-((3-ethyl-4-oxochroman-7-yl)oxy)(pyridin-4-yl)methyl)benzamide (250 mg, 0.621 mmol) was separated by SFC (Chiralpak AS-H, 40% (v/v) supercritical CO₂ in EtOH and H₂O with 0.1% NH₃) to yield example 45a (first enantiomer to elute, labelled *R at chiral center on chromanone) and example 45b (second enantiomer to elute, labelled *S at chiral center on chromanone).

Example 45a 4-((*S)—(((*R)-3-ethyl-4-oxochroman-7-yl)oxy)(pyridin-4-yl)methyl)benzamide

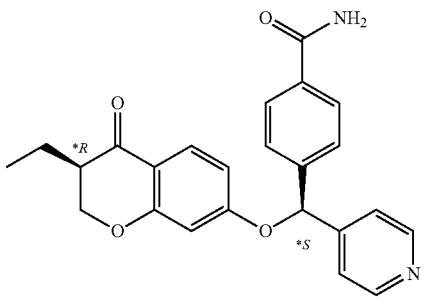 [SMILES: CC[C@@H]1COc2cc(O[C@H](c3ccncc3)c3ccc(C(N)=O)cc3)ccc2C1=O]

MS (ESI): mass calcd. for $C_{24}H_{22}N_2O_4$ 402.16 m/z found 403.0 [M+H]⁺. ¹H NMR (400 MHz, DMSO-d₆) δ 8.55-8.52 (m, 2H), 7.92 (s, 1H), 7.84-7.80 (m, 2H), 7.64 (d, J=8.4 Hz, 1H), 7.59-7.55 (m, 2H), 7.49-7.46 (m, 2H), 7.34 (s, 1H), 6.78-6.74 (m, 2H), 6.57 (d, J=2.4 Hz, 1H), 4.46 (dd, J=4.8, 11.6 Hz, 1H), 4.21 (dd, J=8.8, 11.6 Hz, 1H), 1.72-1.60 (m, 1H), 1.44-1.32 (m, 1H), 0.87 (t, J=7.4 Hz, 3H).

Example 45b 4-((*S)—(((*S)-3-ethyl-4-oxochroman-7-yl)oxy)(pyridin-4-yl)methyl)benzamide

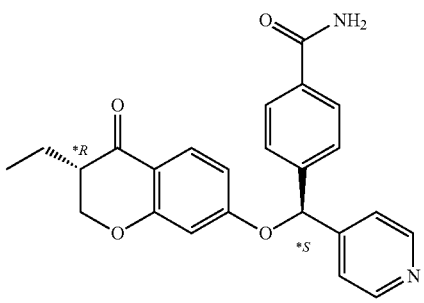 [SMILES: CC[C@H]1COc2cc(O[C@H](c3ccncc3)c3ccc(C(N)=O)cc3)ccc2C1=O]

MS (ESI): mass calcd. for $C_{24}H_{22}N_2O_4$ 402.16 m/z found 403.0 [M+H]⁺. ¹H NMR (400 MHz, DMSO-d₆) δ 8.53 (d, J=6.0 Hz, 2H), 7.92 (s, 1H), 7.86-7.79 (m, 2H), 7.64 (d, J=8.4 Hz, 1H), 7.59-7.54 (m, 2H), 7.51-7.45 (m, 2H), 7.35 (s, 1H), 6.77 (s, 1H), 6.77-6.74 (m, 1H), 6.58 (d, J=2.0 Hz, 1H), 4.47 (dd, J=4.4, 11.2 Hz, 1H), 4.21 (dd, J=8.8, 11.2 Hz, 1H), 1.72-1.60 (m, 1H), 1.44-1.31 (m, 1H), 0.87 (t, J=7.6 Hz, 3H).

Example 46: 4-((1*R)-((3-Ethyl-4-oxochroman-7-yl)oxy)(pyridin-4-yl)methyl)benzamide

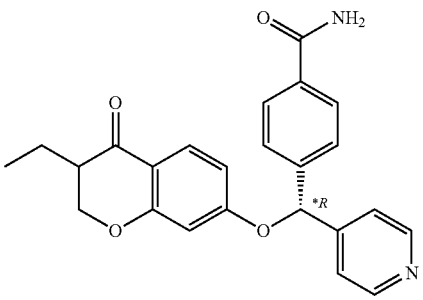 [SMILES: CCC1COc2cc(O[C@@H](c3ccncc3)c3ccc(C(N)=O)cc3)ccc2C1=O]

DIAD (267 mg, 1.32 mmol) was added to a 100 mL three-necked round-bottomed flask containing a solution of 3-ethyl-7-hydroxychroman-4-one (Intermediate 39, 186 mg, 0.968 mmol), (*S)-4-(hydroxy(pyridin-4-yl)methyl)benzamide (Intermediate 107b, 200 mg, 0.876 mmol), PPh₃ (368 mg, 1.40 mmol), and THF (8 mL) under N₂ atmosphere. The mixture was stirred for 16 hours at room temperature before concentrating to dryness under reduced pressure to give the product, which was purified by FCC (eluent:methanol:ethyl acetate, 0:1 to 1:9, gradient elution) to afford impure product (350 mg) as a yellow solid. The post chromatographic product was further purified by preparative HPLC using a Gemini 150×25 mm×5 μm column (eluent: 30% to 60% (v/v) CH₃CN and H₂O with 0.05% NH₃) to afford the title compound (260 mg, 74%) as a white solid. MS (ESI): mass calcd. for $C_{24}H_{22}N_2O_4$ 402.16 m/z found 403.2 [M+H]⁺.

A sample of 4-((1*R)-((3-ethyl-4-oxochroman-7-yl)oxy)(pyridin-4-yl)methyl)benzamide (260 mg, 0.646 mmol) was separated by SFC (Chiralcel OD, 45% (v/v) supercritical CO₂ in EtOH and H₂O with 0.1% NH₃) to yield example 46a (first enantiomer to elute, labelled *R at chiral center on chromanone) and example 46b (second enantiomer to elute, labelled *S at chiral center on chromanone).

Example 46a 4-((*R)—(((*R)-3-ethyl-4-oxochroman-7-yl)oxy)(pyridin-4-yl)methyl)benzamide

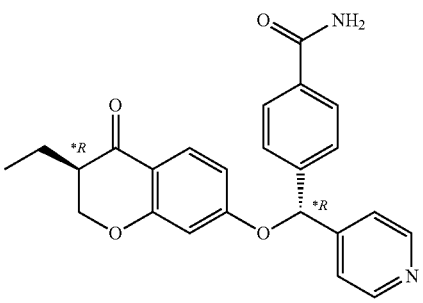 [SMILES: CC[C@@H]1COc2cc(O[C@@H](c3ccncc3)c3ccc(C(N)=O)cc3)ccc2C1=O]

MS (ESI): mass calcd. for $C_{24}H_{22}N_2O_4$ 402.16 m/z found 403.0 [M+H]$^+$. $^1$H NMR (400 MHz, DMSO-$d_6$) δ 8.57 (d, J=5.6 Hz, 1H), 7.96 (br s, 1H), 7.86 (d, J=8.0 Hz, 1H), 7.68 (d, J=8.8 Hz, 1H), 7.61 (d, J=8.2 Hz, 1H), 7.53-7.50 (m, 1H), 7.39 (br s, 1H), 6.81 (s, 1H), 6.81-6.77 (m, 1H), 6.61 (d, J=2.0 Hz, 1H), 4.50 (dd, J=4.4, 11.2 Hz, 1H), 4.25 (dd, J=8.8, 11.2 Hz, 1H), 1.76-1.64 (m, 1H), 1.48-1.36 (m, 1H), 0.91 (t, J=7.2 Hz, 2H).

Example 46b 4-((*R)—(((*S)-3-ethyl-4-oxochroman-7-yl)oxy)(pyridin-4-yl)methyl)benzamide

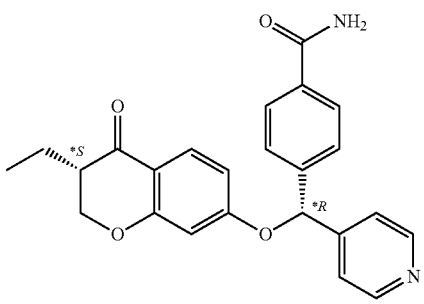 [SMILES: CC[C@H]1COc2cc(O[C@@H](c3ccncc3)c3ccc(C(N)=O)cc3)ccc2C1=O]

MS (ESI): mass calcd. For $C_{24}H_{22}N_2O_4$ 402.16 m/z found 403.0 [M+H]$^+$. $^1$H NMR (400 MHz, DMSO-$d_6$) δ 8.53 (d, J=5.2 Hz, 2H), 7.91 (s, 1H), 7.85-7.80 (m, 2H), 7.64 (d, J=8.8 Hz, 1H), 7.60-7.54 (m, 2H), 7.50-7.45 (m, 2H), 7.34 (s, 1H), 6.77 (s, 1H), 6.77-6.74 (m, 1H), 6.57 (d, J=2.4 Hz, 1H), 4.47 (dd, J=4.4, 11.2 Hz, 1H), 4.21 (dd, J=8.8, 11.6 Hz, 1H), 3.29-3.25 (m, 1H), 1.72-1.61 (m, 1H), 1.44-1.32 (m, 1H), 0.87 (t, J=7.6 Hz, 3H).

Example 47: 4-((1*R)-((4-Oxo-3-phenylchroman-7-yl)oxy)(pyridin-4-yl)methyl)benzamide

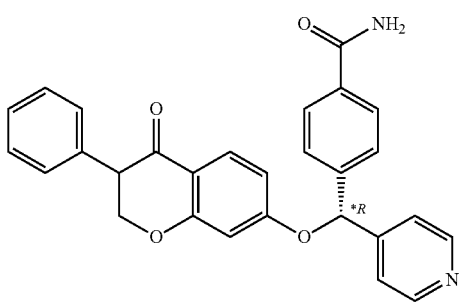 [SMILES: NC(=O)c1ccc([C@@H](Oc2ccc3c(c2)OCC(c2ccccc2)C3=O)c2ccncc2)cc1]

DEAD (290 mg, 1.67 mmol) was added to a solution of (*S)-4-(hydroxy(pyridin-4-yl)methyl)benzamide (Intermediate 107b, 190 mg, 0.832 mmol), 7-hydroxy-3-phenylchroman-4-one (Intermediate 108, 200 mg, 0.832 mmol), PPh$_3$ (437 mg, 1.67 mmol), and dichloromethane (10 mL). The mixture was stirred at room temperature under N$_2$ for 14 hours before concentrating to dryness under reduced pressure to afford the product, which was purified by FCC (eluent:petroleum ether:ethyl acetate, 1:0 to 0:1, gradient elution) to afford the title compound (94 mg, 22%) as a brown solid. An attempt was made to separate the diastereomers of example 47 but the chiral center on the chromanone ring was found to be readily epimerizable, so the sample was tested as a mixture of diastereomers. MS (ESI): mass calcd. for $C_{28}H_{22}N_2O_4$ 450.16 m/z, found 451.0 [M+H]$^+$. $^1$H NMR (400 MHz, DMSO-$d_6$) δ 8.59-8.55 (m, 2H), 7.95 (s, 1H), 7.86 (d, J=8.3 Hz, 2H), 7.73 (d, J=8.8 Hz, 1H), 7.61 (d, J=8.3 Hz, 2H), 7.53-7.50 (m, 2H), 7.38 (s, 1H), 7.34-7.21 (m, 5H), 6.86-6.81 (m, 2H), 6.66 (d, J=2.3 Hz, 1H), 4.72-4.65 (m, 1H), 4.62-4.56 (m, 1H), 4.12-4.06 (m, 1H).

Example 48: (R,S)-4-(((8-Methyl-4-oxochroman-7-yl)oxy)(pyridin-4-yl)methyl)benzamide

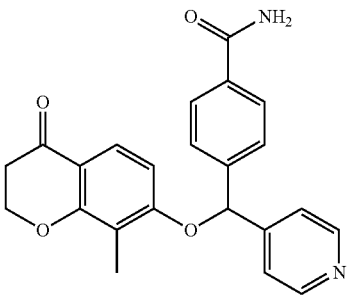

H$_2$O$_2$ (0.8 mL, 30% purity, 8 mmol) was added dropwise to a solution of 4-(((8-methyl-4-oxochroman-7-yl)oxy)(pyridin-4-yl)methyl)benzonitrile (Intermediate 40, 1.0 g, 0.41 mmol, 15% purity), K$_2$CO$_3$ (0.7 g, 5 mmol), and DMSO (9 mL). The mixture was stirred at room temperature for 1 hour before pouring it into saturated Na$_2$SO$_3$ (40 mL), and extracting with ethyl acetate (30 mL×3). The combined organic extracts were dried over anhydrous Na$_2$SO$_4$, filtered, and concentrated to dryness under reduced pressure to give the product which was purified by FCC (eluent:petroleum ether:ethyl acetate, 1:0 to 0:1, gradient elution) to afford the title product.

A sample of (R,S)-4-(((8-methyl-4-oxochroman-7-yl)oxy)(pyridin-4-yl)methyl)benzamide was separated by SFC (Chiralpak AD, 45% (v/v) supercritical CO$_2$ in EtOH and H$_2$O with 0.1% NH$_3$) to yield example 48a (first enantiomer to elute, labelled *R) and example 48b (second enantiomer to elute, labelled *S).

Example 48a (*R)-4-(((8-methyl-4-oxochroman-7-yl)oxy)(pyridin-4-yl)methyl)benzamide

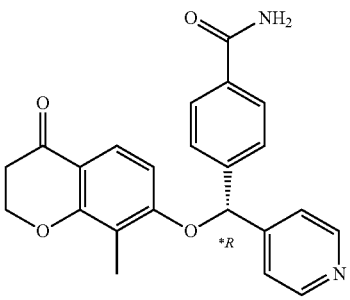

MS (ESI): mass calcd. for $C_{23}H_{20}N_2O_4$ 388.14 m/z found 389.0 [M+H]$^+$. $^1$H NMR (400 MHz, DMSO-$d_6$) δ 8.56-8.49 (m, 2H), 7.90 (br s, 1H), 7.81 (d, J=8.4 Hz, 2H), 7.59 (d, J=8.4 Hz, 2H), 7.53-7.44 (m, 3H), 7.33 (br s, 1H), 6.81 (s, 1H), 6.68 (d, J=8.8 Hz, 1H), 4.49 (t, J=6.4 Hz, 2H), 2.70-2.63 (m, 2H), 2.20 (s, 3H).

Example 48b (*S)-4-(((8-methyl-4-oxochroman-7-yl)oxy)(pyridin-4-yl)methyl)benzamide

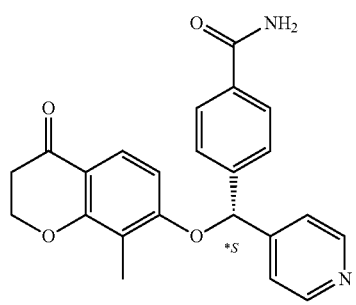

MS (ESI): mass calcd. for C$_{23}$H$_{20}$N$_2$O$_4$ 388.14 m/z found 389.0 [M+H]$^+$. $^1$H NMR (400 MHz, DMSO-d$_6$) δ 8.56 (d, J=5.8 Hz, 2H), 7.94 (br s, 1H), 7.85 (d, J=8.3 Hz, 2H), 7.63 (d, J=8.3 Hz, 2H), 7.56-7.50 (m, 3H), 7.37 (br s, 1H), 6.84 (s, 1H), 6.72 (d, J=9.0 Hz, 1H), 4.53 (t, J=6.3 Hz, 2H), 2.72-2.67 (m, 2H), 2.24 (s, 3H).

Example 49: (R,S)-4-(((6-Methyl-4-oxochroman-7-yl)oxy)(pyridin-4-yl)methyl)benzamide

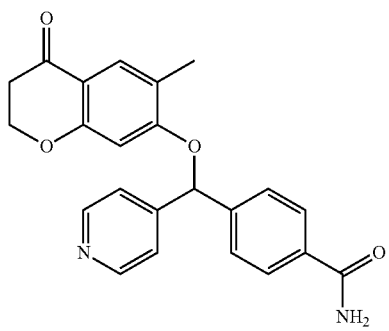 [SMILES: Cc1cc2c(cc1OC(c1ccncc1)c1ccc(C(N)=O)cc1)OCCC2=O]

H$_2$O$_2$ (0.80 mL, 30% purity, 8.0 mmol) was added dropwise to a solution of 4-(((6-methyl-4-oxochroman-7-yl)oxy)(pyridin-4-yl)methyl)benzonitrile (Intermediate 41, 2.0 g, 3.1 mmol), K$_2$CO$_3$ (1.3 g, 9.4 mmol), and DMSO (5 mL). The mixture was stirred at room temperature for 1 hour before pouring it into saturated Na$_2$SO$_3$ (30 mL), and extracting with ethyl acetate (30 mL×2). The combined organic extracts were dried over anhydrous Na$_2$SO$_4$, filtered, and concentrated to dryness under reduced pressure to give the product, which was purified by FCC (eluent: petroleum ether:ethyl acetate, 10:1 to 0:1, gradient elution) to afford the title compound (800 mg, 65%) as a white solid. MS (ESI): mass calcd. for C$_{23}$H$_{20}$N$_2$O$_4$ 388.14 m/z, found 389.0 [M+H]$^+$. $^1$H NMR (400 MHz, DMSO-d$_6$) δ 8.61-8.53 (m, 2H), 7.94 (s, 1H), 7.86 (d, J=8.4 Hz, 2H), 7.64 (d, J=8.2 Hz, 2H), 7.57-7.52 (m, 3H), 7.37 (s, 1H), 6.83 (s, 1H), 6.52 (s, 1H), 4.41 (t, J=6.4 Hz, 2H), 2.64 (t, J=6.4 Hz, 2H), 2.32 (s, 3H).

A sample of (R,S)-4-(((6-methyl-4-oxochroman-7-yl)oxy)(pyridin-4-yl)methyl)benzamide was separated by SFC (Chiralpak AD, 45% (v/v) supercritical CO$_2$ in MeOH and H$_2$O with 0.1% NH$_3$) to yield example 49a (first enantiomer to elute, labelled *R) and example 49b (second enantiomer to elute, labelled *S).

Example 49a (*R)-4-(((6-Methyl-4-oxochroman-7-yl)oxy)(pyridin-4-yl)methyl)benzamide

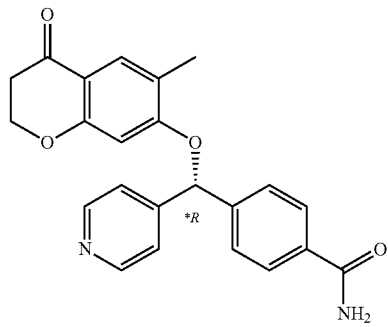 [SMILES: Cc1cc2c(cc1O[C@@H](c1ccncc1)c1ccc(C(N)=O)cc1)OCCC2=O]

MS (ESI): mass calcd. for C$_{23}$H$_{20}$N$_2$O$_4$ 388.14 m/z, found 389.0 [M+H]$^+$. $^1$H NMR (400 MHz, DMSO-d$_6$) δ 8.57-8.51 (m, 2H), 7.91 (s, 1H), 7.82 (d, J=8.4 Hz, 2H), 7.60 (d, J=8.4 Hz, 2H), 7.54-7.48 (m, 3H), 7.34 (s, 1H), 6.80 (s, 1H), 6.48 (s, 1H), 4.38 (t, J=6.4 Hz, 2H), 2.60 (t, J=6.4 Hz, 2H), 2.28 (s, 3H).

Example 49b (*S)-4-(((6-Methyl-4-oxochroman-7-yl)oxy)(pyridin-4-yl)methyl)benzamide

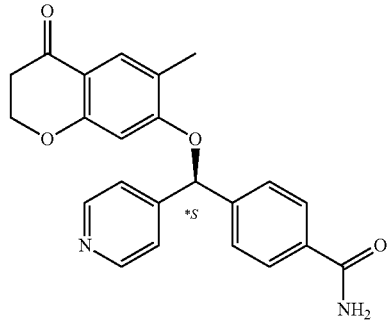 [SMILES: Cc1cc2c(cc1O[C@H](c1ccncc1)c1ccc(C(N)=O)cc1)OCCC2=O]

MS (ESI): mass calcd. for C$_{23}$H$_{20}$N$_2$O$_4$ 388.14 m/z, found 389.0 [M+H]$^+$. $^1$H NMR (400 MHz, DMSO-d$_6$) δ 8.59-8.49 (m, 2H), 7.91 (s, 1H), 7.82 (d, J=8.4 Hz, 2H), 7.60 (d, J=8.4 Hz, 2H), 7.54-7.48 (m, 3H), 7.35 (s, 1H), 6.80 (s, 1H), 6.48 (s, 1H), 4.38 (t, J=6.4 Hz, 2H), 2.60 (t, J=6.4 Hz, 2H), 2.28 (s, 3H).

Example 50: (R,S)-4-(((8-Fluoro-4-oxochroman-7-yl)oxy)(pyridin-4-yl)methyl)benzamide

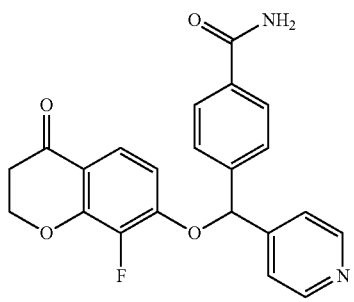

H₂O₂ (0.28 mL, 30% purity, 2.8 mmol) was added dropwise to a solution of 4-(((8-fluoro-4-oxochroman-7-yl)oxy)(pyridin-4-yl)methyl)benzonitrile (Intermediate 41, 350 mg), K₂CO₃ (388 mg, 2.81 mmol), and DMSO (5 mL). The mixture was stirred at room temperature for 1 hour before quenching with saturated Na₂SO₃ (30 mL) and extracting with ethyl acetate (30 mL×3). The combined organic extracts were dried over anhydrous Na₂SO₄, filtered, and concentrated to dryness under reduced pressure to afford the product, which was purified by preparative HPLC using a Phenomenex Gemini 150 mm×25 mm×10 μm column (eluent: 15% to 45% (v/v) CH₃CN and H₂O with 0.05% NH₃) to afford the title compound (110 mg) as a white solid.

A sample of (R,S)-4-(((8-fluoro-4-oxochroman-7-yl)oxy)(pyridin-4-yl)methyl)benzamide (110 mg, 0.280 mmol) was separated by SFC (Chiralpak AD, 45% (v/v) supercritical CO₂ in EtOH and H₂O with 0.1% NH₃) to yield example 50a (first enantiomer to elute, labelled *R) and example 50b (second enantiomer to elute, labelled *S).

Example 50a (*R)-4-(((8-Fluoro-4-oxochroman-7-yl)oxy)(pyridin-4-yl)methyl)benzamide

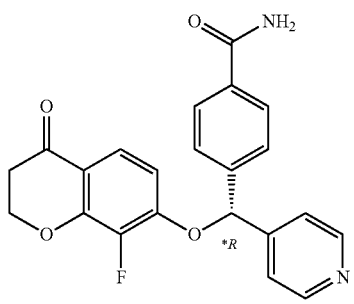 [SMILES: NC(=O)c1ccc([C@@H](Oc2ccc3c(c2F)OCCC3=O)c2ccncc2)cc1]

MS (ESI): mass calcd. for $C_{22}H_{17}FN_2O_4$ 392.12 m/z found 393.0 [M+H]⁺. ¹H NMR (400 MHz, DMSO-d₆) δ 8.70-8.57 (m, 2H), 8.03 (s, 1H), 7.93 (d, J=8.4 Hz, 2H), 7.66 (d, J=8.4 Hz, 2H), 7.57 (d, J=6.0 Hz, 2H), 7.52 (dd, J=1.8, 9.0 Hz, 1H), 7.46 (s, 1H), 6.98-6.91 (m, 2H), 4.68 (t, J=6.3 Hz, 2H), 2.83 (t, J=6.4 Hz, 2H).

Example 50b (*S)-4-(((8-Fluoro-4-oxochroman-7-yl)oxy)(pyridin-4-yl)methyl)benzamide

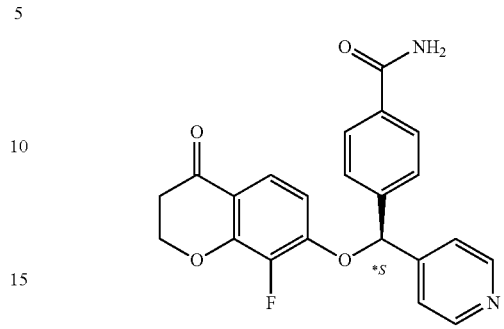

MS (ESI): mass calcd. for $C_{22}H_{17}FN_2O_4$ 392.12 m/z found 393.0 [M+H]⁺. ¹H NMR (400 MHz, DMSO-d₆) δ 8.64 (s, 2H), 8.03 (s, 1H), 7.92 (d, J=8.4 Hz, 2H), 7.66 (d, J=8.4 Hz, 2H), 7.57 (d, J=4.9 Hz, 2H), 7.52 (dd, J=1.9, 8.9 Hz, 1H), 7.46 (s, 1H), 7.00-6.90 (m, 2H), 4.67 (t, J=6.3 Hz, 2H), 2.82 (t, J=6.3 Hz, 2H).

Example 51: (R,S)-4-(((5-Fluoro-4-oxochroman-7-yl)oxy)(pyridin-4-yl)methyl)benzamide

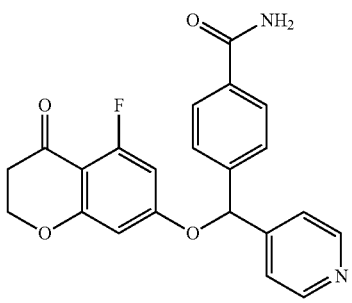

H₂O₂ (0.21 mL, 30% purity, 2.1 mmol) was added dropwise to a solution of 4-(((5-fluoro-4-oxochroman-7-yl)oxy)(pyridin-4-yl)methyl)benzonitrile (Intermediate 42, 260 mg, 0.695 mmol), K₂CO₃ (240 mg, 1.74 mmol), and DMSO (4 mL). The mixture was stirred at room temperature for 1 hour before pouring it into saturated Na₂SO₃ (30 mL), and extracting with ethyl acetate (30 mL×3). The combined organic extracts were dried over anhydrous Na₂SO₄, filtered, and concentrated to dryness under reduced pressure to give the product, which was purified by FCC (eluent:petroleum ether:ethyl acetate, 1:0 to 0:1, gradient elution) to afford the title compound (80 mg, 29%) as a white solid. MS (ESI): mass calcd. for $C_{22}H_{17}FN_2O_4$ 392.12 m/z found 393.1 [M+H]⁺.

A sample of (R,S)-4-(((5-fluoro-4-oxochroman-7-yl)oxy)(pyridin-4-yl)methyl)benzamide was separated by SFC (Chiralpak AD, 40% (v/v) supercritical CO₂ in EtOH and H₂O with 0.1% NH₃) to yield example 51a (first enantiomer to elute, labelled *R) and example 51b (second enantiomer to elute, labelled *S).

Example 51a (*R)-4-(((5-Fluoro-4-oxochroman-7-yl)oxy)(pyridin-4-yl)methyl)benzamide

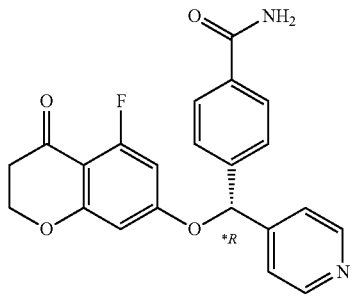 [SMILES: NC(=O)c1ccc([C@@H](Oc2cc(F)c3c(c2)OCCC3=O)c2ccncc2)cc1]

MS (ESI): mass calcd. for $C_{22}H_{17}FN_2O_4$ 392.12 m/z found 393.0 [M+H]$^+$. $^1$H NMR (400 MHz, DMSO-d$_6$) δ 8.61-8.53 (m, 2H), 7.96 (s, 1H), 7.86 (d, J=8.4 Hz, 2H), 7.59 (d, J=8.4 Hz, 2H), 7.50 (d, J=5.7 Hz, 2H), 7.39 (s, 1H), 6.84 (s, 1H), 6.64 (dd, J=2.3, 12.9 Hz, 1H), 6.52-6.49 (m, 1H), 4.46 (t, J=6.3 Hz, 2H), 2.65 (t, J=6.3 Hz, 2H).

Example 51b (*S)-4-(((5-Fluoro-4-oxochroman-7-yl)oxy)(pyridin-4-yl)methyl)benzamide

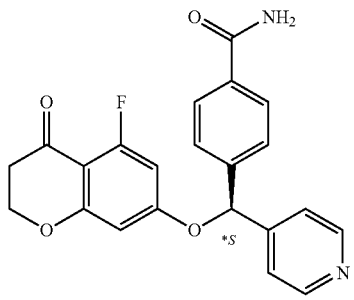 [SMILES: NC(=O)c1ccc([C@H](Oc2cc(F)c3c(c2)OCCC3=O)c2ccncc2)cc1]

MS (ESI): mass calcd. for $C_{22}H_{17}FN_2O_4$ 392.12 m/z found 393.0 [M+H]$^+$. $^1$H NMR (400 MHz, DMSO-d$_6$) δ 8.69-8.58 (m, 2H), 7.97 (s, 1H), 7.87 (d, J=8.4 Hz, 2H), 7.60 (d, J=8.4 Hz, 2H), 7.51 (d, J=5.7 Hz, 2H), 7.40 (s, 1H), 6.85 (s, 1H), 6.66 (dd, J=2.3, 12.9 Hz, 1H), 6.53-6.51 (m, 1H), 4.47 (t, J=6.4 Hz, 2H), 2.67 (t, J=6.4 Hz, 2H).

Example 52: (R,S)-4-(((6-Fluoro-4-oxochroman-7-yl)oxy)(pyridin-4-yl)methyl)benzamide

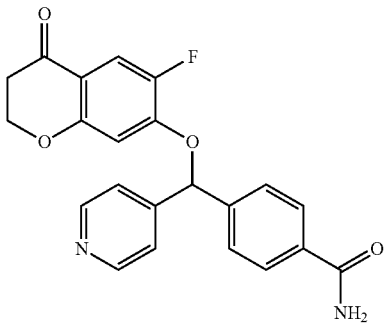

H$_2$O$_2$ (0.64 mL, 30% purity, 6.4 mmol) was added dropwise to a solution of 4-(((6-fluoro-4-oxochroman-7-yl)oxy)(pyridin-4-yl)methyl)benzonitrile (Intermediate 43, 800 mg, 2.14 mmol), K$_2$CO$_3$ (886 mg, 6.41 mmol), and DMSO (5 mL). The mixture was stirred at room temperature for 1 hour before quenching with saturated Na$_2$SO$_3$ (30 mL) and extracting with ethyl acetate (30 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 20:1 to 0:1, gradient elution) to afford the title compound (510 mg, 60%) as a white solid. MS (ESI): mass calcd. for $C_{22}H_{17}FN_2O_4$ 392.12 m/z found 393.0 [M+H]$^+$.

A sample of (R,S)-4-(((6-fluoro-4-oxochroman-7-yl)oxy)(pyridin-4-yl)methyl)benzamide (360 mg, 0.917 mmol) was separated by SFC (Chiralpak AS, 45% to 45% (v/v) supercritical CO$_2$ in EtOH and H$_2$O with 0.1% NH$_3$) to yield example 52a (first enantiomer to elute, labelled *R) and example 52b (second enantiomer to elute, labelled *S).

Example 52a (*R)-4-(((6-Fluoro-4-oxochroman-7-yl)oxy)(pyridin-4-yl)methyl)benzamide

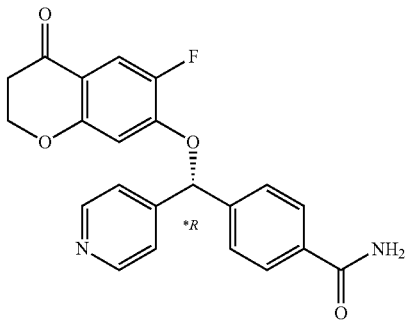 [SMILES: NC(=O)c1ccc([C@@H](Oc2cc3c(cc2F)C(=O)CCO3)c2ccncc2)cc1]

MS (ESI): mass calcd. for $C_{22}H_{17}FN_2O_4$ 392.12 m/z found 393.0 [M+H]$^+$. $^1$H NMR (400 MHz, DMSO-d$_6$) δ 8.59-8.55 (m, 2H), 7.95 (br s, 1H), 7.86 (d, J=8.4 Hz, 2H), 7.58 (d, J=8.4 Hz, 2H), 7.50-7.45 (m, 3H), 7.37 (br s, 1H), 6.89 (s, 1H), 6.77 (d, J=6.8 Hz, 1H), 4.44 (t, J=6.4 Hz, 2H), 2.66 (t, J=6.4 Hz, 2H).

Example 52b (*S)-4-(((6-Fluoro-4-oxochroman-7-yl)oxy)(pyridin-4-yl)methyl)benzamide

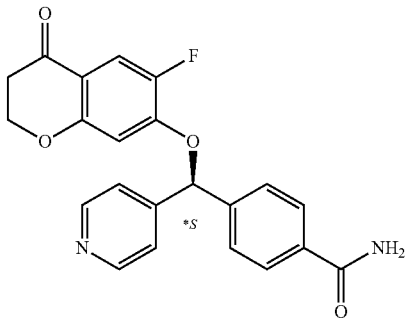 [SMILES: NC(=O)c1ccc([C@H](Oc2cc3c(cc2F)C(=O)CCO3)c2ccncc2)cc1]

MS (ESI): mass calcd. for $C_{22}H_{17}FN_2O_4$ 392.12 m/z found 393.0 [M+H]$^+$. $^1$H NMR (400 MHz, DMSO-d$_6$) δ

8.60-8.51 (m, 2H), 7.93 (br s, 1H), 7.84 (d, J=8.4 Hz, 2H), 7.57 (d, J=8.2 Hz, 2H), 7.49-7.43 (m, 3H), 7.36 (br s, 1H), 6.88 (s, 1H), 6.75 (d, J=6.8 Hz, 1H), 4.42 (t, J=6.5 Hz, 2H), 2.65 (t, J=6.4 Hz, 2H).

Example 53: (R,S)-4-(((4-Oxo-8-phenylchroman-7-yl)oxy)(pyridin-4-yl)methyl)benzamide

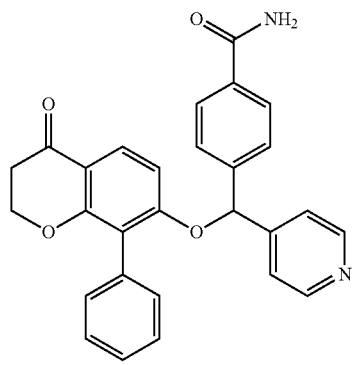 [SMILES: NC(=O)c1ccc(C(Oc2ccc3c(c2-c2ccccc2)OCCC3=O)c2ccncc2)cc1]

H$_2$O$_2$ (0.09 mL, 30% purity, 0.9 mmol) was added dropwise to a solution of 4-(((4-oxo-8-phenylchroman-7-yl)oxy)(pyridin-4-yl)methyl)benzonitrile (Intermediate 44, 80 mg, mixture with PPh$_{3O}$), K$_2$CO$_3$ (128 mg, 0.926 mmol), and DMSO (5 mL). The mixture was stirred at room temperature for 2 hours before treating with saturated Na$_2$SO$_3$ (10 mL), and extracting with ethyl acetate (10 mL×3). The combined organic extracts were washed with brine (10 mL), dried over anhydrous Na$_2$SO$_4$, filtered, and concentrated to dryness under reduced pressure to afford the product, which was purified by preparative TLC (eluent: ethyl acetate) to afford the title compound (30 mg) as a yellow solid. MS (ESI): mass calcd. for C$_{28}$H$_{22}$N$_2$O$_4$ 450.16 m/z found 451.2 [M+H]$^+$.

A sample of (R,S)-4-(((4-oxo-8-phenylchroman-7-yl)oxy)(pyridin-4-yl)methyl)benzamide (50 mg, 0.10 mmol) was separated by SFC (Chiralcel OD, 45% (v/v) supercritical CO$_2$ in EtOH and H$_2$O with 0.1% NH$_3$) to yield example 53a (first enantiomer to elute, labelled *R) and example 53b (second enantiomer to elute, labelled *S).

Example 53a (*R)-4-(((4-oxo-8-phenylchroman-7-yl)oxy)(pyridin-4-yl)methyl)benzamide

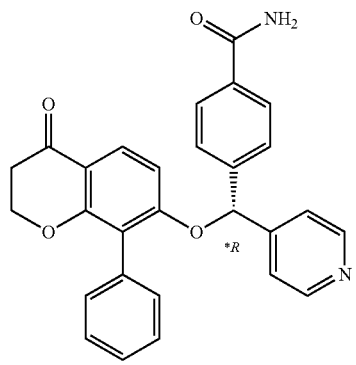 [SMILES: NC(=O)c1ccc([C@@H](Oc2ccc3c(c2-c2ccccc2)OCCC3=O)c2ccncc2)cc1]

MS (ESI): mass calcd. for C$_{28}$H$_{22}$N$_2$O$_4$ 450.16 m/z found 451.0 [M+H]$^+$. $^1$H NMR (400 MHz, DMSO-d$_6$) δ 8.48-8.43 (m, 2H), 7.90 (s, 1H), 7.75 (d, J=8.5 Hz, 2H), 7.69 (d, J=8.8 Hz, 1H), 7.55-7.48 (m, 2H), 7.46-7.40 (m, 3H), 7.38-7.32 (m, 3H), 7.26-7.22 (m, 2H), 6.83 (d, J=9.0 Hz, 1H), 6.79 (s, 1H), 4.43 (t, J=6.1 Hz, 2H), 2.72-2.67 (m, 2H).

Example 53b (*S)-4-(((4-oxo-8-phenylchroman-7-yl)oxy)(pyridin-4-yl)methyl)benzamide

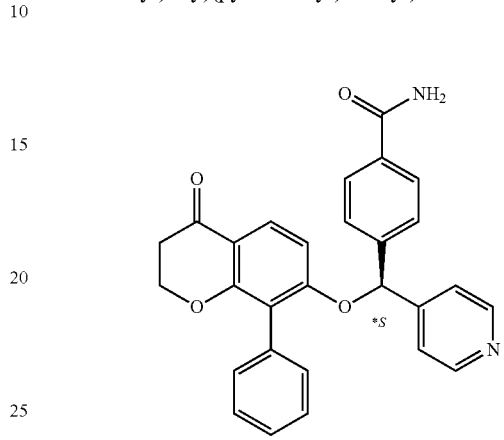

MS (ESI): mass calcd. for C$_{28}$H$_{22}$N$_2$O$_4$ 450.16 m/z found 451.0 [M+H]$^+$. $^1$H NMR (400 MHz, DMSO-d$_6$) δ 8.49-8.43 (m, 2H), 7.90 (s, 1H), 7.76 (d, J=8.3 Hz, 2H), 7.69 (d, J=9.0 Hz, 1H), 7.55-7.48 (m, 2H), 7.47-7.40 (m, 3H), 7.38-7.33 (m, 3H), 7.28-7.22 (m, 2H), 6.84 (d, J=9.0 Hz, 1H), 6.80 (s, 1H), 4.44 (t, J=6.3 Hz, 2H), 2.72-2.67 (m, 2H).

Example 54: (R,S)-4-(((4-Oxo-6-phenylchroman-7-yl)oxy)(pyridin-4-yl)methyl)benzamide

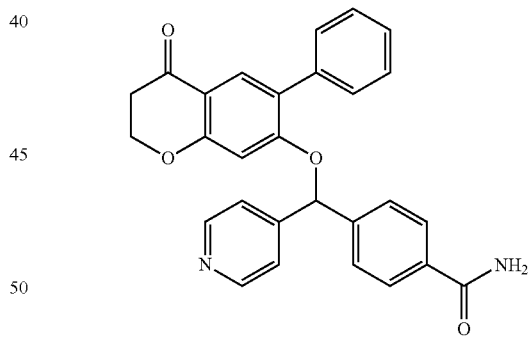

H$_2$O$_2$ (1.4 mL, 30% purity, 14 mmol) was added dropwise to a 25 mL round-bottomed flask containing a solution of 4-(((4-oxo-6-phenylchroman-7-yl)oxy)(pyridin-4-yl)methyl)benzonitrile (Intermediate 45, 500 mg, 61% purity, 0.705 mmol), K$_2$CO$_3$ (1.22 g, 8.83 mmol), and DMSO (5 mL). The mixture was stirred at room temperature for 1 hour before pouring it into saturated Na$_2$SO$_3$ (10 mL), and extracting with ethyl acetate (20 mL×3). The combined organic extracts were dried over anhydrous Na$_2$SO$_4$, filtered, and concentrated to dryness under reduced pressure to give the product, which was purified by FCC (petroleum ether: ethyl acetate, 1:0 to 0:1, gradient elution) and further purified by preparative HPLC using a Phenomenex Gemini 150 mm×25 mm×10 μm column (eluent: 30% to 60% (v/v)

CH₃CN and H₂O with 0.05% NH₃) to afford the title compound (100 mg, 52%) as a white solid.

A sample of (R,S)-4-(((4-oxo-6-phenylchroman-7-yl)oxy)(pyridin-4-yl)methyl)benzamide was separated by SFC (Chiralcel OD, 40% (v/v) supercritical CO₂ in EtOH and H₂O with 0.1% NH₃) to yield example 54a (first enantiomer to elute, labelled *R) and example 54b (second enantiomer to elute, labelled *S).

Example 54a (*R)-4-(((4-oxo-6-phenylchroman-7-yl)oxy)(pyridin-4-yl)methyl)benzamide

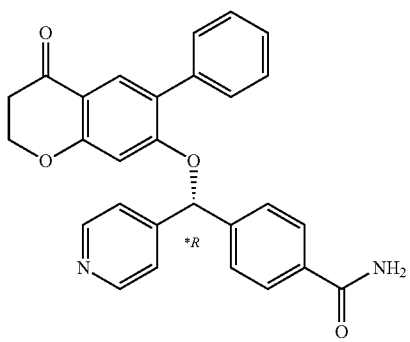 [SMILES: NC(=O)c1ccc([C@@H](Oc2cc3c(cc2-c2ccccc2)C(=O)CCO3)c2ccncc2)cc1]

MS (ESI): mass calcd. for C₂₈H₂₂N₂O₄ 450.16 m/z found 451.0 [M+H]⁺. ¹H NMR (400 MHz, DMSO-d₆) δ 8.54-8.50 (m, 2H), 7.93 (s, 1H), 7.81 (d, J=8.6 Hz, 2H), 7.65 (s, 1H), 7.61-7.56 (m, 2H), 7.54-7.47 (m, 4H), 7.45-7.41 (m, 1H), 7.41-7.38 (m, 2H), 7.37 (s, 1H), 6.86 (s, 1H), 6.66 (s, 1H), 4.50 (t, J=6.4 Hz, 2H), 2.71 (t, J=6.3 Hz, 2H).

Example 54b (*S)-4-(((4-oxo-6-phenylchroman-7-yl)oxy)(pyridin-4-yl)methyl)benzamide

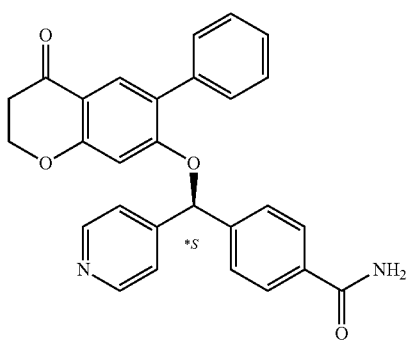 [SMILES: NC(=O)c1ccc([C@H](Oc2cc3c(cc2-c2ccccc2)C(=O)CCO3)c2ccncc2)cc1]

MS (ESI): mass calcd. for C₂₈H₂₂N₂O₄ 450.16 m/z found 451.0 [M+H]⁺. ¹H NMR (400 MHz, DMSO-d₆) δ 8.55-8.49 (m, 2H), 7.92 (s, 1H), 7.81 (d, J=8.4 Hz, 2H), 7.65 (s, 1H), 7.60-7.57 (m, 2H), 7.54-7.48 (m, 4H), 7.45-7.41 (m, 1H), 7.41-7.38 (m, 2H), 7.36 (s, 1H), 6.86 (s, 1H), 6.66 (s, 1H), 4.50 (t, J=6.4 Hz, 2H), 2.71 (t, J=6.4 Hz, 2H).

Example 55: 4-((1*R)-((3-(Hydroxymethyl)-4-oxochroman-7-yl)oxy)(pyridin-4-yl)methyl)benzamide

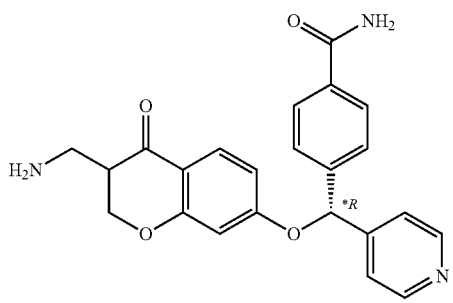 [SMILES: NCC1COc2cc(O[C@@H](c3ccncc3)c3ccc(C(N)=O)cc3)ccc2C1=O]

TFA (1 mL) was added to a solution of 4-((1*R)-((3-(((tert-butyldimethylsilyl)oxy)methyl)-4-oxochroman-7-yl)oxy)(pyridin-4-yl)methyl)benzamide (Intermediate 46, 260 mg, 0.501 mmol) in dichloromethane (4 mL). The mixture was stirred at room temperature for 1 hour before concentrating to dryness under reduced pressure. The residue was diluted with water (20 mL) and extracted with ethyl acetate (20 mL×2). The organic extracts were dried over anhydrous Na₂SO₄, filtered and concentrated to dryness under reduced pressure to give the product, which was purified by FCC (eluent:petroleum ether:ethyl acetate, 1:0 to 0:1, gradient elution) and then further purified by preparative HPLC using a Phenomenex Gemini 150×25 mm×10 μm column (eluent: 10% to 40% (v/v) CH₃CN and H₂O with 0.05% NH₃) to afford the title compound (100 mg, 49%) as a white solid. An attempt was made to separate the diastereomers of example 55 but the chiral center on the chromanone ring was found to be readily epimerizable, so the sample was tested as a mixture of diastereomers. MS (ESI): mass calcd. for C₂₃H₂₀N₂O₅ 404.14 m/z found 405.0 [M+H]⁺. ¹H NMR (400 MHz, DMSO-d₆) δ 8.53 (d, J=5.1 Hz, 2H), 7.92 (s, 1H), 7.86-7.79 (m, 2H), 7.63 (d, J=8.8 Hz, 1H), 7.57 (d, J=7.9 Hz, 2H), 7.48 (d, J=5.3 Hz, 2H), 7.35 (s, 1H), 6.79-6.74 (m, 2H), 6.58 (d, J=2.2 Hz, 1H), 4.82 (br s, 1H), 4.52 (dd, J=11.4, 4.7 Hz, 1H), 4.35 (dd, J=11.2, 9.3 Hz, 1H), 3.69-3.53 (m, 2H), 2.79-2.69 (m, 1H).

Example 56: (R,S)-4-(((3,3-Dimethyl-4-oxochroman-7-yl)oxy)(pyridin-4-yl)methyl)benzamide

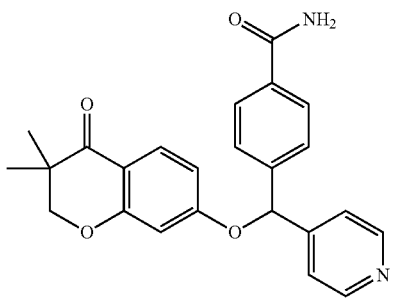 [SMILES: CC1(C)COc2cc(OC(c3ccncc3)c3ccc(C(N)=O)cc3)ccc2C1=O]

H₂O₂ (123 μL, 30% purity, 1.56 mmol) was added dropwise to a solution of 4-(((3,3-dimethyl-4-oxochroman-7-yl)oxy)(pyridin-4-yl)methyl)benzonitrile (Intermediate 47, 400 mg), K₂CO₃ (180 mg, 1.30 mmol), and DMSO (6 mL). The mixture was stirred at room temperature for 1 hour before pouring it into saturated Na$_2$SO$_3$ (30 mL) and extracting with ethyl acetate (50 mL×3). The combined organic extracts were dried over anhydrous Na$_2$SO$_4$, filtered, and concentrated to dryness under reduced pressure to give the product, which was purified by preparative HPLC using a Gemini 150 mm×25 mm×5 μm column (eluent: 20% to 50% (v/v) CH$_3$CN and H$_2$O with 0.05% NH$_3$) to afford the title compound (120 mg, 57%) as a white solid. MS: mass calcd. for C$_{24}$H$_{22}$N$_2$O$_4$ 402.16, m/z found 403.0 [M+H]$^+$.

A sample of (R,S)-4-(((3,3-dimethyl-4-oxochroman-7-yl)oxy)(pyridin-4-yl)methyl)benzamide (120 mg, 0.298 mmol) was separated by SFC (YMC CHIRAL Amylose-C, 40% (v/v) supercritical CO$_2$ in EtOH and H$_2$O with 0.1% NH$_3$) to yield example 56a (first enantiomer to elute, labelled *R) and example 56b (second enantiomer to elute, labelled *S).

Example 56a (*R)-4-(((3,3-dimethyl-4-oxochroman-7-yl)oxy)(pyridin-4-yl)methyl)benzamide

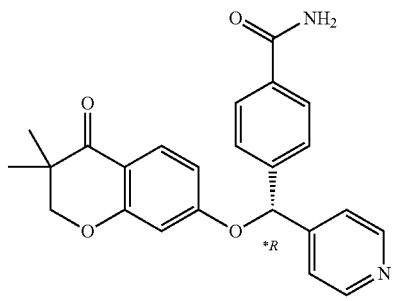 [SMILES: CC1(C)COc2cc(O[C@@H](c3ccncc3)c3ccc(C(N)=O)cc3)ccc2C1=O]

MS: mass calcd. for C$_{24}$H$_{22}$N$_2$O$_4$ 402.16, m/z found 403.0 [M+H]$^+$. $^1$H NMR (400 MHz, DMSO-d$_6$) δ 8.57-8.50 (m, 2H), 7.91 (s, 1H), 7.85-7.79 (m, 2H), 7.65 (d, J=8.8 Hz, 1H), 7.59-7.53 (m, 2H), 7.50-7.45 (m, 2H), 7.35 (s, 1H), 6.80-6.76 (m, 2H), 6.59 (d, J=2.2 Hz, 1H), 4.13 (s, 2H), 1.01 (s, 6H).

Example 56b (*S)-4-(((3,3-dimethyl-4-oxochroman-7-yl)oxy)(pyridin-4-yl)methyl)benzamide

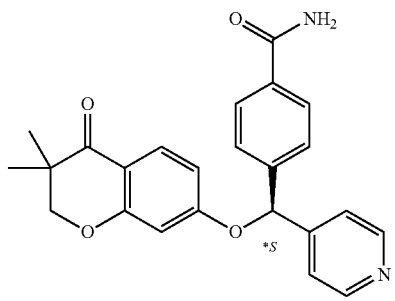 [SMILES: CC1(C)COc2cc(O[C@H](c3ccncc3)c3ccc(C(N)=O)cc3)ccc2C1=O]

MS: mass calcd. for C$_{24}$H$_{22}$N$_2$O$_4$ 402.16, m/z found 403.0 [M+H]$^+$. $^1$H NMR (400 MHz, DMSO-d$_6$) δ 8.58-8.50 (m, 2H), 7.92 (s, 1H), 7.86-7.79 (m, 2H), 7.65 (d, J=8.8 Hz, 1H), 7.60-7.54 (m, 2H), 7.50-7.46 (m, 2H), 7.35 (s, 1H), 6.81-6.75 (m, 2H), 6.59 (d, J=2.4 Hz, 1H), 4.13 (s, 2H), 1.01 (s, 6H).

Example 57: (R,S)-4-((4-Chlorophenyl)((8-methyl-4-oxochroman-7-yl)oxy)methyl)benzamide

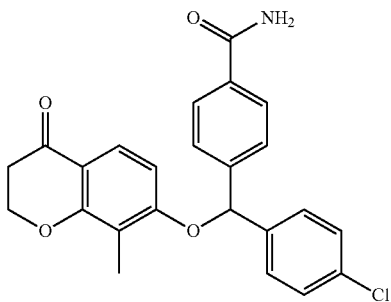 [SMILES: Cc1c(OC(c2ccc(Cl)cc2)c2ccc(C(N)=O)cc2)ccc2c1OCCC2=O]

H$_2$O$_2$ (2.0 mL, 30% purity, 20 mmol) was added dropwise to a 25 mL round-bottomed flask containing a mixture of 4-((4-chlorophenyl)((8-methyl-4-oxochroman-7-yl)oxy)methyl)benzonitrile (Intermediate 48, 1.0 g, 58% purity, 1.5 mmol), K$_2$CO$_3$ (2.0 g, 14 mmol), and DMSO (5 mL). The mixture was stirred at room temperature for 1 hour before pouring it into saturated Na$_2$SO$_3$ (10 mL) and extracting with ethyl acetate (20 mL×3). The combined organic extracts were dried over anhydrous Na$_2$SO$_4$, filtered, and concentrated to dryness under reduced pressure to afford the product, which was purified by preparative HPLC using a Phenomenex Gemini 150 mm×50 mm×10 μm column (eluent: 40% to 70% (v/v) CH$_3$CN and water (0.05% HCl)) to afford the title compound (200 mg, 33%) as a white solid. MS (ESI): mass calcd. for C$_{24}$H$_{20}$ClNO$_4$ 421.11 m/z found 422.1 [M+H]$^+$.

A sample of (R,S)-4-((4-chlorophenyl)((8-methyl-4-oxochroman-7-yl)oxy)methyl)benzamide (200 mg, 0.474 mmol) was separated by SFC (Chiralpak AD, 55% (v/v) supercritical CO$_2$ in EtOH and H$_2$O with 0.1% NH$_3$) to yield example 57a (first enantiomer to elute, labelled *R) and example 57b (second enantiomer to elute, labelled *S).

Example 57a (*R)-4-((4-chlorophenyl)((8-methyl-4-oxochroman-7-yl)oxy)methyl)benzamide

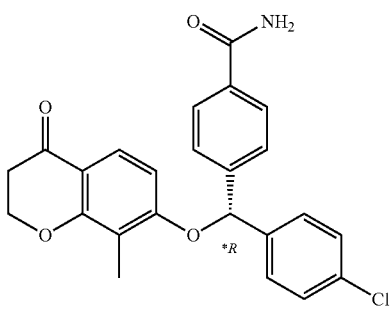 [SMILES: Cc1c(O[C@@H](c2ccc(Cl)cc2)c2ccc(C(N)=O)cc2)ccc2c1OCCC2=O]

MS (ESI): mass calcd. for C$_{24}$H$_{20}$ClNO$_4$ 421.11 m/z found 422.0 [M+H]$^+$. $^1$H NMR (400 MHz, DMSO-d$_6$) δ 7.93 (s, 1H), 7.84 (d, J=8.4 Hz, 2H), 7.61-7.53 (m, 4H), 7.51 (d, J=8.8 Hz, 1H), 7.43 (d, J=8.4 Hz, 2H), 7.36 (s, 1H), 6.81 (s, 1H), 6.72 (d, J=9.0 Hz, 1H), 4.52 (t, J=6.3 Hz, 2H), 2.68 (t, J=6.3 Hz, 2H), 2.20 (s, 3H).

Example 57b (*S)-4-((4-chlorophenyl)((8-methyl-4-oxochroman-7-yl)oxy)methyl)benzamide

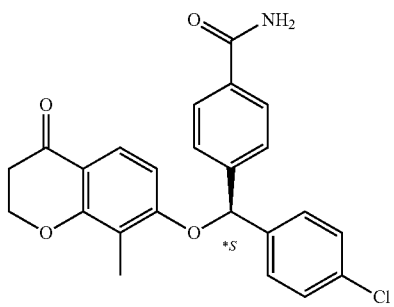 [SMILES: Cc1c(O[C@H](c2ccc(Cl)cc2)c2ccc(C(N)=O)cc2)ccc2c1OCCC2=O]

MS (ESI): mass calcd. for $C_{24}H_{20}ClNO_4$ 421.11 m/z found 422.0 [M+H]$^+$. $^1$H NMR (400 MHz, DMSO-d$_6$) δ 7.93 (s, 1H), 7.84 (d, J=8.4 Hz, 2H), 7.62-7.53 (m, 4H), 7.51 (d, J=8.8 Hz, 1H), 7.43 (d, J=8.4 Hz, 2H), 7.37 (s, 1H), 6.81 (s, 1H), 6.72 (d, J=8.8 Hz, 1H), 4.52 (t, J=6.3 Hz, 2H), 2.68 (t, J=6.3 Hz, 2H), 2.20 (s, 3H).

Example 58: (R,S)-4-(((6-Fluoro-8-methyl-4-oxochroman-7-yl)oxy)(pyridin-4-yl)methyl)benzamide

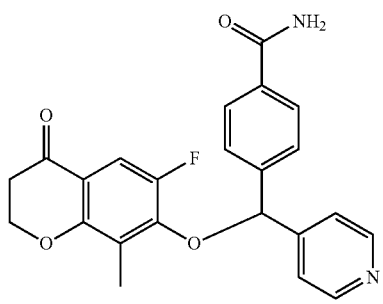 [SMILES: Cc1c(OC(c2ccncc2)c2ccc(C(N)=O)cc2)c(F)cc2c1OCCC2=O]

H$_2$O$_2$ (0.08 mL, 30% purity, 0.8 mmol) was added dropwise to a solution of 4-(((4-oxo-8-phenylchroman-7-yl)oxy)(pyridin-4-yl)methyl)benzonitrile (Intermediate 49, 80 mg, 0.21 mmol), K$_2$CO$_3$ (114 mg, 0.825 mmol), and DMSO (5 mL). The mixture was stirred at room temperature for 2 hours before quenching withe saturated Na$_2$SO$_3$ (10 mL) and extracting with ethyl acetate (10 mL×3). The combined organic extracts were washed with brine (10 mL), dried over anhydrous Na$_2$SO$_4$, filtered, and concentrated to dryness under reduced pressure to give the product, which was purified by preparative TLC (eluent: ethyl acetate) to afford the compound (30 mg, 36%) as a white solid. MS (ESI): mass calcd. for $C_{23}H_{19}FN_2O_4$ 406.13 m/z found 407.0 [M+H]$^+$.

A sample of (R,S)-4-(((6-fluoro-8-methyl-4-oxochroman-7-yl)oxy)(pyridin-4-yl)methyl)benzamide was separated by SFC (YMC CHIRAL Amylose-C, 45% (v/v) supercritical CO$_2$ in EtOH and H$_2$O with 0.1% NH$_3$) to yield example 58a (first enantiomer to elute, labelled *R) and example 58b (second enantiomer to elute, labelled *S).

Example 58a (*R)-4-(((6-fluoro-8-methyl-4-oxochroman-7-yl)oxy)(pyridin-4-yl)methyl)benzamide

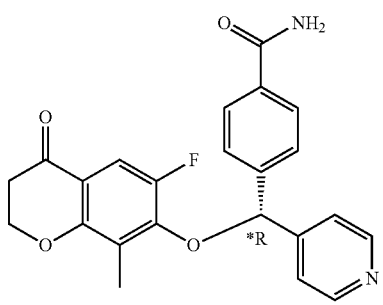 [SMILES: Cc1c(O[C@@H](c2ccncc2)c2ccc(C(N)=O)cc2)c(F)cc2c1OCCC2=O]

MS (ESI): mass calcd. for $C_{23}H_{19}FN_2O_4$ 406.13 m/z found 407.0 [M+H]$^+$. $^1$H NMR (400 MHz, DMSO-d$_6$) δ 8.61-8.53 (m, 2H), 7.96 (s, 1H), 7.83 (d, J=8.4 Hz, 2H), 7.58-7.48 (m, 4H), 7.39 (s, 1H), 7.33 (d, J=11.7 Hz, 1H), 6.57 (s, 1H), 4.52 (t, J=6.4 Hz, 2H), 2.73 (t, J=6.4 Hz, 2H), 2.04 (s, 3H).

Example 58b (*S)-4-(((6-fluoro-8-methyl-4-oxochroman-7-yl)oxy)(pyridin-4-yl)methyl)benzamide

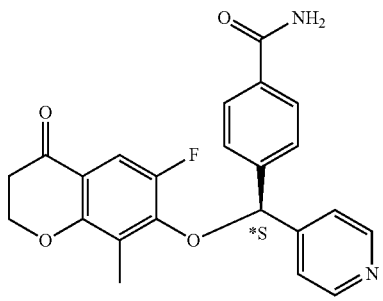 [SMILES: Cc1c(O[C@H](c2ccncc2)c2ccc(C(N)=O)cc2)c(F)cc2c1OCCC2=O]

MS (ESI): mass calcd. for $C_{23}H_{19}FN_2O_4$ 406.13 m/z found 407.0 [M+H]$^+$. $^1$H NMR (400 MHz, DMSO-d$_6$) δ 8.61-8.53 (m, 2H), 7.96 (s, 1H), 7.83 (d, J=8.4 Hz, 2H), 7.58-7.49 (m, 4H), 7.39 (s, 1H), 7.32 (d, J=11.7 Hz, 1H), 6.57 (s, 1H), 4.52 (t, J=6.4 Hz, 2H), 2.73 (t, J=6.4 Hz, 2H), 2.04 (s, 3H).

Example 59: (R,S)-4-((4-Cyanophenyl)((8-methyl-4-oxochroman-7-yl)oxy)methyl)benzamide

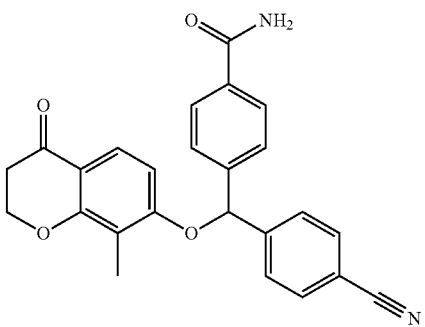 [SMILES: Cc1c(OC(c2ccc(C#N)cc2)c2ccc(C(N)=O)cc2)ccc2c1OCCC2=O]

Zn(CN)$_2$ (190 mg, 1.62 mmol) was added to a mixture of 4-((4-bromophenyl)((8-methyl-4-oxochroman-7-yl)oxy)methyl)benzamide (Intermediate 50, 850 mg, 1.41 mmol), Zn (20 mg, 0.31 mmol), and DMA (6 mL). The mixture was sparged with N$_2$ for 5 minutes and then treated with Pd(dppf)Cl$_2$ (105 mg, 0.144 mmol). The mixture was sparged with N$_2$ for another 5 minutes and then stirred while heating at 160° C. for 1.5 hours before cooling to room temperature. The suspension was filtered through a pad of diatomaceous earth and the pad washed with ethyl acetate (5 mL). The filtrate was poured into water (20 mL) and the mixture extracted with ethyl acetate (20 mL×3). The combined organic extracts were washed with brine (20 mL), dried over anhydrous Na$_2$SO$_4$, filtered, and concentrated to dryness under reduced pressure to give the product, which was purified by FCC (eluent:petroleum ether:ethyl acetate, 10:1 to 0:1, gradient elution) and then was further purified by preparative HPLC using a Phenomenex Gemini 150×25 mm×5 μm column (eluent: 30% to 60% (v/v) CH$_3$CN and H$_2$O with 0.05% NH$_3$) to afford the title compound (350 mg, 60%) as a white solid. MS (ESI): mass calcd. for C$_{25}$H$_{20}$N$_2$O$_4$ 412.14 m/z found 413.0 [M+H]$^+$.

A sample of (R,S)-4-((4-cyanophenyl)((8-methyl-4-oxochroman-7-yl)oxy)methyl)benzamide was separated by SFC (YMC CHIRAL Amylose-C, 55% (v/v) supercritical CO$_2$ in EtOH and H$_2$O with 0.1% NH$_3$) to yield example 59a (first enantiomer to elute, labelled *R) and example 59b (second enantiomer to elute, labelled *S).

Example 59a (*R)-4-((4-cyanophenyl)((8-methyl-4-oxochroman-7-yl)oxy)methyl)benzamide

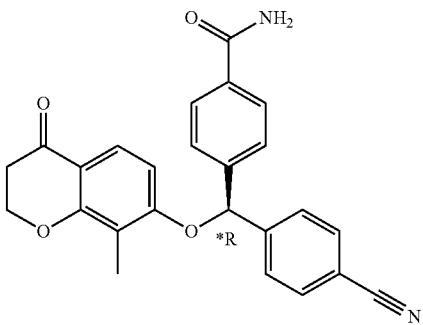 [SMILES: Cc1c(O[C@H](c2ccc(C#N)cc2)c2ccc(C(N)=O)cc2)ccc2c1OCCC2=O]

MS (ESI): mass calcd. for C$_{25}$H$_{20}$N$_2$O$_4$ 412.14 m/z found 413.0 [M+H]$^+$. $^1$H NMR (400 MHz, DMSO-d$_6$) δ 7.94 (s, 1H), 7.87-7.82 (m, 4H), 7.75 (d, J=8.3 Hz, 2H), 7.61 (d, J=8.3 Hz, 2H), 7.51 (d, J=8.8 Hz, 1H), 7.37 (s, 1H), 6.91 (s, 1H), 6.71 (d, J=9.0 Hz, 1H), 4.52 (t, J=6.3 Hz, 2H), 2.69 (t, J=6.4 Hz, 2H), 2.22 (s, 3H).

Example 59b (*S)-4-((4-cyanophenyl)((8-methyl-4-oxochroman-7-yl)oxy)methyl)benzamide

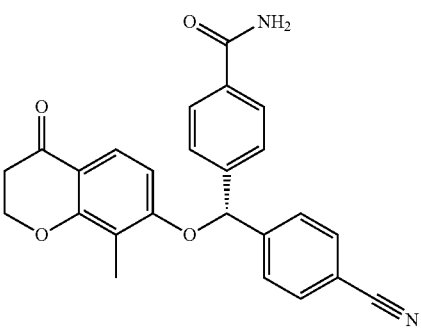 [SMILES: Cc1c(O[C@@H](c2ccc(C#N)cc2)c2ccc(C(N)=O)cc2)ccc2c1OCCC2=O]

MS (ESI): mass calcd. for C$_{25}$H$_{20}$N$_2$O$_4$ 412.14 m/z found 413.0 [M+H]$^+$. $^1$H NMR (400 MHz, DMSO-d$_6$) δ 7.94 (s, 1H), 7.87-7.81 (m, 4H), 7.77-7.73 (m, 2H), 7.61 (d, J=8.4 Hz, 2H), 7.51 (d, J=8.6 Hz, 1H), 7.37 (s, 1H), 6.91 (s, 1H), 6.71 (d, J=9.0 Hz, 1H), 4.52 (t, J=6.4 Hz, 2H), 2.69 (t, J=6.4 Hz, 2H), 2.22 (s, 3H).

Example 60: (R,S)-4-((3-Cyanophenyl)((8-methyl-4-oxochroman-7-yl)oxy)methyl)benzamide

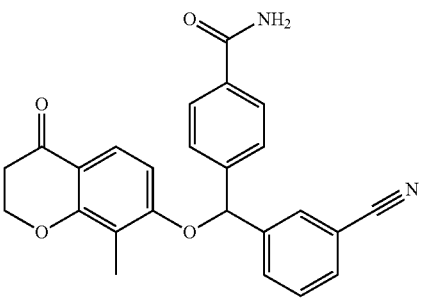 [SMILES: Cc1c(OC(c2ccc(C(N)=O)cc2)c2cccc(C#N)c2)ccc2c1OCCC2=O]

Zn(CN)$_2$ (211 mg, 1.80 mmol) was added to a mixture of 4-((3-bromophenyl)((8-methyl-4-oxochroman-7-yl)oxy)methyl)benzonitrile (Intermediate 51, 1.0 g, 1.5 mmol), Zn (20 mg, 0.31 mmol), and DMA (10 mL). The mixture was sparged with Ar for 5 minutes and then treated with Pd(dppf)Cl$_2$ (110 mg, 0.150 mmol). The mixture was sparged with Ar for another 5 minutes and then heated at 150° C. for 1.5 hours before cooling to room temperature. The suspension was filtered, and the filter cake washed with ethyl acetate (10 mL×2). The filtrate was concentrated to dryness under reduced pressure to give the product, which was purified by preparative HPLC using a Phenomenex Gemini 150×25 mm×10 μm column (eluent: 42% to 72% (v/v) CH$_3$CN and H$_2$O with 0.05% NH$_3$) to afford the title compound (500 mg, 81%) as a white solid. MS (ESI): mass calcd. for C$_{25}$H$_{20}$N$_2$O$_4$ 412.14 m/z found 413.0 [M+H]$^+$.

A sample of (R,S)-4-((3-cyanophenyl)((8-methyl-4-oxochroman-7-yl)oxy)methyl)benzamide was separated by SFC (YMC CHIRAL Amylose-C, 50% (v/v) supercritical $CO_2$ in MeOH and $H_2O$ with 0.1% $NH_3$) to yield example 60a (first enantiomer to elute, labelled *R) and example 60b (second enantiomer to elute, labelled *S).

Example 60a (*R)-4-((3-cyanophenyl)((8-methyl-4-oxochroman-7-yl)oxy)methyl)benzamide

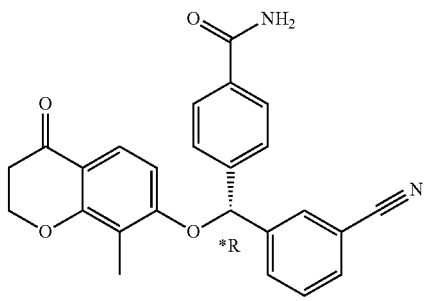 [SMILES: Cc1c(O[C@H](c2ccc(C(N)=O)cc2)c2cccc(C#N)c2)ccc2c1OCCC2=O]

MS (ESI): mass calcd. for $C_{25}H_{20}N_2O_4$ 412.14 m/z found 413.0 [M+H]$^+$. $^1$H NMR (400 MHz, DMSO-$d_6$) δ 8.06-8.03 (m, 1H), 7.94 (s, 1H), 7.89 (d, J=8.0 Hz, 1H), 7.84 (d, J=8.4 Hz, 2H), 7.79-7.75 (m, 1H), 7.64 (d, J=8.4 Hz, 2H), 7.62-7.57 (m, 1H), 7.52 (d, J=8.8 Hz, 1H), 7.37 (s, 1H), 6.87 (s, 1H), 6.71 (d, J=9.2 Hz, 1H), 4.52 (t, J=6.4 Hz, 2H), 2.69 (t, J=6.4 Hz, 2H), 2.23 (s, 3H).

Example 60b (*S)-4-((3-cyanophenyl)((8-methyl-4-oxochroman-7-yl)oxy)methyl)benzamide

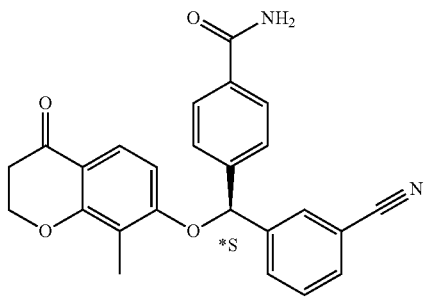 [SMILES: Cc1c(O[C@@H](c2ccc(C(N)=O)cc2)c2cccc(C#N)c2)ccc2c1OCCC2=O]

MS (ESI): mass calcd. for $C_{25}H_{20}N_2O_4$ 412.14 m/z found 413.0 [M+H]$^+$. $^1$H NMR (400 MHz, DMSO-$d_6$) δ 8.05 (s, 1H), 7.94 (s, 1H), 7.89 (d, J=8.4 Hz, 1H), 7.84 (d, J=8.4 Hz, 2H), 7.78-7.75 (m, 1H), 7.64 (d, J=8.4 Hz, 2H), 7.62-7.57 (m, 1H), 7.52 (d, J=8.8 Hz, 1H), 7.37 (s, 1H), 6.87 (s, 1H), 6.71 (d, J=9.2 Hz, 1H), 4.52 (t, J=6.4 Hz, 2H), 2.69 (t, J=6.2 Hz, 2H), 2.23 (s, 3H).

Example 61: (R,S)-4-((2-Cyanophenyl)((8-methyl-4-oxochroman-7-yl)oxy)methyl)benzamide

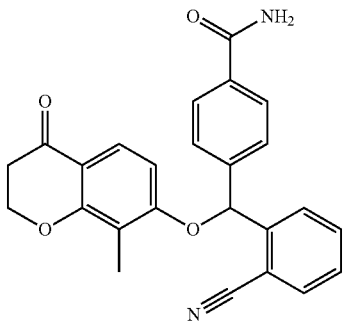 [SMILES: Cc1c(OC(c2ccc(C(N)=O)cc2)c2ccccc2C#N)ccc2c1OCCC2=O]

$Zn(CN)_2$ (670 mg, 5.71 mmol) was added to a 20 mL microwave tube containing a mixture of 4-((2-iodophenyl)((8-methyl-4-oxochroman-7-yl)oxy)methyl)benzamide (Intermediate 52, 1.0 g), Zn (25 mg, 0.38 mmol), and DMF (15 mL). The mixture was sparged with Ar for 5 minutes and then treated with Pd(dppf)Cl$_2$ (285 mg, 0.390 mmol). The mixture was sparged with Ar for another 5 minutes and then stirred while heating at 120° C. for 2 hours before cooling to room temperature, pouring it into $H_2O$ (60 mL) and extracting with ethyl acetate (40 mL×3). The combined organic extracts were dried over anhydrous $Na_2SO_4$, filtered, and concentrated to dryness under reduced pressure to give the product, which was purified by FCC (eluent: petroleum ether:ethyl acetate, 10:1 to 0:1, gradient elution) to afford the title compound (700 mg, 83%), as a yellow oil. MS (ESI): mass calcd. for $C_{25}H_{20}N_2O_4$ 412.14 m/z found 413.0 [M+H]$^+$.

A sample of (R,S)-4-((2-cyanophenyl)((8-methyl-4-oxochroman-7-yl)oxy)methyl)benzamide was separated by SFC (Chiralcel OJ, 45% (v/v) supercritical $CO_2$ in EtOH and $H_2O$ with 0.1% $NH_3$) to yield example 61a (first enantiomer to elute, labelled *R) and example 61b (second enantiomer to elute, labelled *S).

Example 61a (*R)-4-((2-cyanophenyl)((8-methyl-4-oxochroman-7-yl)oxy)methyl)benzamide

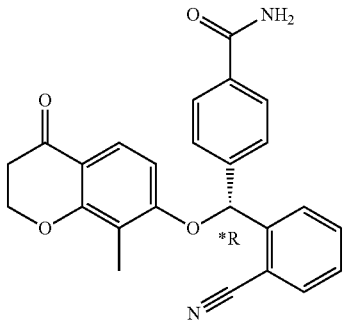 [SMILES: Cc1c(O[C@H](c2ccc(C(N)=O)cc2)c2ccccc2C#N)ccc2c1OCCC2=O]

MS (ESI): mass calcd. for $C_{25}H_{20}N_2O_4$ 412.14 m/z found 413.0 [M+H]$^+$. $^1$H NMR (400 MHz, DMSO-$d_6$) δ 7.94 (br s, 1H), 7.88-7.81 (m, 3H), 7.75-7.68 (m, 2H), 7.57 (d, J=8.3 Hz, 2H), 7.53-7.46 (m, 2H), 7.38 (br s, 1H), 6.90 (s, 1H), 6.67 (d, J=9.0 Hz, 1H), 4.50 (t, J=6.4 Hz, 2H), 2.66 (t, J=6.4 Hz, 2H), 2.17 (s, 3H).

Example 61b (*S)-4-((2-cyanophenyl)((8-methyl-4-oxochroman-7-yl)oxy)methyl)benzamide

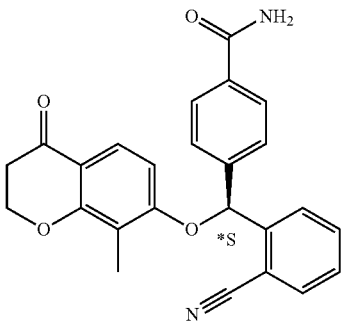 [SMILES: Cc1c(O[C@@H](c2ccc(C(N)=O)cc2)c2ccccc2C#N)ccc2c1OCCC2=O]

MS (ESI): mass calcd. for $C_{25}H_{20}N_2O_4$ 412.14 m/z found 413.0 $[M+H]^+$. $^1H$ NMR (400 MHz, DMSO-$d_6$) δ 7.98 (br. s., 1H), 7.92-7.85 (m, 3H), 7.79-7.72 (m, 2H), 7.61 (d, J=8.3 Hz, 2H), 7.56-7.51 (m, 2H), 7.41 (br s, 1H), 6.94 (s, 1H), 6.71 (d, J=9.0 Hz, 1H), 4.54 (t, J=6.4 Hz, 2H), 2.70 (t, J=6.2 Hz, 2H), 2.21 (s, 3H).

Example 62: (R,S)-4-((5-Chloropyridin-2-yl)((8-methyl-4-oxochroman-7-yl)oxy)methyl)benzamide

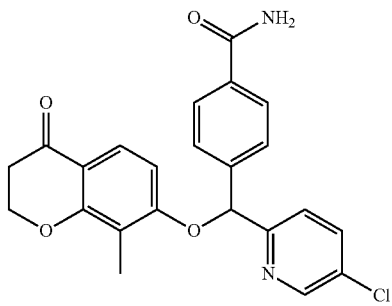 [SMILES: Cc1c(OC(c2ccc(C(N)=O)cc2)c2ccc(Cl)cn2)ccc2c1OCCC2=O]

$H_2O_2$ (1.9 mL, 30% purity, 19 mmol) was added dropwise to a 50 mL round-bottomed flask containing a mixture of 4-((5-chloropyridin-2-yl)((8-methyl-4-oxochroman-7-yl)oxy)methyl)benzonitrile (Intermediate 53, 700 mg, 78% purity), $K_2CO_3$ (1.85 g, 13.4 mmol), and DMSO (15 mL). The mixture was stirred at room temperature for 1 hour before pouring it into saturated $Na_2SO_3$ (10 mL) and extracting with ethyl acetate (20 mL×3). The combined organic extracts were dried over anhydrous $Na_2SO_4$, filtered, and concentrated to dryness under reduced pressure to afford the product, which was purified by preparative HPLC using a Phenomenex Gemini 150 mm×25 mm×10 μm column (eluent: 40% to 70% (v/v) $CH_3CN$ and $H_2O$ with 0.05% $NH_3$) to afford the title compound (170 mg, 30%) as a white solid. MS (ESI): mass calcd. for $C_{23}H_{19}ClN_2O_4$ 422.10 m/z found 423.0 $[M+H]^+$.

A sample of (R,S)-4-((5-chloropyridin-2-yl)((8-methyl-4-oxochroman-7-yl)oxy)methyl)benzamide was separated by SFC (Chiralcel OJ-H, 45% (v/v) supercritical $CO_2$ in EtOH and $H_2O$ with 0.1% $NH_3$) to yield example 62a (first enantiomer to elute, labelled *R) and example 62b (second enantiomer to elute, labelled *S).

Example 62a (*R)-4-((5-chloropyridin-2-yl)((8-methyl-4-oxochroman-7-yl)oxy)methyl)benzamide

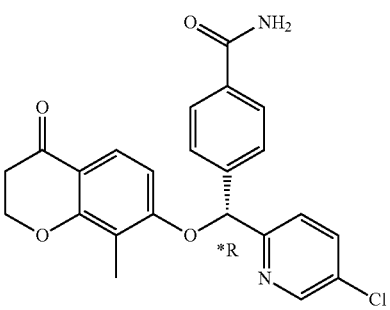 [SMILES: Cc1c(O[C@H](c2ccc(C(N)=O)cc2)c2ccc(Cl)cn2)ccc2c1OCCC2=O]

MS (ESI): mass calcd. for $C_{23}H_{19}ClN_2O_4$ 422.10 m/z found 423.0 $[M+H]^+$. $^1H$ NMR (400 MHz, DMSO-$d_6$) δ 8.60 (d, J=2.2 Hz, 1H), 7.97 (dd, J=2.5, 8.5 Hz, 1H), 7.95 (s, 1H), 7.83 (d, J=8.2 Hz, 2H), 7.71 (d, J=8.6 Hz, 1H), 7.61 (d, J=8.4 Hz, 2H), 7.50 (d, J=9.0 Hz, 1H), 7.38 (s, 1H), 6.75 (s, 1H), 6.71 (d, J=9.0 Hz, 1H), 4.52 (t, J=6.4 Hz, 2H), 2.69 (t, J=6.3 Hz, 2H), 2.22 (s, 3H).

Example 62b (*S)-4-((5-chloropyridin-2-yl)((8-methyl-4-oxochroman-7-yl)oxy)methyl)benzamide

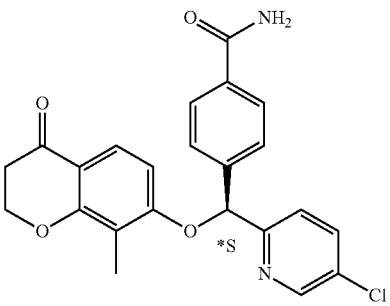 [SMILES: Cc1c(O[C@@H](c2ccc(C(N)=O)cc2)c2ccc(Cl)cn2)ccc2c1OCCC2=O]

MS (ESI): mass calcd. for $C_{23}H_{19}ClN_2O_4$ 422.10 m/z found 423.0 $[M+H]^+$. $^1H$ NMR (400 MHz, DMSO-$d_6$) δ 8.60 (d, J=2.4 Hz, 1H), 7.97 (dd, J=2.5, 8.5 Hz, 1H), 7.95 (s, 1H), 7.83 (d, J=8.4 Hz, 2H), 7.71 (d, J=8.6 Hz, 1H), 7.61 (d, J=8.4 Hz, 2H), 7.50 (d, J=8.8 Hz, 1H), 7.38 (s, 1H), 6.75 (s, 1H), 6.71 (d, J=8.8 Hz, 1H), 4.52 (t, J=6.3 Hz, 2H), 2.69 (t, J=6.4 Hz, 2H), 2.22 (s, 3H).

Example 63: (R,S)-6-((4-Chlorophenyl)((8-methyl-4-oxochroman-7-yl)oxy)methyl)nicotinamide

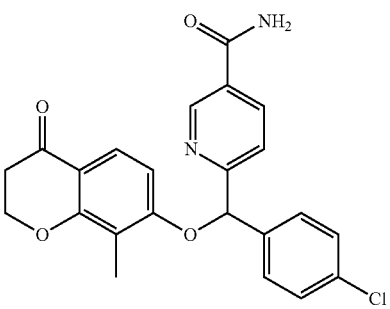 [SMILES: Cc1c(OC(c2ccc(Cl)cc2)c2ccc(C(N)=O)cn2)ccc2c1OCCC2=O]

H$_2$O$_2$ (0.5 mL, 30% purity, 5 mmol) was added dropwise to a mixture of 6-((4-chlorophenyl)((8-methyl-4-oxochroman-7-yl)oxy)methyl)nicotinonitrile (Intermediate 54, 800 mg, 1.98 mmol), K$_2$CO$_3$ (821 mg, 5.94 mmol), and DMSO (10 mL). The mixture was stirred at room temperature for 1 hour before pouring it into saturated Na$_2$SO$_3$ (10 mL) and extracting with ethyl acetate (20 mL×3). The combined organic extracts were dried over anhydrous Na$_2$SO$_4$, filtered, and concentrated to dryness under reduced pressure to give the product, which was purified by preparative HPLC using a Gemini C18, 150 mm×25 mm×5 μm column (eluent: 40% to 70% (v/v) CH$_3$CN and H$_2$O with 0.05% NH$_3$) to afford the title compound (140 mg, 16%) as a white solid. MS (ESI): mass calcd. for C$_{23}$H$_{19}$ClN$_2$O$_4$ 422.10 m/z found 423.1 [M+H]$^+$.

A sample of (R,S)-6-((4-chlorophenyl)((8-methyl-4-oxochroman-7-yl)oxy)methyl)nicotinamide was separated by SFC (Chiralpak AS-H, 45% (v/v) supercritical CO$_2$ in EtOH and H$_2$O with 0.1% NH$_3$) to yield example 63a (first enantiomer to elute, labelled *R), and example 63b (second enantiomer to elute, labelled *S).

Example 63a (*R)-6-((4-chlorophenyl)((8-methyl-4-oxochroman-7-yl)oxy)methyl)nicotinamide

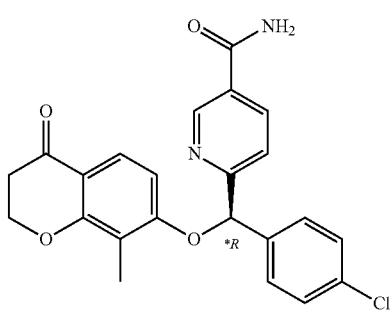 [SMILES: Cc1c(O[C@H](c2ccc(Cl)cc2)c2ccc(C(N)=O)cn2)ccc2c1OCCC2=O]

MS (ESI): mass calcd. for C$_{23}$H$_{19}$ClN$_2$O$_4$ 422.10 m/z found 423.0 [M+H]$^+$. $^1$H NMR (400 MHz, DMSO-d$_6$) δ 8.95 (d, J=2.0 Hz, 1H), 8.21 (dd, J=2.2, 8.2 Hz, 1H), 8.12 (s, 1H), 7.72 (d, J=8.2 Hz, 1H), 7.61-7.57 (m, 3H), 7.50 (d, J=8.8 Hz, 1H), 7.45-7.41 (m, 2H), 6.75 (s, 1H), 6.69 (d, J=8.8 Hz, 1H), 4.52 (t, J=6.4 Hz, 2H), 2.69 (t, J=6.3 Hz, 2H), 2.22 (s, 3H).

Example 63b (*S)-6-((4-chlorophenyl)((8-methyl-4-oxochroman-7-yl)oxy)methyl)nicotinamide

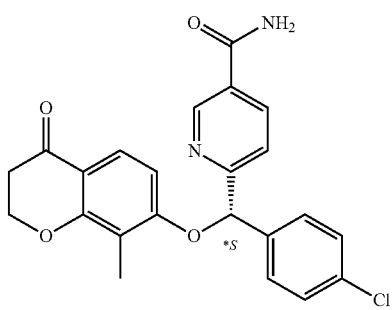 [SMILES: Cc1c(O[C@@H](c2ccc(Cl)cc2)c2ccc(C(N)=O)cn2)ccc2c1OCCC2=O]

MS (ESI): mass calcd. for C$_{23}$H$_{19}$ClN$_2$O$_4$ 422.10 m/z found 423.0 [M+H]$^+$. $^1$H NMR (400 MHz, DMSO-d$_6$) δ 8.95 (d, J=1.5 Hz, 1H), 8.21 (dd, J=2.1, 8.3 Hz, 1H), 8.12 (s, 1H), 7.72 (d, J=8.2 Hz, 1H), 7.62-7.57 (m, 3H), 7.50 (d, J=9.0 Hz, 1H), 7.46-7.41 (m, 2H), 6.75 (s, 1H), 6.70 (d, J=9.0 Hz, 1H), 4.53 (t, J=6.3 Hz, 2H), 2.69 (t, J=6.3 Hz, 2H), 2.22 (s, 3H).

Example 64: (R,S)-5-((4-Chlorophenyl)((8-methyl-4-oxochroman-7-yl)oxy)methyl)picolinamide

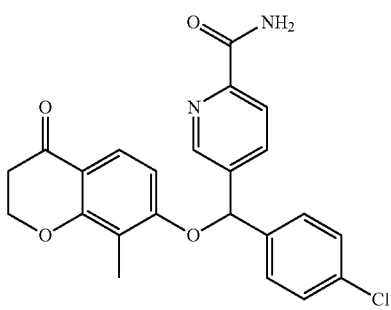 [SMILES: Cc1c(OC(c2ccc(Cl)cc2)c2ccc(C(N)=O)nc2)ccc2c1OCCC2=O]

H$_2$O$_2$ (1.5 mL, 30% purity, 15 mmol) was added dropwise to a 50 mL round-bottomed flask containing a mixture of 5-((4-chlorophenyl)((8-methyl-4-oxochroman-7-yl)oxy)methyl)picolinonitrile (Intermediate 55, 1.0 g, 43% purity), K$_2$CO$_3$ (1.46 g, 10.6 mmol), and DMSO (10 mL). The mixture was stirred at room temperature for 1 hour before pouring it into saturated Na$_2$SO$_3$ (10 mL) and extracting with ethyl acetate (20 mL×3). The combined organic extracts were dried over anhydrous Na$_2$SO$_4$, filtered, and concentrated to dryness under reduced pressure to give the product which was purified by FCC (eluent:petroleum ether: ethyl acetate, 1:0 to 0:1, gradient elution) and was further purified by preparative HPLC using a Phenomenex Gemini 150 mm×20 mm×10 μm column (eluent: 47% to 77% (v/v) CH$_3$CN and H$_2$O with 0.05% NH$_3$) to afford the title compound (160 mg, 36%) as a white solid. MS (ESI): mass calcd. for C$_{23}$H$_{19}$ClN$_2$O$_4$ 422.10 m/z found 423.0 [M+H]$^+$.

A sample of (R,S)-5-((4-chlorophenyl)((8-methyl-4-oxochroman-7-yl)oxy)methyl)picolinamide (160 mg, 0.378 mmol) was separated by SFC (YMC CHIRAL Amylose-C, 50% (v/v) supercritical CO$_2$ in i-PrOH and H$_2$O with 0.1% NH$_3$) to yield example 64a (first enantiomer to elute, labelled *R) and example 64b (second enantiomer to elute, labelled *S).

Example 64a (*R)-5-((4-chlorophenyl)((8-methyl-4-oxochroman-7-yl)oxy)methyl)picolinamide

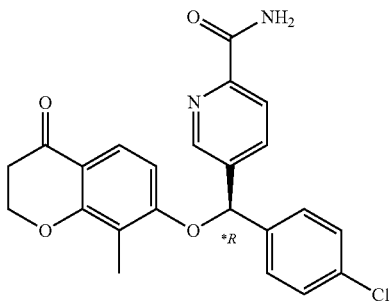 [SMILES: Cc1c(O[C@H](c2ccc(Cl)cc2)c2ccc(C(N)=O)nc2)ccc2c1OCCC2=O]

MS (ESI): mass calcd. for $C_{23}H_{19}ClN_2O_4$ 422.10 m/z found 423.0 [M+H]$^+$. $^1$H NMR (400 MHz, DMSO-d$_6$) δ 8.81-8.79 (m, 1H), 8.10-8.01 (m, 3H), 7.65 (s, 1H), 7.61-7.57 (m, 2H), 7.53 (d, J=9.0 Hz, 1H), 7.48-7.44 (m, 2H), 6.97 (s, 1H), 6.75 (d, J=9.0 Hz, 1H), 4.52 (t, J=6.4 Hz, 2H), 2.69 (t, J=6.4 Hz, 2H), 2.20 (s, 3H).

Example 64b (*S)-5-((4-chlorophenyl)((8-methyl-4-oxochroman-7-yl)oxy)methyl)picolinamide

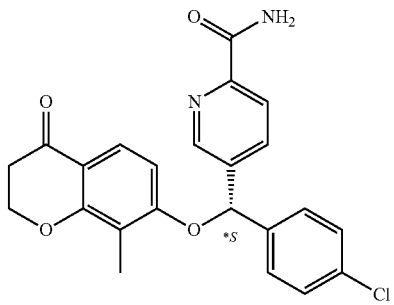

MS (ESI): mass calcd. for $C_{23}H_{19}ClN_2O_4$ 422.10 m/z found 422.9 [M+H]$^+$. $^1$H NMR (400 MHz, DMSO-d$_6$) δ 8.81-8.78 (m, 1H), 8.10-8.01 (m, 3H), 7.65 (s, 1H), 7.61-7.57 (m, 2H), 7.53 (d, J=8.8 Hz, 1H), 7.49-7.44 (m, 2H), 6.97 (s, 1H), 6.75 (d, J=9.0 Hz, 1H), 4.53 (t, J=6.3 Hz, 2H), 2.69 (t, J=6.4 Hz, 2H), 2.20 (s, 3H).

Example 65: (R,S)-2-((4-Carbamoylphenyl)((8-methyl-4-oxochroman-7-yl)oxy)methyl)pyridine 1-oxide

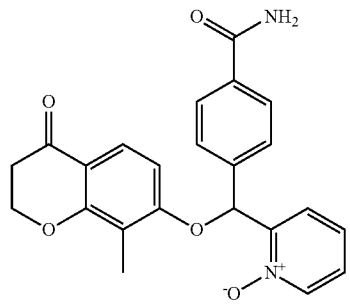

H$_2$O$_2$ (0.93 mL, 30% purity, 9.3 mmol) was added dropwise to a mixture of 2-((4-cyanophenyl)((8-methyl-4-oxochroman-7-yl)oxy)methyl)pyridine 1-oxide (Intermediate 56, 710 mg, 1.84 mmol), K$_2$CO$_3$ (762 mg, 5.51 mmol), and DMSO (10 mL). The mixture was stirred at room temperature for 1 hour before pouring it into saturated Na$_2$SO$_3$ (20 mL). The mixture was frozen using dry ice/acetone to give the product, which was purified by FCC (eluent: ethyl acetate:methanol=1:0 to 9:1, gradient elution) to afford the title compound (310 mg, 41%) as a colorless oil. MS (ESI): mass calcd. for $C_{23}H_{20}N_2O_5$ 404.14 m/z found 405.0 [M+H]$^+$.

A sample of (R,S)-2-((4-carbamoylphenyl)((8-methyl-4-oxochroman-7-yl)oxy)methyl)pyridine 1-oxide (300 mg, 0.742 mmol) was separated by SFC (Chiralcel OJ, 55% (v/v) supercritical CO$_2$ in MeOH and H$_2$O with 0.1% NH$_3$) to yield example 65b (second enantiomer to elute, labelled *S).

Example 65a (*R)-2-((4-carbamoylphenyl)((8-methyl-4-oxochroman-7-yl)oxy)methyl)pyridine 1-oxide

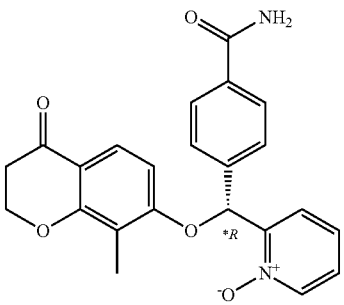

MS (ESI): mass calcd. for $C_{23}H_{20}N_2O_5$ 404.14 m/z found 405.0 [M+H]$^+$. $^1$H NMR (400 MHz, DMSO-d$_6$) δ 8.31-8.28 (m, 1H), 7.93 (s, 1H), 7.82 (d, J=8.4 Hz, 2H), 7.67-7.63 (m, 3H), 7.50 (d, J=8.8 Hz, 1H), 7.40-7.34 (m, 3H), 7.08 (s, 1H), 6.56 (d, J=8.8 Hz, 1H), 4.49 (t, J=6.4 Hz, 2H), 2.66 (t, J=6.4 Hz, 2H), 2.16 (s, 3H).

Example 65b (*S)-2-((4-carbamoylphenyl)((8-methyl-4-oxochroman-7-yl)oxy)methyl)pyridine 1-oxide

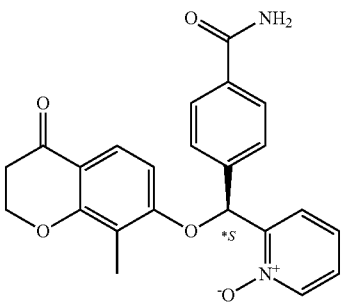

MS (ESI): mass calcd. for $C_{23}H_{20}N_2O_5$ 404.14 m/z found 405.0 [M+H]$^+$. $^1$H NMR (400 MHz, DMSO-d$_6$) δ 8.35-8.30 (m, 1H), 7.96 (s, 1H), 7.85 (d, J=8.4 Hz, 2H), 7.71-7.66 (m, 3H), 7.53 (d, J=8.8 Hz, 1H), 7.43-7.37 (m, 3H), 7.12 (s, 1H), 6.59 (d, J=8.8 Hz, 1H), 4.53 (t, J=6.4 Hz, 2H), 2.69 (t, J=6.4 Hz, 2H), 2.19 (s, 3H).

Example 66: (R,S)-4-((4-Fluorophenyl)((8-methyl-4-oxochroman-7-yl)oxy)methyl)benzamide

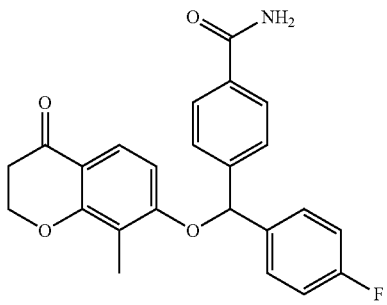 [SMILES: Cc1c(OC(c2ccc(F)cc2)c2ccc(C(N)=O)cc2)ccc2c1OCCC2=O]

H$_2$O$_2$ (1.87 mL, 30% purity in H$_2$O, 18.6 mmol) was added dropwise to a mixture of 4-((4-fluorophenyl)((8-methyl-4-oxochroman-7-yl)oxy)methyl)benzonitrile (Intermediate 57, 2.40 g, 6.20 mmol), K$_2$CO$_3$ (2.14 g, 15.5 mmol), and DMSO (6 mL). The mixture was stirred at room temperature for 2 hours before pouring it into saturated Na$_2$SO$_3$ (200 mL, aq) and extracting with ethyl acetate (80 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 1:3, gradient elution) and was further purified by preparative HPLC using a Phenomenex Gemini 150 mm×25 mm×5 m column (eluent: 30% to 60% (v/v) CH$_3$CN and H$_2$O with 0.05% NH$_3$) to afford the title compound (420 mg, 16.7%) as a white solid. MS (ESI): mass calcd. for C$_{24}$H$_{20}$FNO$_4$ 405.14 m/z, found 406.1 [M+H]$^+$. $^1$H NMR (400 MHz, DMSO-d$_6$) δ 7.93 (s, 1H), 7.84 (d, J=8.3 Hz, 2H), 7.63-7.55 (m, 4H), 7.51 (d, J=8.8 Hz, 1H), 7.39-7.34 (m, 1H), 7.24-7.17 (m, 2H), 6.81 (s, 1H), 6.74 (d, J=9.0 Hz, 1H), 4.53 (t, J=6.3 Hz, 2H), 2.69 (t, J=6.3 Hz, 2H), 2.21 (s, 3H).

A sample of (R,S)-4-((4-fluorophenyl)((8-methyl-4-oxochroman-7-yl)oxy)methyl)benzamide (420 mg, 1.04 mmol) was separated by SFC (Chiralpak AD, 40% (v/v) supercritical CO$_2$ in EtOH and H$_2$O with 0.1% NH$_3$) to yield example 66a (first enantiomer to elute, labelled *R) and example 66b (second enantiomer to elute, labelled *S).

Example 66a (*R)-4-((4-Fluorophenyl)((8-methyl-4-oxochroman-7-yl)oxy)methyl)benzamide

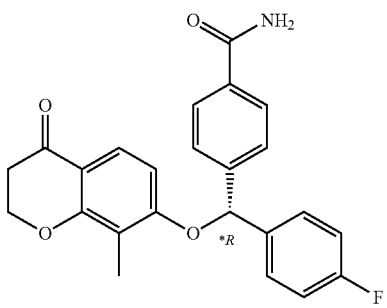 [SMILES: Cc1c(O[C@@H](c2ccc(F)cc2)c2ccc(C(N)=O)cc2)ccc2c1OCCC2=O]

MS (ESI): mass calcd. for C$_{24}$H$_{20}$FNO$_4$ 405.14 m/z, found 406.0 [M+H]$^+$. $^1$H NMR (400 MHz, DMSO-d$_6$) δ 7.93 (br s, 1H), 7.83 (d, J=8.3 Hz, 2H), 7.60-7.54 (m, 4H), 7.51 (d, J=8.8 Hz, 1H), 7.35 (br s, 1H), 7.23-7.16 (m, 2H), 6.80 (s, 1H), 6.73 (d, J=9.0 Hz, 1H), 4.52 (t, J=6.3 Hz, 2H), 2.68 (t, J=6.3 Hz, 2H), 2.20 (s, 3H).

Example 66b (*S)-4-((4-Fluorophenyl)((8-methyl-4-oxochroman-7-yl)oxy)methyl)benzamide

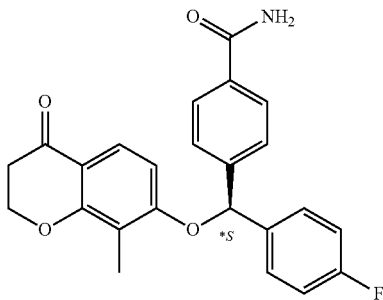 [SMILES: Cc1c(O[C@H](c2ccc(F)cc2)c2ccc(C(N)=O)cc2)ccc2c1OCCC2=O]

MS (ESI): mass calcd. for C$_{24}$H$_{20}$FNO$_4$ 405.14 m/z, found 406.0 [M+H]$^+$. $^1$H NMR (400 MHz, DMSO-d$_6$) δ 7.93 (br. s., 1H), 7.83 (d, J=8.3 Hz, 2H), 7.60-7.55 (m, 4H), 7.50 (d, J=8.8 Hz, 1H), 7.36 (br. s., 1H), 7.23-7.17 (m, 2H), 6.80 (s, 1H), 6.73 (d, J=9.0 Hz, 1H), 4.52 (t, J=6.4 Hz, 2H), 2.68 (t, J=6.4 Hz, 2H), 2.20 (s, 3H).

Example 67: (R,S)-4-((3-Fluorophenyl)((8-methyl-4-oxochroman-7-yl)oxy)methyl)benzamide

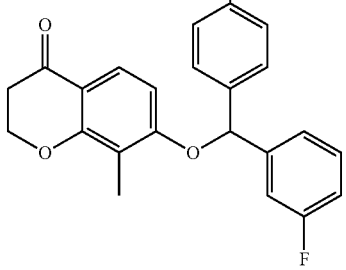

H$_2$O$_2$ (1.13 mL, 30% purity, 11.3 mmol) was added dropwise to a mixture of 4-((3-fluorophenyl)((8-methyl-4-oxochroman-7-yl)oxy)methyl)benzonitrile (Intermediate 58, 1.45 g), K$_2$CO$_3$ (1.29 g, 9.33 mmol), and DMSO (8 mL). The mixture was stirred at room temperature for 1 hour before pouring it into saturated Na$_2$SO$_3$ (100 mL, aq) and extracting with ethyl acetate (60 mL×3). The combined organic extracts were dried over anhydrous Na$_2$SO$_4$, filtered, and concentrated to dryness under reduced pressure to give the product, which was purified by preparative HPLC using a Phenomenex Gemini 150 mm×25 mm×10 μm column (eluent: 40% to 70% (v/v) CH$_3$CN and H$_2$O with 0.05% NH$_3$) to afford the title compound (1.08 g) as a white solid. MS (ESI): mass calcd. for C$_{24}$H$_{20}$FNO$_4$ 405.14 m/z, found 406.1 [M+H]$^+$.

A sample of (R,S)-4-((3-fluorophenyl)((8-methyl-4-oxochroman-7-yl)oxy)methyl)benzamide (1.08 g, 2.66 mmol) was separated by SFC (YMC CHIRAL Amylose-C, 55% (v/v) supercritical CO$_2$ in MeOH and H$_2$O with 0.1% NH$_3$) to yield example 67a (first enantiomer to elute, labelled *R) and example 67b (second enantiomer to elute).

Example 67a (*R)-4-((3-Fluorophenyl)((8-methyl-4-oxochroman-7-yl)oxy)methyl)benzamide

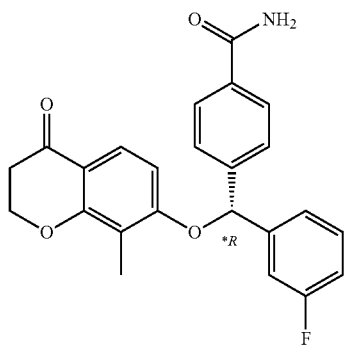 [SMILES: Cc1c(O[C@H](c2ccc(C(N)=O)cc2)c2cccc(F)c2)ccc2c1OCCC2=O]

MS (ESI): mass calcd. for C$_{24}$H$_{20}$FNO$_4$ 405.14 m/z, found 406.0 [M+H]$^+$. $^1$H NMR (400 MHz, DMSO-d$_6$) δ 7.90 (br s, 1H), 7.81 (d, J=8.4 Hz, 2H), 7.58 (d, J=8.4 Hz, 2H), 7.48 (d, J=8.8 Hz, 1H), 7.43-7.29 (m, 4H), 7.13-7.03 (m, 1H), 6.78 (s, 1H), 6.69 (d, J=9.0 Hz, 1H), 4.49 (t, J=6.4 Hz, 2H), 2.66 (t, J=6.4 Hz, 2H), 2.19 (s, 3H).

Example 67b (*S)-4-((3-Fluorophenyl)((8-methyl-4-oxochroman-7-yl)oxy)methyl)benzamide

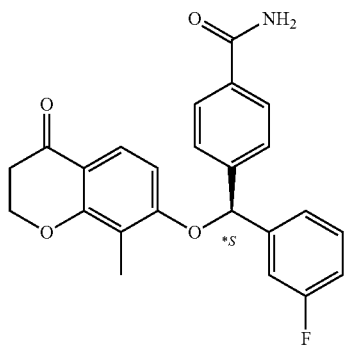 [SMILES: Cc1c(O[C@@H](c2ccc(C(N)=O)cc2)c2cccc(F)c2)ccc2c1OCCC2=O]

MS (ESI): mass calcd. for C$_{24}$H$_{20}$FNO$_4$ 405.14 m/z, found 406.0 [M+H]$^+$. $^1$H NMR (400 MHz, DMSO-d$_6$) δ 7.90 (br. s., 1H), 7.81 (d, J=8.4 Hz, 2H), 7.58 (d, J=8.2 Hz, 2H), 7.48 (d, J=9.0 Hz, 1H), 7.42-7.31 (m, 4H), 7.11-7.05 (m, 1H), 6.78 (s, 1H), 6.69 (d, J=9.0 Hz, 1H), 4.49 (t, J=6.3 Hz, 2H), 2.65 (t, J=6.4 Hz, 2H), 2.19 (s, 3H).

Example 68: (R,S)-4-((2-Fluorophenyl)((8-methyl-4-oxochroman-7-yl)oxy)methyl)benzamide

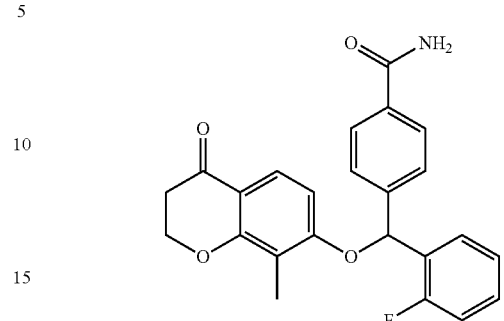

H$_2$O$_2$ (0.55 mL, 30% purity, 5.5 mmol) was added dropwise to a mixture of 4-((2-fluorophenyl)((8-methyl-4-oxochroman-7-yl)oxy)methyl)benzonitrile (Intermediate 59, 800 mg), K$_2$CO$_3$ (631 mg, 4.57 mmol), and DMSO (8 mL). The mixture was stirred at room temperature for 0.5 hours before pouring it into saturated Na$_2$SO$_3$ (30 mL) and extracting with ethyl acetate (30 mL×3). The combined organic extracts were dried over anhydrous Na$_2$SO$_4$, filtered, and concentrated to dryness under reduced pressure to give the product, which was purified by preparative HPLC using a Gemini 150 mm×25 mm×5 μm column (eluent: 30% to 60% (v/v) CH$_3$CN and H$_2$O with 0.05% NH$_3$) to afford the title compound (350 mg) as a white solid. MS (ESI): mass calcd. for C$_{24}$H$_{20}$FNO$_4$ 405.14 m/z found 406.0 [M+H]$^+$.

A sample of (R,S)-4-((2-fluorophenyl)((8-methyl-4-oxochroman-7-yl)oxy)methyl)benzamide (350 mg, 0.863 mmol) was separated by SFC (ChiralpakAD, 40% (v/v) supercritical CO$_2$ in MeOH and H$_2$O with 0.1% NH$_3$) to yield example 68a (first enantiomer to elute, labelled *R) and example 69b (second enantiomer to elute, labelled *S).

Example 68a (*R)-4-((2-Fluorophenyl)((8-methyl-4-oxochroman-7-yl)oxy)methyl)benzamide

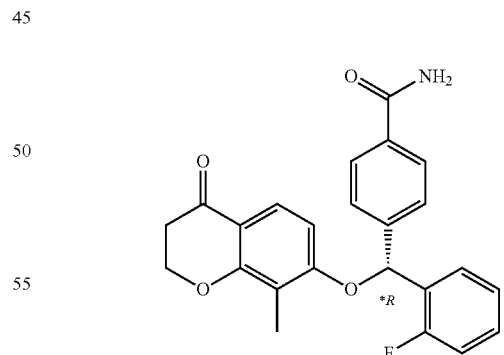

MS (ESI): mass calcd. for C$_{24}$H$_{20}$FNO$_4$ 405.14 m/z found 406.0 [M+H]$^+$. $^1$H NMR (400 MHz, DMSO-d$_6$) δ 7.94 (s, 1H), 7.85 (d, J=8.4 Hz, 2H), 7.60-7.54 (m, 3H), 7.52 (d, J=8.8 Hz, 1H), 7.40-7.33 (m, 2H), 7.26-7.19 (m, 2H), 6.91 (s, 1H), 6.75 (d, J=9.0 Hz, 1H), 4.52 (t, J=6.4 Hz, 2H), 2.69 (t, J=6.3 Hz, 2H), 2.18 (s, 3H).

Example 68b (*S)-4-((2-Fluorophenyl)((8-methyl-4-oxochroman-7-yl)oxy)methyl)benzamide

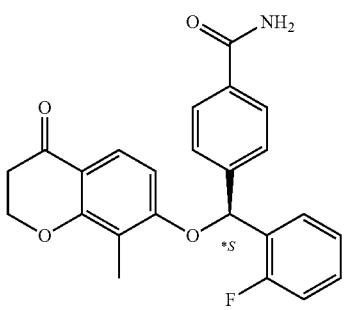 [SMILES: Cc1c(O[C@@H](c2ccc(C(N)=O)cc2)c2ccccc2F)ccc2c1OCCC2=O]

MS (ESI): mass calcd. for $C_{24}H_{20}FNO_4$ 405.14 m/z found 406.0 $[M+H]^+$. $^1H$ NMR (400 MHz, DMSO-$d_6$) δ 7.94 (br. s., 1H), 7.85 (d, J=8.6 Hz, 2H), 7.60-7.54 (m, 3H), 7.52 (d, J=8.8 Hz, 1H), 7.42-7.33 (m, 2H), 7.27-7.18 (m, 2H), 6.91 (s, 1H), 6.75 (d, J=8.8 Hz, 1H), 4.52 (t, J=6.4 Hz, 2H), 2.69 (t, J=6.4 Hz, 2H), 2.18 (s, 3H).

Example 69: (R,S)-4-(((8-Methyl-4-oxochroman-7-yl)oxy)(phenyl)methyl)benzamide

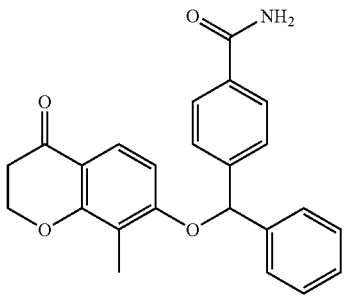 [SMILES: Cc1c(OC(c2ccccc2)c2ccc(C(N)=O)cc2)ccc2c1OCCC2=O]

$H_2O_2$ (0.34 mL, 30% purity, 3.4 mmol) was added dropwise to a mixture of 4-(((8-methyl-4-oxochroman-7-yl)oxy)(phenyl)methyl)benzonitrile (Intermediate 60, 500 mg, 1.35 mmol), $K_2CO_3$ (561 mg, 4.06 mmol), and DMSO (10 mL). The mixture was stirred at room temperature for 1 hour before pouring it into saturated $Na_2SO_3$ (20 mL) and extracting with ethyl acetate (30 mL×3). The combined organic extracts were dried over anhydrous $Na_2SO_4$, filtered, and concentrated to dryness under reduced pressure to give the product, which was purified by preparative HPLC using a Gemini C18, 150 mm×25 mm×5 μm column (eluent: 30% to 60% (v/v) $CH_3CN$ and $H_2O$ with 0.05% $NH_3$) to afford the title compound (110 mg, 21%) as a white solid. MS (ESI): mass calcd. for $C_{24}H_{21}NO_4$ 387.15 m/z found 388.2 $[M+H]^+$. A sample of (R,S)-4-(((8-methyl-4-oxochroman-7-yl)oxy)(phenyl)methyl)benzamide (200 mg, 0.516 mmol) was separated by SFC (Chiralpak AD, 55% (v/v) supercritical $CO_2$ in MeOH and $H_2O$ with 0.1% $NH_3$) to yield example 69a (first enantiomer to elute, labelled *R) and example 69b (second enantiomer to elute, labelled *S).

Example 69a (*R)-4-(((8-Methyl-4-oxochroman-7-yl)oxy)(phenyl)methyl)benzamide

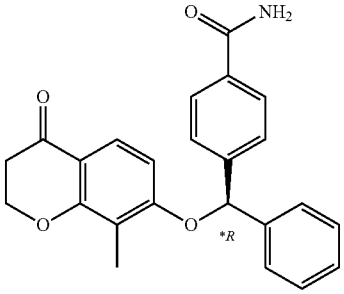 [SMILES: Cc1c(O[C@H](c2ccccc2)c2ccc(C(N)=O)cc2)ccc2c1OCCC2=O]

MS (ESI): mass calcd. for $C_{24}H_{21}NO_4$ 387.15 m/z found 388.0 $[M+H]^+$. $^1H$ NMR (400 MHz, DMSO-$d_6$) δ 7.92 (s, 1H), 7.83 (d, J=7.9 Hz, 2H), 7.59 (d, J=8.2 Hz, 2H), 7.56-7.48 (m, 3H), 7.39-7.32 (m, 3H), 7.29-7.24 (m, 1H), 6.77 (s, 1H), 6.74 (d, J=8.8 Hz, 1H), 4.52 (t, J=6.3 Hz, 2H), 2.68 (t, J=6.2 Hz, 2H), 2.21 (s, 3H).

Example 69b (*S)-4-(((8-Methyl-4-oxochroman-7-yl)oxy)(phenyl)methyl)benzamide

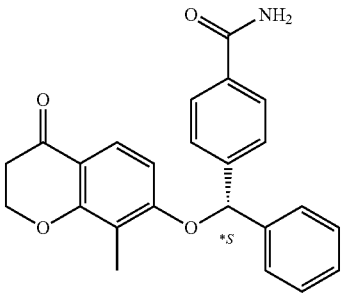 [SMILES: Cc1c(O[C@@H](c2ccccc2)c2ccc(C(N)=O)cc2)ccc2c1OCCC2=O]

MS (ESI): mass calcd. for $C_{24}H_{21}NO_4$ 387.15 m/z found 388.0 $[M+H]^+$. $^1H$ NMR (400 MHz, DMSO-$d_6$) δ 7.92 (s, 1H), 7.83 (d, J=7.7 Hz, 2H), 7.59 (d, J=7.9 Hz, 2H), 7.56-7.48 (m, 3H), 7.39-7.32 (m, 3H), 7.29-7.23 (m, 1H), 6.77 (s, 1H), 6.74 (d, J=9.0 Hz, 1H), 4.52 (t, J=6.3 Hz, 2H), 2.68 (t, J=6.3 Hz, 2H), 2.21 (s, 3H).

Example 70: (R,S)-4-(((8-Methyl-4-oxochroman-7-yl)oxy)(phenyl)methyl)benzoic acid

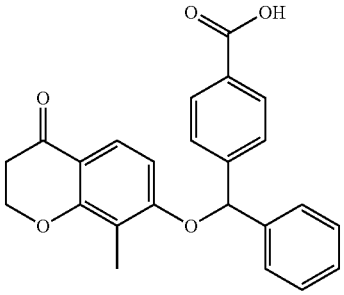 [SMILES: Cc1c(OC(c2ccccc2)c2ccc(C(=O)O)cc2)ccc2c1OCCC2=O]

NaOH (119 mg, 2.98 mmol) was added to a solution of methyl 4-(((8-methyl-4-oxochroman-7-yl)oxy)(phenyl)methyl)benzoate (Intermediate 61, 300 mg, 0.745 mmol), THF (4 mL), and H$_2$O (1 mL). The mixture was stirred at 40° C. for 16 hours before cooling to room temperature, adjusting the pH of the solution to pH to 4 with 1 N HCl (8 mL), and extracting with ethyl acetate (20 mL×3). The combined organic extracts were dried over anhydrous Na$_2$SO$_4$, filtered, and concentrated to dryness under reduced pressure to afford the product, which was purified by preparative HPLC using a Phenomenex Xtimate C18, 150 mm×25 mm×5 μm column (eluent: 58% to 88% (v/v) CH$_3$CN and H$_2$O with 0.225% HCOOH) to afford the title compound (60 mg, 21%) as a light yellow solid. MS (ESI): mass calcd. for C$_{24}$H$_{20}$O$_5$ 388.13 m/z found 389.2 [M+H]$^+$. $^1$H NMR (400 MHz, DMSO-d$_6$) δ 7.92 (d, J=7.0 Hz, 2H), 7.65 (d, J=7.0 Hz, 2H), 7.56-7.47 (m, 3H), 7.40-7.33 (m, 2H), 7.29-7.22 (m, 1H), 6.81 (s, 1H), 6.74 (d, J=9.0 Hz, 1H), 4.52 (t, J=6.3 Hz, 2H), 2.68 (t, J=6.3 Hz, 2H), 2.21 (s, 3H).

A sample of (R,S)-4-(((8-methyl-4-oxochroman-7-yl)oxy)(phenyl)methyl)benzoic acid (110 mg, 0.283 mmol) was separated by SFC (YMC CHIRAL Amylose-C, 45% (v/v) supercritical CO$_2$ in MeOH and H$_2$O with 0.1% NH$_3$) to yield example 70a (first enantiomer to elute, labelled *R) and example 70b (second enantiomer to elute, labelled *S).

Example 70a (*R)-4-(((8-methyl-4-oxochroman-7-yl)oxy)(phenyl)methyl)benzoic acid

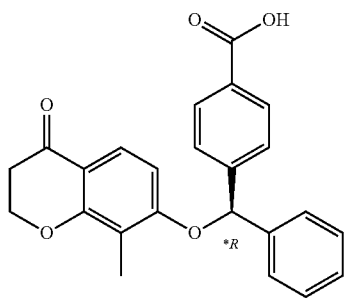 [SMILES: Cc1c(O[C@H](c2ccccc2)c2ccc(C(=O)O)cc2)ccc2c1OCCC2=O]

MS (ESI): mass calcd. for C$_{24}$H$_{20}$O$_5$ 388.13 m/z found 389.0 [M+H]$^+$. $^1$H NMR (400 MHz, DMSO-d$_6$) δ 7.92 (d, J=8.2 Hz, 2H), 7.64 (d, J=8.2 Hz, 2H), 7.56-7.47 (m, 3H), 7.39-7.33 (m, 2H), 7.30-7.24 (m, 1H), 6.81 (s, 1H), 6.74 (d, J=8.8 Hz, 1H), 4.52 (t, J=6.3 Hz, 2H), 2.68 (t, J=6.3 Hz, 2H), 2.21 (s, 3H).

Example 70b (*S)-4-(((8-methyl-4-oxochroman-7-yl)oxy)(phenyl)methyl)benzoic acid

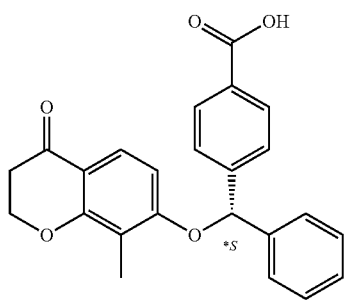 [SMILES: Cc1c(O[C@@H](c2ccccc2)c2ccc(C(=O)O)cc2)ccc2c1OCCC2=O]

MS (ESI): mass calcd. for C$_{24}$H$_{20}$O$_5$ 388.13 m/z found 389.0 [M+H]$^+$. $^1$H NMR (400 MHz, DMSO-d$_6$) δ 7.92 (d, J=8.4 Hz, 2H), 7.64 (d, J=8.2 Hz, 2H), 7.56-7.48 (m, 3H), 7.39-7.33 (m, 2H), 7.30-7.24 (m, 1H), 6.81 (s, 1H), 6.74 (d, J=9.0 Hz, 1H), 4.52 (t, J=6.3 Hz, 2H), 2.68 (t, J=6.3 Hz, 2H), 2.21 (s, 3H).

Example 71: (R,S)-4-((4-Carbamoylphenyl)((8-methyl-4-oxochroman-7-yl)oxy)methyl)benzoic acid

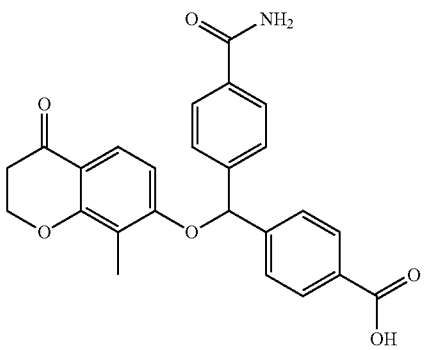 [SMILES: Cc1c(OC(c2ccc(C(N)=O)cc2)c2ccc(C(=O)O)cc2)ccc2c1OCCC2=O]

NaOH (400 mg, 10.0 mmol) was added to a solution of methyl 4-((4-carbamoylphenyl)((8-methyl-4-oxochroman-7-yl)oxy)methyl)benzoate (1.5 g, 3.4 mmol), THF (20 mL), and H$_2$O (2 mL). The mixture was stirred at room temperature for 16 hours before quenching with 3 N HCl (5 mL), pouring it into water (50 mL), and extracting with ethyl acetate (30 mL×3). The combined organic extracts were dried over anhydrous Na$_2$SO$_4$, filtered, and concentrated to dryness under reduced pressure to give the product, which was purified by preparative HPLC using a Xtimate C18 150 mm×25 mm×5 um (eluent: 28% to 58% (v/v) CH$_3$CN and H$_2$O with 0.225% HCOOH) to afford the title compound (65 mg, 4.5%) as a white solid. MS (ESI): mass calcd. for C$_{25}$H$_{21}$NO$_6$ 431.14 m/z found 432.0 [M+H]$^+$.

A sample of (R,S)-4-((4-carbamoylphenyl)((8-methyl-4-oxochroman-7-yl)oxy)methyl)benzoic acid was separated by SFC (YMC CHIRAL Amylose-C, 50% (v/v) supercritical CO$_2$ in MeOH and H$_2$O with 0.1% NH$_3$) to yield example 71a (first enantiomer to elute, labelled *R) and example 71b (second enantiomer to elute, labelled *S).

Example 71a (*R)-4-((4-carbamoylphenyl)((8-methyl-4-oxochroman-7-yl)oxy)methyl)benzoic acid

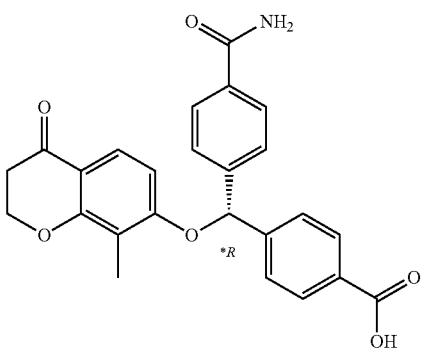 [SMILES: Cc1c(O[C@H](c2ccc(C(N)=O)cc2)c2ccc(C(=O)O)cc2)ccc2c1OCCC2=O]

MS (ESI): mass calcd. for $C_{25}H_{21}NO_6$ 431.14 m/z found 432.0 [M+H]⁺. ¹H NMR (400 MHz, DMSO-d₆) δ 7.92 (d, J=8.3 Hz, 3H), 7.83 (d, J=8.3 Hz, 2H), 7.64 (d, J=8.3 Hz, 2H), 7.60 (d, J=8.3 Hz, 2H), 7.50 (d, J=8.8 Hz, 1H), 7.35 (s, 1H), 6.86 (s, 1H), 6.73 (d, J=9.0 Hz, 1H), 4.55 (s, 0.8H, NH₄+), 4.52 (t, J=6.4 Hz, 2H), 2.68 (t, J=6.3 Hz, 2H), 2.22 (s, 3H).

Example 71b (*S)-4-((4-carbamoylphenyl)((8-methyl-4-oxochroman-7-yl)oxy)methyl)benzoic acid

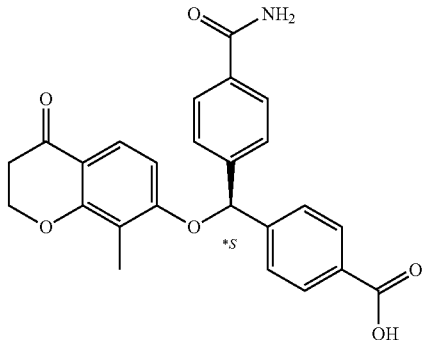 [SMILES: Cc1c(O[C@@H](c2ccc(C(N)=O)cc2)c2ccc(C(=O)O)cc2)ccc2c1OCCC2=O]

MS (ESI): mass calcd. for $C_{25}H_{21}NO_6$ 431.14 m/z found 432.0 [M+H]⁺. ¹H NMR (400 MHz, DMSO-d₆) δ 7.92 (d, J=8.3 Hz, 3H), 7.83 (d, J=8.3 Hz, 2H), 7.65 (d, J=8.3 Hz, 2H), 7.60 (d, J=8.3 Hz, 2H), 7.50 (d, J=9.0 Hz, 1H), 7.35 (s, 1H), 6.87 (s, 1H), 6.73 (d, J=9.0 Hz, 1H), 4.55 (s, 0.7H, NH₄+), 4.52 (t, J=6.4 Hz, 2H), 2.70-2.66 (m, 2H), 2.22 (s, 3H).

Example 72: (R,S)—N,N-Dimethyl-4-(((4-oxochroman-7-yl)oxy)(pyridin-4-yl)methyl)benzamide

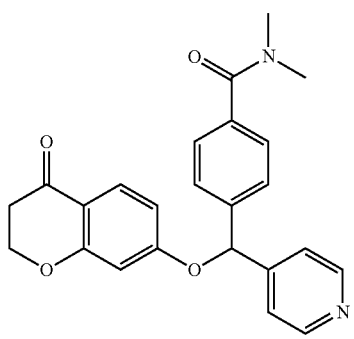 [SMILES: CN(C)C(=O)c1ccc(C(Oc2ccc3c(c2)OCCC3=O)c2ccncc2)cc1]

DIAD (0.43 mL, 2.4 mmol) was added to a solution of 7-hydroxychroman-4-one (192 mg, 1.17 mmol), 4-(hydroxy(pyridin-4-yl)methyl)-N,N-dimethylbenzamide (Intermediate 63, 300 mg, 1.17 mmol), PPh₃ (614 mg, 2.34 mmol), and anhydrous dichloromethane (3 mL). The mixture was stirred at room temperature for 3 hours before concentrating to dryness under reduced pressure to give the product, which was purified by preparative HPLC using a Phenomenex Gemini 150 mm×25 mm×10 μm column (eluent: 21% to 51% (v/v) CH₃CN and H₂O with 0.05% NH₃) to afford the title compound (50 mg, 11%) as a white solid. MS (ESI): mass calcd. for $C_{24}H_{22}N_2O_4$ 402.16 m/z found 403.1 [M+H]⁺.

A sample of (R,S)—N,N-dimethyl-4-(((4-oxochroman-7-yl)oxy)(pyridin-4-yl)methyl)benzamide was separated by SFC (YMC CHIRAL Amylose-C, 50% (v/v) supercritical CO₂ in EtOH and H₂O with 0.1% NH₃) to yield example 72a (first enantiomer to elute, labelled *R) and example 72b (second enantiomer to elute, labelled *S).

Example 72a (*R)—N,N-dimethyl-4-(((4-oxochroman-7-yl)oxy)(pyridin-4-yl)methyl)benzamide

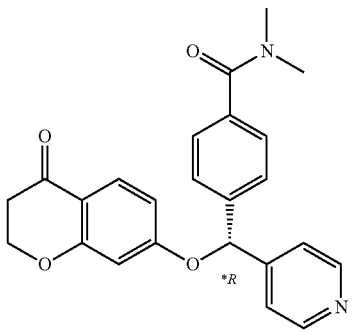 [SMILES: CN(C)C(=O)c1ccc([C@@H](Oc2ccc3c(c2)OCCC3=O)c2ccncc2)cc1]

MS (ESI): mass calcd. for $C_{24}H_{22}N_2O_4$ 402.16 m/z found 403.2 [M+H]⁺. H NMR (400 MHz, DMSO-d₆) δ 8.58-8.56 (m, 2H), 7.67 (d, J=8.8 Hz, 1H), 7.58 (d, J=8.3 Hz, 2H), 7.53-7.50 (m, 2H), 7.41 (d, J=8.3 Hz, 2H), 6.82-6.77 (m, 2H), 6.62 (d, J=2.3 Hz, 1H), 4.47 (t, J=6.4 Hz, 2H), 2.95 (s, 3H), 2.85 (s, 3H), 2.68 (t, J=6.4 Hz, 2H).

Example 72b (*S)—N,N-dimethyl-4-(((4-oxochroman-7-yl)oxy)(pyridin-4-yl)methyl)benzamide

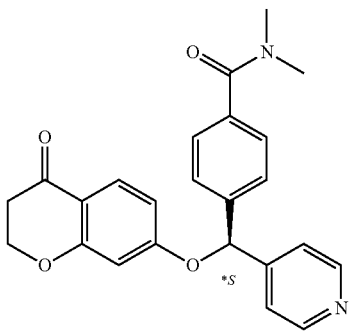 [SMILES: CN(C)C(=O)c1ccc([C@H](Oc2ccc3c(c2)OCCC3=O)c2ccncc2)cc1]

MS (ESI): mass calcd. for $C_{24}H_{22}N_2O_4$ 402.16 m/z found 403.2 [M+H]⁺. ¹H NMR (400 MHz, DMSO-d₆) δ 8.59-8.55 (m, 2H), 7.67 (d, J=8.8 Hz, 1H), 7.58 (d, J=8.3 Hz, 2H), 7.53-7.50 (m, 2H), 7.41 (d, J=8.0 Hz, 2H), 6.82-6.76 (m, 2H), 6.62 (d, J=2.5 Hz, 1H), 4.47 (t, J=6.4 Hz, 2H), 2.95 (s, 3H), 2.85 (s, 3H), 2.68 (t, J=6.4 Hz, 2H).

Example 73: (R,S)-4-(((8-Ethyl-4-oxochroman-7-yl)oxy)(pyridin-4-yl)methyl)benzamide

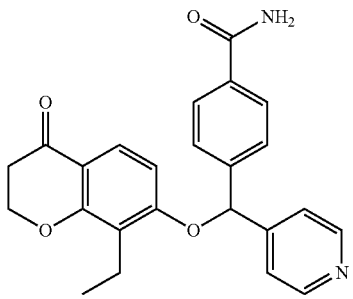

DEAD (182 mg, 1.05 mmol) was added to a solution of 4-(hydroxy(pyridin-4-yl)methyl)benzamide (Intermediate 107, 147 mg, 0.644 mmol), 8-ethyl-7-hydroxychroman-4-one (Intermediate 64, 130 mg, 0.643 mmol), $PPh_3$ (260 mg, 0.991 mmol), and anhydrous THF (2 mL). The mixture was stirred at room temperature for 3 hours before pouring it into ethyl acetate (50 mL). The resulting mixture was washed with brine (20 mL), dried over anhydrous $Na_2SO_4$, filtered, and concentrated to dryness under reduced pressure to give the product, which was purified by FCC (eluent:petroleum ether:ethyl acetate, 1:0 to 0:1, gradient elution) and was further purified by preparative HPLC using a Phenomenex Gemini 150 mm×25 mm×10 m column (eluent: 30% to 60% (v/v) $CH_3CN$ and $H_2O$ with 0.05% $NH_3$) to afford the title compound (100 mg, 50%) as a white solid. MS (ESI): mass calcd. for $C_{24}H_{22}N_2O_4$ 402.16 m/z found 403.2 [M+H]$^+$.

A sample of (R,S)-4-(((8-ethyl-4-oxochroman-7-yl)oxy)(pyridin-4-yl)methyl)benzamide (130 mg, 0.320 mmol) was separated by SFC (YMC CHIRAL Amylose-C, 50% (v/v) supercritical $CO_2$ in MeOH and $H_2O$ with 0.1% $NH_3$) to yield example 73a (first enantiomer to elute, labelled *R) and example 73b (second enantiomer to elute, labelled *S).

Example 73a (*R)-4-(((8-ethyl-4-oxochroman-7-yl)oxy)(pyridin-4-yl)methyl)benzamide

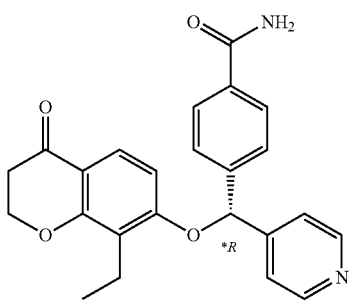 [SMILES: CCc1c(O[C@@H](c2ccncc2)c2ccc(C(N)=O)cc2)ccc2c1OCCC2=O]

MS (ESI): mass calcd. for $C_{24}H_{22}N_2O_4$ 402.16 m/z found 403.0 [M+H]$^+$. $^1$H NMR (400 MHz, DMSO-$d_6$) δ 8.60-8.55 (m, 2H), 7.94 (s, 1H), 7.85 (d, J=8.3 Hz, 2H), 7.61 (d, J=8.3 Hz, 2H), 7.54-7.50 (m, 3H), 7.38 (s, 1H), 6.84 (s, 1H), 6.71 (d, J=9.0 Hz, 1H), 4.52 (t, J=6.4 Hz, 2H), 2.78 (q, J=7.3 Hz, 2H), 2.69 (t, J=6.4 Hz, 2H), 1.15 (t, J=7.3 Hz, 3H).

Example 73b (*S)-4-(((8-ethyl-4-oxochroman-7-yl)oxy)(pyridin-4-yl)methyl)benzamide

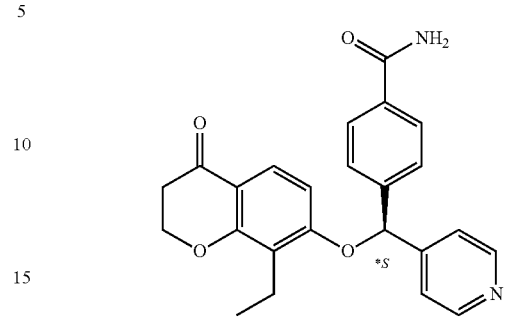

MS (ESI): mass calcd. for $C_{24}H_{22}N_2O_4$ 402.16 m/z found 403.0 [M+H]$^+$. $^1$H NMR (400 MHz, DMSO-$d_6$) δ 8.60-8.56 (m, 2H), 7.94 (s, 1H), 7.85 (d, J=8.3 Hz, 2H), 7.61 (d, J=8.3 Hz, 2H), 7.55-7.50 (m, 3H), 7.38 (s, 1H), 6.84 (s, 1H), 6.71 (d, J=9.0 Hz, 1H), 4.52 (t, J=6.4 Hz, 2H), 2.78 (q, J=7.5 Hz, 2H), 2.69 (t, J=6.5 Hz, 2H), 1.15 (t, J=7.3 Hz, 3H).

Example 74: (R,S)-4-(((6-Ethyl-4-oxochroman-7-yl)oxy)(pyridin-4-yl)methyl)benzamide

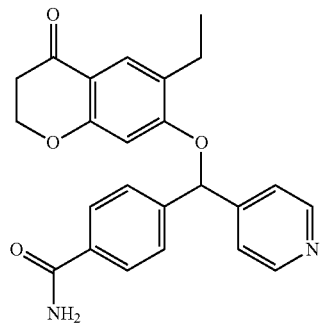 [SMILES: CCc1cc2c(cc1OC(c1ccncc1)c1ccc(C(N)=O)cc1)OCCC2=O]

$H_2O_2$ (0.4 mL, 30% purity, 4.0 mmol) was added dropwise to a mixture of 4-(((6-ethyl-4-oxochroman-7-yl)oxy)(pyridin-4-yl)methyl)benzonitrile (Intermediate 65, 1.5 g, 45% purity, 1.8 mmol), $K_2CO_3$ (737 mg, 5.33 mmol), and DMSO (10 mL). The mixture was stirred at room temperature for 1 hour before pouring it into saturated $Na_2SO_3$ (20 mL) and extracting with ethyl acetate (20 mL×3). The combined organic extracts were dried over anhydrous $Na_2SO_4$, filtered, and concentrated to dryness under reduced pressure to give the product, which was purified by preparative HPLC using a Xtimate C18, 150 mm×25 mm×5 μm column (eluent: 22% to 52% (v/v) $CH_3CN$ and $H_2O$ with 0.225% HCOOH) to afford the title compound (300 mg, 42%) as a white solid. MS (ESI): mass calcd. for $C_{24}H_{22}N_2O_4$ 402.16 m/z found 403.0 [M+H]$^+$.

A sample of (R,S)-4-(((6-ethyl-4-oxochroman-7-yl)oxy)(pyridin-4-yl)methyl)benzamide (250 mg, 0.621 mmol) was separated by SFC (YMC CHIRAL Amylose-C, 40% (v/v) supercritical $CO_2$ in EtOH and $H_2O$ with 0.1% $NH_3$) to yield example 74a (first enantiomer to elute, labelled *R) and example 74b (second enantiomer to elute, labelled *S).

Example 74a (*R)-4-(((6-ethyl-4-oxochroman-7-yl)oxy)(pyridin-4-yl)methyl)benzamide

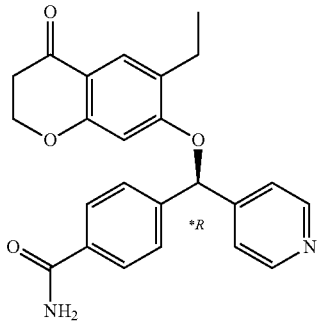 [SMILES: CCc1cc2c(cc1O[C@@H](c1ccncc1)c1ccc(C(N)=O)cc1)OCCC2=O]

MS (ESI): mass calcd. for C$_{24}$H$_{22}$N$_2$O$_4$ 402.16 m/z found 403.0 [M+H]$^+$. $^1$H NMR (400 MHz, DMSO-d$_6$) δ 8.60-8.56 (m, 2H), 7.96 (s, 1H), 7.86 (d, J=8.4 Hz, 2H), 7.63 (d, J=8.2 Hz, 2H), 7.56-7.51 (m, 3H), 7.40 (s, 1H), 6.83 (s, 1H), 6.51 (s, 1H), 4.42 (t, J=6.4 Hz, 2H), 2.77-2.70 (m, 2H), 2.64 (t, J=6.4 Hz, 2H), 1.22 (t, J=7.4 Hz, 3H).

Example 74b (*S)-4-(((6-ethyl-4-oxochroman-7-yl)oxy)(pyridin-4-yl)methyl)benzamide

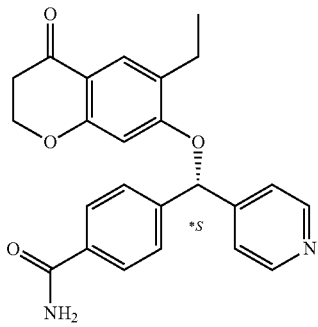 [SMILES: CCc1cc2c(cc1O[C@H](c1ccncc1)c1ccc(C(N)=O)cc1)OCCC2=O]

MS (ESI): mass calcd. for C$_{24}$H$_{22}$N$_2$O$_4$ 402.16 m/z found 403.0 [M+H]$^+$. $^1$H NMR (400 MHz, DMSO-d$_6$) δ 8.60-8.56 (m, 2H), 7.95 (s, 1H), 7.86 (d, J=8.4 Hz, 2H), 7.62 (d, J=8.2 Hz, 2H), 7.56-7.51 (m, 3H), 7.40 (s, 1H), 6.83 (s, 1H), 6.51 (s, 1H), 4.42 (t, J=6.4 Hz, 2H), 2.78-2.70 (m, 2H), 2.64 (t, J=6.4 Hz, 2H), 1.22 (t, J=7.4 Hz, 3H).

Example 75: (R,S)-4-(((8-Isopropyl-4-oxochroman-7-yl)oxy)(pyridin-4-yl)methyl)benzamide

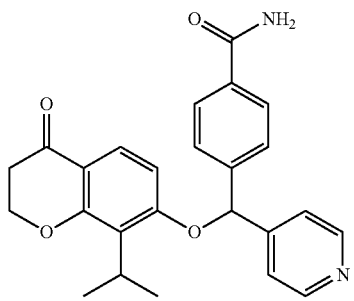 [SMILES: CC(C)c1c(OC(c2ccncc2)c2ccc(C(N)=O)cc2)ccc2c1OCCC2=O]

H$_2$O$_2$ (1.0 mL, 30% purity, 10 mmol) was added dropwise to a 50 mL round-bottomed flask containing a mixture of 4-(((8-isopropyl-4-oxochroman-7-yl)oxy)(pyridin-4-yl)methyl)benzonitrile (Intermediate 66, 800 mg, 36% purity, 0.723 mmol), K$_2$CO$_3$ (967 mg, 6.99 mmol), and DMSO (6 mL). The mixture was stirred at room temperature for 1 hour before quenching with saturated Na$_2$SO$_3$ (10 mL) and extracting with ethyl acetate (20 mL×3). The combined organic extracts were washed with brine (20 mL), dried over anhydrous Na$_2$SO$_4$, filtered, and concentrated to dryness under reduced pressure to give the product, which was purified by FCC (eluent:petroleum ether:ethyl acetate, 1:0 to 0:1, gradient elution) and was further purified by preparative HPLC using a Phenomenex Gemini 150 mm×25 mm×10 m column (eluent: 30% to 60% (v/v) CH$_3$CN and H$_2$O with 0.05% NH$_3$) to afford the title compound (200 mg, 65%) as a white solid. MS (ESI): mass calcd. for C$_{25}$H$_{24}$N$_2$O$_4$ 416.17 m/z found 417.2 [M+H]$^+$.

A sample of (R,S)-4-(((8-isopropyl-4-oxochroman-7-yl)oxy)(pyridin-4-yl)methyl)benzamide (300 mg, 0.677 mmol) was separated by SFC (DAICEL CHIRALCEL OD, 40% (v/v) supercritical CO$_2$ in EtOH and H$_2$O with 0.1% NH$_3$) to yield example 75a (first enantiomer to elute, labelled *R) and example 75b (second enantiomer to elute, labelled *S).

Example 75a (*R)-4-(((8-isopropyl-4-oxochroman-7-yl)oxy)(pyridin-4-yl)methyl)benzamide

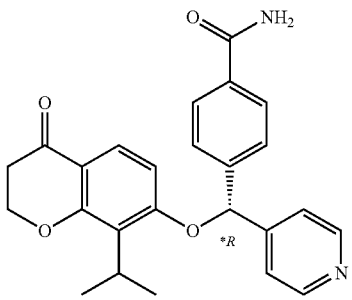 [SMILES: CC(C)c1c(O[C@@H](c2ccncc2)c2ccc(C(N)=O)cc2)ccc2c1OCCC2=O]

MS (ESI): mass calcd. for C$_{25}$H$_{24}$N$_2$O$_4$ 416.17 m/z found 417.2 [M+H]$^+$. $^1$H NMR (400 MHz, DMSO-d$_6$) δ 8.62-8.56 (m, 2H), 7.94 (s, 1H), 7.86 (d, J=8.1 Hz, 2H), 7.59 (d, J=8.3 Hz, 2H), 7.54-7.47 (m, 3H), 7.39 (s, 1H), 6.82 (s, 1H), 6.67 (d, J=9.0 Hz, 1H), 4.51 (t, J=6.2 Hz, 2H), 3.71 (td, J=6.8, 14.0 Hz, 1H), 2.68 (t, J=6.2 Hz, 2H), 1.34 (d, J=3.9 Hz, 3H), 1.32 (d, J=3.9 Hz, 3H).

Example 75b (*S)-4-(((8-isopropyl-4-oxochroman-7-yl)oxy)(pyridin-4-yl)methyl)benzamide

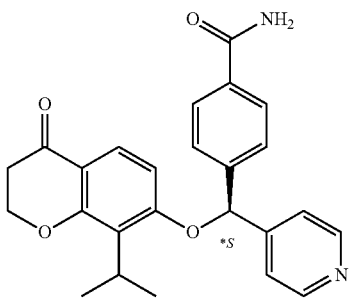 [SMILES: CC(C)c1c(O[C@H](c2ccncc2)c2ccc(C(N)=O)cc2)ccc2c1OCCC2=O]

MS (ESI): mass calcd. for $C_{25}H_{24}N_2O_4$ 416.17 m/z found 417.2 [M+H]$^+$. $^1$H NMR (400 MHz, DMSO-d$_6$) δ 8.61-8.55 (m, 2H), 7.94 (s, 1H), 7.86 (d, J=8.3 Hz, 2H), 7.59 (d, J=8.3 Hz, 2H), 7.55-7.47 (m, 3H), 7.39 (s, 1H), 6.82 (s, 1H), 6.67 (d, J=9.0 Hz, 1H), 4.51 (t, J=6.4 Hz, 2H), 3.72 (td, J=7.2, 14.2 Hz, 1H), 2.69 (t, J=6.4 Hz, 2H), 1.34 (d, J=3.9 Hz, 3H), 1.32 (d, J=3.9 Hz, 3H).

Example 76: (R,S)-4-(((6-Isopropyl-4-oxochroman-7-yl)oxy)(pyridin-4-yl)methyl)benzamide

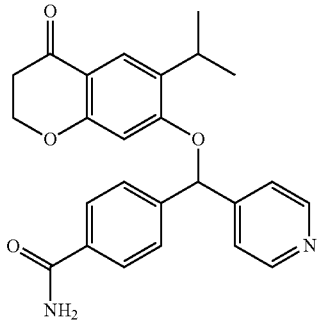 [SMILES: CC(C)c1cc2c(cc1OC(c1ccncc1)c1ccc(C(N)=O)cc1)OCCC2=O]

H$_2$O$_2$ (3.0 mL, 30%, 30 mmol) was added dropwise to a 100 mL round-bottomed flask containing a mixture of 4-(((6-isopropyl-4-oxochroman-7-yl)oxy)(pyridin-4-yl) methyl)benzonitrile (Intermediate 67, 1.6 g, 51% purity), K$_2$CO$_3$ (2.8 g, 20 mmol), and DMSO (15 mL). The mixture was stirred at room temperature for 1 hour before quenching with saturated Na$_2$SO$_3$ (15 mL) and extracting with ethyl acetate (20 mL×3). The combined organic extracts were dried over anhydrous Na$_2$SO$_4$, filtered, and concentrated to dryness under reduced pressure to give the product, which was further purified by FCC (eluent:petroleum ether:ethyl acetate, 1:0 to 0:1, gradient elution) to afford title compound (600 mg, 68%) as a white solid. MS (ESI): mass calcd. for $C_{25}H_{24}N_2O_4$ 416.17 m/z found 417.1 [M+H]$^+$.

A sample of (R,S)-4-(((6-isopropyl-4-oxochroman-7-yl) oxy)(pyridin-4-yl)methyl)benzamide was separated by SFC (YMC CHIRAL Amylose-C, 30% (v/v) supercritical CO$_2$ in EtOH and H$_2$O with 0.1% NH$_3$) to yield example 76a (first enantiomer to elute, labelled *R) and example 76b (second enantiomer to elute, labelled *S).

Example 76a (*R)-4-(((6-isopropyl-4-oxochroman-7-yl)oxy)(pyridin-4-yl)methyl)benzamide

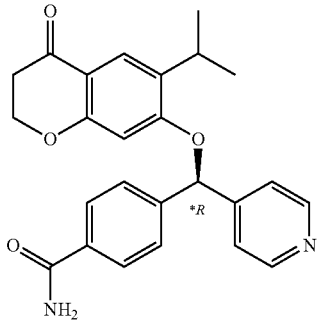 [SMILES: CC(C)c1cc2c(cc1O[C@@H](c1ccncc1)c1ccc(C(N)=O)cc1)OCCC2=O]

MS (ESI): mass calcd. for $C_{25}H_{24}N_2O_4$ 416.17 m/z found 417.0 [M+H]$^+$. $^1$H NMR (400 MHz, DMSO-d$_6$) δ 8.59 (d, J=5.8 Hz, 2H), 7.97 (s, 1H), 7.87 (d, J=8.0 Hz, 2H), 7.63 (d, J=8.0 Hz, 2H), 7.58 (s, 1H), 7.53 (d, J=5.8 Hz, 2H), 7.41 (s, 1H), 6.84 (s, 1H), 6.51 (s, 1H), 4.43 (t, J=6.3 Hz, 2H), 3.45-3.38 (m, 1H), 2.65 (t, J=6.3 Hz, 2H), 1.25 (dd, J=4.9, 6.7 Hz, 6H).

Example 76b (*S)-4-(((6-isopropyl-4-oxochroman-7-yl)oxy)(pyridin-4-yl)methyl)benzamide

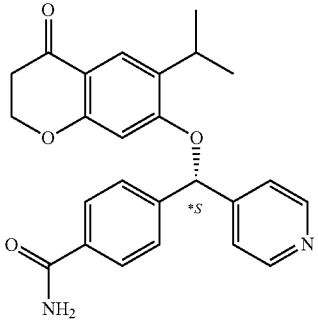

MS (ESI): mass calcd. for $C_{25}H_{24}N_2O_4$ 416.17 m/z found 417.0 [M+H]$^+$. $^1$H NMR (400 MHz, DMSO-d$_6$) δ 8.59 (d, J=6.0 Hz, 2H), 7.97 (s, 1H), 7.88 (d, J=8.3 Hz, 2H), 7.63 (d, J=8.3 Hz, 2H), 7.59 (s, 1H), 7.53 (d, J=5.8 Hz, 2H), 7.41 (s, 1H), 6.84 (s, 1H), 6.51 (s, 1H), 4.42 (t, J=6.3 Hz, 2H), 3.45-3.40 (m, 1H), 2.65 (t, J=6.3 Hz, 2H), 1.25 (dd, J=4.9, 6.7 Hz, 6H).

Example 77: (R,S)-4-(((5-Methoxy-4-oxochroman-7-yl)oxy)(pyridin-4-yl)methyl)benzamide

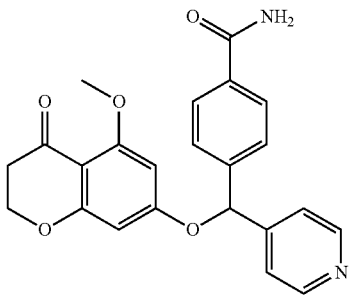

DIAD (0.24 mL, 1.3 mmol) was added to a solution of 7-hydroxy-5-methoxychroman-4-one (Intermediate 68, 125 mg, 0.644 mmol), 4-(hydroxy(pyridin-4-yl)methyl)benzamide (Intermediate 107, 264 mg, 1.16 mmol), PPh$_3$ (338 mg, 1.29 mmol), and THF (2 mL). The mixture was stirred at room temperature for 3 hours and at 70° C. for 1 hour before concentrating to dryness under reduced pressure to give the product, which was purified by preparative HPLC using a Xtimate C18, 250 mm×50 mm×5 μm column (eluent: 5% to 35% (v/v) CH$_3$CN and H$_2$O with 10 mM NH$_4$HCO$_3$) to afford the title compound (60 mg, 23%) as a light yellow solid. MS (ESI): mass calcd. for $C_{23}H_{20}N_2O_5$ 404.14 m/z found 405.1 [M+H]$^+$.

A sample of (R,S)-4-(((5-methoxy-4-oxochroman-7-yl) oxy)(pyridin-4-yl)methyl)benzamide (60 mg, 0.15 mmol)

Example 77a (*R)-4-(((5-methoxy-4-oxochroman-7-yl)oxy)(pyridin-4-yl)methyl)benzamide

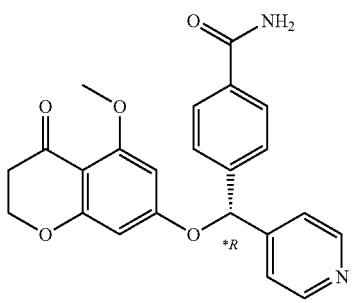 [SMILES: COc1cc(O[C@@H](c2ccncc2)c2ccc(C(N)=O)cc2)cc2c1C(=O)CCO2]

MS (ESI): mass calcd. for $C_{23}H_{20}N_2O_5$ 404.14 m/z found 405.2 [M+H]$^+$. $^1$H NMR (400 MHz, DMSO-d$_6$) δ 8.58-8.54 (m, 2H), 7.98 (s, 1H), 7.85 (d, J=8.3 Hz, 2H), 7.60 (d, J=8.1 Hz, 2H), 7.51 (d, J=5.9 Hz, 2H), 7.40 (s, 1H), 6.79 (s, 1H), 6.38 (d, J=2.2 Hz, 1H), 6.17 (d, J=2.2 Hz, 1H), 4.34 (t, J=6.2 Hz, 2H), 3.74 (s, 3H), 2.55 (t, J=6.4 Hz, 2H).

Example 77b (*S)-4-(((5-methoxy-4-oxochroman-7-yl)oxy)(pyridin-4-yl)methyl)benzamide

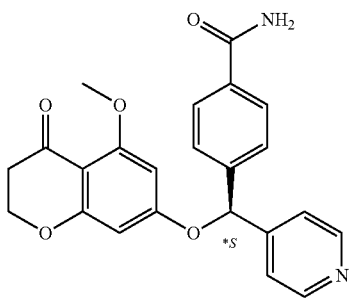

MS (ESI): mass calcd. for $C_{23}H_{20}N_2O_5$ 404.14 m/z found 405.1 [M+H]$^+$. $^1$H NMR (400 MHz, DMSO-d$_6$) δ 8.59-8.55 (m, 2H), 7.97 (s, 1H), 7.86 (d, J=8.3 Hz, 2H), 7.60 (d, J=8.1 Hz, 2H), 7.51 (d, J=5.9 Hz, 2H), 7.40 (s, 1H), 6.80 (s, 1H), 6.39 (d, J=2.2 Hz, 1H), 6.17 (d, J=2.0 Hz, 1H), 4.35 (t, J=6.2 Hz, 2H), 3.75 (s, 3H), 2.55 (t, J=6.2 Hz, 2H).

Example 78: (R,S)-4-(((8-Cyano-4-oxochroman-7-yl)oxy)(pyridin-4-yl)methyl)benzamide

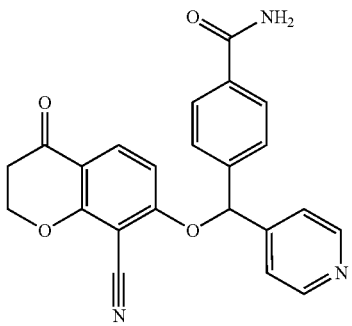 [SMILES: N#Cc1c(OC(c2ccncc2)c2ccc(C(N)=O)cc2)ccc2c1OCCC2=O]

Zn(CN)$_2$ (325 mg, 2.77 mmol) was added to a 10 mL microwave tube containing a mixture of 4-(((8-iodo-4-oxochroman-7-yl)oxy)(pyridin-4-yl)methyl)benzamide (Intermediate 69, 500 mg), Zn dust (20 mg, 0.31 mmol), and DMF (5 mL). The mixture was sparged with Ar for 5 minutes and then treated with Pd(dppf)Cl$_2$ (146 mg, 0.20 mmol). The mixture was sparged with Ar for another 5 minutes and then stirred while heating at 130° C. for 0.5 hours before cooling to room temperature. The mixture was combined with another reaction conducted in the same manner, quenched with water (60 mL), and extracted with ethyl acetate (100 mL×3). The combined organic extracts were dried over anhydrous Na$_2$SO$_4$, filtered, and concentrated to dryness under reduced pressure to give the product, which was purified by preparative HPLC using a Phenomenex Gemini 150 mm×25 mm, 10 μm column (eluent: 20% to 50% (v/v) CH$_3$CN and H$_2$O with 0.05% NH$_3$) to afford the title compound (80 mg) as a yellow solid. MS (ESI): mass calcd. for $C_{23}H_{17}N_3O_4$ 399.12 m/z found 400.2 [M+H]$^+$.

A sample of (R,S)-4-(((8-cyano-4-oxochroman-7-yl)oxy)(pyridin-4-yl)methyl)benzamide (80 mg, 0.20 mmol) was separated by SFC (DAICEL CHIRALCEL OJ-H, 40% (v/v) supercritical CO$_2$ in EtOH and H$_2$O with 0.1% NH$_3$) to yield example 78a (first enantiomer to elute, labelled *R) and example 78b (second enantiomer to elute, labelled *S).

Example 78a (*R)-4-(((8-cyano-4-oxochroman-7-yl)oxy)(pyridin-4-yl)methyl)benzamide

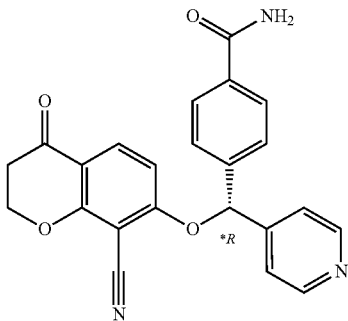 [SMILES: N#Cc1c(O[C@@H](c2ccncc2)c2ccc(C(N)=O)cc2)ccc2c1OCCC2=O]

MS (ESI): mass calcd. for $C_{23}H_{17}N_3O_4$ 399.12 m/z found 399.9 [M+H]$^+$. $^1$H NMR (400 MHz, DMSO-d$_6$) δ 8.64-8.56 (m, 2H), 7.97 (br s, 1H), 7.92 (d, J=9.0 Hz, 1H), 7.88 (d, J=8.3 Hz, 2H), 7.61 (d, J=8.1 Hz, 2H), 7.52 (d, J=5.9 Hz, 2H), 7.41 (br s, 1H), 7.06 (s, 1H), 6.91 (d, J=9.0 Hz, 1H), 4.72 (t, J=6.4 Hz, 2H), 2.81 (t, J=6.4 Hz, 2H).

Example 78b (*S)-4-(((8-cyano-4-oxochroman-7-yl)oxy)(pyridin-4-yl)methyl)benzamide

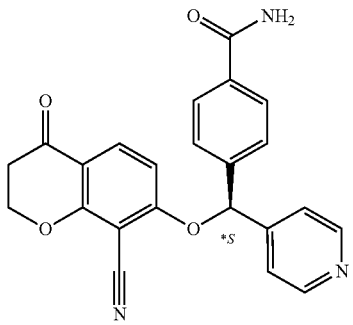 [SMILES: N#Cc1c(O[C@H](c2ccncc2)c2ccc(C(N)=O)cc2)ccc2c1OCCC2=O]

MS (ESI): mass calcd. for $C_{23}H_{17}N_3O_4$ 399.12 m/z found 400.1 [M+H]$^+$. $^1$H NMR (400 MHz, DMSO-d$_6$) δ 8.63-8.58 (m, 1H), 7.96 (br s, 1H), 7.92 (d, J=9.0 Hz, 1H), 7.88 (d, J=8.3 Hz, 1H), 7.61 (d, J=8.3 Hz, 1H), 7.52 (d, J=5.9 Hz, 1H), 7.41 (br s, 1H), 7.06 (s, 1H), 6.91 (d, J=9.0 Hz, 1H), 4.72 (t, J=6.4 Hz, 1H), 2.81 (t, J=6.4 Hz, 1H).

Example 79: (R,S)-4-(((8-([1,1'-Biphenyl]-4-yl)-4-oxochroman-7-yl)oxy)(pyridin-4-yl)methyl)benzamide

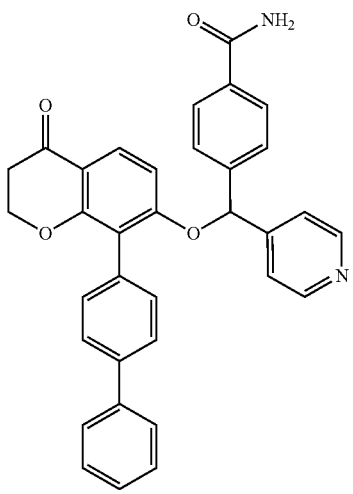 [SMILES: NC(=O)c1ccc(C(Oc2ccc3c(c2-c2ccc(-c4ccccc4)cc2)OCCC3=O)c2ccncc2)cc1]

H$_2$O$_2$ (0.11 mL, 30% purity, 1.1 mmol) was added dropwise to a mixture of 4-(((8-([1,1'-biphenyl]-4-yl)-4-oxochroman-7-yl)oxy)(pyridin-4-yl)methyl)benzonitrile (Intermediate 70, 300 mg), K$_2$CO$_3$ (148 mg, 1.07 mmol), and DMSO (5 mL). The mixture was stirred at 40° C. for 1 hour before cooling to room temperature, pouring it into saturated Na$_2$SO$_3$ (10 mL), and extracting with ethyl acetate (10 mL×3). The combined organic extracts were dried over anhydrous Na$_2$SO$_4$, filtered, and concentrated to dryness under reduced pressure to give the product, which was purified by preparative HPLC using a Xtimate C18, 150 mm×25 mm×5 m column (eluent: 22% to 52% (v/v) CH$_3$CN and H$_2$O with 0.05% NH$_3$) to afford the title compound (60 mg, 27%) as a white solid. MS (ESI): mass calcd. for $C_{34}H_{26}N_2O_4$ 526.19 m/z found 527.1 [M+H]$^+$.

A sample of (R,S)-4-(((8-([1,1'-biphenyl]-4-yl)-4-oxochroman-7-yl)oxy)(pyridin-4-yl)methyl)benzamide (60 mg, 0.11 mmol) was separated by SFC (YMC CHIRAL Amylose-C, 50% (v/v) supercritical CO$_2$ in EtOH and H$_2$O with 0.1% NH$_3$) to yield example 79a (first enantiomer to elute, labelled *R) and example 79b (second enantiomer to elute, labelled *S).

Example 79a (*R)-4-(((8-([1,1'-biphenyl]-4-yl)-4-oxochroman-7-yl)oxy)(pyridin-4-yl)methyl)benzamide

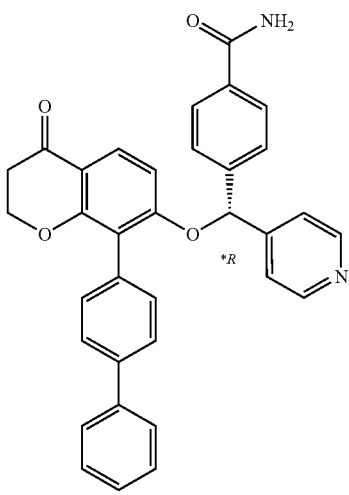 [SMILES: NC(=O)c1ccc([C@@H](Oc2ccc3c(c2-c2ccc(-c4ccccc4)cc2)OCCC3=O)c2ccncc2)cc1]

MS (ESI): mass calcd. for $C_{34}H_{26}N_2O_4$ 526.19 m/z found 527.0 [M+H]$^+$. $^1$H NMR (400 MHz, DMSO-d$_6$) δ 8.60-8.56 (m, 2H), 7.96 (s, 1H), 7.86 (d, J=8.4 Hz, 2H), 7.63 (d, J=8.2 Hz, 2H), 7.56-7.51 (m, 3H), 7.40 (s, 1H), 6.83 (s, 1H), 6.51 (s, 1H), 4.42 (t, J=6.4 Hz, 2H), 2.77-2.70 (m, 2H), 2.64 (t, J=6.4 Hz, 2H), 1.22 (t, J=7.4 Hz, 3H).

Example 79b (*S)-4-(((8-([1,1'-biphenyl]-4-yl)-4-oxochroman-7-yl)oxy)(pyridin-4-yl)methyl)benzamide

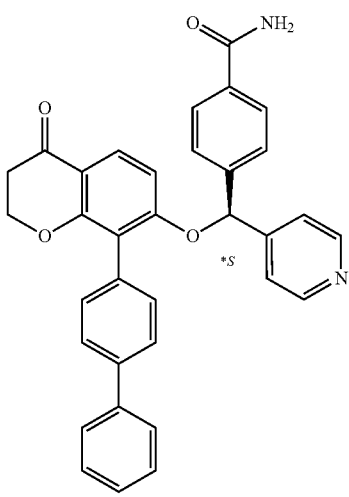 [SMILES: NC(=O)c1ccc([C@H](Oc2ccc3c(c2-c2ccc(-c4ccccc4)cc2)OCCC3=O)c2ccncc2)cc1]

MS (ESI): mass calcd. for $C_{34}H_{26}N_2O_4$ 526.19 m/z found 527.0 [M+H]$^+$. H NMR (400 MHz, DMSO-$d_6$) δ 8.60-8.56 (m, 2H), 7.95 (s, 1H), 7.86 (d, J=8.4 Hz, 2H), 7.62 (d, J=8.2 Hz, 2H), 7.56-7.51 (m, 3H), 7.40 (s, 1H), 6.83 (s, 1H), 6.51 (s, 1H), 4.42 (t, J=6.4 Hz, 2H), 2.78-2.70 (m, 2H), 2.64 (t, J=6.4 Hz, 2H), 1.22 (t, J=7.4 Hz, 3H).

Example 80: (R,S)-4-(((4-Oxo-8-propylchroman-7-yl)oxy)(pyridin-4-yl)methyl)benzamide

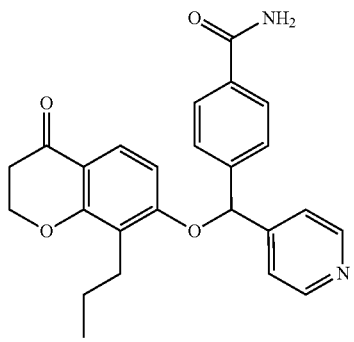 [SMILES: CCCc1c(OC(c2ccncc2)c2ccc(C(N)=O)cc2)ccc2c1OCCC2=O]

H$_2$O$_2$ (1.6 mL, 30%, 16 mmol) was added dropwise to a 50 mL round-bottomed flask containing a mixture of 4-(((4-oxo-8-propylchroman-7-yl)oxy)(pyridin-4-yl)methyl)benzonitrile (Intermediate 71, 800 mg, 53% purity, 1.06 mmol), K$_2$CO$_3$ (1.4 g, 10 mmol), and DMSO (6 mL).

The mixture was stirred at room temperature for 1 hour before pouring it into saturated Na$_2$SO$_3$ (10 mL) and extracting with ethyl acetate (20 mL×3). The combined organic extracts were washed with brine (20 mL), dried over anhydrous Na$_2$SO$_4$, filtered, and concentrated to dryness under reduced pressure to give the product, which was purified by FCC (eluent:petroleum ether:ethyl acetate, 1:0 to 0:1, gradient elution) to afford the title compound (300 mg, 62%) as a brown oil. MS (ESI): mass calcd. for $C_{25}H_{24}N_2O_4$ 416.17 m/z found 417.1 [M+H]$^+$.

A sample of (R,S)-4-(((4-oxo-8-propylchroman-7-yl)oxy)(pyridin-4-yl)methyl)benzamide (300 mg, 0.677 mmol) was separated by SFC (DAICEL CHIRALCEL OJ, 40% (v/v) supercritical CO$_2$ in EtOH and H$_2$O with 0.1% NH$_3$) to yield example 80a (first enantiomer to elute, labelled *R) and 80b (second enantiomer to elute, labelled *S).

Example 80a (*R)-4-(((4-Oxo-8-propylchroman-7-yl)oxy)(pyridin-4-yl)methyl)benzamide

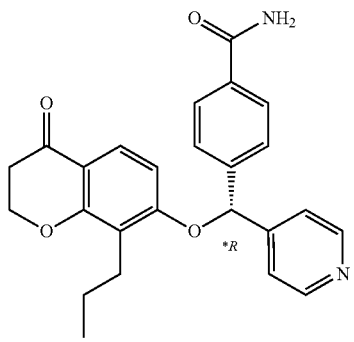 [SMILES: CCCc1c(O[C@@H](c2ccncc2)c2ccc(C(N)=O)cc2)ccc2c1OCCC2=O]

MS (ESI): mass calcd. for $C_{25}H_{24}N_2O_4$ 416.17 m/z found 417.2 [M+H]$^+$. $^1$H NMR (400 MHz, DMSO-$d_6$) δ 8.57 (m, 2H), 7.94 (s, 1H), 7.85 (d, J=8.3 Hz, 2H), 7.61 (d, J=8.3 Hz, 2H), 7.55-7.48 (m, 3H), 7.38 (s, 1H), 6.82 (s, 1H), 6.69 (d, J=9.0 Hz, 1H), 4.51 (t, J=6.4 Hz, 2H), 2.74 (t, J=7.6 Hz, 2H), 2.69 (t, J=6.4 Hz, 2H), 1.57 (qd, J=7.4, 15.0 Hz, 2H), 0.96 (t, J=7.3 Hz, 3H).

Example 80b (*S)-4-(((4-Oxo-8-propylchroman-7-yl)oxy)(pyridin-4-yl)methyl)benzamide

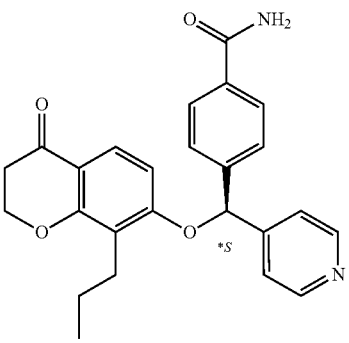 [SMILES: CCCc1c(O[C@H](c2ccncc2)c2ccc(C(N)=O)cc2)ccc2c1OCCC2=O]

MS (ESI): mass calcd. for $C_{25}H_{24}N_2O_4$ 416.17 m/z found 417.1 [M+H]$^+$. $^1$H NMR (400 MHz, DMSO-$d_6$) δ 8.55 (m, 2H), 7.94 (s, 1H), 7.85 (d, J=8.3 Hz, 2H), 7.61 (d, J=8.3 Hz, 2H), 7.55-7.49 (m, 3H), 7.38 (s, 1H), 6.82 (s, 1H), 6.69 (d, J=9.0 Hz, 1H), 4.51 (t, J=6.2 Hz, 2H), 2.75 (t, J=7.5 Hz, 2H), 2.69 (t, J=6.4 Hz, 2H), 1.57 (qd, J=7.3, 14.9 Hz, 2H), 0.96 (t, J=7.3 Hz, 3H).

Example 81: (R,S)-1-(3-(((8-Methyl-4-oxochroman-7-yl)oxy)(pyridin-4-yl)methyl)benzyl)urea

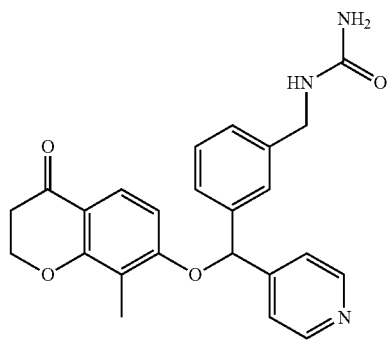 [SMILES: Cc1c(OC(c2ccncc2)c2cccc(CNC(N)=O)c2)ccc2c1OCCC2=O]

DIAD (503 mg, 2.49 mmol) was added to a mixture of 1-(3-(hydroxy(pyridin-4-yl)methyl)benzyl)urea (Intermediate 72, 400 mg, 1.56 mmol), 7-hydroxy-8-methylchroman-4-one (Intermediate 40, Step B, 332 mg, 1.86 mmol), PPh$_3$ (652 mg, 2.49 mmol), and THF (3 mL). The mixture was stirred at room temperature for 16 hours and then combined with a second reaction run in the same manner. The mixture was concentrated to dryness under reduced pressure to give the product, which was purified by preparative HPLC using a Phenomenex Gemini 150 mm×25 mm×10 μm column (eluent: 25% to 55% (v/v) CH$_3$CN and H$_2$O with 0.05% NH$_3$) to afford the title compound (250 mg). MS (ESI): mass calcd. for $C_{24}H_{23}N_3O_4$ 417.17 m/z found 418.2 [M+H]$^+$.

A sample of (R,S)-1-(3-(((8-methyl-4-oxochroman-7-yl)oxy)(pyridin-4-yl)methyl)benzyl)urea (250 mg, 0.599 mmol) was separated by SFC (DAICEL CHIRALCEL OJ, 35% (v/v) supercritical CO₂ in EtOH and H₂O with 0.1% NH₃) to yield example 81a (first enantiomer to elute, labelled *R) and example 81b (second enantiomer to elute, labelled *S).

Example 81a (*R)-1-(3-(((8-methyl-4-oxochroman-7-yl)oxy)(pyridin-4-yl)methyl)benzyl)urea

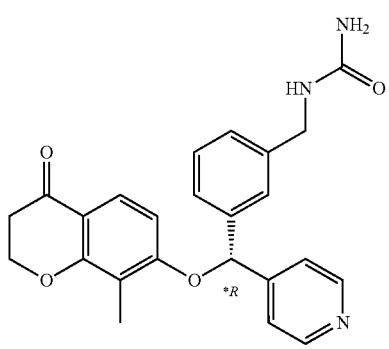 [SMILES: Cc1c(O[C@@H](c2ccncc2)c2cccc(CNC(N)=O)c2)ccc2c1OCCC2=O]

MS (ESI): mass calcd. for $C_{24}H_{23}N_3O_4$ 417.17 m/z found 418.2 [M+H]⁺. ¹H NMR (400 MHz, DMSO-d₆) δ 8.58-8.52 (m, 2H), 7.54-7.48 (m, 3H), 7.45 (s, 1H), 7.43-7.38 (m, 1H), 7.36-7.29 (m, 1H), 7.17 (d, J=7.5 Hz, 1H), 6.79-6.70 (m, 2H), 6.46-6.37 (m, 1H), 5.54 (s, 2H), 4.53 (t, J=6.3 Hz, 2H), 4.16 (d, J=6.0 Hz, 2H), 2.69 (t, J=6.4 Hz, 2H), 2.22 (s, 3H).

Example 81b (*S)-1-(3-(((8-methyl-4-oxochroman-7-yl)oxy)(pyridin-4-yl)methyl)benzyl)urea

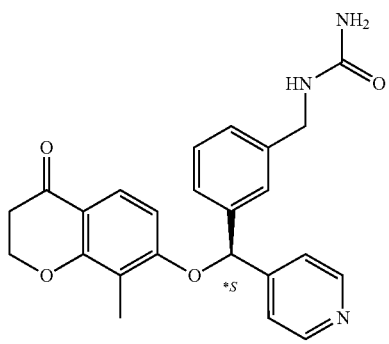 [SMILES: Cc1c(O[C@H](c2ccncc2)c2cccc(CNC(N)=O)c2)ccc2c1OCCC2=O]

MS (ESI): mass calcd. for $C_{24}H_{23}N_3O_4$ 417.17 m/z found 418.2 [M+H]⁺. ¹H NMR (400 MHz, DMSO-d₆) δ 8.57-8.53 (m, 2H), 7.53-7.48 (m, 3H), 7.45 (s, 1H), 7.43-7.38 (m, 1H), 7.35-7.30 (m, 1H), 7.17 (d, J=7.5 Hz, 1H), 6.78-6.70 (m, 2H), 6.45-6.37 (m, 1H), 5.54 (s, 2H), 4.53 (t, J=6.3 Hz, 2H), 4.16 (d, J=6.0 Hz, 2H), 2.69 (t, J=6.4 Hz, 2H), 2.22 (s, 3H).

Example 82: (R,S)-3-Methoxy-4-(((8-methyl-4-oxochroman-7-yl)oxy)(pyridin-4-yl)methyl)benzamide

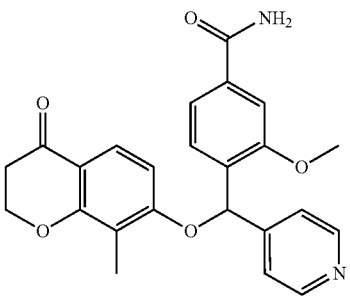 [SMILES: COc1cc(C(N)=O)ccc1C(Oc1ccc2c(c1C)OCCC2=O)c1ccncc1]

H₂O₂ (0.31 mL, 30% purity, 3.1 mmol) was added dropwise to a 0° C. mixture of 3-methoxy-4-(((8-methyl-4-oxochroman-7-yl)oxy)(pyridin-4-yl)methyl)benzonitrile (Intermediate 73, 240 mg, 0.599 mmol), K₂CO₃ (250 mg, 1.81 mmol), and DMSO (5 mL). The mixture was stirred at room temperature for 1 hour before quenching with saturated Na₂SO₃ (20 mL) and extracting with ethyl acetate (20 mL×3). The aqueous layer was lyophilized to dryness to give the product (400 mg) as a brown solid, which was further purified by FCC (eluent:petroleum ether:ethyl acetate, 1:1 to 0:1, gradient elution) to afford the title compound (160 mg, 64%) as a white solid. MS (ESI): mass calcd. for $C_{24}H_{22}N_2O_5$ 418.15 m/z found 419.0 [M+H]⁺.

A sample of (R,S)-3-methoxy-4-(((8-methyl-4-oxochroman-7-yl)oxy)(pyridin-4-yl)methyl)benzamide (160 mg, 0.344 mmol) was separated by SFC (DAICEL CHIRALCEL OJ-H, 40% (v/v) supercritical CO₂ in EtOH and H₂O with 0.1% NH₃) to yield example 82a (first enantiomer to elute, labelled *R) and example 82b (second enantiomer to elute, labelled *S).

Example 82a (*R)-3-Methoxy-4-(((8-methyl-4-oxochroman-7-yl)oxy)(pyridin-4-yl)methyl)benzamide

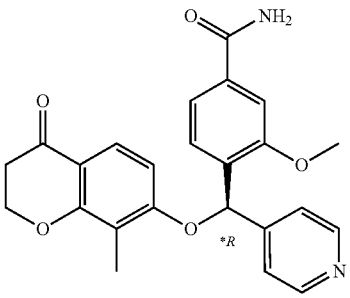 [SMILES: COc1cc(C(N)=O)ccc1[C@H](Oc1ccc2c(c1C)OCCC2=O)c1ccncc1]

MS (ESI): mass calcd. for $C_{24}H_{22}N_2O_5$ 418.15 m/z found 419.2 [M+H]⁺. ¹H NMR (400 MHz, DMSO-d₆) δ 8.59-8.51 (m, 2H), 7.98 (br. s, 1H), 7.56-7.38 (m, 7H), 6.83 (s, 1H), 6.58 (d, J=9.0 Hz, 1H), 4.52 (t, J=6.4 Hz, 2H), 3.95 (s, 3H), 2.68 (t, J=6.4 Hz, 2H), 2.21 (s, 3H).

Example 82b (*S)-3-Methoxy-4-(((8-methyl-4-oxochroman-7-yl)oxy)(pyridin-4-yl)methyl)benzamide

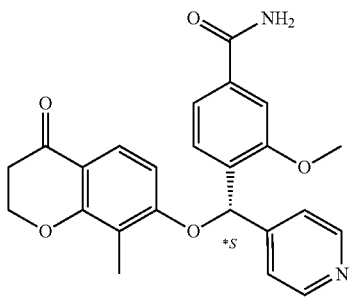 [SMILES: COc1cc(C(N)=O)ccc1[C@@H](Oc1ccc2c(c1C)OCCC2=O)c1ccncc1]

MS (ESI): mass calcd. for $C_{24}H_{22}N_2O_5$ 418.15 m/z found 419.2 [M+H]$^+$. $^1$H NMR (400 MHz, DMSO-d$_6$) δ 8.60-8.50 (m, 2H), 7.98 (s, 1H), 7.55-7.38 (m, 7H), 6.83 (s, 1H), 6.58 (d, J=9.0 Hz, 1H), 4.52 (t, J=6.4 Hz, 2H), 3.95 (s, 3H), 2.68 (t, J=6.4 Hz, 2H), 2.21 (s, 3H).

Example 83: (R,S)-3-Ethoxy-4-(((8-methyl-4-oxochroman-7-yl)oxy)(pyridin-4-yl)methyl)benzamide

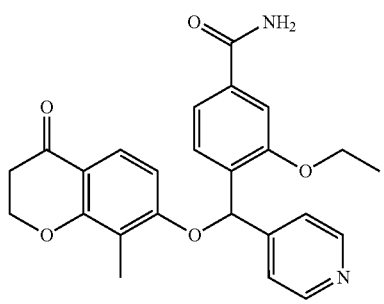 [SMILES: CCOc1cc(C(N)=O)ccc1C(Oc1ccc2c(c1C)OCCC2=O)c1ccncc1]

H$_2$O$_2$ (0.4 mL, 30% purity, 4 mmol) was added dropwise to a solution of 3-ethoxy-4-(((8-methyl-4-oxochroman-7-yl)oxy)(pyridin-4-yl)methyl)benzonitrile (Intermediate 74, 650 mg), K$_2$CO$_3$ (200 mg, 1.45 mmol), and DMSO (8 mL). The mixture was stirred at room temperature for 1 hour before pouring it into saturated Na$_2$SO$_3$ (20 mL) and then extracting with ethyl acetate (20 mL×3). The combined organic extracts were dried over anhydrous Na$_2$SO$_4$, filtered, and concentrated to dryness under reduced pressure to give the product, which was purified by FCC (eluent:methanol:ethyl acetate, 0:1 to 1:3, gradient elution) and further purified by preparative HPLC using a DB Xbridge 150×30 mm×10 μm column (eluent: 25% to 55% (v/v) CH$_3$CN and H$_2$O with 0.05% NH$_3$) to afford the title compound (110 mg) as a white solid. MS (ESI): mass calcd. for $C_{25}H_{24}N_2O_5$ 432.17 m/z found 433.0 [M+H]$^+$.

A sample of (R,S)-3-ethoxy-4-(((8-methyl-4-oxochroman-7-yl)oxy)(pyridin-4-yl)methyl)benzamide (100 mg, 0.231 mmol) was separated by SFC (DAICEL CHIRALCEL OJ-H, 25% (v/v) supercritical CO$_2$ in EtOH and H$_2$O with 0.1% NH$_3$) to yield example 83a (first enantiomer to elute, labelled *R) and example 83b (second enantiomer to elute, labelled *S).

Example 83a (*R)-3-ethoxy-4-(((8-methyl-4-oxochroman-7-yl)oxy)(pyridin-4-yl)methyl)benzamide

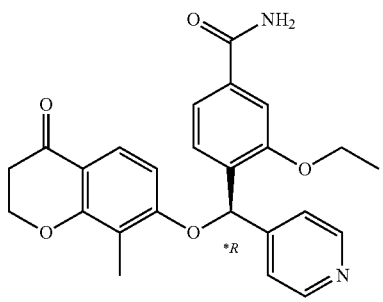 [SMILES: CCOc1cc(C(N)=O)ccc1[C@H](Oc1ccc2c(c1C)OCCC2=O)c1ccncc1]

MS (ESI): mass calcd. for $C_{25}H_{24}N_2O_5$ 432.17 m/z found 433.1 [M+H]$^+$. $^1$H NMR (400 MHz, DMSO-d$_6$) δ 8.59-8.51 (m, 2H), 7.96 (s, 1H), 7.54-7.45 (m, 5H), 7.45-7.37 (m, 2H), 6.82 (s, 1H), 6.61 (d, J=8.8 Hz, 1H), 4.52 (t, J=6.4 Hz, 2H), 4.23-4.14 (m, 2H), 2.71-2.66 (m, 2H), 2.21 (s, 3H), 1.41 (t, J=6.8 Hz, 3H).

Example 83b (*S)-3-ethoxy-4-(((8-methyl-4-oxochroman-7-yl)oxy)(pyridin-4-yl)methyl)benzamide

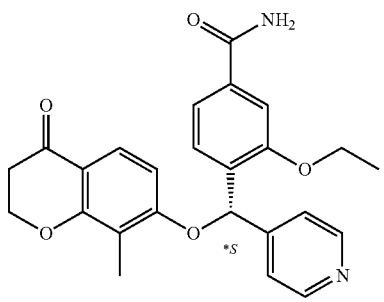 [SMILES: CCOc1cc(C(N)=O)ccc1[C@@H](Oc1ccc2c(c1C)OCCC2=O)c1ccncc1]

MS (ESI): mass calcd. for $C_{25}H_{24}N_2O_5$ 432.17 m/z found 433.2 [M+H]$^+$. $^1$H NMR (400 MHz, DMSO-d$_6$) δ 8.57-8.49 (m, 2H), 7.93 (s, 1H), 7.51-7.42 (m, 5H), 7.42-7.32 (m, 2H), 6.79 (s, 1H), 6.58 (d, J=8.8 Hz, 1H), 4.49 (t, J=6.4 Hz, 2H), 4.19-4.11 (m, 2H), 2.65 (t, J=6.2 Hz, 2H), 2.17 (s, 3H), 1.38 (t, J=7.0 Hz, 3H).

Example 84: (R,S)-3-Isopropoxy-4-(((8-methyl-4-oxochroman-7-yl)oxy)(pyridin-4-yl)methyl)benzamide

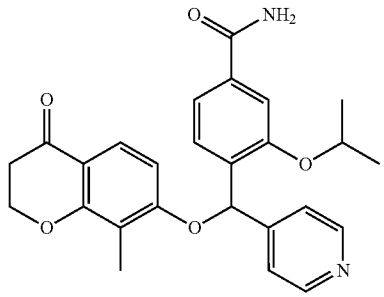 [SMILES: Cc1c(OC(c2ccncc2)c2ccc(C(N)=O)cc2OC(C)C)ccc2c1OCCC2=O]

H$_2$O$_2$ (0.34 mL, 30% purity, 3.4 mmol) was added dropwise to a solution of 3-isopropoxy-4-(((8-methyl-4-oxochroman-7-yl)oxy)(pyridin-4-yl)methyl)benzonitrile (Intermediate 75, 250 mg, 0.583 mmol), K$_2$CO$_3$ (247 mg, 1.79 mmol), and DMSO (6 mL). The mixture was stirred at room temperature for 1 hour before pouring it into saturated Na$_2$SO$_3$ (10 mL) and extracting with ethyl acetate (20 mL×3). The combined organic extracts were dried over anhydrous Na$_2$SO$_4$, filtered, and concentrated to dryness under reduced pressure to give the product, which was purified by FCC (eluent:methanol:ethyl acetate, 0:1 to 1:3, gradient elution) to afford the title compound (240 mg, 87%) as a yellow oil. MS (ESI): mass calcd. for C$_{26}$H$_{26}$N$_2$O$_5$ 446.18 m/z found 447.0 [M+H]$^+$.

A sample of (R,S)-3-isopropoxy-4-(((8-methyl-4-oxochroman-7-yl)oxy)(pyridin-4-yl)methyl)benzamide (240 mg, 0.538 mmol) was separated by SFC (DAICEL CHIRALCEL OJ-H, 30% (v/v) supercritical CO$_2$ in MeOH and H$_2$O with 0.1% NH$_3$) to yield example 84a (first enantiomer to elute, labelled *R) and example 84b (second enantiomer to elute, labelled *S).

Example 84a (*R)-3-isopropoxy-4-(((8-methyl-4-oxochroman-7-yl)oxy)(pyridin-4-yl)methyl)benzamide

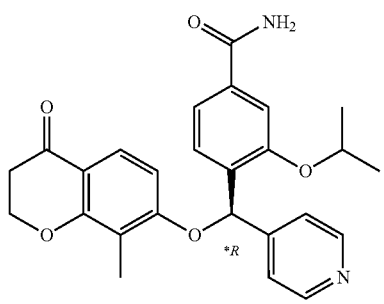 [SMILES: Cc1c(O[C@H](c2ccncc2)c2ccc(C(N)=O)cc2OC(C)C)ccc2c1OCCC2=O]

MS (ESI): mass calcd. for C$_{26}$H$_{26}$N$_2$O$_5$ 446.18 m/z found 447.2 [M+H]$^+$. $^1$H NMR (400 MHz, DMSO-d$_6$) δ 8.56-8.48 (m, 2H), 7.93 (s, 1H), 7.50-7.42 (m, 5H), 7.40-7.33 (m, 2H), 6.76 (s, 1H), 6.58 (d, J=8.8 Hz, 1H), 4.84-4.73 (m, 1H), 4.49 (t, J=6.4 Hz, 2H), 2.65 (t, J=6.4 Hz, 2H), 2.17 (s, 3H), 1.30 (d, J=6.0 Hz, 3H), 1.26 (d, J=6.0 Hz, 3H).

Example 84b (*S)-3-isopropoxy-4-(((8-methyl-4-oxochroman-7-yl)oxy)(pyridin-4-yl)methyl)benzamide

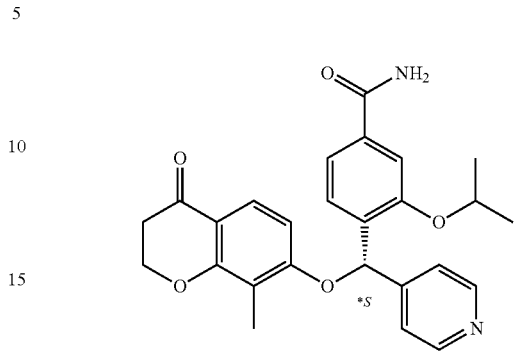

MS (ESI): mass calcd. for C$_{26}$H$_{26}$N$_2$O$_5$ 446.18 m/z found 447.2 [M+H]$^+$. $^1$H NMR (400 MHz, DMSO-d$_6$) δ 8.54-8.51 (m, 2H), 7.93 (s, 1H), 7.49-7.42 (m, 5H), 7.39-7.34 (m, 2H), 6.76 (s, 1H), 6.58 (d, J=9.2 Hz, 1H), 4.83-4.75 (m, 1H), 4.49 (t, J=6.4 Hz, 2H), 2.65 (t, J=6.4 Hz, 2H), 2.17 (s, 3H), 1.30 (d, J=6.0 Hz, 3H), 1.26 (d, J=6.0 Hz, 3H).

Example 85: (R,S)-3-Isobutoxy-4-(((8-methyl-4-oxochroman-7-yl)oxy)(pyridin-4-yl)methyl)benzamide

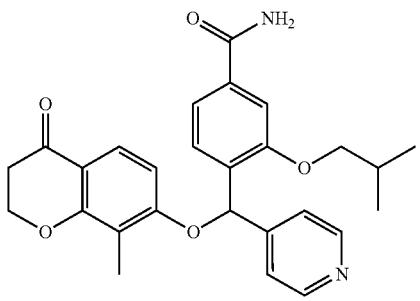 [SMILES: Cc1c(OC(c2ccncc2)c2ccc(C(N)=O)cc2OCC(C)C)ccc2c1OCCC2=O]

H$_2$O$_2$ (0.37 mL, 30% purity, 3.7 mmol) was added dropwise to a 0° C. mixture of 3-isobutoxy-4-(((8-methyl-4-oxochroman-7-yl)oxy)(pyridin-4-yl)methyl)benzonitrile (Intermediate 76, 400 mg, 0.729 mmol), K$_2$CO$_3$ (305 mg, 2.21 mmol), and DMSO (6 mL). The mixture was stirred at room temperature for 1 hour before quenching with saturated Na$_2$SO$_3$ (20 mL) and extracting with ethyl acetate (20 mL×3). The aqueous layer was lyophilized to dryness to give the product, which was purified by FCC (eluent: petroleum ether:ethyl acetate, 1:1 to 0:1, gradient elution) to afford the title compound (250 mg, 75%) as a white solid. MS (ESI): mass calcd. for C$_{27}$H$_{28}$N$_2$O$_5$ 460.20 m/z found 461.0 [M+H]$^+$.

A sample of (R,S)-3-isobutoxy-4-(((8-methyl-4-oxochroman-7-yl)oxy)(pyridin-4-yl)methyl)benzamide (250 mg, 0.543 mmol) was separated by SFC (DAICEL CHIRALPAK AD-H, 35% (v/v) supercritical CO$_2$ in EtOH and H$_2$O with 0.1% NH$_3$) to yield example 85a (first enantiomer to elute, labelled *R) and example 85b (second enantiomer to elute, labelled *S).

Example 85a (*R)-3-isobutoxy-4-(((8-methyl-4-oxochroman-7-yl)oxy)(pyridin-4-yl)methyl)benzamide

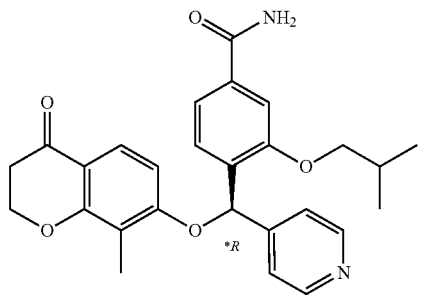 [SMILES: Cc1c(O[C@H](c2ccncc2)c2ccc(C(N)=O)cc2OCC(C)C)ccc2c1OCCC2=O]

MS (ESI): mass calcd. for $C_{27}H_{28}N_2O_5$ 460.20 m/z found 461.2 $[M+H]^+$. $^1H$ NMR (400 MHz, DMSO-$d_6$) δ 8.67-8.42 (m, 2H), 7.98 (br s, 1H), 7.55-7.36 (m, 7H), 6.83 (s, 1H), 6.59 (d, J=9.0 Hz, 1H), 4.52 (t, J=6.1 Hz, 2H), 4.02-3.80 (m, 2H), 2.68 (t, J=6.1 Hz, 2H), 2.19 (s, 3H), 2.15-2.05 (m, 1H), 1.06-0.95 (m, 6H).

Example 85b (*S)-3-isobutoxy-4-(((8-methyl-4-oxochroman-7-yl)oxy)(pyridin-4-yl)methyl)benzamide

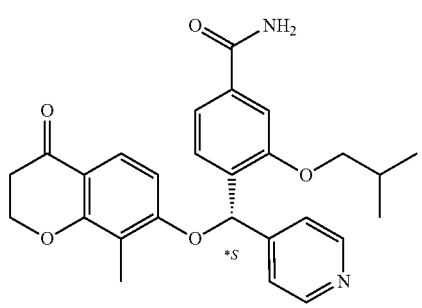 [SMILES: Cc1c(O[C@@H](c2ccncc2)c2ccc(C(N)=O)cc2OCC(C)C)ccc2c1OCCC2=O]

MS (ESI): mass calcd. for $C_{27}H_{28}N_2O_5$ 460.20 m/z found 461.2 $[M+H]^+$. $^1H$ NMR (400 MHz, DMSO-$d_6$) δ 8.61-8.52 (m, 2H), 7.98 (br s, 1H), 7.53-7.40 (m, 7H), 6.83 (s, 1H), 6.59 (d, J=9.0 Hz, 1H), 4.52 (t, J=6.3 Hz, 2H), 3.99-3.84 (m, 2H), 2.68 (t, J=6.4 Hz, 2H), 2.19 (s, 3H), 2.16-2.05 (m, 1H), 1.05-0.98 (m, 6H).

Example 86: (R,S)-3-(Benzyloxy)-4-(((8-methyl-4-oxochroman-7-yl)oxy)(pyridin-4-yl)methyl)benzamide

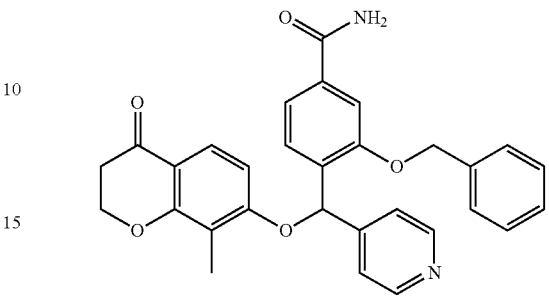

$H_2O_2$ (0.14 mL, 30% purity, 1.4 mmol) was added dropwise to a 0° C. mixture of 3-(benzyloxy)-4-(((8-methyl-4-oxochroman-7-yl)oxy)(pyridin-4-yl)methyl)benzonitrile (Intermediate 77, 150 mg, 0.277 mmol), $K_2CO_3$ (120 mg, 0.868 mmol), and DMSO (1 mL). The mixture was stirred at room temperature for 1 hour before quenching with saturated $Na_2SO_3$ (10 mL) and extracting with ethyl acetate (20 mL×3). The combined organic extracts were dried over anhydrous $Na_2SO_4$, filtered, and concentrated to dryness under reduced pressure afford the product, which was purified by FCC (eluent:petroleum ether:ethyl acetate, 1:0 to 0:1, gradient elution) to afford the title compound (80 mg, 58%) as a white solid. MS (ESI): mass calcd. for $C_{30}H_{26}N_2O_5$ 494.18 m/z found 495.0 $[M+H]^+$.

A sample of (R,S)-3-(benzyloxy)-4-(((8-methyl-4-oxochroman-7-yl)oxy)(pyridin-4-yl)methyl)benzamide was separated by SFC (YMC CHIRAL Amylose-C, 45% (v/v) supercritical $CO_2$ in IPA and $H_2O$ with 0.1% $NH_3$) to yield example 86a (first enantiomer to elute, labelled *R) and example 86b (second enantiomer to elute, labelled *S).

Example 86a (*R)-3-(benzyloxy)-4-(((8-methyl-4-oxochroman-7-yl)oxy)(pyridin-4-yl)methyl)benzamide

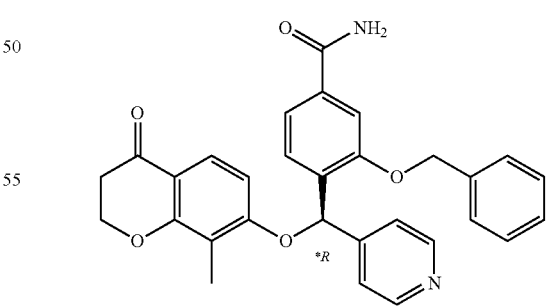

MS (ESI): mass calcd. for $C_{30}H_{26}N_2O_5$ 494.18 m/z found 495.2 $[M+H]^+$. $^1H$ NMR (400 MHz, DMSO-$d_6$) δ 8.57-8.48 (m, 2H), 7.99 (s, 1H), 7.64 (s, 1H), 7.49-7.33 (m, 11H), 6.83 (s, 1H), 6.53 (d, J=9.0 Hz, 1H), 5.28 (s, 2H), 4.51 (t, J=6.2 Hz, 2H), 2.68 (t, J=6.2 Hz, 2H), 2.16 (s, 3H)

Example 86b (*S)-3-(benzyloxy)-4-(((8-methyl-4-oxochroman-7-yl)oxy)(pyridin-4-yl)methyl)benzamide

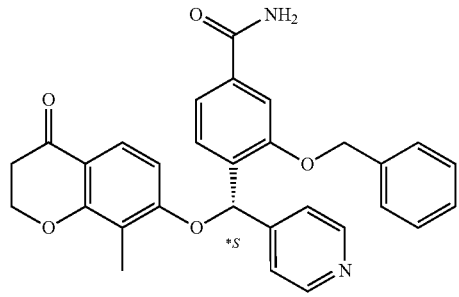 [SMILES: Cc1c(O[C@@H](c2ccncc2)c2ccc(C(N)=O)cc2OCc2ccccc2)ccc2c1OCCC2=O]

MS (ESI): mass calcd. for $C_{30}H_{26}N_2O_5$ 494.18 m/z found 495.2 [M+H]$^+$. $^1$H NMR (400 MHz, DMSO-$d_6$) δ 8.56-8.51 (m, 2H), 7.99 (s, 1H), 7.64 (s, 1H), 7.50-7.32 (m, 11H), 6.83 (s, 1H), 6.53 (d, J=9.0 Hz, 1H), 5.28 (s, 2H), 4.51 (t, J=6.2 Hz, 2H), 2.68 (t, J=6.2 Hz, 2H), 2.16 (s, 3H).

Example 87: (R,S)-Ethyl 3-(4-((4-carbamoylphenyl)((8-methyl-4-oxochroman-7-yl)oxy)methyl)pyridin-2-yl)propanoate

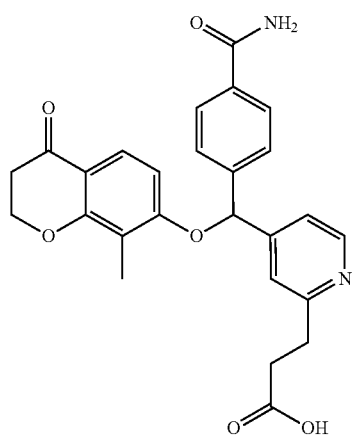 [SMILES: Cc1c(OC(c2ccc(C(N)=O)cc2)c2ccnc(CCC(=O)O)c2)ccc2c1OCCC2=O]

LiOH·H$_2$O (41 mg, 0.98 mmol) was added to a solution of ethyl 3-(4-((4-carbamoylphenyl)((8-methyl-4-oxochroman-7-yl)oxy)methyl)pyridin-2-yl)propanoate (Intermediate 78, 140 mg, 0.287 mmol), EtOH (2 mL), and H$_2$O (0.5 mL). The mixture was stirred at 40° C. for 30 minutes before cooling to room temperature and adjusting the pH of the solution to pH to 5 with 1 N HCl (2 mL). The resulting solution was purified by preparative HPLC using a Xtimate C18, 150×25 mm×5 µm column (eluent: 23% to 53% (v/v) CH$_3$CN and H$_2$O with 0.225% HCOOH) to afford the title compound (80 mg, 61%) as a white solid. MS (ESI): mass calcd. for $C_{26}H_{24}N_2O_6$ 460.16 m/z found 461.1 [M+H]$^+$.

A sample of (R,S)-ethyl 3-(4-((4-carbamoylphenyl)((8-methyl-4-oxochroman-7-yl)oxy)methyl)pyridin-2-yl)propanoate was separated by SFC (DAICEL CHIRALPAK OJ-H, 40% (v/v) supercritical CO$_2$ in MeOH and H$_2$O with 0.1% NH$_3$) to yield example 87a (first enantiomer to elute, labelled *R) and example 87b (second enantiomer to elute, labelled *S).

Example 87a (*R)-Ethyl 3-(4-((4-carbamoylphenyl)((8-methyl-4-oxochroman-7-yl)oxy)methyl)pyridin-2-yl)propanoate

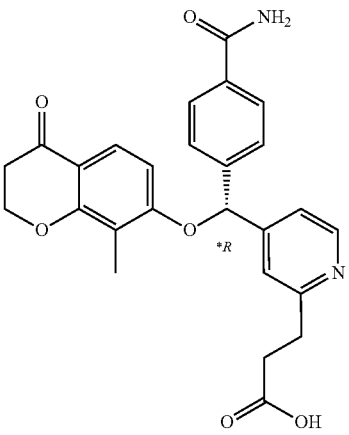 [SMILES: Cc1c(O[C@H](c2ccc(C(N)=O)cc2)c2ccnc(CCC(=O)O)c2)ccc2c1OCCC2=O]

MS (ESI): mass calcd. for $C_{26}H_{24}N_2O_6$ 460.16 m/z found 461.1 [M+H]$^+$. $^1$H NMR (400 MHz, DMSO-$d_6$) δ 8.44 (d, J=5.1 Hz, 1H), 7.93 (s, 1H), 7.83 (d, J=8.3 Hz, 2H), 7.62 (d, J=8.3 Hz, 2H), 7.51 (d, J=8.8 Hz, 1H), 7.46 (s, 1H), 7.40-7.32 (m, 2H), 6.78 (s, 1H), 6.70 (d, J=9.0 Hz, 1H), 4.53 (t, J=6.4 Hz, 2H), 2.95 (t, J=7.2 Hz, 2H), 2.69 (t, J=6.4 Hz, 2H), 2.62 (t, J=7.4 Hz, 2H), 2.23 (s, 3H).

Example 87b (*S)-Ethyl 3-(4-((4-carbamoylphenyl)((8-methyl-4-oxochroman-7-yl)oxy)methyl)pyridin-2-yl)propanoate

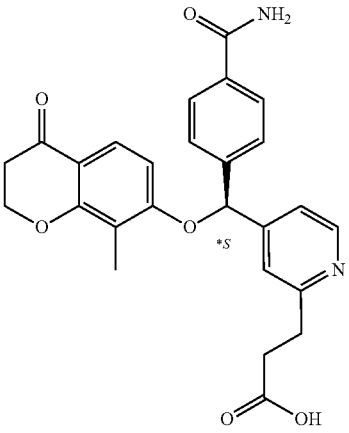 [SMILES: Cc1c(O[C@@H](c2ccc(C(N)=O)cc2)c2ccnc(CCC(=O)O)c2)ccc2c1OCCC2=O]

LC-MS (ESI): RT=3.09 min, mass calcd. for $C_{26}H_{24}N_2O_6$ 460.16 m/z found 461.1 [M+H]$^+$. $^1$H NMR (400 MHz, DMSO-$d_6$) δ 8.44 (d, J=4.9 Hz, 1H), 7.94 (s, 1H), 7.83 (d, J=8.3 Hz, 2H), 7.62 (d, J=8.3 Hz, 2H), 7.51 (d, J=8.8 Hz, 1H), 7.46 (s, 1H), 7.39-7.32 (m, 2H), 6.78 (s, 1H), 6.70 (d, J=8.8 Hz, 1H), 4.53 (t, J=6.4 Hz, 2H), 2.95 (t, J=7.4 Hz, 2H), 2.68 (t, J=6.6 Hz, 2H), 2.61 (t, J=7.2 Hz, 2H), 2.23 (s, 3H).

Example 88: (R,S)-4-(((6,8-Dimethyl-4-oxochroman-7-yl)oxy)(pyridin-4-yl)methyl)benzonitrile

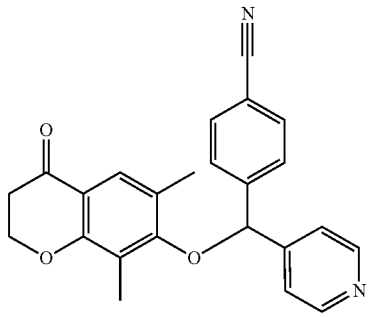 [SMILES: Cc1cc2c(c(C)c1OC(c1ccncc1)c1ccc(C#N)cc1)OCCC2=O]

DIAD (1.26 g, 6.23 mmol) was added to a solution of 4-(hydroxy(pyridin-4-yl)methyl)benzonitrile (Intermediate 8, 875 mg, 4.16 mmol), 7-hydroxy-6,8-dimethylchroman-4-one (Intermediate 79, 800 mg, 4.16 mmol), PPh$_3$ (1.64 g, 6.24 mmol), and anhydrous dichloromethane (8 mL). The mixture was stirred at room temperature for 2 hours before concentrating to dryness under reduced pressure to give the product, which was purified by FCC (eluent:petroleum ether:ethyl acetate, 1:0 to 0:1, gradient elution) followed by preparative HPLC using a Phenomenex Gemini 150×25 mm×10 μm column (eluent: 44% to 74% (v/v) CH$_3$CN and H$_2$O with 0.05% NH$_3$) to afford the title compound (200 mg). MS (ESI): mass calcd. for C$_{24}$H$_{20}$N$_2$O$_3$ 384.15 m/z found 385.2 [M+H]$^+$.

A sample of (R,S)-4-(((6,8-dimethyl-4-oxochroman-7-yl)oxy)(pyridin-4-yl)methyl)benzonitrile was separated by SFC (DAICEL CHIRALCEL OJ, 35% (v/v) supercritical CO$_2$ in EtOH and H$_2$O with 0.1% NH$_3$) to yield example 88a (first enantiomer to elute, labelled *R) and example 88b (second enantiomer to elute, labelled *S).

Example 88a (*R)-4-(((6,8-dimethyl-4-oxochroman-7-yl)oxy)(pyridin-4-yl)methyl)benzonitrile

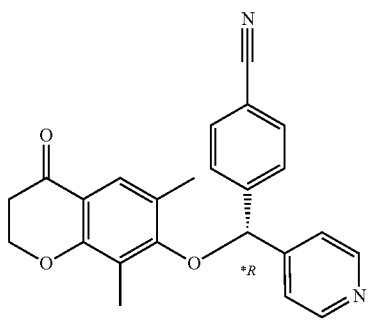 [SMILES: Cc1cc2c(c(C)c1O[C@@H](c1ccncc1)c1ccc(C#N)cc1)OCCC2=O]

MS (ESI): mass calcd. for C$_{24}$H$_{20}$N$_2$O$_3$ 384.15 m/z found 385.2 [M+H]$^+$. $^1$H NMR (400 MHz, DMSO-d$_6$) δ 8.61-8.56 (m, 2H), 7.87 (d, J=8.3 Hz, 2H), 7.65 (d, J=8.3 Hz, 2H), 7.48 (d, J=5.9 Hz, 2H), 7.42 (s, 1H), 6.19 (s, 1H), 4.50 (t, J=6.5 Hz, 2H), 2.71 (t, J=6.4 Hz, 2H), 1.85 (s, 3H), 1.76 (s, 3H).

Example 88b (*S)-4-(((6,8-dimethyl-4-oxochroman-7-yl)oxy)(pyridin-4-yl)methyl)benzonitrile

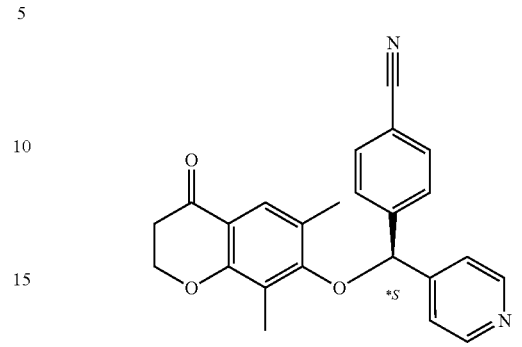

MS (ESI): mass calcd. for C$_{24}$H$_{20}$N$_2$O$_3$ 384.15 m/z found 385.2 [M+H]$^+$. $^1$H NMR (400 MHz, DMSO-d$_6$) δ 8.63-8.56 (m, 2H), 7.87 (d, J=8.1 Hz, 2H), 7.65 (d, J=8.1 Hz, 2H), 7.48 (d, J=5.4 Hz, 2H), 7.42 (s, 1H), 6.19 (s, 1H), 4.50 (t, J=6.2 Hz, 2H), 2.71 (t, J=6.2 Hz, 2H), 1.85 (s, 3H), 1.76 (s, 3H).

Example 89: (R,S)-4-(((6,8-Dimethyl-4-oxochroman-7-yl)oxy)(pyridin-4-yl)methyl)benzamide

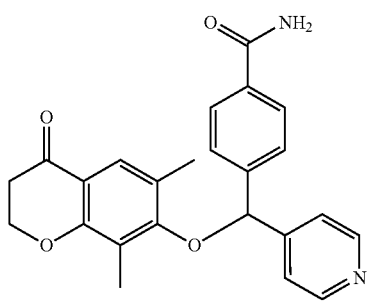 [SMILES: Cc1cc2c(c(C)c1OC(c1ccncc1)c1ccc(C(N)=O)cc1)OCCC2=O]

H$_2$O$_2$ (2.2 mL, 30% purity, 22 mmol) was added dropwise to a solution of 4-(((6,8-dimethyl-4-oxochroman-7-yl)oxy)(pyridin-4-yl)methyl)benzonitrile (Example 88, 1.5 g, 1.5 mmol, 38% purity), K$_2$CO$_3$ (2.0 g, 14 mmol), and DMSO (10 mL) in a 50 mL round-bottomed flask. The mixture was stirred at room temperature for 0.5 hours before pouring it into saturated Na$_2$SO$_3$ (10 mL) and extracting with ethyl acetate (20 mL×3). The combined organic extracts were washed with brine (20 mL), dried over anhydrous Na$_2$SO$_4$, filtered, and concentrated to dryness under reduced pressure to give the product, which was further purified by FCC (eluent: petroleum ether:ethyl acetate, 1:0 to 0:1, gradient elution) to afford the title compound (180 mg, 28%) as a brown oil. MS (ESI): mass calcd. for C$_{24}$H$_{22}$N$_2$O$_4$ 402.16 m/z found 403.1 [M+H]$^+$.

A sample of (R,S)-4-(((6,8-dimethyl-4-oxochroman-7-yl)oxy)(pyridin-4-yl)methyl)benzamide (180 mg, 0.420 mmol) was separated by SFC (YMC CHIRAL Amylose-C, 50% (v/v) supercritical CO$_2$ in MeOH and H$_2$O with 0.1% NH$_3$) to yield example 89a (first enantiomer to elute, labelled *R) and example 89b (second enantiomer to elute, labelled *S).

Example 89a (*R)-4-(((6,8-dimethyl-4-oxochroman-7-yl)oxy)(pyridin-4-yl)methyl)benzamide

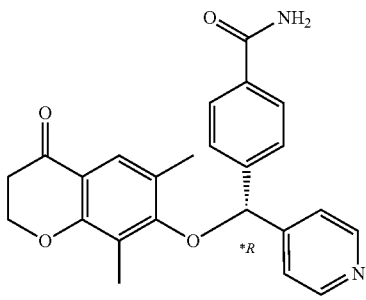 [SMILES: Cc1cc2c(c(C)c1O[C@@H](c1ccncc1)c1ccc(C(N)=O)cc1)OCCC2=O]

MS (ESI): mass calcd. for $C_{24}H_{22}N_2O_4$ 402.16 m/z found 403.0 [M+H]$^+$. $^1$H NMR (400 MHz, DMSO-d$_6$) δ 8.59 (d, J=6.0 Hz, 2H), 7.98 (s, 1H), 7.85 (d, J=8.3 Hz, 2H), 7.51-7.44 (m, 4H), 7.43-7.38 (m, 2H), 6.12 (s, 1H), 4.50 (t, J=6.4 Hz, 2H), 2.71 (t, J=6.3 Hz, 2H), 1.86 (s, 3H), 1.78 (s, 3H).

Example 89b (*S)-4-(((6,8-dimethyl-4-oxochroman-7-yl)oxy)(pyridin-4-yl)methyl)benzamide

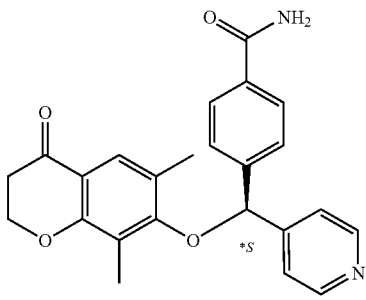 [SMILES: Cc1cc2c(c(C)c1O[C@H](c1ccncc1)c1ccc(C(N)=O)cc1)OCCC2=O]

MS (ESI): mass calcd. for $C_{24}H_{22}N_2O_4$ 402.16 m/z found 403.2 [M+H]$^+$. $^1$H NMR (400 MHz, DMSO-d$_6$) δ 8.58 (d, J=6.0 Hz, 2H), 7.97 (s, 1H), 7.84 (d, J=8.0 Hz, 2H), 7.51-7.45 (m, 4H), 7.42-7.38 (m, 2H), 6.12 (s, 1H), 4.50 (t, J=6.4 Hz, 2H), 2.71 (t, J=6.4 Hz, 2H), 1.86 (s, 3H), 1.77 (s, 3H).

Example 90: (R,S)-4-(((6,8-Dimethyl-4-oxochroman-7-yl)oxy)(4-fluorophenyl)methyl)benzamide

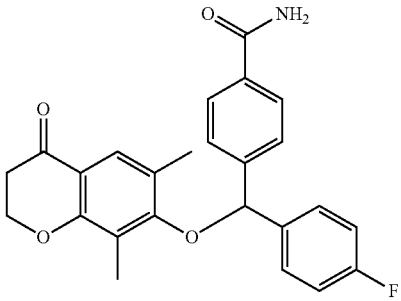 [SMILES: Cc1cc2c(c(C)c1OC(c1ccc(F)cc1)c1ccc(C(N)=O)cc1)OCCC2=O]

H$_2$O$_2$ (0.6 mL, 30% purity, 6 mmol) was added dropwise to a solution of 4-(((6,8-dimethyl-4-oxochroman-7-yl)oxy)(4-fluorophenyl)methyl)benzonitrile (Intermediate 80, 800 mg), K$_2$CO$_3$ (689 mg, 4.99 mmol), and DMSO (8 mL). The mixture was stirred at room temperature for 1 hour before pouring it into saturated Na$_2$SO$_3$ (80 mL) and extracting with ethyl acetate (50 mL×3). The combined organic extracts were dried over anhydrous Na$_2$SO$_4$, filtered, and concentrated to dryness under reduced pressure to afford the product, which was purified by preparative HPLC using a Waters Xbridge Prep OBD C18 150×25 mm×10 μm column (eluent: 5% to 35% (v/v) CH$_3$CN and H$_2$O with 0.05% NH$_3$) to afford the title compound (370 mg). MS (ESI): mass calcd. for $C_{25}H_{22}FNO_4$ 419.15 m/z found 420.1 [M+H]$^+$.

A sample of (R,S)-4-(((6,8-dimethyl-4-oxochroman-7-yl)oxy)(4-fluorophenyl)methyl)benzamide (370 mg, 0.882 mmol) was separated by SFC (YMC CHIRAL Amylose-C, 40% (v/v) supercritical CO$_2$ in EtOH and H$_2$O with 0.1% NH$_3$) to yield example 90a (first enantiomer to elute, labelled *R) and example 90b (second enantiomer to elute, labelled *S).

Example 90a (*R)-4-(((6,8-dimethyl-4-oxochroman-7-yl)oxy)(4-fluorophenyl)methyl)benzamide MS (ESI): mass calcd. for $C_{25}H_{22}FNO_4$ 419.15 m/z found 420.1 [M+H]$^+$. $^1$H NMR (400 MHz, DMSO-d$_6$) δ 7.97 (br. s., 1H), 7.86 (d, J=8.1 Hz, 2H), 7.51 (d, J=8.3 Hz, 2H), 7.46-7.36 (m, 4H), 7.22-7.15 (m, 2H), 6.09 (s, 1H), 4.49 (t, J=6.4 Hz, 2H), 2.70 (t, J=6.4 Hz, 2H), 1.84 (s, 3H), 1.77 (s, 3H).

Example 90b (*S)-4-(((6,8-dimethyl-4-oxochroman-7-yl)oxy)(4-fluorophenyl)methyl)benzamide MS (ESI): mass calcd. for $C_{25}H_{22}FNO_4$ 419.15 m/z found 420.2 [M+H]$^+$. $^1$H NMR (400 MHz, DMSO-d$_6$) δ 7.98 (br s, 1H), 7.86 (d, J=8.3 Hz, 2H), 7.51 (d, J=8.3 Hz, 2H), 7.46-7.35 (m, 4H), 7.24-7.14 (m, 2H), 6.09 (s, 1H), 4.49 (t, J=6.4 Hz, 2H), 2.70 (t, J=6.4 Hz, 2H), 1.84 (s, 3H), 1.77 (s, 3H).

Example 91: (R,S)-4-((3,4-Difluorophenyl)((6-fluoro-8-methyl-4-oxochroman-7-yl)oxy)methyl)benzamide

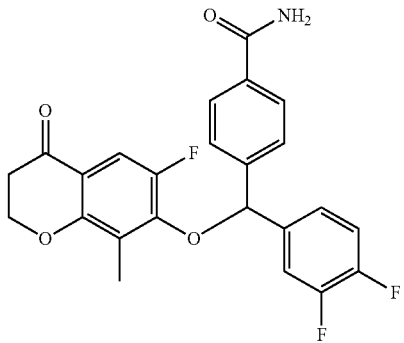 [SMILES: Cc1c(OC(c2ccc(C(N)=O)cc2)c2ccc(F)c(F)c2)c(F)cc2c1OCCC2=O]

H$_2$O$_2$ (0.28 mL, 30% purity, 2.8 mmol) was added dropwise to a solution of 4-((3,4-difluorophenyl)((6-fluoro-8-methyl-4-oxochroman-7-yl)oxy)methyl)benzonitrile (Intermediate 82, 300 mg, 0.709 mmol), K$_2$CO$_3$ (294 mg, 2.13 mmol), and DMSO (3 mL). The mixture was stirred at room temperature for 2 hours before quenching with saturated Na$_2$SO$_3$ (30 mL) and extracting with ethyl acetate (30 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 20:1 to 0:1, gradient elution) and further purified by preparative HPLC using a Phenomenex Gemini 150 mm×25 mm×10 μm column (eluent: 40% to 70% (v/v) CH$_3$CN and H$_2$O with 0.05% NH$_3$) to afford the title compound (180 mg, 57%) as a white solid. MS (ESI): mass calcd. for C$_{24}$H$_{18}$F$_3$NO$_4$ 441.12 m/z found 442.1 [M+H]$^+$.

A sample of (R,S)-4-((3,4-difluorophenyl)((6-fluoro-8-methyl-4-oxochroman-7-yl)oxy)methyl)benzamide was separated by SFC (YMC CHIRAL Amylose-C, 45% (v/v) supercritical CO$_2$ in EtOH and H$_2$O with 0.1% NH$_3$) to yield example 91a (first enantiomer to elute, labelled *R).

Example 91a (*R)-4-((3,4-difluorophenyl)((6-fluoro-8-methyl-4-oxochroman-7-yl)oxy)methyl)benzamide

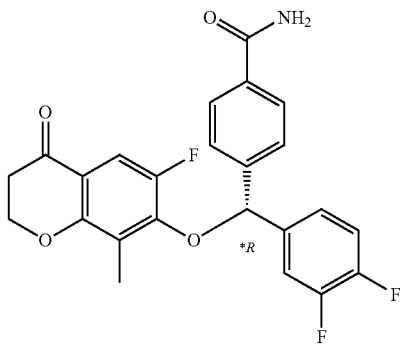 [SMILES: Cc1c(O[C@H](c2ccc(C(N)=O)cc2)c2ccc(F)c(F)c2)c(F)cc2c1OCCC2=O]

MS (ESI): mass calcd. for C$_{24}$H$_{18}$F$_3$NO$_4$ 441.12 m/z found 442.2 [M+H]$^+$. $^1$H NMR (400 MHz, DMSO-d$_6$) δ 7.93 (br s, 1H), 7.81 (d, J=8.1 Hz, 2H), 7.60-7.50 (m, 3H), 7.45-7.26 (m, 4H), 6.51 (s, 1H), 4.49 (t, J=6.5 Hz, 2H), 2.70 (t, J=6.4 Hz, 2H), 1.99 (s, 3H).

Example 91b: (*S)-4-((3,4-difluorophenyl)((6-fluoro-8-methyl-4-oxochroman-7-yl)oxy)methyl)benzamide

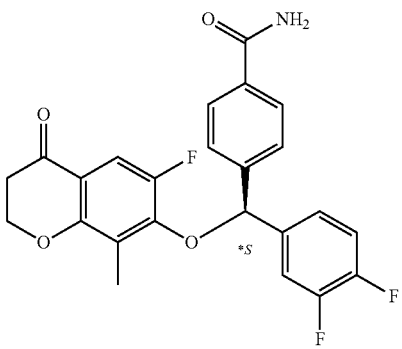 [SMILES: Cc1c(O[C@@H](c2ccc(C(N)=O)cc2)c2ccc(F)c(F)c2)c(F)cc2c1OCCC2=O]

MS (ESI): RT=3.70 min, mass calcd. for C$_{24}$H$_{18}$F$_3$NO$_4$ 441.12 m/z found 442.2 [M+H]$^+$. $^1$H NMR (400 MHz, DMSO-d$_6$) δ 7.95 (br. s., 1H), 7.84 (d, J=8.3 Hz, 2H), 7.63-7.53 (m, 3H), 7.48-7.30 (m, 4H), 6.54 (s, 1H), 4.52 (t, J=6.5 Hz, 2H), 2.73 (t, J=6.4 Hz, 2H), 2.02 (s, 3H).

Example 92: (R,S)-4-((3-Cyanophenyl)((6-fluoro-8-methyl-4-oxochroman-7-yl)oxy)methyl)benzamide

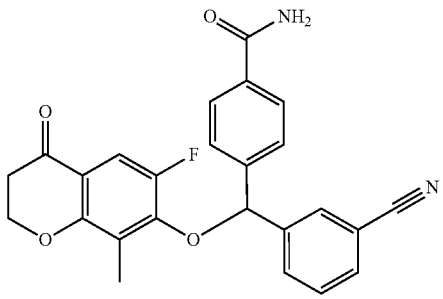 [SMILES: Cc1c(OC(c2ccc(C(N)=O)cc2)c2cccc(C#N)c2)c(F)cc2c1OCCC2=O]

4-((3-Bromophenyl)((6-fluoro-8-methyl-4-oxochroman-7-yl)oxy)methyl)benzamide (Intermediate 83, 550 mg, 1.14 mmol), Zn(CN)$_2$ (300 mg, 2.55 mol), XPhos (217 mg, 0.455 mmol), Zn (45 mg, 0.69 mmol), and DMF (3 mL) were added to a 20 mL sealed tube. The mixture was sparged with Ar for 5 minutes and then treated with Pd$_2$(dba)$_3$ (208 mg, 0.227 mmol). The mixture was sparged with Ar for another 5 minutes and then stirred while heating at 100° C. for 1 hour before cooling to room temperature. The suspension was filtered and the filter cake washed with ethyl acetate (20 mL). The filtrate was diluted with water (30 mL) and extracted with ethyl acetate (20 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 10:1 to 0:1, gradient elution) and was further purified by preparative HPLC using a Phenomenex Gemini 150 mm×25 mm×10 µm column (eluent: 40% to 70% (v/v) CH₃CN and H₂O with 0.05% NH₃) to afford the title compound (260 mg, 53%) as a white solid. MS (ESI): mass calcd. for $C_{25}H_{19}FN_2O_4$ 430.13 m/z found 431.1 [M+H]⁺.

A sample of (R,S)-4-((3-cyanophenyl)((6-fluoro-8-methyl-4-oxochroman-7-yl)oxy)methyl)benzamide was separated by SFC (YMC CHIRAL Amylose-C, 55% (v/v) supercritical CO₂ in MeOH and H₂O with 0.1% NH₃) to yield example 92a (first enantiomer to elute, labelled *R) and example 92b (second enantiomer to elute, labelled *S).

Example 92a (*R)-4-((3-cyanophenyl)((6-fluoro-8-methyl-4-oxochroman-7-yl)oxy)methyl)benzamide

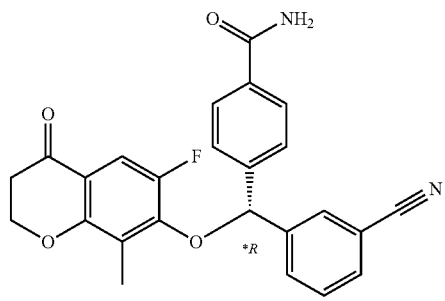 [SMILES: Cc1c(O[C@H](c2ccc(C(N)=O)cc2)c2cccc(C#N)c2)c(F)cc2c1OCCC2=O]

MS (ESI): mass calcd. for $C_{25}H_{19}FN_2O_4$ 430.13 m/z found 431.2 [M+H]⁺. ¹H NMR (400 MHz, DMSO-d₆) δ 8.02-7.99 (m, 1H), 7.96 (br s, 1H), 7.88-7.82 (m, 3H), 7.80 (d, J=7.8 Hz, 1H), 7.63-7.55 (m, 3H), 7.38 (br s, 1H), 7.33 (d, J=11.8 Hz, 1H), 6.61 (s, 1H), 4.53 (t, J=6.4 Hz, 2H), 2.74 (t, J=6.4 Hz, 2H), 2.03 (s, 3H).

Example 92b: (*S)-4-((3-cyanophenyl)((6-fluoro-8-methyl-4-oxochroman-7-yl)oxy)methyl)benzamide

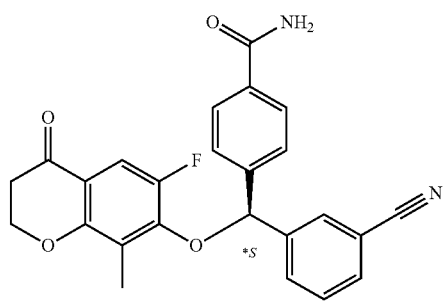 [SMILES: Cc1c(O[C@@H](c2ccc(C(N)=O)cc2)c2cccc(C#N)c2)c(F)cc2c1OCCC2=O]

MS (ESI): mass calcd. for $C_{25}H_{19}FN_2O_4$ 430.13 m/z found 431.2 [M+H]⁺. ¹H NMR (400 MHz, DMSO-d₆) δ 8.03-7.99 (m, 1H), 7.96 (br. s., 1H), 7.88-7.83 (m, 3H), 7.81 (d, J=7.8 Hz, 1H), 7.64-7.56 (m, 3H), 7.39 (br. s., 1H), 7.34 (d, J=11.5 Hz, 1H), 6.61 (s, 1H), 4.53 (t, J=6.4 Hz, 2H), 2.74 (t, J=6.4 Hz, 2H), 2.04 (s, 3H).

Example 93: (R,S)-4-(((6-Fluoro-8-methyl-4-oxochroman-7-yl)oxy)(4-(methylsulfonyl)phenyl)methyl)benzamide

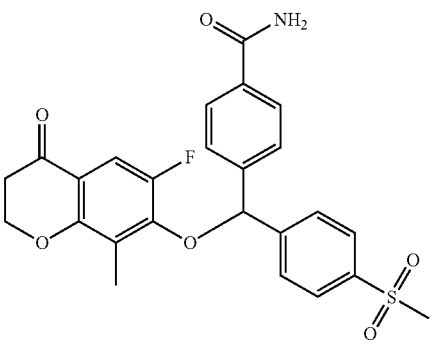 [SMILES: Cc1c(OC(c2ccc(C(N)=O)cc2)c2ccc(S(C)(=O)=O)cc2)c(F)cc2c1OCCC2=O]

H₂O₂ (0.43 mL, 30% purity, 4.3 mmol) was added dropwise to a solution of 4-(((6-fluoro-8-methyl-4-oxochroman-7-yl)oxy)(4-(methylsulfonyl)phenyl)methyl)benzonitrile (Intermediate 84, 500 mg), K₂CO₃ (445 mg, 3.22 mmol), and DMSO (5 mL). The mixture was stirred at room temperature for 1 hour before pouring it into saturated Na₂SO₃ (50 mL) and extracting with ethyl acetate (50 mL×3). The combined organic extracts were dried over anhydrous Na₂SO₄, filtered, and concentrated to dryness under reduced pressure to give the product, which was purified by preparative HPLC using a Phenomenex Gemini 150 mm×25 mm×10 µm column (eluent: 36% to 66% (v/v) CH₃CN and H₂O with 0.05% NH₃) to afford the title compound (200 mg). MS (ESI): mass calcd. for $C_{25}H_{22}FNO_6S$ 483.12 m/z found 484.0 [M+H]⁺.

A sample of (R,S)-4-(((6-fluoro-8-methyl-4-oxochroman-7-yl)oxy)(4-(methylsulfonyl)phenyl)methyl)benzamide was separated by SFC (YMC CHIRAL Amylose-C, 50% (v/v) supercritical CO₂ in EtOH and H₂O with 0.1% NH₃) to yield example 93a (first enantiomer to elute, labelled *R) and example 93b (second enantiomer to elute, labelled *S).

Example 93a: (*R)-4-(((6-fluoro-8-methyl-4-oxochroman-7-yl)oxy)(4-(methylsulfonyl)phenyl)methyl)benzamide

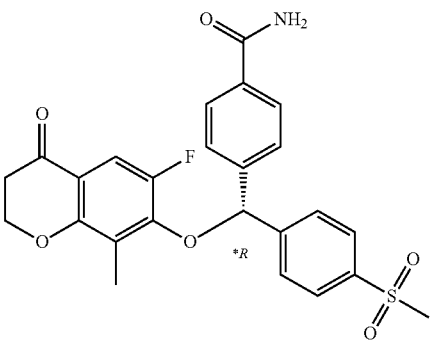 [SMILES: Cc1c(O[C@H](c2ccc(C(N)=O)cc2)c2ccc(S(C)(=O)=O)cc2)c(F)cc2c1OCCC2=O]

MS (ESI): mass calcd. for $C_{25}H_{22}FNO_6S$ 483.12 m/z found 484.2 [M+H]⁺. ¹H NMR (400 MHz, DMSO-d₆) δ 7.98-7.91 (m, 3H), 7.84 (d, J=8.3 Hz, 2H), 7.80 (d, J=8.5 Hz, 2H), 7.57 (d, J=8.3 Hz, 2H), 7.39 (s, 1H), 7.33 (d, J=11.5 Hz, 1H), 6.67 (s, 1H), 4.53 (t, J=6.4 Hz, 2H), 3.21 (s, 3H), 2.73 (t, J=6.4 Hz, 2H), 2.04 (s, 3H).

Example 93b: (*S)-4-(((6-fluoro-8-methyl-4-oxochroman-7-yl)oxy)(4-(methylsulfonyl)phenyl)methyl)benzamide

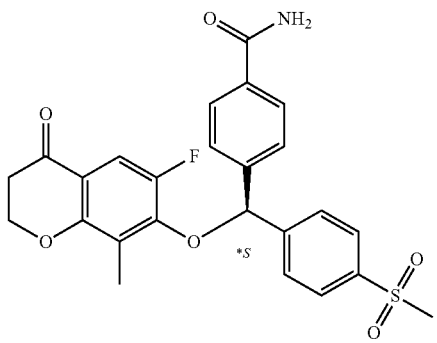 [SMILES: Cc1c(O[C@@H](c2ccc(C(N)=O)cc2)c2ccc(S(C)(=O)=O)cc2)c(F)cc2c1OCCC2=O]

MS (ESI): mass calcd. for $C_{25}H_{22}FNO_6S$ 483.12 m/z found 484.1 [M+H]$^+$. $^1$H NMR (400 MHz, DMSO-$d_6$) δ 7.98-7.92 (m, 3H), 7.84 (d, J=8.3 Hz, 2H), 7.80 (d, J=8.3 Hz, 2H), 7.57 (d, J=8.3 Hz, 2H), 7.40 (s, 1H), 7.34 (d, J=11.5 Hz, 1H), 6.67 (s, 1H), 4.53 (t, J=6.4 Hz, 2H), 3.21 (s, 3H), 2.74 (t, J=6.4 Hz, 2H), 2.04 (s, 3H).

Example 94: (R,S)-4-((2,6-Dimethylpyridin-4-yl)((6-fluoro-8-methyl-4-oxochroman-7-yl)oxy)methyl)benzamide

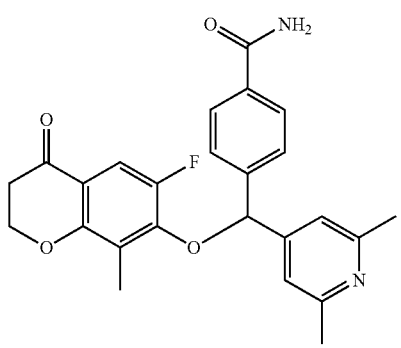 [SMILES: Cc1cc(C(Oc2c(F)cc3c(c2C)OCCC3=O)c2ccc(C(N)=O)cc2)cc(C)n1]

H$_2$O$_2$ (0.6 mL, 30% purity, 6 mmol) was added dropwise to a solution of 4-((2,6-dimethylpyridin-4-yl)((6-fluoro-8-methyl-4-oxochroman-7-yl)oxy)methyl)benzonitrile (Intermediate 85, 600 mg), K$_2$CO$_3$ (597 mg, 4.32 mmol), and DMSO (5 mL). The mixture was stirred at room temperature for 1 hour before pouring it into saturated Na$_2$SO$_3$ (50 mL) and extracting with ethyl acetate (50 mL×3). The combined organic extracts were dried over anhydrous Na$_2$SO$_4$, filtered, and concentrated to dryness under reduced pressure to give the product, which was purified by preparative HPLC using a Phenomenex Gemini 150 mm×25 mm×10 μm column (eluent: 35% to 65% (v/v) CH$_3$CN and H$_2$O with 0.05% NH$_3$) to afford the title compound (170 mg). MS (ESI): mass calcd. for $C_{25}H_{23}FN_2O_4$ 434.16 m/z found 435.2 [M+H]$^+$.

A sample of (R,S)-4-((2,6-dimethylpyridin-4-yl)((6-fluoro-8-methyl-4-oxochroman-7-yl)oxy)methyl)benzamide (170 mg, 0.391 mmol) was separated by SFC (YMC CHIRAL Amylose-C, 45% (v/v) supercritical CO$_2$ in MeOH and H$_2$O with 0.1% NH$_3$) to yield example 94a (first enantiomer to elute, labelled *R) and example 94b (second enantiomer to elute, labelled *S).

Example 94a: (*R)-4-((2,6-dimethylpyridin-4-yl)((6-fluoro-8-methyl-4-oxochroman-7-yl)oxy)methyl)benzamide

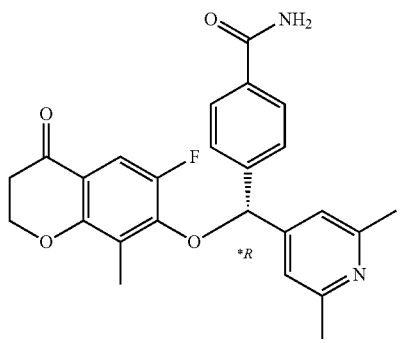 [SMILES: Cc1cc([C@H](Oc2c(F)cc3c(c2C)OCCC3=O)c2ccc(C(N)=O)cc2)cc(C)n1]

MS (ESI): mass calcd. for $C_{25}H_{23}FN_2O_4$ 434.16 m/z found 435.1 [M+H]$^+$. $^1$H NMR (400 MHz, DMSO-$d_6$) δ 7.95 (s, 1H), 7.81 (d, J=8.3 Hz, 2H), 7.51 (d, J=8.3 Hz, 2H), 7.39 (s, 1H), 7.32 (d, J=11.5 Hz, 1H), 7.16 (s, 2H), 6.43 (s, 1H), 4.52 (t, J=6.4 Hz, 2H), 2.73 (t, J=6.4 Hz, 2H), 2.40 (s, 6H), 2.02 (s, 3H).

Example 94b: (*S)-4-((2,6-dimethylpyridin-4-yl)((6-fluoro-8-methyl-4-oxochroman-7-yl)oxy)methyl)benzamide

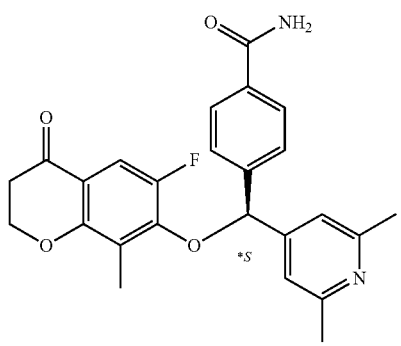

MS (ESI): mass calcd. for $C_{25}H_{23}FN_2O_4$ 434.16 m/z found 435.1 [M+H]$^+$. $^1$H NMR (400 MHz, DMSO-$d_6$) δ 7.96 (s, 1H), 7.82 (d, J=8.3 Hz, 2H), 7.52 (d, J=8.3 Hz, 2H), 7.39 (s, 1H), 7.33 (d, J=11.8 Hz, 1H), 7.17 (s, 2H), 6.44 (s, 1H), 4.53 (t, J=6.4 Hz, 2H), 2.73 (t, J=6.4 Hz, 2H), 2.41 (s, 6H), 2.03 (s, 3H).

Example 95: (R,S)-2-Fluoro-4-(((6-fluoro-8-methyl-4-oxochroman-7-yl)oxy)(pyridin-4-yl)methyl)benzamide

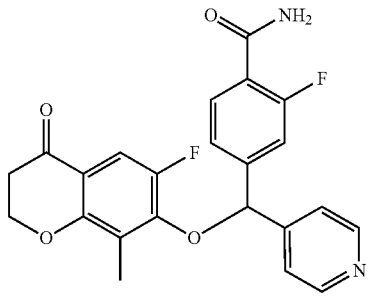 [SMILES: Cc1c(OC(c2ccncc2)c2ccc(C(N)=O)c(F)c2)c(F)cc2c1OCCC2=O]

H$_2$O$_2$ (0.5 mL, 30% purity, 5 mmol) was added dropwise to a 0° C. mixture of 2-fluoro-4-(((6-fluoro-8-methyl-4-oxochroman-7-yl)oxy)(pyridin-4-yl)methyl)benzonitrile (Intermediate 86, 800 mg, 0.963 mmol), K$_2$CO$_3$ (400 mg, 2.89 mmol), and DMSO (6 mL). The mixture was stirred at room temperature for 1.5 hours before pouring into saturated Na$_2$SO$_3$ (20 mL) and extracting with ethyl acetate (40 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 20:1 to 0:1, gradient elution) to afford the title compound (300 mg, 63%) as a white solid. MS (ESI): mass calcd. for C$_{23}$H$_{18}$F$_2$N$_2$O$_4$ 424.12 m/z found 424.9 [M+H]$^+$.

A sample of (R,S)-2-fluoro-4-(((6-fluoro-8-methyl-4-oxochroman-7-yl)oxy)(pyridin-4-yl)methyl)benzamide was separated by SFC (Phenomenex-Amylose-1, 250 mm×30 mm×5 m, 40% (v/v) supercritical CO$_2$ in EtOH and H$_2$O with 0.1% NH$_3$) to yield example 95a (first enantiomer to elute, labelled *R) and example 95b (second enantiomer to elute, labelled *S).

Example 95a (*R)-2-fluoro-4-(((6-fluoro-8-methyl-4-oxochroman-7-yl)oxy)(pyridin-4-yl)methyl)benzamide

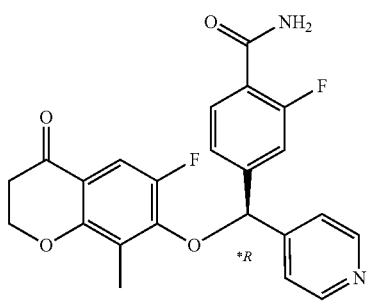 [SMILES: Cc1c(O[C@H](c2ccncc2)c2ccc(C(N)=O)c(F)c2)c(F)cc2c1OCCC2=O]

MS (ESI): mass calcd. for C$_{23}$H$_{18}$F$_2$N$_2$O$_4$ 424.12 m/z found 425.1 [M+H]$^+$. $^1$H NMR (400 MHz, DMSO-d$_6$) δ 8.58 (d, J=5.4 Hz, 2H), 7.74 (br s, 1H), 7.68-7.59 (m, 2H), 7.54 (d, J=5.9 Hz, 2H), 7.45 (d, J=11.0 Hz, 1H), 7.39 (d, J=7.6 Hz, 1H), 7.34 (d, J=11.7 Hz, 1H), 6.58 (s, 1H), 4.53 (t, J=6.4 Hz, 2H), 2.74 (t, J=6.4 Hz, 2H), 2.06 (s, 3H).

Example 95b (*S)-2-fluoro-4-(((6-fluoro-8-methyl-4-oxochroman-7-yl)oxy)(pyridin-4-yl)methyl)benzamide

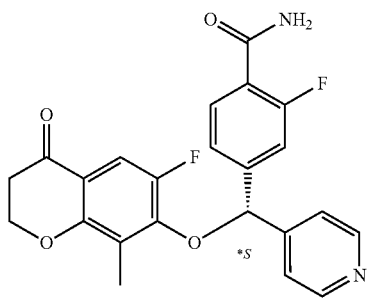 [SMILES: Cc1c(O[C@@H](c2ccncc2)c2ccc(C(N)=O)c(F)c2)c(F)cc2c1OCCC2=O]

MS (ESI): mass calcd. for C$_{23}$H$_{18}$F$_2$N$_2$O$_4$ 424.12 m/z found 425.2 [M+H]$^+$. $^1$H NMR (400 MHz, DMSO-d$_6$) δ 8.58 (d, J=5.6 Hz, 2H), 7.73 (br s, 1H), 7.67-7.59 (m, 2H), 7.53 (d, J=5.9 Hz, 2H), 7.44 (d, J=11.2 Hz, 1H), 7.39 (d, J=7.8 Hz, 1H), 7.31 (d, J=11.7 Hz, 1H), 6.54 (s, 1H), 4.50 (t, J=6.5 Hz, 2H), 2.71 (t, J=6.4 Hz, 2H), 2.03 (s, 3H).

Example 96: (R,S)-6-Fluoro-7-((3-fluorophenyl)(pyridin-4-yl)methoxy)-8-methylchroman-4-one

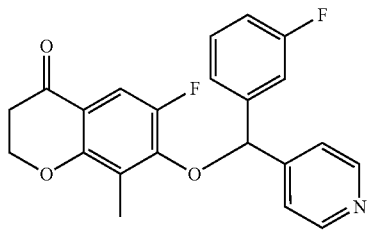 [SMILES: Cc1c(OC(c2ccncc2)c2cccc(F)c2)c(F)cc2c1OCCC2=O]

DIAD (456 mg, 2.56 mmol) was added to a 100 mL three-necked round-bottomed flask containing a solution of (3-fluorophenyl)(pyridin-4-yl)methanol (Intermediate 2, 300 mg, 1.48 mmol), 6-fluoro-7-hydroxy-8-methylchroman-4-one (Intermediate 81, 319 mg, 1.63 mmol), PPh$_3$ (626 mg, 2.39 mmol), and THF (6 mL) under N$_2$ atmosphere. The mixture was stirred at room temperature for 16 hours before concentrating to dryness under reduced pressure to give the product, which was purified by preparative HPLC using a DB Phenomenex Gemini 150 mm×25 mm×10 µm column (eluent: 50% to 80% (v/v) CH$_3$CN and H$_2$O with 0.05% NH$_3$) to afford the title compound (230 mg, 41%) as a white solid. MS (ESI): mass calcd. for C$_{22}$H$_{17}$F$_2$NO$_3$ 381.12 m/z found 381.9 [M+H]$^+$.

A sample of (R,S)-6-fluoro-7-((3-fluorophenyl)(pyridin-4-yl)methoxy)-8-methylchroman-4-one (230 mg, 0.603 mmol) was separated by SFC (DAICEL CHIRALCEL OJ-H, 250 mm×30 mm×5 µm, 30% (v/v) supercritical CO$_2$ in MeOH and H$_2$O with 0.1% NH$_3$) to yield example 96a (first enantiomer to elute, labelled *R) and example 96b (second enantiomer to elute, labelled *S).

Example 96a (*R)-6-fluoro-7-((3-fluorophenyl)(pyridin-4-yl)methoxy)-8-methylchroman-4-one

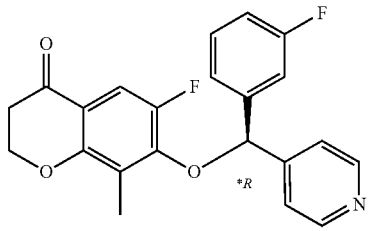 [SMILES: Cc1c(O[C@H](c2ccncc2)c2cccc(F)c2)c(F)cc2c1OCCC2=O]

MS (ESI): mass calcd. for $C_{22}H_{17}F_2NO_3$ 381.12 m/z found 382.2 [M+H]$^+$. $^1$H NMR (400 MHz, DMSO-d$_6$) δ 8.55 (d, J=6.4 Hz, 2H), 7.49 (d, J=6.0 Hz, 2H), 7.42-7.36 (m, 1H), 7.34-7.27 (m, 3H), 7.16-7.09 (m, 1H), 6.50 (s, 1H), 4.50 (t, J=6.4 Hz, 2H), 2.70 (t, J=6.4 Hz, 2H), 2.00 (s, 3H).

Example 96b (*S)-6-fluoro-7-((3-fluorophenyl)(pyridin-4-yl)methoxy)-8-methylchroman-4-one

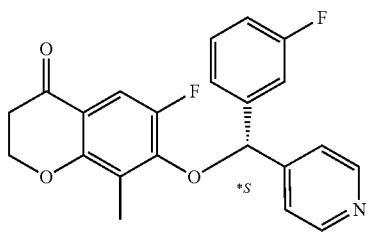 [SMILES: Cc1c(O[C@@H](c2ccncc2)c2cccc(F)c2)c(F)cc2c1OCCC2=O]

MS (ESI): mass calcd. for $C_{22}H_{17}F_2NO_3$ 381.12 m/z found 382.2 [M+H]$^+$. $^1$H NMR (400 MHz, DMSO-d$_6$) δ 8.58 (d, J=5.6 Hz, 2H), 7.52 (d, J=6.0 Hz, 2H), 7.45-7.39 (m, 1H), 7.37-7.31 (m, 3H), 7.19-7.13 (m, 1H), 6.53 (s, 1H), 4.53 (t, J=6.4 Hz, 2H), 2.74 (t, J=6.4 Hz, 2H), 2.04 (s, 3H).

Example 97: (R,S)-6-Fluoro-7-((3-fluoro-4-methoxyphenyl)(pyridin-4-yl)methoxy)-8-methylchroman-4-one

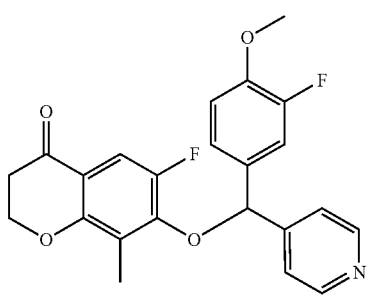 [SMILES: COc1ccc(C(Oc2c(F)cc3c(c2C)OCCC3=O)c2ccncc2)cc1F]

DIAD (397 mg, 1.96 mmol) was added to a 100 mL three-necked round-bottomed flask containing a solution of (3-fluoro-4-methoxyphenyl)(pyridin-4-yl)methanol (Intermediate 87, 300 mg, 1.29 mmol), 6-fluoro-7-hydroxy-8-methylchroman-4-one (Intermediate 81, 278 mg, 1.42 mmol), PPh$_3$ (545 mg, 2.08 mmol), and THF (6 mL) under N$_2$ atmosphere. The mixture was stirred for 16 hours at room temperature before concentrating to dryness under reduced pressure to give the product, which was purified by preparative HPLC using a DB Phenomenex Gemini 150 mm×25 mm×10 μm column (eluent: 50% to 80% (v/v) CH$_3$CN and H$_2$O with 0.05% NH$_3$) to afford the title compound (220 mg, 42%) as a white solid. MS (ESI): mass calcd. for $C_{23}H_{19}F_2NO_4$ 411.13 m/z found 411.9 [M+H]$^+$.

A sample of (R,S)-6-fluoro-7-((3-fluoro-4-methoxyphenyl)(pyridin-4-yl)methoxy)-8-methylchroman-4-one (200 mg, 0.486 mmol) was separated by preparative SFC (DAICEL CHIRALCEL OD 250 mm×30 mm×10 μm, 30% (v/v) supercritical CO$_2$ in EtOH and H$_2$O with 0.1% NH$_3$) to yield example 97a (first enantiomer to elute, labelled *R) and 97b (second enantiomer to elute, labelled *S).

Example 97a (*R)-6-fluoro-7-((3-fluoro-4-methoxyphenyl)(pyridin-4-yl)methoxy)-8-methylchroman-4-one

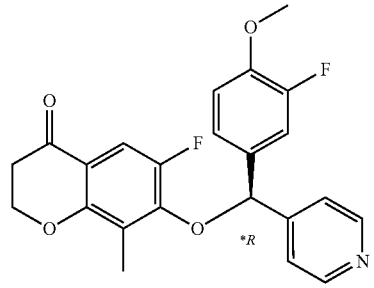 [SMILES: COc1ccc([C@H](Oc2c(F)cc3c(c2C)OCCC3=O)c2ccncc2)cc1F]

MS (ESI): mass calcd. for $C_{23}H_{19}F_2NO_4$ 411.13 m/z found 412.2 [M+H]$^+$. $^1$H NMR (400 MHz, DMSO-d$_6$) δ 8.57 (d, J=6.0 Hz, 2H), 7.50 (d, J=5.8 Hz, 2H), 7.35-7.27 (m, 2H), 7.25-7.20 (m, 1H), 7.16-7.11 (m, 1H), 6.46 (s, 1H), 4.53 (t, J=6.4 Hz, 2H), 3.80 (s, 3H), 2.73 (t, J=6.4 Hz, 2H), 2.03 (s, 3H).

Example 97b (*S)-6-fluoro-7-((3-fluoro-4-methoxyphenyl)(pyridin-4-yl)methoxy)-8-methylchroman-4-one

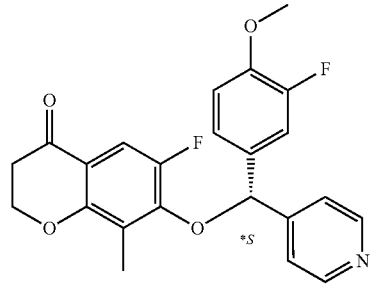 [SMILES: COc1ccc([C@@H](Oc2c(F)cc3c(c2C)OCCC3=O)c2ccncc2)cc1F]

MS (ESI): mass calcd. for $C_{23}H_{19}F_2NO_4$ 411.13 m/z found 412.2 [M+H]$^+$. $^1$H NMR (400 MHz, DMSO-d$_6$) δ 8.58 (d, J=6.0 Hz, 2H), 7.51 (d, J=6.0 Hz, 2H), 7.35-7.27 (m, 2H), 7.25-7.21 (m, 1H), 7.17-7.11 (m, 1H), 6.46 (s, 1H), 4.53 (t, J=6.4 Hz, 2H), 3.80 (s, 3H), 2.73 (t, J=6.5 Hz, 2H), 2.03 (s, 3H).

Example 98: (R,S)-4-(((4-Oxochroman-7-yl)oxy)(pyridin-4-yl)methyl)-1-naphthamide

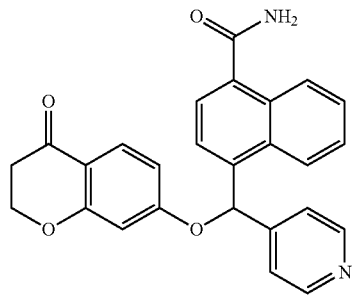 [SMILES: NC(=O)c1ccc(C(Oc2ccc3c(c2)OCCC3=O)c2ccncc2)c2ccccc12]

H$_2$O$_2$ (1.85 mL, 30% purity, 18.4 mmol) was added dropwise to a solution of 4-(((4-oxochroman-7-yl)oxy)(pyridin-4-yl)methyl)-1-naphthonitrile (Example 37, 2.5 g, 6.2 mmol), K$_2$CO$_3$ (2.13 g, 15.4 mmol), and DMSO (5 mL). The mixture was stirred at room temperature for 1 hour before pouring it into water (100 mL) and extracting with ethyl acetate (80 mL×3). The combined organic extracts were dried over anhydrous Na$_2$SO$_4$, filtered, and concentrated to dryness under reduced pressure to give the product, which was purified by FCC (eluent: petroleum ether:ethyl acetate, 1:0 to 0:1, gradient elution) and further purified by preparative HPLC using a Phenomenex Gemini 150×25 mm×10 μm column (eluent: 30% to 60% (v/v) CH$_3$CN and H$_2$O with 0.05% NH$_3$) to afford the title compound (1.1 g, 41%) as a white solid. MS (ESI): mass calcd. for C$_{26}$H$_{20}$N$_2$O$_4$ 424.14 m/z, found 424.9 [M+H]$^+$.

A sample of (R,S)-4-(((4-oxochroman-7-yl)oxy)(pyridin-4-yl)methyl)-1-naphthamide (1.00 g, 2.36 mmol) was separated by SFC (Chiralpak OJ 250 mm×30 mm×10 μm, EtOH (containing 0.1% of 25% aqueous NH$_3$): supercritical CO$_2$, 40%:60% (v/v)) to yield example 98a (first enantiomer to elute, labelled *R) and example 98b (second enantiomer to elute, labelled *S).

Example 98a (*R)-4-(((4-Oxochroman-7-yl)oxy)(pyridin-4-yl)methyl)-1-naphthamide

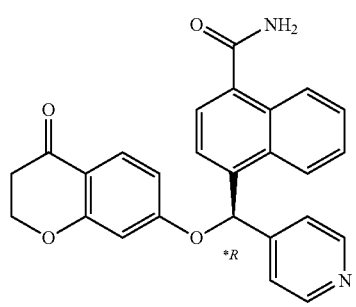 [SMILES: NC(=O)c1ccc([C@H](Oc2ccc3c(c2)OCCC3=O)c2ccncc2)c2ccccc12]

MS (ESI): mass calcd. for C$_{26}$H$_{20}$N$_2$O$_4$ 424.14 m/z, found 425.0 [M+H]$^+$. $^1$H NMR (400 MHz, DMSO-d$_6$) δ 8.61-8.53 (m, 2H), 8.43-8.36 (m, 1H), 8.32-8.26 (m, 1H), 8.03 (s, 1H), 7.73-7.57 (m, 6H), 7.55-7.50 (m, 2H), 7.49 (s, 1H), 6.82 (dd, J=2.2, 8.8 Hz, 1H), 6.67 (d, J=2.2 Hz, 1H), 4.44 (t, J=6.4 Hz, 2H), 2.66 (t, J=6.4 Hz, 2H).

Example 98b (*S)-4-(((4-oxochroman-7-yl)oxy)(pyridin-4-yl)methyl)-1-naphthamide

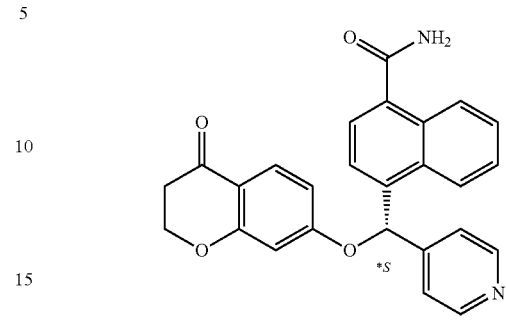

MS (ESI): mass calcd. for C$_{26}$H$_{20}$N$_2$O$_4$ 424.14 m/z, found 425.0 [M+H]$^+$. $^1$H NMR (400 MHz, DMSO-d$_6$) δ 8.59-8.55 (m, 2H), 8.43-8.38 (m, 1H), 8.31-8.27 (m, 1H), 8.03 (s, 1H), 7.71-7.58 (m, 6H), 7.54-7.50 (m, 2H), 7.49 (s, 1H), 6.82 (dd, J=2.2, 8.8 Hz, 1H), 6.67 (d, J=2.2 Hz, 1H), 4.44 (t, J=6.4 Hz, 2H), 2.66 (t, J=6.4 Hz, 2H).

Example 99: (R,S)-4-(((5-Ethyl-4-oxochroman-7-yl)oxy)(pyridin-4-yl)methyl)benzamide

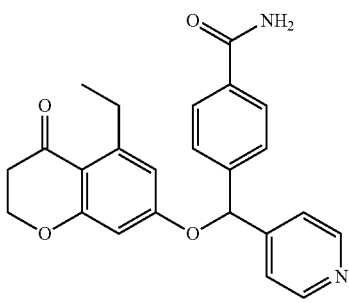 [SMILES: CCc1cc(OC(c2ccncc2)c2ccc(C(N)=O)cc2)cc2c1C(=O)CCO2]

H$_2$O$_2$ (0.63 mL, 30% purity, 6.3 mmol) was added dropwise to a solution of 4-(((5-ethyl-4-oxochroman-7-yl)oxy)(pyridin-4-yl)methyl)benzonitrile (Intermediate 88, 600 mg), K$_2$CO$_3$ (863 mg, 6.24 mmol), and DMSO (5 mL). The mixture was stirred at room temperature for 30 min before pouring it into aqueous Na$_2$SO$_3$ (10 mL) and extracting with ethyl acetate (10 mL×3). The combined organic extracts were dried over anhydrous Na$_2$SO$_4$, filtered and concentrated to dryness under reduced pressure to give the product, which was purified by preparative HPLC using a Xtimate C18, 150×25 mm×5 μm column (eluent: 18% to 48% (v/v) CH$_3$CN and H$_2$O with 0.225% HCOOH) to afford the title compound (100 mg, 15%) as a white solid. MS (ESI): mass calcd. for C$_{24}$H$_{22}$N$_2$O$_4$ 402.16 m/z found 403.1 [M+H]$^+$.

A sample of (R,S)-4-(((5-ethyl-4-oxochroman-7-yl)oxy)(pyridin-4-yl)methyl)benzamide (90 mg, 0.22 mmol) was separated by SFC (YMC CHIRAL Amylose-C, 250 mm×30 mm, 10 μm (i-PrOH (containing 0.1% of 25% aqueous NH$_3$): supercritical CO$_2$, 40%:60% (v/v)) to yield example 99a (first enantiomer to elute, labelled *R) and example 99b (second enantiomer to elute, labelled *S).

Example 99a (*R)-4-(((5-ethyl-4-oxochroman-7-yl)oxy)(pyridin-4-yl)methyl)benzamide

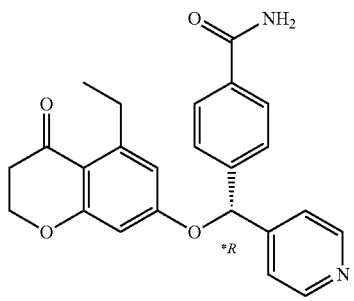 [SMILES: CCc1cc(O[C@@H](c2ccncc2)c2ccc(C(N)=O)cc2)cc2c1C(=O)CCO2]

MS (ESI): mass calcd. for C₂₄H₂₂N₂O₄ 402.16 m/z found 403.2 [M+H]⁺. ¹H NMR (400 MHz, DMSO-d₆) δ 8.57 (d, J=5.1 Hz, 2H), 7.95 (s, 1H), 7.85 (d, J=8.1 Hz, 2H), 7.60 (d, J=8.1 Hz, 2H), 7.51 (d, J=5.1 Hz, 2H), 7.39 (s, 1H), 6.79 (s, 1H), 6.64-6.61 (m, 1H), 6.46-6.44 (m, 1H), 4.38 (t, J=6.1 Hz, 2H), 2.98-2.90 (m, 2H), 2.65 (t, J=6.4 Hz, 2H), 1.08 (t, J=7.3 Hz, 3H).

Example 99b (*S)-4-(((5-ethyl-4-oxochroman-7-yl)oxy)(pyridin-4-yl)methyl)benzamide

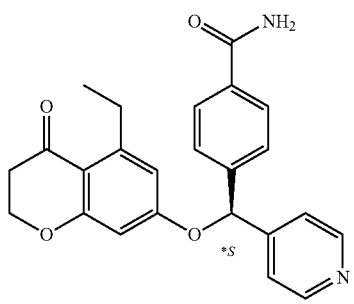 [SMILES: CCc1cc(O[C@H](c2ccncc2)c2ccc(C(N)=O)cc2)cc2c1C(=O)CCO2]

MS (ESI): mass calcd. for C₂₄H₂₂N₂O₄ 402.16 m/z found 403.2 [M+H]⁺. ¹H NMR (400 MHz, DMSO-d₆) δ 8.57 (d, J=5.1 Hz, 2H), 7.95 (s, 1H), 7.85 (d, J=8.1 Hz, 2H), 7.60 (d, J=8.1 Hz, 2H), 7.51 (d, J=5.1 Hz, 2H), 7.39 (s, 1H), 6.79 (s, 1H), 6.64-6.61 (m, 1H), 6.46-6.44 (m, 1H), 4.38 (t, J=6.1 Hz, 2H), 2.98-2.90 (m, 2H), 2.65 (t, J=6.4 Hz, 2H), 1.08 (t, J=7.3 Hz, 3H).

Example 100: (R,S)-4-(((8-Methoxy-4-oxochroman-7-yl)oxy)(pyridin-4-yl)methyl)benzamide

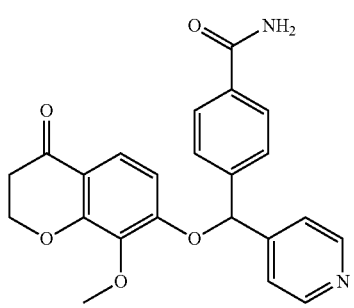 [SMILES: COc1c(OC(c2ccncc2)c2ccc(C(N)=O)cc2)ccc2c1OCCC2=O]

H₂O₂ (0.48 mL, 30% purity, 4.8 mmol) was added dropwise to a solution of 4-(((8-methoxy-4-oxochroman-7-yl)oxy)(pyridin-4-yl)methyl)benzonitrile (Intermediate 89, 280 mg, 0.326 mmol), K₂CO₃ (0.436 g, 3.16 mmol), and DMSO (5 mL) in a 50 mL round-bottomed flask. The mixture was stirred at room temperature for 1 hour before pouring it into saturated Na₂SO₃ (10 mL) and extracting with ethyl acetate (20 mL×3). The combined organic extracts were dried over anhydrous Na₂SO₄, filtered, and concentrated to dryness under reduced pressure to give the product, which was purified by preparative HPLC using a Phenomenex Gemini 150×25 mm×m column (eluent: 23% to 53% (v/v) CH₃CN and H₂O with 0.04% NH₃·H₂O and 10 mM NH₄HCO₃) to afford the title compound (100 mg, 75%) as white solid. MS (ESI): mass calcd. for C₂₃H₂₀N₂O₅ 404.14 m/z found 405.1 [M+H]⁺. ¹H NMR (400 MHz, DMSO-d₆) δ 8.58 (d, J=6.0 Hz, 2H), 7.94 (s, 1H), 7.95-7.93 (m, 1H), 7.86 (d, J=8.3 Hz, 2H), 7.61 (d, J=8.3 Hz, 2H), 7.52 (d, J=6.0 Hz, 2H), 7.42-7.37 (m, 2H), 6.82 (s, 1H), 6.77 (d, J=9.0 Hz, 1H), 4.55 (t, J=6.5 Hz, 2H), 3.85 (s, 3H), 2.71 (t, J=6.4 Hz, 2H).

A sample of (R,S)-4-(((8-methoxy-4-oxochroman-7-yl)oxy)(pyridin-4-yl)methyl)benzamide (291 mg, 0.677 mmol) was separated by SFC (DAICEL CHIRALCEL OJ-H 250 mm×30 mm, 5 μm, EtOH (containing 0.1% of 25% aqueous NH₃): supercritical CO₂, 40%:60% (v/v)) to yield example 100a (first enantiomer to elute, labelled *R) and example 100b (second enantiomer to elute, labelled *S).

Example 100a (*R)-4-(((8-methoxy-4-oxochroman-7-yl)oxy)(pyridin-4-yl)methyl)benzamide

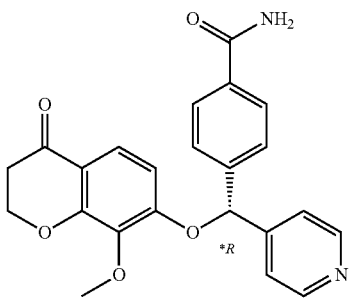 [SMILES: COc1c(O[C@@H](c2ccncc2)c2ccc(C(N)=O)cc2)ccc2c1OCCC2=O]

MS (ESI): mass calcd. for C₂₃H₂₀N₂O₅ 404.14 m/z found 405.2 [M+H]⁺. ¹H NMR (400 MHz, DMSO-d₆) δ 8.60-8.56 (m, 2H), 7.95 (s, 1H), 7.88-7.83 (m, 2H), 7.61 (d, J=8.6 Hz, 2H), 7.52 (d, J=5.9 Hz, 2H), 7.40 (d, J=8.8 Hz, 2H), 6.82 (s, 1H), 6.77 (d, J=9.3 Hz, 1H), 4.55 (t, J=6.4 Hz, 2H), 3.85 (s, 3H), 2.71 (t, J=6.4 Hz, 2H).

Example 100b (*S)-4-(((8-methoxy-4-oxochroman-7-yl)oxy)(pyridin-4-yl)methyl)benzamide

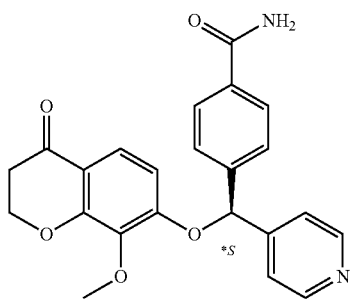 [SMILES: COc1c(O[C@H](c2ccncc2)c2ccc(C(N)=O)cc2)ccc2c1OCCC2=O]

MS (ESI): mass calcd. for $C_{23}H_{20}N_2O_5$ 404.14 m/z found 405.1 [M+H]$^+$. $^1$H NMR (400 MHz, DMSO-d$_6$) δ 8.60-8.55 (m, 2H), 7.95 (s, 1H), 7.88-7.83 (m, 2H), 7.61 (d, J=8.3 Hz, 2H), 7.52 (d, J=5.1 Hz, 2H), 7.40 (d, J=9.0 Hz, 2H), 6.82 (s, 1H), 6.77 (d, J=9.0 Hz, 1H), 4.55 (t, J=6.2 Hz, 2H), 3.85 (s, 3H), 2.71 (t, J=6.4 Hz, 2H).

Example 101: (R,S)-4-(((5-Cyano-4-oxochroman-7-yl)oxy)(pyridin-4-yl)methyl)benzamide

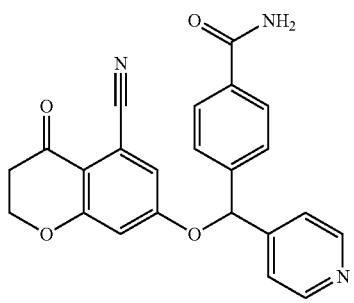 [SMILES: N#Cc1cc(OC(c2ccncc2)c2ccc(C(N)=O)cc2)cc2c1C(=O)CCO2]

DIAD (0.06 mL, 0.31 mmol) was added to a solution of 7-hydroxy-4-oxochroman-5-carbonitrile (Intermediate 90, 250 mg, 1.32 mmol), 4-(hydroxy(pyridin-4-yl)methyl)benzamide (Intermediate 107, 332 mg, 1.46 mmol), PPh$_3$ (693 mg, 2.64 mmol), and THF (6 mL). The mixture was stirred at room temperature for 1 hour. The solvent was removed under reduced pressure to afford the product, which was purified by prep-HPLC using a Xtimate C18, 150×25 mm×5 μm column (eluent: 6% to 36% (v/v) CH$_3$CN and H$_2$O with 0.225% HCOOH) to afford the title compound (240 mg, 45%) as a light yellow solid. MS (ESI): mass calcd. for $C_{23}H_{17}N_3O_4$ 399.12 m/z found 400.2 [M+H]$^+$.

A sample of (R,S)-4-(((5-cyano-4-oxochroman-7-yl)oxy)(pyridin-4-yl)methyl)benzamide (240 mg, 0.601 mmol) was separated by SFC (DAICEL CHIRALPAK AD-H 250 mm×30 mm, 5 m, MeOH (containing 0.1% of 25% aqueous NH$_3$): supercritical CO$_2$, 40%:60% (v/v)) to yield example 101a (first enantiomer to elute, labelled *R) and example 101b (second enantiomer to elute, labelled *S).

Example 101a (*R)-4-(((5-cyano-4-oxochroman-7-yl)oxy)(pyridin-4-yl)methyl)benzamide

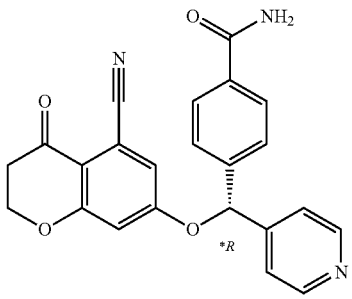 [SMILES: N#Cc1cc(O[C@@H](c2ccncc2)c2ccc(C(N)=O)cc2)cc2c1C(=O)CCO2]

MS (ESI): mass calcd. for $C_{23}H_{17}N_3O_4$ 399.12 m/z found 400.2 [M+H]$^+$. $^1$H NMR (400 MHz, DMSO-d$_6$) δ 8.58 (d, J=5.4 Hz, 2H), 7.97 (s, 1H), 7.86 (d, J=8.3 Hz, 2H), 7.61 (d, J=8.1 Hz, 2H), 7.52 (d, J=5.9 Hz, 2H), 7.41 (s, 1H), 7.37 (d, J=2.4 Hz, 1H), 6.98 (d, J=2.4 Hz, 1H), 6.95 (s, 1H), 4.54 (t, J=6.5 Hz, 2H), 2.76 (t, J=6.4 Hz, 2H).

Example 101b (*S)-4-(((5-cyano-4-oxochroman-7-yl)oxy)(pyridin-4-yl)methyl)benzamide

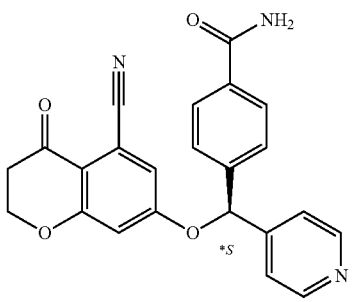 [SMILES: N#Cc1cc(O[C@H](c2ccncc2)c2ccc(C(N)=O)cc2)cc2c1C(=O)CCO2]

MS (ESI): mass calcd. for $C_{23}H_{17}N_3O_4$ 399.12 m/z found 400.1 [M+H]$^+$. $^1$H NMR (400 MHz, DMSO-d$_6$) δ 8.58 (d, J=5.9 Hz, 2H), 7.97 (s, 1H), 7.86 (d, J=8.3 Hz, 2H), 7.61 (d, J=8.3 Hz, 2H), 7.52 (d, J=5.9 Hz, 2H), 7.41 (s, 1H), 7.37 (d, J=2.4 Hz, 1H), 6.98 (d, J=2.4 Hz, 1H), 6.94 (s, 1H), 4.53 (t, J=6.4 Hz, 2H), 2.76 (t, J=6.5 Hz, 2H).

Example 102: (R,S)-4-(((8-Bromo-4-oxochroman-7-yl)oxy)(pyridin-4-yl)methyl)benzamide

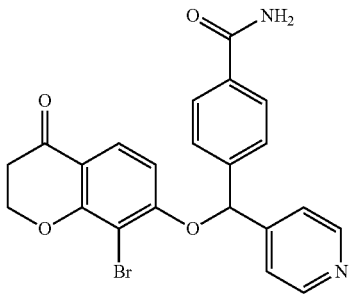 [SMILES: NC(=O)c1ccc(C(Oc2ccc3c(c2Br)OCCC3=O)c2ccncc2)cc1]

H$_2$O$_2$ (1.8 mL, 30% purity, 18 mmol) was added dropwise to a solution of 4-(((8-bromo-4-oxochroman-7-yl)oxy)(pyridin-4-yl)methyl)benzonitrile (Intermediate 91, 1.1 g), K$_2$CO$_3$ (1.66 g, 12.0 mmol), and DMSO (6 mL) in a 50 mL round-bottomed flask. The mixture was stirred at room temperature for 1 hour before pouring it into saturated Na$_2$SO$_3$ (10 mL) and extracting with ethyl acetate (20 mL×3). The combined organic extracts were washed with brine (20 mL), dried over anhydrous Na$_2$SO$_4$, filtered, and concentrated to dryness under reduced pressure to give the product, which was purified by FCC (eluent:petroleum ether:ethyl acetate, 1:0 to 0:1, gradient elution), then was further purified by preparative HPLC using a Phenomenex Gemini 150×25 mm×10 μm column (eluent: 30% to 60% (v/v) CH$_3$CN and H$_2$O with 0.05% NH$_3$) to afford the title compound (200 mg) as light brown solid. MS (ESI): mass calcd. for C$_{22}$H$_{17}$BrN$_2$O$_4$ 452.04 m/z found 453.1 [M+H]$^+$.

A sample of (R,S)-4-(((8-bromo-4-oxochroman-7-yl)oxy)(pyridin-4-yl)methyl)benzamide (200 mg, 0.437 mmol) was separated by SFC (YMC CHIRAL Amylose-C, 250 mm×30 mm, 10 μm, MeOH (containing 0.1% of 25% aqueous NH$_3$): supercritical CO$_2$, 55%:45% (v/v)) to yield example 102a (first enantiomer to elute, labelled *R) and example 102b (second enantiomer to elute, labelled *S).

Example 102a (*R)-4-(((8-bromo-4-oxochroman-7-yl)oxy)(pyridin-4-yl)methyl)benzamide

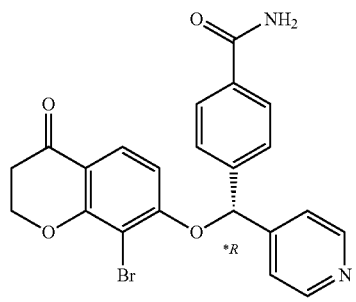 [SMILES: NC(=O)c1ccc([C@@H](Oc2ccc3c(c2Br)OCCC3=O)c2ccncc2)cc1]

MS (ESI): mass calcd. for C$_{22}$H$_{17}$BrN$_2$O$_4$ 452.04 m/z found 454.9 [M+H]$^+$. $^1$H NMR (400 MHz, DMSO-d$_6$) δ 8.61-8.56 (m, 2H), 7.94 (s, 1H), 7.85 (d, J=8.3 Hz, 2H), 7.67 (d, J=9.0 Hz, 1H), 7.63 (d, J=8.3 Hz, 2H), 7.55 (d, J=6.0 Hz, 2H), 7.38 (s, 1H), 6.99 (s, 1H), 6.87 (d, J=9.0 Hz, 1H), 4.64 (t, J=6.4 Hz, 2H), 2.76 (t, J=6.4 Hz, 2H).

Example 102b (*S)-4-(((8-bromo-4-oxochroman-7-yl)oxy)(pyridin-4-yl)methyl)benzamide

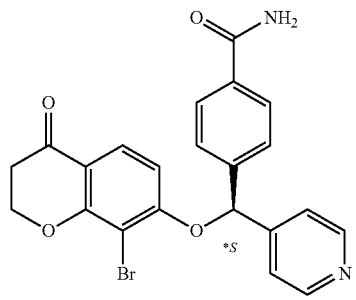 [SMILES: NC(=O)c1ccc([C@H](Oc2ccc3c(c2Br)OCCC3=O)c2ccncc2)cc1]

MS (ESI): mass calcd. for C$_{22}$H$_{17}$BrN$_2$O$_4$ 452.04 m/z found 454.9 [M+H]$^+$. $^1$H NMR (400 MHz, DMSO-d$_6$) δ 8.59 (m, 2H), 7.94 (s, 1H), 7.86 (d, J=8.3 Hz, 2H), 7.67 (d, J=9.0 Hz, 1H), 7.63 (d, J=8.3 Hz, 2H), 7.56 (d, J=6.0 Hz, 2H), 7.38 (s, 1H), 7.00 (s, 1H), 6.87 (d, J=9.0 Hz, 1H), 4.64 (t, J=6.4 Hz, 2H), 2.76 (t, J=6.4 Hz, 2H).

Example 103: (R,S)-6-Fluoro-7-((4-methoxyphenyl)(pyridin-4-yl)methoxy)-8-methylchroman-4-one

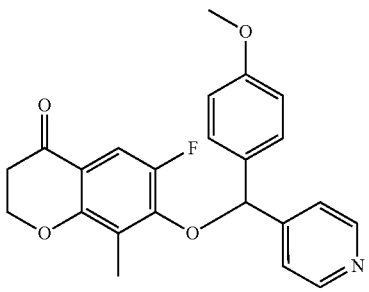 [SMILES: COc1ccc(C(Oc2c(F)cc3c(c2C)OCCC3=O)c2ccncc2)cc1]

DIAD (280 mg, 1.39 mmol) was added to a 0° C. solution of (4-methoxyphenyl)(pyridin-4-yl)methanol (Intermediate 9, 200 mg, 0.929 mmol), 6-fluoro-7-hydroxy-8-methylchroman-4-one (Intermediate 81, 140 mg, 0.714 mmol), PPh$_3$ (370 mg, 1.41 mmol), and THF (5 mL). The mixture was stirred at room temperature for 12 hours with gradual warming to room temperature before pouring it into water (20 mL) and extracting with ethyl acetate (20 mL×2). The combined organic extracts were dried over anhydrous Na$_2$SO$_4$, filtered and concentrated to dryness under reduced pressure to give the product, which was purified by FCC (eluent: petroleum ether:ethyl acetate, 10:1 to 1:2, gradient elution) and further purified by preparative HPLC using a Phenomenex Gemini 150 mm×25 mm×10 μm column (eluent: 50% to 80% (v/v) CH$_3$CN and H$_2$O with 0.05% NH$_3$) to afford the title compound (150 mg, 41%) as a white solid. MS (ESI): mass calcd. for C$_{23}$H$_{20}$FNO$_4$ 393.14 m/z found 393.9 [M+H]$^+$.

A sample of (R,S)-6-fluoro-7-((4-methoxyphenyl)(pyridin-4-yl)methoxy)-8-methylchroman-4-one (150 mg, 0.381 mmol) was separated by SFC (DAICEL CHIRALCEL OJ-H, 250 mm×30 mm, 5 μm, EtOH (containing 0.1% of 25% aqueous NH$_3$): supercritical CO$_2$, 30%:70% (v/v)) to yield example 103a (first enantiomer to elute, labelled *R) and example 103b (second enantiomer to elute, labelled *S).

Example 103a (*R)-6-fluoro-7-((4-methoxyphenyl)(pyridin-4-yl)methoxy)-8-methylchroman-4-one

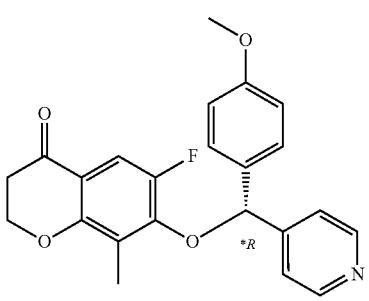 [SMILES: COc1ccc([C@@H](Oc2c(F)cc3c(c2C)OCCC3=O)c2ccncc2)cc1]

MS (ESI): mass calcd. for $C_{23}H_{20}FNO_4$ 393.14 m/z found 394.2 [M+H]$^+$. $^1$H NMR (400 MHz, DMSO-d$_6$) δ 8.57 (d, J=6.0 Hz, 2H), 7.48 (d, J=6.0 Hz, 2H), 7.35-7.29 (m, 3H), 6.89 (d, J=8.8 Hz, 2H), 6.46 (s, 1H), 4.52 (t, J=6.4 Hz, 2H), 3.71 (s, 3H), 2.73 (t, J=6.5 Hz, 2H), 2.01 (s, 3H).

Example 103b (*S)-6-fluoro-7-((4-methoxyphenyl)(pyridin-4-yl)methoxy)-8-methylchroman-4-one

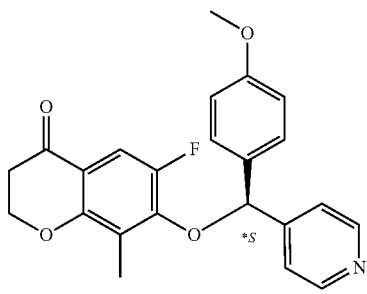 [SMILES: COc1ccc([C@H](Oc2c(F)cc3c(c2C)OCCC3=O)c2ccncc2)cc1]

MS (ESI): mass calcd. for $C_{23}H_{20}FNO_4$ 393.14 m/z found 394.1 [M+H]$^+$. $^1$H NMR (400 MHz, DMSO-d$_6$) δ 8.57 (d, J=5.9 Hz, 2H), 7.48 (d, J=5.6 Hz, 2H), 7.36-7.27 (m, 3H), 6.89 (d, J=8.8 Hz, 2H), 6.46 (s, 1H), 4.51 (t, J=6.4 Hz, 2H), 3.71 (s, 3H), 2.72 (t, J=6.4 Hz, 2H), 2.01 (s, 3H).

Example 104: (R,S)-6-Fluoro-8-methyl-7-((4-(methylsulfonyl)phenyl)(pyridin-4-yl)methoxy)chroman-4-one

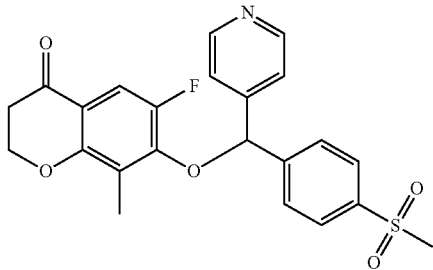 [SMILES: Cc1c(OC(c2ccncc2)c2ccc(S(C)(=O)=O)cc2)c(F)cc2c1OCCC2=O]

DIAD (495 mg, 2.45 mmol) was added to a mixture consisting of 6-fluoro-7-hydroxy-8-methylchroman-4-one (Intermediate 81, 300 mg, 1.53 mmol), (4-(methylsulfonyl)phenyl)(pyridin-4-yl)methanol (Intermediate 92, 443 mg, 1.68 mmol), PPh$_3$ (642 mg, 2.45 mmol), and dichloromethane (4 mL). Then the mixture was stirred at room temperature for 2 hours. The reaction mixture was concentrated to dryness under reduced pressure to give the product, which was purified by FCC (eluent:petroleum ether:ethyl acetate, 1:0 to 1:1, gradient elution) and further purified by preparative HPLC using a Xtimate C18 150 mm×25 mm, 5 μm column (eluent: 23% to 53% (v/v) CH$_3$CN and H$_2$O with 0.225% HCOOH) to afford the title compound (140 mg, 21%) as a colorless oil. MS (ESI): mass calcd. for $C_{23}H_{20}FNO_5S$ 441.10 m/z found 442.1 [M+H]$^+$.

A sample of (R,S)-6-fluoro-8-methyl-7-((4-(methylsulfonyl)phenyl)(pyridin-4-yl)methoxy)chroman-4-one (140 mg, 0.317 mmol) was separated by SFC (DAICEL CHIRALPAK AD-H, 250 mm×30 mm, 5 μm column, EtOH (containing 0.1% of 25% aqueous NH$_3$): supercritical CO$_2$, 50%:50% (v/v)) to yield example 104a (first enantiomer to elute, labelled *R) and example 104b (second enantiomer to elute, labelled *S).

Example 104a (*R)-6-fluoro-8-methyl-7-((4-(methylsulfonyl)phenyl)(pyridin-4-yl)methoxy)chroman-4-one

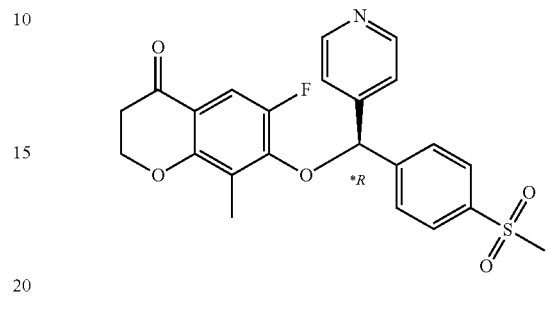

MS (ESI): mass calcd. for $C_{23}H_{20}FNO_5S$ 441.10 m/z found 442.1 [M+H]$^+$. $^1$H NMR (400 MHz, DMSO-d$_6$) δ 8.58 (d, J=1.0 Hz, 2H), 7.94 (d, J=8.3 Hz, 2H), 7.79 (d, J=8.3 Hz, 2H), 7.53 (d, J=1.0 Hz, 2H), 7.34 (d, J=11.8 Hz, 1H), 6.65 (s, 1H), 4.53 (t, J=6.3 Hz, 2H), 3.21 (s, 3H), 2.74 (t, J=6.3 Hz, 2H), 2.04 (s, 3H).

Example 104b (*S)-6-fluoro-8-methyl-7-((4-(methylsulfonyl)phenyl)(pyridin-4-yl)methoxy)chroman-4-one

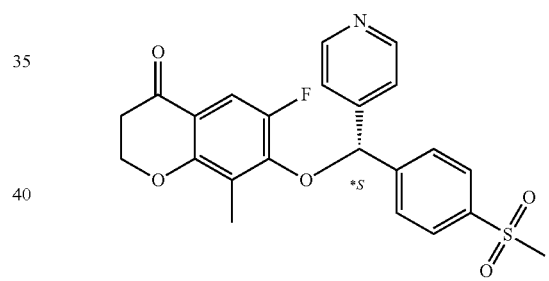

MS (ESI): mass calcd. for $C_{23}H_{20}FNO_5S$ 441.10 m/z found 442.1 [M+H]$^+$. $^1$H NMR (400 MHz, DMSO-d$_6$) δ 8.58 (d, J=1.0 Hz, 2H), 7.94 (d, J=8.5 Hz, 2H), 7.79 (d, J=8.3 Hz, 2H), 7.53 (d, J=6.0 Hz, 2H), 7.34 (d, J=11.5 Hz, 1H), 6.65 (s, 1H), 4.53 (t, J=6.4 Hz, 2H), 3.21 (s, 3H), 2.74 (t, J=6.4 Hz, 2H), 2.04 (s, 3H).

Example 105: (R,S)-6-Fluoro-8-methyl-7-((3-(methylsulfonyl)phenyl)(pyridin-4-yl)methoxy)chroman-4-one

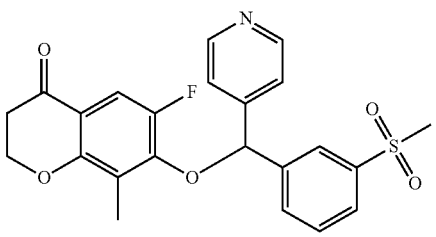 [SMILES: Cc1c(OC(c2ccncc2)c2cccc(S(C)(=O)=O)c2)c(F)cc2c1OCCC2=O]

DIAD (0.38 mL, 1.9 mmol) was added to a mixture consisting of (3-(methylsulfonyl)phenyl)(pyridin-4-yl)methanol (Intermediate 93, 250 mg, 0.949 mmol), 6-fluoro-7-hydroxy-8-methylchroman-4-one (Intermediate 81, 168 mg, 0.856 mmol), PPh$_3$ (374 mg, 1.43 mmol), and THF (4 mL). The mixture was stirred at room temperature for 2 hours before pouring it into H$_2$O (10 mL) and extracting with ethyl acetate (10 mL×3). The combined organic extracts were washed with brine (10 mL), dried over anhydrous Na$_2$SO$_4$, filtered, and concentrated to dryness under reduced pressure to give the product, which was purified by preparative HPLC using a Phenomenex Gemini 150×25 mm×10 μm column (eluent: 45% to 75% (v/v) CH$_3$CN and H$_2$O with 0.05% NH$_3$) to afford the title compound (110 mg, 26%) as a white solid. MS (ESI): mass calcd. for C$_{23}$H$_{20}$FNO$_5$S 441.10 m/z found 442.0 [M+H]$^+$.

A sample of (R,S)-6-fluoro-8-methyl-7-((3-(methylsulfonyl)phenyl)(pyridin-4-yl)methoxy)chroman-4-one (110 mg, 0.249 mmol) was separated by SFC (DAICEL CHIRALCEL OJ-H, 250 mm×30 mm, 5 μm, EtOH (containing 0.1% of 25% aqueous NH$_3$): supercritical CO$_2$, 30%:70% (v/v)) to yield example 105a (first enantiomer to elute, labelled *R) and example 105b (second enantiomer to elute, labelled *S).

Example 105a (*R)-6-fluoro-8-methyl-7-((3-(methylsulfonyl)phenyl)(pyridin-4-yl)methoxy)chroman-4-one

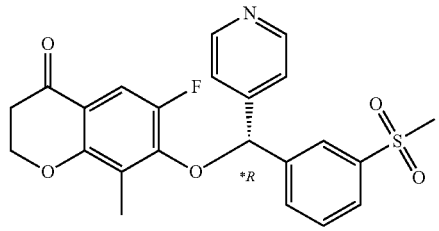 [SMILES: Cc1c(O[C@H](c2ccncc2)c2cccc(S(C)(=O)=O)c2)c(F)cc2c1OCCC2=O]

MS (ESI): mass calcd. for C$_{23}$H$_{20}$FNO$_5$S 441.10 m/z found 442.1 [M+H]$^+$. $^1$H NMR (400 MHz, DMSO-d$_6$) δ 8.60 (d, J=5.8 Hz, 2H), 8.06 (s, 1H), 7.91 (d, J=8.0 Hz, 1H), 7.85 (d, J=7.8 Hz, 1H), 7.71-7.64 (m, 1H), 7.55 (d, J=6.0 Hz, 2H), 7.34 (d, J=11.5 Hz, 1H), 6.65 (s, 1H), 4.53 (t, J=6.4 Hz, 2H), 3.21 (s, 3H), 2.74 (t, J=6.4 Hz, 2H), 2.02 (s, 3H).

Example 105b (*S)-6-fluoro-8-methyl-7-((3-(methylsulfonyl)phenyl)(pyridin-4-yl)methoxy)chroman-4-one

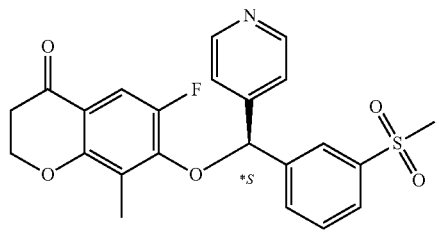 [SMILES: Cc1c(O[C@@H](c2ccncc2)c2cccc(S(C)(=O)=O)c2)c(F)cc2c1OCCC2=O]

MS (ESI): mass calcd. for C$_{23}$H$_{20}$FNO$_5$S 441.10 m/z found 442.1 [M+H]$^+$. $^1$H NMR (400 MHz, DMSO-d$_6$) δ 8.61-8.57 (m, 2H), 8.06 (s, 1H), 7.93-7.89 (m, 1H), 7.87-7.83 (m, 1H), 7.70-7.65 (m, 1H), 7.55 (d, J=5.9 Hz, 2H), 7.34 (d, J=11.5 Hz, 1H), 6.65 (s, 1H), 4.53 (t, J=6.5 Hz, 2H), 3.21 (s, 3H), 2.74 (t, J=6.4 Hz, 2H), 2.01 (s, 3H).

Example 106: (R,S)-4-((2,6-Dimethylpyridin-4-yl)((8-isopropyl-4-oxochroman-7-yl)oxy)methyl)benzamide

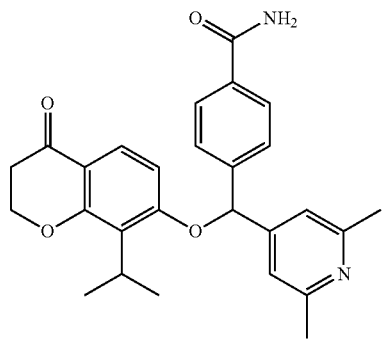 [SMILES: Cc1cc(C(Oc2ccc3c(c2C(C)C)OCCC3=O)c2ccc(C(N)=O)cc2)cc(C)n1]

H$_2$O$_2$ (2.0 mL, 30% purity, 20 mmol) was added dropwise to a solution of 4-(((8-methoxy-4-oxochroman-7-yl)oxy)(pyridin-4-yl)methyl)benzonitrile (Intermediate 94, 1.4 g, 41% purity, 1.3 mmol), K$_2$CO$_3$ (1.8 g, 13 mmol), and DMSO (10 mL) in a 50 mL round-bottomed flask. The mixture was stirred at room temperature for 1 hour before pouring it into saturated Na$_2$SO$_3$ (15 mL) and extracting with ethyl acetate (20 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 0:1, gradient elution) and further purified by preparative HPLC using a Phenomenex Gemini 150×25 mm×10 μm column (eluent: 35% to 65% (v/v) CH$_3$CN and H$_2$O with 0.05% NH$_3$) to afford the title compound (400 mg, 66%) as a brown solid. MS (ESI): mass calcd. for C$_{27}$H$_{28}$N$_2$O$_4$ 444.20 m/z found 445.1 [M+H]$^+$.

A sample of (R,S)-4-((2,6-dimethylpyridin-4-yl)((8-isopropyl-4-oxochroman-7-yl)oxy)methyl)benzamide (400 mg, 0.90 mmol) was separated by SFC (DAICEL CHIRALCEL OD-H 250 mm×30 mm, 5 μm, EtOH (containing 0.1% of 25% aqueous NH$_3$): supercritical CO$_2$, 45%:55% (v/v)) to yield example 106a (first enantiomer to elute, labelled *R) and example 106b (second enantiomer to elute, labelled *S).

Example 106a (*R)-4-((2,6-dimethylpyridin-4-yl)((8-isopropyl-4-oxochroman-7-yl)oxy)methyl)benzamide

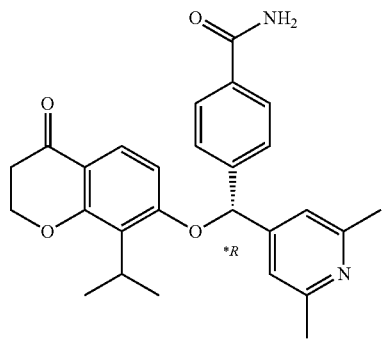 [SMILES: Cc1cc([C@H](Oc2ccc3c(c2C(C)C)OCCC3=O)c2ccc(C(N)=O)cc2)cc(C)n1]

MS (ESI): mass calcd. for $C_{27}H_{28}N_2O_4$ 444.20 m/z found 445.2 [M+H]$^+$. $^1$H NMR (400 MHz, DMSO-d$_6$) δ 7.94 (s, 1H), 7.85 (d, J=8.3 Hz, 2H), 7.57 (d, J=8.3 Hz, 2H), 7.52 (d, J=9.0 Hz, 1H), 7.39 (s, 1H), 7.13 (s, 2H), 6.68 (s, 1H), 6.66 (d, J=9.0 Hz, 1H), 4.50 (t, J=6.4 Hz, 2H), 3.75-3.66 (m, 1H), 2.68 (t, J=6.2 Hz, 2H), 2.39 (s, 6H), 1.33 (d, J=7.1 Hz, 3H), 1.31 (d, J=7.3 Hz, 3H).

Example 106b (*S)-4-((2,6-dimethylpyridin-4-yl)((8-isopropyl-4-oxochroman-7-yl)oxy)methyl)benzamide

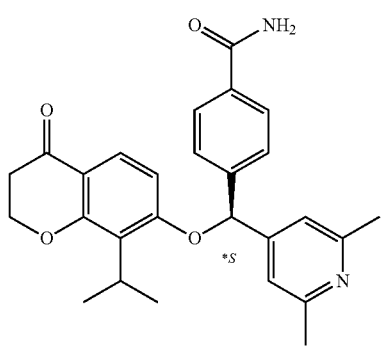 [SMILES: Cc1cc([C@@H](Oc2ccc3c(c2C(C)C)OCCC3=O)c2ccc(C(N)=O)cc2)cc(C)n1]

MS (ESI): mass calcd. for $C_{27}H_{28}N_2O_4$ 444.20 m/z found 445.2 [M+H]$^+$. $^1$H NMR (400 MHz, DMSO-d$_6$) δ 7.95 (s, 1H), 7.89-7.82 (m, 2H), 7.61-7.55 (m, 2H), 7.54-7.50 (m, 1H), 7.39 (s, 1H), 7.13 (s, 2H), 6.71-6.63 (m, 2H), 4.50 (t, J=6.2 Hz, 2H), 3.70 (td, J=7.1, 14.2 Hz, 1H), 2.68 (t, J=6.2 Hz, 2H), 2.39 (s, 6H), 1.33 (d, J=7.3 Hz, 3H), 1.31 (d, J=7.3 Hz, 3H).

Example 107: (R,S)-4-((3-Cyanophenyl)((8-isopropyl-4-oxochroman-7-yl)oxy)methyl)benzamide

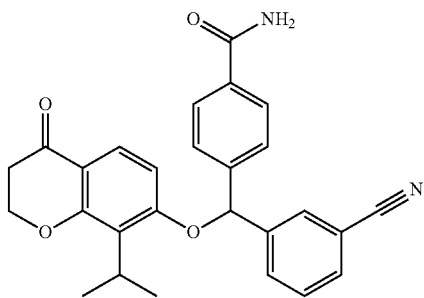 [SMILES: CC(C)c1c(OC(c2ccc(C(N)=O)cc2)c2cccc(C#N)c2)ccc2c1OCCC2=O]

4-((3-Bromophenyl)((8-isopropyl-4-oxochroman-7-yl)oxy)methyl)benzamide (Intermediate 95, 600 mg), Zn(CN)$_2$ (390 mg, 3.32 mmol), XPhos (231 mg, 0.485 mmol), Zn dust (48 mg, 0.73 mmol), and DMF (3 mL) were added to a 20 mL sealed tube. The mixture was sparged with Ar for 5 minutes and then treated with Pd$_2$(dba)$_3$ (223 mg, 0.244 mmol). The mixture was sparged with Ar for another 5 minutes and then stirred while heating at 100° C. for 1 hour before cooling to room temperature. The suspension was filtered and the filter cake was washed with ethyl acetate (20 mL). The filtrate was diluted with water (30 mL) and extracted with ethyl acetate (20 mL×3). The combined organic extracts were dried over anhydrous Na$_2$SO$_4$, filtered and concentrated to dryness under reduced pressure to give the product, which was purified by FCC (eluent:petroleum ether:ethyl acetate, 10:1 to 0:1, gradient elution) and further purified by preparative high performance liquid chromatography over Phenomenex Gemini 150 mm×25 mm, 10 μm column (eluent: 43% to 73% (v/v) CH$_3$CN and H$_2$O with 0.04% NH$_3$ and 10 mM NH$_4$HCO$_3$) to afford the title compound (150 mg) as a white solid. MS (ESI): mass calcd. for $C_{27}H_{24}N_2O_4$ 440.17 m/z found 441.1 [M+H]$^+$.

A sample of (R,S)-4-((3-cyanophenyl)((8-isopropyl-4-oxochroman-7-yl)oxy)methyl)benzamide (145 mg, 0.329 mmol) was separated by SFC (DAICEL CHIRALPAK AD-H 250 mm×30 mm, m, i-PrOH (containing 0.1% of 25% aqueous NH$_3$): supercritical CO$_2$, 40%:60% (v/v)) to yield example 107a (first enantiomer to elute, labelled *R) and example 107b (second enantiomer to elute, labelled *S).

Example 107a (*R)-4-((3-cyanophenyl)((8-isopropyl-4-oxochroman-7-yl)oxy)methyl)benzamide

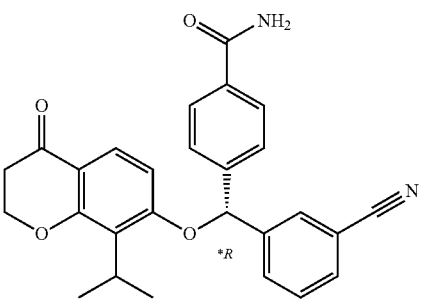 [SMILES: CC(C)c1c(O[C@H](c2ccc(C(N)=O)cc2)c2cccc(C#N)c2)ccc2c1OCCC2=O]

MS (ESI): mass calcd. for $C_{27}H_{24}N_2O_4$ 440.17 m/z found 441.2 [M+H]$^+$. $^1$H NMR (400 MHz, DMSO-d$_6$) δ 7.96 (s, 1H), 7.93 (br s, 1H), 7.88-7.82 (m, 3H), 7.78 (d, J=7.6 Hz, 1H), 7.63 (d, J=7.6 Hz, 1H), 7.59 (d, J=8.6 Hz, 2H), 7.52 (d, J=9.0 Hz, 1H), 7.36 (br s, 1H), 6.84 (s, 1H), 6.69 (d, J=9.0 Hz, 1H), 4.50 (t, J=6.2 Hz, 2H), 3.76-3.66 (m, 1H), 2.68 (t, J=6.2 Hz, 2H), 1.31 (d, J=7.1 Hz, 6H).

Example 107b (*S)-4-((3-cyanophenyl)((8-isopropyl-4-oxochroman-7-yl)oxy)methyl)benzamide

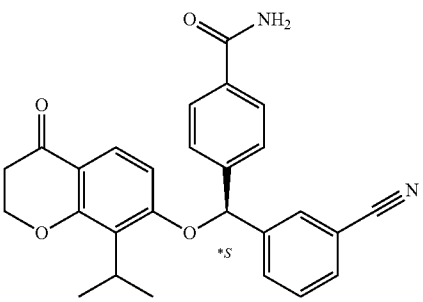 [SMILES: CC(C)c1c(O[C@@H](c2ccc(C(N)=O)cc2)c2cccc(C#N)c2)ccc2c1OCCC2=O]

MS (ESI): mass calcd. for $C_{27}H_{24}N_2O_4$ 440.17 m/z found 441.2 [M+H]$^+$. $^1$H NMR (400 MHz, DMSO-d$_6$) δ 7.97 (s, 1H), 7.93 (br s, 1H), 7.89-7.82 (m, 3H), 7.78 (d, J=7.6 Hz, 1H), 7.63 (d, J=8.0 Hz, 1H), 7.59 (d, J=8.1 Hz, 2H), 7.52 (d, J=8.8 Hz, 1H), 7.36 (br s, 1H), 6.84 (s, 1H), 6.69 (d, J=9.0 Hz, 1H), 4.50 (t, J=6.4 Hz, 2H), 3.77-3.65 (m, 1H), 2.68 (t, J=6.4 Hz, 2H), 1.32 (d, J=7.1 Hz, 6H).

Example 108: (R,S)-4-((4-Carbamoylphenyl)((8-isopropyl-4-oxochroman-7-yl)oxy)methyl)benzoic acid

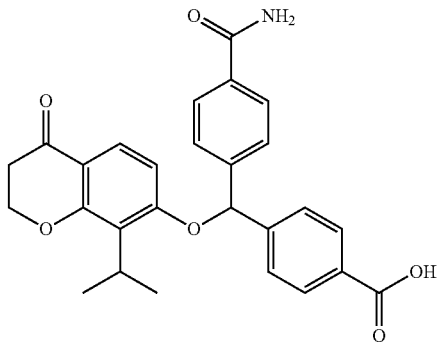 [SMILES: CC(C)c1c(OC(c2ccc(C(N)=O)cc2)c2ccc(C(=O)O)cc2)ccc2c1OCCC2=O]

H$_2$O$_2$ (1.2 g, 30% purity, 11 mmol) was added dropwise to a suspension of 4-((4-cyanophenyl)((8-isopropyl-4-oxochroman-7-yl)oxy)methyl)benzoic acid (Intermediate 96, 600 mg), K$_2$CO$_3$ (1.5 g, 11 mmol), and DMSO (20 mL). The reaction mixture was stirred at room temperature for 2 hours before pouring it into water (30 mL) and diluting with ethyl acetate (30 mL). After stirring for 10 min, the organic layer was separated, dried over anhydrous Na$_2$SO$_4$, filtered, and concentrated to dryness under reduced pressure to give the product, which was purified by preparative HPLC using a Xtimate C18 150×25 mm×5 μm column (eluent: 31% to 51% (v/v) CH$_3$CN and H$_2$O with 0.225% HCOOH) to afford the title compound (200 mg) as a pale yellow solid. MS (ESI): mass calcd. for C$_{27}$H$_{23}$NO$_5$ 459.17 m/z found 460.2 [M+H]$^+$.

A sample of (R,S)-4-((4-carbamoylphenyl)((8-isopropyl-4-oxochroman-7-yl)oxy)methyl)benzoic acid (200 mg, 0.435 mmol) was separated by SFC (Daicel ChiralpakAD 250 mm×30 mm, 10 μm, EtOH (containing 0.1% of 25% aqueous NH$_3$): supercritical CO$_2$, 40%:60% (v/v)) to yield example 108a (first enantiomer to elute, labelled *R) and example 108b (second enantiomer to elute, labelled *S).

Example 108a (*R)-4-((4-carbamoylphenyl)((8-isopropyl-4-oxochroman-7-yl)oxy)methyl)benzoic acid

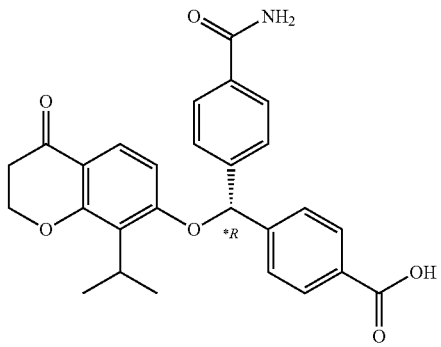 [SMILES: CC(C)c1c(O[C@H](c2ccc(C(N)=O)cc2)c2ccc(C(=O)O)cc2)ccc2c1OCCC2=O]

MS (ESI): RT=3.18 min, mass calcd. for C$_{27}$H$_{23}$NO$_5$ 459.17 m/z found 460.2 [M+H]$^+$. $^1$H NMR (400 MHz, DMSO-d$_6$) δ 12.98 (br. s, 1H), 7.95 (d, J=8.3 Hz, 3H), 7.85 (d, J=8.6 Hz, 2H), 7.62 (d, J=8.3 Hz, 2H), 7.57 (d, J=8.3 Hz, 2H), 7.51 (d, J=8.8 Hz, 1H), 7.37 (s, 1H), 6.85 (s, 1H), 6.69 (d, J=9.0 Hz, 1H), 4.50 (t, J=6.4 Hz, 2H), 3.76-3.66 (m, 1H), 2.68 (t, J=6.2 Hz, 2H), 1.32 (d, J=7.1 Hz, 6H).

Example 108b (*S)-4-((4-carbamoylphenyl)((8-isopropyl-4-oxochroman-7-yl)oxy)methyl)benzoic acid

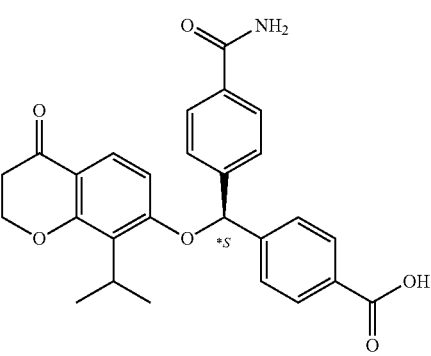 [SMILES: CC(C)c1c(O[C@@H](c2ccc(C(N)=O)cc2)c2ccc(C(=O)O)cc2)ccc2c1OCCC2=O]

MS (ESI): mass calcd. for C$_{27}$H$_{23}$NO$_5$ 459.17 m/z found 460.2 [M+H]$^+$. $^1$H NMR (400 MHz, DMSO-d$_6$) δ 13.01 (br s, 1H), 7.95 (d, J=8.3 Hz, 3H), 7.86 (d, J=8.3 Hz, 2H), 7.62 (d, J=8.3 Hz, 2H), 7.57 (d, J=8.3 Hz, 2H), 7.51 (d, J=8.8 Hz, 1H), 7.37 (s, 1H), 6.85 (s, 1H), 6.69 (d, J=9.0 Hz, 1H), 4.50 (t, J=6.2 Hz, 2H), 3.76-3.65 (m, 1H), 2.68 (t, J=6.4 Hz, 2H), 1.32 (d, J=7.1 Hz, 6H).

Example 109: (R,S)-4-((2,6-Dimethylpyridin-4-yl)((6-fluoro-4-oxochroman-7-yl)oxy)methyl)benzamide

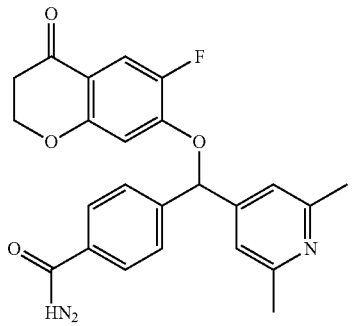

H$_2$O$_2$ (0.6 mL, 30% purity, 6 mmol) was added dropwise to a solution of 4-((2,6-dimethylpyridin-4-yl)((6-fluoro-4-oxochroman-7-yl)oxy)methyl)benzonitrile (Intermediate 97, 600 mg), K$_2$CO$_3$ (618 mg, 4.47 mmol), and DMSO (5 mL). The mixture was stirred at room temperature for 0.5 hours before pouring it into saturated Na$_2$SO$_3$ (80 mL) and extracting with ethyl acetate (50 mL×3). The combined organic extracts were dried over anhydrous Na$_2$SO$_4$, filtered, and concentrated to dryness under reduced pressure to afford the product, which was purified by FCC (eluent:petroleum ether:ethyl acetate, 1:0 to 0:1, gradient elution) to afford the title compound (245 mg, 38%) as a yellow oil. MS (ESI): mass calcd. for C$_{24}$H$_{21}$FN$_2$O$_4$ 420.15 m/z found 421.2 [M+H]$^+$.

A sample of (R,S)-4-((2,6-dimethylpyridin-4-yl)((6-fluoro-4-oxochroman-7-yl)oxy)methyl)benzamide (245 mg, 0.583 mmol) was separated by SFC (DAICEL CHIRALPAK AD-H 250 mm×30 mm, 5 μm, MeOH (containing 0.1% of 25% aqueous $NH_3$): supercritical $CO_2$, 40%:60% (v/v)) to yield example 109a (first enantiomer to elute, labelled *R) and example 109b (second enantiomer to elute, labelled *S).

Example 109a (*R)-4-((2,6-dimethylpyridin-4-yl) ((6-fluoro-4-oxochroman-7-yl)oxy)methyl)benzamide

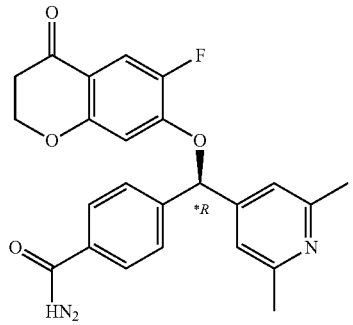

MS (ESI): mass calcd. for $C_{24}H_{21}FN_2O_4$ 420.15 m/z found 421.2 $[M+H]^+$. $^1H$ NMR (400 MHz, DMSO-$d_6$) δ 7.96 (s, 1H), 7.86 (d, J=8.3 Hz, 2H), 7.58 (d, J=8.3 Hz, 2H), 7.49 (d, J=10.8 Hz, 1H), 7.39 (s, 1H), 7.15 (s, 2H), 6.79-6.73 (m, 2H), 4.46 (t, J=6.4 Hz, 2H), 2.69 (t, J=6.4 Hz, 2H), 2.40 (s, 6H).

Example 109b (*S)-4-((2,6-dimethylpyridin-4-yl) ((6-fluoro-4-oxochroman-7-yl)oxy)methyl)benzamide

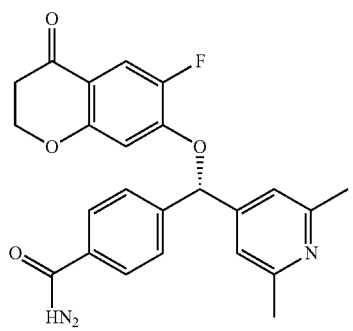

MS (ESI): mass calcd. for $C_{24}H_{21}FN_2O_4$ 420.15 m/z found 421.2 $[M+H]^+$. $^1H$ NMR (400 MHz, DMSO-$d_6$) δ 7.96 (s, 1H), 7.86 (d, J=8.3 Hz, 2H), 7.58 (d, J=8.3 Hz, 2H), 7.49 (d, J=11.0 Hz, 1H), 7.40 (s, 1H), 7.15 (s, 2H), 6.80-6.74 (m, 2H), 4.46 (t, J=6.4 Hz, 2H), 2.69 (t, J=6.5 Hz, 2H), 2.41 (s, 6H).

Example 110: (R,S)-4-(((8-Cyano-4-oxochroman-7-yl)oxy)(2,6-dimethylpyridin-4-yl)methyl)benzamide

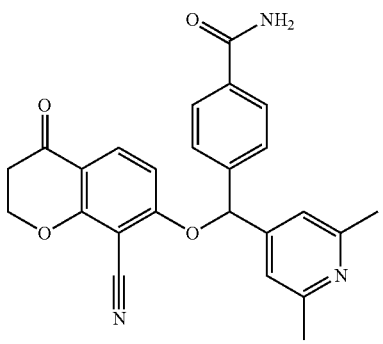 [SMILES: Cc1cc(C(Oc2ccc3c(c2C#N)OCCC3=O)c2ccc(C(N)=O)cc2)cc(C)n1]

$Zn(CN)_2$ (987 mg, 8.40 mmol) was added to a 100 mL round-bottomed flask containing a mixture of 4-((2,6-dimethylpyridin-4-yl)((8-iodo-4-oxochroman-7-yl)oxy)methyl)benzamide (Intermediate 98, 2.0 g, 3.8 mmol), Zn dust (149 mg, 2.28 mmol), and DMF (20 mL). The mixture was sparged with $N_2$ for 5 minutes and then treated with $Pd_2(dba)_3$ (693 mg, 0.757 mmol) and XPhos (722 mg, 1.52 mmol). The mixture was sparged with $N_2$ for another 5 minutes and then stirred while heating at 100° C. for 1 hour before cooling to room temperature before pouring it into $H_2O$ (60 mL) and extracting with ethyl acetate (40 mL×3). The combined organic extracts were dried over anhydrous $Na_2SO_4$, filtered, and concentrated to dryness under reduced pressure to give the product, which was purified by preparative HPLC using a Phenomenex Gemini 150 mm×25 mm×10 μm column (eluent: 30% to 60% (v/v) $CH_3CN$ and $H_2O$ with 0.04% $NH_3$+10 mM $NH_4HCO_3$) to afford the title compound (360 mg, 21%) as a brown oil. MS (ESI): mass calcd. for $C_{25}H_{21}N_3O_4$ 427.15 m/z found 428.2 $[M+H]^+$.

A sample of (R,S)-4-(((8-cyano-4-oxochroman-7-yl)oxy)(2,6-dimethylpyridin-4-yl)methyl)benzamide (360 mg, 0.842 mmol) was separated by SFC (DAICEL CHIRALCEL OD-H 250 mm×30 mm, 5 μm, MeOH (containing 0.1% of 25% aqueous $NH_3$): supercritical $CO_2$, 45%:55% (v/v)) to yield example 110a (first enantiomer to elute, labelled *R) and example 110b (second enantiomer to elute, labelled *S).

Example 110a (*R)-4-(((8-cyano-4-oxochroman-7-yl)oxy)(2,6-dimethylpyridin-4-yl)methyl)benzamide

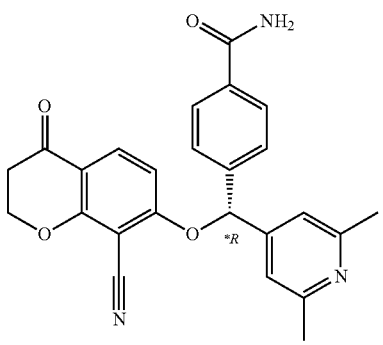 [SMILES: Cc1cc([C@H](Oc2ccc3c(c2C#N)OCCC3=O)c2ccc(C(N)=O)cc2)cc(C)n1]

MS (ESI): mass calcd. for $C_{25}H_{21}N_3O_4$ 427.15 m/z found 428.0 $[M+H]^+$. $^1H$ NMR (400 MHz, DMSO-$d_6$) δ 7.96 (s, 1H), 7.92 (d, J=9.0 Hz, 1H), 7.87 (d, J=8.3 Hz, 2H), 7.60 (d, J=8.3 Hz, 2H), 7.41 (s, 1H), 7.18 (s, 2H), 6.92 (s, 1H), 6.88 (d, J=9.0 Hz, 1H), 4.72 (t, J=6.4 Hz, 2H), 2.81 (t, J=6.4 Hz, 2H), 2.40 (s, 6H).

Example 110b (*S)-4-(((8-cyano-4-oxochroman-7-yl)oxy)(2,6-dimethylpyridin-4-yl)methyl)benzamide

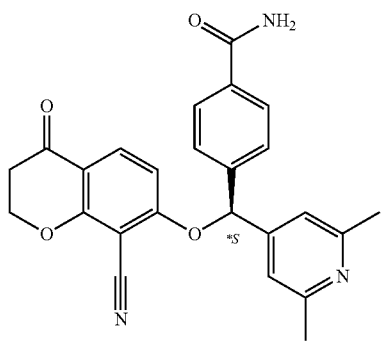 [SMILES: Cc1cc([C@@H](Oc2ccc3c(c2C#N)OCCC3=O)c2ccc(C(N)=O)cc2)cc(C)n1]

MS (ESI): mass calcd. for $C_{25}H_{21}N_3O_4$ 427.15 m/z found 428.2 [M+H]$^+$. $^1$H NMR (400 MHz, DMSO-d$_6$) δ 7.96 (s, 1H), 7.91 (d, J=9.0 Hz, 1H), 7.87 (d, J=8.0 Hz, 2H), 7.60 (d, J=8.3 Hz, 2H), 7.40 (s, 1H), 7.17 (s, 2H), 6.91 (s, 1H), 6.88 (d, J=9.0 Hz, 1H), 4.71 (t, J=6.3 Hz, 2H), 2.81 (t, J=6.1 Hz, 2H), 2.40 (s, 6H).

Example 111: (R,S)-4-((2,6-Dimethylpyridin-4-yl)((8-methyl-4-oxochroman-7-yl)oxy)methyl)benzamide

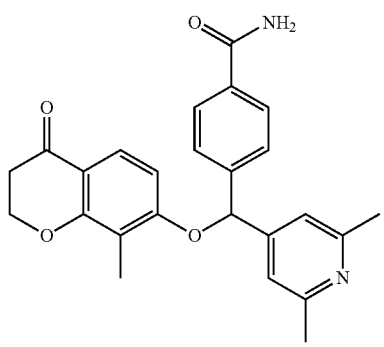 [SMILES: Cc1cc(C(Oc2ccc3c(c2C)OCCC3=O)c2ccc(C(N)=O)cc2)cc(C)n1]

H$_2$O$_2$ (0.6 mL, 30% purity, 6 mmol) was added dropwise to a solution of 4-((2,6-dimethylpyridin-4-yl)((8-methyl-4-oxochroman-7-yl)oxy)methyl)benzonitrile (Intermediate 99, 550 mg), K$_2$CO$_3$ (572 mg, 4.14 mmol), and DMSO (5 mL). The mixture was stirred at room temperature for 1 hour before pouring it into saturated Na$_2$SO$_3$ (80 mL) and extracting with ethyl acetate (50 mL×3). The combined organic extracts were dried over anhydrous Na$_2$SO$_4$, filtered, and concentrated to dryness under reduced pressure to give the product, which was purified by FCC (eluent:petroleum ether:ethyl acetate, 1:0 to 0:1, gradient elution) to afford the title compound (200 mg) as a yellow oil. MS (ESI): mass calcd. for $C_{25}H_{24}N_2O_4$ 416.17 m/z found 417.1 [M+H]$^+$.

A sample of (R,S)-4-((2,6-dimethylpyridin-4-yl)((8-methyl-4-oxochroman-7-yl)oxy)methyl)benzamide (200 mg, 0.480 mmol) was separated by SFC (DAICEL CHI-RALCEL OJ-H 250 mm×30 mm, 5 μm, EtOH (containing 0.1% of 25% aqueous NH$_3$): supercritical CO$_2$, 40%:60% (v/v)) to yield example 111a (first enantiomer to elute, labelled *R) and example 111b (second enantiomer to elute, labelled *S).

Example 111a (*R)-4-((2,6-dimethylpyridin-4-yl)((8-methyl-4-oxochroman-7-yl)oxy)methyl)benzamide

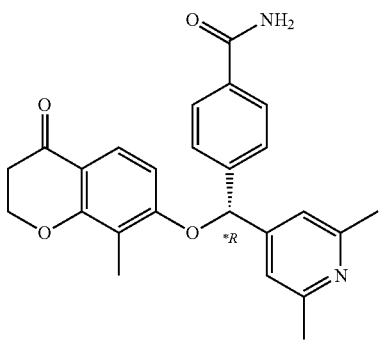 [SMILES: Cc1cc([C@H](Oc2ccc3c(c2C)OCCC3=O)c2ccc(C(N)=O)cc2)cc(C)n1]

MS (ESI): mass calcd. for $C_{25}H_{24}N_2O_4$ 416.17 m/z found 417.2 [M+H]$^+$. $^1$H NMR (400 MHz, DMSO-d$_6$) δ 7.93 (br s, 1H), 7.83 (d, J=8.3 Hz, 2H), 7.60 (d, J=8.1 Hz, 2H), 7.52 (d, J=8.8 Hz, 1H), 7.36 (br s, 1H), 7.19 (s, 2H), 6.72-6.66 (m, 2H), 4.53 (t, J=6.4 Hz, 2H), 2.69 (t, J=6.2 Hz, 2H), 2.39 (s, 6H), 2.22 (s, 3H).

Example 111b (*S)-4-((2,6-dimethylpyridin-4-yl)((8-methyl-4-oxochroman-7-yl)oxy)methyl)benzamide

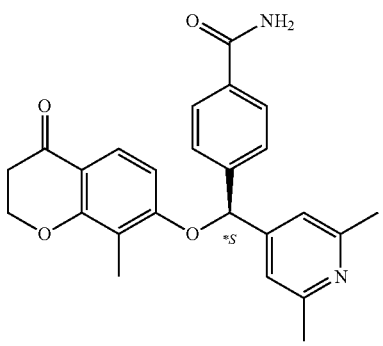 [SMILES: Cc1cc([C@@H](Oc2ccc3c(c2C)OCCC3=O)c2ccc(C(N)=O)cc2)cc(C)n1]

MS (ESI): mass calcd. for $C_{25}H_{24}N_2O_4$ 416.17 m/z found 417.2 [M+H]$^+$. $^1$H NMR (400 MHz, DMSO-d$_6$) δ 7.92 (br s, 1H), 7.83 (d, J=8.1 Hz, 2H), 7.60 (d, J=8.3 Hz, 2H), 7.51 (d, J=8.8 Hz, 1H), 7.36 (br s, 1H), 7.19 (s, 2H), 6.71-6.67 (m, 2H), 4.52 (t, J=6.4 Hz, 2H), 2.69 (t, J=6.4 Hz, 2H), 2.39 (s, 6H), 2.22 (s, 3H).

Example 112: (R,S)-4-((2,6-Dimethylpyridin-4-yl)((2,2,8-trimethyl-4-oxochroman-7-yl)oxy)methyl)benzamide

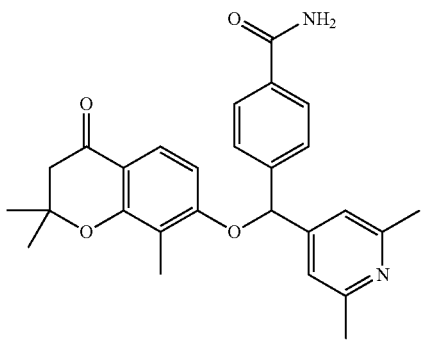

H$_2$O$_2$ (0.56 mL, 30% purity, 5.6 mmol) was added dropwise to a suspension of 4-((2,6-dimethylpyridin-4-yl)((2,2,8-trimethyl-4-oxochroman-7-yl)oxy)methyl)benzonitrile (Intermediate 100, 1 g, 1.1 mmol), K$_2$CO$_3$ (770 mg, 5.6 mmol), and DMSO (10 mL). The mixture was stirred at room temperature for 1 hour before pouring it into saturated aqueous Na$_2$SO$_3$ (20 mL) and extracting with ethyl acetate (20 mL×3). The combined organic extracts were dried over anhydrous Na$_2$SO$_4$, filtered, and concentrated to dryness under reduced pressure to give the product, which was purified by prep-HPLC using a Phenomenex Gemini, 150× 25 mm×10 μm column (eluent: 35% to 65% (v/v) CH$_3$CN and H$_2$O with 0.05% NH$_3$) to afford the title compound (200 mg, 40%) as a light yellow solid. MS (ESI): mass calcd. for C$_{27}$H$_{28}$N$_2$O$_4$ 444.20 m/z found 445.3 [M+H]$^+$.

A sample of (R,S)-4-((2,6-dimethylpyridin-4-yl)((2,2,8-trimethyl-4-oxochroman-7-yl)oxy)methyl)benzamide (200 mg, 0.450 mmol) was separated by SFC (DAICEL CHIRALCEL OD 250 mm×30 mm, 10 μm, EtOH (containing 0.1% of 25% aqueous NH$_3$): supercritical CO$_2$, 45%:55% (v/v)) to yield example 112a (first enantiomer to elute, labelled *R) and example 112b (second enantiomer to elute, labelled *S).

Example 112a (*R)-4-((2,6-dimethylpyridin-4-yl)((2,2,8-trimethyl-4-oxochroman-7-yl)oxy)methyl)benzamide

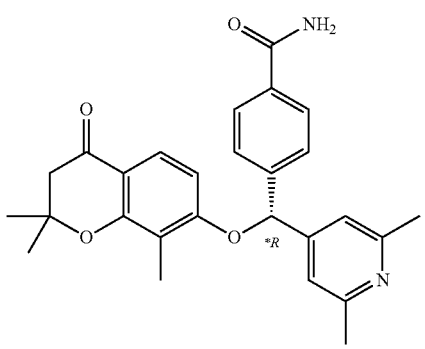

MS (ESI): mass calcd. for C$_{27}$H$_{28}$N$_2$O$_4$ 444.20 m/z found 445.3 [M+H]$^+$. $^1$H NMR (400 MHz, DMSO-d$_6$) δ 7.93 (s, 1H), 7.83 (d, J=8.3 Hz, 2H), 7.60 (d, J=8.3 Hz, 2H), 7.48 (d, J=8.8 Hz, 1H), 7.37 (s, 1H), 7.18 (s, 2H), 6.68 (s, 1H), 6.64 (d, J=9.0 Hz, 1H), 2.69 (s, 2H), 2.39 (s, 6H), 2.20 (s, 3H), 1.39 (s, 3H), 1.37 (s, 3H).

Example 112b (*S)-4-((2,6-dimethylpyridin-4-yl)((2,2,8-trimethyl-4-oxochroman-7-yl)oxy)methyl)benzamide

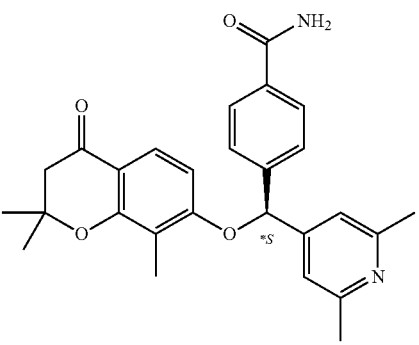

MS (ESI): mass calcd. for C$_{27}$H$_{28}$N$_2$O$_4$ 444.20 m/z found 445.2 [M+H]$^+$. $^1$H NMR (400 MHz, DMSO-d$_6$) δ 7.93 (s, 1H), 7.83 (d, J=8.3 Hz, 2H), 7.60 (d, J=8.3 Hz, 2H), 7.48 (d, J=8.8 Hz, 1H), 7.37 (s, 1H), 7.20 (s, 2H), 6.68 (s, 1H), 6.64 (d, J=9.0 Hz, 1H), 2.69 (s, 2H), 2.40 (s, 6H), 2.20 (s, 3H), 1.39 (s, 3H), 1.37 (s, 3H).

Example 113: (R,S)-4-(pyridin-4-yl((2,2,8-trimethyl-4-oxochroman-7-yl)oxy)methyl)benzamide

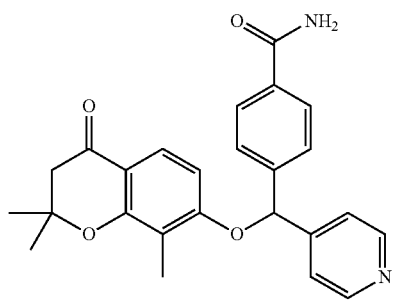 [SMILES: Cc1c(OC(c2ccncc2)c2ccc(C(N)=O)cc2)ccc2c1OC(C)(C)CC2=O]

To a mixture of 4-(pyridin-4-yl((2,2,8-trimethyl-4-oxochroman-7-yl)oxy)methyl)benzonitrile (Intermediate 101, 180 mg, 0.452 mmol) and K$_2$CO$_3$ (156.1 mg, 1.13 mmol) in DMSO (2 mL) was added H$_2$O$_2$ (130.2 μL, 1.36 mmol, 30% purity). The reaction mixture was stirred at 10° C. for 2 hrs. The reaction mixture was poured into saturated aqueous Na$_2$SO$_3$ (3 mL), water was added (10 mL) and the mixture was extracted with EtOAc (10 mL×3). The combined organic layers were washed with brine (10 mL), dried over anhydrous Na$_2$SO$_4$, filtered and concentrated under reduced pressure to give a residue. The residue was purified by prep-HPLC to give the title compound (41.0 mg, 22%). MS (ESI): mass calcd. for C$_{25}$H$_{24}$N$_2$O$_4$ 416.17 m/z found 417.0 [M+H]$^+$. $^1$H NMR (400 MHz, CD3D) δ 8.55 (d, J=4.8 Hz, 2H), 7.88 (d, J=6.3 Hz, 2H), 7.61-7.66 (m, 4H), 7.56 (d, J=6.9 Hz, 2H), 6.70 (s, 1H), 6.63 (d, J=6.6 Hz, 1H), 2.69 (s, 2H), 2.27 (s, 3H), 1.45 (s, 6H).

Example 114: (R,S)-7-(Phenyl(pyridin-4-yl)methoxy)chroman-4-one

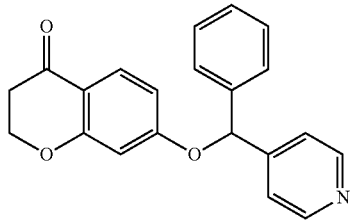 [SMILES: O=C1CCOc2cc(OC(c3ccccc3)c3ccncc3)ccc21]

(R,S)-7-(Phenyl(pyridin-4-yl)methoxy)chroman-4-one was obtained from the corporate compound collection of Janssen Pharmaceutical Research and Development, LLC.

A sample of (R,S)-7-(phenyl(pyridin-4-yl)methoxy)chroman-4-one (78.7 mg, 0.237 mmol) was separated by chiral SFC (Chiralpak AS-H, 80% $CO_2$-20% MeOH) to yield example 114a (first enantiomer to elute, labelled *R) and example 114b (second enantiomer to elute, labelled *S).

Example 114a (*R)-7-(phenyl(pyridin-4-yl)methoxy)chroman-4-one

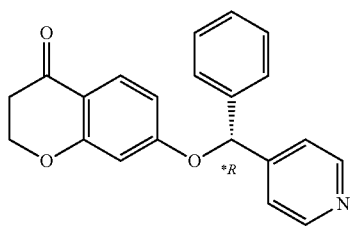 [SMILES: O=C1CCOc2cc(O[C@H](c3ccccc3)c3ccncc3)ccc21]

MS (ESI): mass calcd. for $C_{21}H_{17}NO_3$ 331.12 m/z found 332.1 [M+H]$^+$. $^1$H NMR (400 MHz, CHLOROFORM-d) δ 8.60 (d, J=6.1 Hz, 2H), 7.82 (d, J=8.6 Hz, 1H), 7.30-7.41 (m, 7H), 6.67 (dd, J=8.6, 2.5 Hz, 1H), 6.42 (d, J=2.0 Hz, 1H), 6.20 (s, 1H), 4.47 (t, J=6.6 Hz, 2H), 2.73 (t, J=6.6 Hz, 2H).

Example 114b (*S)-7-(phenyl(pyridin-4-yl)methoxy)chroman-4-one

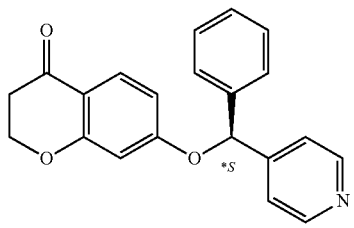 [SMILES: O=C1CCOc2cc(O[C@@H](c3ccccc3)c3ccncc3)ccc21]

MS (ESI): mass calcd. for $C_{21}H_{17}NO_3$ 331.12 m/z found 332.1 [M+H]$^+$. $^1$H NMR (400 MHz, CHLOROFORM-d) δ 8.60 (d, J=6.1 Hz, 2H), 7.82 (d, J=8.6 Hz, 1H), 7.30-7.41 (m, 7H), 6.67 (dd, J=8.6, 2.5 Hz, 1H), 6.42 (d, J=2.0 Hz, 1H), 6.20 (s, 1H), 4.47 (t, J=6.6 Hz, 2H), 2.73 (t, J=6.6 Hz, 2H).

Example 115: (R,S)-7-(Phenyl(pyridin-3-yl)methoxy)chroman-4-one

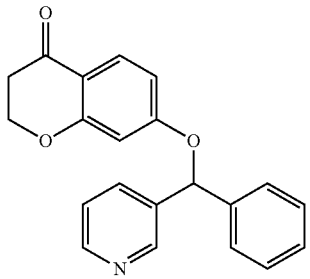 [SMILES: O=C1CCOc2cc(OC(c3ccccc3)c3cccnc3)ccc21]

(R,S)-7-(Phenyl(pyridin-3-yl)methoxy)chroman-4-one was obtained from the corporate compound collection of Janssen Pharmaceutical Research and Development, LLC.

Example 117: 7-((2,6-Dimethylpyridin-4-yl)methoxy)-8-isopropylchroman-4-one

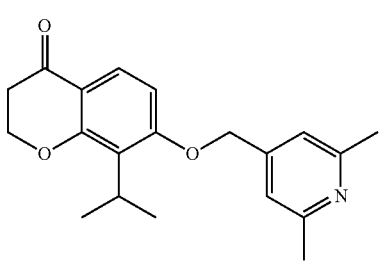 [SMILES: Cc1cc(COc2ccc3c(c2C(C)C)OCCC3=O)cc(C)n1]

DIAD (296 mg, 1.46 mmol) was added to a solution of (2,6-dimethylpyridin-4-yl)methanol (135 mg, 0.984 mmol), 7-hydroxy-8-isopropylchroman-4-one (Intermediate 66, Step C, 200 mg, 0.970 mmol), PPh$_3$ (377 mg, 1.44 mmol) and anhydrous dichloromethane (3 mL).

The mixture was stirred at room temperature for 2 hours and was concentrated to dryness under reduced pressure to afford the product which was purified by preparative HPLC with a Xtimate C18 150×25 mm×5 μm column (eluent: water (0.04%$_0$NH$_3$·H$_2$O+10 mM NH$_4$HCO$_3$)-MeCN) from 40% to 70%) to afford the title compound (91.1 mg, 29%) as white solid. MS (ESI): mass calcd. for $C_{21}H_{17}NO_3$ 325.17 m/z found 326.2 [M+H]$^+$. $^1$H NMR (400 MHz, DMSO-d$_6$) δ 7.62 (d, J=8.8 Hz, 1H), 7.06 (s, 2H), 6.76 (d, J=8.8 Hz, 1H), 5.19 (s, 2H), 4.51 (t, J=6.2 Hz, 2H), 3.66-3.51 (m, 1H), 2.70 (t, J=6.2 Hz, 2H), 2.42 (s, 6H), 1.28 (s, 3H), 1.27 (s, 3H).

Example 118: (R,S)-2-Ethyl-7-((2-methylpyridin-4-yl)methoxy)chroman-4-one

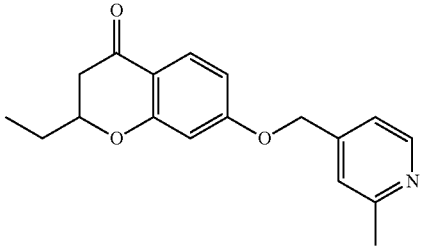 [SMILES: CCC1CC(=O)c2ccc(OCc3ccnc(C)c3)cc2O1]

ADDP (632 mg, 3.13 mmol) was added to a 100 mL three-necked round-bottomed flask containing a solution of 2-ethyl-7-hydroxychroman-4-one (Intermediate 37, 400 mg, 2.08 mmol), (2-methylpyridin-4-yl)methanol (257 mg, 2.09 mmol), n-Bu$_3$P (820 mg, 3.13 mmol), and toluene (10 mL) under a N$_2$ atmosphere. The mixture was stirred at 75° C. for 3 hours before cooling to the room temperature, pouring it into water (20 mL), and extracting with ethyl acetate (20 mL×3). The combined organic extracts were washed with brine (50 mL), dried over anhydrous Na$_2$SO$_4$, filtered, and concentrated to dryness under reduced pressure to give the product, which was purified by FCC (eluent:petroleum ether:ethyl acetate, 1:0 to 3:7, gradient elution) to afford the title compound (438 mg, 71%) as a white solid. MS (ESI): mass calcd. for $C_{18}H_{19}NO_3$ 297.14 m/z found 298.0 [M+H]$^+$.

A sample of (R,S)-2-ethyl-7-((2-methylpyridin-4-yl)methoxy)chroman-4-one (430 mg, 1.41 mmol) was separated by SFC (Chiralpak AD 250 mm×30 mm, 10 µm, 40% to 40% (v/v) supercritical CO$_2$ in EtOH and H$_2$O with 0.1% NH$_3$) to yield example 118a (first enantiomer to elute, labelled *R) and example 118b (second enantiomer to elute, labelled *S).

Example 118a (*R)-2-ethyl-7-((2-methylpyridin-4-yl)methoxy)chroman-4-one

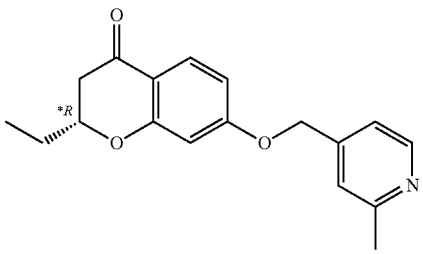 [SMILES: CC[C@@H]1CC(=O)c2ccc(OCc3ccnc(C)c3)cc2O1]

MS (ESI): mass calcd. for $C_{18}H_{19}NO_3$ 297.14 m/z found 298.0 [M+H]$^+$. $^1$H NMR (400 MHz, DMSO-d$_6$) δ 8.41 (d, J=4.8 Hz, 1H), 7.65 (d, J=8.8 Hz, 1H), 7.25 (s, 1H), 7.17 (d, J=5.2 Hz, 1H), 6.68 (dd, J=2.4, 8.8 Hz, 1H), 6.59 (d, J=2.4 Hz, 1H), 5.18 (s, 2H), 4.43-4.36 (m, 1H), 2.68-2.51 (m, 2H), 2.44 (s, 3H), 1.78-1.64 (m, 2H), 0.96 (t, J=7.6 Hz, 3H).

Example 118b (*S)-2-ethyl-7-((2-methylpyridin-4-yl)methoxy)chroman-4-one

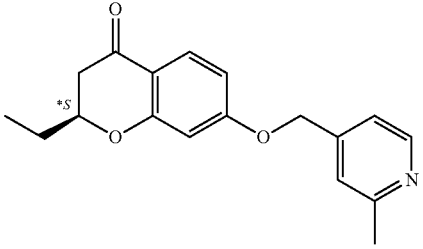 [SMILES: CC[C@H]1CC(=O)c2ccc(OCc3ccnc(C)c3)cc2O1]

MS (ESI): mass calcd. For $C_{18}H_{19}NO_3$ 297.14 m/z found 298.0 [M+H]$^+$. $^1$H NMR (400 MHz, DMSO-d$_6$) δ 8.41 (d, J=4.8 Hz, 1H), 7.65 (d, J=8.8 Hz, 1H), 7.25 (s, 1H), 7.17 (d, J=5.2 Hz, 1H), 6.68 (dd, J=2.0, 8.8 Hz, 1H), 6.59 (d, J=2.4 Hz, 1H), 5.19 (s, 2H), 4.44-4.36 (m, 1H), 2.68-2.52 (m, 2H), 2.44 (s, 3H), 1.78-1.64 (m, 2H), 0.96 (t, J=7.4 Hz, 3H).

Example 119: (R,S)-2-Ethyl-7-((3-methoxypyridin-4-yl)methoxy)chroman-4-one

ADDP (327 mg, 1.62 mmol) was added to a 100 mL three-necked round-bottomed flask containing a solution of 2-ethyl-7-hydroxychroman-4-one (Intermediate 37, 208 mg, 1.08 mmol), (3-methoxypyridin-4-yl)methanol (150 mg, 1.08 mmol), n-Bu$_3$P (425 mg, 1.62 mmol), and toluene (5 mL) under N$_2$ atmosphere. The mixture was stirred at 85° C. for 3 hours before cooling to room temperature, pouring it into water (20 mL), and extracting with ethyl acetate (20 mL×3). The combined organic extracts were washed with brine (20 mL), dried over anhydrous Na$_2$SO$_4$, filtered, and concentrated to dryness under reduced pressure to give the product, which was purified by FCC (eluent:petroleum ether:ethyl acetate, 1:0 to 3:7, gradient elution) to afford the title compound (300 mg, 87%) as a white solid. MS (ESI): mass calcd. for $C_{18}H_{19}NO_4$ 313.13 m/z found 314.0 [M+H]$^+$.

A sample of (R,S)-2-ethyl-7-((3-methoxypyridin-4-yl)methoxy)chroman-4-one (300 mg, 0.946 mmol) was separated by SFC (Chiralpak AD 250 mm×30 mm, 5 µm, 45% (v/v) supercritical CO$_2$ in EtOH and H$_2$O with 0.1% NH$_3$) to yield example 119a (first enantiomer to elute, labelled *R) and example 119b (second enantiomer to elute, labelled *S).

Example 119a (*R)-2-ethyl-7-((3-methoxypyridin-4-yl)methoxy)chroman-4-one

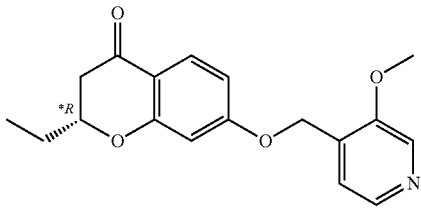 [SMILES: CC[C@@H]1CC(=O)c2ccc(OCc3ccncc3OC)cc2O1]

MS (ESI): mass calcd. for C₁₈H₁₉NO₄ 313.13 m/z found 314.0 [M+H]⁺. ¹H NMR (400 MHz, DMSO-d₆) δ 8.38 (s, 1H), 8.21 (d, J=4.4 Hz, 1H), 7.65 (d, J=8.8 Hz, 1H), 7.34 (d, J=4.8 Hz, 1H), 6.67 (dd, J=2.4, 8.8 Hz, 1H), 6.58 (d, J=2.4 Hz, 1H), 5.15 (s, 2H), 4.43-4.35 (m, 1H), 3.92 (s, 3H), 2.69-2.52 (m, 2H), 1.79-1.62 (m, 2H), 0.96 (t, J=7.2 Hz, 3H).

Example 119b (*S)-2-ethyl-7-((3-methoxypyridin-4-yl)methoxy)chroman-4-one

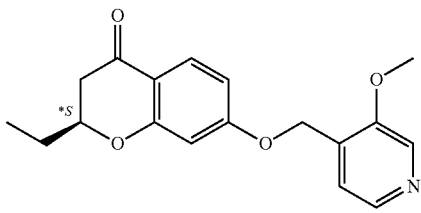 [SMILES: CC[C@H]1CC(=O)c2ccc(OCc3ccncc3OC)cc2O1]

MS (ESI): mass calcd. For C₁₈H₁₉NO₄ 313.13 m/z found 314.0 [M+H]⁺. ¹H NMR (400 MHz, DMSO-d₆) δ 8.38 (s, 1H), 8.21 (d, J=4.8 Hz, 1H), 7.65 (d, J=8.8 Hz, 1H), 7.34 (d, J=4.4 Hz, 1H), 6.67 (dd, J=2.4, 8.8 Hz, 1H), 6.58 (d, J=2.4 Hz, 1H), 5.15 (s, 2H), 4.43-4.36 (m, 1H), 3.92 (s, 3H), 2.68-2.52 (m, 2H), 1.78-1.64 (m, 2H), 0.96 (t, J=7.4 Hz, 3H).

Example 120: (R,S)-3-Ethyl-7-(pyridin-4-ylmethoxy)chroman-4-one

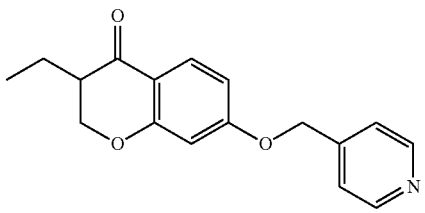 [SMILES: CCC1COc2cc(OCc3ccncc3)ccc2C1=O]

4-(Bromomethyl)pyridine hydrobromide (120 mg, 0.474 mmol) was added to a 100 mL round-bottomed flask containing a mixture of (R,S)-3-ethyl-7-hydroxychroman-4-one (Intermediate 103, 120 mg, 0.392 mmol), Cs₂CO₃ (385 mg, 1.18 mmol), and CH₃CN (8 mL). The mixture was stirred at 75° C. for 2 hours before cooling to room temperature. The suspension was filtered and the cake washed with ethyl acetate (30 mL×2). The filtrate was concentrated to dryness under reduced pressure to afford the product, which was purified by FCC (eluent:petroleum ether:ethyl acetate, 1:0 to 1:1, gradient elution) to give the title compound (74.2 mg, 67%) as a white solid. MS (ESI): mass calcd. for C₁₇H₁₇NO₃ 283.12 m/z found 284.0 [M+H]⁺. ¹H NMR (400 MHz, DMSO-d₆) δ 8.60-8.50 (m, 2H), 7.67 (d, J=8.8 Hz, 1H), 7.42-7.36 (m, 2H), 6.70 (dd, J=2.4, 8.8 Hz, 1H), 6.59 (d, J=2.4 Hz, 1H), 5.23 (s, 2H), 4.51 (dd, J=4.4, 11.6 Hz, 1H), 4.26 (dd, J=8.8, 11.6 Hz, 1H), 2.55-2.50 (m, 1H), 1.76-1.64 (m, 1H), 1.48-1.36 (m, 1H), 0.90 (t, J=7.6 Hz, 3H).

Example 121: (R,S)-1-((8-Methyl-4-oxochroman-7-yl)oxy)-2,3-dihydro-1H-indene-5-carboxamide

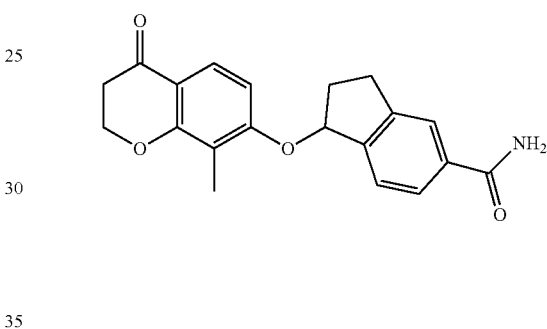

A mixture of 1-((8-methyl-4-oxochroman-7-yl)oxy)-2,3-dihydro-1H-indene-5-carbonitrile (Intermediate 105, 206.5 mg, 0.647 mmol), DMSO (1.2 mL), and K₂CO₃ (268.1 mg, 1.94 mmol) was briefly cooled in an ice water bath, and 30% H₂O₂ (0.324 mL, 3.23 mmol) was added dropwise. The resulting yellow suspension was stirred at room temperature open to air for 3 hr. The reaction mixture was partitioned between EtOAc (40 mL) and water (40 mL). The organic phase was washed with water (40 mL), followed by 1 M saturated aqueous Na₂SO₃ (40 mL). The organic phase was dried (Na₂SO₄), filtered, and concentrated onto SiO₂. The residue was purified by flash column chromatography (SiO₂, gradient 0-100% EtOAc-heptanes) to afford the title compound (54 mg, 25%) as a white solid. MS (ESI): mass calcd. for C₂₀H₁₉NO₄ 337.13 m/z found 360.1 [M+Na]⁺. ¹H NMR (400 MHz, CHLOROFORM-d) δ 7.84 (d, J=8.3 Hz, 1H), 7.79 (s, 1H), 7.68 (td, J=1.0, 7.8 Hz, 1H), 7.47 (d, J=7.8 Hz, 1H), 6.79 (d, J=8.8 Hz, 1H), 5.99-6.18 (br s, 1H), 5.82-5.90 (m, 1H), 5.52-5.70 (br s, 1H), 4.55 (t, J=6.4 Hz, 2H), 3.19 (ddd, J=4.9, 8.8, 16.1 Hz, 1H), 2.94-3.05 (m, 1H), 2.77 (t, J=6.4 Hz, 2H), 2.69 (dddd, J=4.9, 6.9, 8.4, 13.6 Hz, 1H), 2.18-2.29 (m, 1H), 2.03 (s, 3H).

A sample of (R,S)-1-((8-methyl-4-oxochroman-7-yl)oxy)-2,3-dihydro-1H-indene-5-carboxamide (45 mg, 0.133 mmol) was separated by chiral SFC (Chiralpak IG, 50% CO₂-50% MeOH) to yield example 121a (first enantiomer to elute, labelled *R) and example 121b (second enantiomer to elute, labelled *S).

Example 121a (*R)-1-((8-methyl-4-oxochroman-7-yl)oxy)-2,3-dihydro-1H-indene-5-carboxamide

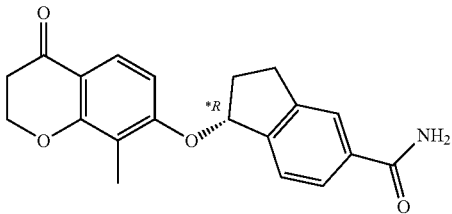 [SMILES: Cc1c(O[C@@H]2CCc3cc(C(N)=O)ccc32)ccc2c1OCCC2=O]

MS (ESI): mass calcd. for $C_{20}H_{19}NO_4$ 337.13 m/z found 360.1 [M+Na]$^+$. $^1$H NMR (400 MHz, MeOD) δ 7.84 (s, 1H), 7.74-7.83 (m, 2H), 7.48 (d, J=7.83 Hz, 1H), 6.99 (d, J=8.80 Hz, 1H), 6.00 (dd, J=4.65, 6.60 Hz, 1H), 4.56 (t, 2H, J=6.36 Hz), 3.14-3.24 (m, 1H), 2.98-3.08 (m, 1H), 2.68-2.80 (m, 3H), 2.15-2.28 (m, 1H).

Example 121b (*S)-1-((8-methyl-4-oxochroman-7-yl)oxy)-2,3-dihydro-1H-indene-5-carboxamide

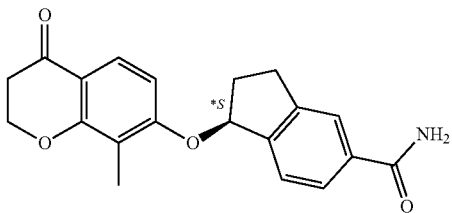 [SMILES: Cc1c(O[C@H]2CCc3cc(C(N)=O)ccc32)ccc2c1OCCC2=O]

MS (ESI): mass calcd. for $C_{20}H_{19}NO_4$ 337.13 m/z found 360.1 [M+Na]$^+$. $^1$H NMR (400 MHz, MeOD) δ 7.84 (s, 1H), 7.74-7.83 (m, 2H), 7.48 (d, J=7.8 Hz, 1H), 6.99 (d, J=9.3 Hz, 1H), 6.00 (dd, J=4.9, 6.4 Hz, 1H), 4.56 (t, 2H, J=6.4 Hz), 3.14-3.24 (m, 1H), 2.98-3.08 (m, 1H), 2.68-2.80 (m, 3H), 2.15-2.24 (m, 1H).

Example 122: (R,S)-5-((8-Methyl-4-oxochroman-7-yl)oxy)-5,6,7,8-tetrahydronaphthalene-2-carbonitrile

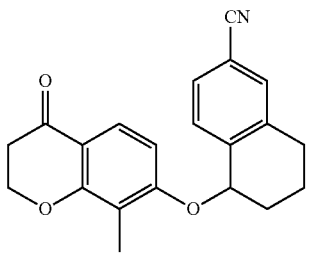 [SMILES: Cc1c(OC2CCCc3cc(C#N)ccc32)ccc2c1OCCC2=O]

7-Hydroxy-8-methylchroman-4-one (Intermediate 40, Step B, 268 mg, 1.51 mmol), 5-hydroxy-5,6,7,8-tetrahydronaphthalene-2-carbonitrile (Intermediate 105, 287 mg, 1.66 mmol), and triphenylphosphine (592 mg, 2.26 mmol) were combined in a round bottom flask. THF (14 mL) was added and a brown solution resulted. The reaction vessel was sealed and evacuated and back-filled with argon twice. The mixture was cooled in an ice water bath. DIAD (0.843 mL, 4.33 mmol) was added dropwise. The resulting brown solution was stirred at room temperature under argon for 24 hr. Additional portions of triphenylphospine (568 mg, 2.17 mmol) and DIAD (422 μL, 2.17 mmol) were added and the mixture was stirred at room temperature for 6 hr. The reaction mixture was partitioned between water (20 mL) and EtOAc (20 mL). The separated aqueous phase was extracted twice with EtOAc (20 mL each). The organic phase was dried (Na$_2$SO$_4$), filtered, and concentrated. The residue was purified by FCC (first column: SiO$_2$, 50-100% DCM-heptanes, gradient elution, second column: 0-100% DCM-heptanes, gradient elution) to afford the title compound (318 mg, 33%) as a foamy white solid. MS (ESI): mass calcd. for $C_{21}H_{19}NO_3$ 333.14 m/z found 334.2 [M+H]$^+$. $^1$H NMR (400 MHz, CHLOROFORM-d) δ 7.83 (d, J=8.8 Hz, 1H), 7.39-7.51 (m, 3H), 6.75 (d, J=8.8 Hz, 1H), 5.47 (t, J=5.4 Hz, 1H), 4.55 (t, J=6.4 Hz, 2H), 2.73-2.99 (m, 4H), 1.95-2.22 (m, 6H), 1.78-1.93 (m, 1H).

A sample of (R,S)-5-((8-methyl-4-oxochroman-7-yl)oxy)-5,6,7,8-tetrahydronaphthalene-2-carbonitrile (62 mg, 0.186 mmol) was separated by chiral SFC (Chiralpak AD-H, 70% CO$_2$-30% MeOH) to yield example 122a (first enantiomer to elute, labelled *R) and example 122b (second enantiomer to elute, labelled *S).

Example 122a (*R)-5-((8-methyl-4-oxochroman-7-yl)oxy)-5,6,7,8-tetrahydronaphthalene-2-carbonitrile

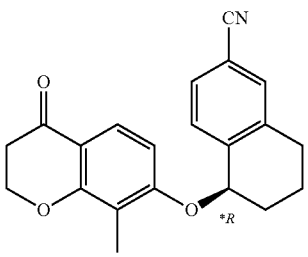 [SMILES: Cc1c(O[C@@H]2CCCc3cc(C#N)ccc32)ccc2c1OCCC2=O]

MS (ESI): mass calcd. for $C_{21}H_{19}NO_3$ 333.14 m/z found 334.2 [M+H]$^+$. $^1$H NMR (400 MHz, CHLOROFORM-d) δ 7.83 (d, J=8.8 Hz, 1H), 7.41-7.51 (m, 3H), 6.75 (d, J=8.8 Hz, 1H), 5.47 (t, J=5.4 Hz, 1H), 4.55 (dd, J=5.9, 6.9 Hz, 2H), 2.88-3.01 (m, 1H), 2.74-2.88 (m, 3H), 1.95-2.20 (m, 6H), 1.81-1.93 (m, 1H).

Example 122b (*S)-5-((8-methyl-4-oxochroman-7-yl)oxy)-5,6,7,8-tetrahydronaphthalene-2-carbonitrile

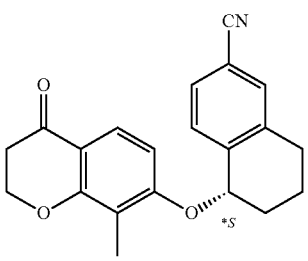 [SMILES: Cc1c(O[C@H]2CCCc3cc(C#N)ccc32)ccc2c1OCCC2=O]

MS (ESI): mass calcd. for $C_{21}H_{19}NO_3$ 333.14 m/z found 334.2 [M+H]$^+$. $^1$H NMR (400 MHz, CHLOROFORM-d) δ 7.83 (d, J=8.8 Hz, 1H), 7.41-7.51 (m, 3H), 6.75 (d, J=8.8 Hz, 1H), 5.47 (t, J=5.4 Hz, 1H), 4.55 (dd, J=5.9, 6.9 Hz, 2H), 2.88-3.01 (m, 1H), 2.74-2.88 (m, 3H), 1.95-2.20 (m, 6H), 1.81-1.93 (m, 1H).

Example 123: (R,S)-5-((8-Methyl-4-oxochroman-7-yl)oxy)-5,6,7,8-tetrahydronaphthalene-2-carboxamide

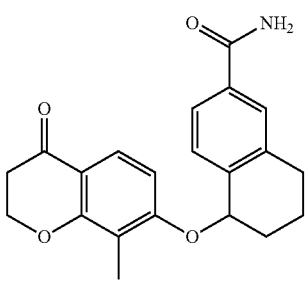 [SMILES: Cc1c(OC2CCCc3cc(C(N)=O)ccc32)ccc2c1OCCC2=O]

To a mixture of (R,S)-5-((8-methyl-4-oxochroman-7-yl)oxy)-5,6,7,8-tetrahydronaphthalene-2-carbonitrile (Example 122, 242 mg, 0.725 mmol), DMSO (1.5 mL), and $K_2CO_3$ (301 mg, 2.18 mmol) was added 30% $H_2O_2$ (0.364 mL, 3.63 mmol) dropwise. The resulting yellow suspension was stirred at room temperature open to air for 4.5 hr. The reaction mixture was partitioned between EtOAc (40 mL) and water (40 mL). The organic phase was washed with water (40 mL), followed by 1 M saturated aqueous $Na_2SO_3$ (40 mL). The organic phase was dried ($Na_2SO_4$), filtered, and concentrated onto $SiO_2$. The residue was purified by FCC ($SiO_2$, 0-100% EtOAc-heptanes, gradient elution) to yield the title compound (209 mg, 82%). MS (ESI): mass calcd. for $C_{21}H_{21}NO_4$ 351.15 m/z found 352.2 [M+H]$^+$. $^1$H NMR (400 MHz, CHLOROFORM-d) δ 7.83 (d, J=8.8 Hz, 1H), 7.67 (s, 1H), 7.58 (dd, J=2.0, 8.3 Hz, 1H), 7.41 (d, J=7.8 Hz, 1H), 6.78 (d, J=8.8 Hz, 1H), 6.07 (br s, 1H), 5.57 (br s, 1H), 5.50 (t, J=5.1 Hz, 1H), 4.55 (t, J=6.4 Hz, 2H), 2.91-3.02 (m, 1H), 2.74-2.89 (m, 3H), 1.98-2.14 (m, 6H), 1.80-1.91 (m, 1H).

A sample of (R,S)-5-((8-methyl-4-oxochroman-7-yl)oxy)-5,6,7,8-tetrahydronaphthalene-2-carboxamide (188 mg, 0.535 mmol) was separated by chiral SFC (Chiralpak AD-H, 70% $CO_2$-30% EtOH) to yield example 123a (first enantiomer to elute, labelled *R) and example 123b (second enantiomer to elute, labelled *S).

Example 123a (*R)-5-((8-methyl-4-oxochroman-7-yl)oxy)-5,6,7,8-tetrahydronaphthalene-2-carboxamide

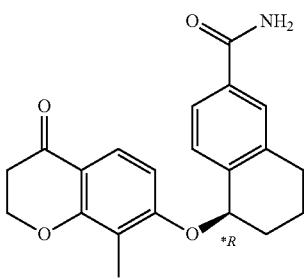 [SMILES: Cc1c(O[C@@H]2CCCc3cc(C(N)=O)ccc32)ccc2c1OCCC2=O]

MS (ESI): mass calcd. for $C_{21}H_{21}NO_4$ 351.15 m/z found 352.2 [M+H]$^+$. $^1$H NMR (400 MHz, CHLOROFORM-d) δ 7.83 (d, J=9.3 Hz, 1H), 7.67 (s, 1H), 7.58 (dd, J=1.7, 8.1 Hz, 1H), 7.41 (d, J=7.8 Hz, 1H), 6.78 (d, J=9.3 Hz, 1H), 6.08 (br s, 1H), 5.62 (br s, 1H), 5.50 (t, J=5.1 Hz, 1H), 4.55 (t, J=6.4 Hz, 2H), 2.91-3.03 (m, 1H), 2.73-2.90 (m, 3H), 1.97-2.15 (m, 6H), 1.80-1.92 (m, 1H).

Example 123b (*S)-5-((8-methyl-4-oxochroman-7-yl)oxy)-5,6,7,8-tetrahydronaphthalene-2-carboxamide

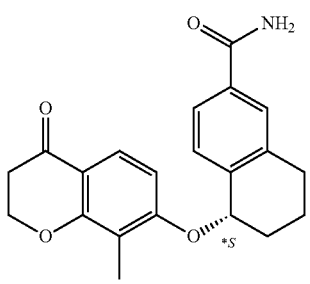 [SMILES: Cc1c(O[C@H]2CCCc3cc(C(N)=O)ccc32)ccc2c1OCCC2=O]

MS (ESI): mass calcd. for $C_{21}H_{21}NO_4$ 351.15 m/z found 352.2 [M+H]$^+$. $^1$H NMR (400 MHz, CHLOROFORM-d) δ 7.83 (d, J=9.3 Hz, 1H), 7.67 (s, 1H), 7.58 (dd, J=1.7, 8.1 Hz, 1H), 7.41 (d, J=7.8 Hz, 1H), 6.78 (d, J=9.3 Hz, 1H), 6.08 (br s, 1H), 5.62 (br s, 1H), 5.50 (t, J=5.1 Hz, 1H), 4.55 (t, J=6.4 Hz, 2H), 2.91-3.03 (m, 1H), 2.73-2.90 (m, 3H), 1.97-2.15 (m, 6H), 1.80-1.92 (m, 1H).

Example 124: (R,S)-7-((6,7-Dihydro-5H-cyclopenta[c]pyridin-5-yl)oxy)-8-methylchroman-4-one

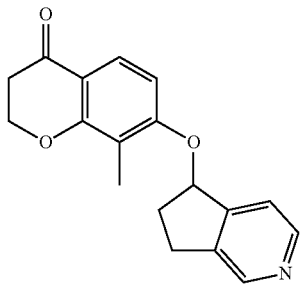 [SMILES: Cc1c(OC2CCc3cnccc32)ccc2c1OCCC2=O]

7-Hydroxy-8-methylchroman-4-one (Intermediate 40, Step B, 143 mg, 0.802 mmol), 6,7-dihydro-5H-cyclopenta[c]pyridin-5-ol (Intermediate 106, 119 mg, 0.882 mmol), and triphenylphosphine (315 mg, 1.20 mmol) were combined in a round bottom flask. THF (4 mL) was added and a brown solution resulted. The reaction vessel was sealed and evacuated and back-filled with argon twice. The mixture was cooled in an ice water bath. Diisopropyl azodicarboxylate (0.234 mL, 1.039 g/mL, 1.20 mmol) was added dropwise. The resulting brown solution was stirred at room temperature under argon for 4.5 hours. Additional portions of triphenylphosphine (158 mg, 0.75 equiv) and diisopropyl azodicarboxylate (0.117 mL, 0.75 equiv) were added and stirring was continued at room temperature for 1 h. The reaction mixture was partitioned between water (20 mL) and EtOAc (20 mL). The separated aqueous phase was extracted twice with EtOAc (20 mL each). The organic phase was dried (Na₂SO₄), filtered, and concentrated onto SiO₂. The residue was purified by FCC (SiO₂, 0-100% EtOAc-heptanes, gradient elution) followed by reverse-phase HPLC (gradient 10-90% CH₃CN-H₂O, 0.1% TFA) to afford the title compound (115 mg, 48%) as a white foamy solid.

A sample of (R,S)-7-((6,7-dihydro-5H-cyclopenta[c]pyridin-5-yl)oxy)-8-methylchroman-4-one (81 mg, 0.275 mmol) was separated by chiral SFC (Chiralpak OJ-H, 70% CO₂-30% iPrOH (0.3% iPrNH₂)) to yield example 124a (first enantiomer to elute, labelled *R) and example 124b (second enantiomer to elute, labelled *S).

Example 124a (*R)-7-((6,7-dihydro-5H-cyclopenta[c]pyridin-5-yl)oxy)-8-methylchroman-4-one

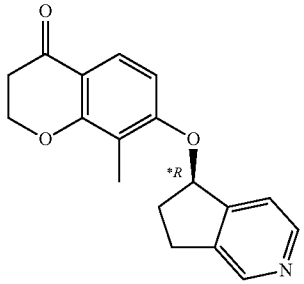 [SMILES: Cc1c(O[C@@H]2CCc3cnccc32)ccc2c1OCCC2=O]

MS (ESI): mass calcd. for $C_{18}H_{17}NO_3$ 295.12 m/z found 296.1 [M+H]⁺. ¹H NMR (400 MHz, CHLOROFORM-d) δ 8.62 (s, 1H), 8.51 (d, J=4.9 Hz, 1H), 7.84 (d, J=8.8 Hz, 1H), 7.34 (d, J=5.4 Hz, 1H), 6.78 (d, J=8.8 Hz, 1H), 5.84 (t, J=6.4 Hz, 1H), 4.55 (t, J=6.4 Hz, 2H), 3.13-3.23 (m, 1H), 2.95-3.05 (m, 1H), 2.78 (t, J=6.4 Hz, 2H), 2.70 (dddd, J=4.4, 6.9, 8.3, 13.7 Hz, 1H), 2.16-2.27 (m, 1H), 2.04 (s, 3H).

Example 124b (*S)-7-((6,7-dihydro-5H-cyclopenta[c]pyridin-5-yl)oxy)-8-methylchroman-4-one

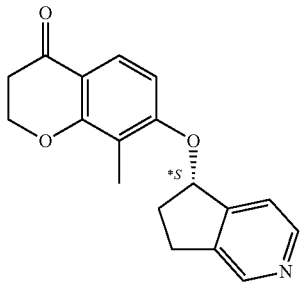 [SMILES: Cc1c(O[C@H]2CCc3cnccc32)ccc2c1OCCC2=O]

MS (ESI): mass calcd. for $C_{18}H_{17}NO_3$ 295.12 m/z found 296.1 [M+H]⁺. ¹H NMR (400 MHz, CHLOROFORM-d) δ 8.62 (s, 1H), 8.51 (d, J=4.9 Hz, 1H), 7.84 (d, J=8.8 Hz, 1H), 7.34 (d, J=4.9 Hz, 1H), 6.78 (d, J=8.8 Hz, 1H), 5.84 (t, J=6.4 Hz, 1H), 4.55 (t, J=6.4 Hz, 2H), 3.13-3.23 (m, 1H), 2.94-3.05 (m, 1H), 2.78 (t, J=6.4 Hz, 2H), 2.65-2.75 (m, 1H), 2.16-2.27 (m, 1H), 2.04 (s, 3H).

The small molecule inhibitors of antigen presentation by HLA-DR were screened and counter-screened as described below.

The screening was made through two sets of HLA-DR/peptide-dependent assays: a peptide-dependent Homogeneous Time Resolved Fluorescence (HTRF) binding assay followed by an HLA-DR dependent, peptide-specific T cell functional assay (HLA-DR4-restricted peptide-specific T cell-based assay hybridoma assay). The HTRF binding assay was designed to measure the ability of the small molecule to inhibit the loading of a fluorescently labeled high-affinity peptide onto HLA-DR peptide binding groove. The peptide-specific T cell functional assay assesses T cell activation resulting from proper peptide presentation onto HLA-DR expressed on the surface of the antigen-presenting cells to the T cell and is used to screen compounds able to inhibit such HLA-DR/peptide-dependent T cell activation.

The counter-screening was made through an HLA-DR-independent assay (Pan-CD4+ T cell activation assay), i.e., TCR-stimulated pan-T cell activation assay, and consists of activating T cell directly with agonistic antibody targeting the T cell receptor. The lack of inhibition in the counter-screening assay reflects that the inhibition of T cell activation in the HLA-DR4 restricted peptide-specific T cell based assay with the small molecule inhibitors is due to impaired antigen presentation on HLA-DR to the T cell and not due to a direct inhibition of the T cell function by an off-target mechanism (i.e., independently of targeting HLA-DR).

HLA-DR4 HTRF Assay

The HLA-DR4 HTRF assay is based on HTRF technology and designed to measure ability of compounds to prevent loading of high-affinity Alexa Fluor 647-labeled Citrullinated Collagen 111236-1249 peptide (named Cit-CII/AF647, aa1236-1249, LQYM-Cit-ADQAAGGLR; Alexa Fluor 647 dye commercially available from Invitrogen) onto HLA-DRB1*0401. The HTRF assay technology is based on the energy transfer between two fluorophores, a donor and an acceptor, when in close proximity. The HLA-DR4 protein construct was uniquely designed for this assay and has (i) the α and ρ subunits fused to human Fc chains and (ii) the invariant chain-associated peptide (CLIP peptide, aa85-101), the universal moderate/low-affinity HLA-DR binder, attached to the beta chain through a HRV3C protease-cleavable linker.

Because of the low stability of peptide free HLA-DR4 heterodimer, the construct was purified and delivered with CLIP peptide attached to the N-terminal of the β chain. The HLA-DR4 heterodimer was pre-treated with 3 µL HRV3C protease (Novagen E71493-3) (~2 U/µL) per mg of the cleavable protein to cleave CLIP peptide and incubated overnight (>16 hrs) at 4° C. This method yielded at least 80% cleavage and allowed the CLIP peptide to be potentially exchanged with the fluorescently labeled high affinity cit-CII$_{1236-1249}$ peptide. A batch of HLA-DR4B1*01:01 protein with CLIP cleaved was prepared for multiple experiments and was stable for several months when stored at 4° C.

In this assay, anti-human Fc antibody labeled with Tb-Cryptate probe was used as the donor (commercially available from Cisbio—PAb Anti-human IgG-Tb Cryptate, Cat #61HFCTAB) and high affinity peptide Citrullinated CII (cit-CII) labeled with Alexa 647 fluorophore was utilized as the acceptor. Inhibitors of the exchange of the pre-cleaved CLIP peptide for the high affinity cit-CII$_{1236-1249}$ peptide onto HLA-DRB1*04:01 caused a decrease in HTRF signal as measured by the ratio of the 665 nm/620 nm emitted signal. Screening compounds were robotically pre-dispensed (150 nL, Hummingbird, DigiLab/CyBio AG) onto black, round bottom, nontreated, 1536-well assay plates (Corning #3939), were incubated with 3 nM HLA-DR4 (with CLIP cleaved) plus 1 nM Human IgG-Tb (anti-Fc-Tb) Antibody for 45 min prior to addition of 40 nM Cit-CII peptide labeled with Alexa-647. The negative control was DMSO plus 1 nM Human IgG-Tb (anti-Fc-Tb) Antibody, incubated for 45 minutes before addition of 40 nM Cit-CII peptide labeled with Alexa-647. The positive control was DMSO plus 3 nM HLA-DR4 (with CLIP cleaved) plus 1 nM Human IgG-Tb (anti-Fc-Tb) Antibody with 40 nM Cit-CII peptide labeled with Alexa-647 added after a 45-minute incubation. Plates were centrifuged at 1000 rpm for 1 minute and then incubated at 37° C., at 90% relative humidity for 90 minutes. After incubation, plates were read on a spectrophotometer, the Pherastar FS (BMG Labtech), in HTRF mode. The HTRF ratio as well as percent inhibition was calculated. Curve fitting and $IC_{50}$ calculation for dose response data was performed by Microsoft Excel, 3DX (Janssen proprietary software) or Graphpad Prism (Graphpad Software, San Diego, CA). Dose response data was plotted versus the log of compound concentration and analyzed by non-linear regression to determine the $IC_{50}$.

HLA-DR4-Restricted Peptide-Specific T Cell-Based Assay (Hybridoma Assay)

The hybridoma assay was used to measure compound inhibition of TL-2 production from an HLA-DR4 restricted mouse T cell hybridoma line (DR4.CII.36.8) that was antigen-specific for collagen $II_{259-273}$ ($CII_{259-273}$) peptide when presented with an HLA-DR4 expressing Antigen Presenting Cell (APC) cell line (i.e., Boleth).

To the HLA-DRB1*04:01-expressing B cell line (Boleth cell line from International Histocompatibility Working Group (IHWG), ref #IHW09031) was presented the collagen II 259-273 peptide ($CII_{259-273}$, GIAGFKGEQGPKGEP) to mouse T cell hybridoma (DR4.CII.36.8 T cell hybridoma; clone 36.8, expressing a $CII_{259-273}$-specific, HLA-DRB1*04:01-restricted T cell receptor). Upon proper $CII_{259-273}$ peptide presentation, the T cell hybridoma was activated and thus produced IL-2 cytokine, whose level in the cell culture supernatant was detected using mouse IL-2 AlphaLISA kit (Perkin Elmer, Cat: AL511F).

This assay was performed in a 384-well plate (polypropylene V-bottom Greiner bio-one, ref #784075) by: (i) pre-incubation of 20 μL of 1.25 million/mL Boleth cells (25,000 cells) resuspended in DMEM/1% fetal calf serum (FCS; Gibco, ref #16140-071) with 20 μL of 2.5× final concentration of compound of interest in DMEM/1% serum/0.75% DMSO at 37° C. for 1 hr in the incubator, then (ii) 10 μL of 5 million/mL (50,000 cells) DR4.CII.36.8 T cell hybridoma cells resuspended in DMEM/1% FCS was added and incubated for 6 h at 37° C. in the incubator. Supernatant was then collected and mouse IL-2 detected using AlphaLISA kit (ref #AL511F). Compounds were tested in duplicate, with 8-point titration. Mean±SD of AlphaLISA units at each compound concentration was used for compound $IC_{50}$ calculation. The negative control for this experiment was run without peptide stimulation and used a DMSO vehicle wherein no compound of interest was added. The positive control was run with peptide stimulation and used a DMSO vehicle wherein no compound of interest was added. Both the negative and positive controls were run in 8 replicates each. Curve fitting and $IC_{50}$ calculation for dose response data was performed by GraphPad software 6 or higher (GraphPad Software, San Diego, CA). Dose response data was plotted versus the log of compound concentration and $IC_{50}$ was determined using 4-parameter logistic (4-PL) curve fitting.

Pan-CD4+ T Cell Activation

Compounds were tested using a pan-T cell activation assay. In this assay, anti-human CD3 antibody (BD Pharmingen #55336) pre-coated at 1 μg/mL to a 96-well assay plate and 1 μg/ml soluble anti-human CD28 (EBioscience #16-0289-85) antibody were used for activating human peripheral blood CD4+ helper T cells (no HLA-DR-expressing APC were present in this assay format), in the presence of compounds (or vehicle control) for 24 hrs. IL-2 production was measured in the culture supernatant by ELISA (Human IL-2 Duo Set ELISA #DY202 from R&D Systems).

Table 7 below provides $IC_{50}$ data in the biological assays described above for certain compounds of the invention.

TABLE 7

$IC_{50}$ Data in HLA-DR4 HTRF, HLA-DR4- restricted peptide-specific T cell-based assay and Pan-CD4+ T cell activation (off-target assay)

| Example | HLA-DR4 HTRF assay, $IC_{50}$ (μM) | HLA-DR4-restricted peptide-specific T cell-based assay, $IC_{50}$ (μM) | Pan-CD4+ T cell activation (off-target assay), $IC_{50}$ (μM) |
|---|---|---|---|
| 1a | 1.0 | 3.4 | >15 |
| 1b | 1.2 | 3.1 | 3.1 |
| 2 | 1.0 | 2.8 | >15 |
| 2a | 1.6 | 1.7 | 15 |
| 2b | 1.8 | 3.9 | >15 |
| 3 | 0.99 | 3.7 | >15 |
| 3a | 1.6 | 4.2 | 15 |
| 3b | 1.3 | 2.1 | >15 |
| 4a | 6.9 | 2.9 | 7.8 |
| 4b | 7.9 | 2.6 | 15 |
| 5a | 14 | 1.9 | 2.8 |
| 5b | 14 | 5.2 | nt |
| 6 | 1.8 | 1.4 | nt |
| 7a | 0.69 | 4.6 | 4.4 |
| 7b | 0.96 | 5.4 | nt |
| 8a | 0.68 | >15 | nt |
| 8b | 0.82 | 6.5 | nt |
| 9a | 0.92 | 6.3 | 4.7 |
| 9b | 0.98 | 11 | 4.7 |
| 10 | 0.77 | 8.7 | nt |
| 10a | 0.95 | 4.9 | >15 |
| 10b | 0.91 | >15 | nt |
| 11 | 0.65 | 1.2 | >15 |
| 11a | 0.72 | 0.46 | >15 |
| 11b | 0.95 | 4.7 | >15 |
| 12 | 1.2 | 1.6 | >15 |
| 12a | 2.0 | 2.6 | 9.9 |
| 12b | 1.7 | 2.9 | >15 |
| 13a | 2.0 | >15 | nt |
| 13b | 1.4 | 4.7 | >15 |
| 14 | 2.4 | 5.0 | >15 |
| 14a | 1.9 | 8.7 | >15 |
| 14b | 1.9 | 11 | nt |
| 15a | 0.44 | 0.61 | >15 |
| 15b | 0.77 | 8.1 | nt |
| 16a | 8.1 | 12 | nt |
| 16b | 9.9 | >15 | nt |
| 17a | 5.8 | 4.3 | 15 |
| 17b | 4.9 | 7.7 | 4.8 |
| 18a | 1.4 | >15 | nt |
| 18b | 0.95 | 12 | 9.9 |
| 19a | 0.82 | 3.6 | 1.8 |
| 19b | 1.2 | 7.6 | 4.7 |
| 20a | 1.2 | 6.9 | nt |
| 20b | 0.91 | 6.2 | nt |
| 21a | 1.0 | 5.4 | nt |
| 21b | 0.64 | 5.4 | nt |
| 22a | 1.3 | 1.9 | 4.7 |
| 22b | 1.2 | 2.2 | 15 |
| 23a | 0.45 | 10 | nt |
| 23b | 0.68 | 5.0 | >15 |
| 24a | 1.4 | 5.1 | >15 |
| 24b | 1.2 | 2.7 | 4.7 |
| 25a | 0.48 | 6.4 | nt |
| 25b | 0.49 | 4.5 | 3.2 |
| 26a | 64 | 1.1 | >15 |
| 26b | 88 | 1.6 | 15 |
| 27a | 7.3 | 13 | nt |

TABLE 7-continued

IC$_{50}$ Data in HLA-DR4 HTRF, HLA-DR4- restricted peptide-specific T cell-based assay and Pan-CD4+ T cell activation (off-target assay)

| Example | HLA-DR4 HTRF assay, IC$_{50}$ (μM) | HLA-DR4-restricted peptide-specific T cell-based assay, IC$_{50}$ (μM) | Pan-CD4+ T cell activation (off-target assay), IC$_{50}$ (μM) |
|---|---|---|---|
| 27b | 6.4 | >15 | nt |
| 28a | 1.8 | 6.9 | nt |
| 28b | 1.7 | 3.5 | >15 |
| 29a | 1.1 | 2.3 | >15 |
| 29b | 0.96 | 5.0 | >15 |
| 30a | 0.93 | 5.9 | nt |
| 30b | 1.2 | 6.4 | nt |
| 31a | 0.85 | 5.5 | 15 |
| 31b | 0.64 | 3.5 | >15 |
| 32a | 3.6 | 8.2 | nt |
| 32b | 1.9 | >15 | nt |
| 33a | 0.58 | 8.7 | nt |
| 33b | 0.59 | >15 | nt |
| 34a | 0.80 | 12 | 9.9 |
| 34b | 0.69 | >15 | >15 |
| 35a | 0.96 | >15 | nt |
| 35b | 0.83 | 5.2 | nt |
| 36a | 0.55 | 4.8 | 4.7 |
| 36b | 0.57 | 5.1 | nt |
| 37a | 33 | 9.3 | 2.0 |
| 37b | 24 | 5.1 | 9.9 |
| 38a | 4.6 | 4.0 | 4.7 |
| 38b | 4.1 | 5.5 | >15 |
| 39a | 1.1 | 14 | nt |
| 39b | 0.85 | 0.6 | 9.9 |
| 39c | 0.99 | 1.1 | 9.9 |
| 39d | 1.0 | 15 | nt |
| 40a | 1.5 | 0.76 | 15 |
| 40b | 1.3 | 1.0 | 15 |
| 41a | 1.2 | >15 | nt |
| 41b | 1.1 | 1.5 | >15 |
| 42a | 3.8 | 11 | >15 |
| 42b | 7.5 | 12 | 9.9 |
| 43a | 3.6 | 0.74 | 4.5 |
| 43b | 4.9 | 0.63 | 9.9 |
| 44a | 1.6 | 1.6 | >15 |
| 44b | 1.1 | 2.3 | >15 |
| 44c | 1.3 | >15 | nt |
| 44d | 0.85 | >15 | nt |
| 45a | 1.1 | 3.4 | >15 |
| 45b | 1.4 | 10 | >15 |
| 46a | 0.97 | 1.5 | >15 |
| 46b | 1.3 | 0.17 | 5.0 |
| 47 | 6.5 | 0.60 | 9.9 |
| 48a | 0.68 | 0.14 | 9.9 |
| 48b | 0.69 | 1.1 | >15 |
| 49a | 0.57 | 0.20 | 9.9 |
| 49b | 1.0 | 3.0 | 15 |
| 50a | 1.9 | 0.24 | 9.9 |
| 50b | 1.9 | 2.5 | >15 |
| 51a | 3.6 | 0.25 | 15 |
| 51b | 3.5 | 15 | nt |
| 52a | 0.23 | 0.56 | >15 |
| 52b | 0.30 | 8.5 | nt |
| 53a | 0.80 | 0.74 | 2.1 |
| 53b | 0.60 | 0.45 | 3.2 |
| 54a | 0.63 | 0.078 | 0.52 |
| 54b | 0.87 | 4.3 | 15 |
| 55 | 0.93 | 0.89 | >15 |
| 56a | 1.4 | 1.7 | 4.6 |
| 56b | 1.3 | 6.0 | >15 |
| 57a | 2.3 | 4.8 | >15 |
| 57b | 2.0 | >15 | nt |
| 58a | 0.33 | 0.18 | 5.3 |
| 58b | 0.73 | 2.6 | 9.9 |
| 59a | 1.2 | 3.2 | 4.7 |
| 59b | 1.3 | >15 | nt |
| 60a | 1.8 | 0.74 | 4.7 |
| 60b | 2 | 2.3 | 9.9 |
| 61a | 0.99 | 4.6 | 2.7 |
| 61b | 0.96 | 5.2 | >15 |
| 62a | 1.5 | 8.5 | 4.7 |
| 62b | 1.4 | 1.8 | 2.7 |
| 63a | 1.6 | >15 | nt |
| 63b | 1.5 | 1.3 | 4.7 |
| 64a | 1.7 | 6.0 | 2.0 |
| 64b | 1.8 | 4.8 | >15 |
| 65a | 30 | >15 | nt |
| 65b | 28 | 2.0 | 15 |
| 66a | 2.7 | 7.8 | 4.7 |
| 66b | 2.4 | >15 | nt |
| 67a | 3.1 | 2.7 | 15 |
| 67b | 2.2 | >15 | nt |
| 68a | 1.5 | 5.6 | 4.7 |
| 68b | 5.4 | >15 | nt |
| 69a | 2.1 | 2.2 | 6.1 |
| 69b | 2.1 | >15 | nt |
| 70a | 1.3 | 7.1 | 4.7 |
| 70b | 1.5 | 4.8 | 9.9 |
| 71a | 1.6 | 1.5 | >15 |
| 71b | 0.93 | 0.20 | >15 |
| 72a | 0.84 | 6.3 | 9.9 |
| 72b | 0.69 | 11 | >15 |
| 73a | 0.54 | 0.11 | 8.0 |
| 73b | 0.60 | 0.71 | 15 |
| 74a | 0.55 | 0.12 | 2.2 |
| 74b | 0.92 | 1.9 | 15 |
| 75a | 0.60 | 0.062 | 4.7 |
| 75b | 0.63 | 0.18 | 9.3 |
| 76a | 0.65 | 0.32 | 2.2 |
| 76b | 1.0 | 3.1 | 15 |
| 77a | 1.7 | 9.1 | >15 |
| 77b | 1.5 | 5.5 | 9.9 |
| 78a | 0.47 | 2.3 | 9.9 |
| 78b | 0.45 | 0.47 | 15 |
| 79a | 28 | 0.47 | 3.1 |
| 79b | 49 | 0.97 | >15 |
| 80a | 0.66 | 0.032 | 5.9 |
| 80b | 0.96 | nt | nt |
| 81a | 0.69 | 15 | nt |
| 81b | 0.61 | 1.3 | >15 |
| 82a | 0.71 | >15 | nt |
| 82b | 0.62 | 5.7 | nt |
| 83a | 0.95 | 2.7 | 0.99 |
| 83b | 0.69 | 5.0 | nt |
| 84a | 1.2 | 0.79 | 0.47 |
| 84b | <1 | 6.5 | 1.7 |
| 85a | 0.81 | 0.24 | 3.7 |
| 85b | 1.1 | 3.9 | 0.47 |
| 86a | 0.74 | 0.072 | 2.5 |
| 86b | 1.0 | 1.7 | 1.4 |
| 87a | 0.58 | 0.83 | >15 |
| 87b | 0.51 | >15 | nt |
| 88a | 0.40 | 2.2 | >15 |
| 88b | 0.36 | 5.9 | 9.9 |
| 89a | 0.47 | 1.8 | 4.7 |
| 89b | 0.47 | 1.2 | 4.7 |
| 90a | 0.52 | >15 | nt |
| 90b | 0.59 | 7.4 | nt |
| 91a | 0.55 | 7.8 | nt |
| 91b | 0.35 | >15 | nt |
| 92a | 0.30 | 0.31 | 9.9 |
| 92b | 0.19 | >15 | nt |
| 93a | 0.19 | 6.0 | nt |
| 93b | 0.28 | 14 | nt |
| 94a | 0.22 | 0.047 | 9.9 |
| 94b | 0.23 | 0.89 | 9.9 |
| 95a | 0.22 | 0.23 | nt |
| 95b | 0.22 | 1.1 | nt |
| 96a | 0.30 | 11 | nt |

TABLE 7-continued

IC$_{50}$ Data in HLA-DR4 HTRF, HLA-DR4- restricted peptide-specific T cell-based assay and Pan-CD4+ T cell activation (off-target assay)

| Example | HLA-DR4 HTRF assay, IC$_{50}$ (µM) | HLA-DR4-restricted peptide-specific T cell-based assay, IC$_{50}$ (µM) | Pan-CD4+ T cell activation (off-target assay), IC$_{50}$ (µM) |
|---|---|---|---|
| 96b | 0.47 | >15 | nt |
| 97a | 0.41 | 5.2 | nt |
| 97b | 0.38 | >15 | nt |
| 98a | 9.0 | 5.9 | nt |
| 98b | 10 | >15 | nt |
| 99a | 42 | 0.59 | 3.1 |
| 99b | >89 | 5.5 | nt |
| 100a | 6.4 | 7.6 | nt |
| 100b | 9.0 | 2.3 | nt |
| 101a | 0.96 | >15 | nt |
| 101b | 1.3 | 12 | nt |
| 102a | 78 | 0.099 | 15 |
| 102b | >89 | 0.091 | >15 |
| 103a | 2.9 | 15 | nt |
| 103b | 2.8 | 15 | nt |
| 104a | 0.29 | 3.9 | nt |
| 104b | 0.23 | 1.1 | nt |
| 105a | 0.20 | >15 | nt |
| 105b | 0.19 | 6.0 | nt |
| 106a | 0.47 | 0.057 | nt |
| 106b | 0.74 | 0.37 | nt |
| 107a | 0.94 | 10 | nt |
| 107b | 1.1 | 2.3 | nt |
| 108a | 0.86 | >15 | nt |
| 108b | 0.82 | 2.7 | nt |
| 109a | 0.21 | 1.1 | nt |
| 109b | 0.23 | 12 | nt |
| 110a | 0.55 | 0.12 | nt |
| 110b | 0.61 | 0.79 | nt |
| 111a | 0.49 | 0.60 | nt |
| 111b | 0.56 | 0.021 | 4.8 |
| 112a | 0.76 | 0.41 | nt |
| 112b | 0.60 | 4.0 | nt |
| 113 | 0.82 | 1.0 | nt |
| 114 | 3.4 | 11 | >10 |
| 114a | 1.4 | 5.5 | >15 |
| 114b | 1.3 | 3.0 | 4.7 |
| 115 | 5.0 | 12 | 15 |
| 117 | 0.68 | 3.1 | nt |
| 118a | 0.96 | 7.5 | >15 |
| 118b | 0.99 | 12 | >15 |
| 119a | 0.54 | 13 | nt |
| 119b | 0.69 | >15 | nt |
| 120 | 1.2 | 5.1 | >15 |
| 121 | 0.63 | 8.1 | >15 |
| 121a | 0.93 | >15 | nt |
| 121b | 0.83 | 14 | >15 |
| 122 | 1.1 | 15 | nt |
| 122a | 0.54 | 6.3 | nt |
| 122b | 0.93 | 15 | nt |
| 123 | 0.52 | 15 | nt |
| 123a | 0.63 | 7.9 | nt |
| 123b | 0.57 | 6.3 | nt |
| 124a | 0.57 | 14 | nt |
| 124b | 0.74 | 6.0 | nt |

The invention claimed is:

1. A compound of Formula (I), or a pharmaceutically acceptable salt thereof

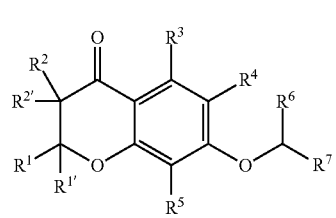

(I)

wherein $R^1$ is selected from the group consisting of H, —C$_1$-C$_5$alkyl, and phenyl;

$R^{1'}$ is selected from the group consisting of H and —C$_1$-C$_5$alkyl;

$R^2$ is selected from the group consisting of H, —C$_1$-C$_5$alkyl, —CH$_2$OH, and phenyl;

$R^{2'}$ is selected from the group consisting of H and —C$_1$-C$_5$alkyl;

$R^3$ is selected from the group consisting of H, —C$_1$-C$_5$alkyl, halo, —OCH$_3$ and CN;

$R^4$ is selected from the group consisting of H, —C$_1$-C$_5$alkyl, halo, and phenyl;

$R^5$ is selected from the group consisting of H, —C$_1$-C$_5$alkyl, halo, CN, —OCH$_3$, phenyl, and

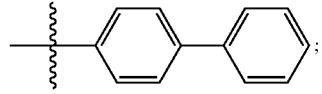 [SMILES: *c1ccc(-c2ccccc2)cc1]

$R^6$ is selected from the group consisting of

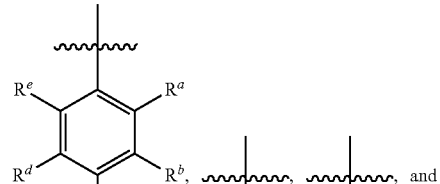

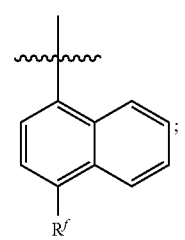

$R^a$ is selected from the group consisting of H, —OCH₃, F, CN, —OC₁-C₅alkyl, —C(O)NH₂, and

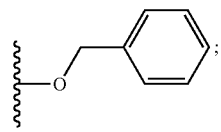 [SMILES: *OCc1ccccc1];

$R^b$ is selected from the group consisting of H, CN, —CH₃, —OCH₃, —OH, F,

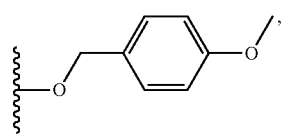 [SMILES: *OCc1ccc(OC)cc1],

—C(O)NH₂, —SO₂CH₃, and —CH₂NHC(O)NH₂;
$R^c$ is selected from the group consisting of H, —OCH₃, halo, CN;

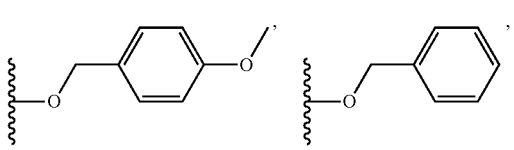 [SMILES: *OCc1ccc(OC)cc1 ; *OCc1ccccc1],

—CO₂H, —CO₂CH₃, —C(O)NH₂, —C(O)NHCH₃, —C(O)N(CH₃)₂, —SO₂CH₃, and —CH₂NHC(O)NH₂;
$R^d$ is H;
$R^e$ is H;
$R^f$ is selected from the group consisting of H, —C(O)NH₂ and CN;
$R^7$ is selected from the group consisting of

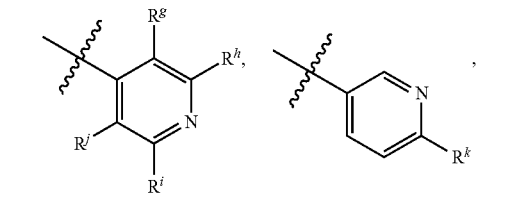

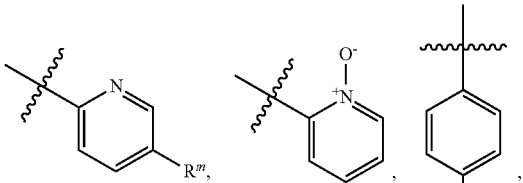

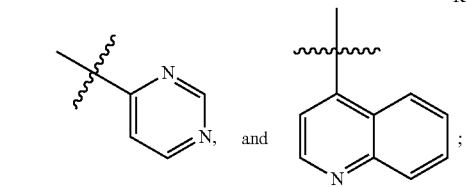

$R^g$ is selected from the group consisting of H, F, —NH₂, —OCH₃, —CH₃, —CF₃, —CH₂CH₂CO₂H and phenyl;

$R^h$ is selected from the group consisting of H, —NH₂, —OCH₃, —CH₃, —CF₃, —CH₂CH₂CO₂H and phenyl;

$R^i$ is selected from the group consisting of H, and —C₁-C₅alkyl;

$R^j$ is selected from the group consisting of H and —C₁-C₅alkyl;

$R^k$ is selected from the group consisting of H and —CO₂NH₂;

$R^m$ is selected from the group consisting of H, Cl, and —CO₂NH₂; and $R^q$ is —CO₂H or —CO₂NH₂.

2. A compound as claimed in claim 1, wherein each of $R^1$ and $R^{1'}$ is H.

3. A compound as claimed in claim 1, wherein each of $R^2$ and $R^{2'}$ is H.

4. A compound as claimed in claim 1, wherein each of $R^1$, $R^{1'}$, $R^2$, $R^{2'}$ is H.

5. A compound as claimed in claim 1, wherein each of $R^2$ and $R^{2'}$ is —C₁-C₅alkyl.

6. A compound as claimed in claim 1, wherein each of $R^2$ and $R^{2'}$ is —C₁-C₂alkyl.

7. A compound as claimed in claim 1, wherein each of $R^2$ and $R^{2'}$ are —CH₃.

8. A compound as claimed in claim 1, wherein $R^3$ is H and $R^4$ is F.

9. A compound as claimed in claim 1, wherein $R^5$ is —CH₃ or CN.

10. A compound as claimed in claim 1, wherein $R^6$ is

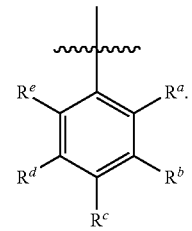

11. A compound as claimed in claim 1, wherein $R^6$ is

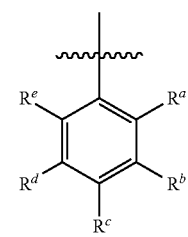

and $R^c$ is —C(O)NH₂.

12. A compound as claimed in claim 1, wherein $R^7$ is

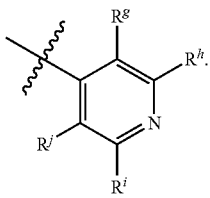

13. A compound as claimed in claim 1, wherein $R^7$ is

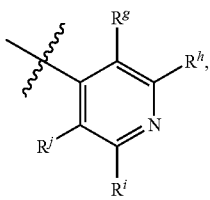

$R^g$ is H or —$CH_3$, and $R^h$ is H or —$CH_3$.

14. A compound or pharmaceutically acceptable salt thereof selected from
- (*R)-7-((2-Fluorophenyl)(pyridin-4-yl)methoxy)chroman-4-one;
- (*S)-7-((2-Fluorophenyl)(pyridin-4-yl)methoxy)chroman-4-one;
- (R,S)-7-((3-Fluorophenyl)(pyridin-4-yl)methoxy)chroman-4-one;
- (*R)-7-((3-Fluorophenyl)(pyridin-4-yl)methoxy)chroman-4-one;
- (*S)-7-((3-Fluorophenyl)(pyridin-4-yl)methoxy)chroman-4-one;
- (R,S)-7-((4-Fluorophenyl)(pyridin-4-yl)methoxy)chroman-4-one;
- (*R)-7-((4-Fluorophenyl)(pyridin-4-yl)methoxy)chroman-4-one;
- (*S)-7-((4-Fluorophenyl)(pyridin-4-yl)methoxy)chroman-4-one;
- (R,S)-7-((3-((4-Methoxybenzyl)oxy)phenyl)(pyridin-4-yl)methoxy)chroman-4-one;
- (*R)-7-((3-((4-Methoxybenzyl)oxy)phenyl)(pyridin-4-yl)methoxy)chroman-4-one;
- (*S)-7-((3-((4-Methoxybenzyl)oxy)phenyl)(pyridin-4-yl)methoxy)chroman-4-one;
- (*S)-7-((3-Hydroxyphenyl)(pyridin-4-yl)methoxy)chroman-4-one;
- (R,S)-7-(Pyridin-2-yl(pyridin-4-yl)methoxy)chroman-4-one;
- (*R)-2-(((4-Oxochroman-7-yl)oxy)(pyridin-4-yl)methyl)benzonitrile;
- (*S)-2-(((4-Oxochroman-7-yl)oxy)(pyridin-4-yl)methyl)benzonitrile;
- (*R)-2-(((4-Oxochroman-7-yl)oxy)(pyridin-4-yl)methyl)benzamide;
- (*S)-3-(((4-Oxochroman-7-yl)oxy)(pyridin-4-yl)methyl)benzamide;
- (*R)-3-(((4-oxochroman-7-yl)oxy)(pyridin-4-yl)methyl)benzamide;
- (*S)-4-(((4-oxochroman-7-yl)oxy)(pyridin-4-yl)methyl)benzamide;
- (R,S)-4-(((4-Oxochroman-7-yl)oxy)(pyridin-4-yl)methyl)benzonitrile;
- (*R)-4-(((4-oxochroman-7-yl)oxy)(pyridin-4-yl)methyl)benzonitrile;
- (*S)-4-(((4-oxochroman-7-yl)oxy)(pyridin-4-yl)methyl)benzonitrile;
- (R,S)-4-(((4-Oxochroman-7-yl)oxy)(pyridin-4-yl)methyl)benzamide;
- (*R)-4-(((4-oxochroman-7-yl)oxy)(pyridin-4-yl)methyl)benzamide;
- (*S)-7-(((4-oxochroman-7-yl)oxy)(pyridin-4-yl)methyl)benzamide;
- (R,S)-7-((4-Methoxyphenyl)(pyridin-4-yl)methoxy)chroman-4-one;
- (*R)-7-((4-Methoxyphenyl)(pyridin-4-yl)methoxy)chroman-4-one;
- (*S)-7-((4-Methoxyphenyl)(pyridin-4-yl)methoxy)chroman-4-one;
- (*R)-7-((3-methoxyphenyl)(pyridin-4-yl)methoxy)chroman-4-one;
- (*S)-7-((3-methoxyphenyl)(pyridin-4-yl)methoxy)chroman-4-one;
- (*R)-7-((2-Methoxyphenyl)(pyridin-4-yl)methoxy)chroman-4-one;
- (*S)-4-((2-Methoxyphenyl)(pyridin-4-yl)methoxy)chromane-4-one;
- (*R)-4-((2-Methylpyridin-4-yl)((4-oxochroman-7-yl)oxy)methyl)benzamide;
- (*S)-7-((2-Methylpyridin-4-yl)((4-oxochroman-7-yl)oxy)methyl)benzamide;
- (*R)-7-((4-(benzyloxy)phenyl)(pyridin-4-yl)methoxy)chroman-4-one;
- (*R)-7-((4-((4-Methoxybenzyl)oxy)phenyl)(pyridin-4-yl)methoxy)chroman-4-one;
- (*S)-7-((4-((4-Methoxybenzyl)oxy)phenyl)(pyridin-4-yl)methoxy)chroman-4-one;
- (*S)-4-(((4-oxochroman-7-yl)oxy)(2-(trifluoromethyl)pyridin-4-yl)methyl)benzamide;
- (*R)-4-(((4-oxochroman-7-yl)oxy)(3-(trifluoromethyl)pyridin-4-yl)methyl)benzamide;
- (*S)-4-(((4-oxochroman-7-yl)oxy)(3-(trifluoromethyl)pyridin-4-yl)methyl)benzamide;
- (*R)-4-((3-fluoropyridin-4-yl)((4-oxochroman-7-yl)oxy)methyl)benzamide;
- (*S)-4-((3-fluoropyridin-4-yl)((4-oxochroman-7-yl)oxy)methyl)benzamide;
- (*R)-4-((3-Methylpyridin-4-yl)((4-oxochroman-7-yl)oxy)methyl)benzamide;
- (*S)-4-((3-Methylpyridin-4-yl)((4-oxochroman-7-yl)oxy)methyl)benzamide;
- (*R)-4-(((4-oxochroman-7-yl)oxy)(quinolin-4-yl)methyl)benzamide;
- (*S)-4-(((4-oxochroman-7-yl)oxy)(quinolin-4-yl)methyl)benzamide;
- (*R)-4-((3-methoxypyridin-4-yl)((4-oxochroman-7-yl)oxy)methyl)benzamide;
- (*S)-4-((3-methoxypyridin-4-yl)((4-oxochroman-7-yl)oxy)methyl)benzamide;
- (*R)-4-((2-methoxypyridin-4-yl)((4-oxochroman-7-yl)oxy)methyl)benzamide;
- (*S)-4-((2-methoxypyridin-4-yl)((4-oxochroman-7-yl)oxy)methyl)benzamide;
- (*R)-4-(((4-oxochroman-7-yl)oxy)(3-phenylpyridin-4-yl)methyl)benzamide;
- (*S)-4-(((4-oxochroman-7-yl)oxy)(3-phenylpyridin-4-yl)methyl)benzamide;
- (*R)-4-(((4-oxochroman-7-yl)oxy)(2-phenylpyridin-4-yl)methyl)benzamide;

(*S)-4-(((4-oxochroman-7-yl)oxy)(2-phenylpyridin-4-yl)methyl)benzamide;
(*R)-4-((3-aminopyridin-4-yl)((4-oxochroman-7-yl)oxy)methyl)benzamide;
(*R)-4-((2-aminopyridin-4-yl)((4-oxochroman-7-yl)oxy)methyl)benzamide;
(*S)-4-((2-aminopyridin-4-yl)((4-oxochroman-7-yl)oxy)methyl)benzamide;
(*R)-4-(((4-oxochroman-7-yl)oxy)(phenyl)methyl)benzamide;
(*S)-4-(((4-oxochroman-7-yl)oxy)(phenyl)methyl)benzamide;
(*R)-4-((4-Chlorophenyl)((4-oxochroman-7-yl)oxy)methyl)benzamide;
(*S)-4-((4-Chlorophenyl)((4-oxochroman-7-yl)oxy)methyl)benzamide;
(*R)-4-(((4-oxochroman-7-yl)oxy)(pyridin-3-yl)methyl)benzamide;
(*S)-4-(((4-oxochroman-7-yl)oxy)(pyridin-3-yl)methyl)benzamide;
(*R)-4-(((4-oxochroman-7-yl)oxy)(pyridin-2-yl)methyl)benzamide;
(*S)-4-(((4-oxochroman-7-yl)oxy)(pyridin-2-yl)methyl)benzamide;
(*R)-4-(((4-Oxochroman-7-yl)oxy)(pyrimidin-4-yl)methyl)benzamide;
(*S)-4-(((4-Oxochroman-7-yl)oxy)(pyrimidin-4-yl)methyl)benzamide;
(*R)—N-methyl-4-(((4-oxochroman-7-yl)oxy)(pyridin-4-yl)methyl)benzamide;
(*S)—N-methyl-4-(((4-oxochroman-7-yl)oxy)(pyridin-4-yl)methyl)benzamide;
(*R)-2-methyl-4-(((4-oxochroman-7-yl)oxy)(pyridin-4-yl)methyl)benzamide;
(*S)-2-methyl-4-(((4-oxochroman-7-yl)oxy)(pyridin-4-yl)methyl)benzamide;
(*R)-3-methyl-4-(((4-oxochroman-7-yl)oxy)(pyridin-4-yl)methyl)benzamide;
(*S)-3-methyl-4-(((4-oxochroman-7-yl)oxy)(pyridin-4-yl)methyl)benzamide;
(*R)-4-(((4-oxochroman-7-yl)oxy)(pyridin-4-yl)methyl)-1-naphthonitrile;
(*S)-4-(((4-oxochroman-7-yl)oxy)(pyridin-4-yl)methyl)-1-naphthonitrile;
(*R)-7-(cyclohexyl(pyridin-4-yl)methoxy)chroman-4-one;
(*S)-(7-(cyclohexyl(pyridin-4-yl)methoxy)chroman-4-one;
4-((*S)—(((*R)-2-Methyl-4-oxochroman-7-yl)oxy)(pyridin-4-yl)methyl)benzamide;
4-((*R)—(((*R)-2-Methyl-4-oxochroman-7-yl)oxy)(pyridin-4-yl)methyl)benzamide;
4-((*R)—(((*S)-2-Methyl-4-oxochroman-7-yl)oxy)(pyridin-4-yl)methyl)benzamide;
4-((*S)—(((*S)-2-Methyl-4-oxochroman-7-yl)oxy)(pyridin-4-yl)methyl)benzamide;
4-((*R)—(((*R)-2-ethyl-4-oxochroman-7-yl)oxy)(pyridin-4-yl)methyl)benzamide;
4-((*R)—(((*S)-2-ethyl-4-oxochroman-7-yl)oxy)(pyridin-4-yl)methyl)benzamide;
4-((*S)—(((*R)-2-ethyl-4-oxochroman-7-yl)oxy)(pyridin-4-yl)methyl)benzamide;
4-((*S)—(((*S)-4-ethyl-4-oxochroman-7-yl)oxy)(pyridin-4-yl)methyl)benzamide;
4-((*S)—(((*R)-4-oxo-2-phenylchroman-7-yl)oxy)(pyridin-4-yl)methyl)benzamide;
4-((*S)—(((*S)-4-oxo-2-phenylchroman-7-yl)oxy)(pyridin-4-yl)methyl)benzamide;
4-((*R)—(((*R)-4-oxo-2-phenylchroman-7-yl)oxy)(pyridin-4-yl)methyl)benzamide;
4-((*R)—(((*S)-3-oxo-2-phenylchroman-7-yl)oxy)(pyridin-4-yl)methyl)benzamide;
4-((*S)—(((*R)-3-Methyl-4-oxochroman-7-yl)oxy)(pyridin-4-yl)methyl)benzamide;
4-((*R)—(((*R)-3-Methyl-4-oxochroman-7-yl)oxy)(pyridin-4-yl)methyl)benzamide;
4-((*R)—(((*S)-3-Methyl-4-oxochroman-7-yl)oxy)(pyridin-4-yl)methyl)benzamide;
4-((*S)—(((*S)-3-Methyl-4-oxochroman-7-yl)oxy)(pyridin-4-yl)methyl)benzamide;
4-((*S)—(((*R)-3-ethyl-4-oxochroman-7-yl)oxy)(pyridin-4-yl)methyl)benzamide;
4-((*S)—(((*S)-3-ethyl-4-oxochroman-7-yl)oxy)(pyridin-4-yl)methyl)benzamide;
4-((*R)—(((*R)-3-ethyl-4-oxochroman-7-yl)oxy)(pyridin-4-yl)methyl)benzamide;
4-((*R)—(((*S-3-ethyl-4-oxochroman-7-yl)oxy)(pyridin-4-yl)methyl)benzamide;
4-((1*R-((4-Oxo-3-phenylchroman-7-yl)oxy)(pyridin-4-yl)methyl)benzamide;
(*R)-4-(((8-methyl-4-oxochroman-7-yl)oxy)(pyridin-4-yl)methyl)benzamide;
(*S)-4-(((8-methyl-4-oxochroman-7-yl)oxy)(pyridin-4-yl)methyl)benzamide;
(*R)-4-(((6-Methyl-4-oxochroman-7-yl)oxy)(pyridin-4-yl)methyl)benzamide;
(*S)-4-(((6-Methyl-4-oxochroman-7-yl)oxy)(pyridin-4-yl)methyl)benzamide;
(*R)-4-(((8-Fluoro-4-oxochroman-7-yl)oxy)(pyridin-4-yl)methyl)benzamide;
(*S)4-(((8-Fluoro-4-oxochroman-7-yl)oxy)(pyridin-4-yl)methyl)benzamide;
(*R)-4-(((5-Fluoro-4-oxochroman-7-yl)oxy)(pyridin-4-yl)methyl)benzamide;
(*S)-4-(((5-Fluoro-4-oxochroman-7-yl)oxy)(pyridin-4-yl)methyl)benzamide;
(*R)-4-(((6-Fluoro-4-oxochroman-7-yl)oxy)(pyridin-4-yl)methyl)benzamide;
(*S)-4-(((6-Fluoro-4-oxochroman-7-yl)oxy)(pyridin-4-yl)methyl)benzamide;
(*R)-4-(((4-oxo-8-phenylchroman-7-yl)oxy)(pyridin-4-yl)methyl)benzamide;
(*S)-4-(((4-oxo-8-phenylchroman-7-yl)oxy)(pyridin-4-yl)methyl)benzamide;
(*R)-4-(((4-oxo-6-phenylchroman-7-yl)oxy)(pyridin-4-yl)methyl)benzamide;
(*S)-4-(((4-oxo-6-phenylchroman-7-yl)oxy)(pyridin-4-yl)methyl)benzamide;
4-((1*R)-((3-(Hydroxymethyl-4-oxochroman-7-yl)oxy)(pyridin-4-yl)methyl)benzamide;
(*R)-4-(((3,3-dimethyl-4-oxochroman-7-yl)oxy)(pyridin-4-yl)methyl)benzamide;
(*S)-4-(((3,3-dimethyl-4-oxochroman-7-yl)oxy)(pyridin-4-yl)methyl)benzamide;
(*R)-4-((4-chlorophenyl)((8-methyl-4-oxochroman-7-yl)oxy-yl)methyl)benzamide;
(*S)-4-((4-chlorophenyl)((8-methyl-4-oxochroman-7-yl)oxy)methyl)benzamide;
(*R)-4-(((6-fluoro-8-methyl-4-oxochroman-7-yl)oxy)(pyridin-4-yl)methyl)benzamide;
(*S)-4-(((6-fluoro-8-methyl-4-oxochroman-7-yl)oxy)(pyridin-4-yl)methyl)benzamide;

(*R)-4-((4-cyanophenyl)((8-methyl-4-oxochroman-7-yl)oxy)methyl)benzamide;
(*S)-4-((4-cyanophenyl)((8-methyl-4-oxochroman-7-yl)oxy)methyl)benzamide;
(*R)-4-((3-cyanophenyl)((8-methyl-4-oxochroman-7-yl)oxy)methyl)benzamide;
(*S)-4-((3-cyanophenyl)((8-methyl-4-oxochroman-7-yl)oxy)methyl)benzamide;
(*R)-4-((2-cyanophenyl)((8-methyl-4-oxochroman-7-yl)oxy)methyl)benzamide;
(*S)-4-((2-cyanophenyl)((8-methyl-4-oxochroman-7-yl)oxy)methyl)benzamide;
(*R)-4-((5-chloropyridin-2-yl)((8-methyl-4-oxochroman-7-yl)oxy)methyl)benzamide;
(*S)-4-((5-chloropyridin-2-yl)((8-methyl-4-oxochroman-7-yl)oxy)methyl)benzamide;
(*R)-6-((4-chlorophenyl)((8-methyl-4-oxochroman-7-yl)oxy)methyl)nicotinamide;
(*S)-6-((4-chlorophenyl)((8-methyl-4-oxochroman-7-yl)oxy)methyl)nicotinamide;
(*R)-5-((4-chlorophenyl)((8-methyl-4-oxochroman-7-yl)oxy)methyl)picolinamide;
(*S)-5-((4-chlorophenyl)((8-methyl-4-oxochroman-7-yl)oxy)methyl)picolinamide;
(*R)-2-((4-carbamoylphenyl)((8-methyl-4-oxochroman-7-yl)oxy)methyl)pyridine 1-oxide;
(*S)-2-((4-carbamoylphenyl)((8-methyl-4-oxochroman-7-yl)oxy)methyl)pyridine 1-oxide;
(*R)-4-((4-Fluorophenyl)((8-methyl-4-oxochroman-7-yl)oxy)methyl)benzamide;
(*S)-4-((4-Fluorophenyl)((8-methyl-4-oxochroman-7-yl)oxy)methyl)benzamide;
(*R)-4-((3-Fluorophenyl)((8-methyl-4-oxochroman-7-yl)oxy)methyl)benzamide;
(*S)-4-((3-Fluorophenyl)((8-methyl-4-oxochroman-7-yl)oxy)methyl)benzamide;
(*R)-4-((2-Fluorophenyl)((8-methyl-4-oxochroman-7-yl)oxy)methyl)benzamide;
(*S)-4-((2-Fluorophenyl)((8-methyl-4-oxochroman-7-yl)oxy)methyl)benzamide;
(*R)-4-(((8-Methyl-4-oxochroman-7-yl)oxy)(phenyl)methyl)benzamide;
(*S)-4-(((8-Methyl-4-oxochroman-7-yl)oxy)(phenyl)methyl)benzamide;
(*R)-4-(((8-methyl-4-oxochroman-7-yl)oxy)(phenyl)methyl)benzoic acid;
(*S)-4-(((8-methyl-4-oxochroman-7-yl)oxy)(phenyl)methyl)benzoic acid;
(*R)-4-((4-carbamoylphenyl)((8-methyl-4-oxochroman-7-yl)oxy)methyl)benzoic acid;
(*S)-4-((4-carbamoylphenyl)((8-methyl-4-oxochroman-7-yl)oxy)methyl)benzoic acid;
(*R)—N,N-dimethyl-4-(((4-oxochroman-7-yl)oxy)(pyridin-4-yl)methyl)benzamide;
(*S)—N,N-dimethyl-4-(((4-oxochroman-7-yl)oxy)(pyridin-4-yl)methyl)benzamide;
(*R)-4-(((8-ethyl-4-oxochroman-7-yl)oxy)(pyridin-4-yl)methyl)benzamide;
(*S)-4-(((8-ethyl-4-oxochroman-7-yl)oxy)(pyridin-4-yl)methyl)benzamide;
(*R)-4-(((6-ethyl-4-oxochroman-7-yl)oxy)(pyridin-4-yl)methyl)benzamide;
(*S)-4-(((6-ethyl-4-oxochroman-7-yl)oxy)(pyridin-4-yl)methyl)benzamide;
(*R)-4-(((8-isopropyl-4-oxochroman-7-yl)oxy)(pyridin-4-yl)methyl)benzamide;
(*S)-4-(((8-isopropyl-4-oxochroman-7-yl)oxy)(pyridin-4-yl)methyl)benzamide;
(*R)-4-(((6-isopropyl-4-oxochroman-7-yl)oxy)(pyridin-4-yl)methyl)benzamide;
(*S)-4-(((6-isopropyl-4-oxochroman-7-yl)oxy)(pyridin-4-yl)methyl)benzamide;
(*R)-4-(((5-methoxy-4-oxochroman-7-yl)oxy)(pyridin-4-yl)methyl)benzamide;
(*S)-4-(((5-methoxy-4-oxochroman-7-yl)oxy)(pyridin-4-yl)methyl)benzamide;
(*R)-4-(((8-cyano-4-oxochroman-7-yl)oxy)(pyridin-4-yl)methyl)benzamide;
(*S)-4-(((8-cyano-4-oxochroman-7-yl)oxy)(pyridin-4-yl)methyl)benzamide;
(*R)-4-(((8-([1,1'-biphenyl]-4-yl)-4-oxochroman-7-yl)oxy)(pyridin-4-yl)methyl)benzamide;
(*S)-4-(((8-([1,1'-biphenyl]-4-yl)-4-oxochroman-7-yl)oxy)(pyridin-4-yl)methyl)benzamide;
(*R)-4-(((4-Oxo-8-propylchroman-7-yl)oxy)(pyridin-4-yl)methyl)benzamide;
(*S)-4-(((4-Oxo-8-propylchroman-7-yl)oxy)(pyridin-4-yl)methyl)benzamide;
(*R)-1-(3-(((8-methyl-4-oxochroman-7-yl)oxy)(pyridin-4-yl)methyl)benzyl)urea;
(*S)-1-(3-(((8-methyl-4-oxochroman-7-yl)oxy)(pyridin-4-yl)methyl)benzyl)urea;
(*R)-3-Methoxy-4-(((8-methyl-4-oxochroman-7-yl)oxy)(pyridin-4-yl)methyl)benzamide;
(*S)-3-Methoxy-4-(((8-methyl-4-oxochroman-7-yl)oxy)(pyridin-4-yl)methyl)benzamide;
(*R)-3-ethoxy-4-(((8-methyl-4-oxochroman-7-yl)oxy)(pyridin-4-yl)methyl)benzamide;
(*S)-3-ethoxy-4-(((8-methyl-4-oxochroman-7-yl)oxy)(pyridin-4-yl)methyl)benzamide;
(*R)-3-isopropoxy-4-(((8-methyl-4-oxochroman-7-yl)oxy)(pyridin-4-yl)methyl)benzamide;
(*S)-3-isopropoxy-4-(((8-methyl-4-oxochroman-7-yl)oxy)(pyridin-4-yl)methyl)benzamide;
(*R)-3-isobutoxy-4-(((8-methyl-4-oxochroman-7-yl)oxy)(pyridin-4-yl)methyl)benzamide;
(*S)-3-isobutoxy-4-(((8-methyl-4-oxochroman-7-yl)oxy)(pyridin-4-yl)methyl)benzamide;
(*R)-3-(benzyloxy)-4-(((8-methyl-4-oxochroman-7-yl)oxy)(pyridin-4-yl)methyl)benzamide;
(*S)-3-(benzyloxy)-4-(((8-methyl-4-oxochroman-7-yl)oxy)(pyridin-4-yl)methyl)benzamide;
(*R)-Ethyl 3-(4-((4-carbamoylphenyl)((8-methyl-4-oxochroman-7-yl)oxy)methyl)pyridin-2-yl)propanoate;
(*S)-Ethyl 3-(4-((4-carbamoylphenyl)((8-methyl-4-oxochroman-7-yl)oxy)methyl)pyridin-2-yl)propanoate;
(*R)-4-(((6,8-dimethyl-4-oxochroman-7-yl)oxy)(pyridin-4-yl)methyl)benzonitrile;
(*S)-4-(((6,8-dimethyl-4-oxochroman-7-yl)oxy)(pyridin-4-yl)methyl)benzonitrile;
(*R)-4-(((6,8-dimethyl-4-oxochroman-7-yl)oxy)(pyridin-4-yl)methyl)benzamide;
(*S)-4-(((6,8-dimethyl-4-oxochroman-7-yl)oxy)(pyridin-4-yl)methyl)benzamide;
(*R)-4-(((6,8-dimethyl-4-oxochroman-7-yl)oxy)(4-fluorophenyl)methyl)benzamide;
(*S-4-(((6,8-dimethyl-4-oxochroman-7-yl)oxy)(4-fluorophenyl)methyl)benzamide;
(*R)-4-((3,4-difluorophenyl)((6-fluoro-8-methyl-4-oxochroman-7-yl)oxy)methyl)benzamide;

(*S)-4-((3,4-difluorophenyl)((6-fluoro-8-methyl-4-oxochroman-7-yl)oxy)methyl)benzamide;
(*R)-4-((3-cyanophenyl)((6-fluoro-8-methyl-4-oxochroman-7-yl)oxy)methyl)benzamide;
(*S)-4-((3-cyanophenyl)((6-fluoro-8-methyl-4-oxochroman-7-yl)oxy)methyl)benzamide;
(*R)-4-(((6-fluoro-8-methyl-4-oxochroman-7-yl)oxy)(4-(methylsulfonyl)phenyl)methyl)benzamide;
(*S)-4-(((6-fluoro-8-methyl-4-oxochroman-7-yl)oxy)(4-(methylsulfonyl)phenyl)methyl)benzamide;
(*R)-4-((2,6-dimethylpyridin-4-yl)((6-fluoro-8-methyl-4-oxochroman-7-yl)oxy)methyl)benzamide;
(*S)-4-((2,6-dimethylpyridin-4-yl)((6-fluoro-8-methyl-4-oxochroman-7-yl)oxy)methyl)benzamide;
(*R)-2-fluoro-4-(((6-fluoro-8-methyl-4-oxochroman-7-yl)oxy)(pyridin-4-yl)methyl)benzamide;
(*S)-2-fluoro-4-(((6-fluoro-8-methyl-4-oxochroman-7-yl)oxy)(pyridin-4-yl)methyl)benzamide;
(*R)-6-fluoro-7-((3-fluorophenyl)(pyridin-4-yl)methoxy)-8-methylchroman-4-one;
(*S)-6-fluoro-7-((3-fluorophenyl)(pyridin-4-yl)methoxy)-8-methylchroman-4-one;
(*R)-6-fluoro-7-((3-fluoro-4-methoxyphenyl)(pyridin-4-yl)methoxy)-8-methylchroman-4-one;
(*S)-6-fluoro-7-((3-fluoro-4-methoxyphenyl)(pyridin-4-yl)methoxy)-8-methylchroman-4-one;
(*R)-4-(((4-oxochroman-7-yl)oxy)(pyridin-4-yl)methyl)-1-naphthamide;
(*S)-4-(((4-oxochroman-7-yl)oxy)(pyridin-4-yl)methyl)-1-naphthamide;
(*R)-4-(((5-ethyl-4-oxochroman-7-yl)oxy)(pyridin-4-yl)methyl)benzamide;
(*S)-4-(((5-ethyl-4-oxochroman-7-yl)oxy)(pyridin-4-yl)methyl)benzamide;
(*R)-4-(((8-methoxy-4-oxochroman-7-yl)oxy)(pyridin-4-yl)methyl)benzamide;
(*S)-4-(((8-methoxy-4-oxochroman-7-yl)oxy)(pyridin-4-yl)methyl)benzamide;
(*R)-4-(((5-cyano-4-oxochroman-7-yl)oxy)(pyridin-4-yl)methyl)benzamide;
(*S)-4-(((5-cyano-4-oxochroman-7-yl)oxy)(pyridin-4-yl)methyl)benzamide;
(*R)-4-(((8-bromo-4-oxochroman-7-yl)oxy)(pyridin-4-yl)methyl)benzamide;
(*S)-4-(((8-bromo-4-oxochroman-7-yl)oxy)(pyridin-4-yl)methyl)benzamide;
(*R)-6-fluoro-7-((4-methoxyphenyl)(pyridin-4-yl)methoxy)-8-methylchroman-4-one;
(*S)-6-fluoro-7-((4-methoxyphenyl)(pyridin-4-yl)methoxy)-8-methylchroman-4-one;
(*R)-6-fluoro-8-methyl-7-(4-(methylsulfonyl)phenyl)(pyridin-4-yl)methoxy)chroman-4-one;
(*S)-6-fluoro-8-methyl-7-((4-(methylsulfonyl)phenyl)(pyridin-4-yl)methoxy)chroman-4-one;
(*R)-6-fluoro-8-methyl-7-(3-(methylsulfonyl)phenyl)(pyridin-4-yl)methoxy)chroman-4-one;
(*S)-6-fluoro-8-methyl-7-((3-(methylsulfonyl)phenyl)(pyridin-4-yl)methoxy)chroman-4-one;
(*R)-4-((2,6-dimethylpyridin-4-yl)((8-isopropyl-4-oxochroman-7-yl)oxy)methyl)benzamide;
(*S)-4-((2,6-dimethylpyridin-4-yl)((8-isopropyl-4-oxochroman-7-yl)oxy)methyl)benzamide;
(*R)-4-((3-cyanophenyl)((8-isopropyl-4-oxochroman-7-yl)oxy)methyl)benzamide;
(*S)-4-((3-cyanophenyl)((8-isopropyl-4-oxochroman-7-yl)oxy)methyl)benzamide;
(*R)-4-((4-carbamoylphenyl)((8-isopropyl-4-oxochroman-7-yl)oxy)methyl)benzoic acid;
(*S)-4-((4-carbamoylphenyl)((8-isopropyl-4-oxochroman-7-yl)oxy)methyl)benzoic acid;
(*R)-4-((2,6-dimethylpyridin-4-yl)((6-fluoro-4-oxochroman-7-yl)oxy)methyl)benzamide;
(*S)-4-((2,6-dimethylpyridin-4-yl)((6-fluoro-4-oxochroman-7-yl)oxy)methyl)benzamide;
(*R)-4-(((8-cyano-4-oxochroman-7-yl)oxy)(2,6-dimethylpyridin-4-yl)methyl)benzamide;
(*S)-4-(((8-cyano-4-oxochroman-7-yl)oxy)(2,6-dimethylpyridin-4-yl)methyl)benzamide;
(*R)-4-((2,6-dimethylpyridin-4-yl)((8-methyl-4-oxochroman-7-yl)oxy)methyl)benzamide;
(*S)-4-((2,6-dimethylpyridin-4-yl)((8-methyl-4-oxochroman-7-yl)oxy)methyl)benzamide;
(*R)-4-((2,6-dimethylpyridin-4-yl)((2,2,8-trimethyl-4-oxochroman-7-yl)oxy)methyl)benzamide;
(*S)-4-((2,6-dimethylpyridin-4-yl)((2,2,8-trimethyl-4-oxochroman-7-yl)oxy)methyl)benzamide;
(R,S)-4-(pyridin-4-yl((2,2,8-trimethyl-4-oxochroman-7-yl)oxy)methyl)benzamide;
(*R)-7-(phenyl(pyridin-4-yl)methoxy)chroman-4-one;
(*S)-7-(phenyl(pyridin-4-yl)methoxy)chroman-4-one; and
(R,S)-7-(Phenyl(pyridin-3-yl)methoxy)chroman-4-one.

15. A compound as claimed in claim 14 wherein said compound is selected from
(*R)-7-((3-((4-Methoxybenzyl)oxy)phenyl)(pyridin-4-yl)methoxy)chroman-4-one;
(*R)-2-(((4-Oxochroman-7-yl)oxy)(pyridin-4-yl)methyl)benzonitrile;
(*R)-3-(((4-oxochroman-7-yl)oxy)(pyridin-4-yl)methyl)benzamide;
(*R)-4-(((8-methyl-4-oxochroman-7-yl)oxy)(pyridin-4-yl)methyl)benzamide;
(*R)-4-((2,6-dimethylpyridin-4-yl)((6-fluoro-8-methyl-4-oxochroman-7-yl)oxy)methyl)benzamide;
(*R)-4-(((8-cyano-4-oxochroman-7-yl)oxy)(2,6-dimethylpyridin-4-yl)methyl)benzamide
(*S)-4-((2,6-dimethylpyridin-4-yl)((8-methyl-4-oxochroman-7-yl)oxy)methyl)benzamide;
(*R)-4-((2,6-dimethylpyridin-4-yl)((2,2,8-trimethyl-4-oxochroman-7-yl)oxy)methyl)benzamide and pharmaceutically acceptable salts thereof.

16. A pharmaceutical composition comprising a therapeutically effective amount of at least one compound or a pharmaceutically acceptable salt thereof, as claimed in claim 1.

* * * * *